US008676937B2

(12) United States Patent
Rapaport et al.

(10) Patent No.: US 8,676,937 B2
(45) Date of Patent: Mar. 18, 2014

(54) SOCIAL-TOPICAL ADAPTIVE NETWORKING (STAN) SYSTEM ALLOWING FOR GROUP BASED CONTEXTUAL TRANSACTION OFFERS AND ACCEPTANCES AND HOT TOPIC WATCHDOGGING

(75) Inventors: Jeffrey Alan Rapaport, Angeles (PH); Seymour Rapaport, Los Altos, CA (US); Kenneth Allen Smith, Fremont, CA (US); James Beattie, San Ramon, CA (US); Gideon Gimlan, Los Gatos, CA (US)

(73) Assignee: Jeffrey Alan Rapaport (PH)

( * ) Notice: Subject to any disclaimer, the term of this patent is extended or adjusted under 35 U.S.C. 154(b) by 0 days.

(21) Appl. No.: 13/367,642

(22) Filed: Feb. 7, 2012

(65) Prior Publication Data

US 2012/0290950 A1 Nov. 15, 2012

Related U.S. Application Data

(60) Provisional application No. 61/485,409, filed on May 12, 2011, provisional application No. 61/551,338, filed on Oct. 25, 2011.

(51) Int. Cl.
*G06F 15/16* (2006.01)

(52) U.S. Cl.
USPC .......................................................... 709/219

(58) Field of Classification Search
USPC .......................................................... 709/219
See application file for complete search history.

(56) References Cited

U.S. PATENT DOCUMENTS

| | | | |
|---|---|---|---|
| 5,754,939 | A | 5/1998 | Herz et al. |
| 5,793,365 | A | 8/1998 | Tang et al. |
| 5,828,839 | A | 10/1998 | Moncreiff |
| 5,848,396 | A | 12/1998 | Gerace |
| 5,890,152 | A | 3/1999 | Rapaport et al. |
| 5,930,474 | A | 7/1999 | Dunworth et al. |
| 5,950,200 | A | 9/1999 | Sudai et al. |
| 6,041,311 | A | 3/2000 | Chislenko et al. |
| 6,061,716 | A | 5/2000 | Moncreiff |
| 6,081,830 | A | 6/2000 | Schindler |
| 6,229,542 | B1 | 5/2001 | Miller |
| 6,272,467 | B1 | 8/2001 | Durand et al. |
| 6,425,012 | B1 | 7/2002 | Trovato et al. |
| 6,446,113 | B1 | 9/2002 | Ozzie et al. |
| 6,480,885 | B1 | 11/2002 | Olivier |
| 6,611,881 | B1 | 8/2003 | Gottfurcht et al. |
| 6,618,593 | B1 | 9/2003 | Drutman et al. |

(Continued)

OTHER PUBLICATIONS

PCT Search Report, PCT/US10/23731, Jun. 4, 2010, 12 pages.

(Continued)

*Primary Examiner* — Jerry Dennison
(74) *Attorney, Agent, or Firm* — Innovation Counsel LLP

(57) ABSTRACT

Disclosed is a Social-Topical Adaptive Networking (STAN) system that can inform users of cross-correlations between currently focused-upon topic or other nodes in a corresponding topic or other data-objects organizing space maintained by the system and various social entities monitored by the system. More specifically, one of the cross-correlations may be as between the top N now-hottest topics being focused-upon by a first social entity and the amounts of focus 'heat' that other social entities (e.g., friends and family) are casting on the same topics (or other subregions of other cognitive attention receiving spaces) in a relevant time period.

41 Claims, 39 Drawing Sheets

(56) References Cited

U.S. PATENT DOCUMENTS

| | | | |
|---|---|---|---|
| 6,651,086 | B1 | 11/2003 | Manber et al. |
| 6,745,178 | B1 | 6/2004 | Emens et al. |
| 6,757,682 | B1 | 6/2004 | Naimark et al. |
| 6,766,374 | B2 | 7/2004 | Trovato et al. |
| 6,873,314 | B1 | 3/2005 | Campbell |
| 6,879,994 | B1 | 4/2005 | Matsliach et al. |
| 6,978,292 | B1 | 12/2005 | Murakami et al. |
| 6,981,021 | B2 | 12/2005 | Takakura et al. |
| 7,219,303 | B2 | 5/2007 | Fish |
| 7,386,796 | B1 | 6/2008 | Simpson et al. |
| 7,394,388 | B1 | 7/2008 | Light et al. |
| 7,395,507 | B2 | 7/2008 | Robarts et al. |
| 7,401,098 | B2 | 7/2008 | Baker |
| 7,424,541 | B2 | 9/2008 | Bourne |
| 7,430,315 | B2 | 9/2008 | Yang et al. |
| 7,472,352 | B2 | 12/2008 | Liversidge et al. |
| 7,610,287 | B1 | 10/2009 | Dean et al. |
| 7,630,986 | B1 | 12/2009 | Herz et al. |
| 7,788,260 | B2 | 8/2010 | Lunt et al. |
| 7,853,881 | B1 | 12/2010 | Assal et al. |
| 7,860,928 | B1 | 12/2010 | Anderson |
| 7,865,553 | B1 | 1/2011 | Anderson |
| 7,870,026 | B2 | 1/2011 | Krishnan et al. |
| 7,904,500 | B1 | 3/2011 | Anderson |
| 7,945,861 | B1 | 5/2011 | Karam |
| 7,966,565 | B2 | 6/2011 | Dawson et al. |
| 8,024,328 | B2 | 9/2011 | Dolin et al. |
| 8,274,377 | B2 | 9/2012 | Smith et al. |
| 2003/0037110 | A1 | 2/2003 | Yamamoto |
| 2003/0055897 | A1 | 3/2003 | Brown et al. |
| 2003/0078972 | A1 | 4/2003 | Tapissier et al. |
| 2003/0195928 | A1 | 10/2003 | Kamijo et al. |
| 2003/0225833 | A1 | 12/2003 | Pilat et al. |
| 2003/0234953 | A1 | 12/2003 | Dawson et al. |
| 2004/0205651 | A1 | 10/2004 | Dutta et al. |
| 2004/0228531 | A1 | 11/2004 | Fernandez et al. |
| 2005/0086610 | A1 | 4/2005 | Mackinlay et al. |
| 2005/0149459 | A1 | 7/2005 | Kofman et al. |
| 2005/0154693 | A1 | 7/2005 | Ebert |
| 2005/0259035 | A1 | 11/2005 | Iwaki et al. |
| 2006/0080613 | A1 | 4/2006 | Savant |
| 2006/0093998 | A1 | 5/2006 | Vertegaal |
| 2006/0156326 | A1 | 7/2006 | Goronzy et al. |
| 2006/0176831 | A1 | 8/2006 | Greenberg et al. |
| 2006/0224593 | A1 | 10/2006 | Benton et al. |
| 2007/0013652 | A1 | 1/2007 | Kim et al. |
| 2007/0016585 | A1 | 1/2007 | Nickell et al. |
| 2007/0036292 | A1 | 2/2007 | Selbie et al. |
| 2007/0100938 | A1 | 5/2007 | Bagley et al. |
| 2007/0150281 | A1 | 6/2007 | Hoff |
| 2007/0150916 | A1 | 6/2007 | Begole et al. |
| 2007/0168446 | A1 | 7/2007 | Keohane et al. |
| 2007/0168448 | A1 | 7/2007 | Garbow et al. |
| 2007/0239566 | A1 * | 10/2007 | Dunnahoo et al. .............. 705/27 |
| 2007/0265507 | A1 | 11/2007 | de Lemos |
| 2008/0034309 | A1 | 2/2008 | Louch et al. |
| 2008/0065468 | A1 | 3/2008 | Berg et al. |
| 2008/0091512 | A1 | 4/2008 | Marci et al. |
| 2008/0097235 | A1 | 4/2008 | Ofek et al. |
| 2008/0114737 | A1 * | 5/2008 | Neely et al. ....................... 707/3 |
| 2008/0114755 | A1 | 5/2008 | Wolters et al. |
| 2008/0189367 | A1 | 8/2008 | Okumura |
| 2008/0209343 | A1 | 8/2008 | Macadaan et al. |
| 2008/0209350 | A1 | 8/2008 | Sobotka et al. |
| 2008/0234976 | A1 | 9/2008 | Wittkowski |
| 2008/0262364 | A1 | 10/2008 | Aarts |
| 2008/0266118 | A1 | 10/2008 | Pierson et al. |
| 2008/0281783 | A1 | 11/2008 | Papkoff et al. |
| 2008/0288437 | A1 | 11/2008 | Siregar |
| 2008/0313108 | A1 | 12/2008 | Carrabis |
| 2008/0320082 | A1 | 12/2008 | Kuhlke et al. |
| 2009/0077064 | A1 | 3/2009 | Daigle |
| 2009/0089678 | A1 * | 4/2009 | Sacco et al. .................. 715/733 |
| 2009/0100469 | A1 | 4/2009 | Conradt et al. |
| 2009/0119584 | A1 | 5/2009 | Herbst |
| 2009/0179983 | A1 | 7/2009 | Schindler |
| 2009/0234727 | A1 | 9/2009 | Petty |
| 2009/0234876 | A1 | 9/2009 | Schigel et al. |
| 2009/0249244 | A1 | 10/2009 | Robinson et al. |
| 2009/0260060 | A1 | 10/2009 | Smith et al. |
| 2009/0327417 | A1 | 12/2009 | Chakra et al. |
| 2010/0037277 | A1 | 2/2010 | Flynn-Ripley et al. |
| 2010/0070758 | A1 | 3/2010 | Low et al. |
| 2010/0114684 | A1 | 5/2010 | Neged |
| 2010/0159909 | A1 | 6/2010 | Stifelman |
| 2010/0164956 | A1 | 7/2010 | Hyndman et al. |
| 2010/0169766 | A1 | 7/2010 | Duarte et al. |
| 2010/0180217 | A1 | 7/2010 | Li |
| 2010/0191727 | A1 | 7/2010 | Malik |
| 2010/0198633 | A1 | 8/2010 | Guy et al. |
| 2010/0293104 | A1 | 11/2010 | Olsson et al. |
| 2011/0029898 | A1 | 2/2011 | Malik |
| 2011/0047119 | A1 | 2/2011 | Kaplan |
| 2011/0047487 | A1 | 2/2011 | Deweese et al. |
| 2011/0055734 | A1 | 3/2011 | Borst et al. |
| 2011/0055735 | A1 | 3/2011 | Wood et al. |
| 2011/0082907 | A1 | 4/2011 | Anderson |
| 2011/0087540 | A1 | 4/2011 | Krishnan et al. |
| 2011/0087735 | A1 | 4/2011 | Anderson |
| 2011/0125661 | A1 | 5/2011 | Hull et al. |
| 2011/0137690 | A1 | 6/2011 | Louch et al. |
| 2011/0137951 | A1 | 6/2011 | Baker |
| 2011/0142016 | A1 | 6/2011 | Chatterjee |
| 2011/0145570 | A1 | 6/2011 | Gressel et al. |
| 2011/0153761 | A1 | 6/2011 | Anderson |
| 2011/0154224 | A1 | 6/2011 | Bates et al. |
| 2011/0161164 | A1 | 6/2011 | Anderson |
| 2011/0161177 | A1 | 6/2011 | Anderson |
| 2011/0179125 | A1 | 7/2011 | Lee et al. |
| 2011/0185025 | A1 | 7/2011 | Cherukuri et al. |
| 2011/0197123 | A1 | 8/2011 | Caine et al. |
| 2011/0197146 | A1 | 8/2011 | Goto et al. |
| 2011/0201423 | A1 | 8/2011 | Borst et al. |
| 2011/0246908 | A1 | 10/2011 | Akram et al. |
| 2011/0246920 | A1 | 10/2011 | Lebrun |
| 2011/0270830 | A1 | 11/2011 | Stefik et al. |
| 2012/0042263 | A1 | 2/2012 | Rapaport et al. |
| 2012/0124486 | A1 | 5/2012 | Robinson et al. |
| 2012/0265528 | A1 | 10/2012 | Gruber et al. |
| 2012/0323928 | A1 | 12/2012 | Bhatia |

OTHER PUBLICATIONS

PCT International Preliminary Report on Patentability, PCT/US2010/023731, Aug. 16, 2011, 1 page.

Advance E-Mail, PCT Notification Concerning Transmittal of International Preliminary Report on Patentability, PCT/US2010/023731, Aug. 25, 2011, 1 page.

Joshua Schnell, Macgasm, http://www.macgasm.net/2011/06/09/apple-smartphones-smarter-patent/, Oct. 6, 2011, 6 pages.

* cited by examiner

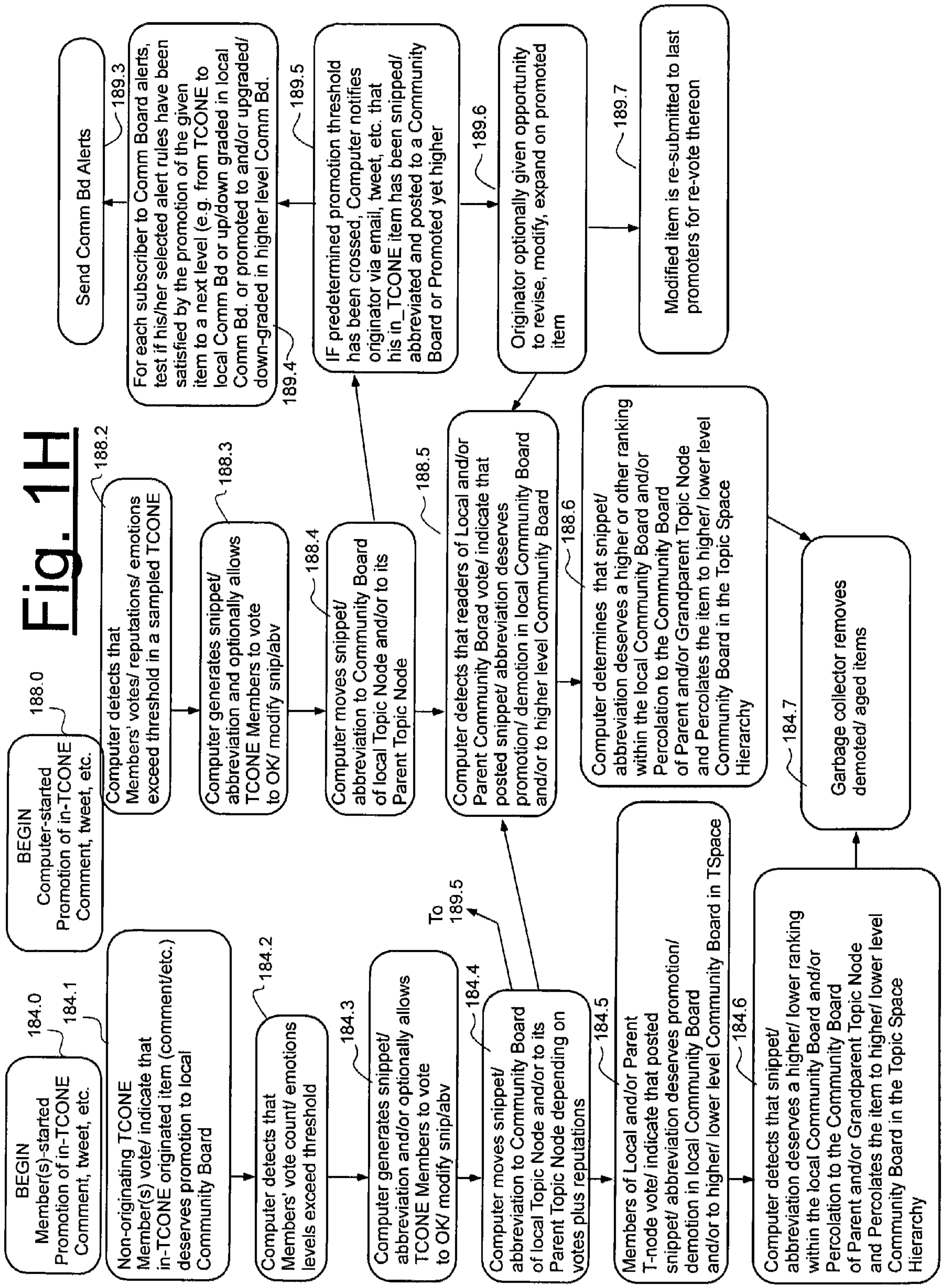
Fig. 1H
184.0
BEGIN Member(s)-started Promotion of in-TCONE Comment, tweet, etc.
184.1
Non-originating TCONE Member(s) vote/ indicate that in-TCONE originated item (comment/etc.) deserves promotion to local Community Board
184.2
Computer detects that Members' vote count/ emotions levels exceed threshold
184.3
Computer generates snippet/ abbreviation and/or optionally allows TCONE Members to vote to OK/ modify snip/abv
184.4
Computer moves snippet/ abbreviation to Community Board of local Topic Node and/or to its Parent Topic Node depending on votes plus reputations
To 189.5
184.5
Members of Local and/or Parent T-node vote/ indicate that posted snippet/ abbreviation deserves promotion/ demotion in local Community Board and/or to higher/ lower level Community Board in TSpace
184.6
Computer detects that snippet/ abbreviation deserves a higher/ lower ranking within the local Community Board and/or Percolation to the Community Board of Parent and/or Grandparent Topic Node and Percolates the item to higher/ lower level Community Board in the Topic Space Hierarchy
184.7
Garbage collector removes demoted/ aged items
188.0
BEGIN Computer-started Promotion of in-TCONE Comment, tweet, etc.
188.2
Computer detects that Members' votes/ reputations/ emotions exceed threshold in a sampled TCONE
188.3
Computer generates snippet/ abbreviation and optionally allows TCONE Members to vote to OK/ modify snip/abv
188.4
Computer moves snippet/ abbreviation to Community Board of local Topic Node and/or to its Parent Topic Node
188.5
Computer detects that readers of Local and/or Parent Community Borad vote/ indicate that posted snippet/ abbreviation deserves promotion/ demotion in local Community Board and/or to higher level Community Board
188.6
Computer determines that snippet/ abbreviation deserves a higher or other ranking within the local Community Board and/or Percolation to the Comdparent Community Board of Parent and/or Grandparent Topic Node and Percolates the item to higher/ lower level Community Board in the Topic Space Hierarchy
189.3
Send Comm Bd Alerts
189.4
For each subscriber to Comm Board alerts, test if his/her selected alert rules have been satisfied by the promotion of the given item to a next level (e.g. from TCONE to local Comm Bd or up/down graded in local Comm Bd. or promoted to and/or upgraded/ down-graded in higher level Comm Bd.
189.5
IF predetermined promotion threshold has been crossed, Computer notifies originator via email, tweet, etc. that his in_TCONE item has been snipped/ abbreviated and posted to a Community Board or Promoted yet higher
189.6
Originator optionally given opportunity to revise, modify, expand on promoted item
189.7
Modified item is re-submitted to last promoters for re-vote thereon

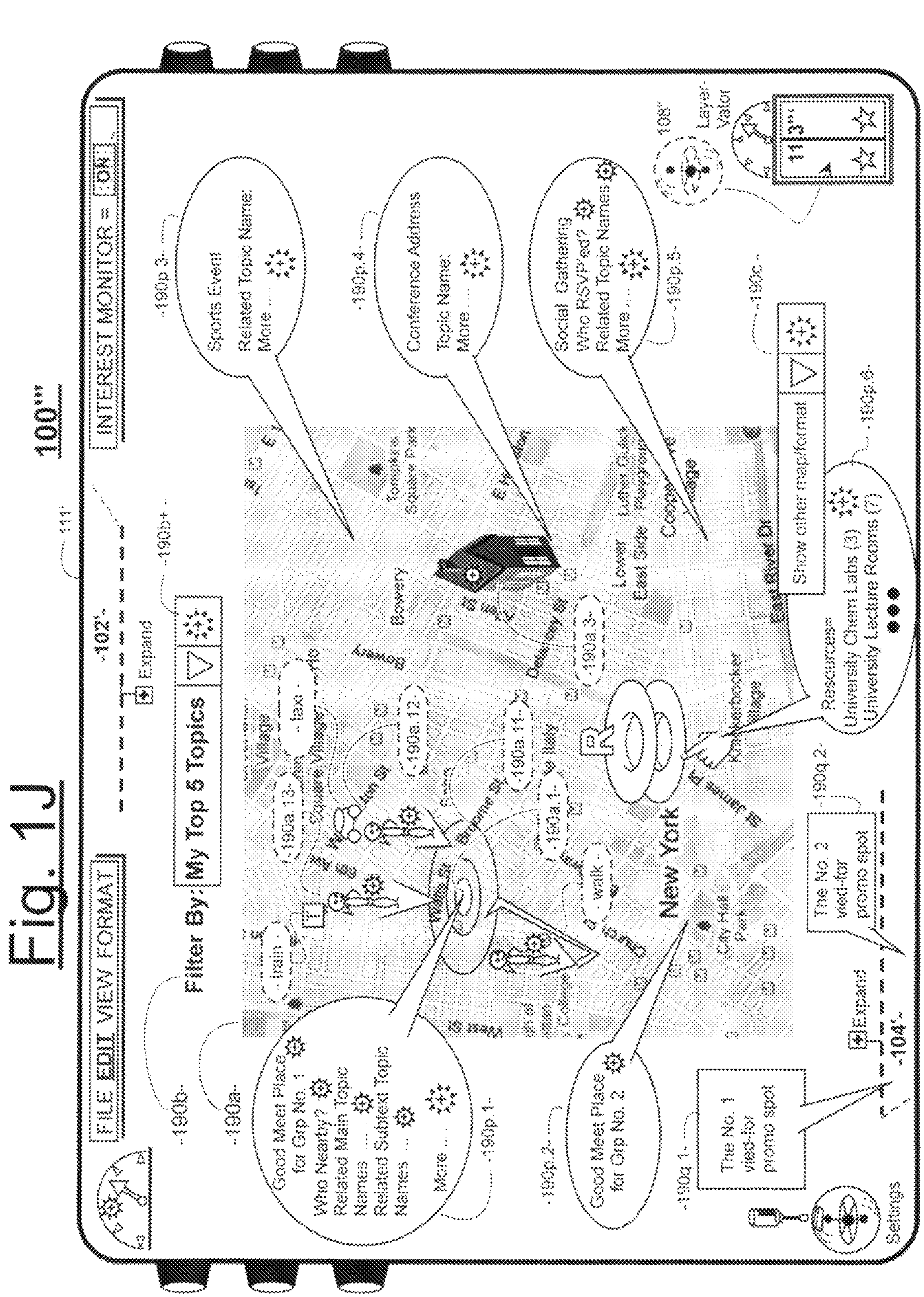
Fig. 1J
100'''
FILE EDIT VIEW FORMAT
INTEREST MONITOR = ON
Filter By: My Top 5 Topics
Expand
Good Meet Place for Grp No. 1
Who Nearby?
Related Main Topic Names ...
Related Subtext Topic Names ...
More ...
Good Meet Place for Grp No. 2
Sports Event
Related Topic Name:
Conference Address
Topic Name:
Social Gathering
Who RSVP'ed?
Related Topic Names
Show other map/format
Resources=
University Chem Labs (3)
University Lecture Rooms (7)
The No. 1 vied-for promo spot
The No. 2 vied-for promo spot
New York
Settings
Layer-Vator
-train-
-taxi-
-walk-
-102'-
-104'-
111'
108''

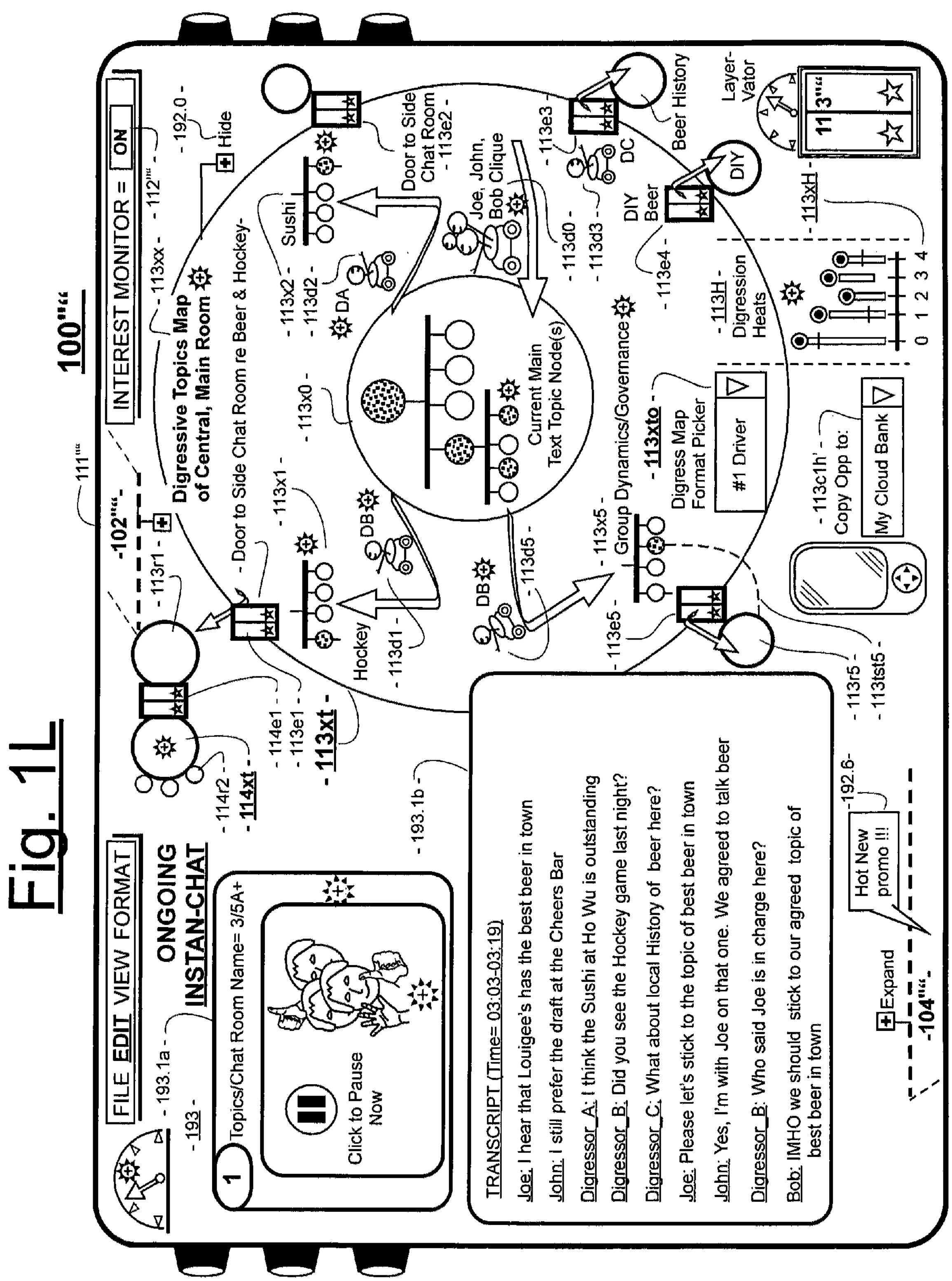
Fig. 1L
100''''
FILE EDIT VIEW FORMAT
ONGOING
INSTAN-CHAT
INTEREST MONITOR = ON
Digressive Topics Map
of Central, Main Room
Topics/Chat Room Name= 3/5A+
Click to Pause
Now
TRANSCRIPT (Time= 03:03-03:19)
Joe: I hear that Louigee's has the best beer in town
John: I still prefer the draft at the Cheers Bar
Digressor_A: I think the Sushi at Ho Wu is outstanding
Digressor_B: Did you see the Hockey game last night?
Digressor_C: What about local History of beer here?
Joe: Please let's stick to the topic of best beer in town
John: Yes, I'm with Joe on that one. We agreed to talk beer
Digressor_B: Who said Joe is in charge here?
Bob: IMHO we should stick to our agreed topic of
best beer in town
Door to Side Chat Room re Beer & Hockey
Door to Side
Chat Room
Current Main
Text Topic Node(s)
Joe, John,
Bob Clique
Sushi
Hockey
Beer History
DIY
DIY
Beer
Group Dynamics/Governance
Digress Map
Format Picker
#1 Driver
Copy Opp to:
My Cloud Bank
Digression
Heats
0 1 2 3 4
Layer-
Vator
Hide
Expand
Hot New
promo !!!
DA
DB
DC
- 111'''' -
- 102'''' -
- 112'''' -
- 113xx -
- 192.0 -
- 193 -
- 193.1a -
- 193.1b -
- 192.6 -
- 104'''' -
- 114r2 -
- 114xt -
- 114e1 -
- 113e1 -
- 113xt -
- 113r1 -
- 113x1 -
- 113x0 -
- 113x2 -
- 113d2 -
- 113d1 -
- 113d5 -
- 113d0 -
- 113d3 -
- 113e2 -
- 113e3 -
- 113e4 -
- 113e5 -
- 113x5 -
- 113xto -
- 113H -
- 113xH -
- 113c1h' -
- 113r5 -
- 113tst5 -

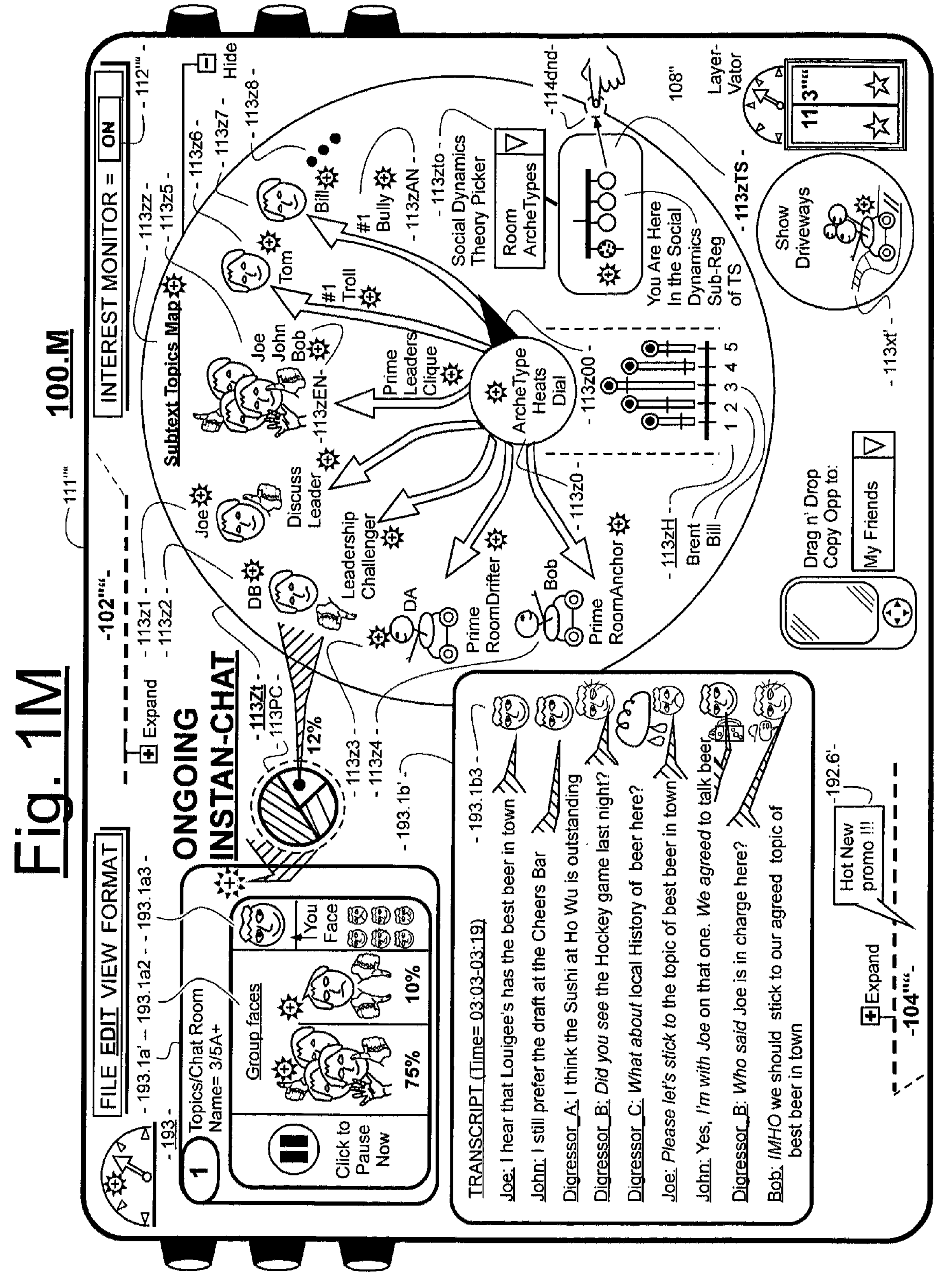
Fig. 1M
100.M
FILE EDIT VIEW FORMAT
INTEREST MONITOR = ON
ONGOING INSTAN-CHAT
Topics/Chat Room Name= 3/5A+
Group faces
75%
10%
You Face
Click to Pause Now
12%
Subtext Topics Map
ArcheType Heats Dial
Prime Leaders Clique
Discuss Leader
Leadership Challenger
Prime RoomDrifter
Prime RoomAnchor
#1 Troll
#1 Bully
Joe John Bob
Tom
Bill
Joe
DB
DA
Bob
Brent
Bill
Social Dynamics Theory Picker
Room ArcheTypes
You Are Here In the Social Dynamics Sub-Reg of TS
Show Driveways
Layer-Vator
Drag n' Drop Copy Opp to:
My Friends
Hot New promo !!!
Expand
Hide
TRANSCRIPT (Time= 03:03-03:19)
Joe: I hear that Louigee's has the best beer in town
John: I still prefer the draft at the Cheers Bar
Digressor_A: I think the Sushi at Ho Wu is outstanding
Digressor_B: Did you see the Hockey game last night?
Digressor_C: What about local History of beer here?
Joe: Please let's stick to the topic of best beer in town
John: Yes, I'm with Joe on that one. We agreed to talk beer
Digressor_B: Who said Joe is in charge here?
Bob: IMHO we should stick to our agreed topic of best beer in town

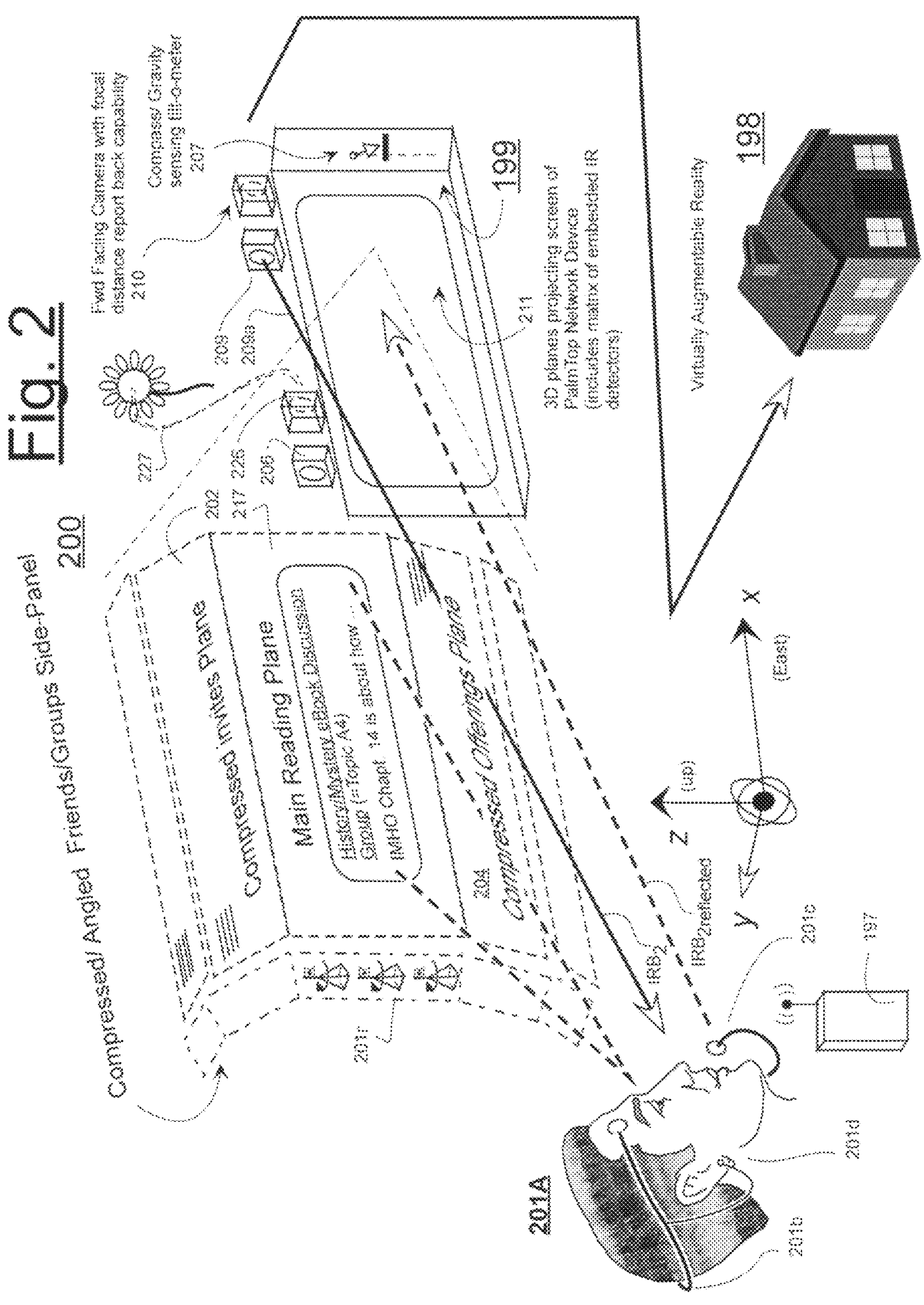
Fig. 2
200
Compressed/ Angled Friends/Groups Side-Panel
Compressed Invites Plane
Main Reading Plane
History/Mystery eBook Discussion
Group (=Topic A4)
IMHO Chapt 14 is about how ...
204
Compressed Offerings Plane
202
217
206
226
206
227
209
209a
210
Fwd Facing Camera with focal distance report back capability
Compass/ Gravity sensing tilt-o-meter
207
199
211
3D planes projecting screen of PalmTop Network Device (includes matrix of embedded IR detectors)
Virtually Augmentable Reality
198
X
(East)
Z
(up)
Y
IRB2
IRB2reflected
201c
197
201r
201A
201d
201b Music Primitive Object 30F.0

Sound Primitive Object 30G.0

Voice Primitive Object 30H.0

Linguistics Primitive Object 30i.0

Context Primitive Object 30J.0

Image Primitive Object
30M.0

Gross Anatomy Body Part & Movement or Energy Input/Output-Thereof Primitive Object
30N.0

Biological State/ Medical Condition Primitive Object
30o.0

Reactive Chemical Mixture Object
30P.0

Operator Node Object
30Q.0

A Cylindric Branch Region within Topic Space (and Part of the Universal "A" Tree)

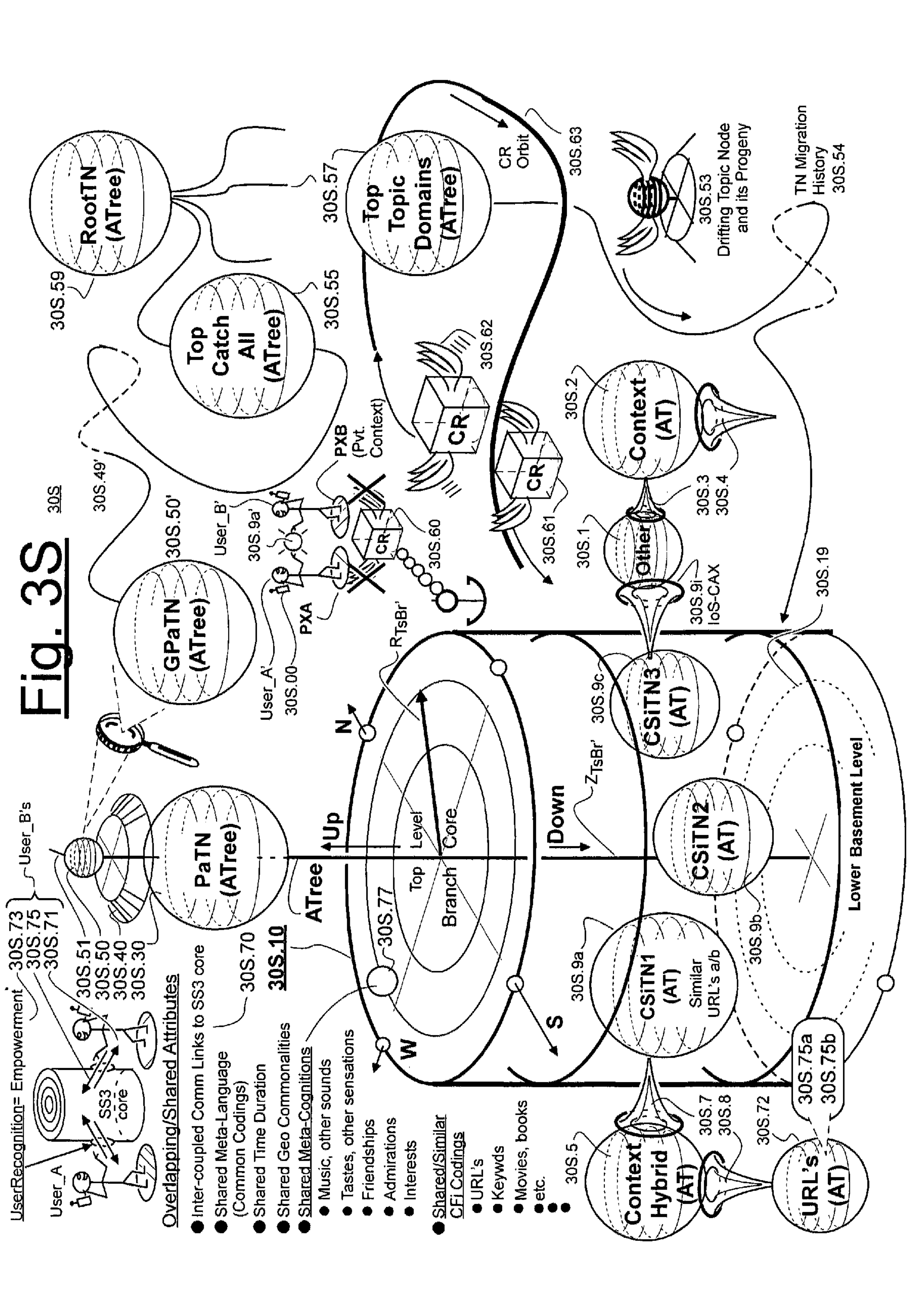
Fig. 3S
30S
UserRecognition= Empowerment
30S.73
30S.75
30S.71
User_B's
User_A
SS3 core
30S.51
30S.50
30S.40
30S.30
Overlapping/Shared Attributes
Inter-coupled Comm Links to SS3 core
Shared Meta-Language (Common Codings)
Shared Time Duration
Shared Geo Commonalities
Shared Meta-Cognitions
Music, other sounds
Tastes, other sensations
Friendships
Admirations
Interests
Shared/Similar CFi Codings
URL's
Keywds
Movies, books
etc.
30S.70
30S.10
PaTN (ATree)
ATree
Up
Down
Top Level Branch Core
30S.77
W
N
S
$R_{TsBr'}$
$Z_{TsBr'}$
GPaTN (ATree)
30S.50'
30S.49'
Top Catch All (ATree)
30S.55
RootTN (ATree)
30S.59
Top Topic Domains (ATree)
30S.57
CR Orbit
30S.63
30S.53
Drifting Topic Node and its Progeny
TN Migration History
30S.54
User_A'
30S.00
PXA
User_B'
30S.9a'
PXB (Pvt. Context)
CR
30S.60
30S.61
30S.62
Context (AT)
30S.2
30S.3
30S.4
Other
30S.1
30S.9i
IoS-CAX
30S.19
CSiTN3 (AT)
30S.9c
CSiTN2 (AT)
30S.9b
CSiTN1 (AT)
Similar URL's a/b
30S.9a
Lower Basement Level
30S.75a
30S.75b
30S.72
Context Hybrid (AT)
30S.5
30S.7
30S.8
URL's (AT)

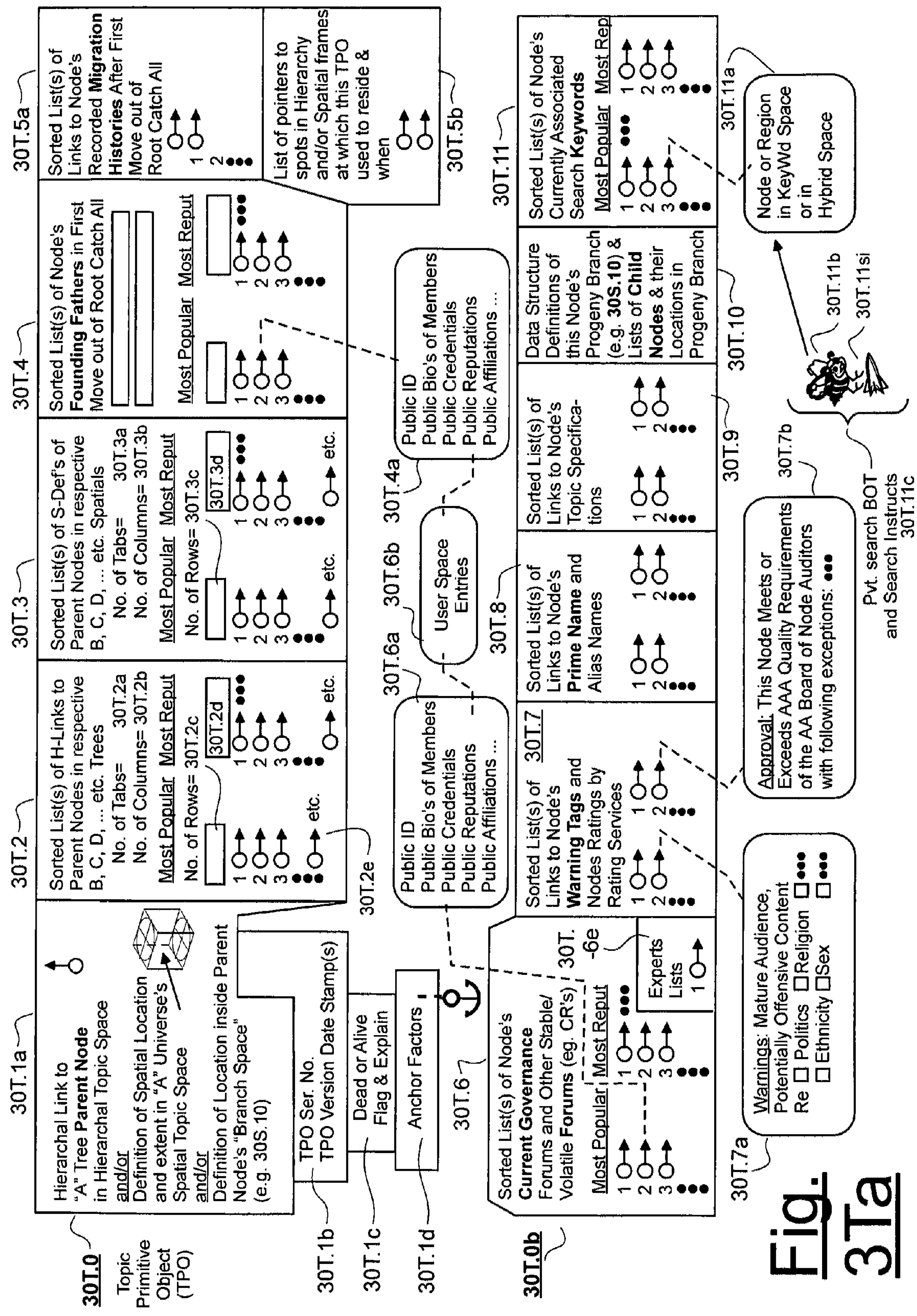
30T.0
Topic Primitive Object (TPO)
30T.1a
Hierarchal Link to "A" Tree Parent Node in Hierarchal Topic Space and/or Definition of Spatial Location and extent in "A" Universe's Spatial Topic Space and/or Definition of Location inside Parent Node's "Branch Space" (e.g. 30S.10)
30T.1b
TPO Ser. No.
TPO Version Date Stamp(s)
30T.1c
Dead or Alive Flag & Explain
30T.1d
Anchor Factors
30T.2
Sorted List(s) of H-Links to Parent Nodes in respective B, C, D, ... etc. Trees
No. of Tabs= 30T.2a
No. of Columns= 30T.2b
Most Popular Most Reput
No. of Rows= 30T.2c
30T.2d
etc.
30T.2e
30T.3
Sorted List(s) of S-Def's of Parent Nodes in respective B, C, D, ... etc. Spatials
No. of Tabs= 30T.3a
No. of Columns= 30T.3b
Most Popular Most Reput
No. of Rows= 30T.3c
30T.3d
etc.
30T.4
Sorted List(s) of Node's Founding Fathers in First Move out of Root Catch All
Most Popular Most Reput
30T.4a
Public ID
Public Bio's of Members
Public Credentials
Public Reputations
Public Affiliations ...
30T.5a
Sorted List(s) of Links to Node's Recorded Migration Histories After First Move out of Root Catch All
30T.5b
List of pointers to spots in Hierarchy and/or Spatial frames at which this TPO used to reside & when
30T.6
30T.6a
30T.6b
User Space Entries
30T.6e
Experts Lists
30T.0b
Sorted List(s) of Node's Current Governance Forums and Other Stable/ Volatile Forums (eg. CR's)
Most Popular Most Reput
30T.7
Sorted List(s) of Links to Node's Warning Tags and Nodes Ratings by Rating Services
30T.7a
Warnings: Mature Audience, Potentially Offensive Content Re □ Politics □Religion □ □ Ethnicity □Sex □
30T.7b
Approval: This Node Meets or Exceeds AAA Quality Requirements of the AA Board of Node Auditors with following exceptions:
30T.8
Sorted List(s) of Links to Node's Prime Name and Alias Names
30T.9
Sorted List(s) of Links to Node's Topic Specifica-tions
30T.10
Data Structure Definitions of this Node's Progeny Branch (e.g. 30S.10) & Lists of Child Nodes & their Locations in Progeny Branch
30T.11
Sorted List(s) of Node's Currently Associated Search Keywords
Most Popular Most Rep
30T.11a
Node or Region in KeyWd Space or in Hybrid Space
30T.11b
30T.11si
Pvt. search BOT and Search Instructs 30T.11c
Fig. 3Ta

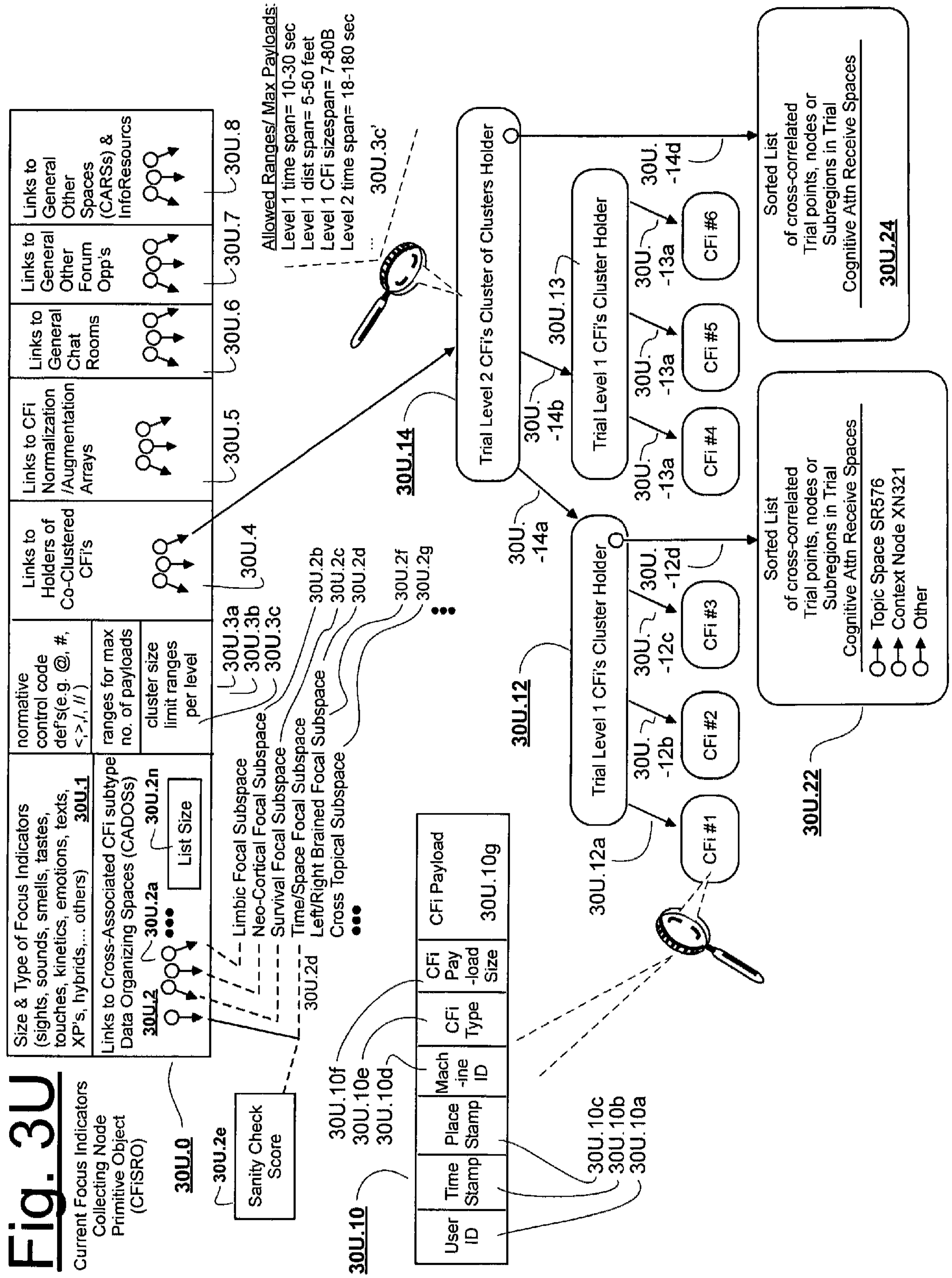
Fig. 3U
Current Focus Indicators Collecting Node Primitive Object (CFiSRO)
30U.0
Size & Type of Focus Indicators (sights, sounds, smells, tastes, touches, kinetics, emotions, texts, XP's, hybrids,... others) 30U.1
Links to Cross-Associated CFi subtype Data Organizing Spaces (CADOSs)
30U.2
30U.2a
30U.2n
List Size
normative control code def's(e.g. @, #, <,>,/, //)
ranges for max no. of payloads
cluster size limit ranges per level
30U.3a
30U.3b
30U.3c
Links to Holders of Co-Clustered CFi's
30U.4
Links to CFi Normalization /Augmentation Arrays
30U.5
Links to General Chat Rooms
30U.6
Links to General Other Forum Opp's
30U.7
Links to General Other Spaces (CARSs) & InfoResources
30U.8
Limbic Focal Subspace
Neo-Cortical Focal Subspace
Survival Focal Subspace
Time/Space Focal Subspace
Left/Right Brained Focal Subspace
Cross Topical Subspace
30U.2b
30U.2c
30U.2d
30U.2f
30U.2g
30U.2d
Sanity Check Score
30U.2e
Allowed Ranges/ Max Payloads:
Level 1 time span= 10-30 sec
Level 1 dist span= 5-50 feet
Level 1 CFi sizespan= 7-80B
Level 2 time span= 18-180 sec
...
30U.3c'
Trial Level 2 CFi's Cluster of Clusters Holder
30U.14
30U.14a
30U.14b
30U.14d
Trial Level 1 CFi's Cluster Holder
30U.13
30U.13a
CFi #4
CFi #5
CFi #6
Trial Level 1 CFi's Cluster Holder
30U.12
30U.12a
30U.12b
30U.12c
30U.12d
CFi #1
CFi #2
CFi #3
Sorted List of cross-correlated Trial points, nodes or Subregions in Trial Cognitive Attn Receive Spaces
30U.24
Sorted List of cross-correlated Trial points, nodes or Subregions in Trial Cognitive Attn Receive Spaces
Topic Space SR576
Context Node XN321
Other
30U.22
User ID
Time Stamp
Place Stamp
Mach-ine ID
CFi Type
CFi Pay-load Size
CFi Payload
30U.10g
30U.10
30U.10a
30U.10b
30U.10c
30U.10d
30U.10e
30U.10f

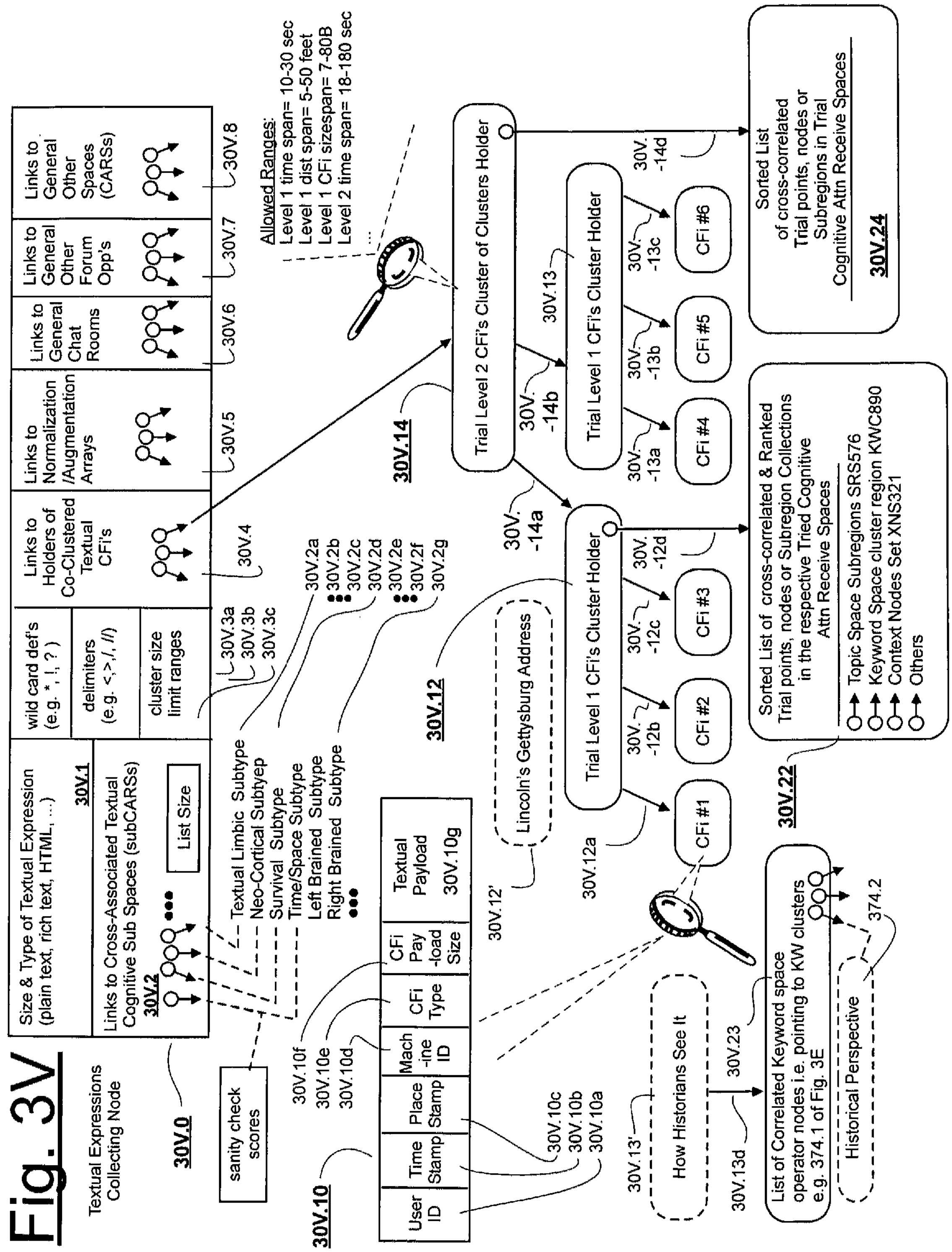
Fig. 3V
Textual Expressions Collecting Node
30V.0
Size & Type of Textual Expression (plain text, rich text, HTML, ...)
30V.1
Links to Cross-Associated Textual Cognitive Sub Spaces (subCARSs)
30V.2
List Size
wild card def's (e.g. *, !, ? )
delimiters (e.g. <,>,/, //)
cluster size limit ranges
30V.3a
30V.3b
30V.3c
Links to Holders of Co-Clustered Textual CFi's
30V.4
Links to Normalization /Augmentation Arrays
30V.5
Links to General Chat Rooms
30V.6
Links to General Other Forum Opp's
30V.7
Links to General Other Spaces (CARSs)
30V.8
sanity check scores
Textual Limbic Subtype
Neo-Cortical Subtyep
Survival Subtype
Time/Space Subtype
Left Brained Subtype
Right Brained Subtype
30V.2a
30V.2b
30V.2c
30V.2d
30V.2e
30V.2f
30V.2g
User ID
Time Stamp
Place Stamp
Mach -ine ID
CFi Type
CFi Pay -load Size
Textual Payload
30V.10g
30V.10
30V.10a
30V.10b
30V.10c
30V.10d
30V.10e
30V.10f
Allowed Ranges:
Level 1 time span= 10-30 sec
Level 1 dist span= 5-50 feet
Level 1 CFi sizespan= 7-80B
Level 2 time span= 18-180 sec
Trial Level 2 CFi's Cluster of Clusters Holder
30V.14
30V.-14a
30V.-14b
30V.-14d
Trial Level 1 CFi's Cluster Holder
30V.13
30V.-13a
30V.-13b
30V.-13c
CFi #4
CFi #5
CFi #6
Trial Level 1 CFi's Cluster Holder
30V.12
30V.12a
30V.-12b
30V.-12c
30V.-12d
CFi #1
CFi #2
CFi #3
Lincoln's Gettysburg Address
30V.12'
Sorted List of cross-correlated Trial points, nodes or Subregions in Trial Cognitive Attn Receive Spaces
30V.24
Sorted List of cross-correlated & Ranked Trial points, nodes or Subregion Collections in the respective Tried Cognitive Attn Receive Spaces
Topic Space Subregions SRS576
Keyword Space cluster region KWC890
Context Nodes Set XNS321
Others
30V.22
How Historians See It
30V.13'
30V.13d
30V.23
List of Correlated Keyword space operator nodes i.e. pointing to KW clusters e.g. 374.1 of Fig. 3E
374.2
Historical Perspective

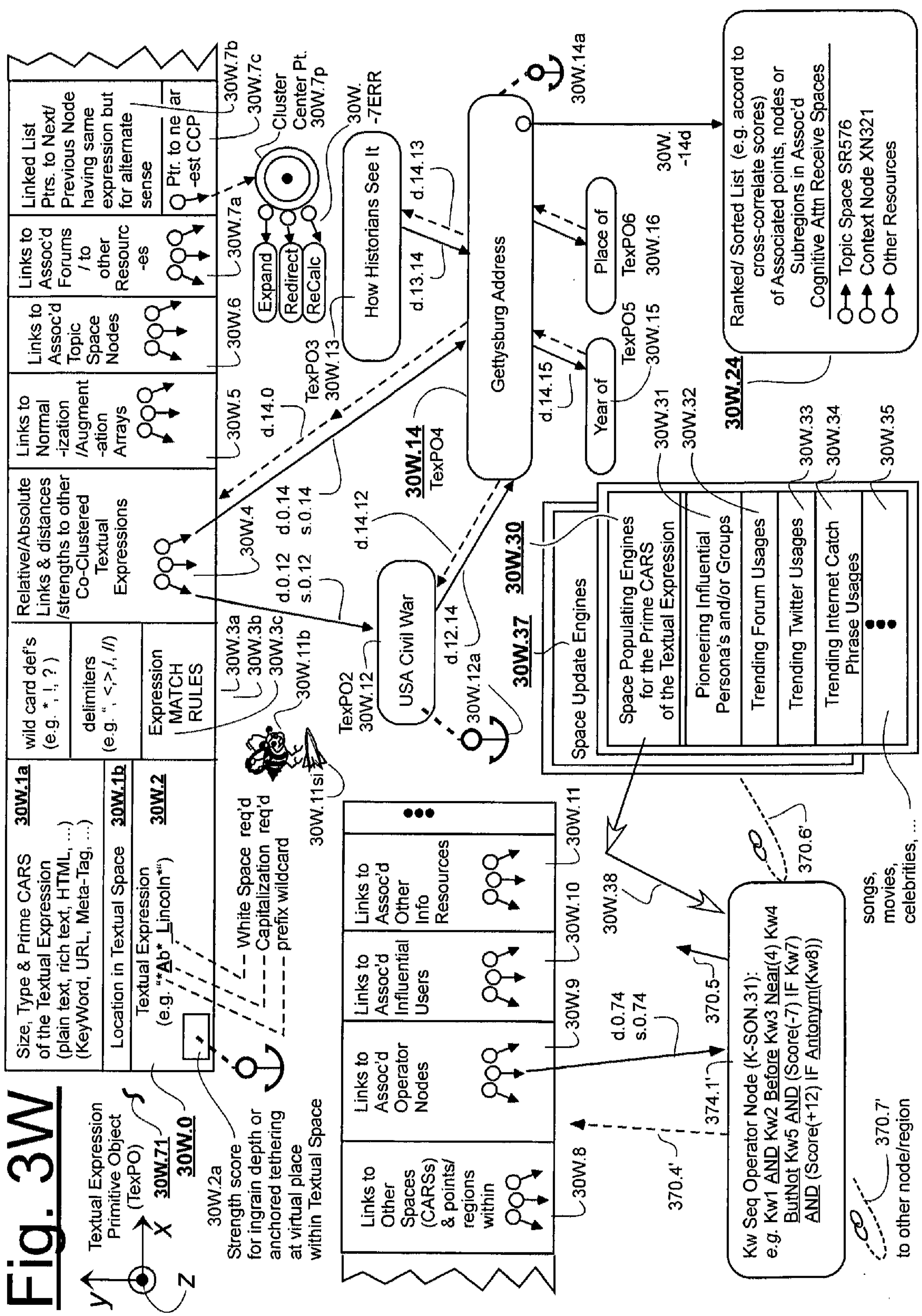
Fig. 3W
Textual Expression Primitive Object (TexPO)
30W.71
30W.0
Size, Type & Prime CARS of the Textual Expression (plain text, rich text, HTML, ...) (KeyWord, URL, Meta-Tag, ...)
30W.1a
Location in Textual Space
30W.1b
Textual Expression (e.g. "*Ab* Lincoln*")
30W.2
White Space req'd
Capitalization req'd
prefix wildcard
30W.2a
Strength score for ingrain depth or anchored tethering at virtual place within Textual Space
wild card def's (e.g. * ! ; ? )
delimiters (e.g. " ; <,>/, //)
Expression MATCH RULES
30W.3a
30W.3b
30W.3c
30W.11b
30W.11si
Relative/Absolute Links & distances /strengths to other Co-Clustered Textual Expressions
30W.4
Links to Normal -ization /Augment -ation Arrays
30W.5
Links to Assoc'd Topic Space Nodes
30W.6
Links to Assoc'd Forums / to other Resourc -es
30W.7a
Linked List Ptrs. to Next/ Previous Node having same expression but for alternate sense
Ptr. to ne /ar -est CCP
30W.7b
30W.7c
Cluster Center Pt. 30W.7p
Expand
Redirect
ReCalc
30W. -7ERR
How Historians See It
TexPO3
30W.13
d.13.14
d.14.13
d.14.0
d.0.14
s.0.14
d.0.12
s.0.12
USA Civil War
TexPO2
30W.12
30W.12a
d.12.14
d.14.12
30W.14
TexPO4
Gettysburg Address
30W.14a
30W. -14d
d.14.15
Year of
TexPO5
30W.15
Place of
TexPO6
30W.16
Ranked/ Sorted List (e.g. accord to cross-correlate scores) of Associated points, nodes or Subregions in Assoc'd Cognitive Attn Receive Spaces
Topic Space SR576
Context Node XN321
Other Resources
30W.24
30W.37
30W.30
Space Update Engines
Space Populating Engines for the Prime CARS of the Textual Expression
Pioneering Influential Persona's and/or Groups
Trending Forum Usages
Trending Twitter Usages
Trending Internet Catch Phrase Usages
30W.31
30W.32
30W.33
30W.34
30W.35
Links to Other Spaces (CARSs) & points/ regions within
30W.8
Links to Assoc'd Operator Nodes
30W.9
Links to Assoc'd Influential Users
30W.10
Links to Assoc'd Other Info Resources
30W.11
30W.38
d.0.74
s.0.74
370.5'
374.1'
370.4'
370.6'
370.7'
Kw Seq Operator Node (K-SON.31): e.g. Kw1 AND Kw2 Before Kw3 Near(4) Kw4 ButNot Kw5 AND (Score(-7) IF Kw7) AND (Score(+12) IF Antonym(Kw8))
songs, movies, celebrities, ...
to other node/region

| Node: | $Tn_{71}'$ | $Tn_{72}'$ | $Tn_{73}'$ | $Tn_{74}'$ |
|---|---|---|---|---|
| Attribute: Member of B tree? | Yes | No | Yes | Yes |
| Member of C tree? | No | No | No | No |
| Number of A tree child nodes= | 3 | None | None | None |
| Number of B tree child nodes= | 1 | 5 | None | None |
| ••• | | | | |
| Links to nodes/ subregions in KW Space = | Lnk71.K57 Lnk71.K85 ••• | Lnk72.K57 Lnk72.K33 ••• | None | None |
| Links to nodes/ subregions in UR Space = | Lnk71.U68 Lnk71.U96 ••• | None | Lnk73.U45 Lnk73.U43 ••• | None |
| ••• | ••• | ••• | ••• | ••• |

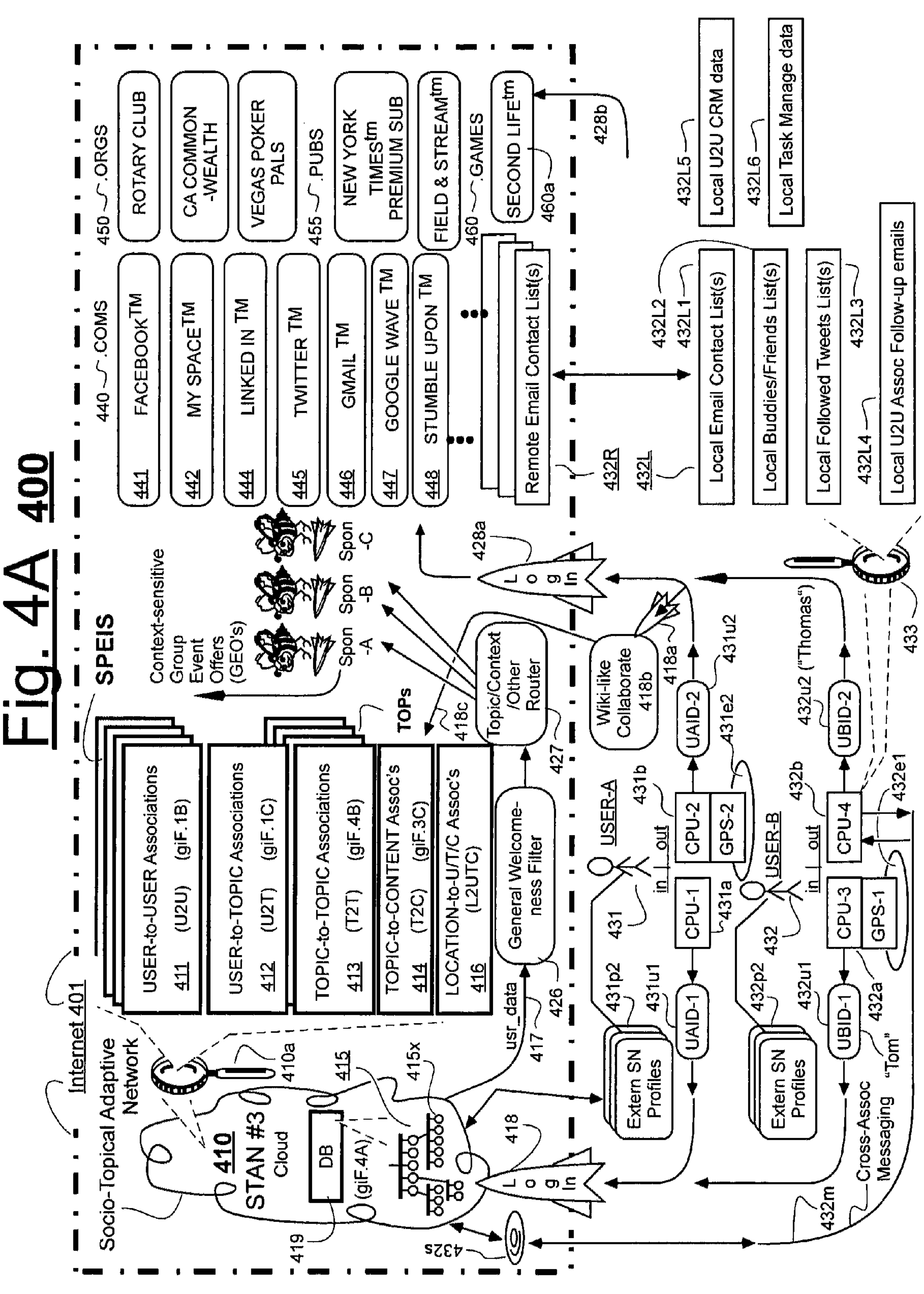

Fig. 4A 400
Socio-Topical Adaptive Network
Internet 401
410 STAN #3 Cloud
DB
(giF.4A)
410a
415
415x
418
419
432s
Log In
417
usr_data
426
General Welcomeness Filter
USER-to-USER Associations 411 (U2U) (giF.1B)
USER-to-TOPIC Associations 412 (U2T) (giF.1C)
TOPIC-to-TOPIC Associations 413 (T2T) (giF.4B)
TOPIC-to-CONTENT Assoc's 414 (T2C) (giF.3C)
LOCATION-to-U/T/C Assoc's 416 (L2UTC)
TOPs
SPEIS
Context-sensitive Group Event Offers (GEO's)
Topic/Context /Other Router
427
418c
Spon -A
Spon -B
Spon -C
Wiki-like Collaborate 418b
418a
428a
428b
440 .COMS
441 FACEBOOK TM
442 MY SPACE TM
444 LINKED IN TM
445 TWITTER TM
446 GMAIL TM
447 GOOGLE WAVE TM
448 STUMBLE UPON TM
450 .ORGS
ROTARY CLUB
CA COMMON -WEALTH
VEGAS POKER PALS
455 .PUBS
NEW YORK TIMEStm PREMIUM SUB
FIELD & STREAMtm
460 .GAMES
SECOND LIFEtm
460a
Remote Email Contact List(s)
432R
432L
432L1
432L2
Local Email Contact List(s)
Local Buddies/Friends List(s)
432L3
Local Followed Tweets List(s)
432L4
Local U2U Assoc Follow-up emails
432L5
Local U2U CRM data
432L6
Local Task Manage data
USER-A
431
in out
CPU-1
431a
CPU-2
GPS-2
431b
UAID-1
UAID-2
431u1
431u2
431p2
431e2
Extern SN Profiles
USER-B
432
CPU-3
GPS-1
CPU-4
432a
432b
UBID-1
UBID-2
432u1
432u2 ("Thomas")
"Tom"
432p2
432e1
433
432m
Cross-Assoc Messaging

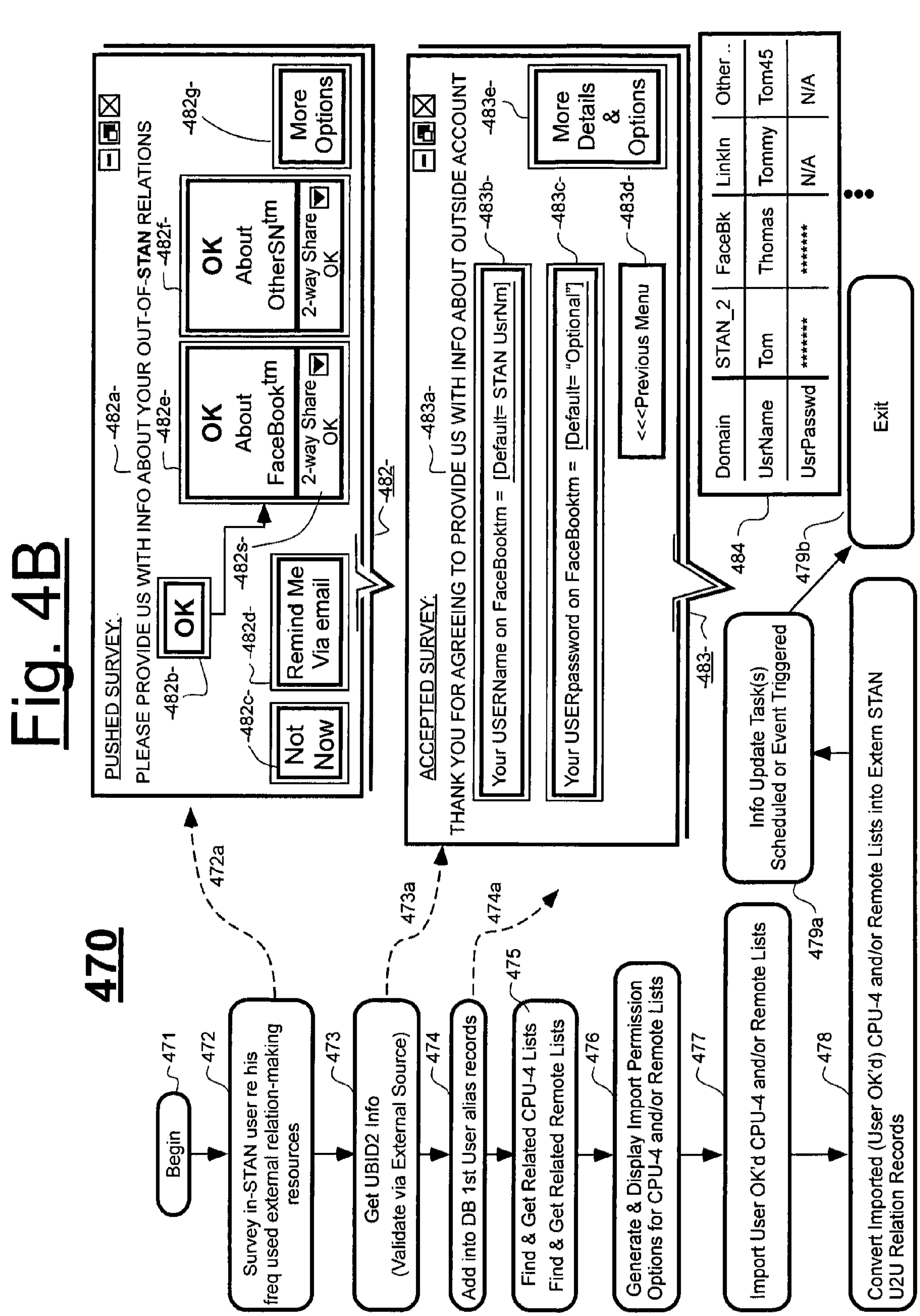
Fig. 4B
470
Begin
471
Survey in-STAN user re his freq used external relation-making resources
472
472a
Get UBID2 Info (Validate via External Source)
473
473a
Add into DB 1st User alias records
474
474a
Find & Get Related CPU-4 Lists
Find & Get Related Remote Lists
475
Generate & Display Import Permission Options for CPU-4 and/or Remote Lists
476
Import User OK'd CPU-4 and/or Remote Lists
477
Convert Imported (User OK'd) CPU-4 and/or Remote Lists into Extern STAN U2U Relation Records
478
Info Update Task(s) Scheduled or Event Triggered
479a
479b
Exit
PUSHED SURVEY:
PLEASE PROVIDE US WITH INFO ABOUT YOUR OUT-OF-STAN RELATIONS
482a
482b
OK
482c
Not Now
482d
Remind Me Via email
482s
482e
OK About FaceBook tm
2-way Share OK
482f
OK About OtherSN tm
2-way Share OK
482g
More Options
482
ACCEPTED SURVEY:
THANK YOU FOR AGREEING TO PROVIDE US WITH INFO ABOUT OUTSIDE ACCOUNT
483a
483b
Your USERName on FaceBooktm = [Default= STAN UsrNm]
483c
Your USERpassword on FaceBooktm = [Default= "Optional"]
483d
<<<Previous Menu
483e
More Details & Options
483
484
Domain
STAN_2
FaceBk
LinkIn
Other ..
UsrName
Tom
Thomas
Tommy
Tom45
UsrPasswd
******
******
N/A
N/A

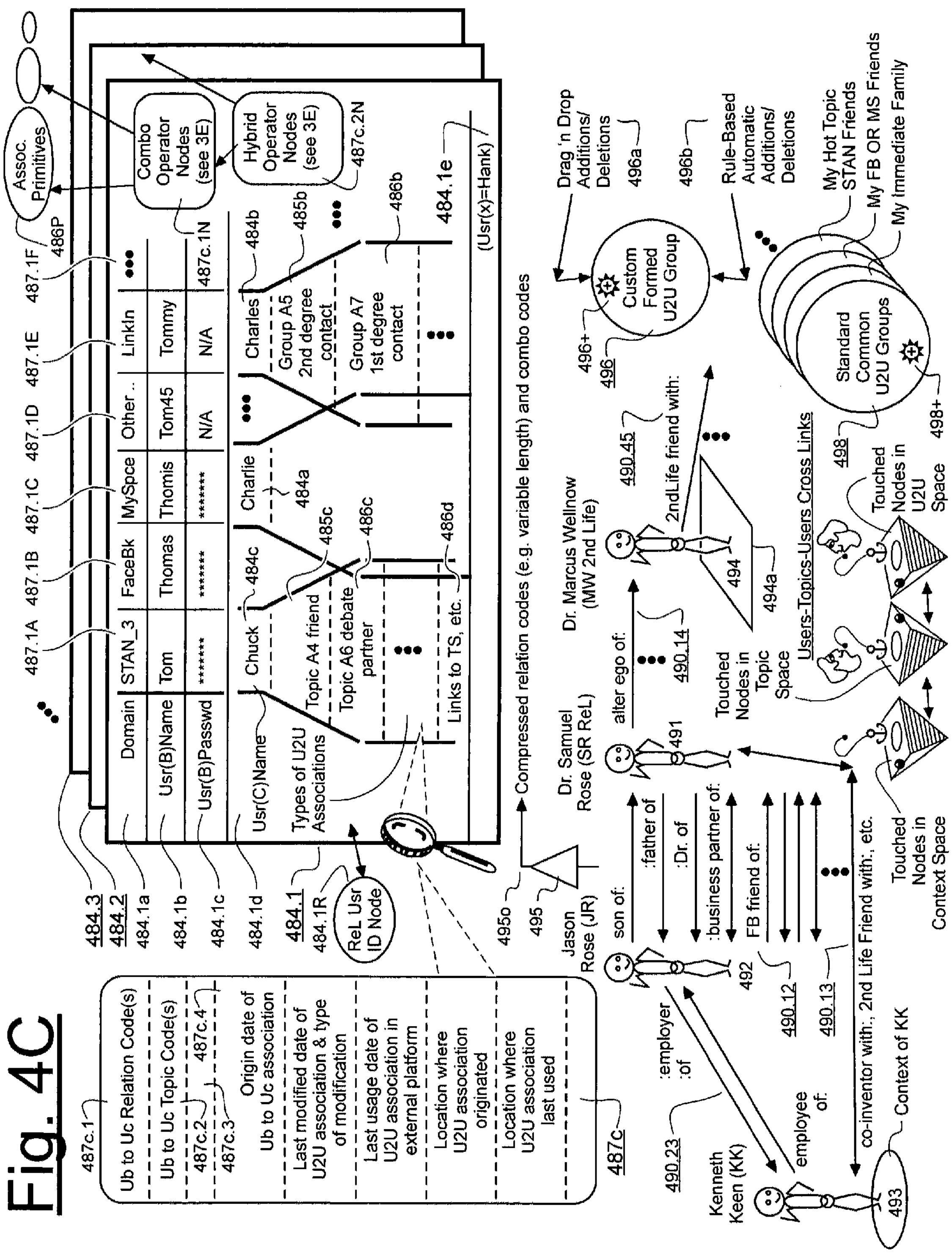

Fig. 4C
Ub to Uc Relation Code(s)
Ub to Uc Topic Code(s)
487c.1
487c.2
487c.3
487c.4
Origin date of Ub to Uc association
Last modified date of U2U association & type of modification
Last usage date of U2U association in external platform
Location where U2U association originated
Location where U2U association last used
487c
484.3
484.2
484.1a
484.1b
484.1c
484.1d
484.1
484.1R
ReL Usr ID Node
Domain
Usr(B)Name
Usr(B)Passwd
Usr(C)Name
Types of U2U Associations
STAN_3
Tom
*******
Chuck
Topic A4 friend
Topic A6 debate partner
Links to TS, etc.
FaceBk
Thomas
*******
484c
485c
486c
486d
MySpce
Thomis
*******
Charlie
484a
Other ..
Tom45
N/A
LinkIn
Tommy
N/A
Charles
Group A5 2nd degree contact
Group A7 1st degree contact
484b
485b
486b
484.1e
(Usr(x)=Hank)
487.1A
487.1B
487.1C
487.1D
487.1E
487.1F
486P
487c.1N
487c.2N
Assoc. Primitives
Combo Operator Nodes (see 3E)
Hybrid Operator Nodes (see 3E)
Compressed relation codes (e.g. variable length) and combo codes
495o
495
Jason Rose (JR)
Dr. Samuel Rose (SR ReL)
Dr. Marcus Wellnow (MW 2nd Life)
son of:
:father of
:Dr. of
:business partner of:
FB friend of:
alter ego of:
2ndLife friend with:
491
492
490.12
490.13
490.14
490.45
490.23
494
494a
:employer :of
employee of:
co-inventor with:, 2nd Life Friend with:, etc.
Kenneth Keen (KK)
Context of KK
493
Touched Nodes in Context Space
Touched Nodes in Topic Space
Touched Nodes in U2U Space
Users-Topics-Users Cross Links
Drag 'n Drop Additions/ Deletions
496a
Rule-Based Automatic Additions/ Deletions
496b
Custom Formed U2U Group
496
496+
Standard Common U2U Groups
498
498+
My Hot Topic STAN Friends
My FB OR MS Friends
My Immediate Family

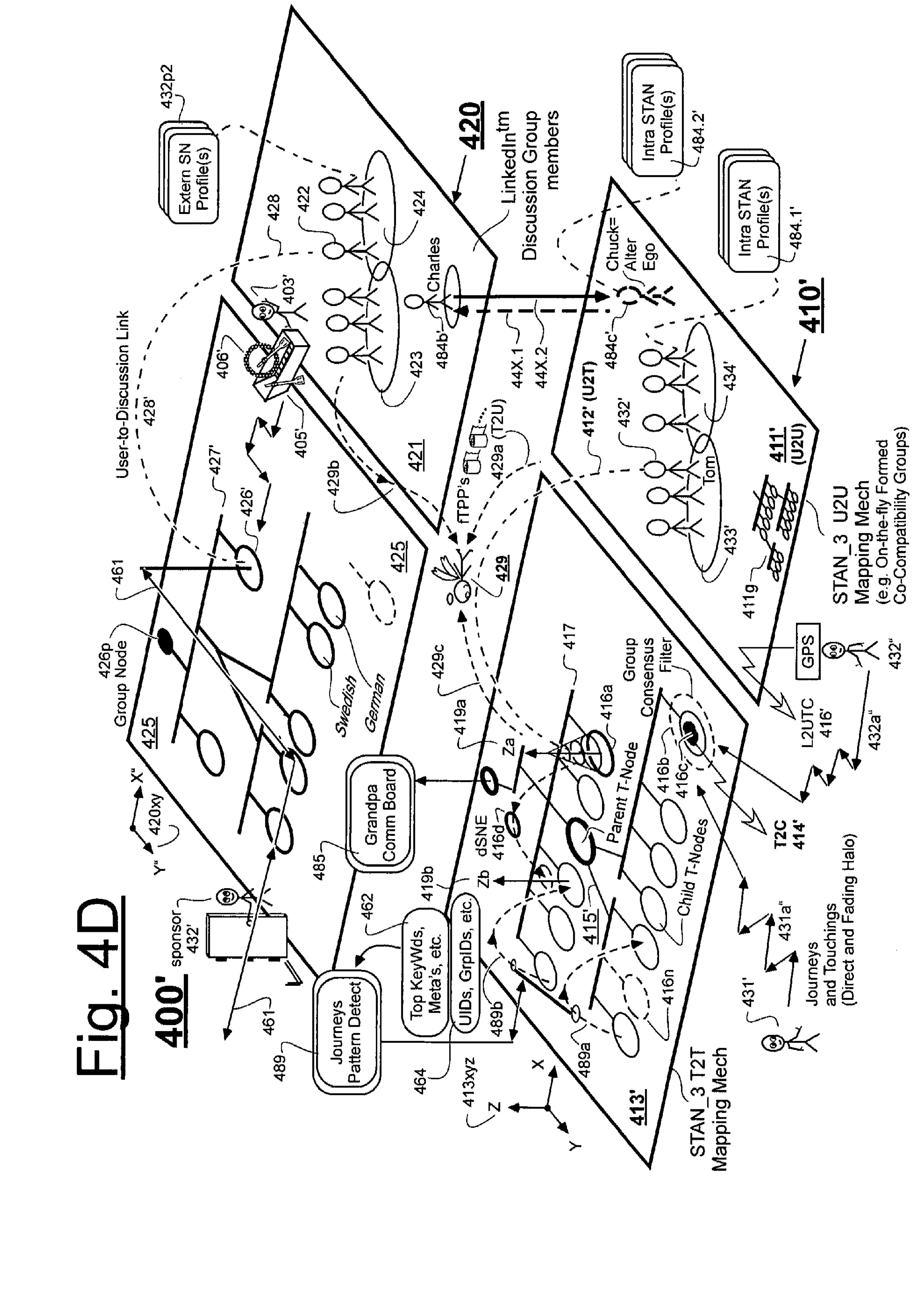
Fig. 4D
400'
sponsor
432'
Journeys Pattern Detect
489
Top KeyWds, Meta's, etc.
462
UIDs, GrpIDs, etc.
464
Grandpa Comm Board
485
Group Node
426p
461
425
Swedish
German
User-to-Discussion Link
428'
427'
426'
406'
405'
403'
428
422
423
424
432p2
Extern SN Profile(s)
420
LinkedIn tm Discussion Group members
Charles
484b'
44X.1
44X.2
421
429b
fTPP's
429a (T2U)
429
429c
419a
Za
417
416a
Group Consensus Filter
Parent T-Node
416b
416c
416d
dSNE
419b
Zb
415'
Child T-Nodes
416n
489b
489a
413xyz
413'
STAN_3 T2T Mapping Mech
T2C
414'
L2UTC
416'
432a"
GPS
432"
Journeys and Touchings (Direct and Fading Halo)
431'
431a"
Chuck= Alter Ego
484c'
412' (U2T)
432'
434'
433'
Tom
411g
411'
(U2U)
STAN_3 U2U Mapping Mech (e.g. On-the-fly Formed Co-Compatibility Groups)
410'
Intra STAN Profile(s)
484.1'
484.2'
420xy
X"
Y"
X
Y
Z

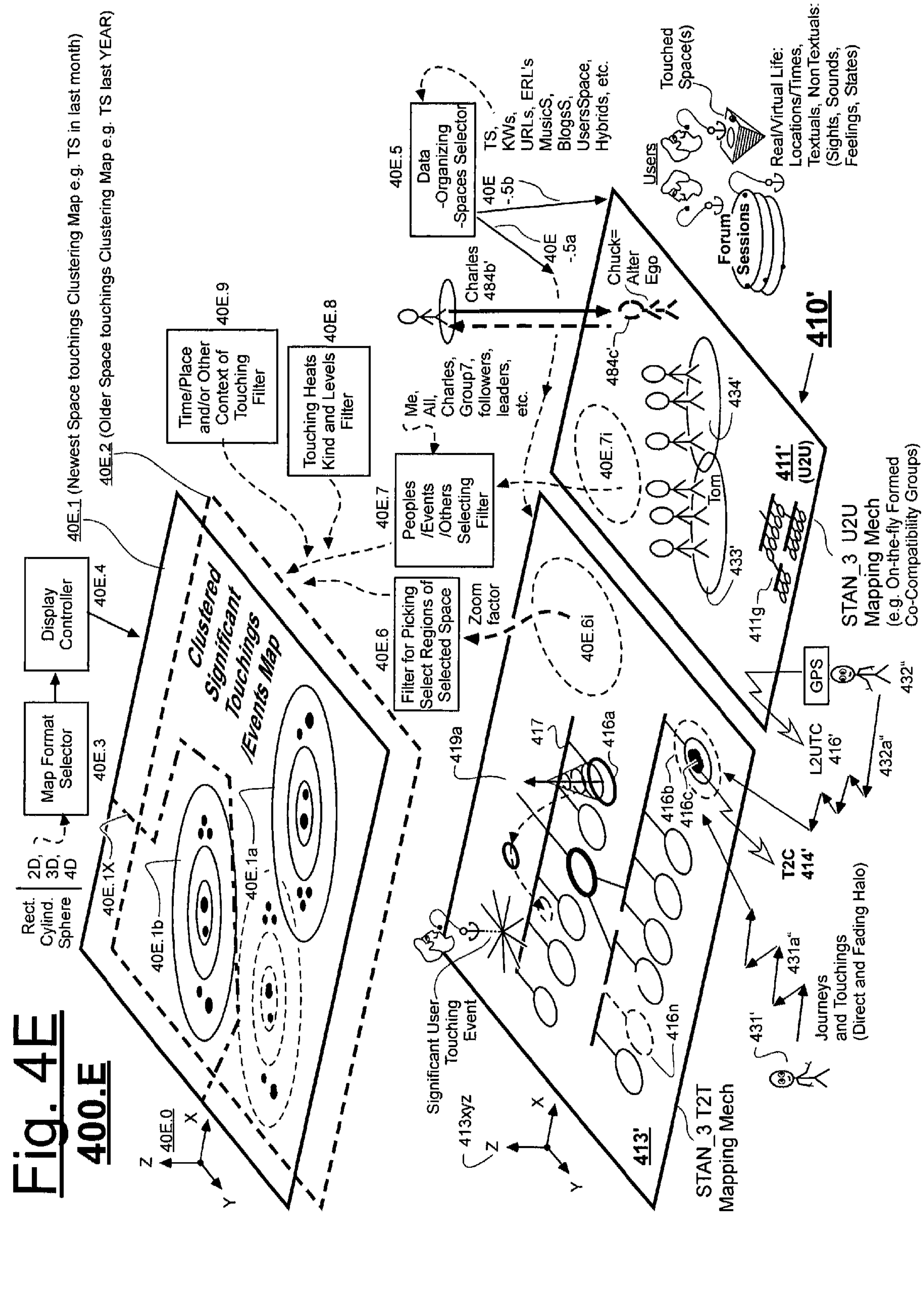
Fig. 4E
400.E
40E.0
Rect. Cylind. Sphere
2D, 3D, 4D
Map Format Selector
40E.3
Display Controller
40E.4
40E.1 (Newest Space touchings Clustering Map e.g. TS in last month)
40E.2 (Older Space touchings Clustering Map e.g. TS last YEAR)
40E.1X
40E.1b
40E.1a
Clustered Significant Touchings /Events Map
Filter for Picking Select Regions of Selected Space
40E.6
Peoples /Events /Others Selecting Filter
40E.7
Touching Heats Kind and Levels Filter
40E.8
Time/Place and/or Other Context of Touching Filter
40E.9
Me, All, Charles, Group7, followers, leaders, etc.
Data -Organizing -Spaces Selector
40E.5
40E -.5b
40E -.5a
TS, KWs, URLs, ERL's MusicS, BlogsS, UsersSpace, Hybrids, etc.
Charles 484b'
Chuck= Alter Ego
484c'
Users
Touched Space(s)
Forum Sessions
Real/Virtual Life: Locations/Times, Textuals, NonTextuals: (Sights, Sounds, Feelings, States)
410'
411' (U2U)
40E.7i
434'
433'
Tom
411g
STAN_3 U2U Mapping Mech (e.g. On-the-fly Formed Co-Compatibility Groups)
Zoom factor
40E.6i
GPS
432"
432a"
L2UTC 416'
419a
417
416a
416b
416c
T2C 414'
Significant User Touching Event
413xyz
413'
416n
STAN_3 T2T Mapping Mech
431'
431a"
Journeys and Touchings (Direct and Fading Halo)
X Y Z

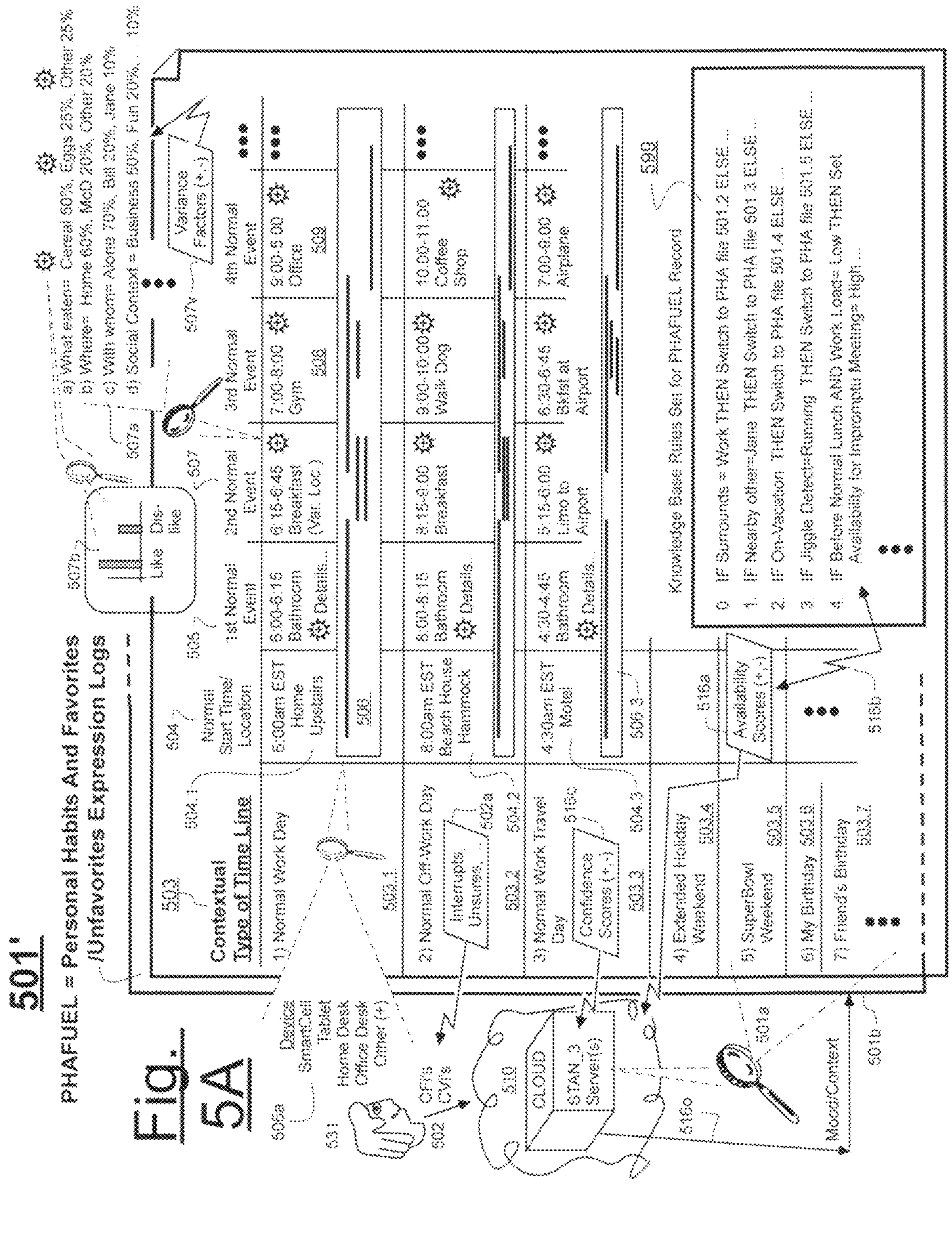
Fig. 5A
501'
PHAFUEL = Personal Habits And Favorites /Unfavorites Expression Logs
503
Contextual Type of Time Line
504
Normal Start Time/ Location
505
1st Normal Event
507
2nd Normal Event
3rd Normal Event
4th Normal Event
1) Normal Work Day
6:00am EST Home Upstairs
6:00-6:15 Bathroom
Details...
6:15-6:45 Breakfast (Var. Loc.)
7:00-8:00 Gym
508
9:00-5:00 Office
509
2) Normal Off-Work Day
8:00am EST Beach House Hammock
8:00-8:15 Bathroom
8:15-9:00 Breakfast
9:00-10:00 Walk Dog
10:00-11:00 Coffee Shop
3) Normal Work Travel Day
4:30am EST Motel
4:30-4:45 Bathroom
5:15-6:00 Limo to Airport
6:30-6:45 Bkfst at Airport
7:00-9:00 Airplane
4) Extended Holiday Weekend
503.4
5) SuperBowl Weekend
503.5
6) My Birthday 503.6
7) Friend's Birthday 503.7
503.1
503.2
503.3
504.1
504.2
504.3
505.3
506
502a
Interrupts, Unsures, ...
516c
Confidence Scores (+,-)
516a
Availability Scores (+,-)
516b
507b
Like
Dis-like
507a
507v
Variance Factors (+,-)
a) What eaten= Cereal 50%, Eggs 25%, Other 25%
b) Where= Home 60%, McD 20%, Other 20%
c) With whom= Alone 70%, Bill 20%, Jane 10%
d) Social Context = Business 50%, Fun 20%, ... 10%
599
Knowledge Base Rules Set for PHAFUEL Record
0 IF Surrounds = Work THEN Switch to PHA file 501.2 ELSE...
1. IF Nearby other=Jane THEN Switch to PHA file 501.3 ELSE...
2. IF On-Vacation THEN Switch to PHA file 501.4 ELSE...
3. IF Jiggle Detect=Running THEN Switch to PHA file 501.5 ELSE...
4. IF Before Normal Lunch AND Work Load= Low THEN Set Availability for Impromptu Meeting= High...
505a
Device
SmartCell
Tablet
Home Desk
Office Desk
Other (+)
531
502
CFi's
CVi's
510
CLOUD
STAN_3
Server(s)
516d
501a
501b
Mood/Context

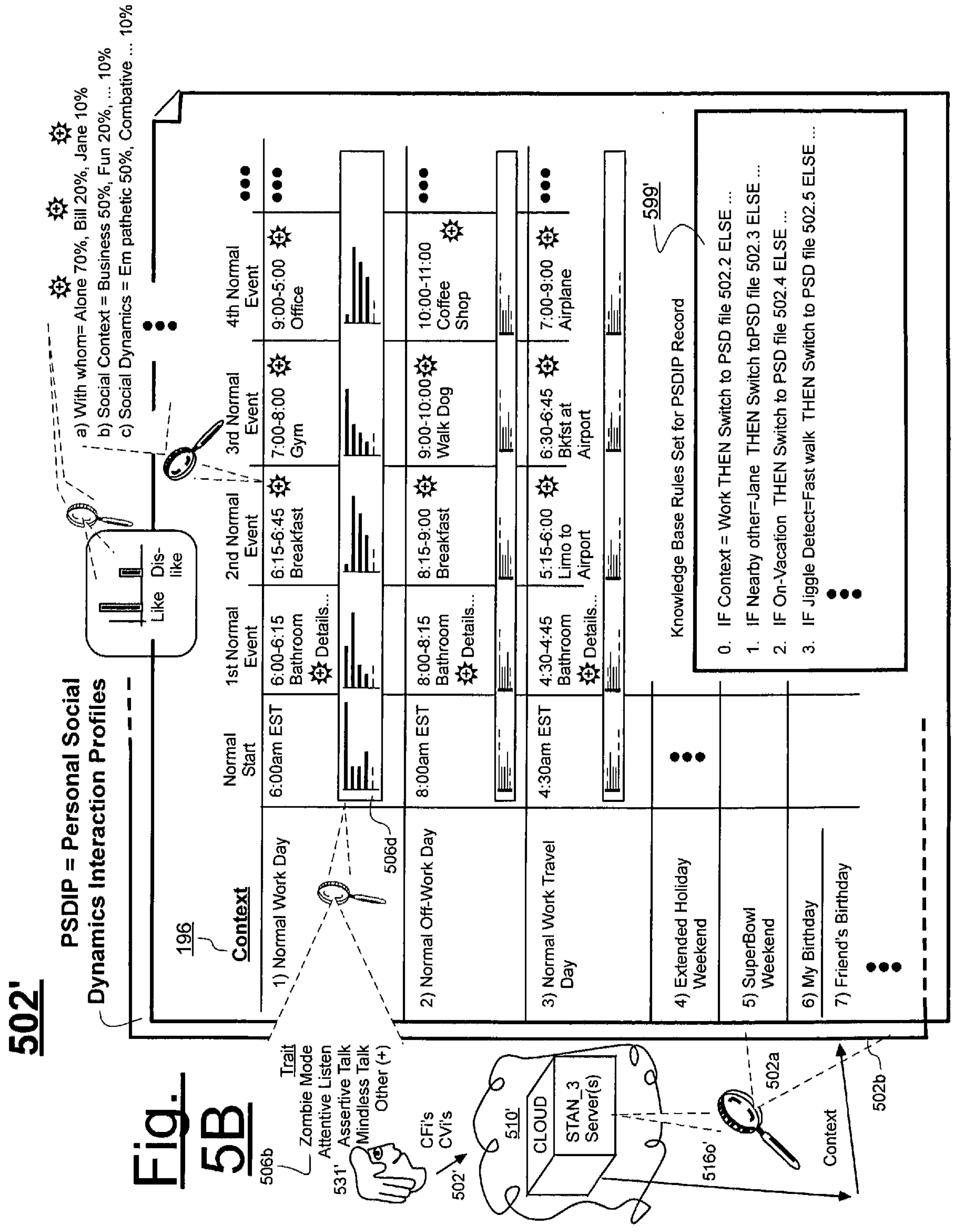
Fig. 5B
502'
PSDIP = Personal Social Dynamics Interaction Profiles
196
Context
1) Normal Work Day
2) Normal Off-Work Day
3) Normal Work Travel Day
4) Extended Holiday Weekend
5) SuperBowl Weekend
6) My Birthday
7) Friend's Birthday
Normal Start
1st Normal Event
2nd Normal Event
3rd Normal Event
4th Normal Event
6:00am EST
6:00-6:15 Bathroom Details...
6:15-6:45 Breakfast
7:00-8:00 Gym
9:00-5:00 Office
8:00am EST
8:00-8:15 Bathroom Details...
8:15-9:00 Breakfast
9:00-10:00 Walk Dog
10:00-11:00 Coffee Shop
4:30am EST
4:30-4:45 Bathroom Details...
5:15-6:00 Limo to Airport
6:30-6:45 Bkfst at Airport
7:00-9:00 Airplane
506d
Like
Dis-like
a) With whom= Alone 70%, Bill 20%, Jane 10%
b) Social Context = Business 50%, Fun 20%, ... 10%
c) Social Dynamics = Em pathetic 50%, Combative ... 10%
599'
Knowledge Base Rules Set for PSDIP Record
0. IF Context = Work THEN Switch to PSD file 502.2 ELSE ...
1. IF Nearby other=Jane THEN Switch toPSD file 502.3 ELSE ...
2. IF On-Vacation THEN Switch to PSD file 502.4 ELSE ...
3. IF Jiggle Detect=Fast walk THEN Switch to PSD file 502.5 ELSE ...
Trait
Zombie Mode
Attentive Listen
Assertive Talk
Mindless Talk
Other (+)
506b
531'
CFi's
CVi's
502'
510'
CLOUD
STAN_3 Server(s)
516o'
502a
502b
Context

503'

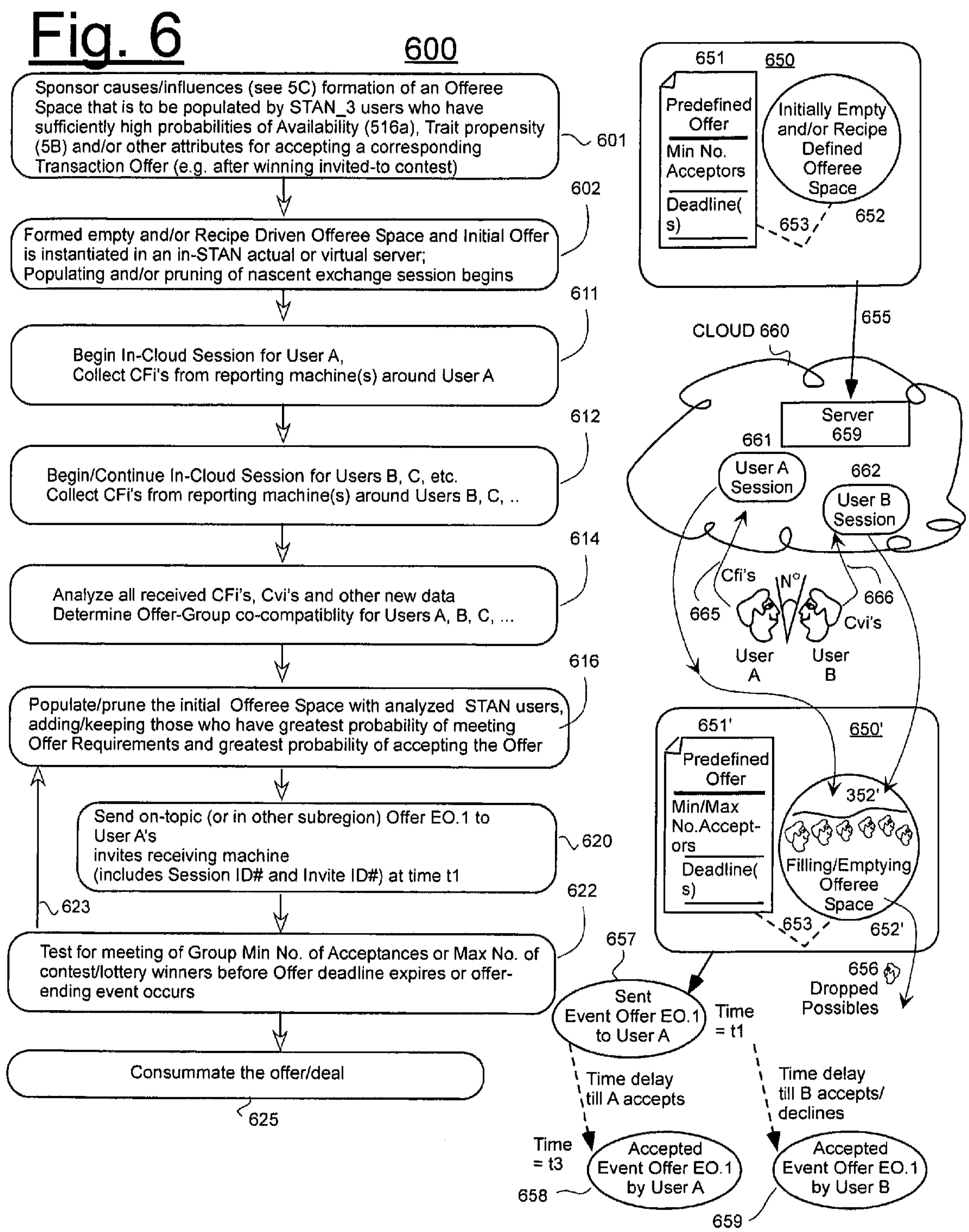
Fig. 6
600
Sponsor causes/influences (see 5C) formation of an Offeree Space that is to be populated by STAN_3 users who have sufficiently high probabilities of Availability (516a), Trait propensity (5B) and/or other attributes for accepting a corresponding Transaction Offer (e.g. after winning invited-to contest)
601
602
Formed empty and/or Recipe Driven Offeree Space and Initial Offer is instantiated in an in-STAN actual or virtual server; Populating and/or pruning of nascent exchange session begins
611
Begin In-Cloud Session for User A, Collect CFi's from reporting machine(s) around User A
612
Begin/Continue In-Cloud Session for Users B, C, etc. Collect CFi's from reporting machine(s) around Users B, C, ..
614
Analyze all received CFi's, Cvi's and other new data Determine Offer-Group co-compatiblity for Users A, B, C, ...
616
Populate/prune the initial Offeree Space with analyzed STAN users, adding/keeping those who have greatest probability of meeting Offer Requirements and greatest probability of accepting the Offer
Send on-topic (or in other subregion) Offer EO.1 to User A's invites receiving machine (includes Session ID# and Invite ID#) at time t1
620
622
623
Test for meeting of Group Min No. of Acceptances or Max No. of contest/lottery winners before Offer deadline expires or offer-ending event occurs
Consummate the offer/deal
625
651
650
Predefined Offer
Min No. Acceptors
Deadline(s)
Initially Empty and/or Recipe Defined Offeree Space
653
652
655
CLOUD 660
Server 659
661
User A Session
662
User B Session
Cfi's
N°
665
666
Cvi's
User A
User B
651'
650'
Predefined Offer
Min/Max No.Acceptors
Deadline(s)
352'
Filling/Emptying Offeree Space
653
652'
657
656
Dropped Possibles
Sent Event Offer EO.1 to User A
Time = t1
Time delay till A accepts
Time delay till B accepts/ declines
Time = t3
Accepted Event Offer EO.1 by User A
Accepted Event Offer EO.1 by User B
658
659

SOCIAL-TOPICAL ADAPTIVE NETWORKING (STAN) SYSTEM ALLOWING FOR GROUP BASED CONTEXTUAL TRANSACTION OFFERS AND ACCEPTANCES AND HOT TOPIC WATCHDOGGING

1. FIELD OF DISCLOSURE

The present disclosure of invention relates generally to online networking systems and uses thereof.

The disclosure relates more specifically to Social-Topical/contextual Adaptive Networking (STAN) systems that, among other things, empower co-compatible users to on-the-fly join into corresponding online chat or other forum participation sessions based on user context and/or on likely topics currently being focused-upon by the respective users. Such STAN systems can additionally provide transaction offerings to groups of people based on system determined contexts of the users, on system determined topics of most likely current focus and/or based on other usages of the STAN system by the respective users. Yet more specifically, one system disclosed herein maintains logically interconnected and continuously updated representations of communal cognitions spaces (e.g., topic space, keyword space, URL space, context space, content space and so on) where points, nodes or subregions of such spaces link to one another and/or to cross-related online chat or other forum participation opportunities and/or to cross-related informational resources. By automatically determining where in at least one of these spaces a given user's attention is currently being focused, the system can automatically provide the given user with currently relevant links to the interrelated chat or other forum participation opportunities and/or to the interrelated other informational resources. In one embodiment, such currently relevant links are served up as continuing flows of more up to date invitations that empower the user to immediately link up with the link targets.

2a. CROSS REFERENCE TO AND INCORPORATION OF CO-OWNED NONPROVISIONAL APPLICATIONS

The following copending U.S. patent applications are owned by the owner of the present application, and their disclosures are incorporated herein by reference in their entireties as originally filed:

(A) Ser. No. 12/369,274 filed Feb. 11, 2009 by Jeffrey A. Rapaport et al. and which is originally entitled, 'Social Network Driven Indexing System for Instantly Clustering People with Concurrent Focus on Same Topic into On Topic Chat Rooms and/or for Generating On-topic Search Results Tailored to User Preferences Regarding Topic', where said application was early published as US 2010-0205541 A1; and (B) Ser. No. 12/854,082 filed Aug. 10, 2010 by Seymour A. Rapaport et al. and which is originally entitled, Social-Topical Adaptive Networking (STAN) System Allowing for Cooperative Inter-coupling with External Social Networking Systems and Other Content Sources.

2b. CROSS REFERENCE TO AND INCORPORATION OF CO-OWNED PROVISIONAL APPLICATIONS

The following copending U.S. provisional patent applications are owned by the owner of the present application, and their disclosures are incorporated herein by reference in their entireties as originally filed:

(A) Ser. No. 61/485,409 filed May 12, 2011 by Jeffrey A. Rapaport, et al. and entitled Social-Topical Adaptive Networking (STAN) System Allowing for Group Based Contextual Transaction Offers and Acceptances and Hot Topic Watchdogging; and (B) Ser. No. 61/551,338 filed Oct. 25, 2011 and entitled Social-Topical Adaptive Networking (STAN) System Allowing for Group Based Contextual Transaction Offers and Acceptances and Hot Topic Watchdogging.

2c. CROSS REFERENCE TO OTHER PATENTS/PUBLICATIONS

The disclosures of the following U.S. patents or Published U.S. patent applications are incorporated herein by reference:

(A) U.S. Pub. 20090195392 published Aug. 6, 2009 to Zalewski; Gary and entitled: Laugh Detector and System and Method for Tracking an Emotional Response to a Media Presentation;

(B) U.S. Pub. 2005/0289582 published Dec. 29, 2005 to Tavares, Clifford; et al. and entitled: System and method for capturing and using biometrics to review a product, service, creative work or thing;

(C) U.S. Pub. 2003/0139654 published Jul. 24, 2003 to Kim, Kyung-Hwan; et al. and entitled: System and method for recognizing user's emotional state using short-time monitoring of physiological signals; and (D) U.S. Pub. 20030055654 published Mar. 20, 2003 to Oudeyer, Pierre Yves and entitled: Emotion recognition method and device.

PRELIMINARY INTRODUCTION TO DISCLOSED SUBJECT MATTER

Imagine a set of virtual elevator doors opening up on your N-th generation smart cellphone (a.k.a. smartphone) or tablet computer screen (where N≥3 here) and imagine an on-screen energetic bouncing ball hopping into the elevator, dragging you along visually with it into the insides of a dimly lighted virtual elevator. Imagine the ball bouncing back and forth between the elevator walls while blinking sets of virtual light emitters embedded in the ball illuminate different areas within the virtual elevator. You keep your eyes trained on the attention grabbing ball. What will it do next?

Suddenly the ball jumps to the elevator control panel and presses the button for floor number 86. A sign lights up next to the button. It glowingly says "Superbowl™ Sunday Party Today". You already had a subconscious notion that this is where this virtual elevator ride was going to next take you. Surprisingly, another, softer lit sign on the control panel momentarily flashes the message: "Reminder: Help Grandma Tomorrow". Then it fades. You are glad for the gentle reminder. You had momentarily forgotten that you promised to help Grandma with some chores tomorrow. In today's world of mental overload and overwhelming information deluges (and required cognition staminas for handling those deluges) it is hard to remember where to cast one's limited energies (of the cognitive kind) and when and how intensely to cast them on competing points of potential focus. It is impossible to focus one's attentions everywhere and at everything. The human mind has a problem in that, unlike the eye's relatively small and well understood blind spot (the eye's optic disc), the mind's conscious blind spots are vast and almost everywhere except in the very few areas one currently concentrates one's attentions on. Hopefully, the bouncing virtual ball will remember to remind you yet again, and at an appropriate closer time tomorrow that it is "Help Grandma Day". (It will.) You make a mental note to not stay at today's party very late because you need to reserve some of your limited energies for tomorrow's chores.

Soon the doors of your virtual elevator open up and you find yourself looking at a refreshed display screen (the screen of your real life (ReL) intelligent personal digital assistant (a.k.a. PDA, smartphone or tablet computer). Now it has a center display area populated with websites related to today's Superbowl™ football game (the American game of football, not British "football", a.k.a. soccer). On the left side of your screen is a list of friends whom you often like to talk to (literally or by way of electronic messaging) about sports related matters. Sometimes you forget one or two of them. But your computer system seems not to forget and thankfully lists all the vital ones for this hour's planned activities. Next to their names are a strange set of revolving pyramids with red lit bars disposed along the slanted side areas of those pyramids. At the top of your screen there is a virtual serving tray supporting a set of so-called, invitation-serving plates. Each serving plate appears to serve up a stack of pancake-like or donut-like objects, where the served stacks or combinations of pancake or donut-like objects each invites you to join a recently initiated, or soon-to-be-started, online chat and where the user-to-user exchanges of these chats are (or will be) primarily directed to your current topic of attention; which today at this hour happens to be on the day's Superbowl™ Sunday football game. Rather than you going out hunting for such chats, they appear to have miraculously hunted for, and found you instead. On the bottom of your screen is another virtual serving tray that is serving up a set of transaction offers related to buying Superbowl™ associated paraphernalia. One of the promotional offerings is for T-shirts with your favorite team's name on them and proclaiming them the champions of this year's climactic but-not-yet-played-out game. You think to yourself, "I'm ready to buy that, and I'm fairly certain my team will win".

As you muse over this screenful of information that was automatically served up to you by your wirelessly networked computer device (e.g., smartphone) and as you muse over what today's date is, as well as considering the real life surroundings where you are located and the context of that location, you realize in the back of your mind that the virtual bouncing ball and its virtual elevator friend had guessed correctly about you, about where you are or where you were heading, your surrounding physical context, your surrounding social context, what you are thinking about at the moment (your mental context), your current emotional mood (happy and ready to engage with sports-minded friends of similar dispositions to yours) and what automatically presented invitations or promotional offerings you will now be ready to now welcome. Indeed, today is Superbowl™ Sunday and at the moment you are about to sit down (in real life) on the couch in your friend's house (Ken's house) getting ready to watch the big game on Ken's big-screen TV along with a few other like minded colleagues. The thing of it is that today you not only have the topic of the "Superbowl™ Sunday football game" as a central focal point or central attention receiving area in your mind, but you also have the unfolding dynamics of a real life social event (meeting with friends at Ken's house) as an equally important region of focus in your mind. If you had instead been sitting at home alone and watching the game on your small kitchen TV, the surrounding social dynamics probably would not have been such a big part of your current thought patterns. However, the combination of the surrounding physical cues and social context inferences plus the main topic of focus in your mind places you in Ken's house, in front of his big screen, high definition TV and happily trading quips with similarly situated friends sitting next to you.

You surmise that the smart virtual ball inside your smartphone (or inside another mobile data processing device) and whatever external system it wirelessly connects with must have been empowered to use a GPS and/or other sensor embedded in the smart cellphone (or tablet or other mobile device) as well as to use your online digitized calendar to make best-estimate guesses at where you are (or soon will be), which other people are near you (or soon will be with you), what symmetric or asymmetric social relations probably exist between you and the nearby other people, what you are probably now doing, how you mentally perceive your current context, and what online content you might now find to be of greatest and most welcomed interest to you due to your currently adopted contexts and current points of focus (where, ultimately in this scenario; you are the one deciding what your currently adopted contexts are: e.g., Am I at work or at play? and which if any of the offerings automatically presented to you by your mobile data processing device you will now accept).

Perhaps your mobile data processing device was empowered, you further surmise; to pick up on sounds surrounding you (e.g., sounds from the turned-on TV set) or images surrounding you (e.g., sampled video from the TV set as well as automatically recognized faces of friends who happen to be there in real life (ReL)) and it was empowered to report these context-indicating signals to a remote and more powerful data processing system by way of networking? Perhaps that is how the limited computing power associated with your relatively small and low powered smartphone determined your most likely current physical and mental contexts? The question intrigues you for only a flash of a moment and then you are interrupted in your thoughts by Ken offering you a bowl full of potato chips.

With thoughts about how the computer systems might work quickly fading into the back of your subconscious, you thank Ken and then you start paying conscious attention to one of the automatically presented websites now found within a first focused-upon area of your smartphone screen. It is reporting on the health condition of your favorite football player, Joe-the-Throw Nebraska (best quarterback, in your humble opinion; since Joe Montana (a.k.a. "Golden Joe", "Comeback Joe") hung up his football cleats). Meanwhile in your real life background, the Hi-Def TV is already blaring with the pre-game announcements and Ken has started blasting some party music from the kitchen area while he opens up more bags of pretzels and potato chips. As you return focus to the web content presented by your PDA-style (Personal Digital Assistant type) smartphone, a small on-screen advertisement icon pops up next to the side of the athlete's health-condition reporting frame. You hover a pointer over it and the advertisement icon automatically expands to say: "Pizza: Big Local Discount, Only while it lasts, First 10 Households, Press here for more". This promotional offering you realize is not at all annoying to you. Actually it is welcomed. You were starting to feel a wee bit hungry just before the ad popped up. Maybe it was the sound and smell of the bags of potato chips being opened in the kitchen or maybe it was the party music. You hadn't eaten pizza in a while and the thought of it starts your mouth salivating. So you pop the small teaser advertisement open to see even more.

The further enlarged promotional informs you that at least 50 households in your current, local neighborhood are having similar Superbowl™ Sunday parties and that a reputable pizza store nearby is ready to deliver two large sized pizza pies to each accepting household at a heavily discounted price, where the offered deal requires at least 10 households in the same, small radius neighborhood to accept the deal within the next 30 minutes; otherwise the deal lapses. Additional pies and other items are available at different discount rates, first not as good of a deal as the opening teaser rate, but then getting better and better again as you order larger and larger volumes (or more expensive ones) of those items. (In an alternate version of this hypothetical story, the deal minimum is not based on number of households but rather on number of pizzas ordered, or number of people who send their email addresses to the promoter or on some other basis that may be beneficial to the product vendor for reasons known to him. Also, in an alternate version, special bonus prizes are promised if you convince the next door neighbor to join in on your group order so that two adjacent houses are simultaneously ordering from the same pizza store.)

This promotional offering not only sounds like a great deal for you, but as you think on it some more, you realize it is also a win-win deal for the local pizza pie vendor. The pizza store owner can greatly reduce his delivery overhead costs by delivering in one delivery run, a large volume of same-time ordered pizzas to a same one local neighborhood (especially if there are a few large-sized social gatherings i.e., parties, in the one small-radiused neighborhood) and all the pizzas should be relatively fresh if the 10 or more closely-located households all order in the allotted minutes (which could instead be 20 minutes, 40 minutes or some other number). Additionally, the pizza store can time a mass-production run of the pizzas, and a common storage of the volume-ordered hot pizzas (and of other co-ordered items) so they will all arrive fresh and hot (or at least lukewarm) in the next hour to all the accepting customers in the one small neighborhood. Everyone ends up pleased with this deal; customers and promoter. Additionally, if the pizza store owner can capture new customers at the party because they are impressed with the speed and quality of the delivery and the taste and freshness of the food, that is one additional bonus for the promotion offering vendor (e.g., the local pizza store).

You ask around the room and discover that a number of other people at the party (in Ken's house, including Ken) are also very much in the mood for some hot fresh pizza. One of them has his tablet computer running and he just got the same promotional invitation from the same vendor and, as a matter of fact, he was about to ask you if you wanted to join with him in signing up for the deal. He too indicates he hasn't had pizza in a week and therefore he is "game" for it. Now Jim chimes in and says he wants spicy chicken wings to go along with his pizza. Another friend (Jeff) tells you not to forget the garlic bread. Sye, another friend, says we need more drinks, it's important to hydrate (he is always health conscious). As you hit the virtual acceptance button within your on-screen offer, you begin to wonder; how did the pizza store, or more correctly your smartphone's computer and whatever it is remotely connected to; know this would happen just now—that all these people would welcome this particular promotional offering? You start filling in the order details on your screen while keeping an eye on an on-screen deal-acceptance counter. The deal counter indicates how many nearby neighbors have also signed up for the neighborhood group discount (and/or other promotional offering) before the offer deadline lapses. Next to the sign-up count there is a countdown timer decrementing from 30 minutes towards zero. Soon the required minimum number of acceptances is reached, well before the countdown timer reaches zero. How did all this come to be? Details will follow below.

After you place the pizza order, a not-unwelcomed further suggestion icon or box pops open on your screen. It says: "This is the kind of party that your friends A) Henry and B) Charlie would like to be at, but they are not present. Would you like to send a personalized invitation to one or more of them? Please select: 0) No, 1) Initiate Instant Chat, 2) Text message to their cellphones or tablets using pre-drafted invitation template, 3) Dial their cellphone or other device now for personal voice invite, 4) Email, 5) more . . . ". The automatically generated suggestion further says, "Please select one of the following, on-topic messaging templates and select the persons (A, B, C, etc.) to apply it to." The first listed topic reads: "SuperBowl Party, Come ASAP". You think to yourself, yes this is indeed a party where Charlie is sorely missed. How did my computer realize this when it had slipped my mind? I'm going to press the number 2) "Text message" option right now. In response to the press, a pre-drafted invitation template addressed to Charlie automatically pops open. It says: "Charlie, We are over at Ken's house having a Superbowl™ Sunday Party. We sorely miss you. Please join ASAP. P.S. Do you want pizza?" Further details for empowering this kind of feature will follow below.

Your eyes flick back to the on-screen news story concerning the health of your favorite sports celebrity (Joe-the-Throw Nebraska—a hypothetical name). A new frame has now appeared next to it: "Will Joe Throw Today?". You start reading avidly. In the background, the doorbell rings. Someone says, "Pizza is here!" The new frame on your screen says "Best Chat Comments re Joe's Health". From experience you know that this is a compilation of contributions collected from numerous chat rooms, blog comments, etc.; a sort of community collection of best and voted most-worthy-to-see comments so far regarding the topic of Joe-the-Throw Nebraska, his health status and today's American football game. You know from past experience that these "community board" type of comments have been voted on, and have been ranked as the best liked and/or currently 'hottest' and they are all directed to substantially the same topic you are currently centering your attention on, namely, the health condition of your favorite sports celebrity's (e.g., "Is Joe well enough to play full throttle today?") and how it will impact today's game. The best comments have percolated to the top of the list (a.k.a., community board). You have given up trying to figure out how your smartphone (and whatever computer system it is wirelessly hooked up to) can do this too. Details for empowering this kind of feature will also follow below.

DEFINITIONS

As used herein, terms such as "cloud", "server", "software", "software agent", "BOT", "virtual BOT", "virtual agent", "virtual ball", "virtual elevator" and the like do not mean nonphysical abstractions but instead always entail a physically real and tangibly implemented aspect unless otherwise explicitly stated to the contrary at that spot.

Claims appended hereto which use such terms (e.g., "cloud", "server", "software", etc.) do not preclude others from thinking about, speaking about or similarly non-usefully using abstract ideas, or laws of nature or naturally occurring phenomenon. Instead, such "virtual" or non-virtual entities as described herein are always accompanied by changes of physical state of real physical, tangible and non-transitory objects. For example, when it is in an active (e.g., an executing) mode, a "software" module or entity, be it a "virtual agent", a spyware program or the alike is understood to be a physical ongoing process (at the time it is executed) which is being carried out in one or more real, tangible and specific physical machines (e.g., data processing machines) where the machine(s) entropically consume(s) electrical power and/or other forms of real energy per unit time as a consequence of said physical ongoing process being carried out there within. Parts or wholes of software implementations may be substituted for by substantially similar in functionality hardware or firmware including for example implementation of functions by way of field programmable gate arrays (FPGA's) or other such programmable logic devices (PLD's). When it is in a static (e.g., non-executing) mode, an instantiated "software" entity or module, or "virtual agent" or the alike is understood (unless explicitly stated otherwise herein) to be embodied as a substantially unique and functionally operative and non-transitory pattern of transformed physical matter preserved in a more-than-elusively-transitory manner in one or more physical memory devices so that it can functionally and cooperatively interact with a commandable or instructable machine as opposed to being merely descriptive and totally nonfunctional matter. The one or more physical memory devices mentioned herein can include, but are not limited to, PLD's and/or memory devices which utilize electrostatic effects to represent stored data, memory devices which utilize magnetic effects to represent stored data, memory devices which utilize magnetic and/or other phase change effects to represent stored data, memory devices which utilize optical and/or other phase change effects to represent stored data, and so on.

As used herein, the terms, "signaling", "transmitting", "informing" "indicating", "logical linking", and the like do not mean nonphysical and abstract events but rather physical and not elusively transitory events where the former physical events are ones whose existence can be verified by modern scientific techniques. Claims appended hereto that use the aforementioned terms, "signaling", "transmitting", "informing", "indicating", "logical linking", and the like or their equivalents do not preclude others from thinking about, speaking about or similarly using in a non-useful way abstract ideas, laws of nature or naturally occurring phenomenon.

As used herein, the terms, "empower", "empowerment" and the like refer to a physically transformative process that provides a present or near-term ability to a data producing/processing device or the like to be recognized by and/or to communicate with a functionally more powerful data processing system (e.g., an on network or in cloud server) where the provided abilities include at least one of: transmitting status reporting signals to, and receiving responsive information-containing signals from the more powerful data processing system where the more powerful system will recognize at least some of the reporting signals and will responsively change stored state-representing signals for a corresponding one or more system-recognized personas and/or for a corresponding one or more system-recognized and in-field data producing and/or data processing devices and where at least some of the responsive information-containing signals, if provided at all, will be based on the stored state-representing signals. The term, "empowerment" may include a process of registering a person or persona (real or virtual) or a process of logging in a registered entity for the purpose of having the functionally more powerful data processing system recognize that registered entity and respond to reporting signals associated with that recognized entity. The term, "empowerment" may include a process of registering a data processing and/or data-producing and/or information inputting and/or outputting device or a process of logging in a registered such device for the purpose of having the functionally more powerful data processing system recognize that registered device and respond to reporting signals associated with that recognized device and/or supply information-containing and/or instruction-containing signals to that recognized device.

BACKGROUND AND FURTHER INTRODUCTION TO RELATED TECHNOLOGY

The above identified and herein incorporated by reference U.S. patent application Ser. No. 12/369,274 (filed Feb. 11, 2009) and Ser. No. 12/854,082 (filed Aug. 10, 2010) disclose certain types of Social-Topical Adaptive Networking (STAN) Systems (hereafter, also referred to respectively as "Sierra#1" or "STAN_1" and "Sierra#2" or "STAN_2") which empower and enable physically isolated online users of a network to automatically join with one another (electronically or otherwise) so as to form a topic-specific and/or otherwise based information-exchanging group (e.g., a 'TCONE'—as such is described in the STAN_2 application). A primary feature of the STAN systems is that they provide and maintain one or more so-called, topic space defining objects (e.g., topic-to-topic associating database records) which are represented by physical signals stored in machine memory and which topic space defining objects can define (and thus model) topic nodes and logical interconnections (cross-associations) between, and/or spatial clusterings of those nodes and/or can provide logical links to forums associated with topics modeled by the respective nodes and/or to persons or other social entities associated with topics of the nodes and/or to on-topic other material associated with topics of the nodes. The topic space defining objects (e.g., database records, also referred to herein as potentially-attention-receiving modeled points, nodes or subregions of a Cognitive Attention Receiving Space (CARS), which space in this case is topic space) can be used by the STAN systems to automatically provide, for example, invitations to plural persons or to other social entities to join in on-topic online chats or other Notes Exchange sessions (forum sessions) when those social entities are deemed to be currently focusing-upon (e.g., casting their respective attention giving energies on) such topics or clusters of such topics and/or when those social entities are deemed to be co-compatible for interacting at least online with one another. (In one embodiment, co-compatibilities are established by automatically verifying reputations and/or attributes of persons seeking to enter a STAN-sponsored chat room or other such Notes Exchange session, e.g., a Topic Center "Owned" Notes Exchange session or "TCONE".) Additionally, the topic space defining objects (e.g., database records) are used by the STAN systems to automatically provide suggestions to users regarding on-topic other content and/or regarding further social entities whom they may wish to connect with for topic-related activities and/or socially co-compatible activities.

During operation of the STAN systems, a variety of different kinds of informational signals may be collected by a STAN system in regard to the current states of its users; including but not limited to, the user's geographic location, the user's transactional disposition (e.g., at work? at a party? at home? etc.); the user's recent online activities; the user's recent biometric states; the user's habitual trends, behavioral routines, the user's biological states (e.g., hungry tired, muscles fatigued from workout) and so on. The purpose of this collected information is to facilitate automated joinder of like-minded and co-compatible persons for their mutual benefit. More specifically, a STAN-system-facilitated joinder may occur between users at times when they are in the mood to do so (to join in a so-called Notes Exchange session) and when they have roughly concurrent focus on same or similar detectable content and/or when they apparently have approximately concurrent interest in a same or similar particular topic or topics and/or when they have current personality co-compatibility for instantly chatting with, or for otherwise exchanging information with one another or otherwise transacting with one another.

In terms of a more concrete example of the above concepts, the imaginative and hypothetical introduction that was provided above revolved around a group of hypothetical people who all seemed to be currently thinking about a same popular event (the day's Superbowl™ football game) and many of whom seemed to be concurrently interested in then obtaining event-relevant refreshments (e.g., pizza) and/or other event-relevant paraphernalia (e.g., T-shirts). The group-based discount offer sought to join them, along with others, in an online manner for a mutually beneficial commercial transaction (e.g., volume purchase and localized delivery of a discounted item that is normally sold in smaller quantities to individual and geographically dispersed customers one at a time). The unsolicited and thus "pushed" solicitation was not one that generally annoyed the recipients as would conventionally pushed unsolicited and undesired advertisements. It's almost as if the users pulled the solicitation in to them by means of their subconscious will power rather than having the solicitations rudely pushed onto them by an insistent high pressure salesperson. The underlying mechanisms that can automatically achieve this will be detailed below. At this introductory phase of the present disclosure it is worthwhile merely to note that some wants and desires can arise at the subconscious level and these can be inferred to a reasonable degree of confidence by carefully reading a person's facial expressions (e.g., micro-expressions) and/or other body gestures, by monitoring the persons' computer usage activities, by tracking the person's recent habitual or routine activities, and so on, without giving away that such is going on and without inappropriately intruding on reasonable expectations of privacy by the person. Proper reading of each individual's body-language expressions may require access to a Personal Emotion Expression Profile (PEEP) that has been pre-developed for that individual and for certain contexts in which the person may find themselves. Example structures for such PEEP records are disclosed in at least one of the here incorporated U.S. Ser. No. 12/369,274 and Ser. No. 12/854,082. Appropriate PEEP records for each individual may be activated based on automated determination of time, place and other context revealing hints or clues (e.g., the individual's digitized calendar or recent email records which show a plan, for example, to attend a certain friend's "Superbowl™ Sunday Party" at a pre-arranged time and place, for example 1:00 PM at Ken's house). Of course, user permission for accessing and using such information should be obtained by the system beforehand, and the users should be able to rescind the permissions whenever they want to do so, whether manually or by automated command (e.g., IF Location=Charlie's Tavern THEN Disable All STAN monitoring"). In one embodiment, user permission automatically fades over time for all or for one or more prespecified regions of topic space and needs to be reestablished by contacting the user and either obtaining affirmative consent or permission from the user or at least notifying the user and reminding the user of the option to rescind. In one embodiment, certain prespecified regions of topic space are tagged by system operators and/or the respective users as being of a sensitive nature and special double permissions are required before information regarding user direct or indirect 'touchings' into these sensitive regions of topic space is automatically shared with one or more prespecified other social entities (e.g., most trusted friends and family).

Before delving deeper into such aspects, a rough explanation of the term "STAN system" as used herein is provided. The term arises from the nature of the respective network systems, namely, STAN_1 as disclosed in here-incorporated U.S. Ser. No. 12/369,274 and STAN_2 as disclosed in here-incorporated U.S. Ser. No. 12/854,082. Generically they are referred to herein as Social-Topical 'Adaptive' Networking (STAN) systems or STAN systems for short. One of the things that such STAN systems can generally do is to maintain in machine memory one or more virtual spaces (data-objects organizing spaces) populated by interrelated data objects stored therein such as interrelated topic nodes (or 'topic centers' as they are referred to in the Ser. No. 12/854,082 application) where the nodes may be hierarchically interconnected (via logical graphing) to one another and/or logically linked to topic-related forums (e.g., online chat rooms) and/or to topic-related other content. Such system-maintained and logically interconnected and continuously updated representations of topic nodes and associated forums (e.g., online chat rooms) may be viewed as social and dynamically changing communal cognition spaces. (The definition of such communal cognition spaces is expanded on herein as will be seen below.) In accordance with one aspect of the present disclosure, if there are not enough online users tethered to one topic node so as to adequately fill a social mix recipe of a given chat or other forum participation session, users from hierarchically and/or spatially nearby other topic nodes those of substantially similar topic may be automatically recruited to fill the void. In other words, one chat room can simultaneously service plural ones of topic nodes. (The concept of social mix recipe will be explained later below.) The STAN_1 and STAN_2 systems (as well as the STAN_3 of the present disclosure) can cross match current users with respective topic nodes that are determined by machine means as representing topics likely to be currently focused-upon ones in the respective users' minds. The STAN systems can also cross match current users with other current users (e.g., co-compatible other users) so as to create logical linkages between users where the created linkages are at least one if not both of being topically relevant and socially acceptable for such users of the STAN system. Incidentally, hierarchical graphing of topic-to-topic associations (T2T) is not a necessary or only way that STAN systems can graph T2T associations via a physical database or otherwise. Topic-to-topic associations (T2T) may alternatively or additionally be defined by non-hierarchical graphs (ones that do not have clear parent to child relationships as between nodes) and/or by spatial and distance based positionings within a specified virtual positioning space.

The "adaptive" aspect of the "STAN" acronym correlates in one sense to the "plasticity" (neuroplasticity) of the individual human mind and correlates in a second sense to a similar "plasticity" of the collective or societal mind. Because both individualized people and groups thereof; and their respective areas of focused attention tend to change with time, location, new events and variation of physical and/or social context (as examples), the STAN systems are structured to adaptively change (e.g., update) their definitions regarding what parts of a system-maintained, Cognitive Attention Receiving Space (referred to herein also as a "CARS") are currently cross-associated with what other parts of the same CARS and/or with what specific parts of other CARS. The adaptive changes can also modify what the different parts currently represent (e.g., what is the current definition of a topic of a respective topic node when the CARS is defined as being the topic space). The adaptive changes can also vary the assigned intensity of attention giving energies for respective users when the users are determined by the machine means to be focused-upon specific subareas within, for example, a topics-defining map (e.g., hierarchical and/or spatial). The adaptive changes can also determine how and/or at what rate the cross-associated parts (e.g., topic nodes) and their respective interlinkings and their respective definitions change with changing times and changing external conditions. In other words, the STAN systems are structured to adaptively change the topics-defining maps themselves (a.k.a. topic spaces, which topic maps/spaces have corresponding, physically represented, topic nodes or the like defined by data signals recorded in databases or other appropriate memory means of the STAN_system and which topic nodes or groups thereof can be pointed to with logical pointer mechanisms). Such adaptive change of perspective regarding virtual positions or graphed interlinks in topic space and/or reworking of the topic space and of topic space content (and/or of alike subregions of other Cognitive Attention Receiving Spaces) helps the STAN systems to keep in tune with variable external conditions and with their variable user populations as the latter migrate to new topics (e.g., fad of the day) and/or to new personal dispositions (e.g., higher levels of expertise, different moods, etc.).

One of the adaptive mechanisms that can be relied upon by the STAN system is the generation and collection of implicit vote or CVi signals (where CVi may stand for Current (and implied or explicit) Vote-Indicating record). CVi's are vote-representing signals which are typically automatically collected from user surrounding machines and used to infer subconscious positive or negative votes cast by users as they go about their normal machine usage activities or normal life activities, where those activities are open to being monitored (due to rescindable permissions given by the user for such monitoring) by surrounding information gathering equipment. User PEEP files may be used in combination with collected CFi and CVi signals to automatically determine most probable, user-implied votes regarding focused-upon material even if those votes are only at the subconscious level. Stated otherwise, users can implicitly urge the STAN system topic space and pointers thereto to change (or pointers/links within the topic space to change) in response to subconscious votes that the users cast where the subconscious votes are inferred from telemetry gathered about user facial grimaces, body language, vocal grunts, breathing patterns, eye movements, and the like. (Note: The above notion of a current cross-association between different parts of a same CARS (e.g., topic space or some other Cognitive Attention Receiving Space) is also referred to herein as an IntrA-Space cross-associating link or "InS-CAX" for short. The above notion of a current cross-association between points, nodes or subregions of different CARS's is also referred to herein as an IntEr-Space cross-associating link or "IoS-CAX" for short, where the "o" in the "IoS-CAX" acronym signifies that the link crosses to outside of the respective space. See for example, IoS-CAX 370.6 of FIG. 3E and IoS-CAX 390.6 of the same figure where these will be further described later below.)

Although not specifically given as an example in the earlier filed and here incorporated U.S. Ser. No. 12/854,082 (STAN_2), one example of a changing and "neuro-plastic" cognition landscape might revolve around a keyword such as "surfing". In the decade of the 1960's, the word "surfing" may most likely have conjured up in the minds of most individuals and groups, the notion of waves breaking on a Hawaiian or Californian beach and young men taking to the waves with their "surf boards" so they can ride or "surf" those waves. By contrast, after the decade of the 1990's, the word "surfing" may more likely have conjured up in the minds of most up-to-date individuals (and groups of the same), the notion of people using personal computers and using the Internet and searching through it (surfing the net) to find websites of interest. Moreover, in the decade of the 1960's there was essentially no popular attention giving activities directed to the notion of "surfing" meaning the idea of journeying through webs of data by means of personally controlled computers. By contrast, beginning with the decade of the 1990's (and the explosive growth of the World Wide Web), it became exponentially more and more popular to focus one's attention giving energies on the notion of "surfing" as it applies to riding through the growing mounds of information found on the World Wide Web or elsewhere within the Internet and/or within other network systems. Indeed, another word that changed in meaning in a plastic cognition way is the word sounded out as "Google". In the decade of the 1960's such a sounded out word (more correctly spelled as "Googol") was understood to mean the number 10 raised to the 100th power. Thinking about sorting through a Googol-ful of computerized data meant looking for a needle in a haystack. The likelihood of finding the sought item was close to nil. Ironically, with the advent of the internet searching engine known as Google™, the probability of finding a website whose content matches with user-picked keywords increased dramatically and the popularly assumed meaning for the corresponding sound bite ("Googol" or "Google") changed, and the topics cross-correlated to that sound bite also changed; quite significantly.

The sounded-out words, "surfing and "Google" are but two of many examples of the "plasticity" attribute of the individual human mind and of the "plasticity" attribute of the collective or societal mind. Change has and continues to come to many other words, and to their most likely meanings and to their most likely associations to other words (and/or other cognitions). The changes can come not only due to passage of time, be it over a period of years; or sometimes over a matter of days or hours, but also due to unanticipated events (e.g., the term "911"—pronounced as nine eleven—took on sudden and new meaning on Sep. 11, 2001). Other examples of words or phrases that have plastically changed over time include, being "online", opening a "window", being infected by a "virus", looking at your "cellular", going "phishing", worrying about "climate change", "occupying" a street such as one named Wall St., and so on. Indeed, not only do meanings and connotations of same-sounding words change over time, but new words and new ideas associated with them are constantly being added. The notion of having an adaptive and user-changeable topic space was included even in the here-incorporated STAN_1 disclosure (U.S. Ser. No. 12/369,274).

In addition to disclosing an adaptively changing topics space/map (topic-to-topic (T2T) associations space), the here also-incorporated U.S. Ser. No. 12/854,082 (STAN_2) discloses the notion of a user-to-user (U2U) associations space as well as a user-to-topic (U2T) cross associations space. Here, an extension of the user-to-user (U2U) associations space will be disclosed where that extension will be referred to as Social/Persona Entities Interrelation Spaces (SPEIS'es for short). A single such space is a SPEIS. However, there often are many such spaces due to the typical presence of multiple social networking (SN) platforms like FaceBook™, LinkedIn™, MySpace™, Quora™, etc. and the many different kinds of user-to-user associations which can be formed by activities carried out on these various platforms in addition to user activities carried out on a STAN platform. The concept of different "personas" for each one real world person was explained in the here incorporated U.S. Ser. No. 12/854,082 (STAN_2). In this disclosure however, Social/Persona Entities (SPE's) may include not only the one or different personas of a real world, single flesh and blood person, but also personas of hybrid real/virtual persons (e.g., a Second Life™ avatar driven by a committee of real persons) and personas of collectives such as a group of real persons and/or a group of hybrid real/virtual persons and/or purely virtual persons (e.g., those driven entirely by an executing computer program). In one embodiment, each STAN user can define his or her own custom groups or the user can use system-provided templates (e.g., My Immediate Family). The Group social entity may be used to keep a collective tab on what a relevant group of social entities are doing (e.g., What topic or other thing are they collectively and recently focusing-upon?).

When it comes to automated formation of social groups, one of the extensions or improvements disclosed herein involves formation of a group of online real persons who are to be considered for receiving a group discount offer (e.g., reduced price pizza) or another such transaction/promotional offering. More specifically, the present disclosure provides for a machine-implemented method that can use the automatically gathered CFi and/or CVi signals (current focus indicator and current voting indicator signals respectively) of a STAN system advantageously to automatically infer therefrom what unsolicited solicitations (e.g., group offers and the like) would likely be welcome at a given moment by a targeted group of potential offerees (real or even possibly virtual if the offer is to their virtual life counterparts, e.g., their SecondLife™ avatars) and which solicitations would less likely be welcomed and thus should not be now pushed onto the targeted personas, because of the danger of creating ill-will or degrading previously developed goodwill. Another feature of the present disclosure is to automatically sort potential offerees according to likelihood of welcoming and accepting different ones of possible solicitations and pushing the M most likely-to-be-now-welcomed solicitations to a corresponding top N ones of the potential offerees who are currently likely to accept (where here M and N are corresponding predetermined numbers). Outcomes can change according to changing moods/ideas of socially-interactive user populations as well as those of individual users (e.g., user mood or other current user persona state). A potential offeree who is automatically determined to be less likely to welcome a first of simultaneously brewing group offers may nonetheless be determined to more likely to now welcome a second of the brewing group offers. Thus brewing offers are competitively and automatically sorted by machine means so that each is transmitted (pushed) to a respective offerees population that is populated by persons deemed most likely to then accept that offer and offerees are not inundated with too many or unwelcomed offers. More details follow below.

Another novel use disclosed herein of the Group entity is that of tracking group migrations and migration trends through topic space and/or through other cognition cross-associating spaces (e.g., keyword space, context space, etc.). If a predefined group of influential personas (e.g., Tipping Point Persons) is automatically tracked as having traveled along a sequence of paths or a time parallel set of paths through topic space (by virtue of making direct or indirect 'touchings' in topic space), then predictions can be automatically made about the paths that their followers (e.g., twitter fans) will soon follow and/or of what the influential group will next likely do as a group. This can be useful for formulating promotional offerings to the influential group and/or their followers. Also, the leaders may be solicited by vendors for endorsing vendor provided goods and/or services. Detection of sequential paths and/or time parallel paths through topic space is not limited to predefined influential groups. It can also apply to individual STAN users. The tracking need not look at (or only at) the topic nodes they directly or indirectly 'touched' in topic space. It can include a tracking of the sequential and/or time parallel patterns of CFi's and/or CVi's (e.g., keywords, meta-tags, hybrid combinations of different kinds of CFi's (e.g., keywords and context-reporting CFi's), etc.) produced by the tracked individual STAN users. Such trackings can be useful for automatically formulating promotional offerings to the corresponding individuals. In one embodiment, so-called, hybrid spaces are created and represented by data stored in machine memory where the hybrid spaces can include but are not limited to, a hybrid topic-and-context space, a hybrid keyword-and-context space, a hybrid URL-and-context space, whereby system users whose recently collected CFi's indicate a combination of current context and current other focused-upon attribute (e.g., keyword) can be identified and serviced according to their current dispositions in the respective hybrid spaces and/or according to their current trajectories of journeying through the respective hybrid spaces.

It is to be understood that this background and further introduction section is intended to provide useful background for understanding the here disclosed inventive technology and as such, this technology background section may and probably does include ideas, concepts or recognitions that were not part of what was known or appreciated by others skilled in the pertinent arts prior to corresponding invention dates of invented subject matter disclosed herein. As such, this background of technology section is not to be construed as any admission whatsoever regarding what is or is not prior art. A clearer picture of the inventive technology will unfold below.

SUMMARY

In accordance with one aspect of the present disclosure, likely to-be-welcomed group-based offers or other offers are automatically presented to STAN system users based on information gathered from their STAN (Social-Topical Adaptive Networking) system usage activities. The gathered information may include current mood or disposition as implied by a currently active PEEP (Personal Emotion Expression Profile) of the user as well as recently collected CFi signals (Current Focus indicator signals), recently collected CVi signals (Current Voting (implicit or explicit indicator signals) and recently collected context-indicating signals (e.g., XP signals) uploaded for the user and recent topic space (TS) usage patterns or hybrid space (HS) usage patterns or attention giving energies being recently cast onto other Cognitive Attention Receiving Points, Nodes or SubRegions (CAR PNoS's) of other cognition cross-associating spaces (CARS) maintained by the system or trends therethrough as detected of the user and/or associated group and/or recent friendship space usage patterns or trends detected of the user (where latter is more correctly referred to here as recent SPEIS'es usage patterns or trends {usage of Social/Persona Entities Interrelation Spaces}). Current mood and/or disposition may be inferred from currently focused-upon nodes and/or subregions of other spaces besides just topic space (TS) as well as from detected hints or clues about the user's real life (ReL) surroundings (e.g., identifying music playing in the background or other sounds and/or odors emanating from the background, such as for example the sounds and/or smells of potato chip bags being popped open at the hypothetical "Superbowl™ Sunday Party" described above).

In accordance with another aspect of the present disclosure, various user interface techniques are provided for allowing a user to conveniently interface (even when using a small screen portable device; e.g., smartphone) with resources of the STAN system including by means of device tilt, body gesture, facial expressions, head tilt and/or wobble inputs and/or touch screen inputs as well as pupil pointing, pupil dilation changes (independent of light level change), eye widening, tongue display, lips/eyebrows/tongue contortions display, and so on, as such may be detected by tablet and/or palmtop and/or other data processing units proximate to STAN system users and communicating with telemetry gathering resources of a STAN system.

Although numerous examples given herein are directed to situations where the user of the STAN_system is carrying a small-sized mobile data processing device such as a tablet computer with a tappable touch screen, it is within the contemplation of the present disclosure to have a user enter an instrumented room or other such area (e.g., instrumented with audio visual display resources and other user interface resources) and with the user having essentially no noticeable device in hand, where the instrumented area automatically recognizes the user and his/her identity, automatically logs the user into his/her STAN_system account, automatically presents the user with one or more of the STAN_system generated presentations described herein (e.g., invitations to immediately join in on chat or other forum participation sessions related to a subportion of a Cognitive Attention Receiving Space, which subportion the user is deemed to be currently focusing-upon) and automatically responds to user voice and/or gesture commands and/or changes in user biometric states.

In accordance with yet another aspect of the present disclosure, a user-viewable screen area is organized to have user-relevant social entities (e.g., My Friends and Family) iconically represented in one subarea (e.g., hideable side tray area) of the screen and user-relevant topical and contextual material (e.g., My Top 5 Now Topics While Being Here) iconically represented in another subarea (e.g., hideable top tray area) of the screen, where an indication is provided to the user regarding which user-relevant social entities are currently focusing-upon which user-relevant topics (and/or other points, nodes or subregions in other Cognitive Attention Receiving Spaces). Thus the user can readily appreciate which of persons or other social entities relevant to him/her (e.g., My Friends and Family, My Followed Influencers) are likely to be currently interested in what topics that are same or similar (as measured by hierarchical and/or spatial distances in topic space) to those being current focused-upon by the user in the user's current context (e.g., at a bus stop, bored and waiting for the bus to arrive) or in topics that the user has not yet focused-upon. Alternatively, when the on-screen indications are provided to the user with regard to other points, nodes or subregions in other Cognitive Attention Receiving Spaces (e.g., keyword space, URL space, content space) the user can learn of user-relevant other social entities who are currently focusing-upon such user-relevant other spaces (including upon same or similar base symbols in a clustered symbols layer of the respective Cognitions-representing Space (CARS)).

Other aspects of the disclosure will become apparent from the below yet more detailed description.

BRIEF DESCRIPTION OF THE DRAWINGS

The below detailed description section makes reference to the accompanying drawings, in which:

FIG. 1H shows an automated process that may be used in conjunction with the automated community board posting and posts ranking/promoting system of FIG. 1G;

FIG. 1J shows a smartphone and tablet computer compatible user interface method for presenting on-topic location based congregation opportunities to users of the STAN_3 system where the congregation opportunities may depend on availability of local resources (e.g., lecture halls, multimedia presentation resources, laboratory supplies, etc.);

FIG. 1L shows a smartphone and tablet computer compatible user interface method that includes a topics digression mapping tool;

FIG. 1M shows a smartphone and tablet computer compatible user interface method that includes a social dynamics mapping tool;

FIG. 2 is a perspective block diagram of a user environment that includes a portable palmtop microcomputer and/or intelligent cellphone (smartphone) or tablet computer which is structured for electromagnetic linking (e.g., electronically and/or optically linking) with a networking environment that includes a Social-Topical Adaptive Networking (STAN_3) system where, in accordance with one aspect of the present disclosure, the STAN_3 system includes means for automatically presenting through the mobile user interface, individual or group transaction offerings based on user context and on usages of the STAN_3 system;

FIG. 3S illustrates in a perspective schematic format how topic-less, catch-all nodes and/or topic-less, catch-all chat rooms (or other forum participation sessions) can respectively migrate to become topic-affiliated nodes placed in a branch space of a hierarchical topics tree and to become topic-affiliated chat rooms (or other forum participation sessions) that are strongly or weakly tethered to such topic-affiliated nodes;

FIG. 3U shows an example of a data structure that may be used for implementing a generic CFi's collecting (clustering) node in the system of FIGS. 3R-3S;

FIG. 3V shows an example of a data structure that may be used for implementing a species of a CFi's collecting node specific to textual types of CFi's;

FIG. 3W shows an example of a data structure that may be used for implementing a textual expression primitive object;

FIG. 4A is a block diagram of a networked system that includes network interconnected mechanisms for maintaining one or more Social/Persona Entities Interrelation Spaces (SPEIS), for maintaining one or more kinds of topic spaces (TS's, including a hybrid context plus topic space) and for supplying group offers to users of a Social-Topical Adaptive Networking system (STAN3) that supports the SPEIS and TS's as well as other relationships (e.g., L2U/T/C, which here denotes location to user(s), topic node(s), content(s) and other such data entities);

FIG. 4B shows a combination of flow chart and popped up screen shots illustrating how user-to-user associations (U2U) from external platforms can be acquired by (imported into) the STAN_3 system;

FIG. 4C shows a combination of a data structure and examples of user-to-user associations (U2U) for explaining an embodiment of FIG. 4B in greater detail;

FIG. 4D is a perspective type of schematic view showing mappings between different kinds of spaces and also showing how different user-to-user associations (U2U) may be utilized by a STAN_3 server that determines, for example, "What topics are my friends now focusing on and what patterns of journeys have they recently taken through one or more spaces supported by the STAN_3 system?";

FIG. 4F illustrates how geographic clusterings of on-topic chat or other forum participation sessions can be displayed and how availability of nearby promotional or other resources can also be displayed;

FIG. 5A illustrates a profiling data structure (PHA_FUEL) usable for determining habits, routines, and likes and dislikes of STAN users;

FIG. 5B illustrates another profiling data structure (PSDIP) usable for determining time and context dependent social dynamic traits of STAN users;

FIG. 6 is a flow chart indicating how an offering recipients-space may be populated by identities of persons who are likely to accept a corresponding offered transaction where the populating or depopulating of the offering recipients-space may be a function of usage by the targeted offerees of the STAN_3 system.

MORE DETAILED DESCRIPTION

Figure 1A:
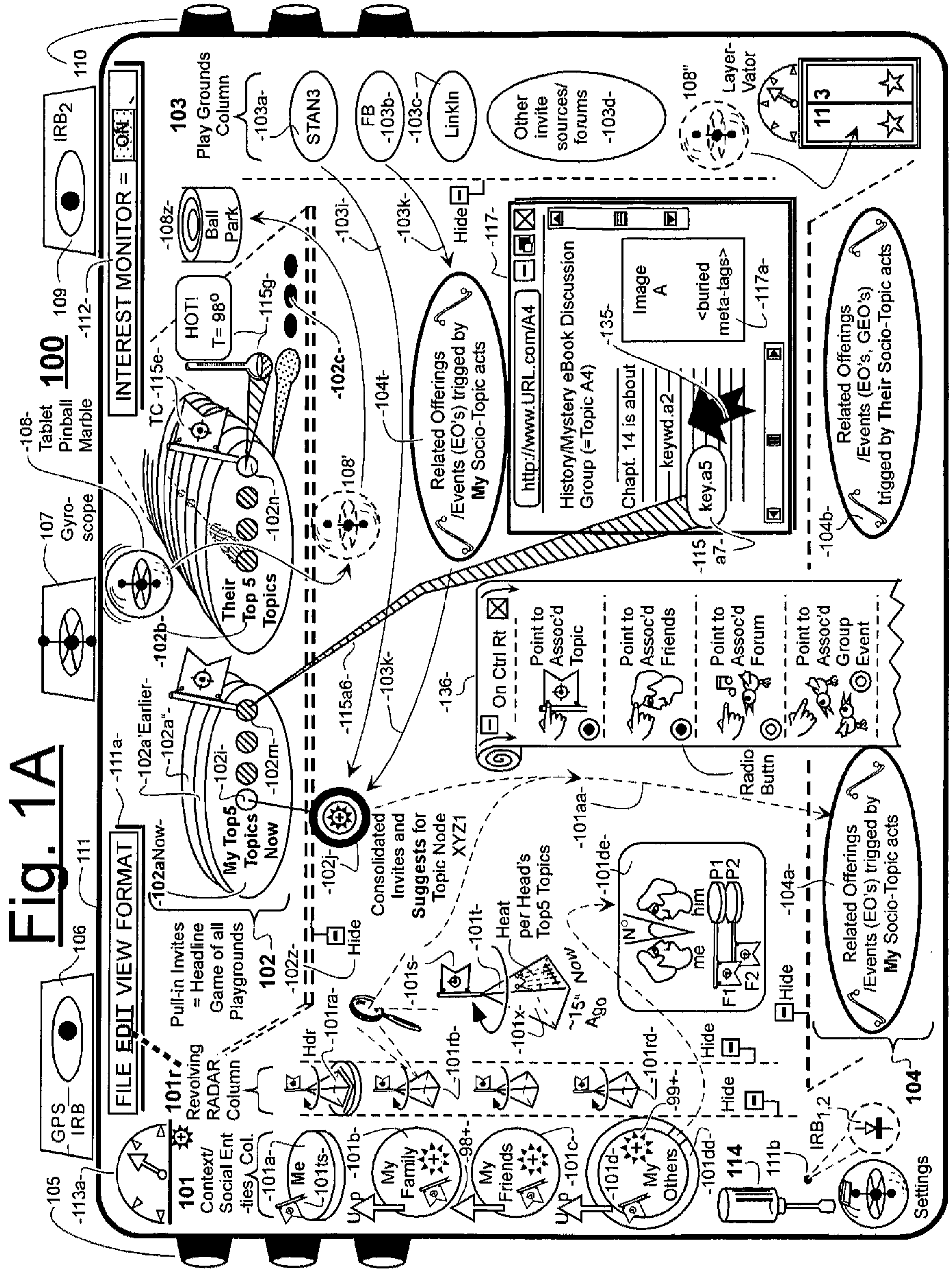
FIG. 1A is a block diagram of a portable tablet microcomputer which is structured for electromagnetic linking (e.g., electronically and/or optically linking, this including wirelessly linking) with a networking environment that includes a Social-Topical Adaptive Networking (STAN_3) system where, in accordance with the present disclosure, the STAN_3 system includes means for automatically creating individual or group transaction offerings based on usages of the STAN_3 system.

Some of the detailed description found immediately below is substantially repetitive of detailed description of a 'FIG. 1A' found in the here-incorporated U.S. Ser. No. 12/854,082 application (STAN_2) and thus readers familiar with the details of the STAN_2 disclosure may elect to skim through to a part further below that begins to detail a tablet computer 100 illustrated by FIG. 1A of the present disclosure. FIG. 4A of the present disclosure corresponds to, but is not completely the same as the 'FIG. 1A' provided in the here-incorporated U.S. Ser. No. 12/854,082 application (STAN_2).

Referring to FIG. 4A of the present disclosure, shown is a block diagram of an electromagnetically inter-linked (e.g., electronically and/or optically linked, this optionally including wirelessly linked) networking environment 400 that includes a Social-Topical Adaptive Networking (STAN_3) sub-system 410 configured in accordance with the present disclosure. The encompassing environment 400 shown in FIG. 4A includes other sub-network systems (e.g., Non-STAN subnets 441, 442, etc., generally denoted herein as 44X). Although the electromagnetically inter-linked networking environment 400 will be often described as one using "the Internet" 401 for providing communications between, and data processing support for persons or other social entities and/or providing communications therebetween as well, and data processing support for, respective communication and data processing devices thereof, the networking environment 400 is not limited to just using "the Internet" and may include alternative or additional forms of communicative interlinkings. The Internet 401 is just one example of a panoply of communications-supporting and data processing supporting resources that may be used by the STAN_3 system 410. Other examples include, but are not limited to, telephone systems such as cellular telephony systems (e.g., 3G, 4G, etc.), including those wherein users or their devices can exchange text, images (including video, moving images or series of images) or other messages with one another as well as voice messages. More generically, the present disclosure contemplates various means by way of which individualized, physical codings by a first user that are representative of probable mental cognitions of that first user may be communicated directly or indirectly to one or more other users. (An example of an individualized, physical coding might be the text string, "The Golden Great" by way of which string, a given individual user might refer to American football player, Joseph "Joe" Montana, Jr. whereas others may refer to him as "Joe Cool" or "Golden Joe" or otherwise. The significance of individualized, physical codings versus collectively recognized codings will be explained later below. A text string is merely one of different ways in which coded symbols can be used to represent individualized mental cognitions of respective system users. Other examples include sign language, body language, music, and so on.) Yet other examples of communicative means by way of which user codings can be communicated include cable television systems, satellite dish systems, near field networking systems (optical and/or radio based), and so on; any of which can act as conduits and/or routers (e.g., uni-cast, multi-cast broadcast) for not only digitized or analog TV signals but also for various other digitized or analog signals, including those that convey codings representative of individualized and/or collectively recognized codings. Yet other examples of such communicative means include wide area wireless broadcast systems and local area wireless broadcast, uni-cast, and/or multi-cast systems. (Incidental note: In this disclosure, the terms STAN_3, STAN#3, STAN-3, STAN3, or the like are used interchangeably to represent the third generation Social-Topical Adaptive Networking (STAN) system. STAN_1, STAN_2 similarly represent the respective first and second generations.)

The resources of the schematically illustrated environment 400 may be used to define so-called, user-to-user association codings (U2U) including for example, so-called "friendship spaces" (which spaces are a subset of the broader concept of Social/Persona Entities Interrelation Spaces (SPEIS) as disclosed herein and as represented by data signals stored in a SPEIS database area 411 of the STAN_3 system portion 410 of FIG. 4A. Examples of friendship spaces may include a graphed representation (as digitally encoded) of real persons whom a first user (e.g., 431) friends and/or de-friends over a predetermined time period when that first user utilizes an available version of the FaceBook™ platform 441. See also, briefly; FIG. 4C. Another friendship space may be defined by a graphed representation (as digitally encoded) of real persons whom the user 431 friends and/or de-friends over a predetermined time period when that first user utilizes an available version of the MySpace™ platform 442. Other Social/Personal Interrelations may be defined by the first user 431 utilizing other available social networking (SN) systems such as LinkedIn™ 444, Twitter™ and so on. As those skilled in the art of computer-facilitated social networking (SN) will be aware, the well known FaceBook™ platform 441 and MySpace™ platform 442 are relatively pioneering implementations of social media approaches to exploiting user-to-user associations (U2U) for providing network users with socially meaningful experiences while using computer-facilitated and electronic communication facilitated resources. However there is much room for improvement over the pioneering implementations and numerous such improvements may be found at least in the present disclosure if not also in the earlier the disclosures of the here incorporated U.S. Ser. No. 12/369,274 (filed Feb. 11, 2009) and U.S. Ser. No. 12/854,082 (filed Aug. 10, 2010).

The present disclosure will show how various matrix-like cross-correlations between one or more SPEIS 411 (e.g., friendship relation spaces) and topic-to-topic associations (T2T, a.k.a. topic spaces) 413 and hybrid context associations (e.g., location to users to topic associations) 416 may be used to enhance online experiences of real person users (e.g., 431, 432) of the one or more of the sub-networks 410, 441, 442, . . . , 44X, etc. due to cross-correlating actions automatically taken by the STAN_3 sub-network system 410 of FIG. 4A.

Yet more detailed background descriptions on how Social-Topical Adaptive Networking (STAN) sub-systems may operate can be found in the above-cited and here incorporated U.S. application Ser. No. 12/369,274 and Ser. No. 12/854,082 and therefore as already mentioned, detailed repetitions of said incorporated-by-reference materials will not all be provided here. For sake of avoiding confusion between the drawings of Ser. No. 12/369,274 (STAN_1) and the figures of the present application, drawings of Ser. No. 12/369,274 will be identified by the prefix, "giF." (which is "Fig." written backwards) while figures of the present application will be identified by the normal figure prefix, "Fig.". It is to be noted that, if there are conflicts as between any two or more of the two earlier filed and here incorporated applications and this application, the later filed disclosure controls as to conflicting teachings.

In brief, giF. 1A of the here incorporated '274 application shows how topics that are currently being focused-upon by (not to be confused with sub-portions of content being currently 'focused upon' by) individual online participants may be automatically determined based on detection of certain content sub-portions being currently and emotively 'focused upon' by the respective online participants and based upon pre-developed profiles of the respective users (e.g., registered and logged-in users of the STAN_1 system). (Incidentally, in the here disclosed STAN_3 system, the notion is included of determining what group offers a user is likely to currently welcome or not welcome based on a variety of factors including habit histories, trending histories, detected context and so on.)

Further in brief, giF. 1B of the incorporated '274 application shows a data structure of a first stored chat co-compatibility profile that can change with changes of user persona (e.g., change of mood); giF. 1C shows a data structure of a stored topic co-compatibility profile that can also change with change of user persona (e.g., change of mood, change of surroundings); and giF. 1E shows a data structure of a stored personal emotive expression profile of a given user, whereby biometrically detected facial or other biotic expressions of the profiled user may be used to deduce emotional involvement with on-screen content and thus degree of emotional involvement with focused upon content. One embodiment of the STAN_1 system disclosed in the here incorporated '274 application uses uploaded CFi (current focus indicator) packets to automatically determine what topic or topics are most likely ones that each user is currently thinking about based on the content that is being currently focused upon with above-threshold intensity. The determined topic is logically linked by operations of the STAN_1 system to topic nodes (herein also referred to as topic centers or TC's) within a hierarchical parent-child tree represented by data stored in the STAN_1 system.

Yet further and in brief, giF. 2A of the incorporated '274 application shows a possible data structure of a stored CFi record while giF. 2B shows a possible data structure of an implied vote-indicating record (CVi) which may be automatically extracted from biometric information obtained from the user. The giF. 3B diagram shows an exemplary screen display wherein so-called chat opportunity invitations (herein referred to as in-STAN-vitations™) are provided to the user based on the STAN_1 system's understanding of what topics are currently of prime interest to the user. The giF. 3C diagram shows how one embodiment of the STAN_1 system (of the '274 application) can automatically determine what topic or domain of topics might most likely be of current interest for a given user and then responsively can recommend, based on likelihood rankings, content (e.g., chat rooms) which are most likely to be on-topic for that user and compatible with the user's current status (e.g., level of expertise in the topic).

Moreover, in the here incorporated '274 application, giF. 4A shows a structure of a cloud computing system (e.g., a chunky grained cloud) that may be used to implement a STAN_1 system on a geographic region by geographic region basis. Importantly, each data center of giF. 4A has an automated Domains/Topics Lookup Service (DLUX) executing therein which receives up- or in-loaded CFi data packets (Current Focus indicating records) from users and combines these with user histories uploaded form the user's local machine and/or user histories already stored in the cloud to automatically determine probable topics of current interest then on the user's mind. In one embodiment the DLUX points to so-called topic nodes of a hierarchical topics tree. An exemplary data structure for such a topics tree is provided in giF. 4B which shows details of a stored and adaptively updated topic mapping data structure used by one embodiment of the STAN_1 system. Also each data center of giF. 4A further has one or more automated Domain-specific Matching Services (DsMS's) executing therein which are selected by the DLUX to further process the up- or in-loaded CFi data packets and match alike users to one another or to matching chat rooms and then presents the latter as scored chat opportunities. Also each data center of giF. 4A further has one or more automated Chat Rooms management Services (CRS) executing therein for managing chat rooms or the like operating under auspices of the STAN_1 system. Also each data center of giF. 4A further has an automated Trending Data Store service that keeps track of progression of respective users over time in different topic sectors and makes trend projections based thereon.

The here incorporated '274 application is extensive and has many other drawings as well as descriptions that will not all be briefed upon here but are nonetheless incorporated herein by reference. (Note again that where there are conflicts as between any two or more of the earlier filed and here incorporated applications and this application, the later filed disclosure controls as to conflicting teachings.)

Referring again to FIG. 4A of the present disclosure, in the illustrated environment 400 which includes a more advanced, third generation or STAN_3 system 410, a first real and living user 431 (also USER-A, also "Stan") is shown to have access to a first data processing device 431*a* (also CPU-1, where "CPU" does not limit the device to a centralized or single data processing engine, but rather is shorthand for denoting any single or multi-processing digital or mixed signals device capable of providing the commensurate functionality). The first user 431 may routinely log into and utilize the illustrated STAN_3 Social-Topical Adaptive Networking system 410 by causing CPU-1 to send a corresponding user identification package 431*u*1 (e.g., user name and user password data signals and optionally, user fingerprint and/or other biometric identification data) to a log-in interface portion 418 of the STAN_3 system 410. In response to validation of such log-in, the STAN_3 system 410 automatically fetches various profiles of the logged-in user (431, "Stan") from a database (DB, 419) thereof for the purpose of determining the user's currently probable topics of prime interest and current focus-upon, moods, chat co-compatibilities and so forth. As will be explained in conjunction with FIG. 3D, user profiling may start with fail-safe default profiles (301*d*) and then switch to more context appropriate, current profiles (301*p*). In one embodiment, a same user (e.g., 431 of FIG. 4A) may have plural personal log-in pages, for example, one that allows him to log in as "Stan" and another which allows that same real life person user to log-in under the alter ego identity (persona) of say, "Stewart" if that user is in the mood to assume the "Stewart" persona at the moment rather than the "Stan" persona. If a user (e.g., 431) logs-in via interface 418 with a second alter ego identity (e.g., "Stewart") rather than with a first alter ego identity (e.g., "Stan"), the STAN_3 Social- Topical Adaptive Networking system 410 automatically activates corresponding personal profile records (e.g., CpCCp's, DsCCp's, PEEP's, PHAFUEL's, PSDIP, etc.; where the latter two will be explained below) of the second alter ego identity (e.g., "Stewart") rather than those of the first alter ego identity (e.g., "Stan"). Topics of current interest that the machine system determines as being currently focused-upon by the logged-in persona may be identified as being logically associated with specific nodes (herein also referred to as TC's or topic centers) on a topics domain-parent/child tree structure such as the one schematically indicated at 415 within the drawn symbol that represents the STAN_3 system 410 in FIG. 4A. A corresponding stored data structure that represents the tree structure in the earlier STAN_1 system (not shown) is illustratively represented by drawing number giF. 4B. (A more advanced data structure for topic nodes will be described in conjunction with FIG. 3Ta and FIG. 3Tb of the present disclosure.) The topics defining tree 415 as well as user profiles of registered STAN_3 users may be stored in various parts of the STAN_3 maintained database (DB) 419 which latter entity could be part of a cloud computing system and/or partly implemented in the user's local equipment and/or in remotely-instantiated data processing equipment (e.g., CPU-1, CPU-2, etc.). The database (DB) 419 may be a centralized one, or one that is semi-redundantly distributed over different service centers of a geographically distributed cloud computing system. In the distributed cloud computing environment, if one service center becomes nonoperational or overwhelmed with service requests, another somewhat redundant (partially overlapping in terms of resources) service center can function as a backup (where yet more details are provided in the here incorporated STAN_1 patent application). The STAN_1 cloud computing system is of chunky granularity rather than being homogeneous in that local resources (cloud data centers) are more dedicated to servicing local STAN user than to seamlessly backing up geographically distant centers should the latter become overwhelmed or temporarily nonoperational.

As used herein, the term, "local data processing equipment" includes data processing equipment that is remote from the user but is nonetheless controllable by a local means available to the user. More specifically, the user (e.g., 431) may have a so-called net-computer (e.g., 431*a*) in his local possession and in the form for example of a tablet computer (see also 100 of FIG. 1A) or in the form for example of a palmtop smart cellphone/computer (see also 199 of FIG. 2) where that networked-computer is operatively coupled by wireless or other means to a virtual computer or to a virtual desktop space instantiated in one or more servers on a connected to network (e.g., the Internet 401). In such cases the user 431 may access, through operations of the relatively less-fully equipped net-computer (e.g., tablet 100 of FIG. 1A or palmtop 199 of FIG. 2, or more generally CPU-1 of FIG. 4A), the greater computing and data storing resources (hardware and/or software) available in the instantiated server(s) of the supporting cloud or other networked super-system (e.g., a system of data processing machines cooperatively interconnected by one or more networks to form a cooperative larger machine system). As a result, the user 431 is made to feel as if he has a much more resourceful computer locally in his possession (more resourceful in terms of hardware and/or software and/or functionality, any of which are physical manifestations as those terms are used herein) even though that might not be true of the physically possessed hardware and/or software. For example, the user's locally possessed net-computer (e.g., 431*a* in FIG. 4A, 100 in FIG. 1A) may not have a hard disk or a key pad but rather a touch-detecting display screen and/or other user interface means appropriate for the nature of the locally possessed net-computer (e.g., 100 in FIG. 1A) and the local context in which it is used (e.g., while driving a car and thus based more on voice-based and/or gesture-based user-to-machine interface rather than on a graphical user interface). However the server (or cloud) instantiated virtual machine or other automated physical process that services that net-computer can project itself as having an extremely large hard disk or other memory means and a versatile keyboard-like interface that appears with context variable keys by way of the user's touch-responsive display and/or otherwise interactive screen. Occasionally the term "downloading" will be used herein under the assumption that the user's personally controlled computer (e.g., 431*a*) is receiving the downloaded content. However, in the case of a net-book or the like local computer, the term "downloaded" is to be understood as including the more general notion of in- or cross-loaded, wherein a virtual computer on the network (or in a cloud computing system) is inloaded (or cross-loaded) with the content rather than having that content being "downloaded" from the network to an actual local and complete computer (e.g., tablet 100 of FIG. 1A) that is in direct possession of the user.

Of course, certain resources such as the illustrated GPS-2 peripheral part of CPU-2 (in FIG. 4A, or imbedded GPS 106 and gyroscopic (107) peripherals of FIG. 1A) may not always be capable of being operatively mimicked with an in-net or in-cloud virtual counterpart; in which case it is understood that the locally-required resource (e.g., GPS, gyroscope, IR beam source 109, barcode scanner, RFID tag reader, wireless interrogator of local-nodes (e.g., for indoor location and assets determination), user-proximate microphone(s), etc.) is a physically local resource. On the other hand, cell phone triangulation technology, RFID (radio frequency based wireless identification) technology, image recognition technology (e.g., recognizing a landmark) and/or other technologies may be used to mimic the effect of having a GPS unit although one might not be directly locally present. It is to be understood that GPS or other such local measuring, interrogating, detecting or telemetry collecting means need not be directly embedded in a portable data processing device that is hand carried or worn by the user. A portable/mobile device of the user may temporarily inherit such functionality from nearby other devices. More specifically, if the user's portable/mobile device does not have a temperature measuring sensor embedded therein for measuring ambient air temperature but the portable/mobile device is respectively located adjacent to, or between one; two or more other devices that do have air temperature measuring means, the user's portable/mobile device may temporarily adopt the measurements made by the nearby one; two or more other devices and extrapolate and/or add an estimated error indication to the adopted measurement reading based on distance from the nearby measurement equipment and/or based on other factors such as local wind velocity. The same concept substantially applies to obtaining GPS-like location information. If the user's portable/mobile device is interposed between two or more GPS-equipped, and relatively close by, other devices that it can communicate with and the user's portable/mobile device can estimate distances between itself and the other devices, then the user's portable/mobile device may automatically determine its current location based on the adopted location measurements of the nearby other devices and on an extrapolation or estimate of where the user's portable/mobile device is located relative to those other devices. Similarly, the user's portable/mobile device may temporarily co-opt other detection or measurement functionalities that neighboring devices have but it itself does not directly possess such as, but not limited to, sound detection and/or measurement capabilities, biometric data detection and/or measurement capabilities, image capture and/or processing capabilities, odor and/or other chemical detection, measurement and/or analysis capabilities and so on.

It is to be understood that the CPU-1 device (431*a*) used by first user 431 when interacting with (e.g., being tracked, monitored in real time by) the STAN_3 system 410 is not limited to a desktop computer having for example a "central" processing unit (CPU), but rather that many varieties of data processing devices having appropriate minimal intelligence capability are contemplated as being usable, including laptop computers, palmtop PDA's (e.g., 199 of FIG. 2), tablet computers (e.g., 100 of FIG. 1*a*), other forms of net-computers, including 3rd generation or higher smartphones (e.g., an iPhone™, and Android™ phone), wearable computers, and so on. The CPU-1 device (431*a*) used by first user 431 may have any number of different user interface (UI) and environment detecting devices included therein such as, but not limited to, one or more integrally incorporated webcams (one of which may be robotically aimed to focus on what off screen view the user appears to be looking at, e.g. 210 of FIG. 2), one or more integrally incorporated ear-piece and/or head-piece subsystems (e.g., Bluetooth™) interfacing devices (e.g., 201*b* of FIG. 2), an integrally incorporated GPS (Global Positioning System) location identifier and/or other automatic location identifying means, integrally incorporated accelerometers (e.g., 107 of FIG. 1) and/or other such MEMs devices (micro-electromechanical devices), various biometric sensors (e.g., vascular pulse, respiration rate, tongue protrusion, in-mouth tongue actuations, eye blink rate, eye focus angle, pupil dilation and change of dilation and rate of dilation (while taking into consideration ambient light strength and changes), body odor, breath chemistry—e.g., as may be collected and analyzed by combination microphone and exhalation sampler 201*c* of FIG. 2) that are operatively coupleable to the user 431 and so on. As those skilled in the art will appreciate from the here incorporated STAN_1 and STAN_2 disclosures, automated location determining devices such as integrally incorporated GPS and/or audio pickups and/or odor pickups may be used to determine user surroundings (e.g., at work versus at home, alone or in noisy party, near odor emitting items or not) and to thus infer from this sensing of environment and user state within that environment, the more probable current user persona (e.g., mood, frame of mind, etc.). One or more (e.g., stereoscopic) first sensors (e.g., 106, 109 of FIG. 1A) may be provided in one embodiment for automatically determining what specific off-screen or on-screen object(s) the user is currently looking at; and if off-screen, a robotically aimmable further sensor (e.g., webcam 210) may be automatically trained onto the off-screen view (e.g., 198 in FIG. 2) in order to identify it, categorize it and optionally provide a virtually-augmented presentation of that off-screen specific object (198). In one embodiment, an automated image categorizing tool such as GoogleGoggles™ or IQ_Engine™ (e.g., www.iqengines.com) may be used to automatically categorize imagery or objects (including real world objects) that the user appears to be focusing upon. The categorization data of the automatically categorized image/objects may then be used as an additional "encoding" and hint presentations for assisting the STAN_3 system 410 in determining what topic or finite set (e.g., top 5) of topics the user (e.g., 431) currently most probably has in focus within his or her mind given the detected or presumable context of the user.

It is within the contemplation of the present disclosure that alternatively or in addition to having an imaging device near the user and using an automated image/object categorizing tool such as GoogleGoggles™, IQ_Engine™, etc., other encoding detecting devices and automated categorizing tools may be deployed such as, but not limited to, sound detecting, analyzing and categorizing tools; non-visible light band detecting, analyzing, recognizing and categorizing tools (e.g., IR band scanning and detecting tools); near field apparatus identifying communication tools, ambient chemistry and temperature detecting, analyzing and categorizing tools (e.g., What human olfactorable and/or unsmellable vapors, gases are in the air surrounding the user and at what changing concentration levels?); velocity and/or acceleration detecting, analyzing and categorizing tools (e.g., Is the user in a moving vehicle and if so, heading in what direction at what speed or acceleration?); gravitational orientation and/or motion detecting, analyzing and categorizing tools (e.g., Is the user titling, shaking or otherwise manipulating his palmtop device?); and virtually-surrounding or physically-surrounding other people detecting, analyzing and categorizing tools (e.g., Is the user in virtual and/or physical contact or proximity with other personas, and if so what are their current attributes?).

Each user (e.g., 431, 432) may project a respective one of different personas and assumed roles (e.g., "at work" versus "at play" persona, where the selected persona may then imply a selected context) based on the specific environment (including proximate presence of other people virtually or physically) that the user finds him or herself in. For example, there may be an at-the-office or at-work-site persona that is different from an at-home or an on-vacation persona and these may have respectively different habits, routines and/or personal expression preferences due to corresponding contexts. (See also briefly the context identifying signal 316*o* of FIG. 3D which will detailed below. Most likely context may be identified in part based on user selected persona.) More specifically, one of the many selectable personas that the first user 431 may have is one that predominates in a specific real and/or virtual environment 431*e*2 (e.g., as geographically detected by integral GPS-2 device of CPU-2 and/or as socially detected by a connected/nearby others detector). When user 431 is in this environmental context (431*e*2), that first user 431 may choose to identify him or herself with (or have his CPU device automatically choose for him/her) a different user identification (UAID-2, also 431*u*2) than the one utilized (UAID-1, also 431*u*1) when typically interacting in real time with the STAN_3 system 410. A variety of automated tools may be used to detect, analyze and categorize user environment (e.g., place, time, calendar date, velocity, acceleration, surroundings—physically or virtually nearby objects and/or nearby people and their respectively assumed roles, etc.). These may include but are not limited to, webcams, IR Beam (IRB) face scanners, GPS locators, electronic time keeper, MEMs, chemical sniffers, etc.

When operating under this alternate persona (431*u*2), the first user 431 may choose (or pre-elect) to not be wholly or partially monitored in real time by the STAN_3 system (e.g., through its CFi, CVi or other such monitoring and reporting mechanisms) or to otherwise not be generally interacting with the STAN_3 system 410. Instead, the user 431 may elect to log into a different kind of social networking (SN) system or other content providing system (e.g., 441, . . . , 448, 460) and to fly, so-to-speak, STAN-free inside that external platform 441—etc. While so interacting in a free-of-STAN mode with the alternate social networking (SN) system (e.g., FaceBook™, MySpace™, LinkedIn™, YouTube™, Google- Wave™, ClearSpring™, etc.), the user may develop various types of user-to-user associations (U2U, see block 411) unique to that outside-of-STAN platform. More specifically, the user 431 may develop a historically changing record of newly-made "friends"/"frenemys" on the FaceBook™ platform 441 such as: recently de-friended persons, recently allowed-behind the private wall friends (because they are more trusted) and so on. The user 431 may develop a historically changing record of newly-made live-video chat buddies on the FaceBook™ platform 441. The user 431 may develop a historically changing record of newly-made 1st degree "contacts" on the LinkedIn™ platform 444, newly joined groups and so on. The user 431 may then wish to import some of these outside-of-STAN-formed user-to-user associations (U2U) to the STAN_3 system 410 for the purpose of keeping track of what topics in one or more topic spaces 413 (or other nodes in other spaces) the respective friends, non-friends, contacts, buddies etc. are currently focusing-upon in either a direct 'touching' manner or through indirect heat 'touching'. Importation of user-to-user association (U2U) records into the STAN_3 system 410 may be done under joint import/export agreements as between various platform operators or via user transfer of records from an external platform (e.g., 441) to the STAN_3 system 410.

Referring next, and on a brief basis to FIG. 1A (more details are provided later below), shown here is a display screen 111 of a corresponding tablet computer 100 on whose touch-sensitive screen 111 there are displayed a variety of machine-instantiated virtual objects. Although the illustrated example has but one touch-sensitive display screen 111 on which all is displayed, it is within the contemplation of the present disclosure for the computer 100 (a.k.a. first data processing device usable by a corresponding first user) to be operatively coupleable by wireless and/or wired means to one or more auxiliary displays and/or auxiliary user-to-machine interface means (e.g., a large screen TV with built in gesture recognition and for which the computer 100 appears to act as a remote control). Additionally, while not shown in FIG. 1A, it will become clearer below that the illustrated computer 100 is operatively couplable to a point(s)-of-attention modeling system (e.g., in-cloud STAN server(s)) that has access to signals (e.g., CFi's) representing attention indicative activities of the first user (at what is the user focusing his/her attentions upon?). Moreover, it is to be understood that the visual information outputting function of display screen 111 is but one way of presenting (outputting) information to the user and that it is within the contemplation of the present disclosure to present (output) information to the user in additional or alternative ways including by way of sound (e.g., voice and/or tones and/or musical scores) and/or haptic means (e.g., variable Braille dots for the blind and/or vibrating or force producing devices that communicate with the user by means of different vibrations and/or differently directed force applications).

In the exemplary illustration, the displayed objects of screen 111 are clustered into major screen regions including a major left column region 101 (a.k.a. first axis), a topside and hideable tray region 102 (a second axis), a major right column region 103 (a third axis) and a bottomside and hideable tray region 104 (a fourth axis). The corners at which the column and row regions 101-104 meet also have noteworthy objects. The bottom right corner (first axes crossing—of axes 103 and 104) contains an elevator tool 113 which can be used to travel to different virtual floors of multi-storied virtual structure (e.g., building). Such a multi-storied virtual structure may be used to define a virtual space within which the user virtually travels to get to virtual rooms or virtual other areas having respective combinations of invitation presenting trays and/or such tools. (See also briefly, FIG. 1N.) The upper left corner (second axes crossing) of screen 111 contains an elevator floor indicating tool 113*a* which indicates which virtual floor is currently being visited (e.g., the floor that automatically serves up in area 102 a set of opportunity serving plates labeled as the Me and My Friends and Family Top Topics Now serving plates). In one embodiment, the floor indicating tool 113*a* may be used to change the currently displayed floor (for example to rapidly jump to the User-Customized Help Grandma floor of FIG. 1N). The bottom left corner (third axes crossing) contains a settings tool 114. The top right corner (fourth axes crossing—of axes 102 and 103) is reserved for a status indicating tool 112 that tells the user at least whether monitoring by the STAN_3 system is currently active or not, and if so, optionally what parts of his/her screen(s) and/or activities are being monitored (e.g., full screen and all activities versus just one data processing device, just one window or pane therein and/or just certain filter-defined activities). The center of the display screen 111 is reserved for centrally focused-upon content that the user will usually be focusing-upon (e.g., window 117, not to scale, and showing in subportions (e.g., 117*a*) thereof content related to an eBook Discussion Group that the user belongs to). It is to be understood that the described axes (102-104) and axes crossings can be rearranged into different configurations.

Among the objects displayed in the left column area 101 are urgency valued or importance valued ones that collectively define a sorted list of social entities or groups thereof, such as "My Family" 101*b* (valued in this example as second most important/relevant after the "Me" entity 101*a*) and/or "My Friends" 101*c* (valued in this example as third in terms of importance/urgency after "Me" and after "My Family") where the represented social entities and their positionings along the list are pre-specified by the current user of the device 100 or accepted as such by the user after having been automatically recommended by the system.

The topmost social entity along the left-side vertical column 101 (the sorted list of now-important/relevant social entities) is specially denoted as the current King-of-the-Hill Social Entity (e.g., KoH="Me" 101*a*) while the person or group representing objects disposed below the current King-of-the-Hill (101*a*) are understood to be subservient to or secondary relative to the KOH object 101*a* in that certain categories of attributes painted-on or attached to those subservient objects (101*b*, 101*c*, etc.) are inherited from the KOH object 101*a* and mirrored onto the subservient objects or attachments thereof. (The KOH object may alternatively be called the Pharaoh of the Pyramids for reasons soon to become apparent.) Each of the displayed first items (e.g., social entity representing items 101*a*-101*d*) may include one or both a correspondingly displayed label (e.g., "Me") and a correspondingly displayed icon (e.g., up-facing disc). Alternatively or additionally, the presentation of the first items may come by way of voice presentation. Different ones of the presented first items may have unique musical tones and/or color tones associated with them, where in the case of the display being used, the corresponding musical tones and/or color tones are presented as the user hovers a cursor or the like over the item.

Figure 1D:
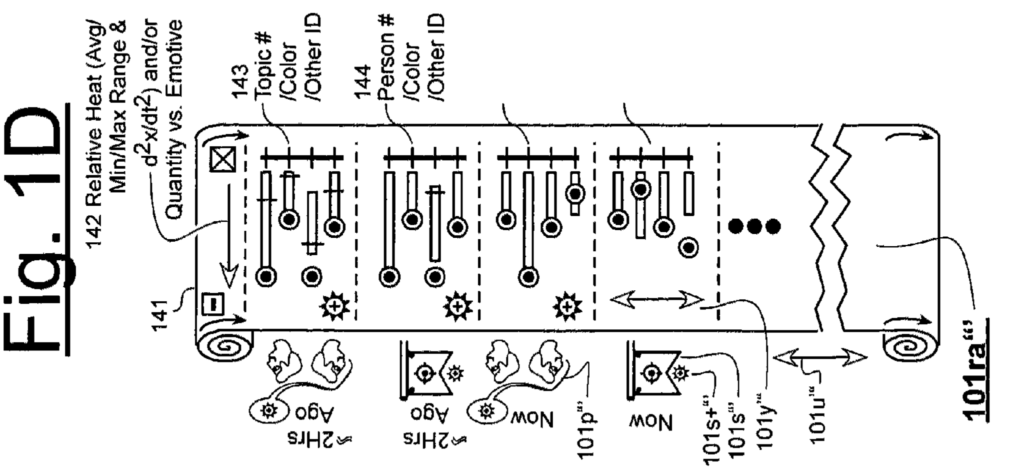
FIG. 1D shows in greater detail, another way of displaying current or previous heats as a function of time and of personas or groups involved and/or of topic nodes (or nodes/subregions of other spaces) involved.
Figure 1C:
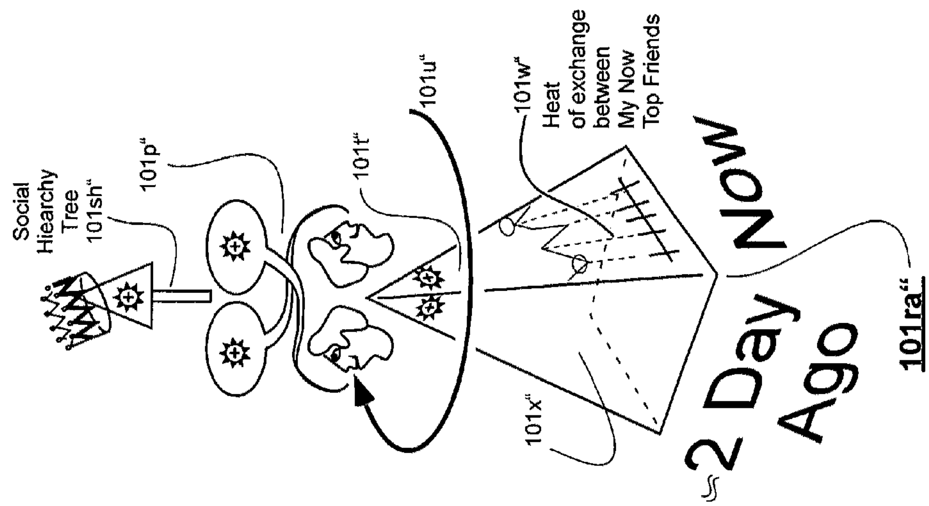
FIG. 1C shows in greater detail, another multi-dimensional and rotatable "heats" indicating construct that may be used in the radar display column of FIG. 1A where the illustrated heats indicating construct is indicative of intensity of discussion or other data exchanges as may be occurring between pairs of persons or groups of persons (SPE's) when using the STAN_3 system.
Figure 1B:
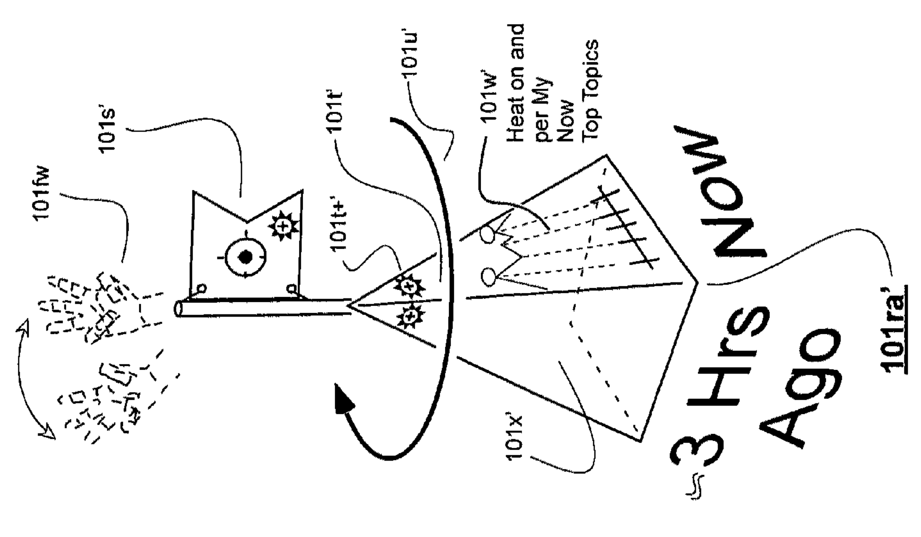
FIG. 1B shows in greater detail, a multi-dimensional and rotatable "current heats" indicating construct that may be used in a so-called, SPEIS radar display column of FIG. 1A where the illustrated heats indicating construct is indicative of intensity of current focus (or earlier timed focus) on certain topic nodes of the STAN_3 system by certain SPE's (Social/Persona Entities) who are context wise related to a top-of-column SPE (e.g., "Me")

In terms of more specifics, and referring also to FIG. 1B, adjacent to the KOH object 101*a* of the first vertical axis 101 of FIG. 1A there may be provided along a second vertical axis 101*r*, a corresponding status reporting pyramid 101*ra* belonging to the KOH object 101*a*. Displayed on a first face of that status-reporting pyramid 101*ra* are a set of painted histogram bars denoted as Heat of My Top 5 Now Topics (see 101*w*' of FIG. 1B). It is understood that each such histogram bar corresponds to a respective one of a Top 5 Now (being-now-focused-upon) Topics of the King-of-the-Hill Social Entity (e.g., KoH="Me" 101*a*) and it reports on a "heat" attribute (e.g., attentive energies) cast by the row's social entity with regard to that topic. The mere presence of the histogram bar indicates that attention is being cast by the row's social entity with regard to the bar's associated topic. The height of the bar (and/or another attribute thereof) indicates how much attention. The amount of attention can have numerous sub-attributes such as emotional attention, deep neo-cortical thinking attention, physical activity attention (i.e., keeping one's eyes trained on content directed to the specific topic) and so on.

From usage of the system, it becomes understood to users of the system that the associated topic of each such histogram bar on the attached status pyramid (e.g., 101*rb* in FIG. 1A) of a subservient social entity (101*b*, 101*c*, etc.) corresponds in category mirroring fashion to a respective one of the Top 5 Now (being-focused-upon) Topics of the KOH. In other words, it is not necessarily a top-now-topic of the subservient social entity (e.g., 101*b*), but rather it is a top-now topic of the King-of-the-Hill (KOH) Social Entity 101*a*.

Therefore, if the social entity identified as "Me" by the top item of column 101 is King-of-the-Hill and the Top 5 Now Topics of "Me" are represented by bars on a face of the KOH's adjacent reporting pyramid 101*ra*, the same Top 5 Now Topics of "Me" will be represented by (mirrored by) respective locations of bars on a corresponding face of subservient reporting pyramids (e.g., 101 rb). Accordingly, with one quick look, the user can see what Top 5 Now Topics of "Me" (if "Me" is the KOH) are also being focused-upon (if at all), and if so with what "heat" (emotional and/or otherwise) by associated other social entities (e.g., by "My Family" 101*b*, by "My Friends" 101*c* and so on).

The designation of who is currently the King-of-the-Hill Social Entity (e.g., KoH="Me" 101*a*) can be indicated by means other than or in addition to displaying the KOH entity object 101*a* at the top of first vertical column 101. For example, KOH status may be indicated by displaying a virtual crown (not shown) on the entity representing object (e.g., 101*a*) who is King and/or coloring or blinking the KOH entity representing object 101*a* differently and so on. Placement at the top of the stack 101 is used here as a convenient way of explaining the KOH concept and also explaining the concept of a sorted array of social entities whose positional placement is based on the user's current valuation of them (e.g., who is now most important, who is most urgent to focus-upon, etc.). The user's data processing device 100 may include a 'Help' function (activated by right clicking to activate, or otherwise activating a context sensitive menu 111*a*) that provides detailed explanation of the KOH function and the sorted array function (e.g., is it sorting its items 101*a*-10*d* based on urgency, based on importance or based on some other metrics?). Although for sake of an easiest to understand example, the "Me" disc 101*a* is disposed in the KOH position, the representative disc of any other social entity (individual or group), say, "My Others" 101*d* can instead be designated as the KOH item, placed on top, and then the Top 5 Now Topics of the group called "My Others" (101*d*) will be mirrored onto the status reporting pyramids of the remaining social entity objects (including "Me") of column 101. The relative sorting of the secondary social entities relative to the new KoH entity will be based on what the user of the system (not the KoH) thinks it should be. However, in one embodiment, the user may ask the system to sort the secondary social entities according to the way the KoH sorts those items on his computer.

Although FIG. 1A shows the left vertical column 101 (first vertical array) as providing a sorted array of disc objects 101*a*-101*d* representing corresponding social entities, where these are sorted according to different valuation criteria such as importance of relation or urgency of relation or priority (in terms for example of needing attention by the user), it is within the contemplation of the present disclosure to have the first vertical column 101 provide a sorted array of corresponding first items representing other things; for example things associated with one or more prespecified social entities; and more specifically, projects or other to-do items associated with one or more social entities. Yet more specifically, the chosen social entity might be "Me" and then the first vertical column 101 may provides a sorted array of first items (e.g., disc objects) representing work projects attributed to the "Me" entity (e.g., "My Project#1", "My Project#2", etc.—not shown) where the array is sorted according to urgency, priority, current financial risk projections or other valuations regarding relative importance and timing priorities. As another example, the sorted array of disc-like objects in the first vertical column 101 might respectively represent, in top down order of display, first the most urgent work project assigned to the "Me" entity, then the most urgent work project assigned to the "My Boss" entity, and then the most urgent work project associated with the "His Boss" entity. At the same time, the upper serving tray 102 (first horizontal axis) may serve up chat or other forum participation opportunities corresponding to keywords, URL's etc. associated with the respective projects, where any of the served up participation opportunities can be immediately seized upon by the user double clicking or otherwise opening up the opportunity-representing icon to thereby immediately display the underlying chat or other forum participation session.

According to yet another variation (not shown), the arrayed first items 101*a*-101*d* of the first vertical column 101 may respectively represent different versions of the "Me" entity; as such for example "Me When at Home" (a first context); "Me When at Work" (a second context); "Me While on the Road" (a third context); "Me While Logged in as Persona#1 on social networking Platform#2" (a fourth context) and so on.

In one embodiment, the sorted first array of disc objects 101*a*-101*d* and what they represent are automatically chosen or automatically offered to be chosen based on an automatically detected current context of the device user. For example, if the user of data processing device 100 is detected to be at his usual work place (and more specifically, in his usual work area and at his usual work station), then the sorted first array of disc objects 101*a*-101*d* might respectively represent work-related personas or work-related projects. In an alternate or same embodiment, the sorted array of disc objects 101*a*-101*d* and what they represent can be automatically chosen or automatically offered to be chosen based on the current Layer-Vator™ floor number (as indicated by tool 113*a*). In an alternate or same embodiment, the sorted array of disc objects 101*a*-101*d* and what they represent can be automatically chosen or automatically offered to be chosen based on current time of day, day of week, date within year and/or current geographic location or compass heading of the user or his vehicle and/or scheduled events in the user's computerized calendar files.

Returning to the specific example of the items actually shown to be arrayed in first vertical column 101 of FIG. 1A and looking here at yet more specific examples of what such social entity objects (e.g., 101*a*-101*d*) might represent, the displayed circular disc denoted as the "My Friends"-representing object 101*c* can represent a filtered subset of a current user's FaceBook™ friends, where identification records of those friends have been imported from the corresponding external platform (e.g., 441 of FIG. 4A) and then optionally further filtered according to a user-chosen filtering algorithm (e.g., just include all my trusted, behind the wall friends of the past week who haven't been de-friended by me in the past 2 weeks). Additionally, the "My Friends" representing object 101*c* is not limited to picking friends from just one source (e.g., the FaceBook™ platform 441 whose counterpart is displayed as platform representing object 103*b* at the far right side 103 of the screen 111). A user can slice and dice and mix individual personas or other social entities (standard groups or customized groups) from different sources; for example by setting "My Friends" equal to My Three Thursday Night Bowling Buddies plus my trusted, behind the wall FaceBook™ friends of the past week. An EDIT function provided by an on-screen menu 111*a* includes tools (not shown) for allowing the user to select who or what social entity or entities will be members of each user-defined, social entity-representing or entities-representing object (e.g., discs 101*a*-101*d*). The "Me" representing object 101*a* does not, for example, have to represent only the device user alone (although such representation is easier to comprehend) and it may be modified by the EDIT function so that, for example, "Me" represents a current online persona of the user's plus one or more identified significant others (SO's, e.g., a spouse) if so desired. Additional user preference tools (114) may be employed for changing how King-of-the-Hill (KOH) status is indicated (if at all) and whether such designation requires that the KOH representing object (e.g., the "Me" object 101*a*) be placed at the top of the stack 101. In one embodiment, if none of the displayed social entity representing objects 101*a*-101*d* in the left vertical column 101 is designated as KOH, then topic mirroring is turned off and each status-reporting pyramid 101*ra*-101*rd* (or pyramids column 101*r*) reports a "heat" status for the respective Top 5 Now Topics of that respective social entity. In other words, reporting pyramid 101*rd* then reports the "heat" status for the Top 5 Now Topics of the social group entity identified as "My Others" and represented by object 101*d* rather than showing "heat" cast by "My Others" on the Top 5 Now Topics of the KOH (the King-of the-Hill). The concept of "cast heat", incidentally, will be explained in more detail below (see FIGS. 1E and 1F). For now, it may be thought of as indicating how intensely in terms of emotions or otherwise, the corresponding social entity or social group (e.g., "My Others" 101*d*) is currently focusing-upon or paying attention to each of the identified topics even if the corresponding social entity is not consciously aware of his or her paying prime attention to the topic per se.

As may be appreciated, the current "heat" reporting function of the status reporting objects in column 101*r* (they do not have to be pyramids) provides a convenient summarizing view, for example, for: (1) identifying relevant social-associates of the user (e.g., "Me" 101*a*), (2) for indicating how those socially-associated entities 101*b*-101*d* are grouped and/or filtered and/or prioritized relative to one another (e.g., "My Friends" equals only all my trusted, behind the wall friends of the past week plus my three bowling buddies); (3) for tracking some of their current activities (if not blocked by privacy settings) in an adjacent column 101*r* by indicating cross-correlation with the KOH's Top 5 Now Topics or by indicating "heat" cast by each on their own Top 5 Now Topics if there is no designated KOH.

Although in the illustrated example, the subsidiary adjacent column 101*r* (social radars column) indicates what top-5 topics of the entity "Me" (101*a*) are also being focused-upon in recent time periods (e.g., now and 15 minutes ago, see faces 101*t* and 101*x* of magnified pyramid 101*rb* in FIG. 1A) and to what extent (amount of "heat") by associated friends or family or other social entities (101*b*-101*d*), various other kinds of status reports may be provided at the user's discretion. For example, the user may wish to see what the top N topics were (where N does not have to be 5) last week, or last month of the respective social entities. By way of another example, the user may wish to see what top N URL's and/or keywords were 'touched' upon by his relevant social entities in the last 6, 12, 24, 48 or other number of hours. ("Keywords" are generally understood here to mean the small number of words used for submitting to a popular search engine tool for thereby homing in on and identifying content best described by such keywords. "Content", on the other hand, may refer to a much broader class of presentable information where the mere presentation of such information does not mean that a user is focusing-upon all of it or even a small sub-portion of it. "Content" is not to be conflated with "Topic". A presented collection of content could have many possible topics associated with it.)

Focused-upon "topics" or topic regions are merely one type of trackable thing or item represented in a corresponding Cognitive Attention Receiving Space (a.k.a. "CARS") and upon which users may focus their attentions upon. As used herein, trackable targets of cognition (codings or symbols representing underlying and different kinds of cognitions) have, or have newly created for them, respective data objects uniquely disposed in a corresponding data-objects organizing space, where data signals representing the data objects are stored within the system. One of the ways to uniquely dispose the data objects is to assign them to unique points, nodes or subregions of the corresponding Cognitive Attention Receiving Space (e.g., Topic Space) where such points, nodes, or subregions may be reported on (as long as the to-be-tracked users have given permission that allows for such monitoring, tracking and/or reporting). As will become clearer, the focused-upon top-5 topics, as exemplified by pyramid face 101*t* in FIG. 1A, are further represented by topic nodes and/or topic regions defined in a corresponding one or more of topic space defining database records (e.g., area 413 of FIG. 4A) maintained and/or tracked by the STAN_3 system 410. A more rigorous discussion of topic nodes, topic regions, pure and hybrid topic spaces will be provided in conjunction with FIGS. 3D-3E, 3R-3Ta and 3Tb and others as the present disclosure unfolds below.

In the simplified example of introductory FIG. 1A, the user of tablet computer 100 (FIG. 1A) has selected a selectable persona of himself (e.g., 431*u*1) to be used as the head entity or "mayor" (or "King-'o-Hill", KoH, or Pharaoh) of the social entities column 101. The user has selected a selectable set of attributes to be reported on by the status reporting objects (e.g., pyramids) of reporting column 101*r* where the selected set of attributes correspond to a topic space usage attributes such as: (a) the current top-5 focused-upon topics of mine, (b) the older top N topics of mine, (c) the recently most "hot" (heated up) top N' topics of mine, and so on. The user of tablet computer 100 (FIG. 1A) has elected to have one or more such attributes reported on in substantially real time in the subsidiary and radar-like tracking column 101*r* disposed adjacent to the social entities listing column 101. The user has also selected an iconic method (e.g., pyramids) by way of which the selected usage attributes will be displayed. It will be seen in FIG. 1D that a rotating pyramid is not the only way.

It is to be understood here that the illustrated screen layout of introductory FIG. 1A and the displayed contents of FIG. 1A are merely exemplary and non-limiting. The same tablet computer 100 may display other Layer-Vator (113) reachable floors or layers that have completely different layouts and contain different on-screen objects. This will be clearer when the "Help Grandma" floor is later described as an example in conjunction with FIG. 1N. Moreover, it is to be understood that, although various graphical user interfaces (GUI's) and/or screen touch, swipe click-on, etc. activating actions are described herein as illustrative examples, it is within the contemplation of the disclosure to use user interfaces other than or in addition to GUI's and screen haptic interfacing; these including, but not being limited to; (1) voice only or voice-augmented interfaces (e.g., provided through a user worn head set or earpiece (i.e. a BlueTooth™ compatible earpiece—see FIG. 2); (2) sight-independent touch/tactile interfaces such as those that might be used by visually impaired persons; (3) gesture recognition interfaces such as those where a user's hand gestures and/or other body motions and/or muscle tensionings or relaxations are detected by automated means and converted into computer-usable input signals; and so on; (4) wrist, arm, leg, finger, toe action recognition interfaces such as those where a user wears a wristwatch like device or an instrumented arm bracelet or an ankle bracelet or an elastic arm band or an instrumented shoe or an instrumented glove or instrumented other garments (or a flexible thin film circuit attached to the user) and the worn device includes acceleration-detecting, location-detecting, temperature-detecting, muscle activation-detecting, perspiration-detecting or like means (e.g., in the form of a MEMs chip) for detecting user body part motions, states, or tensionings or heatings/coolings and means for reporting the same to a corresponding user interface module. More specifically, in one embodiment, the user wears a wrist watch that has a BlueTooth™ interface embedded therein and allows for screen data to be sent to the watch from a host (e.g., as an SMS message) and allows for short replies to be sent from the watch back to the BlueTooth™ host, where here the illustrated tablet computer 100 operates as the BlueTooth™ host and it repeatedly queries the wrist watch (not shown) to respond with telemetry for one or more of detected wrist accelerations, detected wrist locations, detected muscle actuations and detected other biometric attributes (e.g., pulse, skin resistance).

In one variation, the insides of a user's mouth are instrumented such that movement of the tip of the tongue against different teeth and/or the force of contact by the tongue against teeth and/or other in-mouth surfaces are used to signal conscious or subconscious wishes of the user. More specifically, the user may wear a teeth-covering and relatively transparent mouth piece that is electronically and/or optically instrumented to report on various inter-oral cavity activities of the user including teeth clenchings, tongue pressings and/or fluid moving activities where corresponding reporting signals are transmitted to the user's local data processing device for possible inclusion in CFi reporting signals, where the latter can be used by the STAN_3 system to determine levels of attentiveness by the user relative to various focused-upon objects.

In one embodiment, the user alternatively or additionally wears an instrumented necklace or such like jewelry piece about or under his/her neck where the jewelry piece includes one or more, embedded and forward-pointing video cameras and a wireless short range transceiver for operatively coupling to a longer range transceiver provided nearby. The longer range transceiver couples wirelessly and directly or indirectly to the STAN_3 system. In addition to the forward pointing digital camera(s), the jewelry piece includes a battery means and one or more of sound pickups, biological state transducers, motion detecting transducers and a micro-mirrors image forming chip. The battery means may be repeatedly recharged by radio beams directed to it and/or by solar energy when the latter is available and/or by other recharging means. The embedded biological state transducers may detect various biological states of the wearer such as, but not limited to, heart rate, respiration rate, skin galvanic response, etc. The embedded motion detecting transducers may detect various body motion attributes of the wearer such as being still versus moving and if moving, in what directions and at what speeds and/or accelerations and when. The micro-mirrors image forming chip may be of a type such as developed by the Texas Instruments™ Company which has tiltable mirrors for forming a reflected image when excited by an externally provided, one or more laser beams. In one embodiment, the user enters an instrumented area that includes an automated, jewelry piece tracking mechanism having colored laser light sources within it as well as an optional IR or UV beam source. If an image is to be presented to the user, a tactile buzzer included in the necklace alerts him/her and indicates which way to face so that the laser equipped tracking mechanism can automatically focus in upon the micro-mirrors based image forming device (surrounded by target patterns) and supply excitational laser beams safely to it. The reflected beams form a computer generated image that appears on a nearby wall or other reflective object. Optionally, the necklace may include sound output devices or these can be separately provided in an ear-worn BlueTooth™ device or the like.

Informational resources of the STAN_3 system may be provided to the so-instrumented user by way of the projected image wherever a correspondingly instrumented room or other area is present. The user may gesture to the STAN_3 system by blocking part of the projected image with his/her hand or by other means and the necklace supported camera sees this and reports the same back to the STAN_3 system. In one embodiment, the jewelry piece includes two embedded video cameras pointing forward at different angles. One camera may be aimed at a wall mounted mirror (optionally an automatically aimed one which is driven by the system to track the user's face) where this mirror reflects back an image of the user's head while the other camera may be aimed at projected image formed on the wall by the laser beams and the micro-mirrors based reflecting device. Then the user's facial grimaces may be automatically fed back to the STAN_3 system for detecting implicit or explicit voting expressions as well as other user reactions or intentional commands (e.g., tongue projection based commands). In one embodiment, the user also wears electronically driven shutter and/or light polarizing glasses that are shuttered and/or variably polarized in accordance with an over-time changing pattern that is substantially unique to the user. The on-wall projected image is similarly modulated such that only the spectacles-wearing user can see the image intended for him/her. Therefore, user privacy is protected even if the user is in a public instrumented area. Other variations are of course possible, such as having the cameras and image forming devices placed elsewhere on the user's body (e.g., on a hat, a worn arm band near the shoulder, etc.). The necklace may include additional cameras and/or other sensors pointing to areas behind the user for reporting the surrounding environment to the STAN_3 system.

Referring still to the illustrative example of FIG. 1A and also to a further illustrative example provided in corresponding FIG. 1B, the user is assumed in this case to have selected a rotating-pyramids visual-radar displaying method for presenting the selected usage attribute(s) (e.g., heat per my now top 5 topics as measured in at least two time periods—two simultaneously showing faces of a pyramid). Here, the two faces of a periodically or sporadically revolving or rotationally reciprocating pyramid (e.g., a pyramid having a square base, and whose rotations are represented by circular arrow 101_u_') are simultaneously seen by the user. One face 101_w_' graphs so-called temperature or heat attributes of his currently focused-upon, top-N topics as determined over a corresponding time period (e.g., a predetermined duration such as over the last 15 minutes). That first period is denoted as "Now". The other face 101_x_' provides bar graphed temperatures of the identified top topics of "Me" for another time period (e.g., a predetermined duration such as between 2.5 hours ago and 3.5 hours ago) which in the example is denoted as "3 Hours Ago". The chosen attributes and time periods can vary according to user editing of radar options in an available settings menu. While the example of FIG. 1B displays "heat" per topic node (or per topic region), it is within the contemplation of the present disclosure to alternatively or additionally display "heat" per keyword node (or per keyword region in a corresponding keyword space, where the latter concept is detailed below in conjunction with FIG. 3E) and to alternatively or additionally display "heat" per hybrid node (or per hybrid region in a corresponding hybrid space, where the latter concept is also detailed below in conjunction with FIG. 3E). Although a rotating pyramid having an N-sided base (e.g., N=3, 4, 5, . . . ) is one way of displaying graphed heats, such "heat" temperatures or other user-selectable attributes for different time periods and/or for different user-touchable sub-spaces that include but are not limited to: not only 'touched' topic zones, but alternatively or additionally: touched geographic zones or locations, touched context zones, touched habit zones, touched social dynamic zones and so on of a specified user (e.g., the leader or KoH entity), it is also within the contemplation of the present disclosure to instead display such things on respective faces of other kinds of M-faced rotating polyhedrons (where M can be 3 or more, including very large values for M if so desired). These polyhedrons can rotate about different axes thereof so as to display in one or more forward winding or backward winding motions, multiple ones of such faces and their respective attributes.

It is also within the contemplation of the present disclosure to use a scrolling reel format such as illustrated in FIG. 1D where the displayed reel winds forwards or backwards and occasionally rewinds through the graph-providing frames of that reel 101_ra_'''. In one embodiment, the user can edit what will be displayed on each face of his revolving polyhedron (e.g., 101_ra_'' of FIG. 1C) or in each frame of the winding reel (e.g., 101_ra_''' of FIG. 1D) and how the polyhedron/reeled tape will automatically rotate or wind and rewind. The user-selected parameters may include for example, different time ranges for respective time-based faces, different topics and/or different other 'touchable' zones of other spaces and/or different social entities whose respective 'touchings' are to be reported on. The user-selected parameters may additionally specify what events (e.g., passage of time, threshold reached, desired geographic area reached, check-in into business or other establishment or place achieved, etc.) will trigger an automated rotation to, and a showing off of a given face or tape frame and its associated graphs or its other metering or mapping mechanisms.

In FIGS. 1A, 1B, 1D as well as in others, there are showings of so-called, affiliated space flags (101_s_, 101_s_', 101_s_'''). In general, these affiliated space flags indicate a corresponding one or more of system maintained, data-object organizing spaces of the STAN_3 mechanism which spaces can include a topics space (TS—see 313'' of FIG. 3D), a content space (CS—see 314'' of FIG. 3D), a context space (XS—see 316'' of FIG. 3D), a normalized CFi categorizing space (where normalization is described below—see 302'' and 298'' of FIG. 3D), and other Cognitive Attention Receiving Spaces—a.k.a. "CARS's" and/or other Cognition-Representing Objects Organizing Spaces—a.k.a. "CROOS's". Each affiliated space flag (e.g., 101_s_, 101_s_', etc.) can be displayed as having a respective one or more colors, shape and/or glyphs presented thereon for identifying its respective space. For example, the topic-space representing flags may have a target bull's eye symbol on them. If a user control clicks or otherwise activates the affiliated space flag (e.g., 101_s_' of FIG. 1B), a corresponding menu (not shown) pops open to provide the user with more information about the represented space and/or a represented sub-region of that space and to provide the user with various search and/or navigation functions relating to the represented space. One of the menu-provided options allows the user to pop open a local map of a represented topic space region (TSR) where the map can be in a hierarchical tree format (see for example 185_b_ of FIG. 1G—"You are here in TS") or the map can be in a terraced terrain format (see for example plane 413' of FIG. 4D).

Incidentally, as used herein, the term "Cognition-Representing Objects Organizing Space" (a.k.a. CROOS) is to be understood as referring to a more generic form of the species, "Cognitive Attention Receiving Space" (a.k.a. CARS) where both are data-objects organizing spaces represented by data objects stored in system memory and logically inter-linked or otherwise organized according to application-specific details. When a person (e.g., a system user) gives conscious attention to a particular kind of cognition, say to a textual cognition; which cognition can more specifically be directed to a search-field populating "keyword" (which could be a simultaneous collection or a temporal clustering of keywords), then as a counterpart machine operation, a representing portion of a counterpart, conscious Cognition Attention Receiving Space (CARS) should desirably be lit up (focused-upon) in a machine sense to reflect a correct modeling of a lighting up of (energizing of) the corresponding cognition providing region in the user's brain that is metabolically being lit up (energized) when the user is giving conscious attention to that particular kind of cognition (e.g., re a "keyword"). Similarly, when a system user gives conscious attention to a question like, "What are we talking about?" and to its answer ("What are we talking about?"), that is referring to what in the machine counterpart system would be a lighting up of (e.g., activation of) a counterpart point, node or subregion in a system-maintained topic space (TS). Some cognitions however, do not always receive conscious attention. An example might be how a person subconsciously parses (syntactically disambiguates) a phonetically received sentence (e.g., "You too/two[?] should see/sea[?] to it[?]") and decodes it for semantic sense. That often happens subconsciously. At least one of the data-objects organizing spaces discussed herein (FIG. 3V) will be directed to that aspect and the machine-implemented data-objects organizing space that handles that aspect is referred to herein as a Cognition-Representing Objects Organizing Space (a.k.a. CROOS) rather than as a Cognitive Attention Receiving Space (a.k.a. CARS).

The present disclosure, incidentally, does not claim to have discovered how to, nor does it endeavor to represent cognitions within the human mind down to the most primitive neuron and synapse actuations. Instead, and as shall be detailed below, a so-called, primitive expressions (or symbols or codings) layer is contemplated within which is stored machine codes representing corresponding expressions, symbols or codings where the latter represent a meta-level of human cognition, say for example, a semantic sense of what a particular text string (e.g., "Lincoln") represents. The meta-level cognitions can be combined in various ways to build yet more complex representations of cognitions (e.g., "Lincoln" plus "Abraham"; or "Lincoln" plus "Nebraska"; or "Lincoln" plus "Car Dealership"). Although it is not an absolute requirement of the present disclosure, preferably, the primitive expressions storing (and clustering) layer is a communally created and communally updated layer containing "clusterings" of expressions, symbols or codings where a relevant community of users implicitly determines what cognitive sense each such expression or clustering of expressions represents, where legacy "clusterings" of expressions, etc. are preserved and yet new "clusterings" of such expressions, etc. can be added or inserted as substitutes as community sentiments change with regard to such adaptively updateable, expressions, codings, or other symbols that implicitly represent underlying cognitions. More specifically, and as a brief example, prior to September 2011, the expression string" "911" may have most likely invoked the cognitive sense in a corresponding community of a telephone number that is to be dialed In Case of Emergency (ICE). However, after said date, the same expression string" "911" may most likely invoke the cognitive sense in a corresponding community of an attack on the World Trade Center in New York City.

For that brief example, an embodiment in accordance with the present disclosure would seek to preserve the legacy cognitive sense while at the same supplanting it with the more up to date cognitive sense. Details of how this can be done are provided later below.

Still referring to FIGS. 1A-1D, some affiliated space flags, such as for example the specially shaped flag 101*sh*" topping the pyramid 101*ra*" of FIG. 1C provide the user with expansion tool (e.g., starburst+) access to a corresponding Cognitive Attention Receiving Space (CARS) or to a corresponding Cognition-Representing Objects Organizing Space (a.k.a. CROOS) directed to social dynamics as may be developing between two or more people or groups of people. (The subject of social dynamics will be explored in greater detail later, in conjunction with FIG. 1M.) For sake of intuitively indicating to the user that the pyramid 101*ra*" relates to interpersonal dynamics, an icon 101*p*" showing two personas and their intertwined discourses may be displayed under the affiliated space flag 101*sh*". If the user clicks or otherwise activates the expansion tool (e.g., starburst+) disposed inside the represented dialog of the one of the represented people (or groups), addition information about the person (or group) and his/her/their current dialogs is automatically provided. In one embodiment, in response to activating the dialog expansion tool (e.g., starburst+), a system maintained profile of the represented persona or group is displayed (where persona does not necessarily mean the real life (ReL) person and/or his/her real life identity and real life demographic details but could instead mean an online persona with limited information about that online identity).

Additionally, in one embodiment and in response to activating the dialog expansion tool (e.g., starburst+), a current thread of discourse by the respective persona is displayed, where the thread typically is one inside an on-topic chat or other forum participation session for which a "heat of exchange" indication 101*w*" is displayed on the forward turned (101*u*") face (e.g., 101*t*" or 101*x*") of the heat displaying pyramid 101*ra*". Here the "heat of exchange" indication 101*w*" is not showing "heat" cast by a single person on a particular topic but rather heat of exchange as between two or more personas as it may relate to any corresponding point, node or subregion of a respective Cognitive Attention Receiving Space where the later could be topic space (TS) for example, but not necessarily so. Expansion of the social dynamics tree flag 101*sh*" will show how social dynamics between the hotly involved two or more personas (e.g., debating persons) is changing while the "heat of exchange" indications 101*w*" will show which amount of exchange heat and activation of the expansion tool (e.g., starburst+) on the face (e.g., 101*t*") of the pyramid will indicate which topic or topics (or points, nodes or subregions (a.k.a. PNOS's) of another Cognitive Attention Receiving Space) are receiving the heat of the heated exchange between the two or more persons. It may be that there is no one or more points, nodes or subregions receiving such heat, but rather that the involved personas are debating or otherwise heatedly exchanging all over the map. In the latter case, no specific Cognitive Attention Receiving Space (e.g., topic space) and regions thereof will be pinpointed.

If the user of the data processing device of FIG. 1A wants to quickly spot when heated exchanges are developing as between for example, which two or more of his friends as it may or may not relate to one or more of his currently Top 5 Now Topics, the user may command the system to display a social heats pyramid like 101*ra*" (FIG. 1C) in the radar column 101*r* of FIG. 1A as opposed to displaying a heat on specific topic pyramid such as 101*ra*' of FIG. 1B. The difference between pyramid 101*ra*" (FIG. 1C) and pyramid 101*ra*' (FIG. 1B) is that the social heats pyramid (of FIG. 1C) indicates when a social exchange between two or more personas is hot irrespective of topic (or it could be limited to a specified subset of topics) whereas the on-topic pyramid (e.g., of FIG. 1B) indicates when a corresponding point, node or subregion of topic space (or another specified Cognitive Attention Receiving Space) is receiving significant "heat" irrespective of whether or not a hot multi-person exchange is taking place. Significant "heat" may be cast for example upon a topic node even if only one persona (but a highly regarded persona, e.g., a Tipping Point Person) is casting the heat and such would show up on an on-topic pyramid such as 101*ra*' of FIG. 1B but not on a social heats pyramid such as that of FIG. 1C. On the other hand, two relatively non-hot persons (e.g., not experts) may be engaged in a hot exchange (e.g., a heated debate) that shows up on the social heats pyramid of FIG. 1C but not on the on-topic pyramid 101*ra*' of FIG. 1B. The user can select which kind of radar he wants to see.

Referring to FIG. 1D, the radar like reporting tool are not limited to pyramids or the like and may include the illustrated, scrollable (101*u*''') reel 101*ra*''' of frames where each frame can have a different space affiliation (e.g., as indicated by affiliated space flag 101*s*''') and each frame can have a different width (e.g., as indicated by within-frame scrolling tool 101*y*''' and each frame can have a different number of heat or other indicator bars or the like within it. As was the case elsewhere, each affiliated space flag (e.g., 101*s*''') can have its own expansion tool (e.g., starburst+) 101*s*+''' and each associated frame can have its own expansion tool (e.g., starburst+) so that more detailed information and/or options for each can be respectively accessed. The displayed heats may be social exchange heats as is indicated by icon 101*p*''' of FIG. 1D rather than on-topic heats. The non-heat axis (e.g., 144 of FIG. 1D) may represent different persons of pairs of persons rather than specific topics. The different persons or groups of exchanging persons may be represented by different colors, different ID numbers and so on. In the case of per topic heats, the corresponding non-heat axis (e.g., 143 of FIG. 1D) may identify the respective topic (or other point, node or subregion of a different Cognitive Attention Receiving Space) by means of color and/or ID number and/or other appropriate means (e.g., glowing an adjacent identification glyph when the bar is hovered over by a cursor or equivalent). A vertical axis line 142 may be provided with attached expansion tool information (starburst+ not shown) that indicates specifically how the heats of a focused-upon frame are calculated. More details about possible methods of heat calculation will be provided below in conjunction with FIG. 1F. A control portion 141 of the reel may include tools for advancing the reel forward or rewinding it back or shrinking its unwound length or minimizing (hiding) it.

In summary, when a user sees an affiliated space flag (e.g., 101*s*') atop an attributes mapping pyramid (e.g., 101 *ra*' of FIG. 1B) or attached (e.g., 101*s*''' of FIG. 1D) to a reeled frame, the user can often quickly tell from looking at the flag, what data-object organizing space (e.g., topic space) is involved, or if not, the flag may indicate another kind of heat mapping; such as for example one relating to heat of exchange between specified persons rather than with regard to a specific topic. On each face of a revolving pyramid, or alike polyhedron, or back and forth winding tape reel (141 of FIG. 1D), etc., the bar graphed (or otherwise graphed) and so-called, temperature parameter (a.k.a. 'heat' magnitude) may represent any of a plurality of user-selectable attributes including, but not limited to, degree and/or duration of focus on a topic or on a topic space region (TSR) or on another space node or space sub-region (e.g., keywords space, URL's space, etc) and/or degree of emotional intensity detected as statistically normalized, averaged, or otherwise statistically massaged for a corresponding social entity (e.g., "Me", "My Friend", "My Friends" (a user defined group), "My Family Members", "My Immediate Family" (a user defined or system defined group), etc.) and optionally as the same regards a corresponding set of current top N now nodes of the KOH entity 101*a* designated in the social entities column 101 of FIG. 1A.

In addition to displaying the so-called "heats" cast by different social entities on respective topic or other nodes, the exemplary screen of FIG. 1A provides a plurality of invitation "serving plates" disposed on a so-called, invitations serving tray 102. The invitations serving tray 102 is retractable into a minimized mode (or into mostly off-screen hidden mode in which only the hottest invitations occasionally protrude into edges of the screen area) by clicking or otherwise activating Hide tool 102*z*. In the illustrated example, invitations to chat or other forum participation sessions related to the current top 5 topics of the head entity (KoH) 101*a* are found in compacted form on a current top topics serving plate (or listing) 102*a*Now displayed as being disposed on the top serving tray 102 of screen 111. If the user hovers a cursor or other pointer object over a compacted invitations object such as over circle 102*i*, a de-compacted invitations object such as 102J pops out. In one embodiment, the de-compacted invitations object 102J appears as a 3D, inverted Tower of Hanoi set of rings, where the largest top rings represent the newest, hottest invitations and the lower, smaller and receding toward disappearance rings represent the older, growing colder invitations for a same topic subregion. In other words, there is a continuous top to bottom flow of invitation-representing objects directed to respective subregions of topic space. The so de-compacted invitations object 102J not only has its plurality of stacked and emerging or receding rings, but also a starburst-shaped center pole and a darkened outer base disc platform. Hovering or clicking or otherwise activating these different concentric areas (rings, center post, base) of the de-compacted invitations object 102J provides further functions; including immediately popping open one or more topic-related chat or other forum participation opportunities (not shown in FIG. 1A, but see instead the examples 113*c*, 113*d*, 113*e* of FIG. 1I). In one embodiment, when hovering over a de-compacted invitations object such as a Tower of Hanoi ring in the 3D version of 102J or its more compacted seed 102*i*, a blinking of a corresponding spot is initiated in playgrounds column 103. The playgrounds column 103 displays a set of platform-representing objects, 103*a*, 103*b*, . . . , 103*d* to which the corresponding chat or other forum participation sessions belong. More specifically, if one of the chat rooms; for which a join-now invitation (e.g., a Tower of Hanoi Like ring) is available, is maintained by the STAN_3 system, then the corresponding STAN3 playground object 103*a* will blink, glow or otherwise make itself apparent. Alternatively or additionally a translucent connection bridge 103*i* will appear as extending between the playground representing icon 103*a* and the de-compacted invitations object 102J that holds an invitation for immediately joining in on an online chat belonging to that playground 103*a*. Thus a user can quickly see which platform an invitation belongs to without actually accepting the invitation. More specifically, if one of the invited-to-it forum opportunities (e.g., Tower of Hanoi Like rings) belongs to the FB playground 103*b*, then that playground representing object 103*b* will glow and a corresponding translucent connection bridge 103*k* will appear as extending between the FB playground 103*b* and the de-compacted invitations object 102J. The same holds true for playground representing objects 103*c* and 103*d*. Thus, even before popping open the forum(s) of an invitations-serving object like 102J or 102*i*, the user can quickly find out what one or more playgrounds (103*a*-103*d*) are hosting corresponding chat or other forum participation sessions relating to the corresponding topic (the topic of bubble 102*i*).

Throughout the present disclosure, a so-called, starburst+ expansion tool is depicted as a means for obtaining more detailed information. Referring for example to FIG. 1B and more specifically to the "Now" face 101*w*' of that pyramid 101*ra*', at the apex of that face there is displayed a starburst+ expansion tool 101*t*+'. By clicking or otherwise activating there, the user activates a virtual magnifying or details-showing and unpacking function that provides the user with an enlarged and more detailed view of the corresponding object and/or object feature (e.g., pyramid face) and its respective components. It is to be understood that in FIGS. 1A-1D as well as others, a plus symbol (+) inside of a star-burst icon (e.g., 101*t*+' of FIG. 1B or 99+ of FIG. 1A) indicates that such is a virtual magnification/unpacking invoking button tool which, when activated (e.g., by clicking or otherwise activating) will cause presentation of a magnified or expanded-into-more detailed (unpacked) view of the object or object portion. The virtual magnification button may be activated by on-touch-screen finger taps, swipes, etc. and/or other activation techniques (e.g., mouse clicks, voice command, toe tap command, tongue command against an instrumented mouth piece, etc.). Temperatures, as a quantitative indicator of cast "heat"; may be represented as length or range of the displayed bar in bar graph fashion and/or as color or relative luminance of the displayed bar and/or flashing rate of a blinking bar where the flashing may indicate a significant change from last state and/or an above-threshold value of a determined "heat" value (e.g., emotional intensity) associated with the now-"hot" item. These are merely non-limiting examples. Incidentally, in FIG. 1A, embracing hyphens (e.g., those at the start and end of a string like: −99+−) are generally used around reference numbers to indicated that these reference symbols are not displayed on the display screen 111.

Still referring to FIG. 1B, in one embodiment, a special finger waving flag 101*fw* may automatically pop out from the top of the pyramid (or reel frame if the format of FIG. 1D is instead used) at various times. The popped out finger waving flag 101*fw* indicates (as one example of various possibilities) that the tracked social entity has three out of five of commonly shared topics (or other types of nodes) with the column leader (e.g., KoH='Me') where the "heats" of the 3 out of 5 exceed respective thresholds or exceed a predetermined common threshold. The heat values may be represented by translucent finger colors, red being the hottest for example. In other words, such a 2-fingered, 3, 4, etc. fingered wave of a virtual hand (e.g., 101*fw*) alerts the user that the corresponding non-leader social entity (could be a person or a group) is showing above-threshold heat not just for one of the current top N topics of the leader (of the KoH), but rather for two or more, or three or more shared topic nodes or shared topic space regions (TSR's—see FIG. 3D), where the required number of common topics and level of threshold crossing for the alerting hand 101*fw* to pop up is selected by the user through a settings tool (114) and, of course, the popping out of the waving hand 101*fw* may also be turned off if the user so desires. The exceeding-threshold, m out of n common topics function may be provided not only for the alert indication 101*fw* shown in FIG. 1B, but also for similar alerting indications (not shown) in FIG. 1C, in FIG. 1D and in FIG. 1K. The usefulness of such an m out of n common topics indicating function (where here m<n and both are whole numbers) will be further explained below in conjunction with later description of FIG. 1K. Basically, when another user is currently focused-upon a plurality of same or similar topics as is the first user, they are more likely to have much in common with each other as compared to a users who have only one topic node in common with one another.

Referring back to the left side of FIG. 1A, it is to be assumed that reporting column 101*r* is repeatedly changing (e.g., periodically being refreshed). Each time the header (leader, KoH, Pharaoh's) pyramid 101*ra* (or another such "heat" and/or commonality indicating means) rotates or otherwise advances to a next state to thus show a different set of faces thereof, and to therefore show (in one embodiment) a different set of cross-correlated time periods or other context-representing faces; or each time the header object 101*ra* partially twists and returns to its original angle of rotation, the follower pyramids 101*rb*-101*rd* (or other radar objects) below it will follow suite (but perhaps with slight time delay to show that they are mirroring followers, not leaders who define their own top N topics). At this time of pyramid rotation, the displayed faces of each pyramid (or other radar object) are refreshed to show the latest temperature or heats data for the displayed faces (or displayed frames on a reel; 101*ra*''' of FIG. 1D) and optionally where a predetermined threshold level has been crossed by the displayed heat or other attribute indicators (e.g., bar graphs). As a result, the user (not shown in 1A, see instead 201A of FIG. 2) of the tablet computer 100 can quickly see a visual correlation as between the top topics of the header entity 101*a* (e.g., KoH="Me") and the intensity with which other associated social entities 101*b*-101*d* (e.g., friends and family) are also focusing-upon those same topic nodes (top topics of mine) during a relevant time period (e.g., Now versus X minutes ago or H hours ago or D days ago). In cases where there is a shared large amount of 'heat' with regard to more than one common topic, the social entities that have such multi-topic commonality of concurrently large heats (e.g., 3 out of 5 are above-threshold per for example, what is shown on face 101*w*' of FIG. 1B); such may be optionally flagged (e.g., per waving hand object 101*fw* of FIG. 1B) as deserving special attention by the user. Incidentally, the header entity 101*a* (e.g., KoH="Me") does not have to be the user of the tablet computer 100. Also, the time periods reported by the respective faces of the KoH pyramid 101*ra* do not have to be the same as the time periods reported by the respective faces (e.g., 101*t*, 101*x* of follower pyramid 101*rb*) of the subservient pyramids 101*rb*-101*rd*. It is possible that the KoH=Me entity just began this week to focused-upon topics 3 through 5 with great intensity (large "heat") whereas two of his early adapter friends were already focused-upon topic 4 two weeks ago (and maybe they have moved onto a brand new topic number 6 this week). Nonetheless, it may be useful to the user to learn that his followed early adapters (e.g., "My Followed Tipping Point Persons"—not explicitly shown in FIG. 1A, could be disc 101*d*) were hot about that same one or more topics two weeks ago. Accordingly, while the follower pyramids may mirror the KoH (when a KoH is so anointed) in terms of tracked topic nodes and/or tracked topic space regions (TSR) and/or tracked other nodes/subregions of other spaces; they do not necessarily mirror the time periods of the KoH reporting object (101*ra*) in an absolute sense (although they may mirror in a relative sense by having two pyramid faces that are about H hours apart or about D days apart and so on).

The tracked social entities of left column 101 do not necessarily have to be friends or family or other well-liked or well-known acquaintances of the user (or of the KoH entity; not necessarily same as the user). Instead of being persons or groups whom the user admires or likes, they can be social entities whom the user despises, or feels otherwise about, or which the first user never knew before, but nonetheless the first user wishes to see what topics are currently deemed to be the "topmost" and/or "hottest" for that user-selected header entity 101*a* (where KoH is not equal to "Me") and further social entities associated with that user-selected KoH entity. Incidentally, in one embodiment, when the user selects a new KoH entity (e.g., new KoH="Charlie"), the system automatically presents the user with a set of options: (a) Don't change the other discs in column 101; (b) Replace the current discs 101*b*-101*d* in column 101 with a first set of "Charlie"-associated other entity discs (e.g., "Charlie's Family", "Charlie's Friends", etc.); (c) Replace the current discs 101*b*-101*d* in column 101 with a second set of "Charlie"-associated other entity discs (e.g., "Charlie's Workplace Colleagues", etc.) and (d) Replace the current discs 101*b*-101*d* in column 101 with a new third set that the user will next specify. Thus, by changing the designated KoH entity, the user may not only change the identification of the currently "hot" topics whose heats are being watched, but the user may also change, by substantially the same action, the identifications of the follower entities 101*b*-101*d*.

While the far left side column 101 of FIG. 1A is social-entity "centric" in that it focuses on individual personas or groups of personas (or projects associated with those social entities), the upper top row 102 (a.k.a. upper serving tray) is topic "centric" in one sense and, in a more general way, it can be said to be 'touched'-space centric because it serves up information about what nodes or subregions in topic space (TS); or in another Cognitive Attention Receiving Space (e.g., keyword space (KS)) have been "touched" by others or should be (are automatically recommended by the system to be) "touched" by the user. The term, 'touching' will be explained in more detail later below. Basically, there are at least two kinds of 'touching', direct and indirect. When a STAN_3 user "touches" a node or subregion (e.g., a topic node (TN) or a topic region (TSR)) of a given, system-supported "space", that 'touching' can add to a heat count associated with the node or subregion. The amount of "heat", its polarity (positive or negative), its decay rate and so on may depend on who the toucher(s) is/are, how many touchers there are, and on the intensity with which each toucher virtually "touches" that node or subregion (directly or indirectly). In one embodiment, when a node is simultaneously 'touched' by many highly ranked users all at once (e.g., users of relatively high reputation and/or of relatively high credentials and/or of relatively high influencing capabilities), it becomes very "hot" as a result of enhanced heat weights given to such highly ranked users.

In the exemplary case of FIG. 1A, the upper serving tray 102 is shown to be presenting the user with different sets of "serving plates" (e.g., 102*a*Now, 102*a*'Earlier, . . . , 102*b* (Their Top 5), etc.). As will become more apparent below, the first set 102*a* of "serving plates" relate to topics which the "Me" entity (101*a*) has recently been focused-upon with relatively large "heat". Similarly, the second set 102*b* of "serving plates" relate to topics which a "Them" entity (e.g., My Friends 101*c*) has recently been focused-upon with relatively large "heat". Ellipses 102*c* represent yet other upper tray "serving plates" which can correspond to yet other social entities (e.g., My Others 101*d*) and, in one specific case, the topics which those further social entities have recently been focusing-upon with relatively large "heat" (where here, 'recently' is a relative term and could mean 1 year ago rather than 1 hour ago). However, in a more generic sense, the further "serving plates" represented by ellipses 102*c* can correspond to generic nodes or subregions (e.g., in keyword space, context space, etc.) which those further social entities have recently been 'touching' upon with relatively large amounts of "heat". (It is also within the contemplation of the disclosure to report on nodes or subregions that have been 'touched' by respective social entities with minimal or zero "heat" although, often, that information is of limited interest.)

In one embodiment, the changing of designation of who (what social entity) is the KoH 101*a* automatically causes the system to present the user with a set of upper-tray modification options: (a) Don't change the serving plates on tray 102; (b) Replace the current serving plates 102*a*, 102*b*, 102*c* in row 102 with a first set of "Charlie"-associated other serving plates (e.g., "Charlie's Top 5 Now Topics", "Charlie's Family's Top 5 Now Topics", etc. where here the KoH is being changed from being "Me" to being "Charlie"); (c) Replace the current serving plates 102*a*, 102*b*, 102*c* in row 102 with a second set of "Charlie"-associated other serving plates (e.g., "Top N now topics of Charlie's Workplace Colleagues", "Top M now keywords being used by Charlie's Workplace Colleagues", etc.); and (d) Replace the current serving plates 102*a*, 102*b*, 102*c* in row 102 with a new third set of serving plates that the user will next specify. Thus, by changing the designated KoH entity, the user may not only change the identification of the currently "hot" topics (or other "hot" nodes) whose heats are being watched in reporting column 101*r*, but the user may also change, by substantially the same action, the identifications of the serving plates in the upper tray area 102 and the nature of the "touched" or to-be-"touched" items that they will serve up (where those "touched" or to-be-"touched" items can come in the form of links to, or invitations to, chat or other forum participation sessions that are "on-topic" or links to suggested other kinds of content resources that are deemed to be "on-topic" or links to, or invitations to, chat or other forum participation sessions or other resources that are deemed to be well cross-correlated with other types of 'touched' nodes or subregions (e.g., "Top M now keywords being used by Charlie's Workplace Colleagues"). At the same time the upper tray items 102*a*-102*c* are being changed due to switching of the KoH entity, the identifications of the corresponding follower entities 101*b*-101*d* may also be changed.

The so-called, upper serving plates 102*a*, 102*b*, 102*c*, etc. of the upper serving tray 102 (where 102*c* and the extendible others which may be accessible for enlarged viewing with use of a viewing expansion tool (e.g., clicking or otherwise activating the 3 ellipses 102*c*)). These upper serving plates are not limited to showing (serving up) an automatically determined set of recently 'touched' and "hot" nodes or subregions such as a given social entities' top 5 topics or top N topics (where N can be a number other than 5 here, and where automated determination of the recently 'touched' and "hot" nodes or subregions in a selected space (e.g., topic space) can be based on predetermined knowledge base rules). Rather, the user can manually establish how many 'touched'-topics or to-be-'touched'/recommended topics serving plates 102*a*, 102*b*, etc. (if any) and/or other 'touched'/recommended node serving plates (e.g., "Top U now URL's being hyperlinked to by Charlie's Workplace Colleagues",—not shown) will be displayed on the "hot" nodes or hot space subregions serving tray 102 (where the tray can also serve up "cold" items if desired and where the serving tray 102 can be hidden or minimized (via tool 102*z*)). In other words, instead of relying on system-provided templates (recommended) for determining which topic or collection of topics will be served up by each "hot" now topics serving plate (e.g., 102*a*), the user can use the setting tools 114 to establish his own, custom tailored, serving rules and corresponding plates or his own, custom tailored, whole serving trays where the items served up on (or by) such carriers can include, but are not limited to, custom picked topic nodes or subregions and invitations to chat or other forum participation sessions currently or soon to be tethered to such topic nodes and/or links to other on-topic resources suggested by (linked to by and rated highly by) such topic nodes. Alternatively or additionally, the user can use the setting tools 114 to establish his own, custom tailored, serving plates or whole serving trays where the items served on such carriers can include, but are not limited to, custom picked keyword nodes or subregions, custom picked URL nodes or subregions, or custom picked points, nodes or subregions (a.k.a. PNOS's) of another Cognitive Attention Receiving Space. The topics on a given topics serving plate (e.g., 102*a*) do not have to be related to one another, although they could be (and generally should be for ease of use).

Incidentally, the term, "PNOS's" is used throughout this disclosure as an abbreviation for "points, nodes or subregions". Within that context, a "point" is a data object of relatively similar data structure to that of a corresponding "node" of a corresponding Cognitive Attention Receiving Space or Cognitions-representing Space (e.g., topic space) except that the "point" need not be part of a hierarchical tree structure whereas a "node" is often part of a hierarchical, data-objects organizing scheme. Accordingly, the data structure of a PNOS "point" is to be understood as being substantially similar to that of a corresponding "node" of a corresponding Cognitions-representing Space except that fields for supporting the data object representing the "point" do not need to include fields for specifying the "point" as an integral part of a hierarchical tree structure and such fields may be omitted in the data structure of the space-sharing "point". A "subregion" within a given Cognitions-representing Space (e.g., a CARS or Cognitive Attention Receiving Space) may contain one or more nodes and/or one or more "points" belonging to its respective Cognitions-representing Space. A Cognitions-representing Space may be comprised of hierarchically interrelated "nodes" and/or spatially distributed "points" and/or both of such data structures. A "node" may be spatially positioned within its respective Cognitions-representing Space as well as being hierarchically positioned therein.

The term, "cognitive-sense-representing clustering center point" also appears numerous times within the present disclosure. The term, "cognitive-sense-representing clustering center point" (or "center point" for short) as used herein is not to be confused with the PNOS type of "point". Cognitive-sense-representing clustering center points (or COGS's for short) are also data structures similar to nodes that can be hierarchically and/or spatially distributed within a corresponding hierarchical and/or spatial data-objects organizing scheme of a given Cognitions-representing Space except that, at least in one embodiment, system users are not empowered to give names to such center points (COGS's) and chat room or other forum participation sessions do not directly tether to such COGS's and such COGS's do not directly point to informational resources associated with them (with the COGS's) or with underlying cognitive senses associated with the respective and various COGS's. Instead, a COGS (a single cognitive-sense-representing clustering center point) may be thought of as if it were a black hole in a universe populated by topic stars, subtopic planets and chat room spaceships roaming there about to park temporarily in orbit about one planet and then another (or to loop figure eight style or otherwise simultaneously about plural topic planets). Each COGS provides a clustering-thereto cognitive sense kind of force much like the gravitational force of a real world astronomical black hole provides an attracting-thereto gravitational force to nearby bodies having physical mass. One difference though, is that users of the at least one embodiment can vote to move a cognitive-sense-representing clustering center point (COGS) from one location to another within a Cognitions-representing Space (or a subregion there within) that they control. When a COGS moves, the points, nodes or subregions (PNOS's) that were clustered about it do not automatically move. Instead the relative hierarchical and/or spatial distances between the unmoved PNOS's and the displaced COGS change. That change indicates how close in a cognitive sense the PNOS's are deemed to be relative to an unnamed cognitive sense represented by the displaced COGS and vice versa. Just as in the physical astronomical realm where it is not possible (according to current understandings) to see what lies inward of the event horizon of a black hole, according to one aspect of the present disclosure, it is generally not permitted to directly define the cognitive sense represented by a COGS. Instead the represented cognitive sense is inferred from the PNOS's that cluster about and nearby to the COGS. That inferred cognitive sense can change as system users vote to move (e.g., drift) the nearby PNOS's to newer ones of hierarchical and/or spatial locations, thereby changing the corresponding hierarchical and/or spatial distances between the moved PNOS's and the one or more COGS that derive their inferred cognitive senses from their neighboring PNOS's. The inferred cognitive sense can also change if system users vote to move the COGS rather than moving the one or more PNOS's that closely neighbor it. A COGS may have additional attributes such substitutability by way of re-direction and expansion by use of expansion pointers. However, such discussion is premature at this stage of the disclosure and will be picked up much later below. (See for example and very briefly the discussion re COGS 30W.7*p* of FIG. 3W.)

In one embodiment, different organizations of COGS's may be provided as effective for different layers of cognitive sentiments. More specifically, one layer of cognitive sentiments may be attributed to so-called, central or main-stream ways of thinking by the system user population while a second such layer of cognitive sentiments may be attributed to so-called, left wing extremist ways of thinking and yet a third such layer may be attributed to so-called, right wing extremist ways of thinking (this just being one possible set of examples). If a first user (or first persona) who subscribes to main-stream way of thinking logs in, the corresponding central or main-stream layer of accordingly organized COGS's is brought into effect while the second and third are rendered ineffective. On the other hand, if the logging-in first persona self-identifies him/herself as favoring the left wing extremist ways of thinking, then the second layer of accordingly organized COGS's is brought into effect while the first and third layers are rendered ineffective. Similarly, if the logging-in first persona self-identifies him/herself as favoring the right wing extremist ways of thinking, then the third layer of accordingly organized COGS's is brought into effect while the first and second layers are rendered ineffective. In this way, each sub-community of users, be they left-winged, middle of the road, or right winged (or something else) can have the topical universe presented to them with cognitive-sense-representing clustering center points being positioned in that universe according to the confirmation biasing preferences of the respective user. As mentioned, the left versus right versus middle of the road mindsets are merely examples and it is within the contemplation of the present disclosure to have more or other forms of multiple sets of activatable and deactivatable "layers" of differently organized COGS's where one or more such layers are activated (brought into effect) for a given one mindset and/or context of a respective user. In one embodiment, different governance bodies of respective left, right or other mindsets are given control over the hierarchical and/or spatial postionings of the COGS's of their respectively activatable layers where the controlled postionings are relative to the hierarchically and/or spatially organized points, nodes or subregions (PNOS's) of topic space and/or of another applicable, Cognitions-representing Space. In one embodiment, the respective governance bodies of respective Wikipedia™ like collaboration projects (described below) are given control over the postionings of the COGS's that become effective for their respective B level, C level or other hierarchical tree (described below) and/or semi-privately controlled spatial region within a corresponding Cognitions-representing Space.

In one embodiment, in addition to having the so-called, cognitive-sense-representing clustering center points (COGS's) around which, or over which, points, nodes or subregions (PNOS's) of substantially same or similar cognitive sense may cluster, with calculated distance being indicative of how same or similar they in accordance with a not necessarily articulated sense, it is within the contemplation of the present disclosure to have cognitive-sense-representing clustering lines, or curves or closed circumferences where PNOS-types of points, nodes or subregions disposed on a one such line, curve or closed circumference share a same cognitive sense and PNOS's distanced away from such line, curve or closed circumference are deemed dissimilar in accordance with the spacing apart distance calculated along a normal drawn from the spaced apart PNOS to the line, curve of circumference. In one embodiment, and yet alternatively or additionally, so-called, repulsion and/or exclusion center points, lines, curves or closed circumferences may be employed where PNOS-types of points, nodes or subregions are repulsed from (according to a decay factor) and/or are excluded from occupying a part of hierarchical and/or spatial space occupied by a respective, repulsion and/or exclusion type of center point, line, curve or closed circumference. The repulsion and/or exclusion types of boundary defining entities may be used to coerce the governance bodies who control placement of PNOS-types of points, nodes or subregions to distribute their controlled PNOS's more evenly within different bands of hierarchical and/or spatial space rather than clumping all such controlled PNOS's together. For example, if concentric exclusion circles are defined, then governance bodies are coerced into placing their controlled PNOS's into one of several concentric bands or another rather than organizing them as one unidifferentiated clump in the respective Cognitions-representing Space.

The topic of COGS, PNOS's, repulsion bands and so forth was raised here because the term PNOS's has been used a number of times above without giving it more of definition and this juncture in the disclosure presented itself as an opportune time to explain such things. The discussion now returns to the more mundane aspects of FIG. 1A and the displayed objects shown therein. Column 101 of FIG. 1A was being described prior to the digression into the topics of PNOS's, COGS and so on.

Referring to FIG. 1A, one or more editing functions may be used to determine who or what the header entity (KoH) 101*a* is; and in one embodiment, the system (410) automatically changes the identity of who or what is the header entity 101*a* at, for example, predetermined intervals of time (e.g., once every 10 minutes) or when special events take place so that the user is automatically supplied over time with a variety of different radar scope like reports that may be of interest. When the header entity (KoH) 101*a* is automatically so changed, the leftmost topics serving plate (e.g., 102*a*) is automatically also changed to, for example, serve up a representation of the current top 5 topics of the new KoH (King of the Hill) 101*a*. As mentioned above, the selection of social entity representing objects in left vertical column 101 (or projects or other attributes cross-correlated with those social entities) including which one will serve as KOH (if there is a KoH) can automatically change based on one or more of a variety of triggering factors including, but not limited to, the current location, speed and direction of facing or traveling of the user, the identity of other personas currently known to the user (or believed by the user) to be in Cognitive Attention Giving Relation to the user based on current physical proximity and/or current online interaction with the user, by the current activity role adopted by the user (user adopted context) and also even based on the current floor that the Layer-Vator™ 113 has virtually brought the user to.

The ability to track the top-N topic(s) that the user and/or other social entity is now focused-upon (giving cognitive attention to) or has earlier focused-upon is made possible by operations of the STAN_3 system 410 (which system is represented for example in FIG. 4A as optionally including cloud-based and/or remote-server based and database based resources). These operations include that of automatically determining the more likely topics currently deemed to be on the minds of (receiving most attention from) logged-in STAN users by the STAN_3 system 410. Of course each user, whose topic-related temperatures are shown via a radar mechanism such as the illustrated revolving pyramids 101*ra*-101*rd*, is understood to have a-priori given permission (or double level permissions—explained below) in one way or another to the STAN_3 system 410 to share such information with others. In one embodiment, each user of the STAN_3 system 410 can issue a retraction command that causes the STAN_3 system to erase all CFi's and/or CVi's collected from that user in the last m minutes (e.g., m=2, 5, 10, 30, 60 minutes) and to erase from sharing, topical information regarding what the user was doing in the specified last m minutes (or an otherwise specified one or more blocks or ranges of time; e.g. from yesterday at 2 pm until today at 1 pm). The retraction command can be specific to an identified region of topic space instead of being global for all of topic space. (Or it can be alternatively or additionally be directed to other or custom picked points, nodes or subregions of other Cognitive Attention Receiving Spaces.) In this way, if the user realizes after the fact that what he/she was focusing-upon is something they do not want to have shared, they can retract the information to the extent it has not yet been seen by, or captured by others.

In one embodiment, each user of the STAN_3 system 410 can control his/her future share-out attributes so as to specify one or more of: (1) no sharing at all; (2) full sharing of everything; (3) limited sharing to a limited subset of associated other users (e.g., my trusted, behind-the-wall friends and immediate family); (4) limited sharing as to a limited set of time periods; (5) limited sharing as to a limited subset of areas on the screen 111 of the user's computer; (6) limited sharing as to limited subsets of identified regions in topic space; (7) limited sharing as to limited subsets of identified regions in other Cognitive Attention Receiving Spaces (CARs); (8) limited sharing based on specified blockings of identified points, nodes or regions (PNOS's) in topic space and/or other Cognitive Attention Receiving Spaces; (9) limited sharing based on the Layer-Vator™ (113) being stationed at one of one or more prespecified Layer-Vator™ floors, (10) limited sharing as to limited subsets of user-context identified by the user, and so on. If a given second user has not authorized sharing out of his attribute statistics, such blocked statistics will be displayed as faded out, grayed out screen areas or otherwise indicated as not available areas on the radar icons column (e.g., 101*ra*' of FIG. 1B) of the watching first user. Additionally, if a given second user is currently off-line, the "Now" face (e.g., 101*t*' of FIG. 1B) of the radar icon (e.g., pyramid) of that second user may be dimmed, dashed, grayed out, etc. to indicate the second social entity is not online. If the given second user was off-line during the time period (e.g., 3 Hours Ago) specified by the second face 101*x*' of the radar icon (e.g., pyramid) of that second user, such second face 101*x*' will be grayed out. Accordingly, the first user may quickly tell whom among his friends and family (or other associated social entities) was online when (if sharing of such information is permitted by those others) and what interrelated topics (or other types of points, nodes or subregions) they were focused-upon during the corresponding time period (e.g., Now versus 3 Hrs. Ago). In one embodiment, an encoded time graph may be provided showing for example that the other social entity was offline for 30 minutes of the last 90 minute interval of today and offline for 45 minutes of a 4 hour interval of the previous day. Such addition information may be useful in indicating to the first user, how in tune the second social entity probably is with regard to current events that unfolded in the last hour or last few days. If a second user does not want to share out information about when he/she is online or off, no pyramid (or other radar object) will be displayed for that second user to other users. (Or if the second user is a member of group whose group dynamics are being tracked by a radar object, that second user will be treated as if he or she not then participating in the group, in other words, as if he/she is offline because he/she does not want to then share.) If a pyramid is a group representing one, it can show an indicator that four out of nine people are online, for example by providing on the bottom of the pyramid a line graph like the following that indicates 4 people online, 5 people offline: (4on/5off): ☺ ☺ ☺ ☺ | x x x x x". If desired, the graphs can be more detailed to show how long and/or with what emotional intensities the various online or offline entities are/were online and/or for how long they in their current offline state.

Not all of FIG. 4A has been described thus far. That is because there are many different aspects. This disclosure will be ping ponging between FIGS. 1A and 4A as the interrelation between them warrants. With regard to FIG. 4A, it has already been discussed that a given first user (431) may develop a wide variety of user-to-user associations and corresponding U2U records 411 will be stored in the system based on social networking activities carried out within the STAN_3 system 410 and/or within external platforms (e.g., 441, 442, etc.). Also the real person user 431 may elect to have many and differently identified social personas for himself which personas are exclusive to, or cross over as between two or more social networking (SN) platforms. For example, the user 431 may, while interacting only with the MySpace™ platform 442 choose to operate under an alternate ID and/or persona 431*u*2—i.e. "Stewart" instead of "Stan" and when that persona operates within the domain of external platform 442, that "Stewart" persona may develop various user-to-topic associations (U2T) that are different than those developed when operating as "Stan" and under the usage monitoring auspices of the STAN_3 system 410. Also, topic-to-topic associations (T2T), if they exist at all and are operative within the context of the alternate SN system (e.g., 442) may be different from those that at the same time have developed inside the STAN_3 system 410. Additionally, topic-to-content associations (T2C, see block 414) that are operative within the context of the alternate SN system 442 may be nonexistent or different from those that at the same time have developed inside the STAN_3 system 410. Yet further, Context-to-other attribute(s) associations (L2/(U/T/C), see block 416) that are operative within the context of the alternate SN system 442 may be nonexistent or different from those that at the same time have developed inside the STAN_3 system 410. It can be desirable in the context of the present disclosure to import at least subsets of user-to-user association records (U2U) developed within the external platforms (e.g., FaceBook™ 441, LinkedIn™ 444, etc.) into a user-to-user associations (U2U) defining database section 411 maintained by the STAN_3 system 410 so that automated topic tracking operations such as the briefly described one of columns 101 and 101*r* of FIG. 1A can take place while referencing the externally-developed user-to-user associations (U2U). Aside from having the STAN_3 system maintain a user-to-user associations (U2U) data-objects organizing space and a user-to-topic associations (U2T) data-objects organizing space, it is within the contemplation of the present disclosure to maintain a user-to-physical locations associations (U2L) data-objects organizing space and a user-to-events associations (U2E) data-objects organizing space. The user-to-physical locations associations (U2L) space may indicate which users are expected to be at respective physical locations during respective times of day or respective days of the week, month, etc. One use for this U2L space is that of determining user context. More specifically, if a particular one or more users are not at their usual expected locations, that may be used by the system to flag an out-of-normal context. The user-to-events associations (U2E) may indicate which users are expected to be at respective events (e.g., social gatherings) during respective times of day or respective days of the week, month, etc. One use for this U2E space is that of determining user context. More specifically, if a particular one or more users are not at their usual expected events, that may be used by the system to flag an out-of-normal context. Yet more specifically, in the above given example where the system flagged the Superbowl™ Sunday Party attendee that "This is the kind of party that your friends A) Henry and B) Charlie would like to be at", the U2E space may have been consulted to automatically determine that two usual party attendees are not there and to thereby determine that maybe the third user should message to them that they are "sorely missed".

The word "context" is used herein to mean several different things within this disclosure. Unfortunately, the English language does not offer many alternatives for expressing the plural semantic possibilities for "context" and thus its meaning must be determined based on; please forgive the circular definition, its context. One of the meanings ascribed herein for "context" is to describe a role assigned to or undertaken by an actor and the expectations that come with that role assignment. More specifically, when a person is in the context of being "at work", there are certain presumed "roles" assigned to that actor while he or she is deemed to be operating within the context of that "at work" activity. More particularly, a given actor may be assigned to the formal role of being Vice President of Social Media Research and Development at a particular company and there may be a formal definition of expected performances to be carried out by the actor when in that role (e.g., directing subordinates within the company's Social Media Research and Development Department). Similarly, the activity (e.g., being a VP while "at work") may have a formal definition of expected subactivities. At the same time, the formal role may be a subterfuge for other expected or undertaken roles and activities because everybody tends to be called "Vice President" for example in modern companies while that formal designation is not the true "role". So there can be informal role definitions and informal activity definitions as well as formal ones. Moreover, a person can be carrying out several roles at one time and thus operating within overlapping contexts. More specifically, while "at work", the VP of Social Media R&D may drop into an online chat room where he has the role of active room moderator and there he may encounter some of the subordinates in his company's Social Media R&D Dept. also participating within that forum. At that time, the person may have dual roles of being their boss in real life (ReL) and also being room moderator over their virtual activities within the chat room. Accordingly, the simple term "context" can very quickly become complex and its meanings may have to be determined based on existing circumstances (another way of saying context). Other meanings for the term context as used herein can include, but are not limited to unless specifically so-stated: (1) historical context which is based on what memories the user currently has of past attention giving activities; (2) social dynamics context which is based on what other social entities the given user is, or believes him/herself to be in current social interaction with; (3) physical context which is based on what physical objects the given user is, or believes him/herself to be in current proximity with; and (4) cognitive state context, which here, is a catch-all term for other states of cognition that may affect what the user is currently giving significant energies of cognition to or recalling having given significant energies of cognition to, where the other states of cognition may include attributes such as, but not limited to, things sensed by the 5 senses, emotional states such as: fear, anxiety, aloofness, attentiveness, happy, sad, angry and so on; cognitions about other people, about geographic locations and/or places in time (in history); about keywords; about topics and so on.

One addition provided by the STAN_3 system 410 disclosed here is the database portion 416 which provides "Context" based associations and hybrid context-to-other space(s) associations. More specifically, these can be Location-to- User and/or Location-to-Topic and/or Location-to-Content and/or Place-in-Time-to-Other-Thing associations. The context; if it is location-based for example, can be a real life (ReL) geographic one and/or a virtual one of where the real life (ReL) or virtual user is deemed by the system to be located. Alternatively or additionally, the context can be indicative of what type of Social-Topical situation the user is determined by the machine system to be in, for example: "at work", "at a party", at a work-related party, in the school library, etc. The context can alternatively or additionally be indicative of a temporal range (place-in-time) in which the user is situated, such as: time of day, day of week, date within month or year, special holiday versus normal day and so on. Alternatively or additionally, the context can be indicative of a sequence of events that have and/or are expected to happen such as: a current location being part of a sequence of locations the user habitually or routinely traverses through during for example, a normal work day and/or a sequence of activities and/or social contexts the user habitually or routinely traverses through during for example, a normal weekend day (e.g., IF Current Location/Activity=Filling up car at Gas Station X, THEN Next Expected Location/Activity=Passing Car through Car Wash Line at same Gas Station X in next 20 minutes). Moreover, context can add increased definition to points, nodes or subregions in other Cognitive Attention Receiving Spaces; thus defining so-called, hybrid spaces, points, nodes or subregions; including for example IF Context Role=at work and functioning as receptionist AND keyword="meeting" THEN Hybrid ContextualTopic#1=Signing in and Directing new arrivals to Meeting Room. Much more will be said herein regarding "context". It is a complex subject.

For now it is sufficient to appreciate that database records (e.g., hierarchically organized context nodes and links which connect them to other nodes) in this new section 416 can indicate for the machine system, context related associations (e.g., location and/or time related associations) including, but not limited to, (1) when an identified social entity (e.g., first user) is present (virtually or in real life) at a given location as well as within a cross-correlated time period, and that the following one or more topics (e.g., T1, T2, T3, etc.) are likely to be associated with that location, that time and/or a role that the social entity is deemed by the machine system to probably be engaged in due to being in the given "context' or circumstances; (2) when a first user is disposed at a given location as well as within a cross-correlated time period, then the following one or more additional social entities (users) are likely to be associated with (e.g., nearby to) the first user: U2, U3, U4, etc.; (3) when a first user is disposed at a given location as well as within a cross-correlated time period, then the following one or more content items are likely to be associated with the first user: C1, C2, C3, etc.; and (4) when a first user is disposed at a given location as well as within a cross-correlated time period, then the following one or more hybrid combinations of social entity, topic, device and content item(s) are likely to be associated with the first user: U2/T2/D2/C2, U3/T2/D4/C4, etc. The context-to-other (e.g., hybrid) association records 416 (e.g., X-to-U/T/C/D association records 416, where X here represents context) may be used to support location-based or otherwise context-based, automated generation of assistance information. In FIG. 4A, box 416 says L-to-U/T/C rather than X-to-U/T/C/D because location is a simple first example of context (X) and thus easier to understand. Incidentally, the "D" in the broader concept of X-to-U/T/C/D stands for Device, meaning user's device. A given user may be automatically deemed to be in a respective different context (X) if he is currently using his hand-held smartphone as opposed to his office desktop computer.

Before providing a more concrete example of how a given user (e.g., Stan/Stew 431) may have multiple personas operating in different contexts and how those personas may interact differently based for example on their respective contexts and may form different user-to-user associations (U2U) when operating under their various contexts (currently adopted roles or models) including under the contexts of different social networking (SN) or other platforms, a brief discussion about those possible other SN's or other platforms is provided here. There are many well known dot.COM websites (440) that provide various kinds of social interaction services. The following is a non-exhaustive list: Baidu™; Bebo™; Flickr™; Friendster™; Google Buzz™; Google+™ (a.k.a. Google Plus™), Habbo™, hi5™; LinkedIn™; LiveJournal™; MySpace™; NetLog™; Ning™, Orkut™; PearlTrees™, Qzone™, Squidoo™, Twitter™; XING™; and Yelp™.

One of the currently most well known and used ones of the social networking (SN) platforms is the FaceBook™ system 441 (hereafter also referred to as FB). FB users establish an FB account and set up various permission options that are either "behind the wall" and thus relatively private or are "on the wall" and thus viewable by any member of the public. Only pre-identified "friends" (e.g., friend-for-the-day, friend-for-the-hour) can look at material "behind the wall". FB users can manually "de-friend" and "re-friend" people depending on who they want to let in on a given day or other time period to the more private material behind their wall.

Another well known SN site is MySpace™ (442) and it is somewhat similar to FB. A third SN platform that has gained popularity amongst so-called "professionals" is the LinkedIn™ platform (444). LinkedIn™ users post a public "Profile" of themselves which typically appears like a resume and publicizes their professional credentials in various areas of professional activity. LinkedIn™ users can form networks of linked-to other professionals. The system automatically keeps track of who is linked to whom and how many degrees of linking separation, if any, are between people who appear to the LinkedIn™ system to be strangers to each other because they are not directly linked to one another. LinkedIn™ users can create Discussion Groups and then invite various people to join those Discussion Groups. Online discussions within those created Discussion Groups can be monitored (censored) or not monitored by the creator (owner) of the Discussion Group. For some Discussion Groups (private discussion groups), an individual has to be pre-accepted into the Group (for example, accepted by the Group moderator) before the individual can see what is being discussed behind the wall of the members-only Discussion Group or can contribute to it. For other Discussion Groups (open discussion groups), the group discussion transcripts are open to the public even if not everyone can post a comment into the discussion. Accordingly, as is the case with "behind the wall" conversations in FaceBook™, Group Discussions within LinkedIn™ may not be viewable to relative "strangers" who have not been accepted as a linked-in friend or as a contact for whom an earlier member of the LinkedIn™ system sort of vouches for by "accepting" them into their inner ring of direct (1st degree of operatively connection) contacts.

The Twitter™ system (445) is somewhat different because often, any member of the public can "follow" the "tweets" output by so-called "tweeters". A "tweet" is conventionally limited to only 140 characters. Twitter™ followers can sign up to automatically receive indications that their favorite (followed) "tweeters" have tweeted something new and then they can look at the output "tweet" without need for any special permissions. Typically, celebrities such as movie stars output many tweets per day and they have groups of fans who regularly follow their tweets. It could be said that the fans of these celebrities consider their followed "tweeters" to be influential persons and thus the fans hang onto every tweeted output sent by their worshipped celebrity (e.g., movie star).

The Google™ Corporation (Mountain View, Calif.) provides a number of well known services including their famous online and free to use search engine. They also provide other services such a Google™ controlled Gmail™ service (446) which is roughly similar to many other online email services like those of Yahoo™, EarthLink™, AOL™, Microsoft Outlook™ Email, and so on. The Gmail™ service (446) has a Group Chat function which allows registered members to form chat groups and chat with one another. GoogleWave™ (447) is a project collaboration system that is believed to be still maturing at the time of this writing. Microsoft Outlook™ provides calendaring and collaboration scheduling services whereby a user can propose, declare or accept proposed meetings or other events to be placed on the user's computerized schedule. A much newer social networking service launched very recently by the Google™ Corporation is the Google Plus™ system which includes parts called: "Circles", "Hangouts", "Sparks", and "Huddle".

It is within the contemplation of the present disclosure for the STAN_3 system to periodically import calendaring and/or collaboration/event scheduling data from a user's Microsoft Outlook™ and/or other alike scheduling databases (irrespective of whether those scheduling databases and/or their support software are physically local within a user's computer or they are provided via a computing cloud) if such importation is permitted by the user, so that the STAN_3 system can use such imported scheduling data to infer, at the scheduled dates, what the user's more likely environment and/or contexts are. Yet more specifically, in the introductory example given above, the hypothetical attendant to the "Superbowl™ Sunday Party" may have had his local or cloud-supported scheduling databases pre-scanned by the STAN_3 system 410 so that the latter system 410 could make intelligent guesses as to what the user is later doing, what mood he will probably be in, and optionally, what group offers he may be open to welcoming even if generally that user does not like to receive unsolicited offers.

Incidentally, it is within the contemplation of the present disclosure that essentially any database and/or automated service that is hosted in and/or by one or more of a user's physically local data processing devices, or by a website's web serving and/or mirroring servers and data processing parts or all or part of a cloud computing system or equivalent can be used in whole or in part such that it is accessible to the user through one or more physical data processing and/or communicative mechanisms to which the user has access. In other words, even with a relatively small sized and low powered mobile access device, the user can have access to, not only much more powerful computing resources and much larger data storage facilities but also to a virtual community of other people even if each is on the go and thus can only use a mobile interconnection device. The smaller access devices can be made to appear as each had basically borrowed the greater and more powerful resources of cooperatively-connected-to other mechanisms. And in particular, with regard to the here disclosed STAN_3 system, a relatively small sized and low powered mobile access device can be configured to make use of collectively created resources of the STAN_3 system such as so-called, points, nodes or subregions in various Cognitive Attention Receiving Spaces which the STAN_3 system maintains or supports, including but not limited to, topic spaces (TS), keyword spaces (KwS), content spaces (CS), CFi categorizing spaces, context categorizing spaces, and others as shall be detailed below. More to the point, with net-computers, palm-held convergence devices (e.g., iPhone™, iPad™ etc.) and the like, it is usually not of significance where specifically the physical processes of data processing of sensed physical attributes takes place but rather that timely communication and connectivity and multimedia presentation resources are provided so that the user can experience substantially same results irrespective of how the hardware pieces are interconnected and located. Of course, some acts of data acquisition and/or processing may by necessity have to take place at the physical locale of the user such as the acquisition of user responses (e.g., touches on a touch-sensitive tablet screen, IR based pattern recognition of user facial grimaces and eyeball orientations, etc.) and of local user encodings (e.g., what the user's local environment looks, sounds, feels and/or smells like). And also, of course, the user's experience can be limited by the limitations of the multimedia presentation resources (e.g., image displays, sound reproduction devices, etc.) he or she has access to within a given context.

Accordingly, the disclosed system cannot bypass the limitations of the input and output resources available to the user. But with that said, even with availability of a relatively small display screen (e.g., one with embedded touch detection capabilities) and/or minimalist audio interface resources, a user can be automatically connected in short order to on-topic and screen compatible and/or audio compatible chat or other forum participation sessions that likely will be directed to a topic the user is apparently currently casting his/her attention toward such that the user can have a socially-enhanced experience because the user no longer feels as if he/she is dealing "alone" with the user's area of current focus but rather that the user has access to other, like-minded and interaction co-compatible people almost anytime the user wants to have such a shared experience. (Incidentally, just because a user's hand-held, local interface device (e.g., smartphone) is itself relatively small in size that does not mean that the user's interface options are limited to screen touch and voice command alone. As mentioned elsewhere herein, the user may wear or carry various additional devices that expand the user's information input/output options, for example by use of an in-mouth, tongue-driven and wirelessly communicative mouth piece whereby the user may signal in privacy, various choices to his hand-held, local interface device (e.g., smartphone).)

A more concrete example of context-driven determination of what the user is apparently focusing-upon may take advantage of the digressed-away method of automatically importing a user's scheduling data to thereby infer at the scheduled dates, what the user's more likely environment and/or other context based attributes is/are. Yet more specifically, if the user's scheduling database indicates that next Friday he is scheduled to be at the Social Networking Developers Conference (SNDC, a hypothetical example) and more particularly at events 1, 3 and 7 in that conference at the respective hours of 10:00 AM, 3:00 PM and 7:00 PM, then when that date and a corresponding time segment comes around, the STAN_3 system may use such information in combination with GPS or like location determining information (if available) as part of its gathered, hint or clue-giving encodings for then automatically determining what likely are the user's current situation, mood, surroundings (especially context of the user and of other people interacting with the user), expectations and so forth. For example, between conference events 1 and 3 (and if the user's then active habit profile—see FIG. 5A—indicates as such), the user may be likely to seek out a local lunch venue and to seek out nearby friends and/or colleagues to have lunch with. This is where the STAN_3 system 410 can come into play by automatically providing welcomed "offers" regarding available lunching resources and/or available lunching partners. One welcomed offer might be from a local restaurant which proposes a discount if the user brings 3 of his friends/colleagues. Another such welcomed offer might be from one of his friends who asks, "If you are at SNDC today or near the downtown area around lunch time, do you want to do lunch with me? I want to let you in on my latest hot project." These are examples of location specific, social-interrelation specific, time specific, and/or topic specific event offers which may pop up on the user's tablet screen 111 (FIG. 1A) for example in topic-related area 104*t* (adjacent to on-topic window 117) or in general event offers area 104 (at the bottom tray area of the screen).

In order for the system 400 to appear as if it can magically and automatically connect all the right people (e.g., those with concurrent shared areas of focus in a same Cognitions-representing Space and/or those with social interaction co-compatibilities) at the right time for a power lunch in the locale of a business conference they are attending, the system 400 should have access to data that allows the system 400 to: (1) infer the likely moods of the various players (e.g., did each not eat recently and is each in the mood for and/or in the habit or routine a business oriented lunch when in this sort of current context?), (2) infer the current topic(s) of focus most likely on the mind of each individual at the relevant time; (3) infer the type of conversation or other social interaction each individual will most likely desire at the relevant time and place (e.g., a lively debate as between people with opposed view points, or a singing to the choir interaction as between close and like-minded friends and/or family?); (4) infer the type of food or other refreshment or eatery ambiance/decor each invited individual is most likely to agree to (e.g., American cuisine? Beer and pretzels? Chinese take-out? Fine-dining versus fast-food? Other?); (5) infer the distance that each invited individual is likely to be willing to travel away from his/her current location to get to the proposed lunch venue (e.g., Does one of them have to be back on time for a 1:00 PM lecture where they are the guest speaker? Are taxis or mass transit readily available? Is parking a problem?) and so on. See also FIG. 1J of the present disclosure.

Since STAN systems such as the ones disclosed in here incorporated U.S. application Ser. No. 12/369,274 and Ser. No. 12/854,082 as well as in the present disclosure are repeatedly testing for, or sensing for, change of user context, of user mood (and thus change of active PEEP and/or other profiles—see also FIG. 3D, part 301*p*), the same results produced by mood and context determining algorithms may be used for automatically formulating group invitations based on user mood, user context and so forth. Since STAN systems are also persistently testing for change of current user location or current surroundings (—See also time and location stamps of CFi's as provided Gif. 2A of here incorporated Ser. No. 12/369,274), the same results produced by the repeated user location/context determining algorithms may be used for automatically formulating group invitations based on current user location and/or other current user surroundings information. Since STAN systems are also persistently testing for change of user's current likely topic(s) of focus (and/or current likely other points, nodes or subregions of focus in other Cognitions-representing Spaces), the same results produced by the repeated user's current topic(s) or other-subregions-of-focus determining algorithms may be used for automatically formulating group invitations based on same or similar user topic(s) being currently focused-upon by plural people and determining if there are areas of overlap and/or synergy. (Incidentally, in one embodiment, sameness or similarity as between current topics of focus—and/or sameness or similarity as between current likely other points, nodes or subregions (PNOS) of focus in other Cognitions-representing Spaces is determined at least in part on hierarchical and/or spatial distances between the tested two or more PNOS.) Since STAN systems are also persistently checking their users' scheduling calendars for open time slots and pressing obligations, the same results produced by the repeated schedule-checking algorithms may assist in the automated formulating of group invitations based on open time slots and based on competing other obligations. In other words, much of the underlying data processing is already occurring in the background for the STAN systems to support their primary job of delivering online invitations to STAN users to join on-topic (or other) online forums that appear to be best suited for what the machine system automatically determines to be the more likely topic(s) of current focus and/or other points, nodes or subregions (PNOS) of current focus in other Cognitions-representing Spaces for each monitored user. It is thus a practical extension to add various other types of group offers to the process, where; aside from an invitation to join in for example on an online chat, the various other types of offers can include invitations to join in on real world social interactions (e.g., lunch, dinner, movie, show, bowling, etc.) or to join in on real world or virtual world business oriented ventures (e.g., group discount coupon, group collaboration project).

In one embodiment, users are automatically and selectively invited to join in on a system-sponsored game or contest where the number of participants allowed per game or contest is limited to a predetermined maximum number (e.g., 100 contestants or less, 50 or less, 10 or less, or another contest-relevant number). The game or contest may involve one or more prizes and/or recognitions for a corresponding first place winning user or runner up. The prizes may include discount coupons or prize offerings provided by a promoter of specified goods and/or services. In one embodiment, to be eligible for possible invitation to the game or contest (where invitation may also require winning in a final invitations round lottery), the users who wish to be invited (or have a chance of being invited) need to pre-qualify by being involved in one or more pre-specified activities related to the STAN_3 system and/or by having one or more pre-specified user attributes. Examples of such activities/attributes related to the STAN_3 system include, but are not limited to: (1) participating in a chat or other forum participation session that corresponds to a pre-specified topic space subregion (TSR) and/or to a subregion of another system-maintained space (another CARS); (2) participating in adding to or modifying (e.g., editing) within a system-maintained Cognitive Attention Receiving Space (CARS, e.g., topic space), one or more points, nodes or subregions of that space; (3) volunteering to perform other pre-specified services that may be beneficial to the community of users who utilize the STAN_3 system; (4) having a pre-specified set of credentials that indicate expertise or other special disposition relative to a corresponding topic in the system-maintained topic space and/or relative to other pre-specified points, nodes or subregions of other system-maintained CARS's and agreeing to make oneself available for at least a pre-specified number of invitations and/or queries by other system users in regard to the topic node and/or other such CARS PNOS; (5) satisfying in the user's then active personhood and/or profiles of pre-specified geographic and/or other demographic criteria (e.g., age, gender, income level, highest education level) and agreeing to make oneself available for at least a pre-specified number of invitations and/or queries by other system users in regard to the corresponding demographic attributes, and so on.

In one embodiment, user PEEP records (Personal Emotion Expression Profiles) are augmented with user PHAFUEL records (Personal Habits And Favorites/Unfavorites Expression Logs—see FIG. 5A re the latter) which indicate various life style habits and routines of the respective users such as, but not limited to: (1) what types of foods he/she likes to eat, when, in what order and where (e.g., favorite restaurants or restaurant types); (2) what types of sports activities he/she likes to engage in, when, in what order and where (e.g., favorite gym or exercise equipment); (3) what types of non-sport activities he/she likes to engage in, when, in what order and where (e.g., favorite movies, movie houses, theaters, actors, musicians, etc.); (4) what are the usual sleep, eat, work and recreational time patterns of the individuals are (e.g., typically sleeps 11 pm-6 am, gym 7-8, then breakfast 8-8:30, followed by work 9-12, 1-5, dinner 7 pm, etc.) during normal work weeks, when on vacation, when on business oriented trips, etc. The combination of such PEEP records and PHAFUEL records can be used to automatically formulate event invitations that are in tune with each individual's life style habits and routines. More specifically, a generic algorithm for generating a meeting promoting invitation based on habits, routines and availability might be of the following form: IF a 30 minute or greater empty time slot coming up AND user is likely to then be hungry AND user is likely to then be in mood for social engagement with like focused other people (e.g., because user has not yet had a socially-fulfilling event today), THEN locate practically-meetable nearby other system users who have an overlapping time slot of 30 minutes of greater AND are also likely to then be hungry and have overlapping food type/venue type preferences AND have overlapping likely desire for socially-fulfilling event, AND have overlapping topics of current focus AND/OR social interaction co-compatibilities with one another; and if at least two such users located, automatically generate lunch meeting proposal for them and send same to them. (In one embodiment, the tongue is used simultaneously as an intentional signaling means and a biological state deducing means. More specifically, the user's local data processing device is configured to respond to the tongue being stuck out to the left and/or right with lips open or closed for example as meaning different things and while the tongue is stuck out, the data processing device takes an IR scan and/or visible spectrum scan of the stuck out tongue to determine various biological states related to tongue physiology including mapping flow of blood along the exposed area of the tongue and determining films covering the tongue and/or moisture state of the tongue (i.e. dried versus moist).)

Automated life style planning tools such as the Microsoft Outlook™ product can be used to locate common empty time slots and geographic proximity because tools such as the Microsoft Outlook™ typically provide Tasks tracking functions wherein various to-do items and their criticalities (e.g., flagged as a must-do today, must-do next week, etc.) are recorded. Such data could be stored in a computing cloud or in another remotely accessible data processing system. It is within the contemplation of the present disclosure for the STAN_3 system to periodically import Task tracking data from the user's Microsoft Outlook™ and/or other alike task tracking databases (if permitted by the user, and whether stored in a same cloud or different resource) so that the STAN_3 system can use such imported task tracking data to infer during the scheduled time periods, the user's more likely environment, context, moods, social interaction dispositions, offer welcoming dispositions, etc. The imported task tracking data may also be used to update user PHAFUEL records (Personal Habits And Favorites/Unfavorites Expression Log) which indicate various life style habits of the respective user if the task tracking data historically indicates a change in a given habit or a given routine. More specifically with regard to current user context, if the user's task tracking database indicates that the user has a high priority, high pressure work task to be completed by end of day, the STAN_3 system may use this imported information to deduce that the user would not then likely welcome an unsolicited event offer (e.g., 104*t* or 104*a* in FIG. 1A) directed to leisure activities for example and instead that the user's mind is most likely sharply focused on topics related to the must-be-done task(s) as their deadlines approach and they are listed as not yet complete. Similarly, the user may have Customer Relations Management (CRM) software that the user regularly employs and the database of such CRM software might provide exportable information (if permitted by the user) about specific persons, projects, etc. that the user will more likely be involved with during certain time periods and/or when present in certain locations. It is within the contemplation of the present disclosure for the STAN_3 system to periodically import CRM tracking data from the user's CRM tracking database(s) (if permitted by the user, and whether such data is stored in a same cloud or different resources) so that the STAN_3 system can use such imported CRM tracking data to, for example, automatically formulate an impromptu lunch proposal for the user and one of his/her customers if they happen to be located close to a nearby restaurant and they both do not have any time pressing other activities to attend to.

In one embodiment, the CRM/calendar tool is optionally configured to just indicate to the STAN_3 system when free time is available but to not show all data in CRM/calendar system, thereby preserving user privacy. In an alternate embodiment, the CRM/calendar tool is optionally configured to indicate to the STAN_3 system general location data as well as general time slots of free time thereby preserving user privacy regarding details. Of course, it is also within the contemplation of the present disclosure to provide different levels of access by the STAN_3 system to generalized or detailed information of the CRM/calendar system thereby providing different levels of user privacy. The above described, automated generations and transmissions of suggestions for impromptu lunch proposals and the like may be based on automated assessment of each invitee's current emotional state (as determined by current active PEEP record) for such a proposed event as well as each invitee's current physical availability (e.g., distance from venue and time available and transportation resources). In one embodiment, a first user's palmtop computer (e.g., 199 of FIG. 2) automatically flashes a group invite proposal to that first user such as: "Customers X and Z happen to be nearby and likely to be available for lunch with you, Do you want to formulate a group lunch invitation?". If the first user clicks, taps or otherwise indicates "Yes", a corresponding group event offer (e.g., 104*a*) soon thereafter pops on the screens of the selected offerees. In one embodiment, the first user's palmtop computer first presents a draft boiler plate template to the first user of the suggested "group lunch invitation" which the first user may then edit or replace with his own before approving its multi-casting to the computer formulated list of invitees (which list the first user can also edit with deletions or additions). In one embodiment, even before proposing a possible lunch meetup to the first user, the STAN_3 system predetermines if a sufficient number of potential lunchmates are similarly available so that likelihood of success exceeds a predetermined probability threshold; and if not the system does not make the suggestion. As a result, when the first user does receive such a system-originated suggestion, its likelihood of success can be made fairly high. By way of example, the STAN_3 system might check to see if at least 3+ people are available first before even sending invitations at all.

As a yet better enhancer for likelihood of success, the system originated and corresponding group event offer (e.g., let's have lunch together) may be augmented by adding to it a local merchant's discount advertisement. For example, and with regard to the group event offer (e.g., let's have lunch together) which was instigated by the first user (the one whose CRM database was exploited to this end by the STAN_3 system to thereby automatically suggest the group event to the first user who then acts on the suggestion), that group event offer is automatically augmented by the STAN_3 system 410 to have attached thereto a group discount offer (e.g., "Note that the very nearby Louigie's Italian Restaurant is having a lunch special today"). The augmenting offer from the local food provider automatically attached due to a group opportunity algorithm automatically running in the background of the STAN_3 system 410 and which group opportunity algorithm will be detailed below. Briefly, goods and/or service providers can formulate discount offer templates which they want to have matched by the STAN_3 system with groups of people that are likely to accept the offers. The STAN_3 system 410 then automatically matches the more likely groups of people with the discount offers those people are more likely to accept. It is win-win for both the consumers and the vendors. In one embodiment, after, or while a group is forming for a social gathering plan (in real life and/or online) the STAN_3 system 410 automatically reminds its user members of the original and/or possibly newly evolved and/or added on reasons for the get together. For example, a pop-up reminder may be displayed on a user's screen (e.g., 111) indicating that 70% of the invited people have already accepted and they accepted under the idea that they will be focusing-upon topics T_original, T_added_on, T_substitute, and so on. (Here, T_original can be an initially proposed topic that serves as an initiating basis for having the meeting while T_added_on can be later added topic proposed for the meeting after discussion about having the meeting started.) In the heat of social gatherings, people sometimes forget why they got together in the first place (what was the T_original?). However, the STAN_3 system can automatically remind them and/or additionally provide links to or the actual on-topic content related to the initial or added-on or deleted or modified topics (e.g., T_original, T_added_on, T_deleted, etc.)

More specifically and referring to FIG. 1A, in one hypothetical example, a group of social entities (e.g., real persons) have assembled in real life (ReL) and/or online with the original intent of discussing a book they have been reading because most of them are members of the Mystery-History e-book of the month club (where the e-book can be an Amazon Kindle™ compatible electronic book and/or another electronically formatted and user accessible book). However, some other topic is brought up first by one of the members and this takes the group off track. To counter this possibility, the STAN_3 system 410 can post a flashing, high urgency invitation 102*m* in top tray area 102 of the displayed screen 111 of FIG. 1A that reminds one or more of the users about the originally intended topic of focus.

In response, one of the group members notices the flashing (and optionally red colored) circle 102*m* on front plate 102*a*_Now of his tablet computer 100 and double clicks or taps the dot 102*m* open. In response to such activation, his computer 100 displays a forward expanding connection line 115*a*6 whose advancing end (at this stage) eventually stops and opens up into a previously not displayed, on-topic content window 117 (having an image 117*a* of the book included therein). As seen in FIG. 1A, the on-topic content window 117 has an on-topic URL named as www.URL.com/A4 where URL.com represents a hypothetical source location for the in-window content and A4 represents a hypothetical code for the original topic that the group had initially agreed to meet for (as well as meeting for example to have coffee and/or other foods or beverages). In this case, the opened window 117 is HTML coded and it includes two HTML headers (not shown): <H2>Mystery History Online Book Club</H2> and <H3>This Month's Selection: Sherlock Holmes and the Franz Ferdinand Case</H3>. These are two embedded hints or clues that the STAN_3 system 410 may have used to determine that the content in window 117 is on-topic with a topic center in its topic space (413) which is identified by for example, the code name A4. (It is alternatively or additionally within the contemplation of the disclosure that the responsively opened content frame, e.g., 117, be coded with or include XML and XML tags and/or codes and tags of other markup languages.) Other embedded hints or clues that the STAN_3 system 410 may have used include explicit keywords (e.g., 115*a*7) in text within the window 117 and buried (not seen by the user) meta-tags embedded within an in-frame image 117*a* provided by the content sourced from source location www.URL.com/A4 (an example). This reminds the group member of the topic the group originally gathered to discuss. It doesn't mean the member or group is required to discuss that topic. It is merely a reminder. The group member may elect to simply close the opened window 117 (e.g., activating the X box in the upper right corner) and thereafter ignore it. Dot 102*m* then stops flashing and eventually fades away or moves out of sight. In the same or an alternate embodiment, the reminder may come in the form of a short reminder phrase (e.g., "Main Meetg Topic=Book of the Month"). (Note: the references 102*a*_Now and 102*a*Now are used interchangeably herein.)

In one embodiment, after passage of a predetermined amount of time the My Top-5 Topics Now serving plate, 102*a*_Now automatically transforms into a My Top-5 Topics Earlier serving plate, 102*a'*_Earlier which is covered up by a slightly translucent but newer and more up to date, My Top Topics Now serving plate, 102*a*_Now. In the case where Tower-of-Hanoi stacked rings are used in an inverted cone orientation, the smaller, older ones of the top plate can leak through to the "Earlier" in time plate 102*a'*_Earlier where they again become larger and top of the stack rings because in that "Earlier" time frame they are the newest and best invitations and/or recommendations. If, after such an update, the user wants to see the older, My Top Topics Earlier plate 102*a'*_Earlier, he may click on, tap, or otherwise activate a protruding-out small portion of that older plate and stacked behind plate. The older plate then pops to the top. Alternatively the user might use other menu means for shuffling the older serving plate to the front. Behind the My Top Topics Earlier serving plate, 102*a'*_Earlier there is disposed an even earlier in time serving plate 102*a*" and so on. Invitations (to online and/or real life meetings) that are for a substantially same topic (e.g., book club) line up almost behind one another so that a historical line up of such on-same-topic invitations is perceived when looking through the partly translucent plates. This optional viewing of current and older on-topic invitations is shown for the left side of plates stack 102*b* (Their Top 5 Topics). (Note: the references 102*a'*_Earlier and 102*a*'Earlier are used interchangeably herein.) Incidentally, and as indicated elsewhere herein, the on-topic serving plates, such as those of plate stack 102*b* need not be of the meet-up opportunity type, or of the meet-up opportunity only type. The serving plates (e.g., 102*a*Now) can alternatively or additionally serve up links to on-topic resources (e.g., content providing resources) other than invitations to chat or other forum participation sessions. The other on-topic resources may include, but not limited to, links to on-topic web sites, links to on-topic books or other such publications, links to on-topic college courses, links to on-topic databases and so on.

If the exemplary Book-of the-Month Club member had left window 117 open for more than a predetermined length of time, an on-topic event offering 104*t* may have popped open adjacent to the on-topic material of window 117. However, this description of such on-topic promotional offerings has jumped ahead of itself because a broader tour of the user's tablet computer 100 has not yet been supplied here and such a re-tour (return to the main tour) will now be presented.

Recall how the Preliminary Introduction above began with a bouncing, rolling ball (108) pulling the user into a virtual elevator (113) that took the user's observed view to a virtual floor of a virtual high rise building. When the doors open on the virtual elevator (113, bottom right corner of screen) the virtual ball (108") hops out and rolls to the diagonally opposed, left upper corner of the screen 111. This tends to draw the user's eyes to an on-screen context indicator 113*a* and to the header entity 101*a* of social entities column 101. The user may then note that the header entity has been automatically preset to be "Me". The user may also note that the on-screen context indicator 113*a* indicates the user is currently on a virtual floor named, "My Top 5 Now Topics" (which floor name is not shown in FIG. 1A due to space limitations—the name could temporarily unfurl as the bouncing, rolling ball 108 stops in the upper left screen corner and then could roll back up behind floor/context indicator 113*a* as the ball 108 continues to another temporary stopping point 108'). There could be 100*s* of floors in the virtual building (or other such virtual structure) through which the Layer-Vator™ 113 travels and, in one embodiment, each floor has a respective label or name that is found at least on the floor selection panel inside the Layer-Vator™ 113 and besides or behind (but out-poppable therefrom) the current floor/context indicator 113*a*.

Before moving on to next stopping point 108', the virtual ball (also referred to herein as the Magic Marble 108) outputs a virtual spot light from its embedded virtual light sources onto a small topic space flag icon 101*ts* sticking up from the "Me" header object 101*a*. A balloon icon (not shown) temporarily opens up and displays the guessed-at most prominent (top) topic that the machine system (410) has determined to be the topic likely to be foremost (topmost) in the user's mind. In this example, it says, "Superbowl™ Sunday Party". The temporary balloon (not shown) collapses and the Magic Marble 108 then shines another virtual spotlight on invitation dot 102*i* at the left end of the also-displayed, My Top Topics Now serving plate 102*a*_Now. Then the Magic Marble 108 rolls over to the right, optionally stopping at another tour point 108' to light up, for example, the first listed Top Now Topic for the "Them/Their" social entity of plates stack 102*b*. Thereafter, the Magic Marble 108 rolls over further to the right side of the screen 111 and parks itself in a ball parking area 108*z*. This reminds the user as to where the Magic Marble 108 normally parks. The user may later want to activate the Magic Marble 108 for performing user specified functions (e.g., marking up different areas of the screen for temporary exclusion from STAN_3 monitoring or specific inclusion in STAN_3 monitoring where all other areas are automatically excluded).

Unseen by the user during this exercise (wherein the Magic Marble 108 is rolling diagonally from one corner (113) to the other (113*a*) and then across to come to rest in the Ball Park 108*z*) is that the user's tablet computer 100 is automatically watching him while he is watching the Magic Marble 108 move to different locations on the screen. Two spaced apart, eye-tracking sensors, 106 and 109, are provided along an upper edge of the exemplary tablet computer 100. (There could be yet more sensors, such as three at three corners.) Another sensor embedded in the computer housing (100) is a GPS one (Global Positioning Satellites receiver, shown to be included in housing area 106). At the beginning of the story (the Preliminary Introduction to Disclosed Subject Matter), the GPS sensor was used by the STAN_3 system 410 to automatically determine that the user is geographically located at the house of one of his known friends (Ken's house). That information in combination with timing and accessible calendaring data (e.g., Microsoft Outlook™) allowed the STAN_3 system 410 to automatically determine one or a few most likely contexts for the user and then to extract best-guess conclusions that the user is now likely attending the "Superbowl™ Sunday Party" at his friend's house (Ken's), perhaps in the context role of being a "guest". The determined user context (or most likely handful of contexts) similarly provided the system 410 with the ability to draw best-guess conclusions that the user would soon welcome an unsolicited Group Coupon offering 104*a* for fresh hot pizza. But again the story given here is leap-frogging ahead of itself. The guessed at, social context of being at "Ken's Superbowl™ Sunday Party" also allowed the system 410 to pre-formulate the layout of the virtual floor displayed by way of screen 111 as is illustrated in FIG. 1A. That predetermined layout includes the specifics of who (what persona or group) is listed as the header social entity 101*a* (KoH="Me") at the top of left side column 101 and who or what groups are listed as follower social entities 101*b*, 101*c*, . . . , 101*d* below the header social entity (KoH) 101*a*. (In one embodiment, the initial sequence of listing of the follower social entities 101*b*, 101*c*, . . . , 101*d* is established by a predetermined sorting algorithm such as which follower entity has greatest commonality of heat levels applied to same currently focused-upon topics as does the header social entity 101*a* (KoH="Me"). In an alternate embodiment, the sorted positionings of the follower social entities 101*b*, 101*c*, . . . , 101*d* may be established based on an urgency determining algorithm; for example one that determines there are certain higher and lower priority projects that are respectively cross-associated as between the KoH entity (e.g., "Me") and the respective follower social entities 101*b*, 101*c*, . . . , 101*d*. Additionally or alternatively, the sorting algorithm can use some other criteria (e.g., current or future importance of relationship between KoH and the others) to determine relative positionings along vertical column 101. That initially pre-sorted sequence can be altered by the user, for example with use of a shuffle up tool 98+. The predetermined floor layout also includes the specifics of what types of corresponding radar objects (101*ra*, 101*rb*, . . . , 101*rd*) will be displayed in the radar objects holding column 101*r*. It also determines which invitations/suggestions serving plates, 102*a*, 102*b*, etc. (where here 102*a* is understood to reference the plates stack that includes serving plate 102*a*Now as well as those behind it) are displayed in the top and retractable, invitations serving tray 102 provided near an edge of the screen 111. It also determines which associated platforms will be listed in a right side, playgrounds holding column 103 and in what sequence. In one embodiment, when a particular one or more invitations and/or on-topic suggestions (e.g., 102*i*) is/are determined by the STAN_3 system to be directed to an online forum or real life (ReL) gathering associated with a specific platform (e.g., FaceBook™, LinkedIn™ etc.), then; at a time when the user hovers a cursor or other indicator over the invitation(s) (e.g., 102*i*) or otherwise inquires about the invitations (e.g., 102*i*; or associated content suggestions), the corresponding platform representing icon in column 103 (e.g., FB 103*b* in the case of an invitation linked thereto by linkage showing-line 103*k*) will automatically glow and/or otherwise indicate the logical linkage relationship between the platform and the queried invitation or machine-made suggestion. The predetermined layout shown in FIG. 1A may also determine which pre-associated event offers (104*a*, 104*b*) will be initially displayed in a bottom and retractable, offers serving tray 104 provided near the bottom edge of the screen 111. Each such serving tray or side-column/row may include a minimize or hide command mechanism. For sake of illustration, FIG. 1A shows Hide buttons such as 102*z* of the top tray 102 for allowing the user to minimize or hide away any one or more respective ones of the automatically displayed trays: 101, 101*r*, 102, 103 and 104. In one embodiment, even when metaphorically "hidden" beyond the edge of the screen, exceptionally urgent invitations or recommendations will protrude slightly into the screen from the edge to thereby alert the user to the presence of the exceptionally urgent (e.g., highly scored and above a threshold) invitation or recommendation. Of course, other types of hide/minimize/resize mechanisms may be provided, including more detailed control options in the Format drop down menu of toolbar 111*a*.

The display screen 111 may be a Liquid Crystal Display (LCD) type or an electrophoretic type or another as may be appropriate. The display screen 111 may accordingly include a matrix of pixel units embedded therein for outputting and/or reflecting differently colored visible wavelengths of light (e.g., Red, Green, Blue and White pixels) that cause the user (see 201A of FIG. 2) to perceive a two-dimensional (2D) and/or three-dimensional (3D) image being projected to him. The display screens 111, 211 of respective FIGS. 1A and 2 also have a matrix of infra red (IR) wavelength detectors embedded therein, for example between the visible light outputting pixels. In FIG. 1A, only an exemplary one such IR detector is indicated to be disposed at point 111*b* of the screen and is shown as magnified to include one or more photodetectors responsive to wavelengths output by IR beam flashers 106 and 109. The IR beam flashers, 106 and 109, alternatingly output patterns of IR light that can reflect off of a user's face (including off his eyeballs) and can then bounce back to be seen (detected and captured) by the matrix of IR detectors (only one shown at 111*b*) embedded in the screen 111. The so-captured stereoscopic images (represented as data captured by the IR detectors 111*b*) are uploaded to the STAN_3 servers (for example in cloud 410 of FIG. 4A). Before uploading to the STAN_3 servers, some partial data processing on the captured image data (e.g., image clean up and compression) can occur in the client machine, such that less data is pushed to the cloud. The uploaded image data is further processed by data processing resources of the STAN_3 system 410. These resources may include parallel processing digital engines or the like that quickly decipher the captured IR imagery and automatically determine therefrom how far away from the screen 111 the user's face is and/or what specific points on the screen (or sub-portions of the screen) the user's eyeballs are focused upon. The stereoscopic reflections of the user's face, as captured by the in-screen IR sensors may also indicate what facial expressions (e.g., grimaces) the user is making and/or how warm blood is flowing to or leaving different parts of the user's face (including, optionally the user's protruded tongue). The point of focus of the user's eyeballs tells the system 410 what content the user is probably focusing-upon. Point of eyeball focus mapped over time can tell the system 410 what content the user is focusing-upon for longest durations and perhaps reading or thinking about. Facial grimaces, tongue protrusions, head tilts, etc. (as interpreted with aid of the user's currently active PEEP file) can tell the system 410 how the user is probably reacting emotionally to the focused-upon content (e.g., inside window 117). Some facial contortions may represent intentional commands being messaged from the user to the system 410.

When earlier, in the introductory story, the Magic Marble 108 bounced around the screen after entering the displayed scene (of FIG. 1A) by taking a ride thereto by way of virtual elevator 113, the system 410 was preconfigured to know where on the screen (e.g., position 108') the Magic Marble 108 was located. It then used that known position information to calibrate its IRB sensors (106, 109) and/or its IR image detectors (111*b*) so as to more accurately determine what angles the user's eyeballs are at as they follow the Magic Marble 108 during its flight. In one embodiment, there are many other virtual floors in the virtual high rise building (or other such structure, not shown) where virtual presence on this other floor may be indicated to the user by the "You are now on this floor" virtual elevator indicator 113*a* of FIG. 1A (upper left corner). When virtually transported to a special one of these other floors, the user is presented with a virtual game room filled with virtual pinball game machines and the like. The Magic Marble 108 then serves as a virtual pinball in these games. And the IRB sensors (106, 109) and the IR image detectors (111*b*) are calibrated while the user plays these games. In other words, the user is presented with one or more fun activities that call for the user to keep his eyeballs trained on the Magic Marble 108. In the process, the system 410 heuristically or otherwise forms a heuristic mapping between the captured IR reflection patterns (as caught by the IR detectors 111*b*) and the probable angle of focus of the user's eyeballs (which should be tracking the Magic Marble 108).

Another sensor that the tablet computer 100 may include is a housing directional tilt and/or jiggle sensor 107. This can be in the form of an opto-electronically implemented gyroscopic sensor and/or MEMs type acceleration sensors and/or a compass sensor. The directional tilt and jiggle sensor 107 determines what angles the flat panel display screen 111 is at relative to gravity and/or relative to geographic North, South, East and West. The tilt and jiggle sensor 107 also determines what directions the tablet computer 100 is being shaken in (e.g., up/down, side to side, Northeast to Southwest or otherwise). The user may elect to use the Magic Marble 108 as a rolling type of cursor (whose action point is defined by a virtual spotlight cast by the internally lit ball 108) and to position the ball with tilt and shake actions applied to the housing of the tablet computer 100. Push and/or rotate actuators 105 and 110 are respectively located on the left and right sides of the tablet housing and these may be activated by the user to invoke pre-programmed functions associated with the Magic Marble 108. In an embodiment the Magic Marble 108 can be moved with a finger or hand gesture. These functions may be varied with a Magic Marble Settings tool 114 provided in a tools area of the screen 111.

One of the functions that the Magic Marble 108 (or alternatively a touch driven cursor 135) may provide is that of unfurling a context-based controls setting menu such as the one shown at 136 when the user depresses a control-right keypad or an alike side-bar button combination. (Such hot key combination activation may alternatively or additionally be invoked with special, predetermined facial contortions which are picked up by the embedded IR sensors.) Then, whatever the Magic Marble 108 or cursor 135 (shown disposed inside window 117 of FIG. 1A) or both is/are pointing to, can be highlighted and indicated as activating a user-controllable menu function (136) or set of such functions. In the illustrated example of menu 136, the user has preset the control-right key press function (or another hot key combination activation) to cause two actions to simultaneously happen. First, if there is a pre-associated topic (topic node) already associated with the pointed-to on-screen item, an icon representing the associated topic (e.g., the invitation thereto) will be pointed to. More specifically, if the user moves cursor 135 to point to keyword 115*a*7 inside window 117 (the key.a5 word of phrase), a connector beam 115*a*6 grows backwards from the pointed-to object (key.a5) to a topic-wise associated and already presented invitation and/or suggestion making object (e.g., 102*m*) in the top serving tray 102. Second, if there are certain friends or family members or other social entities pre-associated with the pointed-to object (e.g., key.a5) and there are on-screen icons (e.g., 101*a*, . . . , 101*d*) representing those social entities, the corresponding icons (e.g., 101*a*, . . . , 101*d*) will glow or otherwise be highlighted. Hence, with a simple hot key combination (e.g., a control right click or a double tap, a multi-finger swipe or a facial contortion), the user can quickly come to appreciate object-to-topic relations and/or object-to-person relations as between a pointed-to on-screen first object (e.g., key.a5 in FIG. 1A) and on-screen other icons that correspond to the topic of, or the associated person(s) of that pointed-to object (e.g., key.a5).

Let it be assumed for sake of illustration and as a hypothetical that when the user control-right clicks or double taps on or otherwise activates the key.a5 object, the My Family disc-like icon 101*b* glows (or otherwise changes). That indicates to the user that one or more keywords of the key.a5 object are logically linked to the "My Family" social entity. Let it also be assumed that in response to this glowing, the user wants to see more specifically what topics the social entity called "My Family" (101*b*) is now primarily focusing-upon (what are their top now N topics?). This cannot be done using the pyramid 101*rb* for the illustrated configuration of FIG. 1A because "Me" is the header entity in column 101. That means that all the follower radar objects 101*rb*, . . . , 101*rd* are following the current top-5 topics of "Me" (101*a*) and not the current top N topics of "My Family" (101*b*). However, if the user causes the "My Family" icon 101*b* to shuffle up into the header (leader, mayor) position of column 101, the social entity known as "My Family" (101*b*) then becomes the header entity. Its current top N topics become the lead topics shown in the top most radar object of radar column 101*r*. (The "Me" icon may drop to the bottom of column 101 and its adjacent pyramid will now show heat as applied by the "Me" entity to the top N topics of the new header entity, "My Family".) In one embodiment, the stack of on-topic serving plates called My Current Top Topics 102*a* shifts to the right in tray 102 and a new stack of on-topic serving plates called My Family's Current Top Topics (not shown) takes its place as being closest to the upper left corner of the screen 111. This shuffling in and out of entities to/from the top leader position (101*a*) can be accomplished with a shuffle Up tool (e.g., 98+ of icon 101*c*) provided as part of each social entity icon except that of the leader social entity. Alternatively or additionally, drag and drop may be used.

That is one way of discovering what the top N now topics of the "My Family" entity (101*b*) are. Another way involves clicking or otherwise activating a flag tool 101*s* provided atop the 101*rb* pyramid as is shown in the magnified view of pyramid 101*rb* in FIG. 1A.

In addition to using the topic flag icon (e.g., 101*ts*) provided with each pyramid object (e.g., 101*rb*), the user may activate yet another topic flag icon that is either already displayed within the corresponding social entity representing object (101*a*, . . . , 101*d*) or becomes visible when the expansion tool (e.g., starburst+) of that social entity representing object (101*a*, . . . , 101*d*) is activated. In other words, each social entity representing object (101*a*, . . . , 101*d*) is provided with a show-me-more details tool like the tool 99+(e.g., the starburst plus sign) that is for example illustrated in circle 101*d* of FIG. 1A. When the user clicks or otherwise activates this show-me-more details tool 99+, one or more pop-out windows, frames and/or menus open up and show additional details and/or addition function options for that social entity representing object (101*a*, . . . , 101*d*). More specifically, if the show-me-more details tool 99+ of circle 101*d* had been activated, a wider diameter circle 101*dd* spreads out (in one embodiment) from under the first circle 101*d*. Clicking or otherwise activating one area of the wider diameter circle 101*dd* causes a greater details pane 101*de* (for example) to pop up on the screen 111. The greater details pane 101*de* may show a degrees of separation value used by the system 410 for defining a user-to-user association (U2U) between the header entity (101*a*) and the expanded entity (101*d*, e.g., "him"). The degrees of separation value may indicate how many branches in a hierarchical tree structure of a corresponding U2U association space separate the two users. Alternatively or additionally (but not shown in FIG. 1A), a relative or absolute distance of separation value may be displayed as between two or more user-representing icons (me and him) where the displayed separation value indicates in relative or absolute terms, virtual distances (traveled along a hierarchical tree structure or traveled as point-to-point) that separate the two or more users in the corresponding U2U association space. The greater details pane 101*de* may show flags (F1, F2, etc.) for common topic nodes or subregions as between the represented Me-and-Him social entities and the platforms (those of column 103), P1, P2, etc. from which those topic centers spring. Clicking or otherwise activating one of the flags (F1, F2, etc.) opens up more detailed information about the corresponding topic nodes or subregions. For example, the additional detailed information may provide a relative or absolute distance of separation value representing corresponding distance(s) as between two or more currently focused-upon topic nodes of a corresponding two or more social entities. The provided relative or absolute distance of separation value(s) may be used to determine how close to one another or not (how similar to one another or not) are the respectively focused-upon topic nodes when considered in accordance with their respective hierarchical and/or spatial placements in a system-maintained topic space. It is moreover within the contemplation of the present disclosure that closeness to one another or similarity (versus being far apart or highly dissimilar) may be indicated for two or more of respective points, nodes or subregions (PNOS) in any of the Cognitions-representing Spaces described herein. That aspect will be explained in more detail below.

By clicking or otherwise activating one of the platform icons (P1, P2, etc.) of greater details pane 101*de*, such action opens up more detailed information about where in the corresponding platform (e.g., FaceBook™, STAN3™, etc.) the corresponding topic nodes or subregions logically link to. Although not shown in the exemplary greater details pane 101*de*, yet further icons may appear therein that, upon activation, reveal more details regarding points, nodes or subregions (PNOS's) in other Cognitive Attention Receiving Spaces such as keyword space (KwS), URL space, context space (XS) and so on. And as mentioned above, some of the revealed more details can indicate how similar or dissimilar various PNOS's are in their respective Cognitions-representing Spaces. More specifically, cross-correlation details as between the current KoH entity (e.g., "Me") and the other detailed social entity (e.g., "My Other" 101*d*) may include indicating what common or similar keywords or content subportions both social entities are currently focusing significant "heat" upon or are otherwise casting their attention on. These common keywords (as defined by corresponding objects in keyword space) may be indicated by other indicators in place of the "heat" indicators. For example, rather than showing the "heat" metrics, the system may instead display the top 5 currently focused-upon keywords that the two social entities have in common with each other. In addition to or as an alternative to showing commonly shared topic points, nodes or subregions and/or commonly shared keyword points, nodes or subregions, or how similar they are, the greater details pane 101*de* may show commonalities/similarities in other Cognitive Attention Receiving Spaces such as, but not limited to, URL space, meta-tag space, context space, geography space, social dynamics space and so on. In addition to or as an alternative to comparatively showing commonly shared points, nodes or subregions in various Cognitive Attention Receiving Spaces (CARS's) which are common to two or more social entities, the greater details pane 101*de* may show the top N points, nodes or subregions of just one social entity and the corresponding "heats" cast by that just one social entity (e.g., "Me") on the respective points, nodes or subregions in respective ones of different Cognitive Attention Receiving Spaces (CARS's; e.g., topic space, URL space, ERL space (defined below), hybrid keyword-context space, and so on).

Aside from causing a user-selected hot key combination (e.g., control right click or double tap) to provide more detailed information about one or more of associated topic and associated social entities (e.g., friends), the settings menu 136 may be programmed to cause the user-selected hot key combination to provide more detailed information about one or more of other logically-associated objects, such as, but not limited to, associated forum supporting mechanisms (e.g., platforms 103) and associated group events (e.g., professional conference, lunch date, etc.) and/or invitations thereto and/or promotional offerings related thereto.

While a few specific sensors and/or their locations in the tablet computer 100 have been described thus far, it is within the contemplation of the present disclosure for the user-proximate computer 100 to have other or additional sensors. For example, a second display screen with embedded IR sensors and/or touch or proximity sensors may be provided on the other side (back side) of the same tablet housing 100. In addition to or as replacement for the IR beam units, 106 and 109, stereoscopic cameras may be provided in spaced apart relation to look back at the user's face and/or eyeballs and/or to look forward at a scene the user is also looking at. The stereoscopic cameras may be used for creating a 3-dimensional of the user (e.g., of the user's face, including eyeballs) so that the system can determine therefrom what the user is currently focused-upon and/or how the user is reacting to the focused-upon material.

More specifically, in the case of FIG. 2, the illustrated palmtop computer 199 may have its forward pointing camera 210 pointed at a real life (ReL) object such a Ken's house 198 (e.g., located on the North side of Technology Boulevard) and/or a person (e.g., Ken). Object recognition software provided by the STAN_3 system 410 and/or by one or more external platforms (e.g., GoogleGoggles™ or IQ_Engine™) may automatically identify the pointed-at real life object (e.g., Ken's house 198). Alternatively or additionally, item 210 may represent a forward pointing directional microphone configured to pick up sounds from sound sources other than the user 201A. The picked out sounds may be supplied, in one embodiment, to automated voice recognition software where the latter automatically identifies who is speaking and/or what they are saying. The picked out semantics may include merely a few keywords sufficient to identify a likely topic and/or a likely context. The voice based identification of who is speaking may also be used for assisting in the automated determination of the user's likely context. Yet alternatively or additionally, the forward pointing directional microphone (210) may pick up music and/or other sounds or noises where the latter are also automatically submitted to system sound identifying means for the purpose of assisting in the automated determination of the user's likely context. For example, a detection of carousel music in combination with GPS or alike based location identifying operations of the system may indicate the user is in a shopping mall near its carousel area. As an alternative, the directional sound pick up means may be embedded in nearby other machine means and the output(s) of such directional sound pick up means may be wirelessly acquired by the user's mobile device (e.g., 199).

Aside from GPS-like location identifying means and/or directional sound pick up means being embedded in the user's mobile device (e.g., 199) or being available in, and accessed by way of, nearby other devices and being temporarily borrowed for use by the user's mobile device (e.g., 199), the user's mobile device may include direction determining means (e.g., compass means and gravity tilt means) and/or focal distance determining means for automatically determining what direction(s) one or more of used cameras/directional microphones (e.g., 210) are pointing to and where (how far out) the focal point is of the directed camera(s)/microphones relative to the location of the of camera(s)/microphones. The automatically determined identity, direction and distance and up/down disposition of the pointed to object/person (e.g., 198) is then fed to a reality augmenting server within the STAN_3 system 410. The reality augmenting server (not explicitly shown, but one of the data processing resources in the cloud) automatically looks up most likely identity of the person(s) (based for example on automated face and/or voice recognition operations carried out by the cloud), most likely context(s) and/or topic(s) (and/or other points, nodes or subregions of other spaces) that are cross-associated as between the user (or other entity) and the pointed-at real life object/person (e.g., Ken's house 198/Ken). For example, one context plus topic-related invitation that may pop up on the user's augmented reality side (screen 211) may be something like: "This is where Ken's Superbowl™ Sunday Party will take place next week. Please RSVP now." Alternatively, the user's augmented reality or augmented virtuality side of the display may suggest something like: "There is Ken in the real life or in a recently inloaded image and by the way you should soon RSVP to Ken's invitation to his Superbowl™ Sunday Party". These are examples of context and/or topic space augmented presentations of reality and/or of a virtuality. The user is automatically reminded of likely topics of current interest (and/or of other focused-upon points, nodes or subregions of likely current interest in other spaces) that are associated with real life (ReL) objects/persons that the user aims his computer (e.g., 100, 199) at or associated with recognizable objects/persons present in recent images inloaded into the user's device.

As another example, the user may point at the refrigerator in his kitchen and the system 410 invites him to formulate a list of food items needed for next week's party. The user may point at the local supermarket as he passes by (or the GPS sensor 106 detects its proximity) and the system 410 invites him to look at a list of items on a recent to-be-shopped-for list. This is another example of topic and context spaces based augmenting of local reality. So just by way of recap here, it becomes possible for the STAN_3 system to know/guess on what objects and/or which persons are being currently pointed at by one or more cameras/microphones under control of, or being controlled on behalf of a given user (e.g., 210A of FIG. 2) by combining local GPS or GPS-like functionalities with one or more of directional camera pickups, directional microphone pickups, compass functionalities, gravity angle functionalities, distance functionalities and pre-recorded photograph and/or voice recognition functionalities (e.g., an earlier taken picture of Ken and/or his house in which Ken and house are tagged plus an earlier recorded speech sample taken from Ken) where the combined functionalities increase the likelihood that the STAN_3 system will correctly recognize the pointed-to object (198) as being Ken's house (in this example) and the pointed-to person is Ken (in this example). Alternatively or additionally a cruder form of object/person recognition may be used. For example, the system automatically performs the following: 1) identifying the object in camera as a standard "house", 2) using GPS coordinates and using a compass function to determine which "house" on an accessible map the camera is pointing, 3) using a lookup table to determine which person(s) and/or events or activities are associated with the so-identified "house", and 4) using the system's topic space and/or other space lookup functions to determine what topics and/or other points, nodes or subregions are most likely currently associated with the pointed at object (or pointed at person).

Yet other sensors that may be embedded in the tablet computer 100 and/or other devices (e.g., head piece 201*b* of FIG. 2) adjacent to the user include sound detectors that operate outside the normal human hearing frequency ranges, light detectors that operate outside the normal human visibility wavelength ranges, further IR beam emitters and odor detectors (e.g., 226 in FIG. 2). The sounds, lights and/or odor detectors may be used by the STAN_3 system 410 for automatically determining various current events such as, when the user is eating, duration of eating, number of bites or chewings taken, what the user is eating (e.g., based on odor 227 and/or IR readings of bar code information) and for estimating how much the user is eating based on duration of eating and/or counted chews, etc. Later, (e.g., 3-4 hours later) the system 410 may use the earlier collected information to automatically determine that the user is likely getting hungry again. That could be one way that the system of the Preliminary Introduction knows that a group coupon offer from the local pizza store would likely be "welcomed" by the user at a given time and in a given context (Ken's Superbowl™ Sunday Party) even though the solicitation was not explicitly pulled by the user. The system 410 may have collected enough information to know that the user has not eaten pizza in the last 24 hours (otherwise, he may be tired of it) and that the user's last meal was small one 4 hours ago meaning he is likely getting hungry now. The system 410 may have collected similar information about other STAN users at the party to know that they too are likely to welcome a group offer for pizza at this time. Hence there is a good likelihood that all involved will find the unsolicited coupon offer to be a welcomed one rather than an annoying and somewhat overly "pushy" one.

In the STAN_3 system 410 of FIG. 4A, there is provided within its ambit (e.g., cloud, and although shown as being outside), a general welcomeness filter 426 and a topic-based hybrid router 427. The general welcomeness filter 426 receives user data 417 that is indicative of what general types of unsolicited offers the corresponding user is likely or not likely to now welcome. More specifically, if the recent user data 417 indicates the user just ate a very large meal, that will usually flag the user as not welcoming an unsolicited current offer involving consumption of more food. If the recent user data 417 indicates the user just finished a long business oriented meeting, that will usually flag the user as not welcoming an unsolicited offer for another business oriented meeting. (In one embodiment, stored knowledge base rules may be used to automatically determine if an unsolicited offer for another business oriented meeting would be welcome or not; such as for example: IF Length_of Last_Meeting>45 Minutes AND Number_Meetings_Done_Today>4 AND Current_Time>6:00 PM THEN Next_Meeting_Offer_Status=Not Welcome, ELSE . . . ) If the recent user data 417 indicates the user just finished a long exercise routine, that will usually flag the user as not likely welcoming an unsolicited offer for another physically strenuous activity although, on the other hand, it may additionally, flag the user as likely welcoming an unsolicited offer for a relaxing social event at a venue that serves drinks. These are just examples and the list can of course go on. In one embodiment, the general welcomeness filter 426 is tied to a so-called PHA_FUEL file of the user's (Personal Habits And Favorites/Unfavorites Expression Log—see FIG. 5A) where the latter will be detailed later below. Briefly, known habits and routines of the user are used to better predict what the user is likely to welcome or not in terms of unsolicited offers when in different contexts (e.g., at work, at home, at a party, etc.). (Note: the references PHA_FUEL and PHAFUEL are used interchangeably herein.)

If general welcomeness has been determined by the automated welcomeness filter 426 for certain general types of offers, the identification of the likely welcoming user is forwarded to the hybrid topic-context router 427 for more refined determination of what specific unsolicited offers the user (and current friends) are more likely to accept than others based on one or more of the system determined current topic(s) likely to be currently on his/their minds and current location(s) where he/they are situated and/or other contexts under which the user is currently operating. Although, it is premature at this point in the present description to go into greater detail, later below it will be seen that so-called, hybrid topic-context points, nodes or subregions can be defined by the STAN_3 system in respective hybrid Cognitive Attention Receiving Spaces. The idea is that a user is not just merely hungry (as an example of mood/biological state) and/or currently casting attention on a specific topic, but also that the user has adopted a specific role or job definition (as part of his/her context) that will further determine if a specific promotional offering is now more welcome than others. By way of a more specific example, assume that the hypothetical user (you) of the above Superbowl™ Sunday party example is indeed at Ken's house and the Superbowl™ game is starting and that hypothetical user (you) is worried about how healthy Joe-The-Throw Nebraska is, but also that one tiny additional fact has been left out of the story. The left out fact is that a week before the party, the hypothetical user entered into an agreement (e.g., a contract) with Ken that the hypothetical user will be working as a food serving and trash clean-up worker and not as a social invitee (guest) to the party. In other words, the user has a special "role" that the user is now operating under and that assumed role can significantly change how the user behaves and what promotional offerings would be more welcomed or less unwelcomed than others. Yet more specifically, a promotional offering such as, "Do you want to order emergency carpet cleaning services for tomorrow?" may be more welcomed by the user when in the clean-up crew role but not when in the party guest role. The subject of assumed roles will be detailed further in conjunction with FIG. 3J (the context primitive data structure).

In the example above, one or more of various automated mechanisms could have been used by the STAN_3 system to learn that the user is in one role (one adopted context) rather than another. The user may have a task-managing database (e.g., Microsoft Outlook Calendar™) or another form of to-do-list managing software plus associated stored to-do data, or the user may have a client relations management (CRM) tool he regularly uses, or the user may have a social relations management (SRM) tool he regularly uses, or the user may have received a reminder email or other such electronic message (e.g., "Don't forget you have clean-up crew job duty on Sunday") reminding the user of the job role he has agreed to undertake. The STAN_3 system automatically accesses one or more of these (after access permission has been given) and searches for information relating to assumed, or to-be-assumed roles. Then the STAN_3 system determines probabilities as between possible roles and generates a sorted list with the more probable roles and their respective probability scores at the top of the list; and the system prioritizes accordingly.

Assumed roles can determine predicted habits and routines. Predicted habits and routines (see briefly FIG. 5A, the active PHAFUEL profile) can determine what specific promotional offerings would more likely be welcomed or not. In accordance with one aspect of the disclosure, the more probable user context (e.g., assumed role) is used for selectively activating a correspondingly more probable PHAFUEL profile (Personal Habits And Favorites/Unfavorites Expression Log) and then the hybrid topic-context router 427 (FIG. 4A) utilizes data and/or knowledge base rules (KBR's) provided in the activated PHAFUEL profile for determining how to route the identity of the potential offeree (user) to one promotion offering sponsor more so than to another. In other words, the so sorted outputs of the Topic/Other Router 427 are then forwarded to current offer sponsors (e.g., food vendors, paraphernalia vendors, clean up service providers, etc.) who will have their own criteria as to which of the pre-sorted users or user groups will qualify for certain offers and these are applied as further match-making criteria until specific users or user groups have been shuffled into an offerees group that is pre-associated with a group offer they are very likely to accept. The purpose of this welcomeness filtering and routing and shuffling is so that STAN_3 users are not annoyed with unwelcome solicitations and so that offer sponsors are not disappointed with low acceptance rates (or too high of an acceptance rate if alternatively that is one of their goals). More will be detailed about this below. Before moving on and just to recap here, the assumed role that a user has likely undertaken (which is part of user "context") can influence whom he would want to share a given and shareable experience with (e.g., griping about clean-up crew duty) and also which promotional offerings the user will more likely welcome or not in the assumed role. Filter and router modules 426 and 427 are configured to base their results (in one embodiment) on the determined-as-more-likely-by-the-system roles and corresponding habits/routines of the user. This increases the likelihood that unsolicited promotional offerings will not be unwelcomed.

Referring still to FIG. 4A, but returning now to the subject of the out-of-STAN platforms or services contemplated thereby, the StumbleUpon™ system (448) allows its registered users to recommend websites to one another. Users can click or tap or otherwise activate a thumb-up icon to vote for a website they like and can similarly click or tap on a thumb-down icon to indicate they don't like it. The explicitly voted upon websites can be categorized by use of "Tags" which generally are one or two short words to give a rough idea of what the website is about. Similarly, other online websites such as Yelp™ allow its users to rate real world providers of goods and services with number of thumbs-up, or stars, etc. It is within the contemplation of the present disclosure that the STAN_3 system 410 automatically imports (with permission as needed from external platforms or through its own sideline websites) user ratings of other websites, of various restaurants, entertainment venues, etc. where these various user ratings are factored into decisions made by the STAN_3 system 410 as to which vendors (e.g., coupon sponsors) may have their discount offer templates matched with what groups of likely-to-accept STAN users. Data imported from external platforms 44X may include identifications of highly credentialed and/or influential persons (e.g., Tipping Point Persons) that users follow when using the external platforms 44X. In one embodiment, persons or platforms that rate external services and/or goods also post indications of what specific contexts the ratings apply to. The goal is to minimize the number of times that STAN-generated event offers (e.g., 104*t*, 104*a* in FIG. 1A) invite STAN users to establishments whose services or goods are below a predetermined acceptable level of quality and/or suitability for a given context. In other words, fitness ratings are generated as indicating appropriate quality and/or suitability to corresponding contexts as perceived by the respective user. More specifically, and for example, what is more "fitting and appropriate" for a given context such as informal house party versus formal business event might vary from a budget pizza to Italian cuisine from a 5 star restaurant. While the 5 star restaurant may have more quality, its goods/services might not be most "fit" and appropriate for a given context. By rating goods/services relative to different contexts, the STAN_3 system works to minimize the number of times that unsolicited promotional offerings invite STAN users to establishments whose services or goods are of the wrong kinds (e.g., not acceptable relative to the role or other context under which the user is operating and thus not what the user had in mind). Additionally, the STAN_3 system 410 collects CVi's (implied vote-indicating records) from its users when and while they are agreeing to be so-monitored. It is within the contemplation of the present disclosure to automatically collect CVi's from permitting STAN users during STAN-sponsored group events where the collected CVi's indicate how well or not the STAN users like the event (e.g., the restaurant, the entertainment venue, etc.). Then the collected CVi's are automatically factored into future decisions made by the STAN_3 system 410 as to which vendors may have their discount offer templates matched with what groups of likely-to-accept STAN users and under what contexts. The goal again is to minimize the number of times that STAN-generated event offers (e.g., 104*t*, 104*a*) invite STAN users to establishments whose services or goods are collectively voted on as being inappropriate, untimely and/or below a predetermined minimum level of acceptable quality and monetary fitness to the gathering and its respective context(s).

Additionally, it is within the contemplation of the present disclosure to automatically collect implicit or explicit CVi's from permitting STAN users at the times that unsolicited event offers (e.g., 104*t*, 104*a*) are popped up on that user's tablet screen (or otherwise presented to the user). An example of an explicit CVi may be a user-activateable flag which is attached to the promotional offering and which indicates, when checked, that this promotional offering was not welcome or worse, should not be present again to the user and/or to others ever or within a specified context. The then-collected CVi's may indicate how welcomed or not welcomed the unsolicited event offers (e.g., 104*t*, 104*a*) are for that user at the given time and in the given context. The goal is to minimize the number of times that STAN-generated event offers (e.g., 104*t*, 104*a*) are unwelcomed by the respective user. Neural networks or other heuristically evolving automated models may be automatically developed in the background for better predicting when and under which contexts, various unsolicited event offers will be welcomed or not by the various users of the STAN_3 system 410. Parameters for the over-time developed heuristic models are stored in personal preference records (e.g., habit and routine records, see FIG. 5A) of the respective users and thereafter used by the general welcomeness filter 426 and/or routing module 427 of the system 410 or by like other means to block inappropriate-for-the-context and thus unwelcomed solicitations from being made too often to STAN users. After sufficient training time has passed, users begin to feel as if the system 410 somehow magically knows when and under what circumstances (context) unsolicited event offers (e.g., 104*t*, 104*a*) will be welcomed and when not. Hence in the above given example of the hypothetical "Superbowl™ Sunday Party", the STAN_3 system 410 had beforehand developed one or more PHAFUEL records (Personal Habits And Favorites/Unfavorites Expression Profiles) for the given user indicating for example what foods he likes or dislikes under different circumstances (contexts), when he likes to eat lunch, when he is likely to be with a group of other people and so on. The combination of the pre-developed PHAFUEL records and the welcome/unwelcomed heuristics for the unsolicited event offers (e.g., 104*t*, 104*a*) can be used by the STAN_3 system 410 to know when are likely times and circumstances that such unsolicited event offers will be welcome by the user and what kinds of unsolicited event offers will be welcome or not. More specifically, the PHAFUEL records of respective STAN users can indicate what things the user least likes or hates as well what they normally like and accept for a given circumstance (a.k.a. "context fitness"). So if the user of the above hypothecated "Superbowl™ Sunday Party" hates pizza (or is likely to reject it under current circumstances, e.g., because he just had pizza 2 hours ago) the match between vendor offer and the given user and/or his forming social interaction group will be given a low score and generally will not be presented to the given user and/or his forming social interaction group. Incidentally, active PHAFUEL records for different users may automatically change as a function of time, mood, context, etc. Accordingly, even though a first user may have a currently active PHAFUEL record (Personal Habit Expression Profiles) indicating he now is likely to reject a pizza-related offer; that same first user may have a later activated PHAFUEL record which is activated in another context and when so activated indicates the first user is likely to then accept the pizza-related offer.

Referring still to FIG. 4A and more of the out-of-STAN platforms or services contemplated thereby, consider the well known social networking (SN) system reference as the SecondLife™ network (460*a*) wherein virtual social entities can be created and caused to engage in social interactions. It is within the contemplation of the present disclosure that the user-to-user associations (U2U) portion 411 of the database of the STAN_3 system 410 can include virtual to real-user associations and/or virtual-to-virtual user associations. A virtual user (e.g., avatar) may be driven by a single online real user or by an online committee of users and even by a combination of real and virtual other users. More specifically, the SecondLife™ network 460*a* presents itself to its users as an alternate, virtual landscape in which the users appear as "avatars" (e.g., animated 3D cartoon characters) and they interact with each other as such in the virtual landscape. The SecondLife™ system allows for Non-Player Characters (NPC's) to appear within the SecondLife™ landscape. These are avatars that are not controlled by a real life person but are rather computer controlled automated characters. The avatars of real persons can have interactions within the SecondLife™ landscape with the avatars of the NPC's. It is within the contemplation of the present disclosure that the user-to-user associations (U2U) 411 accessed by the STAN_3 system 410 can include virtual/real-user to NPC associations. Yet more specifically, two or more real persons (or their virtual world counterparts) can have social interactions with a same NPC and it is that commonality of interaction with the same NPC that binds the two or more real persons as having second degree of separation relation with one another. In other words, the user-to-user associations (U2U) 411 supported by the STAN_3 system 410 need not be limited to direct associations between real persons and may additionally include user-to-user-to-user-etc. associations (U3U, U4U etc.) that involve NPC's as intermediaries. A very large number of different kinds of user-to-user associations (U2U) may be defined by the system 410. This will be explored in greater detail below.

Aside from these various kinds of social networking (SN) platforms (e.g., 441-448, 460), other social interactions may take place through tweets, email exchanges, list-serve exchanges, comments posted on "blogs", generalized "in-box" messagings, commonly-shared white-boards or Wikipedia™ like collaboration projects, etc. Various organizations (dot.org's, 450) and content publication institutions (455) may publish content directed to specific topics (e.g., to outdoor nature activities such as those followed by the Field-and-Streams™ magazine) and that content may be freely available to all members of the public or only to subscribers in accordance with subscription policies generated by the various content providers. (With regard to Wikipedia™ like collaboration projects, those skilled in the art will appreciate that the Wikipedia™ collaboration project—for creating and updating a free online encyclopedia—and similar other "Wiki"-spaces or collaboration projects (e.g., Wikinews™, Wikiquote™, Wikimedia™, etc.) typically provide user-editable world-wide-web content. The original Wiki concept of "open editing" for all web users may be modified however by selectively limiting who can edit, who can vote on controversial material and so on. Moreover, a Wiki-like collaboration project, as such term is used further below, need not be limited to content encoded in a form that is compatible with early standardizations of HTML coding (world-wide-web coding) and browsers that allow for viewing and editing of the same. It is within the contemplation of the present disclosure to use Wiki-like collaboration project control software for allowing experts within different topic areas to edit and vote (approvingly or disapprovingly) on structures and links (e.g., hierarchical or otherwise) and linked-to/from other nodes/content providers of topic nodes that are within their field of expertise. More detail will follow below.)

Since a user (e.g., 431) of the STAN_3 system 410 may also be a user of one or more of these various other social networking (SN) and/or other content providing platforms (440, 450, 455, 460, etc.) and may form all sorts of user-to-user associations (U2U) with other users of those other platforms, it may be desirous to allow STAN users to import their out-of-STAN U2U associations, in whole or in part (and depending on permissions for such importation) into the user-to-user associations (U2U) database area 411 maintained by the STAN_3 system 410. To this end, a cross-associations importation or messaging system 432*m* may be included as part of the software executed by or on behalf of the STAN user's computer (e.g., 100, 199) where the cross-associations importation or messaging system 432*m* allows for automated importation or exchange of user-to-user associations (U2U) information as between different platforms. At various times the first user (e.g., 432) may choose to be disconnected from (e.g., not logged-into and/or not monitored by) the STAN_3 system 410 while instead interacting with one or more of the various other social networking (SN) and other content providing platforms (440, 450, 455, 460, etc.) and forming social interaction relations there. Later, a STAN user may wish to keep an eye on the top topics (and/or other top nodes or subregions of non-topic spaces) currently being focused-upon by his "friend" Charlie, where the entity known to the first user as "Charlie" was befriended firstly on the MySpace™ platform. (See briefly 484*a* under column 487.1C of FIG. 4C.) Different iconic GUI representations may be used in the screen of FIG. 1A for representing out-of-STAN friends like "Charlie" and the external platform on which they were befriended. In one embodiment, when the first user hovers his cursor over a friend icon, highlighting or glowing will occur for the corresponding representation in column 103 of the main platform and/or other playgrounds where the friendship with that social entity (e.g., "Charlie") first originated. In this way the first user is quickly reminded that it is "that" Charlie, the one he first met for example on the MySpace™ platform. So next, and for sake of illustration, a hypothetical example will be studied where User-B (432) is going to be interacting with an out-of-STAN_3 subnet (where the latter could be any one of outside platforms like 441, 442, 444, etc.; 44X in general) and the user forms user-to-user associations (U2U) in those external playgrounds that he would like to later have tracked by columns 101 and 101*r* at the left side of FIG. 1A as well as reminded of by column 103 to the right.

In this hypothetical example, the same first user 432 (USER-B) employs the username, "Tom" when logged into and being tracked in real time by the STAN_3 system 410 (and may use a corresponding Tom-associated password). (See briefly 484.1*c* under column 487.1A of FIG. 4C.) On the other hand, the same first user 432 employs the username, "Thomas" when logging into the alternate SN system 44X (e.g., FaceBook™—See briefly 484.1*b* under column 487.1B of FIG. 4C.) and he then may use a corresponding Thomas-associated password. The Thomas persona (432*u*2) may favor focusing upon topics related to music and classical literature and socially interacting with alike people whereas the Tom persona (432*u*1) may favor focusing on topics related to science and politics (this being merely a hypothesized example) and socially interacting with alike science/politics focused people. Accordingly, the Thomas persona (432*u*2) may more frequently join and participate in music/classical literature discussion groups when logged into the alternate SN system 44X and form user-to-user associations (U2U) therein, in that external platform. By contrast, the Tom persona (432*u*1) may more frequently join and participate in science/politics topic groups when logged into or otherwise being tracked by the STAN_3 system 410 and form corresponding user-to-user associations (U2U) therein which latter associations can be readily recorded in the STAN_3 U2U database area 411. The local interface devices (e.g., CPU-3, CPU-4) used by the Tom persona (431*u*1) and the Thomas persona (432*u*2) may be a same device (e.g., same tablet or palmtop computer) or different ones or a mixture of both depending on hardware availability, and moods and habits of the user. The environments (e.g., work, home, coffee house) used by the Tom persona (432*u*1) and the Thomas persona (432*u*2) may also be same or different ones depending on a variety of circumstances.

Despite the possibilities for such difference of persona and interests, there may be instances where user-to-user associations (U2U) and/or user-to-topic associations (U2T) developed by the Thomas persona (432*u*2) while operating exclusively under the auspices of the external SN system 44X environment (e.g., FaceBook™) and thus outside the tracking radar of the STAN_3 system 410 may be of cross-association value to the Tom persona (432*u*1). In other words, at a later time when the Tom/Thomas person is logged into the STAN_3 system 410, he may want to know what topics, if any, his new friend "Charlie" is currently focusing-upon. However, "Charlie" is not the pseudo-name used by the real life (ReL) personage of "Charlie" when that real life personage logs into system 410. Instead he goes by the name, "Chuck". (See briefly item 484*c* under column 487.1A of FIG. 4C.)

It may not be practical to import the wholes of external user-to-user association (U2U) maps from outside platforms (e.g., MySpace™) because, firstly, they can be extremely large and secondly, few STAN users will ever demand to view or otherwise interact with all other social entities (e.g., friends, family and everyone else in the real or virtual world) of all external user-to-user association (U2U) maps of all platforms. Instead, STAN users will generally wish to view or otherwise interact with only other social entities (e.g., friends, family) whom they wish to focus-upon because they have a preformed social relationship with them and/or a preformed, topic-based relationship with them. Accordingly, the here disclosed STAN_3 system 410 operates to develop and store only selectively filtered versions of external user-to-user association (U2U) maps in its U2U database area 411. The filtering is done under control of so-called External SN Profile importation records 431*p*2, 432*p*2, etc. for respective ones of STAN_3 's registered members (e.g., 431, 432, etc.). The External SN Profile importation records (e.g., 431*p*2, 432*p*2) may reflect the identification of the external platform (44X) where the relationship developed as well as user social interaction histories that were externally developed and user compatibility characteristics (e.g., co-compatibilities to other users, compatibilities to specific topics, types of discussion groups etc.) and as the same relates to one or more external personas (e.g., 431*u*2, 432*u*2) of registered members of the STAN_3 system 410. The external SN Profile records 431*p*2, 432*p*2 may be automatically generated or alternatively or additionally they may be partly or wholly manually entered into the U2U records area 411 of the STAN_3 database (DB) 419 and optionally validated by entry checking software or other means and thereafter incorporated into the STAN_3 database.

An external U2U associations importing mechanism is more clearly illustrated by FIG. 4B and for the case of second user 432. In one embodiment, while this second user 432 is logged-in into the STAN_3 system 410 (e.g., under his STAN_3 persona as "Tom", 432*u*1), a somewhat intrusive and automated first software agent (BOT) of system 410 invites the second user 432 to reveal by way of a survey his external UBID-2 information (his user-B identification name, "Thomas" and optionally his corresponding external password) which he uses to log into interfaces 428*a*/428*b* of specified Out-of-STAN other systems (e.g., 441, 442, etc.), and if applicable; to reveal the identity and grant access to the alternate data processing device (CPU-4) that this user 432 uses when logged into the Out-of STAN other system 44X. The automated software agent (not explicitly shown in FIGS. 4A-4B) then records an alias record into the STAN_3 database (DB 419) where the stored record logically associates the user's UAID-1 of the 410 domain with his UAID-2 of the 44X external platform domain. Yet another alias record would make a similar association between the UAID-1 identification of the 410 domain with some other identifications, if any, used by user 432 in yet other external domains (e.g., 44Y, 44Z, etc.) Then the agent (BOT) begins scanning that alternate data processing device (CPU-4) for local friends and/or buddies and/or other contacts lists 432L2 and their recorded social interrelations as stored in the local memory of CPU-4 or elsewhere (e.g., in a remote server or cloud). The automated importation scan may also cover local email contact lists 432L1 and Tweet following lists 432L3 (or lists for other blogging or microblogging sites) held in that alternate data processing device (CPU-4). If it is given, the alternate site password for temporary usage, the STAN_3 automated agent also logs into the Out-of-STAN domain 44X while pretending to be the alternate ego, "Thomas" (with user 432's permission to do so) and begins scanning that alternate contacts/friends/followed tweets/etc. listing site for remote listings 432R of Thomas's email contacts, Gmail™ contacts, buddy lists, friend lists, accepted contacts lists, followed tweet lists, and so on; depending on predetermined knowledge held by the STAN_3 system of how the external content site 44X is structured. (The remote listings 432R may include cloud hosted ones of such listings.) Different external content sites (e.g., 441, 442, 444, etc.) may have different mechanisms for allowing logged-in users to access their private (behind the wall) and public friends, contacts and other such lists based on unique privacy policies maintained by the various external content sites. In one embodiment, database 419 of the STAN_3 system 410 stores accessing know-how data (e.g., knowledge base rules) for known ones of the external content sites. In one embodiment, a registered STAN_3 user (e.g., 432) is enlisted to serve as a sponsor into the Out-of STAN platform for automated agents output by the STAN_3 system 410 that need vouching for. Aside from scanning and importing external user-to-user association data (U2U; e.g., 432L1-432L3), the STAN_3 system may at repeated times use its access permissions to collect external data relating to current and future roles (contexts) that the user is likely to undertake. The context related data may include, but is not limited to, data from a local client relations management module 432L5 the user regularly uses and data from a local task management module 432L6 the user regularly uses. As explained above, a user's likely context at different times and places may be automatically determined based on scheduled to-do items in his/her task management and/or calendaring databases. It will also become apparent below that a user's context can be a function of the people who are virtually or physically proximate to him/her. For example, if the user unexpectedly bumps into some business clients within a chat or other forum participation session (or in a live physical gathering), the STAN_3 system can automatically determine that there is a business oriented user-to-user association (U2U) present in the given situation based on data garnered from the user's CRM or task tools (432L5-432L6) and the system can automatically determine, based on this that it is likely the user has switched into a client interfacing or other business oriented role. In other words, the user's "context" has changed. When this happens, the STAN_3 system may automatically switch to context-appropriate and alternate user profiles as well as context-appropriate knowledge base rules (KBR's) when determining what augmentations or normalizations should be applied to user originated CFi's and CVi's and what points, nodes or subregions in various Cognitive Attention Receiving Spaces (e.g., topic space) are to next receive user 'touchings' (and corresponding "heat"). The concept of context-based CFi augmentations and/or normalizations will be further explicated below in conjunction with FIG. 3R.

In one embodiment, and for the case of accessing data of external sources (e.g., 432L1-432L6), cooperation agreements may be negotiated and signed as between operators of the STAN_3 system 410 and operators of one or more of the Out-of STAN other platforms (e.g., external platforms 441, 442, 444, etc.) or tools (e.g., CRM) that permit automated agents output by the STAN_3 system 410 or live agents coached by the STAN_3 system to access the other platforms or tool data stores and operate therein in accordance with restrictions set forth in the cooperation agreements while creating filtered submaps of the external U2U association maps and thereafter causing importation of the so-filtered submaps (e.g., reduced in size and scope; as well as optionally compressed by compression software) into the U2U records area 411 of the STAN_3 database (DB) 419. An automated format change may occur before filtered external U2U submaps are ported into the STAN_3 database (DB) 419.

Referring to FIG. 4C, shown as a forefront pane 484.1 is an example of a first stored data structure that may be used for cross linking between pseudonames (alter-ego personas) used by a given real life (ReL) person when operating under different contexts and/or within the domains of different social networking (SN) platforms, 410 as well as 441, 442, . . . , 44X. The identification of the real life (ReL) person is stored in a real user identification node 484.1R of a system maintained, "users space" (a.k.a. user-related data-objects organizing space). Node 484.1R is part of a hierarchical data-objects organizing tree that has all users as its root node (not shown). The real user identification node 484.1R is bi-directionally linked to data structure 484.1 or equivalents thereof. In one embodiment, the system blocks essentially all other users from having access to the real user identification nodes (e.g., 484.1R) of a respective user unless the corresponding user has given written permission (or explicit permission, can be given orally and recorded or transcribed as such after automated voice recognition authentication of the speaker) for his or her real life (ReL) identification to be made public. The source platform (44X) from which each imported U2U submap is logical linked (e.g., recorded alongside) is listed in a top row 484.1*a* (Domain) of tabular second data structure 484.1 (which latter data structure links to the corresponding real user identification node 484.1R). A respective pseudoname (e.g., Tom, Thomas, etc.) for the primary real life (ReL) person—in this case, 432 of FIG. 4A—is listed in the second row 484.1*b* (User(B)Name) of the illustrative tabular data structure 484.1. If provided by the primary real life (ReL) person (e.g., 432), the corresponding password for logging into the respective external account (of external platform 44X) is included in the third row 484.1*c* (User(B)Passwd) of the illustrative tabular data structure 484.1.

As a result, an identity cross-correlation and context cross-correlations can be established for the primary real life (ReL) person (e.g., 432 and having corresponding real user identification node 484.1R stored for him in system memory) and his various pseudonames (alter-ego personas, which personas may use the real name of the primary real life person as often occurs for example within the FaceBook™ platform). Also, cross-correlations between the different pseudonames and corresponding passwords (if given) may be obtained when that first person logs into the various different platforms (STAN_3 as well as other platforms such as FaceBook™, MySpace™, LinkedIn™, etc.). With access to the primary real life (ReL) person's passwords, pseudonames and/or networking devices (e.g., 100, 199, etc.), the STAN_3 BOT agents often can scan through the appropriate data storage areas to locate and copy external social entity specifications including, but not limited to: (1) the pseudonames (e.g., Chuck, Charlie, Charles) of friends of the primary real life (ReL) person (e.g., 432); (2) the externally defined social relationships between the ReL person (e.g., 432) and his friends, family members and/or other associates; (3) the externally defined roles (e.g., context-based business relationships; i.e. boss and subordinate) between the ReL person (e.g., 432) and others whom he/she interacts with by way of the external platforms; (4) the dates on when these social/other-contextual relationships were originated or last modified or last destroyed (e.g., by de-friending, by quitting a job) and then perhaps last rehabilitated, and so on.

Although FIG. 4C shows just one exemplary area 484.1*d* where the user(B) to user(C) relationships data are recorded as between for example Tom/Thomas/etc. and Chuck/Charlie/etc., it is to be understood that the forefront pane 484.1 (Tom's pane) may be extended to include many other user(B) to user(X) relationship detailing areas 484.1*e*, etc., where X can be another personage other than Chuck/Charlie/etc. such as X=Hank/Henry/etc.; Sam/Sammy/Samantha, etc. and so on.

Figure 3A:
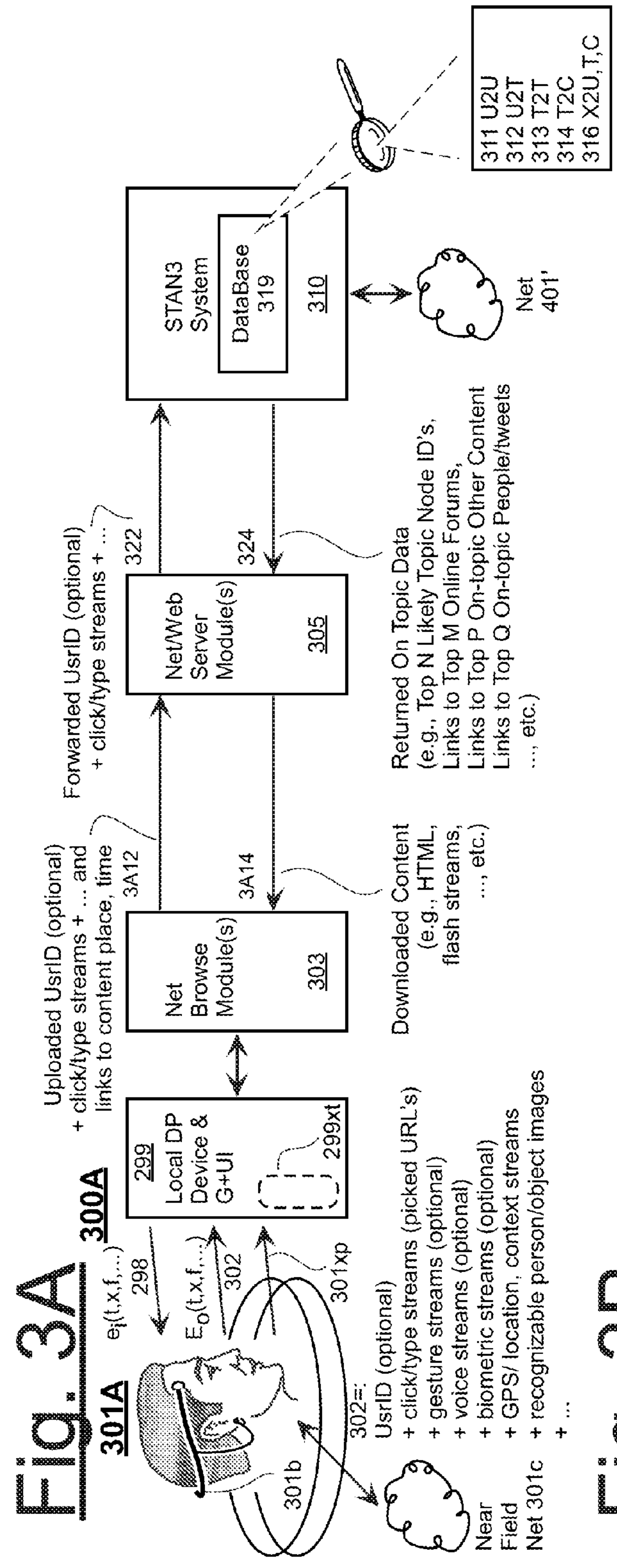
FIGS. 3A-3B illustrate automated systems for passing user click or user tap or other user inputting streams and/or other energetic and contemporary focusing activities of a user through an intermediary server (e.g., webpage downloading server) to the STAN_3 system for thereby having the STAN_3 system return topic-related information for optional downloading to the user of the intermediary server.
Figure 3B:
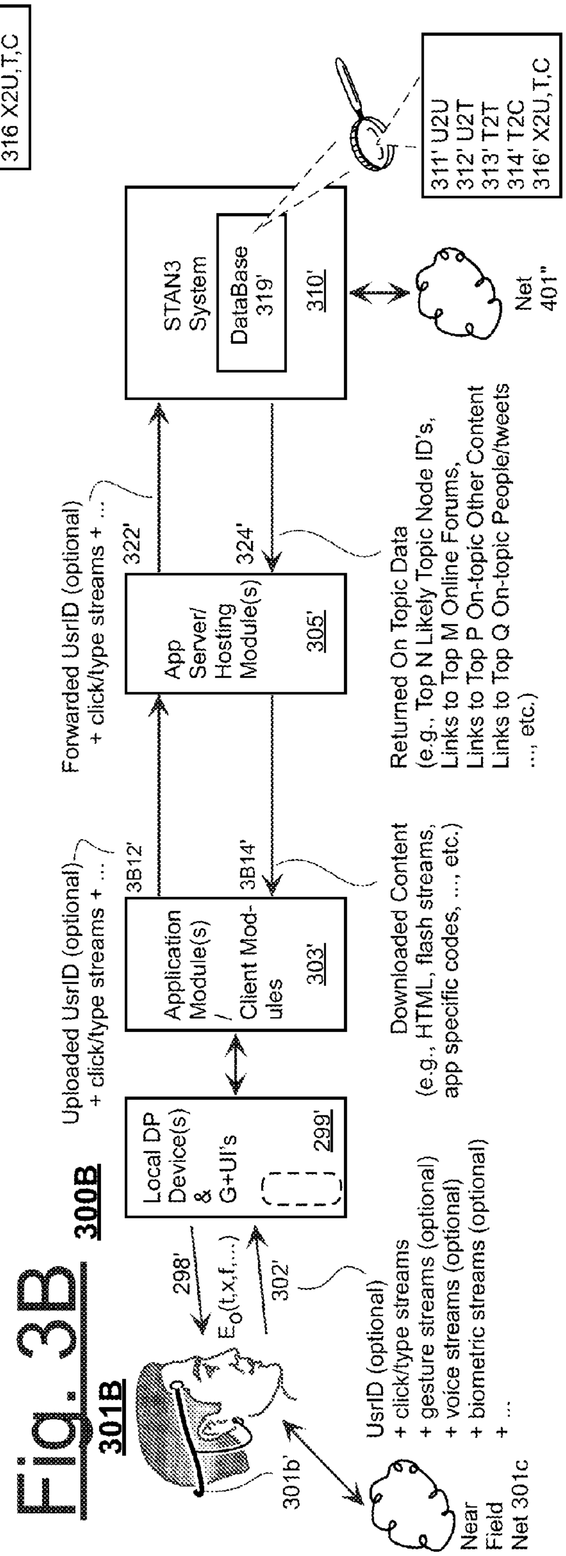
Figure 3C:
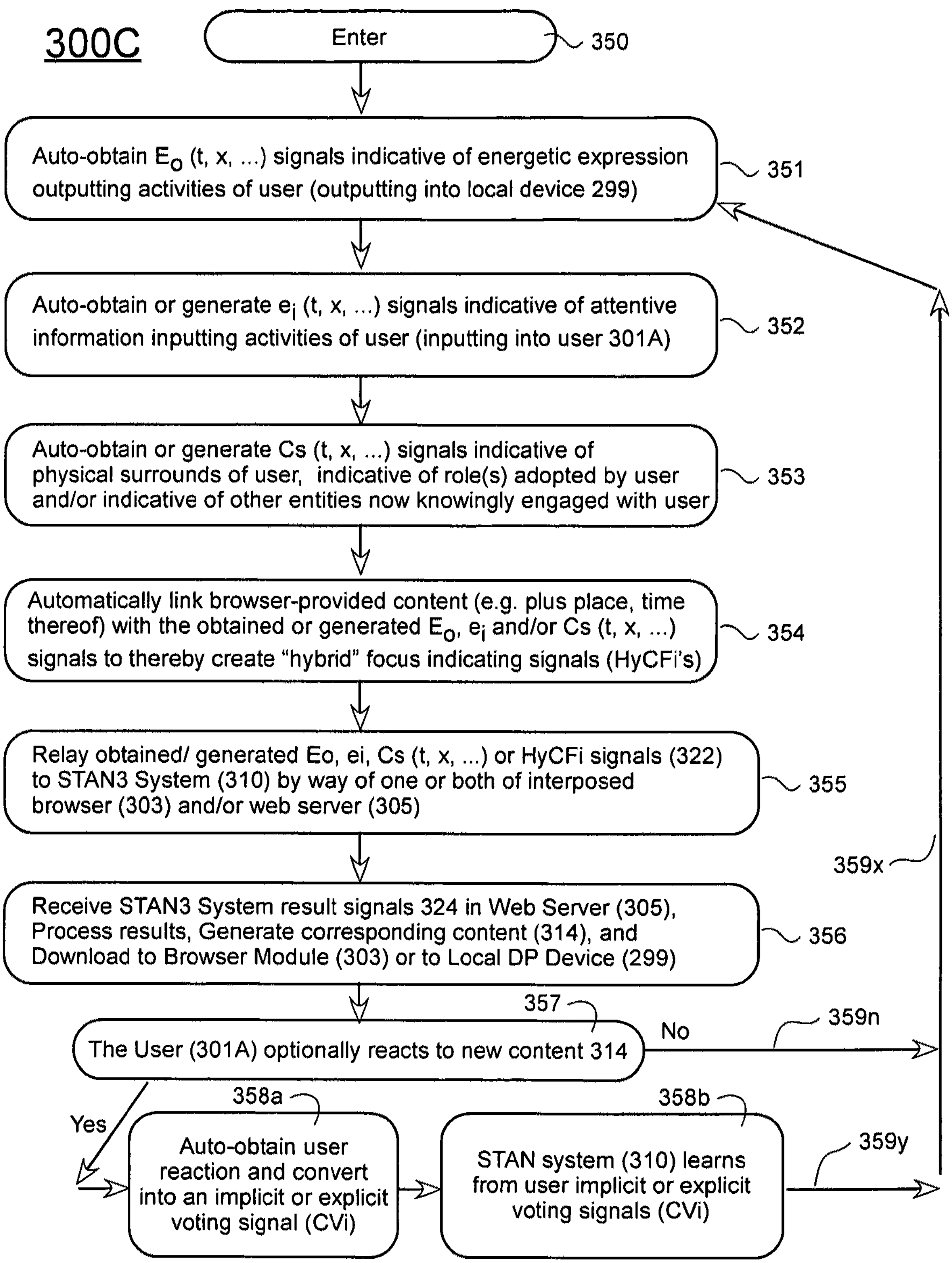
FIG. 3C provides a flow chart of machine-implemented method that can be used in the system of FIG. 3A.

Referring to column 487.1A of the forefront pane 484.1 (Tom's pane), this one provides representations of user-to-user associations (U2U) as formed inside the STAN_3 system 410. For example, the "Tom" persona (432*u*1 in FIG. 4A) may have met a "Chuck" persona (484*c* in FIG. 4C) while participating in a STAN_3 spawned chat room which initially was directed to a topic known as topic A4 (see relationship defining subarea 485*c* in FIG. 4C). Tom and Chuck became more involved friends and later on they joined as debate partners in another STAN_3 spawned chat room which was directed to a topic A6 (see relationship defining subarea 486*c* in FIG. 4C). More generally, various entries in each column (e.g., 487.1A) of a data structure such as 484.1 may include pointers or links to topic nodes after topic space regions (TSRs) of system topic space and/or pointers or links to nodes of other system-supported spaces (e.g., a keyword space 370 such as shown in FIG. 3E and yet more detailed in FIG. 3W). This aspect of FIG. 4C is represented by optional entries 486*d* (Links to topic space (TS), etc.) in exemplary column 487.1A.

The real life (ReL) personages behind the personas known as "Tom" and "Chuck" may have also collaborated within the domains of outside platforms such as the LinkedIn™ platform, where the latter is represented by vertical column 487.1E of FIG. 4C. However, when operating in the domain of that other platform, the corresponding real life (ReL) personages are known as "Tommy" and Charles" respectively. See data holding area 484*b* of FIG. 4C. The relationships that "Tommy" and Charles" have in the out-of-STAN domain (e.g., LinkedIn™) may be defined differently than the way user-to-user associations (U2U) are defined for in-STAN interactions. More specifically, in relationship defining area 485*b* (a.k.a. associations defining area 485*b*), "Charles" (484*b*) is defined as a second-degree-of-separation contact of Tommy's who happens to belong to same LinkedIn™ discussion group known as Group A5. This out-of-STAN discussion group (e.g., Group A5) may not be logical linked to an in-STAN topic node (or topic center, TC) within the STAN_3 topic space. So the user(B) to user(C) code for area-of-commonality may have to be recorded as a discussion group identifying code (not shown) rather than as a topic node(s) identifying code (latter shown in next-discussed area 487*c*.2 of FIG. 4C).

More specifically, and referring to magnified data storing area 487*c* of FIG. 4C; one of the established (and system recorded) relationship operators between "Tom" and "Chuck" (col. 487.1A) may revolve about one or more in-STAN topic nodes whose corresponding identities are represented by one or more codes (e.g., compressed data codes) stored in region 487*c*.2 of the data structure 487*c*. These one or more topic node(s) identifications do not however necessarily define the corresponding relationships of user(B) (Tom) as it relates to user(C) (Chuck). Instead, another set of codes stored in relationship(s) specifying area 487*c*.1 represent the one or more relationships developed by "Tom" as he thus relates to "Chuck" where one or more of these relationships may revolve about shared topic nodes or shared topic space subregions (TSR's) identified in area-of-topics-commonality specifying area 487*c*.2. While FIG. 4C shows data area 487*c*.2 as one that specifies one or more points, nodes or subregions of topic space that users Ub and Uc have in common with each other; it is within the contemplation of the present disclosure to alternatively or additionally specify other points, nodes or subregions of other Cognitive Attention Receiving Spaces (e.g., keyword space, URL space, context space) that the exemplary users Ub and Uc have in common with each other. Context space cross-relations may include that of superior to subordinate within a specified work environment or that of teacher to student within a specified educational environment, and so on. It is within the contemplation of the present disclosure to have hybrid topic-context cross-relations as shall become clearer later below.

Moreover, the present description of user-to-user associations (U2U) as defined through a respective Cognitive Attention Receiving Space (e.g., topic space per data area 487*c*.2) is not limited to individuals. The concept of user-to-user associations (U2U) also includes herein, individual-to-Group (i2G) associations and Group-to-Group (G2G) associations. More specifically, a given individual user (e.g., Usr(B) of FIG. 4C) may have a topic-related cross-association with a Group of users, where the group has a system-recognized name and further identity (e.g., an account with permissions etc.). In that case, an entry in column 487.1 (Usr(B)="Tom") may be provided that is similar to 487*c*.2 but instead defines one or more userB to groupC topic codes. Once again, in the case of individual to group cross-relations (i2G), it is within the contemplation of the present disclosure to alternatively or additionally specify other points, nodes or subregions of other Cognitive Attention Receiving Spaces (e.g., keyword space, URL space, context space) that the exemplary an user Ub and a respective group Gc have in common with each other. Context space cross-relations may include that of user Ub having different kinds of membership rights, statuses and privileges within the corresponding group Gc; such as: general member, temporary member, special high ranking (e.g., moderating) member, and so on.

With regard to Group-to-Group (G2G) associations, the social entity identifications shown in FIG. 4C are appropriately changed to read as “Group(B)Name”; “Group(C) Name”, and so on. More specifically, a given first group (e.g., Group(B) whose name would be substituted into area 484.1*b* of FIG. 4C) may have a topic-related cross-association with a second Group of users, where both groups have a system-recognized names and further identities (e.g., accounts with permissions etc.). In that case, an entry in a modified version of column 487.1 (Grp(B)=“Tom’sGroup”—not shown) may be provided that is similar to 487*c*.2 but instead defines one or more groupB to groupC topic codes. Once again, in the case of group to group cross-relations (G2G), it is within the contemplation of the present disclosure to alternatively or additionally specify other points, nodes or subregions of other Cognitive Attention Receiving Spaces (e.g., keyword space, URL space, context space) that the exemplary group Gb and a respective group Gc have in common with each other. Context space cross-relations may include that of group Gb being a specialized subset or superset or other relations relative to the corresponding group Gc. All individual members of group Gb for example may be business clients of all members of group Gc and therefore a client-to-service provider context relationship may exist as between groups Gb and Gc (not shown in FIG. 4C, but understood to be represented by individualized exemplars Ub and Uc).

Relationships between social entities (e.g., real life persons, virtual persons, groups) may be many faceted and uni or bidirectional. By way of example, imagine two real life persons named Doctor Samuel Rose (491) and his son Jason Rose (492). These are hypothetical persons and any relation to real persons living or otherwise is coincidental. A first set of uni-directional relationships stemming from Dr. S. Rose (Sr. for short) 491 and J. Rose (Jr. for short) 492 is that Sr. is biologically the father of Jr. and is behaviorally acting as a father of Jr. A second relationship may be that from time to time Sr. behaves as the physician of Jr. A bi-directional relationship may be that Sr. and Jr. are friends in real life (ReL). They may also be online friends, for example on FaceBook™. They may also be topic-related co-chatterers in one or more online forums sponsored or tracked by the STAN_3 system 410. They may also be members of a system-recognized group (e.g., the fathers/sons get-together and discuss politics group). The variety of possible uni- and bi-directional relationships possible between Sr. (491) and Jr. (492) is represented in a nonlimiting way by the uni- and bi-directional relationship vectors 490.12 shown in FIG. 4C.

In one embodiment, at least some of the many possible uni- and bi-directional relationships between a given first user (e.g., Sr. 491) and a corresponding second user (e.g., Jr. 492) are represented by digitally compressed code sequences (including compressed ‘operator code’ sequences). The code sequences are organized so that the most common of relationships (as partially or fully specified by interlinkable/cascadable ‘operator codes’) between general first and second users are represented by short length code sequences (e.g., binary 1’s and 0’s). This reduces the amount of memory resources needed for storing codes representing the most common operative and data-dependent relationships (e.g., operatorFiF1=“former is friend of latter” combined with operatorFiF2=“under auspices of this platform:”+ data2=“FaceBook™”; operatorFiF1+operatorFiF2+ data2=“MySpace™”; operatorFiF3=“former is father of latter”, operatorFiF4=“former is son of latter”, . . . is brother of . . . , is husband of . . . , etc.). Unit 495 in FIG. 4C represents a code compressor/decompressor that in one mode compresses long relationship descriptions (e.g., cascadable operator sequences and/or Boolean combinatorial descriptions of operated-on entities) into shortened binary codes (included as part of compressor output signals 495*o*) and in another mode, decompresses the relationship defining codes back into their decompressed long forms. It is within the contemplation of the disclosure to provide the functionality of at least one of the decompressor mode and compressor mode of unit 495 in local data processing equipment of STAN users. It is also within the contemplation of the disclosure to provide the functionality of at least one of the decompressor mode and compressor mode of unit 495 in in-cloud resources of the STAN_3 system 410. The purpose of this description here is not to provide a full exegesis of data compression technologies. Rather it is to show how management and storage of relationship representing data can be practically done without consuming unmanageable amounts of storage space. Also transmission bandwidth over wireless channels can be reduced by using compressed code and decompressing at the receiving end. It is left to those skilled in the data compression arts to work out specifics of exactly which user-to-user association descriptions (U2U) are to have the shortest run length operator codes and which longer ones. The choices may vary from application to application. An example of a use of a Boolean combinatorial description of relationships might be as follows: Define STAN user Y as member of group Gxy IFF (Y is at least one of relation R1 relative to STAN user X OR relation R2 relative to X OR . . . Ra relative to X) AND (Y is all of following relations relative to X: R(a+1) AND NOT R(a+2) AND . . . R(a+b)). More generally this may be seen as a contingent expression valuation based on a Boolean product of sums. Alternatively or additionally, Boolean sums of products may be used.

Jason Rose (a.k.a. Jr. 492) may not know it, but his father, Dr. Samuel Rose (a.k.a. Sr. 491) enjoys playing in a virtual reality domain, say in the SecondLife™ domain (e.g., 460*a* of FIG. 4A) or in Zygna’s Farmville™ and/or elsewhere in the virtual reality universe. When operating in the SecondLife™ domain 494*a* (or 460*a*, and this is purely hypothetical), Dr. Samuel Rose presents himself as the young and dashing Dr. Marcus U. R. Wellnow 494 where the latter appears as an avatar who always wears a clean white lab coat and always has a smile on his face. By using this avatar 494, the real life (ReL) personage, Dr. Samuel Rose 491 develops a set of relationships (490.14) as between himself and his avatar. In turn the avatar 494 develops a related set of relationships (490.45) as between itself and other virtual social entities it interacts with in the domain 494*a* of the virtual reality universe (e.g., within SecondLife™ 460*a*). Those avatar-to-others relationships reflect back to Sr. 491 because for each, Sr. may act as the behind the scenes puppet master of that relationship. Hence, the virtual reality universe relationships of a virtual social entity such as 494 (Dr. Marcus U. Welcome) reflect back to become real world relationships felt by the controlling master, Sr. 491. In some applications it is useful for the STAN_3 system 410 to track these relationships so that Sr. 491 can keep an eye on what top topics are being currently focused-upon by his virtual reality friends. In one embodiment, before a first user can track back from a virtual reality domain to a real life (ReL) domain, at least 2 levels of permissions are required for allowing the first user to track focus in this way. First, one must ask and then be granted permission to look at a particular virtual person’s focuses and then the targeted virtual person can select which areas of focus will be visible to the watcher (e.g., which points, nodes or subregions in topic space, in keyword space, etc. for each virtual domain). Additionally, a further level of similar permissions is required if the watcher wants to track back from the watchable virtual world attributes to corresponding real life (ReL) attributes of the real life (ReL) controller of the virtual person (e.g., avatar)). In an embodiment if the permission-requesting first user is already a close friend of the real life (ReL) controller then permission is automatically granted a priori.

Jason Rose (a.k.a. Jr. 492) is not only a son of Sr. 491, he is also a business owner. Accordingly, Jr. 492 may flip between different roles (e.g., behaving as a "son", behaving as a "business owner", behaving otherwise) as surrounding circumstances change. In his business, Jr. 492 employs Kenneth Keen, an engineer (a.k.a. as KK 493). They communicate with one another via various social networking (SN) channels. Hence a variety of online relationships 490.23 develop between them as it may relate to business oriented topics or outside-of-work topics and they each take on different "roles" (which often means different contexts) as the operative relationships (e.g., 490.23) change. At times, Jr. 492 wants to keep track of what new top topics KK 493 is currently focusing-upon while acting in the role of "employee" and also what new top topics other employees of Jr. 492 are focusing-upon. Jr. 492, KK 493 and a few other employees of Jr. are STAN users. So Jr. has formulated a to-be-watched custom U2U group 496 in his STAN_3 system account. In one embodiment, Jr. 492 can do so by dragging and dropping icons representing his various friends and/or other social entity acquaintances into a custom group defining circle 496 (e.g., his circle of trust). In the same or an alternate embodiment, Jr. 492 can formulate his custom group 496 of to-be-watched social entities (real and/or virtual) by specifying group assemblage rules such as, include all my employees who are also STAN users and are friends of mine on at least one of FaceBook™ and LinkedIn™ (this is merely an example). The rules may also specify that the followed persons are to be followed in this way only when they are in the context of (in the role of) acting as an employee for example, or acting as a "friend", or irrespective of undertaken role. An advantage of such rule based assemblage is that the system 410 can thereafter automatically add and delete appropriate social entities from the custom group and filter among their various activities based on the user specified rules. Accordingly, Jr. 492 does have to hand retool his custom group definition every time he hires a new employee or one decides to seek greener pastures elsewhere and the new employees do not have to worry that their off-the-clock activities will be tracked because the rules that Jr. 492 has formulated (and optionally published to the affected social entities) limit themselves to context-based activities, in other words, only when the watched social entities are in their "employee" context (as an example). However, if in one embodiment, Jr. 492 alternatively or additionally wants to use the drag-and-drop operation to further refine his custom group 496, he can. In one embodiment, icons representing collective social entity groups (e.g., 496) are also provided with magnification and/or expansion unpacking/repacking tool options such as 496+. Hence, anytime Jr. 492 wants to see who specifically is included within his custom formed group definition and under what contexts, he can do so with use of the unpacking/repacking tool option 496+. The same tool may also be used to view and/or refine the automatic add/drop rules 496*b* for that custom formed group representation.

Aside from custom group representations (e.g., 496), the STAN_3 system 410 provides its users with the option of calling up pre-fabricated common templates 498 such as, but not limited to, a pre-programmed group template whose automatic add/drop rules (see 496*b*) cause it to maintain as its followed personas, all living members of the user's immediate family while they are operating in roles that are related to family relationships. The relationship codes (e.g., 490.12) maintained as between STAN users allows the system 410 to automatically do this. Other examples of pre-fabricated common templates 498 include all my FaceBook™ and/or MySpace™ friends during the period of the last 2 weeks; my in-STAN top topic friends during the period of the last 8 days and so on. The rules can be refined to be more selective if desired; for example: all new people who have been granted friend status by me during the period of the last 2 weeks; or all friends I have interacted with during the period of the last 8 days; or all FaceBook™ friends I have sent an email or other message to in a given time period, and so on. As the case with custom group representations (e.g., 496), each pre-programmed group template 498 may include magnification and/or expansion unpacking/repacking tool options such as 498+. Hence, anytime Jr. 492 wants to see who specifically is included within his template formed group definition and what the filter rules are, he can with use of the unpacking/repacking tool option 498+. The same tool may also be used to view and/or refine the automatic add/drop rules (see 496*b*) for that template formed group representation. When the template rules are so changed, the corresponding data object becomes a custom one. A system provided template (498) may also be converted into a custom one by its respective user (e.g., Jr. 492) by using the drag-and-drop option 496*a*.

From the above examples it is seen that relationship specifications and formation of groups (e.g., 496, 498) can depend on a large number of variables. The exploded view of relationship specifying data object 487*c* at the far left of FIG. 4C provides some nonlimiting examples. As has already been mentioned, a first field 487*c*.1 in the database record may specify one or more of user(B) to user(C) relationships by means of compressed binary codes or otherwise. A second field 487*c*.2 may specify one or more of area-of-commonality attributes. These area-of-commonality attributes 487*c*.2 can include one or more of points, nodes or subregions in topic space that are of commonality between the social entities (e.g., user(B) and user(C)) where the specified topic nodes are maintained in the area 413 of the STAN_3 system 410 database (per FIG. 4A) and where optionally the one or more topic nodes of commonality are represented by means of compressed binary operator codes and/or otherwise. It will be seen later that specification of hybrid operator codes is possible; for example ones that specify a combination of shared nodes in topic space and in context space. The specified points, nodes or subregions of commonality as between user (B) and user(C), for example, need not be limited to data-objects organizing spaces maintained by the STAN_3 system (e.g., topic space, keyword space, etc.). When out-of-STAN platforms are involved (e.g., FaceBook™, LinkedIn™, etc.), the specified area-of-commonality attributes may be ones defined by those out-of-STAN platforms rather than, or in addition to STAN_3 maintained topic nodes and the like. An example of an out-of-STAN commonality description might be: co-members of respective Discussion Groups X, Y and Z in the FaceBook™, LinkedIn™ and another domain. These too can be represented by means of compressed binary codes and/or otherwise.

Blank field 487*c*.3 is representative of many alternative or additional parameters that can be included in relationship specifying data object 487*c*. More specifically, these may include user(B) to user(C) shared platform codes for specific platforms such as FaceBook™, LinkedIn™, etc. In other words, what platforms do user(B) and user(C) have shared interests in, and under what specific subcategories of those platforms? These may include user(B) to user(C) shared event offer codes. In other words, what group discount or other online event offers do user(B) and user(C) have shared interests in? These may include user(B) to user(C) shared content source codes. In other words, what major URL's, blogs, chat rooms, etc., do user(B) and user(C) have shared interests in?

Relationships can be made, broken and repaired over the course of time. In accordance with another aspect of the present disclosure, the relationship specifying data object 487*c* may include further fields specifying when and/or where the relationship was first formed, when and/or where the relationship was last modified (and was the modification a breaking of the relationship (e.g., a de-friending?), a remaking of the last broken level or an upgrade to higher/stronger level of relationship). In other words, relationships may be defined by recorded data of one embodiment, not with respect to most recent changes but also with respect to lifetime history so that cycles in long term relationships can be automatically identified and used for automatically predicting future co-compatibilities and the like. The relationship specifying data object 487*c* may include further fields specifying when and/or where the relationship was last used, and so on. Automated group assemblage rules such as 496*b* may take advantage of these various fields of the relationship specifying data object 487*c* to automatically form group specifying objects (e.g., 496) which may then be inserted into column 101 of FIG. 1A so that their collective activities may be watched by means of radar objects such as those shown in column 101*r* of FIG. 1A.

While the user-to-user associations (U2U) space has been described above as being composed in one embodiment of tabular data structures such as panes 484.1, 484.2, etc. for respective real life (ReL) users (e.g., where pane 484.1 corresponds to the real life (ReL) user identified by ReL ID node 484.1R) and where each of the tabular data structures contain, or has pointers pointing to, further data structures such 487*c*.1, it is within the contemplation of the present disclosure to use alternate methods for organizing the data objects of the user-to-user associations (U2U) space. More specifically, an "operator nodes" method is disclosed here, for example in FIG. 3E for organizing keyword expressions as combinations, sequences and so forth in a hierarchical graph. The same approach can be used for organizing nodes or subregions of the U2U space of FIG. 4C. In that alternate embodiment (not fully shown), each real life (ReL) person (e.g., 432) has a corresponding real user identification node 484.1R stored for him in system memory. His various pseudonames (alter-ego personas) and passwords (if given) are stored in child nodes (not shown) under that ReL user ID node 484.1R. (The stored passwords are of course not shared with other users.) Additionally, a plurality of user-to-user association primitives 486P are stored in system memory (e.g., FaceBook™ friend, LinkedIn™ contact, real life biological father of: employee of:, etc.). Various operational combining nodes 487*c*.1N are provided in system memory where the operational combining nodes have pointers pointing to two or more pseudoname (alter-ego persona) nodes of corresponding users for thereby defining user-to-user associations between the pointed to social entities. An example might be: Formers Is/Are Member(s) of Latter's (FB or MS) Friends Group (see 498) where the one operational combining node (not specifically shown, see 487*c*.1N) has an ordered set of plural bi-directional pointers (one being the "latter" for example and others being the "formers") pointing to the pseudoname nodes (or ReL nodes 484.1R if permitted) of corresponding friends and at least one addition bi-directional pointer (e.g., group identifying pointer) pointing to the My (FB or MS) Friends Group definition node. Although operator nodes are schematically illustrated herein as pointing back to the primitive nodes from which they draw their inherited data, it is to be understood that, hierarchically speaking, the operator nodes are child nodes of the primitive parents from which they inherit their data. An operator node can also inherit from a hierarchically superior other operator node, where in such a case, the other operator node is the parent node.

"Operator nodes" (e.g., 487*c*.1N, 487*c*.2N) may point to other spaces aside from pointing to internal nodes of the user-to-user associations (U2U) space. More specifically, rather than having a specific operator node called "Is Member of My (FB or MS) Friends Group" as in the above example, a more generalized relations operator node may be a hybrid node (e.g., 487*c*.2N) called for example "Is Member of My (XP1 or XP2 or XP3 or . . . ) Friends Group" where XP1, XP2, XP3, etc. are inheritance pointers that can point to external platform names (e.g., FaceBook™) or to other operator nodes that form combinations of platforms or inheritance pointers that can point to more specific regions of one or more networks or to other operator nodes that form combinations of such more specific regions and by object oriented inheritance, instantiate specific definitions for the "Friends Group", or more broadly, for the corresponding user-to-user associations (U2U) node.

Hybrid operator nodes may point to other hybrid operator nodes (e.g., 487*c*.2N) and/or to nodes in various system-supported cognition "spaces" (e.g., topic space, keyword space, music space, etc.). Accordingly, by use of object-oriented inheritance functions, a hybrid operator node in U2U space may define complex relations such as, for example, "These are my associates whom I know from platforms (XP1 or XP2 or XP3) and with whom I often exchange notes within chat or other Forum Participation Sessions (FPS1 or FPS2 or FPS3) where the exchanged notes relate to the following topics and/or topic space regions: (Tn11 or (Tn22 AND Tn33) or TSR44 but not TSR55)". It is to be understood here that like XP1, XP2, etc., variables FPS1, etc.; Tn11, etc; TSR44, etc. are instantiated by way of modifiable pointers that point to fixed or modifiable nodes or areas in other cognition spaces (e.g., in topic space). Accordingly a robust and easily modifiable data-objects organizing space is created for representing in machine memory, the user-to-user associations similar to the way that other data-object to data-object associations are represented, for example the topic-node to topic-node associations (T2T) of system topic space (TS). See more specifically TS 313' of FIG. 3E.

Referring now again to FIG. 1A, the pre-specified group or individual social entity objects (e.g., 101*a*, 101*b*, . . . , 101*d*) that appear in the watched entities column 101 may vary as a function of different kinds of context (not just adopted role context as introduced above). More specifically, if the user is planning to soon attend a family event and the system 410 automatically senses that the user has this kind of topic in mind (a family relations oriented context), the My Immediate Family and My Extended Family group objects may automatically be inserted by the system 410 so as to appear in left column 101. On the other hand, if the user is at Ken's house attending the "Superbowl™ Sunday Party", the system 410 may automatically sense that the user does not want to track topics which are currently top for his family members, but rather the current top topics of his sports-topic related acquaintances. Or the system 410 may automatically sense that the user is in an "on-the-job" role (e.g., clean-up crew for Ken's party) where for this undertaken role, the user may have entirely different habits, routines and/or knowledge base rules (KBR's) in effect, where the latter can specify what objects will automatically fill the left vertical column 101 of FIG. 1A. If the system 410 on occasion, guesses wrong as to context (e.g., currently undertaken role) and/or desires of the user, this can be rectified. More specifically, if the system 410 guesses wrong as to which social entities the user now wants in his left side column 101, the user can edit that column 101 and optionally activate a "training" button (not shown) that lets the system 410 know that the user made modification is "training" one which the system 410 is to use to heuristically re-adjust its context based decision makings on.

As another example, the system 410 may have guessed wrong as to exact location and that may have led to erroneous determination of the user's current context. The user is not in Ken's house to watch the Superbowl™ Sunday football game, but rather next door, in the user's grandmother's house because the user had promised his grandmother he would fix the door gasket on her refrigerator that day. (This alternate scenario will be detailed yet further in conjunction with FIG. 1N.) In the latter case, if the Magic Marble 108 had incorrectly taken the user to the Superbowl™ Sunday floor of the metaphorical high rise building, the user can pop the Magic Marble 108 out of its usual parking area 108*z*, roll it down to the virtual elevator doors 113, and have it take him to the "Help Grandma" floor, one or a few stories above. This time when the virtual elevator doors open, the user's left side column 101 (see FIG. 1N) is automatically populated with social entities SE1n, SE2n, etc., who are likely to be able to help him with fixing Grandma's refrigerator, the invitations tray 102" (see FIG. 1N) is automatically populated by invitations to chat rooms or other forums directed to the repair of certain name brand appliances (GE™, Whirlpool™, etc.) and the lower tray offers 104 may include solicitations such as: Hey if you can't do it yourself by half-time, I am a local appliance repair person who can be at Grandma's house in 15 minutes to fix her refrigerator at an acceptable price.

If the mistaken location and/or context determining action by the STAN_3 system 410 is an important one, the user can optionally activate a "training" button (not shown) when taking the Layer-vator 113 to the correct virtual floor or system layer and this lets the system 410 know that the user made modification is a "training" one which the system 410 is to use to heuristically re-adjust its location and/or context determining decision makings on in the future.

Referring again to FIG. 1A and for purposes of a quick recap, magnification and/or unpacking/packing tools such as for example the starburst plus sign 99+ in circle 101*d* of FIG. 1A allow the user to unpack various ones of displayed objects including group representing objects (e.g., 496 of FIG. 4C) or individual representing objects (e.g., Me) and to thereby discover more detailed information such as who exactly is the Hank_123 social entity being specified (as an example) by an individual representing object that merely says Hank_123 on its face. Different people can claim to be Hank_123 on FaceBook™, on LinkedIn™, or elsewhere. The user-to-user associations (U2U) object 487*c* of FIG. 4C can be queried to see more specifically, who this Hank_123 (not shown) social entity is. Thus, when a STAN user (e.g., 432) is keeping an eye on top topics currently being focused-upon (currently receiving substantial attention) by a friend of his named Hank_123 by using the two left columns (101, 101*r*) in FIG. 1A and he sees that Hank_123 is currently focused-upon an interesting topic, the STAN user (e.g., 432) can first make sure it indeed is the Hank_123 he is thinking it is by activating the details magnification tool (e.g., starburst plus sign 99+) whereafter he can verify that yes, it is "that" Hank_123 he had met over on the FaceBook™ 441 platform in the past two weeks while he was inside discussion group number A5. Incidentally, in FIG. 4C it is to be understood that the forefront pane 484.1 is one that provides user(B) to user(C) through user(X) specifications for the case where "Tom" is user(B). Shown behind it is an alike pane 484.2 but wherein user(B) is someone else, say, Hank, and one of Hank's respective definitions of user(C) through user(X) may be "Tommy". Similarly, the next pane 484.3 may be for the case where user(B) is Chuck, and so on.

In one embodiment, when users of the STAN_3 system categorize their imported U2U submaps of friends or other contacts in terms of named Groups, as for example, "My Immediate Family" (e.g., in the Circle of Trust shown as 101*b* in FIG. 1A) versus "My Extended Family" or some other designation so that the top topics of the formed group (e.g., "My Immediate Family" 101*b*) can be watched collectively, the collective heat bars may represent unweighted or weighted and scaled averages of what are the currently focused-upon top topics of members of the group called "My Immediate Family". Alternatively, by using a settings adjustment tool, the STAN user may formulate a weighted averages collective view of his "My Immediate Family" where Uncle Ernie gets 80% weighing but weird Cousin Clod is counted as only 5% contribution to the Family Group Statistics. The temperature scale on a watched group (e.g., "My Family" 101*b*) can represent any one of numerous factors that the STAN user selects with a settings edit tool including, but not limited to, quantity of content that is being focused-upon for a given topic, number of mouse clicks (or other forms of activation, e.g., screen taps on a touch sensing screen) or other agitations associated with the on-topic content, extent of emotional involvement indicated by uploaded CFi's and/or CVi's regarding the on-topic content, and so on.

Although throughout much of this disclosure, an automated plates-packing tool (e.g., 102*a*Now) having a name of the form "My Currently Focused-Upon Top 5 Topics" is used as an example (or "Their Currently Focused-Upon Top Topics", etc.) for describing what topic-related items can be automatically provided on each serving plate (e.g., 102*b* of FIG. 1A) of invitations serving tray 102, it is to be understood that choice of "Currently Focused-Upon Top 5 Topics" is merely a convenient and easily understood example. Users may elect to manually pack topic-related invitation and/or other information providing or generating tools on different ones of named or unnamed serving plate as they please. Additionally, the invitation and/or other information providing or generating tools need not be topic related or purely topic related. They can be keyword-related or related to a hybrid combination of specified points, nodes or subregions of topic space plus specified points, nodes or subregions of context space. A more specific explanation of how a user can hand-craft the invitation and/or other information providing or generating tools will be given below in conjunction with FIG. 1N. As a quick example here, one automated invitation generating tool that may be stacked onto a serving plate (e.g., 102*c* of FIG. 1A) is one that consolidates over its displayed area, invitations to chat rooms whose current "heats" are above a predetermined threshold and whose corresponding topic nodes are within a predetermined hierarchical distance (e.g., 2 branches up and 3 branches down) relative to a favorite topic node of the user's. In other words, if the user always visits a topic node called (for example) "Best Sushi Restaurants in My Town", he may want to take notice of "hot" discussions that occasionally develop on a nearby (nearby in topic space) other topic node called (for example) "Best Sushi Restaurants in My State". The automated invitation generating tool that he may elect to manually formulate and manually stack onto one of his higher priority serving plates (e.g., in area 102*c* of FIG. 1A) may be one that is pseudo-programmed for example to say: IF Heat(emotional) in any Topic Node within 3 Hierarchical Jumps Up or Down from TN="Best Sushi Restaurants in My Town" is Greater than ThresholdLevel5, Get Invitation to Co-compatible Chat Room Anchored to that other topic node ELSE Sleep (20 minutes) and Repeat. Thus, within about 20 minute of a hot discussion breaking out in such a topic node that the user is normally not interested in, the user will nonetheless automatically get an invitation to a chat room (or other forum if applicable) which is tethered to that normally outside-of-interest-zone topic node.

Figure 1E:
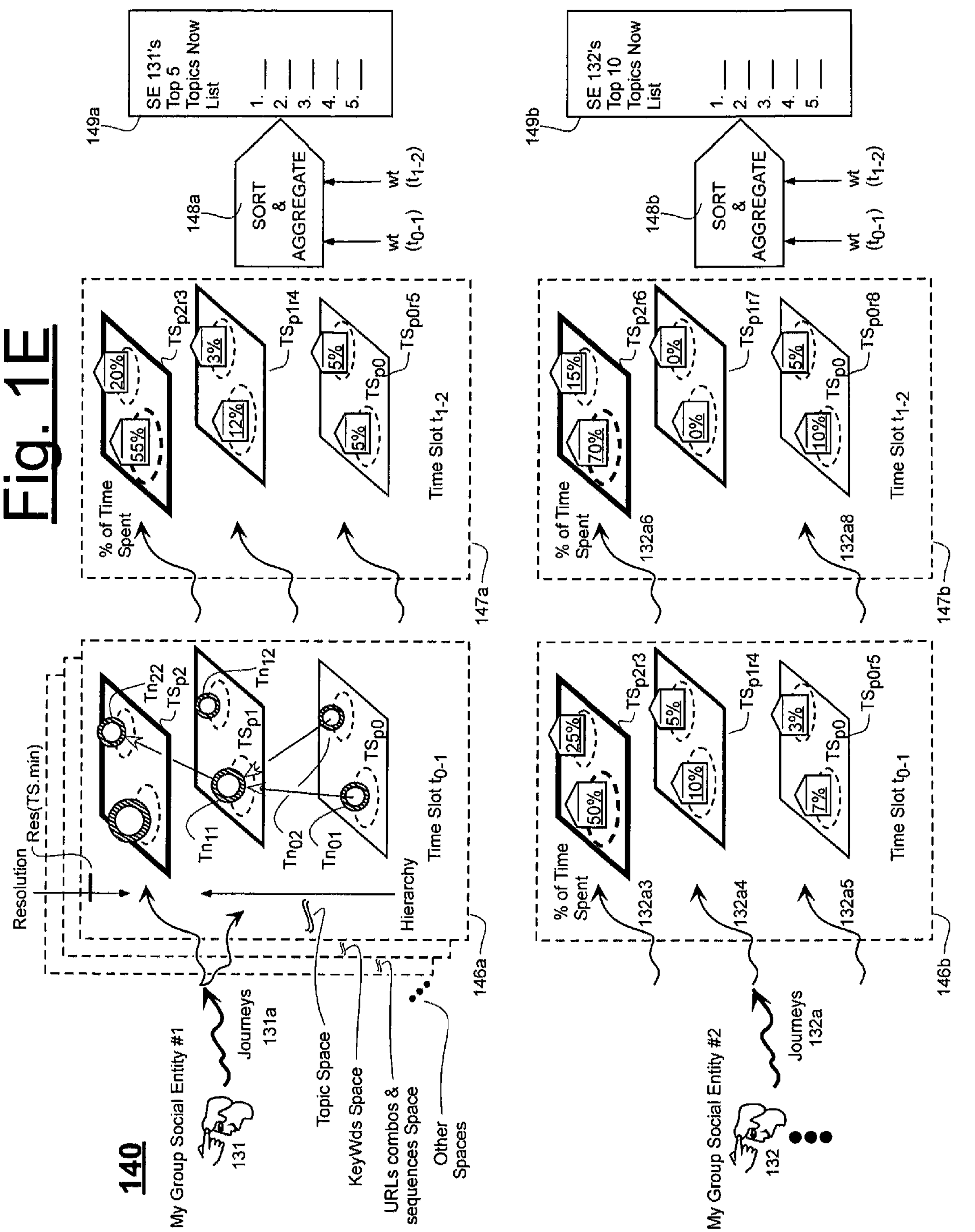
FIG. 1E shows a machine-implemented method for determining what topics are currently the top N topics being focused-upon by each social entity.
Figure 1F:
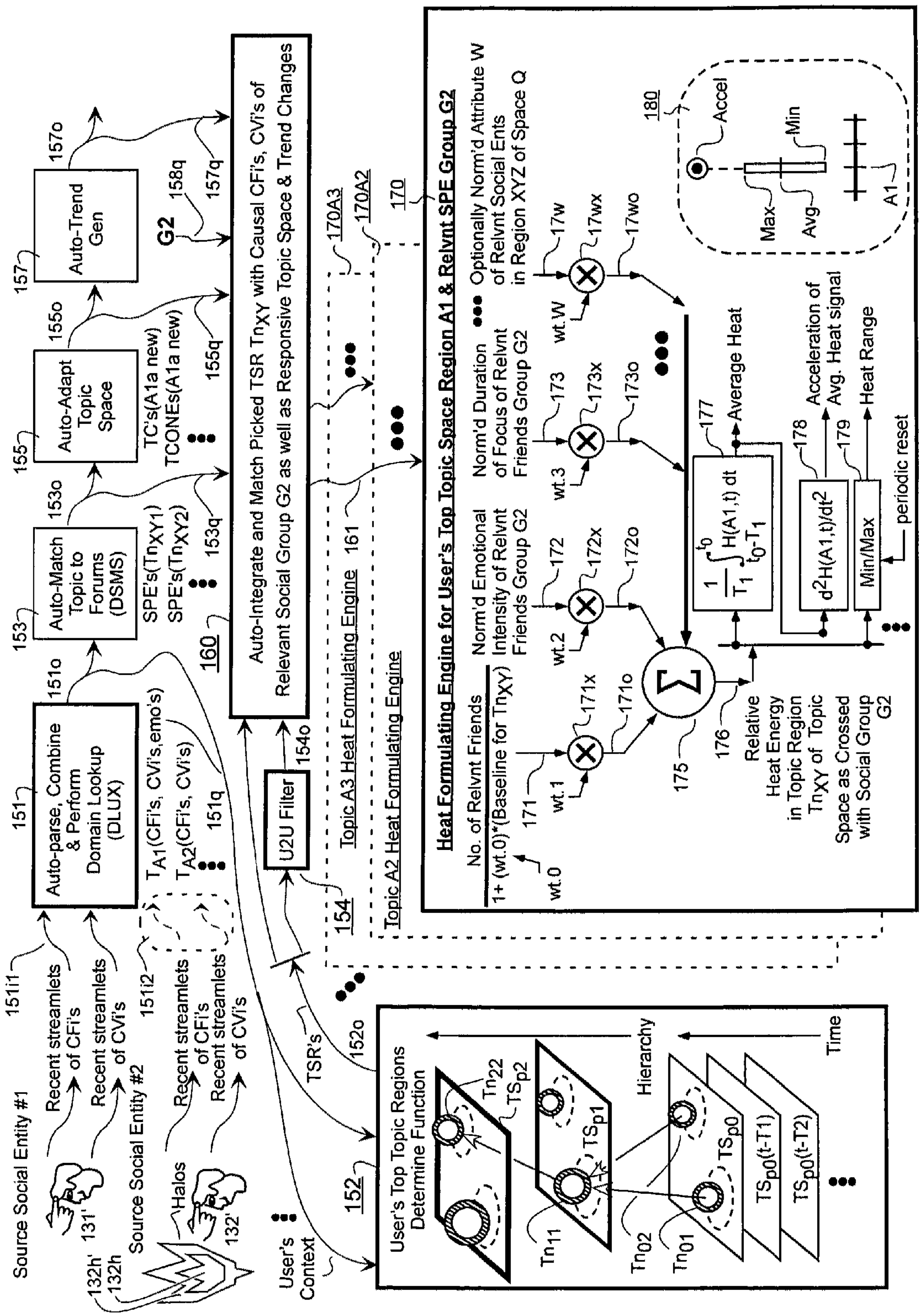
FIG. 1F shows a machine-implemented system for computing heat attributes that are attributable to a respective first user (e.g., Me) and to a cross-correlation between a given topic space region and a preselected one or more second users (e.g., My Friends and Family) of the system.
Figure 1G:
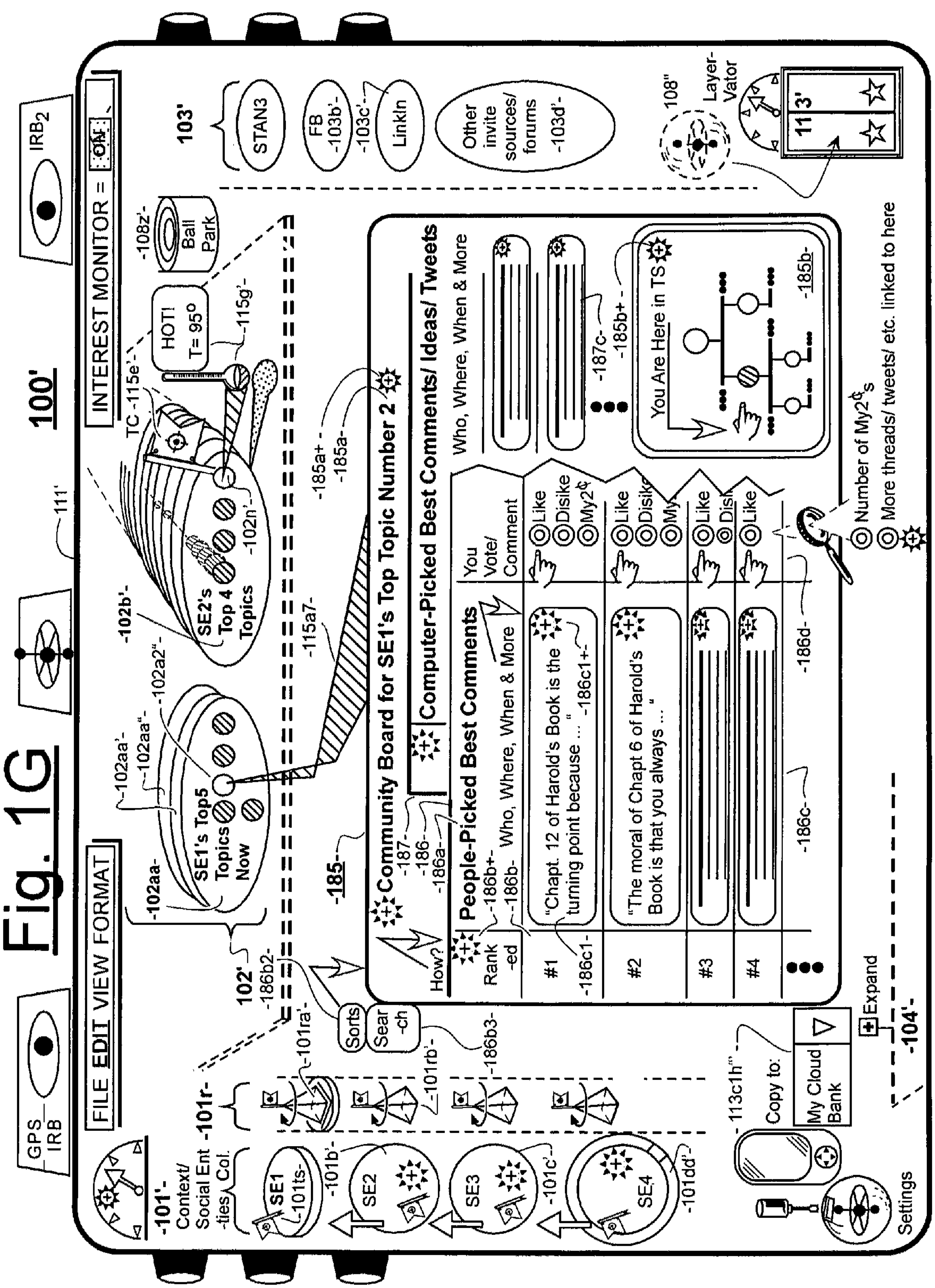
FIG. 1G shows an automated community board posting system that includes a posts ranking and/or promoting subsystem in accordance with the disclosure.
Figure 1I:
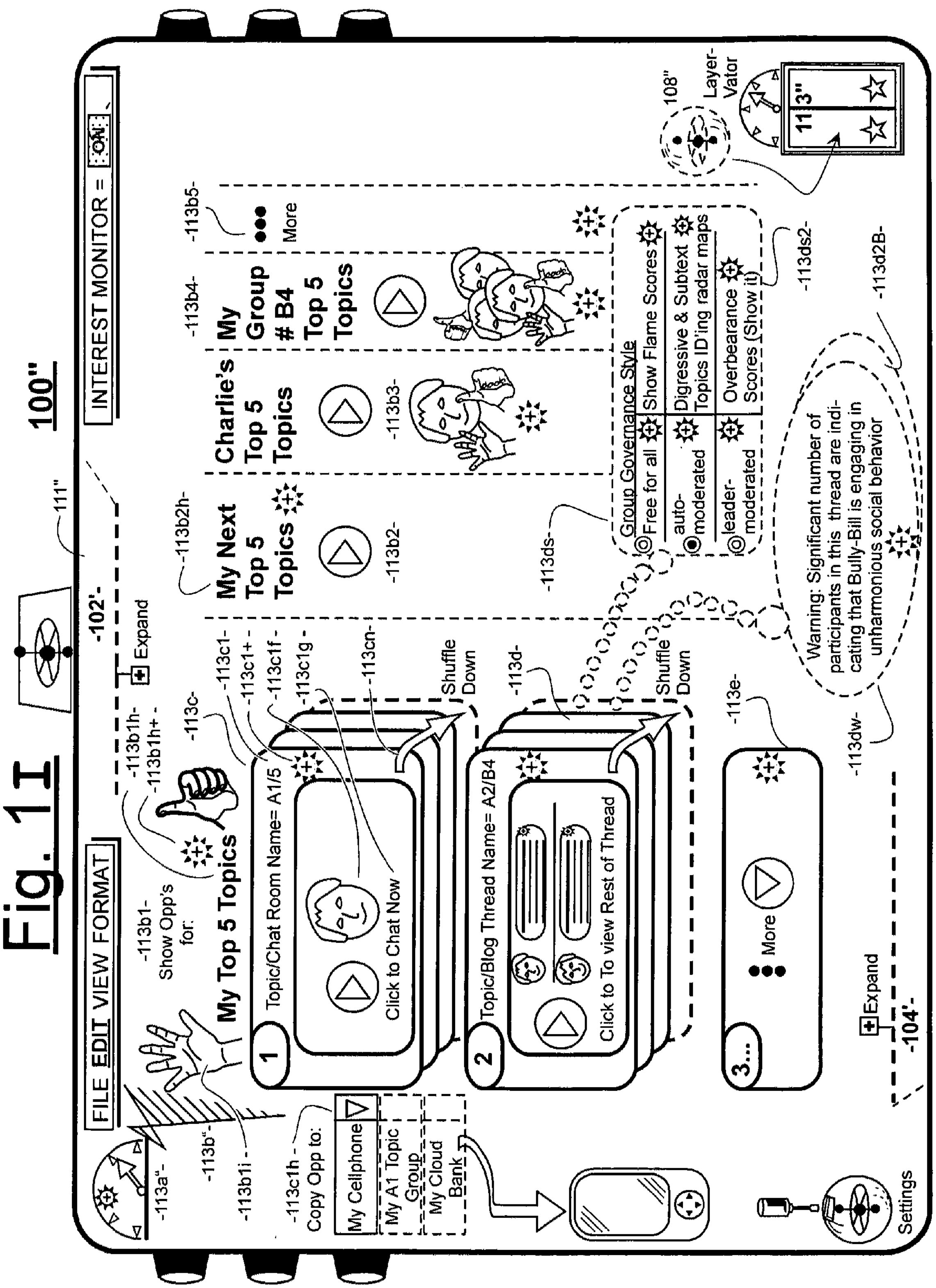
FIG. 1I shows a cell/smartphone or tablet computer having a mobile-compatible user interface for presenting 1-click chat-now and alike, on-topic joinder opportunities to users of the STAN_3 system.
Figure 1K:
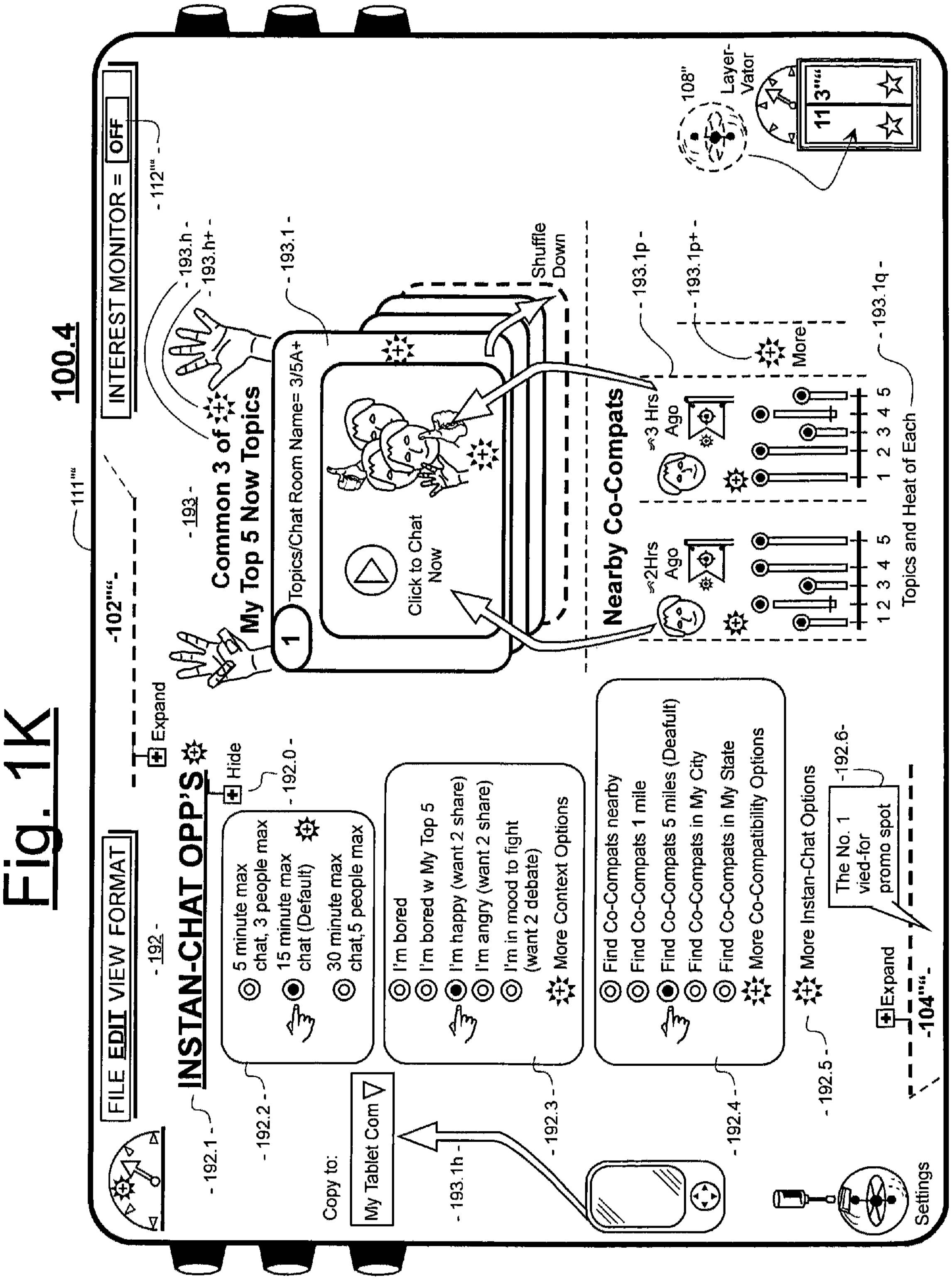
FIG. 1K shows a smartphone and tablet computer compatible user interface method for presenting an M out of N, now commonly focused-upon topics and optional location based chat or other joinder opportunities to users of the STAN_3 system.
Figure 1N:
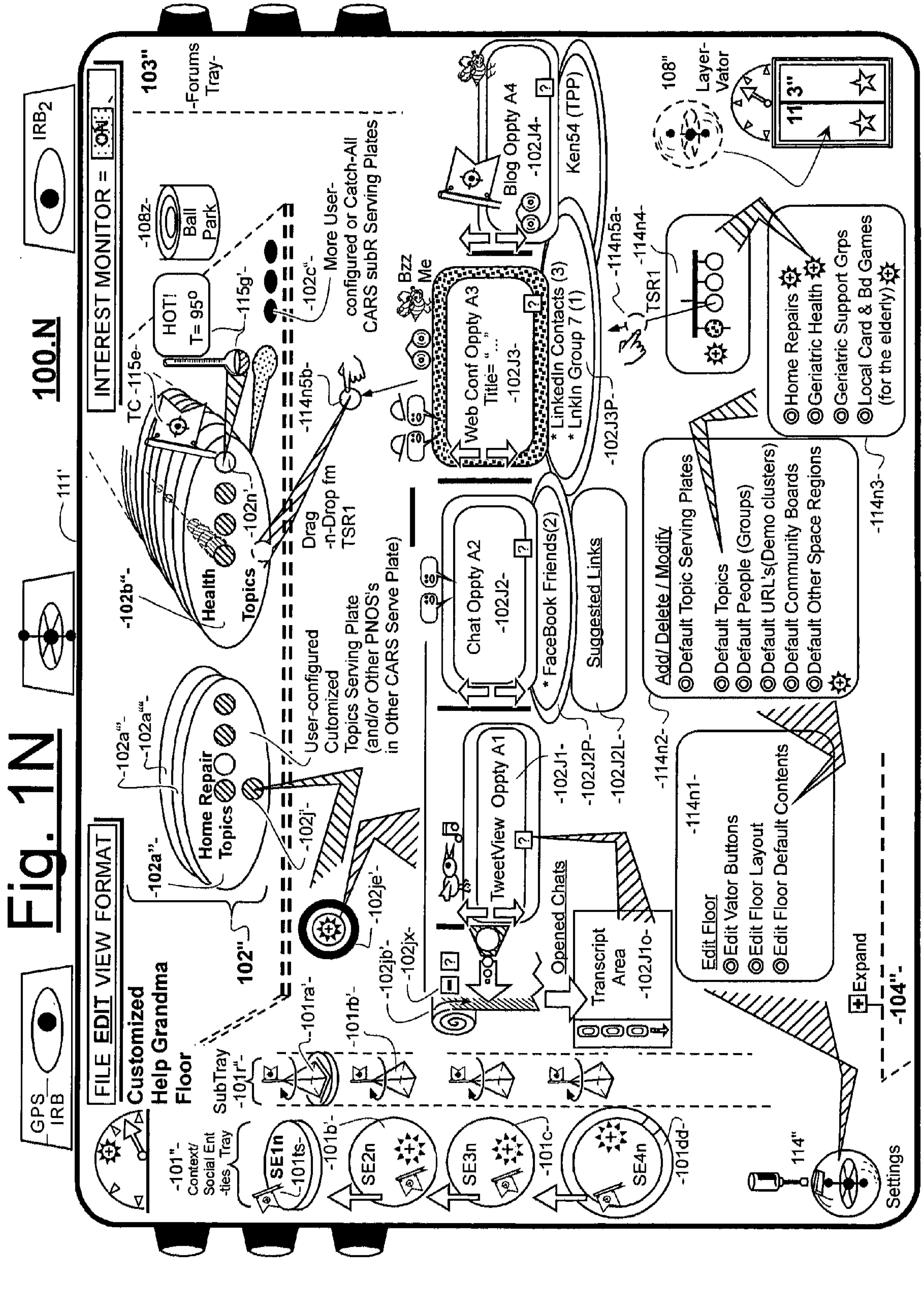
FIG. 1N shows how the layout and content of each floor in a virtual multi-storied building can be re-organized as the user desires (e.g., for a "Help Grandma Today" day)

Yet another automated invitation generating tool that the user may elect to manually attach to one of his serving plates or to have the system 410 automatically attach onto one of the serving plates on a particular Layer-Vator™ floor he visits (see FIG. 1N: Help Grandma) can be one called: "Get Invitations to Top 5 DIVERSIFIED Topics of Entity(X)" where X can be "Me" or "Charlie" or another identified social entity and the 5 is just an exemplary number. The way the latter tool works is as follows. It does not automatically fetch the topic identifications of the five first-listed topics (see briefly list 149*a* of FIG. 1E) on Entity(X)'s top N topics list. Instead it fetches the topmost first topic on the list and it determines where in topic space the corresponding topic node (or TSR) is located. Then it compares the location in topic space of the node or TSR of the next listed topic. If that location is within a predetermined radius distance (e.g., spatial or based on number of hierarchical jumps in a topic space tree) of the first node, the second listed item (of top N topics) is skipped over and the third item is tested. If the third item has its topic node (or TSR) located far enough away, an invitation to that topic is requested. The acceptable third item becomes the new base from which to find a next, sufficiently diversified topic on Entity(X)'s top N topics list and so on. In one embodiment, if the end of a list is reached, wrap-around is blocked so that the algorithm does not circle back to pick up nondiversified items. In an alternate embodiment, wrap-around is allowed. It is within the contemplation of the disclosure to use variations on this theme such as a linearly or geometrically increasing distance requirement for "diversification" as opposed to a constant one; or a random pick of which out of the first top 5 topics in Entity(X)'s top N topics list will serve as the initial base for picking other topics, and so on. It is also within the contemplation of the disclosure to provide such diversified sampling for points, nodes or subregions that draw substantial attention but are located in other Cognitive Attention Receiving Spaces such as keyword space, URL space, social dynamics space and so on. Incidentally, when a "Get Invitations to Top 5 DIVERSIFIED Topics of Entity(X)" function is requested but Entity(X) only currently has 3 topics that are above threshold and thus qualify as being diversified, then the system reports (shows) only those 3, and leaves the other 2 slots as blank or not shown.

An example of why a DIVERSIFIED Topics picker might be desirable is this. Suppose Entity(X) is Cousin Wendy and unfortunately, Cousin Wendy is obsessed with Health Maintenance topics. Invariably, her top 5 topics list will be populated only with Health Maintenance related topics. The user (who is an inquisitive relative of Cousin Wendy) may be interested in learning if Cousin Wendy is still in her Health Maintenance infatuation mode. So yes, if he is analyzing Cousin Wendy's currently focused-upon topics, he will be willing to see one sampling which points to a topic node or associated chat or other forum participation session directed to that same old and tired topic, but not ten all pointing to that one general topic subregion (TSR). The user may wish to automatically skip the top 10 topics of Cousin Wendy's list and get to item number 11, at which for the first time in Cousin Wendy's list of currently focused-upon topics, points to an area in topic space far away from the Health Maintenance subregion. This next found hit will tell the inquisitive user (the relative of Cousin Wendy) that Wendy is also currently focused-upon, but not so much, on a local political issue, on a family get together that is coming up soon, and so on. (Of course, Cousin Wendy is understood to have not blocked out these other topics from being seen by inquisitive My Family members.)

In one embodiment, two or more top N topics mappings (e.g., heat pyramids) for a given social entity (e.g., Cousin Wendy) are displayed at the same time, for example her Undiversified Top 5 Now Topics and her Highly Diversified Top 5 Now Topics. This allows the inquiring friend to see both where the given social entity (e.g., Cousin Wendy) is concentrating her focus heats in an undiversified one topic space subregion (e.g., TSR1) and to see more broadly, other topic space subregions (e.g., TSR2, TSR3) where the given social entity is otherwise applying above-threshold or historically high heats. In one embodiment, the STAN_3 system 410 automatically identifies the most highly diversified topic space subregions (e.g., TSR1 through TSR9) that have been receiving above-threshold or historically increased heats from the given social entity (e.g., Cousin Wendy) during the relevant time duration (e.g., Now or Then) and the system 410 then automatically displays a spread of top N topics mappings (e.g., heat pyramids) for the given social entity (e.g., Cousin Wendy) across a spectrum, extending from an undiversified top N topics Then mapping to a most diversified Last Ones of the Then Above-threshold M topics (where here M≤N) and having one or more intermediate mappings of less and more highly diversified topic space subregions (e.g., TSR5, TSR7) between those extreme ends of the above-threshold heat receiving spectrum.

Aside from the DIVERSIFIED Topics picker, the STAN_3 system 410 may provide many other specialized filtering mechanisms that use rule-based criteria for identifying nodes or subregions in topic space (TS) or in another system-supported space (e.g., a hybrid of topic space and context space for example). One such example is a population-rarifying topic-and-user identifying tool (not shown) which automatically looks at the top N now topics of a substantially-immediately contactable population of STAN users versus the top N now topics of one user (e.g., the user of computer 100). It then automatically determines which of the one user's top N now topics (where N can be 1, 2, 3, etc. here) is most popularly matched within the top N now topics of the substantially-immediately contactable population of other STAN users and it eliminates that popular-attention drawing topic from the list of shared topics for which co-focused users are to be identified. The system (410) thereafter tries to identify the other users in that population who are concurrently focused-upon one or more topic nodes or topic space subregion (TSRs) described by the pruned list (the list which has the most popular topic removed from it). Then the system indicates to the one user (e.g., of computer 100) how many persons in the substantially-immediately contactable population are now focused-upon one or more of the less popular topics, which topics (which nodes or subregions); and if the other users had given permission for their identity to be publicized in such a way, the identifications of the other users who are now focused-upon one or more of the less popular, but still worthy of attention topics. Alternatively or additionally, the system may automatically present the users with chat or other forum participation opportunities directed only to their respective less popular topics of concurrent focus. One example of an invitations filter option that can be presented in the drop down menu 190*b* of FIG. 1J can read as follows: "The Least Popular 3 of My Top 5 Now Topics Among Other Users Within 2 Miles of Me". Another similar filtering definition may appear among the offered card stacks of FIG. 1K and read: "The Least Popular 4 of My Top 10 Now Topics Among Other Users Now Chatting Online and In My Time Zone" (this being a non-limiting example).

The terminology, "substantially-immediately contactable population of STAN users" as used immediately above can have a selected one or more of the following meanings: (1) other STAN users who are physically now in a same room, building, arena or other specified geographic locality such that the first user (of computer 100) can physically meet them with relative ease; (2) other STAN users who are now participating in an online chat or other forum participation session which the first user is also now participating in; (3) other STAN users who are now currently online and located within a specified geographic region; (4) other STAN users who are now currently online; (5) other STAN users who are now currently contactable by means of cellphone texting or other forms of text-like communication (e.g., tablet texting) or other such socially less-intrusive-than direct-talking techniques; and (6) other STAN users who are now currently available for meeting in person or virtually online (e.g., video chat using a real body image or an avatar body image or a hybrid mixture of real and avatar body image—such as for example a partially masked image of the user's real face that does not show the nose and areas around the eyes) because the one or more other STAN users have nothing much to do at the moment (not keenly focused on anything), they are bored and would welcome communicative contact of a pre-specified kind (e.g., avatar based video chat) in the immediate future and for a predetermined duration. The STAN_3 system can automatically determine or estimate what that predetermined duration is by, for example, looking at the digitized calendars, to-do-lists, etc. of the prospective chatterers and/or using the determined personal contexts and corresponding PHAFUEL records (habits, routines) of the chatterers (where the habits, routines data may inform as to the typical free time of the user under the given circumstances).

It is within the contemplation of the disclosure to augment the above exemplary option of "The Least Popular 3 of My Top 5 Now Topics Among Other Users Within 2 Miles of Me" to instead read for example: "The Least Popular 3 of My Top 5 Now DIVERSIFIED Topics Among Other Users Within 10 Miles of Me" or "The Least Popular 2 of Wendy's Top 5 Now DIVERSIFIED Topics Among Other Users Now online".

An example of the use of a filter such as for example "The Least Popular 3 of My Top 5 Now DIVERSIFIED Topics Among Other Users Attending Same Conference as Me" can proceed as follows. The first user (of computer 100) is a medical doctor attending a conference on Treatment and Prevention of Diabetes. His number one of My Top 5 Now Topics is "Treatment and Prevention of Diabetes". In fact for pretty much every other doctor at the conference, one of their Top 5 Now Topics is "Treatment and Prevention of Diabetes". So there is little value under that context in the STAN_3 system 410 connecting any two or more of them by way of invitation to chat or other forum participation opportunities directed to that highly popular topic (at that conference). Also assume that all five of the first user's Top 5 Now Topics are directed to topics that relate in a fairly straight forward manner to the more generalized topic of "Diabetes". However, let it be assumed that the first user (of computer 100) has in his list of "My Top 5 Now DIVERSIFIED Topics", the esoteric topic of "Rare Adverse Drug Interactions between Pharmaceuticals in the Class 8 Compound Category" (a purely hypothetical example). The number of other physicians attending the same conference and being currently focused-upon the same esoteric topic is relatively small. However, as dinner time approaches, and after spending a whole day of listening to lectures on the number one topic ("Treatment and Prevention of Diabetes") the first user would welcome an introduction to a fellow doctor at the same conference who is currently focused-upon the esoteric topic of "Rare Adverse Drug Interactions between Pharmaceuticals in the Class 8 Compound Category" and the vise versa is probably true for at least one among the small subpopulation of conference-attending doctors who are similarly currently focused-upon the same esoteric topic. So by using the population-rarifying topic and user identifying tool (not shown), individuals who are uniquely suitable for meeting each other at say a professional conference, or at a sporting event, etc., can determine that the similarly situated other persons are substantially-immediately contactable and they can inquire if those other identifiable persons are now interested in meeting in person or even just via electronic communication means to exchange thoughts about the less locally popular other topics.

The example of "Rare Adverse Drug Interactions between Pharmaceuticals in the Class 8 Compound Category" (a purely hypothetical example) is merely illustrative. The two or more doctors at the Diabetes conference may instead have the topic of "Best Baseball Players of the 1950's" as their common esoteric topic of current focus to be shared during dinner.

Yet another example of an esoteric-topic filtering inquiry mechanism supportable by the STAN_3 system 410 may involve shared topics that have high probability of being ridiculed within the wider population but are understood and cherished by the rarified few who indulge in that topic. Assume as a purely hypothetical further example that one of the secret current passions of the exemplary doctor attending the Diabetes conference is collecting mint condition Super-Man™ Comic Books of the 1950's. However, in the general population of other Diabetes focused doctors, this secret passion of his is likely to be greeted with ridicule. As dinner time approaches, and after spending a whole day of listening to lectures on the number one topic ("Treatment and Prevention of Diabetes") the first user would welcome an introduction to a fellow doctor at the same conference who is currently focused-upon the esoteric topic of "Mint Condition Super-Man™ Comic Books of the 1950's". In accordance with the present disclosure, the "My Top 5 Now DIVERSIFIED Topics" is again employed except that this time, it is automatically deployed in conjunction with a True Passion Confirmation mechanism (not shown). Before the system generates invitations or other introductory propositions as between the two or more STAN users who are currently focused-upon an esoteric and likely-to-meet-with-ridicule topic, the STAN_3 system 410 automatically performs a background check on each of the potential invitees to verify that they are indeed devotees to the same topic, for example because they each participated to an extent beyond a predetermined threshold in chat room discussions on the topic and/or they each cast an above-threshold amount of "heat" at nodes within topic space (TS) directed to that esoteric topic. Then before they are identified to each other by the system, the system sends them some form of verification or proof that the other person is also a devotee to the same esoteric but likely-to-meet-with-ridicule by the general populace topic. Once again, the example of “Mint Condition SuperMan™ Comic Books of the 1950’s” is merely an illustrative example. The likely-to-meet-with-ridicule by the general populace topic can be something else such as for example, People Who Believe in Abduction By UFO’s, People Who Believe in one conspiracy theory or another or all of them, etc. In accordance with one embodiment, the STAN_3 system 410 provides all users with a protected-nodes marking tool (not shown) which allows each user to mark one or more nodes or subregions in topic space and/or in another space as being “protected” nodes or subregions for which the user is not to be identified to other users unless some form of evidence is first submitted indicating that the other user is trustable in obtaining the identification information, for example where the pre-offered evidence demonstrates that the other user is a true devotee to the same topic based on past above-threshold casting of heat on the topic for greater than a predetermined time duration. The “protected” nodes or subregions category is to be contrasted against the “blocked” nodes or subregions category, where for the latter, no other member of the user community can gain access to the identification of the first user and his or her ‘touchings’ with those “blocked” nodes or subregions unless explicit permission of a predefined kind is given by the first user. In one embodiment, a nascent meet up (online or in real life) that involves potentially sensitive (e.g., embarrassing) subject matter is presaged by a series of progressively more revealing communication. For example, the at first, strangers-to-each-other users might first receive an invite that is text only as a prelude to a next communication where the hesitant invitees (if they indicate acceptance to the text only suggestion or request) are shown avatar-only images of one another. If they indicate acceptance to that next more revealing mode of communication, the system can step up the revelation by displaying partially masked (e.g., upper face covered) versions of their real body images. If the hesitant to meet invitees accept each successive level of increased unmasking, eventually they may agree to meet in person or to start a live video chat where they show themselves and perhaps reveal their real life (ReL) identities to each other.

Referring again to FIG. 4A, and more specifically, to the U2U importation part 432*m* thereof, after an external list of friends, buddies, contacts. followed personas, and/or the alike have been imported for a first external social networking (SN) platform (e.g., FaceBook™) and the imported contact identifications have been optionally categorized (e.g., as to which topic nodes they relate, which discussion groups and/or other), the process can be repeated for other external content resources (e.g., MySpace™, LinkedIn™, etc.). FIG. 4B details an automated process by way of which the user can be coaxed into providing the importation supporting data.

Referring to FIG. 4B, shown is a machine-implemented and automated process 470 by way of which a user (e.g., 432) might be coached through a step of steps which can enable the STAN_3 system 410 to import all or a filter-criteria determined subset of the second user’s external, user-to-user associations (U2U) lists, 432L1, 432L2, etc. (and/or other members of list groups 432L and 432R) into STAN_3 stored profile record areas 432*p*2 for example of that second user 432.

Process 470 is initiated at step 471 (Begin). The initiation might be in automated response to the STAN_3 system determining that user 432 is not heavily focusing upon any on-screen content of his CPU (e.g., 432*a*) at this time and therefore this would likely be a good time to push an unsolicited survey or favor request on user 432 for accessing his external user-to-user associations (U2U) information.

The unsolicited usage survey push begins at step 472. Dashed logical connection 472*a* points to a possible survey dialog box 482 that might then be displayed to user 432 as part of step 472. The illustrated content of dialog box 482 may provide one or more conventional control buttons such as a virtual pushbutton 482*b* for allowing the user 432 to quickly respond affirmatively to the pushed (e.g., popped up) survey proposal 482. Reference numbers like 482*b* do not appear in the popped-up survey dialog box 482. Embracing hyphens like the ones around reference number 482*b* (e.g., “–482*b*–”) indicate that it is a nondisplayed reference number. A same use of embracing hyphens is used in other illustrations herein of display content to indicate nondisplay thereof.

More specifically, introduction information 482*a* of dialog box 482 informs the user of what he is being asked to do. Pushbutton 482*b* allows the user to respond affirmatively in a general way. However, if the STAN_3 has detected that the user is currently using a particular external content site (e.g., FaceBook™, MySpace™, LinkedIn™, etc.) more heavily than others, the popped-up dialog box 482 may provide a suggestive and more specific answer option 482*e* for the user whereby the user can push one rather than a sequence of numerous answer buttons to navigate to his desired conclusion. If the user hits the close window button (the upper right X) that is taken as a no, don’t bother me about this. On the other hand, if the user does not want to be now bothered, he can click or tap on (or otherwise activate) the Not-Now button 482*c*. In response to this, the STAN_3 system will understand that it guessed wrong on user 432 being in a solicitation welcoming mode and thus ready to participate in such a survey. The STAN_3 system will adaptively alter its survey option algorithms for user 432 so as to better guess when in the future (through a series of trials and errors) it is better to bother user 432 with such pushed (unsolicited) surveys about his external user-to-user associations (U2U). Pressing of the Not-Now button 482*c* does not mean user 432 never wants to be queried about such information, just not now. The task is rescheduled for a later time. User 432 may alternatively press the Remind-me-via-email button 482*d*. In the latter case, the STAN_3 system will automatically send an email to a pre-selected email account of user 432 for again inviting him to engage in the same survey (482, 483) at a time of his choosing. The sent email will include a hyperlink for returning the user to the state of step 472 of FIG. 4B. The More-Options button 482*g* provides user 432 with more action options and/or more information. The other social networking (SN) button 482*f* is similar to 482*e* but guesses as to an alternate external network account which user 432 might now want to share information about. In one embodiment, each of the more-specific affirmation (OK) buttons 482*e* and 482*f* includes a user modifiable options section 482*s*. More specifically, when a user affirms (OK) that he or she wants to let the STAN_3 system import data from the user’s FaceBook™ account(s) or other external platform account(s), the user may simultaneously wish to agree to permit the STAN_3 system to automatically export (in response to import requests from those identified external accounts) some or all of shareable data from the user’s STAN_3 account(s). In other words, it is conceivable that in the future, external platforms such as FaceBook™, MySpace™ LinkedIn™, GoogleWave™, GoogleBuzz™, Google Social Search™, FriendFeed™, blogs, ClearSpring™, YahooPulse™, Friendster™, Bebo™, etc. might evolve so as to automatically seek cross-pollination data (e.g., user-to-user associations (U2U) data) from the STAN_3 system and by future agreements such is made legally possible. In that case, the STAN_3 user might wish to leave the illustrated default of “2-way Sharing is OK” as is.

Alternatively, the user may activate the options scroll down sub-button within area 482_s_ of OK virtual button 482_e_ and pick another option (e.g., "2-way Sharing between platforms NOT OK"—option not shown).

If in step 472 the user has agreed to now being questioned, then step 473 is next executed. Otherwise, process 470 is exited in accordance with an exit option chosen by the user in step 472. As seen in the next popped-up and corresponding dialog box 483, after agreeing to the survey, the user is again given some introductory information 483_a_ about what is happening in this proposed dialog box 483. Data entry box 483_b_ asks the user for his user-name as used in the identified outside account. A default answer may be displayed such as the user-name (e.g., "Tom") that user 432 uses when logging into the STAN_3 system. Data entry box 483_c_ asks the user for his user-password as used in the identified outside account. The default answer may indicate that filling in this information is optional. In one embodiment, one or both of entry boxes 483_b_, 483_c_ may be automatically pre-filled by identification data automatically obtained from the encodings acquisition mechanism of the user's local data processing device. For example a built-in webcam automatically recognizes the user's face and thus user identity, or a built-in audio pick-up automatically recognizes his/her voice and/or a built-in wireless key detector automatically recognizes presence of a user possessed key device whereby manual entry of the user's name and/or password is not necessary and instead an encrypted container having such information is unlocked by the biometric recognition and its plaintext data sent to entry boxes 483_b_, 483_c_; thus step 473 can be performed automatically without the user's manual participation. Pressing button 483_e_ provides the user with additional information and/or optional actions. Pressing button 483_d_ returns the user to the previous dialog box (482). In one embodiment, if the user provides the STAN_3 system with his external account password (483_c_), an additional pop-up window asks the user to give STAN_3 some time (e.g., 24 hours) before changing his password and then advices him to change his password thereafter for his protection. In one embodiment, the user is given an option of simultaneously importing user account information from multiple external platforms and for plural ones of possibly differently named personas of the user all at once.

In one embodiment, after having obtained the user's username and password for an external platform, the STAN_3 system asks the user for permission to continue using the user's login name and password of the external platform for purpose of sending lurker BOT's under his login for thereby automatically collecting data that the user is entitled to access; which data may input chat or other forum participation sessions within the external platform that appear to be on-topic with respect to a listed top N now topics of the user and thus worthy of alerting to user about, especially if he is currently logged into the STAN_3 system but not into the external platform.

In one embodiment, after having obtained the user's username and password for an external platform, the STAN_3 system asks the user for permission to log in at a later time and refresh its database regarding the user's friendship circles without bothering the user again.

Although the interfacing between the user and the STAN_3 system is shown illustratively as a series of dialog boxes like 482 and 483 it is within the contemplation of this disclosure that various other kinds of control interfacing may be used to query the user and that the selected control interfacing may depend on user context at the time. For example, if the user (e.g., 432) is currently focusing upon a SecondLife™ environment in which he is represented by an animated avatar (e.g., MW_2 nd_life in FIG. 4C), it may be more appropriate for the STAN_3 system to present itself as a survey-taking avatar (e.g., a uniformed NPC with a clipboard) who approaches the user's avatar and presents these inquiries in accordance with that motif. On the other hand, if the user (e.g., 432) is currently interfacing with his CPU (e.g., 432_a_) by using a mostly audio interface (e.g., a BlueTooth™ microphone and earpiece), it may be more appropriate for the STAN_3 system to present itself as a survey-taking voice entity that presents its inquiries (if possible) in accordance with that predominantly audio motif, and so on.

If in step 473 the user has provided one or more of the requested items of information (e.g., 483_b_, 483_c_), then in subsequent step 474 the obtained information is automatically stored into an aliases tracking portion (e.g., record(s)) of the system database (DB 419). Part of an exemplary DB record structure is shown at 484 and a more detailed version is shown as database section 484.1 in FIG. 4C. For each entered data column in FIG. 4B, the top row identifies the associated SN or other content providing platform (e.g., FaceBook™, MySpace™, LinkedIn™, etc.). The second row provides the username or other alias used by the queried user (e.g., 432) when the latter is logged into that platform (or presenting himself otherwise on that platform). The third row provides the user password and/or other security key(s) used by the queried user (e.g., 432) when logging into that platform (or presenting himself otherwise for validate recognition on that platform). Since providing passwords is optional in data entry box 483_c_, some of the password entries in DB record structure 484 are recorded as not-available (N/A); this indicating the user (e.g., 432) chose to not share this information. As an optional substep in step 473, the STAN_3 system 410 may first grab the user-provided username (and optional password) and test these for validity by automatically presenting them for verification to the associated outside platform (e.g., FaceBook™, MySpace™ LinkedIn™, etc.). If the outside platform responds that no such username and/or password is valid on that outside platform, the STAN_3 system 410 flags an error condition to the user and does not execute step 474. Although exemplary record 484 is shown to have only 3 rows of data entries, it is within the contemplation of the disclosure to include further rows with additional entries such as, alternate UsrName and alternate password (optional), usable photograph or other face-representing image of the user, interests lists, and calendaring/to-do list information of the user as used on the same platform, the user's naming of best friend(s) on the same platform, the user's namings of currently being "followed" influential personas on the same platform, and so on. Yet more specifically, in FIG. 4C it will be shown how various types of user-to-user (U2U) relationships can be recorded in a user(B) database section 484.1 where the recorded relationships indicate how the corresponding user (B) (e.g., 432) relates to other social entities including to out-of-STAN entities (e.g., user(C), . . . , user(X)).

In next step 475 of FIG. 4B, the STAN_3 system uses the obtained username (and optional password and optional other information) for locating and beginning to access the user's local and/or online (remote) friend, buddy, contacts, etc. lists (432L, 432R). The user may not want to have all of this contact information imported into the STAN_3 system for any of a variety of reasons. After having initially scanned the available contact information and how it is grouped or otherwise organized in the external storage locations, in next step 476 the STAN_3 system presents (e.g., via text, graphical icons and/or voice presentations) a set of import permission options to the user, including the option of importing all, importing none and importing a more specific and user specified subset of what was found to be available. The user makes his selection(s) and then in next step 477, the STAN_3 system imports the user-approved portions of the externally available contact data into a STAN_3 scratch data storage area (not shown) for further processing (e.g., clean up and deduping) before the data is incorporated into the STAN_3 system database. For example, the STAN_3 system checks for duplicates and removes these so that its database 419 will not be filled with unnecessary duplicate information.

Then in step 478 the STAN_3 system converts the imported external contacts data into formats that conform to data structures used within the External STAN Profile records (431*p*2, 432*p*2) for that user. In one embodiment, the conform format is in accordance with the user-to-user (U2U) relationships defining sections, 484.1, 484.2, . . . , etc. shown in FIG. 4C. With completion of step 478 of FIG. 4B for each STAN_3 registered user (e.g., 431, 432) who has allowed at one time or another for his/her external contacts information to be imported into the STAN_3 system 410, the STAN_3 system may thereafter automatically inform that user of when his friends, buddies, contacts, best friends, followed influential people, etc. as named in external sites are already present within or are being co-invited to join a chat opportunity or another such online forum and/or when such external social entities are being co-invited to participate in a promotional or other kind of group offering (e.g., Let's meet for lunch) and/or when such external social entities are focusing with "heat" on current top topics (102*a*_Now in FIG. 1A) of the first user (e.g., 432).

This kind of additional information (e.g., displayed in columns 101 and 101*r* of FIG. 1A and optionally also inside popped open promotional offerings like 104*a* and 104*t*) may be helpful to the user (e.g., 432) in determining whether or not he wishes to accept a given in-STAN-Vitation™ or a STAN-provided promotional offering or a content source recommendation where such may be provided by expanding (unpacking) an invitations/suggestions compilation such as 102*j* of FIG. 1A. Icon 102*j* represents a stack of invitations all directed to the same one topic node or same region (TSR) of topic space; where for sake of compactness the invitations are shown as a pancake stack-like object. The unpacking of a stack of invitations 102*j* will be more clearly explained in conjunction with FIG. 1N. For now it is sufficient to understand that plural invitations to a same topic node may occur for example, if the plural invitations originate from friendships made within different platforms 103. For convenience it is useful to stack invitations directed to a same topic or same topic space region (TSR) one same pile (e.g., 102*j*). More specifically, when the STAN user activates a starburst plus sign such as shown within consolidated invitations/suggestions icon 102*j*, the unpacked and so displayed information will provide one or more of on-topic invitations, separately displayed (see FIG. 1N), to respective online forums, on-topic invitations to real life (ReL) gatherings, on-topic suggestions pointing to additional on-topic content as well as indicating if and which of the user's friends or other social entities are logical linked with respective parts of the unpacked information. In one embodiment, the user is given various selectable options including that of viewing in more detail a recommended content source or ongoing online forum. The various selectable options may further include that of allowing the user to conveniently save some or all of the unpacked data of the consolidated invitations/suggestions icon 102*j* for later access to that information and the option to thereafter minimize (repack) the unpacked data back into its original form of a consolidated invitations/suggestions icon 102*j*. The so saved-before-repacking information can include the identification of one or more external platform friends and their association to the corresponding topic.

Still referring to FIG. 4B, after the external contacts information has been formatted and stored in the External STAN Profile records areas (e.g., 431*p*2, 432*p*2 in FIG. 4A, but also 484.1 of FIG. 4C) for the corresponding user (e.g., 432) that recorded information can thereafter be used as part of the chat co-compatibility and desirability analysis when the STAN_3 system is automatically determining in the background the rankings of chat or other connect-to or gather with opportunities that the STAN_3 system might be recommending to the user for example in the opportunities banner areas 102 and 104 of the display screen 111 shown in FIG. 1A. (In one embodiment, these trays or banners, 102 and 104 are optionally out-and-in scrollable or hideable as opaque or shadow-like window shade objects; where the desirability of displaying them as larger screen objects depends on the monitored activities (e.g., as reported by up- or in-loaded CFi's) of the user at that time.)

At next to last step 479*a* of FIG. 4B and before exiting process 470, for each external resource, in one embodiment, the user is optionally asked to schedule an updating task for later updating the imported information. Alternatively, the STAN_3 system automatically schedules such an information update task. In yet another variation, the STAN_3 system alternatively or additionally, provides the user with a list of possible triggering events that may be used to trigger an update attempt at the time of the triggering event. Possible triggering events may include, but are not limited to, detection of idle time by the user, detection of the user registering into a new external platform (e.g., as confirmed in the user's email—i.e. "Thank you for registering into platform XP2, please record these as your new username and password . . . "); detection of the user making a major change to one of his external platform accounts (e.g., again flagged by a STAN_3 accessible email that says—i.e. "The following changes to your account settings have been submitted. Please confirm it was you who requested them . . . "); detection of the user being idle for a predetermined N minutes following detection that the user has made a new friend on an external platform or following detection of a received email indicating the user has connected with a new contact recently. When a combination of plural event triggers are requested such as account setting change and user idle mode, the user idle mode may be detected with use of a user watching webcam as well as optional temperature sensing of the user wherein the user is detected to be leaning back, not inputting via a user interface device for a predefined number of seconds and cooling off after an intense session with his machine system. Of course, the user can also actively request initiation (471) of an update, or specify a periodic time period when to be reminded or specify a combination of a periodic time period and an idle time exceeding a predetermined threshold. The information update task may be used to add data (e.g., user name and password in records 484.1, 484.2, etc.) for newly registered into external platforms and new, nonduplicate contacts that were not present previously, to delete undesired contacts and/or to recategorize various friends, buddies, contacts and/or the alike as different kinds of "Tipping Point" persons (TPP's) and/or as other kinds of noteworthy personas. The process then ends at step 479*b* but may be re-begun at step 471 for yet a another external content source when the STAN_3 system 410 determines that the user is probably in an idle mode and is probably willing to accept such a pushed survey 482. Updates that were given permission for before and therefore don't require a GUI dialog process such as that of FIG. 4B can occur in the background.

Referring again to FIG. 4A, it may now be appreciated how some of the major associations 411-416 can be enhanced by having the STAN_3 system 410 cooperatively interacting with external platforms (441, 442, . . . 44X, etc.) by, for example, importing external contact lists of those external platforms. Additional information that the STAN_3 system may simultaneously import include, but not limited to, importing new context definitions such as new roles that can be adopted by the user (undertaken by the user) either while operating under the domain of the external platforms (441, 442, . . . 44X, etc.) or elsewhere; importing new user-to-context-to-URL interrelation information where the latter may be used to augment hybrid Cognitive Attention Receiving Spaces maintained by the STAN_3 system, and so on. More specifically, the user-to-user associations (U2U) database section 411 of the system 410 can be usefully expanded by virtue of a displayed window such as 111 of FIG. 1A being able to now alert the user of tablet computer 100 as to when friends, buddies, contacts, followed tweeters, and/or the alike of an external platform (e.g., 441, 444) are also associated within the STAN_3 system 410 with displayed invitations and/or connect-to-recommendation (e.g., 102*j* of FIG. 1A) and this additional information may further enhance the user's network-using experience because the user (e.g., 432) now knows that not only is he/she not alone in being currently interested in a given topic (e.g., Mystery-History Book of the Month in content-displaying area 117) but that specific known friends, family members and/or familiar or followed other social entities (e.g., influential persons) are similarly currently interested in exactly the same given topic or in a topic closely related to it.

More to the point, while a given user (e.g., 432) is individually, and in relative isolation, casting individualized cognitive "heat" on one or more points, nodes or subregions in a given Cognitive Attention Receiving Space (e.g., topic space, keyword space, URL space, meta-tag space and so on); other STAN_3 system users (including the first user's friends for example) may be similarly individually casting individualized cognitive "heats" (by "touching") on same or closely related points, nodes or subregions of same or interrelated Cognitive Attention Receiving Spaces during roughly same time periods. The STAN_3 system can detect such cross-correlated and chronologically adjacent (and optionally geographically adjacent) but individualized castings of heat by monitored individuals on the respective same or similar points, nodes or subregions of Cognitive Attention Receiving Spaces (e.g., topic space) maintained by the STAN_3 system. The STAN_3 system can then indicate, at minimum, to the various isolated users that they are not alone in their heat casting activities. However, what is yet more beneficial to those of the users who are willing to accept is that the STAN_3 system can bring the isolated users into a collective chat or other forum participation activities wherein they begin to collaboratively work together (due, for example to their predetermined co-compatibilities to collaboratively work together) and they can thereby refine or add to the work product that they had individually developed thus far. As a result, individualized work efforts directed to a given topic node or topic subregion (TSR) are merged into a collaborative effort that can be beneficial to all involved. The individualized work efforts or cognition efforts of the joined individuals need not be directed to an established point, node or subregion in topic space and instead can be directed to one or more of different points, nodes or subregions in other Cognitive Attention Receiving Spaces such as, but not limited to, keyword space, URL space, ERL space, meta-tag space and so on (where here, ERL represents an Exclusive Resource Locater as distinguished from a Universal Resource Locater (URL)). The concept of starting with individualized user-selected keywords, URL's, ERL's, etc. and converting these into collectively favored (e.g., popular or expert-approved) keywords, URL's, ERL's, etc. and corresponding collaborative specification of what is being discussed (e.g., what is the topic or topics around which the current exchanges circle about?) will be revisited below in yet greater detail in conjunction with FIG. 3R.

For now it is sufficient to understand that a computer-facilitated and automated method is being here disclosed for: (1) identifying closely related cognitions and identifications thereof such as but not limited to, closely related topic points, nodes or subregions to which one or more users is/are apparently casting attentive heat during a specified time period; (2) for identifying people (or groups of people) who, during a specified time period, are apparently casting attentive heat at substantially same or similar points, nodes or subregions of a Cognitive Attention Receiving Space such as for example a topic space (but it could be a different shared cognition/shared experience space, such as for example, a "music space", an "emotional states" space and so on); (3) for identifying people (or groups of people) who, during a specified time period, will satisfy a prespecified recipe of mixed personality types for then forming an "interesting" chat room session or other "interesting" forum participation session; (4) for inviting available ones of such identified personas (real or virtual) into nascent chat or other forum participation opportunities in hopes that the desired mixture of "interesting" personas will accept and an "interesting" forum session will then take place; and (5) for timely exposing the identified personas to one or more promotional offerings that the personas are likely to perceive as being "welcomed" promotional offerings. These various concepts will be described below in conjunction with various figures including FIGS. 1E-1F (heat casting); 3A-3D (attentive energies detection and cross-correlation thereof with one or more Cognitive Attention Receiving Spaces); 3E (formation of hybrid spaces); 3R (transformation from individualized attention projection to collective attention projection directed to branch zone of a Cognitive Attention Receiving Space); and 5C (assembly line formation of "interesting" forum sessions.

In addition to bringing individualized users together for co-beneficial collaboration regarding points, nodes or subregions of Cognitive Attention Receiving Spaces (e.g., topic space) that they are probably directing their attentions to, each user's experience (e.g., 432's of FIG. 4A) can be enhanced by virtue of a displayed screen image such as the multi-arrayed one of FIG. 1A (having arrays 101, 102, etc.) because the displayed information quickly indicates to the viewing user how deeply interested or not are various other users (e.g., friends, family, followed influential individuals or groups) are with regard to one or more topics (or other points, nodes or subregions of other Cognitive Attention Receiving Spaces) that the viewing user (e.g., 432) is currently apparently projecting substantial attention toward or failing to projecting substantial attention toward (in other words, missing out in the latter case). More specifically, the displayed radar column 101*r* of FIG. 1A can show much "heat" is being projected by a certain one or more influential individuals (e.g., My Best Friends) at exactly a same given topic or in a topic closely related to it (where hierarchical and/or spatial closeness in topic space of a corresponding two or more points, nodes or subregions can be indicative of how same or similar the corresponding topics are to each other). The degree of interest can be indicated by heat bar graphs such as shown for example in FIG. 1D or by heat gauges or declarations (e.g., "Hot!") such as shown at 115g of FIG. 1A. When a STAN user spots a topic-associated invitation (e.g., 102n) that is declared to be "Hot!" (e.g., 115g), the user can activate a topic center tool (e.g., space affiliation flag 115e) that automatically presents the user with a view of a topic space map (e.g., a 2D landscape such as 185b of FIG. 1G or a 3D landscape such as represented by cylinder 30R.10 of FIG. 3R) that shows where in topic space or within a topic space region (TSR) the first user (e.g., 432) is deemed to be projecting his attentions by the attention modeling system (the STAN_3 system 410) and where in the same topic space neighborhood (e.g., TSR) his specifically known friends, family members and/or familiar or followed other social entities are similarly currently projecting their attentions on, as determined by the attention modeling system (410). Such a 2D or 3D mapping of a Cognitive Attention Receiving Space (e.g., topic space) can inform the first user (e.g., 432) that, although he/she is currently focusing-upon a topic node that is generally considered hot in a relevant social circles, there is/are nearby topic nodes that are considered even more hot by others and perhaps the first user (e.g., 432) should investigate those other topic nodes because his friends and family are currently intensely interested in the same.

Referring next to FIG. 1E, it will shortly be explained how a "top N" topic nodes or topic regions of various social entities (e.g., friends and family) can be automatically determined by servers (not shown) of the STAN_3 system 410 that are tracking attention-casting user visitations (touchings of a direct and/or distance-wise decaying halo type—see 132h, 132h' of FIG. 1F) through different regions of the STAN_3 topic space. But in order to better understand FIG. 1E, a digression into FIG. 4D will first be taken.

FIG. 4D shows in perspective form how two social networking (SN) spaces or domains (410' and 420) may be used in a cross-pollinating manner. One of the illustrated domains is that of the STAN_3 system 410' and it is shown in the form of a lower plane that has 3D or greater dimensional attributes (see frame 413xyz) wherein different chat or other forum participation sessions are stacked along a Z-direction over topic centers or nodes that reside on an XY plane. Therefore, in this kind of 3D mapping, one can navigate to and usually observe the ongoings within chat rooms of a given topic center (unless the chat is a private closed one) by obtaining X, Y (and optionally Z) coordinates of the topic center (e.g., 419a), and navigating upwards along the Z-axis (e.g., Za) of that topic center to visit the different chat or other forum participation sessions that are currently tethered to that topic center. (With that said, it is within the contemplation of the present disclosure to map topic space in different other ways including by way of a 3D, inner branch space (30R.10) mapping technique as shall be described below in conjunction with FIG. 3R.)

More specifically, the illustrated perspective view in FIG. 4D of the STAN_3 system 410' can be seen to include: (a) a user-to-user associations (U2U) mapping mechanism 411' (represented as a first plane); (b) a topic-to-topic associations (T2T) mapping mechanism 413' (represented as an adjacent second plane); (c) a user-to-topic and/or topic content associations (U2T) mapping mechanism 412' (which latter automated mechanism is not shown as a plane but rather as an exemplary linkage from "Tom" 432' to topic center 419a); and (d) a topic-to-content/resources associations (T2C) mapping mechanism 414' (which latter automated mechanism is not shown as a plane and is, in one embodiment, an embedded part of the T2T mechanism 413'—see Gif. 4B, see also FIGS. 3Ta and 3Tb. Additionally, the STAN_3 system 410 can be seen to include: (e) a Context-to-other attribute(s) associations (L2U/T/C) mapping mechanism 416' which latter automated mechanism is not shown as a plane and is, in one embodiment, dependent on automated location determination (e.g., GPS) of respective users for thereby determining their current contexts (see FIG. 3J and discussion thereof below).

Yet more specifically, the two platforms, 410' and 420 are respectively represented in the multiplatform space 400' of FIG. 4D in such a way that the lower, or first of the platforms, 410' (corresponding to 410 of FIG. 4A) is schematically represented as a 3-dimensional lower prismatic structure having a respective 3D axis frame 413xyz (e.g., chat rooms stacked up in the Z-direction on top of topic center base points). On the other hand, the upper or second of the platforms, 420 (corresponding to 441, . . . , 44X of FIG. 4A) is schematically represented as a 2-dimensional upper planar structure having respective 2D axis frame 420xy (on whose flat plane, all discussion rooms lie co-planar-wise). Each of the first and second platforms, 410' and 420 is shown to respectively have a compilation-of-users-of-the-platform sub-space, 411' and 421; and a messaging-rings supporting sub-space, 413' and 425 respectively. In the case of the lower platform, 410' the corresponding messaging-rings supporting sub-space, 413' is understood to generally include the STAN_3 database (419 in FIG. 4A) as well as online chat rooms and other online forums supported or managed by the STAN_3 system 410. Also, in addition to the corresponding messaging-rings supporting sub-space, 413', the system 410' is understood to generally include a topic-to-topic mapping mechanism 415' (T2T), a user-to-user mapping mechanism 411' (U2U), a user-to-topics mapping mechanism 412' (U2T), a topic-to-related content mapping mechanism 414' (T2C) and a location to related-user and/or related-other-node mapping mechanism 416' (L2UTC).

FIG. 4D will be described in yet more detail below. However, because this introduction ties back to FIG. 1E, what is to be noted here is that for a given context (situation) there are implied journeys 431a" through the topic space (413') of a first STAN user 431' (shown in lower left of FIG. 4D). (Later below, more complex journeys followed by a so-called, journeys-pattern detector 489 will be discussed.) For the case of the simplified travels 431a" through topic space of user 431', it is assumed that media-using activities of this STAN user 431' are being monitored by the STAN_3 system 410 and the monitored activities provide hints or clues as to what the user is projecting his attention-giving energies on during the current time period. A topic domain lookup service (DLUX) of the system is persistently attempting in the background to automatically determine what points, nodes or subregions in a system-maintained topic space are likely to represent foremost (likely top now topics) of what is in that user's mind based on in-loaded CFi signals, CVi signals, etc. of that user (431') as well as developed histories, profiles (e.g., PEEP's, PHA-FUEL's, etc.) and journey trend projections produced for that user (431'). The outputs of the topic domain lookup service (DLUX—to be explicated in conjunction with output signals 151o of FIG. 1F) identify topic nodes or subregions upon which the user is deemed to have directly cast attentive energies on and neighboring topic nodes upon which the user's radially fading halo may be deemed to have indirectly touched upon due to the direct projection of attentive energies on the former nodes or subregions. (In one embodiment, indirect 'touchings' are allotted smaller scores than direct 'touchings'.) One type of indirect 'touching upon' is hierarchy-based indirect touching which will be further explained with reference to FIG. 1E. Another is a spatially-based indirect touching.

The STAN_3 topic space mapping mechanism (413' of FIG. 4D) maintains a topic-to-topic (T2T) associations graph which latter entity includes a parent-to-child hierarchy of topic nodes (see also FIG. 3R) and/or a spatial distancing specification as between topic points, nodes or subregions. In the simplified example 140 of FIG. 1E, three levels of a graphed hierarchy (as represented by physical signals stored in physical storage media) are shown. Actually, plural spaces are shown in parallel in FIG. 1E and the three exemplary levels or planes, $TS_{p0}$, $TS_{p1}$, $TS_{p2}$, shown in the forefront are parts of a system-maintained topic space (Ts). Those skilled in the art of computing machines will of course understand from this that a non-abstract data structure representation of the graph is intended and is implemented. Topic nodes are stored data objects with distinct data structures (see for example giF. 4B of the here-incorporated STAN_1 application and see also FIG. 3Ta-Tb of the present disclosure). The branches of a hierarchical (or other kind) of graph that link the plural topic nodes are also stored data objects (typically pointers that point to where in machine memory, interrelated nodes such as parent and child are located). A topic space therefore, and as used herein is an organized set of recorded data objects, where those objects include topic nodes but can also include other objects, for example topic space cluster regions (TScRs) which are closely clustered pluralities of topic nodes (or points in topic space). For simplicity, in box 146*a* of FIG. 1E, a bottom two of the illustrated topic nodes, $Tn_{01}$ and $Tn_{02}$ are assumed to be leaf nodes of a branched tree-like hierarchy graph that assigns as a parent node to leaf nodes $Tn_{01}$ and $Tn_{02}$, a next higher up node, $Tn_{11}$ in a next higher up level or plane $TS_{p1}$; and that assigns as a grandparent node to leaf nodes $Tn_{01}$ and $Tn_{02}$, a next yet higher up node, $Tn_{22}$ in a next higher up level or plane $TS_{p2}$. The end leaf or child nodes, $Tn_{01}$ and $Tn_{02}$ are shown to be disposed in a lower or zero-ith topic space plane, $TS_{p0}$. The parent node $Tn_{11}$ as well as a neighboring other node, $Tn_{12}$ are shown to be disposed in the next higher topic space plane, $TS_{p1}$. The grandparent node, $Tn_{22}$ as well as a neighboring other node are shown to be disposed in the yet next higher topic space plane, $TS_{p2}$. It is worthy of note to observe here that the illustrated planes, $TS_{p0}$, $TS_{p1}$ and $TS_{p2}$ are all below a fourth hierarchical plane (not shown) where that fourth plane ($TS_{p3}$ not shown) is at a predefined depth (hierarchical distance) from a root node of the hierarchical topic space tree (main graph). This aspect of relative placement within a hierarchical tree is represented in FIG. 1E by the showing of a minimum topic resolution level Res(Ts.min) in box 146*a* of FIG. 1E. It will be appreciated by those skilled in the art of hierarchical graphs or trees that refinement of what the topic is (resolution of what the specific topic is) usually increases as one descends deeper down towards the base of the hierarchical pyramid and thus further away from the root node of the tree. More specifically, an example of hierarchical refinement might progress as follows: Tn22(Topic=mammals), Tn11(Topic=mammals/subclass=omnivore), Tn01(Topic=mammals/subclass=omnivore/super-subclass=fruit-eating), Tn02 (Topic=mammals/subclass=omnivore/super-subclass=grass-eating) and so on.

The term clustering (or clustered) was mentioned above with reference to spatial and/or temporal and/or hierarchical clustering but without yet providing clarifying explanations. It is still too soon in the present disclosure to fully define these terms. However, for now it is sufficient to think of hierarchically clustered nodes as including sibling nodes of a hierarchical tree structure where the hierarchically clustered sibling nodes share a same parent node (see also siblings 30R.9*a*-30R.9*c* of parent 30R.30 in FIG. 3R). It is sufficient for now to think of spatially clustered nodes (or points or subregions) as being unique entities that are each assigned a unique hierarchical position and/or spatial location within an artificially created space (could be a 2D space, a 3-dimensional space, or an otherwise organized space that has locations and distances between locations therein) where points, nodes or subregions that have relatively short distances between one another are said to be spatially clustered together (and thus can be deemed to be substantially same or similar if they are sufficiently close together). In one embodiment, the locations within a pre-specified spatial space of corresponding points, nodes or subregions are voted on by system users either implicitly or explicitly. More specifically, if an influential group of users indicate that they "like" certain nodes (or points or subregions) to be closely clustered together, then the system automatically modifies the assigned hierarchical and/or spatial positions of the such nodes (or points or subregions) to be more closely clustered together in a spatial/hierarchical sense. On the other hand, if the influential group of users indicate that they "dislike" certain nodes (or points or subregions) as being deemed to be close to a certain reference location or to each other; those disliked entities may be pushed away towards peripheral or marginal regions of an applicable spatial space (they are marginalized—see also the description below of anchoring factor 30R.9*d* in FIG. 3R). In other words, the disliked nodes or other such cognition-representing objects are de-clustered so as to be spaced apart from a "liked" cluster of other such points, nodes or subregions. As mentioned, this concept will be better explained in conjunction with FIG. 3R. Although the preferable mode herein is that of variable and user-voted upon positionings of respective cognition-representing objects, be they tagged points, nodes or subregions in corresponding hierarchical and/or spatial spaces (e.g., positioning of topic nodes in topic space), it is within the contemplation of the present disclosure that certain kinds of such entities may contrastingly be assigned fixed (e.g., permanent) and exclusive positions within corresponding hierarchical and/or spatial spaces, with the assigning being done for example by system administrators. Temporal space generally refers to a real life (ReL) time axis herein. However, it is also within the scope of the present disclosure that temporal space can refer to a virtual time axis such as the kind which can be present within a SecondLife™ or alike simulated environment.

Referring back to FIG. 1E, as a first user (131) is detected to be casting attentive energies at various cognitive possibilities and thus making implied cognitive visitations (131*a*) to Cognitive Attention Receiving Points, Nodes or Subregions (CAR PNOS) distributed within the illustrated section 146*a* of topic space during a corresponding first time period (first real life (ReL) time slot $t_0$–$t_1$), he can spend different amounts of time and/or attention-giving powers (e.g., emotional energies) in making direct, attention-giving 'touchings' on different ones of the illustrated topic nodes and he can optionally spend different amounts of time (and/or otherwise cast different amounts of 'heat' providing powers) making indirect 'touchings' on nearby other such topic nodes. An example of a hierarchical indirect touching is one where user 131 is deemed (by the STAN_3 system 410) to have 'directly' touched (cast attentive energy upon) child node $Tn_{01}$ and, because of a then existing halo effect (see 132*h* of FIG. 1F) that is then attributed to user 131, the same user is automatically deemed by the STAN_3 system (410) to have indirectly touched parent node $Tn_{11}$ in the next higher plane $TS_{p1}$. This example assumes that the cast attentive energy is so focused that the system can resolve it to having been projected onto one specific and pre-existing node in topic space. However, in an alternate example, the cast attentive energy may be determined by the system as having been projected more fuzzily and on a clustered group of nodes rather than just one node; or on the nodes of a given branch of a hierarchical topic tree; or on the nodes in a spatial subregion of topic space. In the latter case, and in accordance with one aspect of the present disclosure, a central node is artificially deemed to have received focused attention and an energy redistributing halo then redistributes the cast energy onto other nodes of the cluster of subregion. Contributed heats of 'touching' are computed accordingly.

In the same (140) or another exemplary embodiment where the user is deemed to have directly 'touched' topic node Tn01 and to have indirectly 'touched' topic node Tn11, the user is further automatically deemed to have indirectly touched grandparent node $Tn_{22}$ in the yet next higher plane $TS_{p2}$ due to an attributed halo of a greater hierarchical extent (e.g., two jumps upward along the hierarchical tree rather than one) or due to an attributed greater spatial radius in spatial topic space for his halo if it is a spatial halo (e.g., bigger halo 132*h*' in FIG. 1F).

In one embodiment, topic space auditing servers (not shown) of the STAN_3 system 410 keep track of the percent time spent and/or degree of energetic engagement with which each monitored STAN user engages directly and/or indirectly in touching different topic nodes within respective time slots. (Alternatively or additionally the same concept applies to 'touchings' made in other Cognitions-representing Spaces.) The time spent and/or the emotional or other energy intensity per unit time (power density) that are deemed to have been cast by indirect touchings may be attenuated based on a predetermined halo diminution function (e.g., decays with hierarchical step distance of spatial radial distance—not necessarily at same decay rate in all directions) assigned to the user's halo 132*h*. More specifically, during a first time slot represented by left and right borders of box 146*b* of FIG. 1E, a second exemplary user 132 of the STAN_3 system 410 may have been deemed to have spent 50% of his implied visitation time (and/or 'heat' power such as may be cast due to emotional involvement/intensity) making direct and optionally indirect touchings on a first topic node (the one marked 50%) in respective topic space plane or region $TS_{p2r3}$. During the same first time slot, $t_{0-1}$ of box 146*b*, the second user 132 may have been deemed to have spent 25% of his implied visitation time (and/or attentive energies per unit time) in touching a neighboring second topic node (the one marked 25%) in respective topic space plane or region $TS_{p2r3}$. Similarly, during the same first time slot, $t_{0-1}$, further touchings of percentage amounts 10% and 5% may have been attributed to respective topic nodes in topic space plane or region $TS_{p1r4}$. Yet additionally, during the same first time slot, $t_{0-1}$, further touchings of percentage amounts 7% and 3% may have been attributed to respective topic nodes in topic space plane or region $TS_{p0r5}$. The percentages do not have to add up to, or be under 100% (especially if halo amounts are included in the calculations). Note that the respective topic space planes or regions which are generically denoted here as $TS_{pXrY}$ in box 146*b* (where X and Y here can be respective plane and region identification coordinates) and the respective topic nodes shown therein do not have to correspond to those of upper box 146*a* in FIG. 1E, although they could.

Before continuing with explanation of FIG. 1E, a short note is inserted here. The attentive energies-casting journeys of travelers 131 and 132 are not necessarily uni-space journeys through topic space alone. Their respective journeys, 131*a* and 132*a*, can concurrently cause the system 410 to deem them as each having directly or indirectly made 'touchings' (cast attentive energies) in a keywords organizing space (KeyWds space), in a URL's organizing space, in a meta-tags organizing space, in a semantically-clustered textual content space and/or in other such Cognitive Attention Receiving Spaces. These concepts will become clearer when FIGS. 3D, 3E and others are explained further below. However, for now it is easiest to understand the respective journeys, 131*a* and 132*a*, of STAN users 131 and 132 by assuming that such journeys are uni-space journeys taking them through the, so-far more familiar topic space and its included nodes, Tn01, Tn11, Tn22, etc.

Also for sake of simplicity of the current example (140), it will be assumed that during journey subparts 132*a*3, 132*a*4 and 132*a*5 of respective traveler 132, that traveler 132 is merely skimming through web content at his client device end of the system and not activating any hyperlinks or entering on-topic chat rooms—which latter activities would be examples of more energetic attention giving activities and thus direct 'touchings' in URL space and in chat room space respectively. Although traveler 132 is not yet clicking or tapping or otherwise activating hyperlinks and is not entering chat rooms or accepting invitations to chat or other forum participation opportunities, the domain-lookup servers (DLUX's) of the system 410 may nonetheless be responding to his less energetic, but still attention giving activities (e.g., skimmings; as reported by respectively uploaded CFi signals) through web content and the system will be concurrently determining most likely topic nodes to attribute to this energetic (even if low level energetic) activity of the user 132. Each topic node that is deemed to be a currently more likely than not, now focused-upon node (now attention receiving node) in the system's topic space can be simultaneously deemed by the system 410 to be a directly 'touched' upon topic node. Each such direct 'touching' can contribute to a score that is being totaled in the background by the system 410 for each node, where the total will indicate how much time and/or attention giving energy per unit time (power) at least the first user 132 just expended in directly touching' various ones of the topic nodes.

The first and third journey subparts 132*a*3 and 132*a*5 of traveler 132 are shown in FIG. 1E to have extended into a next time slot 147*b* (slot $t_{1-2}$). (Traveler 131 has his respective next time slot 147*a* (also slot $t_{1-2}$).) Here the extended journeys are denoted as further journey subparts 132*a*6 and 132*a*8. The second journey, 132*a*4 ended in the first time slot ($t_{0-1}$). During the second time slot 147*b* (slot $t_{1-2}$), corresponding journey subparts 132*a*6 and 132*a*8 respectively touch corresponding nodes (or topic space cluster regions (TScRs) if such 'touchings' are being tracked) with different percentages of consumed time and/or spent energies (e.g., emotional intensities determined by CFi's). More specifically, the detected 'touchings' of journey subparts 132*a*6 and 132*a*8 are on nodes within topic space planes or regions $TS_{p2r6}$ and $TS_{p0r8}$. In this example, topic space plane or subregion $TS_{p1r7}$ is not touched (it gets 0% of the scoring). There can be yet more time slots following the illustrated second time slot ($t_{1-2}$). The illustration of just two is merely for sake of simplified example. At the end of a predetermined total duration (e.g., $t_0$ to $t_2$), percentages (or other normalized scores) attributed to the detected 'touchings' are sorted relative to one another within each time slot box (e.g., 146*b*), for example from largest to smallest. This produces a ranking or an assigned sort number for each directly or indirectly 'touched' topic node or clustering of topic nodes. Then predetermined weights are applied on a time-slot-by slot basis to the sort numbers (rankings) of the respective time slots so that, for example the most recent time slot is more heavily weighted than an earlier one. The weights could be equal. Then the weighted sort values are added on a node-by-node basis (or other topic region by topic region basis) to see which node (or topic region) gets the highest preference value, which the lowest and which somewhere in between. Then the identifications of the visited/attention-receiving nodes (or topic regions) are sorted again (e.g., in unit 148b) according to their respective summed scores (weighted rankings) to thereby generate a second-time sorted list (e.g., 149b) extending from most preferred (top most) topic node to least preferred (least most) of the directly and/or indirectly visited topic nodes. (For the case of user 131, a similar process occurs in module 148a.) This machine-generated list is recorded for example in Top-N Nodes Now list 149b for the case of social entity 132 and respective other list 149a for the case of social entity 131. Thus the respective top 5 (or other number of) topic nodes or topic regions currently being focused-upon now by social entity 131 might be listed in memory means 149a of FIG. 1E. The top N topics list of each STAN user is accessible by the STAN_3 system 410 for downloading in raw or modified, filtered, etc. (transformed) form to the STAN interfacing device (e.g., 100 in FIG. 1A, 199 in FIG. 2) such that each respective user is presented with a depiction of what his current top N topics Now are (e.g., by way of invitations/topics serving plate 102aNow of FIG. 1A) and/or is presented with a depiction of what the current top M topics Now are of his friends or other followed social entities/groups (e.g., by way of serving plate 102b of FIG. 1A, where here N and M are whole numbers set by the system 410 or picked by the user).

Accordingly, by using a process such as that of FIG. 1E, the recorded lists of the Top-N topic nodes now favored by each individual user (or group of users, where the group is given its own halos) may be generated based on scores attributed to each directly or indirectly touched topic node and relative time spent or attention giving powers expended for such touching and/or optionally, amount of computed 'heat' expended by the individual user or group in directly or indirectly touching upon that topic node. A more detailed explanation of how group 'heat' can be computed for topic space "regions" and for groups of passing-through-topic-space social entities will be given in conjunction with FIG. 1F. However, for an individual user, various factors such as factor 172 (e.g., optionally normalized emotional intensity, as shown in FIG. 1F) and other factor 173 (e.g., optionally normalized, duration of focus, also in FIG. 1F) can be similarly applicable and these preference score parameters need not be the only ones used for determining 'social heat' cast by a group of others on a topic node. (Note that 'social heat' is different than individualized heat because social group factors such as size of group (absolute or normalized to a baseline), number of influential persons in the group, social dynamics, etc. apply in group situations as will become more apparent when FIG. 1F is described in more detail below). However, with reference to the introductory aspects of FIG. 1E, when intensity of emotion is used as a means for scoring preferred topic nodes, the user's then currently active PEEP record (not shown) may be used to convert associated personal emotion expressions (e.g., facial grimaces, grunts, laughs, eye dilations) of the user into optionally normalized emotion attributes (e.g., anxiety level, anger level, fear level, annoyance level, joy level, sadness level, trust level, disgust level, surprise level, expectation level, pensiveness/anticipation level, embarrassment level, frustration level, level of delightfulness, etc.) and then these are combined in accordance with a predefined aggregation function to arrive at an emotional intensity score. Topic nodes that score as ones with high emotional intensity scores become weighed, in combination with time and/or powers spent focusing-upon the topic, as the more focused-upon among the top N topics_Now of the user for that time duration (where here, the term, more focused-upon may include topic nodes to which the user had extremely negative emotional reactions, e.g., the discussion upset him and not just those that the user reacted positively to). By contrast, topic nodes that score as ones with relatively low emotional intensity scores (e.g., indicating indifference, boredom) become weighed, in combination with the minimal time and/or focusing power spent, as the less focused-upon among the top N topics_Now of the user for that time duration.

Just as lists of top N topic nodes or topic space regions (TSRs) now being focused-upon now (e.g., 149a, 149b) can be automatically created for each STAN user based on the monitored and tracked journeys of the user (e.g., 131) through system topic space, and based on time spent focusing-upon those areas of topic space and/or based on emotional energies (or other energies per unit time) detected to have been expended by the user when focusing-upon those areas of topic space (nodes and/or topic space regions (TSRs) and/or topic space clustering-of-nodes regions (TScRs)), similar lists of top N' nodes or regions (where N' can be same or different from N) within other types of system "spaces" can be automatically generated where the lists indicate for example, top N" URL's (where N" can be same or different from N) or combinations or sequences of URL's being focused-upon now by the user based on his direct or indirect 'touchings' in URL space (see briefly 390 of FIG. 3E); top N'" (where N'" can be same or different from N) keywords or combinations or sequences of keywords being focused-upon now by the user based on his direct or indirect 'touchings' in Keyword space (see briefly 370 of FIG. 3E); and so on, where N', N" and N'" here can be same or different whole numbers just as the N number for top N topics now can be a predetermined whole number.

With the introductory concepts of FIG. 1E now in place regarding how scoring for the now top N(', ", '", . . . ) nodes or subspace regions of individual users can be determined by machine-implemented processes based on their use of the STAN_3 system 410 and for their corresponding current 'touchings' in Cognitive Attention Receiving Spaces of the system 410 such as topic space (see briefly 313" of FIG. 3D); content space (see 314" of FIG. 3D); emotion/behavioral state space (see 315" of FIG. 3D); context space (see 316" of FIG. 3D); and/or other alike data object organizing spaces (see briefly 370, 390, 395, 396, 397 of FIG. 3E), the description here returns to FIG. 4D.

In FIG. 4D, platforms or online social interaction playgrounds that can be outside the CFi monitoring scope of the STAN_3 system 410' (because a user will generally not have STAN_3 monitoring turned while using only those other platforms) are referred to as out-of-STAN platforms. The planar domain of a first out-of-STAN platform 420 will now be described. It is described first here because it follows a more conventional approach such as that of the FaceBook™ and LinkedIn™ platforms for example.

The domain of the exemplary, out-of-STAN platform 420 is illustrated as having a messaging support (and organizing) space 425 and as having a membership support (and organizing) space 421. Let it be assumed that initially, the messaging support space 425 of external platform 420 is completely empty. In other words, it has no discussion rings (e.g., blog threads) like that of illustrated ring 426' yet formed in that space 425. Next, a single (an individualized) ring-creating user 403' of space 421 (membership support space) starts things going by launching (for example in a figurative one-man boat 405') a nascent discussion proposal 406'. This launching of a proposed discussion can be pictured as starting in the membership space 421 and creating a corresponding data object 426' in the group discussion support space 425. In the LinkedIn™ environment this action is known as simply starting a proposed discussion by attaching a headline message (example: "What do you think about what the President said today?") to a created discussion object and pushing that proposal (406' in its outward bound boat 405') out into the then empty discussions space 425. Once launched into discussions space 425 the launched (and substantially empty) ring 426' can be seen by other members (e.g., 422) of a predefined Membership Group 424. The launched discussion proposal 406' is thereby transformed into a fixedly attached child ring 426' of parent node **426*p* (attached to 426' by way of linking branch 427'), where point 426*p* is merely an identified starting point (root) for the Membership Group 424 but does not have message exchange rings like 426' inside of it. Typically, child rings like 426' attach to an ever growing (increasing in illustrated length) branch 427' according to date of attachment. In other words, it is a mere chronologically growing, one dimensional branch with dated nodes attached to it, with the newly attached ring 426'** being one such dated node. As time progresses, a discussions proposal platform like the LinkedIn™ platform may have a long list of proposed discussions posted thereon according to date and ID of its launcher (e.g., posted 5 days ago by discussion leader Jones). Many of the proposals may remain empty and stagnate into oblivion if not responded to by other members of a same membership group within a reasonable span of time.

More specifically, in the initial launching stage of the newly attached-to-branch-427' discussion proposal 426', the latter discussion ring 426' has only one member of group 424 associated with it, namely, its single launcher 403'. If no one else (e.g., a friend, a discussion group co-member) joins into that solo-launched discussion proposal 426', it remains as a substantially empty boat and just sits there bobbing in the water so to speak, aging at its attached and fixed position along the ever growing history branch 427' of group parent node **426*p*. On the other hand, if another member 422 of the same membership group 424 jumps into the ring (by way of by way of illustrated leap 428') and responds to the affixed discussion proposal 426' (e.g., "What do you think about what the President said today?") by posting a responsive comment inside that ring 426', for example, "Oh, I think what the President said today was good.", then the discussion has begun. The discussion launcher/leader 403' may then post a counter comment or other members of the discussion membership group 424 may also jump in and add their comments. In one embodiment, those members of an outside group 423 who are not also members of group 424 do not get to see the discussions of group 424 if the latter is a members-only-group. Irrespective of how many further members of the membership group 424 jump into the launched ring 426' or later cease further participation within that ring 426', that ring 426' stays affixed to the parent node 426*p* and in the original historical position where it originally attached to historically-growing branch 427'. Some discussion rings in LinkedIn™ can grow to have hundreds of comments and a like number of members commenting therein. Other launched discussion rings of LinkedIn™ (used merely as an example here) may remain forever empty while still remaining affixed to the parent node in their historical position and having only the one discussion launcher 403' logically linked to that otherwise empty discussion ring 426'. In some instances, two launched discussions can propose a same discussion question; one draws many responses, the other hardly any, and the two never merge. There is essentially no adaptive recategorization and/or adaptive migration in a topic space for the launched discussion ring 426'. This will be contrasted below against a concept of chat rooms or other forum participation sessions that drift (see drifting Notes Exchange session 416*d*) in an adaptive topic space 413' supported by the STAN_3 system 410' of FIG. 4D. Topic nodes themselves can also migrate to new locations in topic space. This will be described in more detail in conjunction with FIG. 3**S.

Still referring to the external platform 420, it is to be understood that not all discussion group rings like 426' need to be carried out in a single common language such as a lay-person's English. It is quite possible that some discussion groups (membership groups) may conduct their internal exchanges in respective other languages such as, but not limited to, German, French, Italian, Swedish, Japanese, Chinese or Korean. It is also possible that some discussion groups have memberships that are multilingual and thus conduct internal exchanges within certain discussion rings using several languages at once, for example, throwing in French or German loan phrases (e.g., Schadenfreude) into a mostly English discourse where no English word quite suffices. It is also possible that some discussion groups use keywords of a mixed or alternate language type to describe what they are talking about. It is also possible that some discussion groups have members who are experts in certain esoteric arts (e.g., patent law, computer science, medicine, economics, etc.) and use art-based jargon that lay persons not skilled in such arts would not normally understand or use. The picture that emerges from the upper portion (non-STAN platform) of FIG. 4D is therefore one of isolated discussion groups like 424 and isolated discussion rings like 426' that respectively remain in their membership circles (423, 424) and at their place of birthing (virtual boat attachment) and often remain disconnected from other isolated discussion rings (e.g., those conducted in Swedish, German rather than English) due to differences of language and/or jargon used by respective membership groups of the isolated discussion rings (e.g., 426').

By contrast, the birthing (instantiation) of a messaging ring (a TCONE) in the lower platform space 410' (corresponding to the STAN_3 system 410 of FIG. 4A) is often (there are exceptions) a substantially different affair (irrespective of whether the discourse within the TCONE type of messaging ring (e.g., **416*d*) is to be conducted in lay-person's English, or French or mixed languages or specialized jargon). Firstly, a nascent messaging ring (not shown) is generally not launched by only one member (e.g., registered user) of platform 410 but rather by at least two such members (e.g., of user-to-user association group 433', which users are assumed to be ordinary-English speaking in this example; as are members of other group 434'). In other words, at the time of launch of a so-called, TCONE ring (see 416*a*), the two or more launchers of the nascent messaging ring (e.g., Tom 432' of group 433' and an associate of his) have already implicitly agreed to enter into an ordinary-English based online chat (or another form of online "Notes Exchange" which is the NE suffix of the TCONE acronym) centering around one or more shareable experiences, such as for example one or more predetermined topics which are represented by corresponding points, nodes or subregions in the system's topic space. Accordingly, and as a general proposition herein (there could be exceptions such as if one launcher immediately drops out for example or when a credentialed expert (e.g., 429) launches a to-be taught-educational-course ring), each nascent messaging ring like (new TCONE) enters a corresponding rings-supporting and mapping (e.g., indexing, organizing) space 413' while already having at least two STAN_3 members already joined in online discussion (or in another form of mutually understandable "Notes Exchange") therein because they both have accepted a system generated invitation or other proposal to join into the online and Social-Topical exchange (e.g., TCONE tethered to topic center 419***a*) and topic center (e.g., 419*a*) specifies what the common language will be (and what the top keywords will be, top URL's etc. will be) and a back-and-forth translation automatically takes place in one embodiment as between individualized users who speak in another language and/or with use of individualized pet phraseologies as opposed to a commonly accepted language and/or most popular terms of art (jargon). (This will be better explained in conjunction with FIG. 3R.)

As mentioned above, the STAN_3 system 410 can also generate proposals for real life (ReL) gatherings (e.g., Let's meet for lunch this afternoon because we are both physically proximate to each other). In one embodiment, the STAN_3 system 410 automatically alerts co-compatible STAN users as to when they are in relatively close physical proximity to each other and/or the system 410 automatically spawns chat or other forum participation opportunities to which there are invited only those co-compatible and/or same-topic focused-upon STAN users who are in relatively close physical proximity to each other. This can encourage people to have more real life (ReL) gatherings in addition to having more online gatherings with co-compatible others. In one embodiment, if the if one person accepts an invite to a real life gathering (e.g., lunch date) but then no one else joins or the other person drops out at the last minute, or the planned venue (e.g., lunch restaurant) becomes unfeasible, then as soon as it is clear that the planned gathering cannot take place or will be of a diminished size, the STAN_3 system automatically posts a meeting update message that may display for example as stating, "Sorry no lunch rooms were available, meeting canceled", or "Sorry none of other lunch mates could make it, meeting canceled". In this way a user who signs up for a real life (ReL) gathering will not have to wait and be disappointed when no one else shows up. In some instance, even online chats may be automatically canceled, for example when the planned chat requires a certain key/essential person (e.g., expert 429 of FIG. 4D) and that person cannot participate at the planned time or when the planned chat requires a certain minimum number of people (e.g., 4 to play an online social game; i.e. bridge) and less than the minimum accept or one or more drop out at the last minute. In such a case, the STAN_3 system automatically posts a meeting update message that may display for example as stating, "Sorry not enough participants were available, online meeting canceled", or "Sorry, an essential participant could not make it, online meeting canceled". In this way a user who signs up is not left hanging to the last moment only to be disappointed that the expected event does not take place. In one embodiment, the STAN_3 system automatically offers a substitute proposal to users who accepted and then had the meeting canceled out from under their feet. One example message posted automatically by the STAN_3 system might say, "Sorry that your anticipated online (or real life) meeting re topic TX was canceled (where TX represents the topic name). Another chat or other forum participation opportunity is now forming for a co-related topic TY (where TY represents the topic name), would you like to join that meeting instead? Yes/No".

Another possibility is that too many users accept an invitation (above the holding capacity of the real life venue or above the maximum room size for an online chat) and a proposed gathering has to canceled or changed on account of this. More specifically, some proposed gatherings can be extremely popular (e.g., a well-known celebrity is promised to be present) and thus a large number of potential participants will be invited and a large number will accept (as is predictable from their respective PHAFUEL or other profiles). In such cases, the STAN_3 system automatically runs a random pick lottery (or alternatively performs an automated auction) for nonessential invitees where the number of predicted acceptances exceeds the maximum number of participants who can be accommodated. In one embodiment, however, the STAN_3 system automatically presents each user with plural invitations to plural ones of expected-to-be-oversold and expected-to-be-under-sold chat or other forum participation opportunities. The plural invitations are color coded and/or otherwise marked to indicate the degree to which they are respectively expected-to-be-oversold or expected-to-be-undersold and then the invitees are asked to choose only one for acceptance. Since the invitees are pre-warned about their chances of getting into expected-to-be-oversold versus expected-to-be-undersold gatherings, they are "psychologically prepared" for a the corresponding low or high chance that he or she might be successful in getting into the chat or other gathering if they select that invite.

FIG. 4D shows a drifting forum (a.k.a. dSNE) 416*d*. A detailed description about how an initially launched (instantiated) and anchored (moored/tethered) Social Notes Exchange (SNE) ring can become a drifting one that swings Tarzan-style from one anchoring node (TC) to a next, in other words, it becomes a drifting dSNE 416*d*; have been provided in the STAN_1 and STAN_2 applications that are incorporated herein. As such the same details will not be repeated here. For FIG. 3S of the present disclosure it will be explained below how the combination of a drifting/migrating topic node and chat rooms tethered thereto can migrate from being disposed under a root catch-all node (30S.55) to being disposed inside a branch space (e.g., 30S.10) of a specific parent node (e.g., 30S.30). But first, some simpler concepts are covered here.

With regard to the layout of a topic space (TS), it was disclosed in the here incorporated STAN_2 application, how topic space can be both hierarchical and spatial and can have fixed points in a—reference frame (e.g., 413*xyz* of present FIG. 4D) as well as how topic space can be defined by parent and child hierarchical graphs (as well as non-hierarchical other association graphs). More will be said herein, but later below, about how nodes can be organized as parts of different trees (see for example, tress A, B and C of present FIG. 3E. It is to be noted here that it is within the contemplation of the present disclosure to use spatial halos in place of or in addition to the above described, hierarchical touchings halo to determine what topic nodes have been directly or indirectly touched by the journeys through topic space of a STAN_3 monitored user (e.g., 131 or 132 of FIG. 1E). Spatial frames can come in many different forms. The multidimensional reference frame 413*xyz* of present FIG. 4D is one example. A different combination of spatial and hierarchical frame will be described below in conjunction with FIG. 3R.

With regard to a specified common language and/or a common set of terms of art or jargon being assigned to each node of a given Cognitive Attention Receiving Space (e.g., topic space), it was disclosed in the here incorporated STAN_2 application, how cross language and cross-jargon dictionaries may be used to locate persons and/or groups that likely share a common topic of interest. More will be said herein, but later below, about how commonly-used keywords and the like may come to be spatially clustered in a semantic (Thesaurus-wise) sense in respective primitive storing memories. (See layer

371 of FIG. 3E—to be discussed later.) It is to be noted at this juncture that it is within the contemplation of the present disclosure to use cross language and cross-jargon dictionaries similar to those of the STAN_2 application for expanding the definitions of user-to-user association (U2U) types and of context specifications such as those shown for example in area 490.12 of FIG. 4C of the present disclosure. More specifically, the cross language and cross-jargon expansion may be of a Boolean OR type where one can be defined as a "friend of OR buddy of OR 1st degree contact of OR hombre of OR hommie of" another social entity (this example including Spanish and street jargon instances). Cascadable operator objects are also contemplated as discussed elsewhere herein. (Additionally, in FIG. 3E of the present disclosure, it will be explained how context-equivalent substitutes (e.g., 371.2*e*) for certain data items can be automatically inherited into a combination and/or sequence defining operator node (e.g., 374.1).)

With regard to user context, it was disclosed in the here incorporated STAN_2 application, how same people can have different personas within a same or different social networking (SN) platforms. Additionally, an example given in FIG. 4C of the present disclosure shows how a "Charles" 484*b* of an external platform (487.1E) can be the same underlying person as a "Chuck" 484*c* of the STAN_3 system 410. In the now-described FIG. 4D, the relationship between the same "Charles" and "Chuck" personas is represented by cross-platform logical links 44X.1 and 44X.2. When "Chuck" (the in-STAN persona) strongly touches (e.g., for a long time duration and/or with threshold-crossing attentive power) upon an in-STAN topic node such as 416*n* of space 413' for example; and the system 410 knows that "Chuck" is "Charles" 484*b* of an external platform (e.g., 487.1E) even though other user, "Tom" (of FIG. 4C) does not know this. As a consequence, the STAN_3 system 410 can inform "Tom" that his external friend "Charles" (484*b*) is strongly interested in a same top 5 now topic as that of "Tom". This can be done because Tom's intra-STAN U2U associations profile 484.1' (shown in FIG. 4D also) tells the system 410 that Tom and "Charles" (484*b*') are friends and also what type of friendship is involved (e.g., the 485*b* type shown in FIG. 4C). Thus when "Tom" is viewing his tablet computer 100 in FIG. 1A, "Charles" (not shown in 1A) may light up as an on-radar friend (in column 101) who is strongly interested (as indicated in radar column 101*r*) in a same topic as one of the top 5 topics now are of "Tom" (My Top 5 Topics Now 102*a*_Now). FIG. 4D incidentally, also shows the corresponding intra-STAN U2U associations profile 484.2' of a second user 484*c*' (e.g., Chuck, whose alter ego persona in platform 420 is "Charles" 484*b*').

The use of radar column 101*r* of FIG. 1A is one way of keeping track of one's friends and seeing what topics they are now focused-upon (casting substantial attentive energies or powers upon). However, if the user of computing device 100 of FIG. 1A has a large number of friends (or other to-be-followed/tracked personas) the technique of assigning one radar pyramid (e.g., 101*ra*) to each individualized social entity might lead to too many such virtual radar scopes being present at one time, thus cluttering up the finite screen space 111 of FIG. 1A with too many radar representing objects (e.g., spinning pyramids). The better approach is to group individuals into defined groups and track the focus (attentive energies and/or powers) of the group as a whole.

Referring to FIG. 1F, it will now be explained how 'groups' of social entities can be tracked with regard to the attentive energies and/or powers (referred to also herein as 'heats') they collectively apply to a top N now topics of a first user (e.g., Tom). It was already explained in conjunction with FIG. 1E how the top N topics (of a given time duration and) of a first user (say Tom) can be determined with a machine-implemented automatic process. Moreover, the notion of a "region" of topic space was also introduced. More specifically, a "region" (a.k.a. subregion) of topic space that a first user is focusing-upon can include not only topic nodes that are being directly 'touched' by the STAN_3-monitored activities of that first user, but also the region can include hierarchically or spatially or otherwise adjacent topic nodes that are indirectly 'touched' by a predefined 'halo' of the given first user. In the example of FIG. 1E it was assumed that user 131 had only an upwardly radiating 3 level hierarchical halo. In other words, when user 131 directly 'touched' either of nodes Tn01 and Tn02 of the lower hierarchy plane $TS_{p0}$, those direct 'touchings' radiated only upwardly by two more levels (but not further) to become corresponding indirect 'touchings' of node Tn11 in plane $TS_{p1}$, and of node Tn22 in next higher plane $TS_{p2}$ due to the then present hierarchical graphing between those topic nodes. In one embodiment, indirect 'touchings' are weighted (e.g., scored) less than are direct 'touchings'. Stated otherwise, the attributed time spent at, or energy burned onto (or attentive power projected onto) the indirectly 'touched' node is discounted as compared to the corresponding time spent or energy applied factors attributed the correspondingly directly touched node. The amount of discount may progressively decrease as hierarchical distance from the directly touched node increases. In one embodiment, more influential persons (e.g., the flying Tipping Point Person 429 of FIG. 4D) or other influential social entities are assigned a wider or more energetically intense halo so that their direct and/or indirect 'touchings' count for more than do the 'touchings' of less influential, ordinary social entities (e.g., simple Tom 432' of FIG. 4D). In one embodiment, halos may extend hierarchically downwardly as well as upwardly although the progressively decaying weights of the halos do not have to be symmetrical in the up and down directions. In other words and as an example, the downward directed halo part may be less influential than its corresponding upwardly directed counterpart (or vice versa). (Incidentally, as mentioned above and to be explicated below, 'touching' halos can be defined as extending in multidimensional spatial spaces (see for example 413*xyz* of FIG. 4D and the cylindrical coordinates of branch space 30R.10 of FIG. 3R). The respective spatial spaces can be different from one another in how their respective dimensions are defined and how distances within those dimensions are defined. Respective 'touching' halos within those different spatial spaces can be differently defined from those of other spatial spaces; meaning that in a given spatial space (e.g., 30R.10 of FIG. 3R), certain nodes might be "closer" than others for a corresponding first halo but when considered within a given second spatial space (e.g. 30R.40 of FIG. 3R), the same or alike nodes might be deemed "farther" away for a corresponding second halo. In one embodiment, scalar distance values are defined along the lengths of vertical and/or horizontal tree branches of a given hierarchical tree and the scalar distance values can be different when determined within the respective domain of one spatial space (e.g., cylindrical space) and the respective domain of another spatial space (e.g., prismatic).

Accordingly, in one embodiment, the distance-wise decaying, 'touching' halos of node touching persons (e.g., 131 in FIG. 1E, or more broadly of node touching social entities) can be spatially distributed and/or directed ones rather than (or in addition to) being hierarchically distributed and up/down directed ones. In such embodiments, the topic space (and/or other Cognitive Attention Receiving Spaces of the system 410) is partially populated with fixed points of a predetermined multi-dimensional reference frame (e.g., w, x, y and z coordinates in FIG. 4D where the w dimension is not shown but can be included in frame 413*xyz*) and where relative distances and directions are determined based on those predetermined fixed points. However, most topic nodes (e.g., the node vector 419*a* onto which ring 416*a* is strongly tethered) are free to drift in topic space and to attain any location in the topic space as may be dictated for example by the whims of the governing entities of that displaceable topic node (e.g., 419*a*, see also drifting topic node 30S.53 of FIG. 3S). Generally, the active users of the node (e.g., those in its controlling forums) will vote on where 'their' node should be positioned within a hierarchical and/or within a spatial topic space. Halos of traveling-through visitors who directly 'touch' on the driftable topic nodes then radiate spatially and/or hierarchically by corresponding distances, directions and strengths to optionally contribute to the cumulative touched scores of surrounding and also driftable topic nodes. In accordance with one aspect of the present disclosure, topic space and/or other related spaces (e.g., URL space 390 of FIG. 3E) can be constantly changing and evolving spaces whose inhabiting nodes (or other types of inhabiting data objects, e.g., node clusters) can constantly shift in both location and internal nature and can constantly evolve to have newly graphed interrelations (added-on interrelations) with other alike, space-inhabiting nodes (or other types of space-inhabiting data objects) and/or changed (e.g., strengthened, weakened, broken) interrelations with other alike, space-inhabiting nodes/objects. As such, halos can be constantly casting different shadows through the constantly changing ones of the touched spaces (e.g., topic space, URL space, etc.).

Thus far, topic space (see for example 413' of FIG. 4D) has been described for the most part as if there is just one hierarchical graph or tree linking together all the topic nodes within that space. However, this does not have to be so. In one sense, parts of topic space (or for that matter of any consciousness level Cognitions-representing Space) can be considered as consensus-wise created points, nodes or subregions respectively representing consensus-wise defined, communal cognitions. (This aspect will be better understood when the node anchoring aspect 30R.9*d* of FIG. 3R is discussed below.) Consensus may be differently reached as among different groups of collaborators. The different groups of collaborators may have different ideas about which topic node needs to be closest to, or further away from which other topic node(s) and how they should be hierarchically interrelated.

In accordance with one embodiment, so-called Wiki-like collaboration project control software modules (418*b*, see FIG. 4A, only one shown) are provided for allowing select people such as certified experts having expertise, good reputation and/or credentials within different generalized topic areas to edit and/or vote (approvingly or disapprovingly) with respect to topic nodes that are controlled by Wiki-like collaboration governance groups, where the Wiki-like, collaborated-over topic nodes (not explicitly shown in FIG. 4D—see instead Tn61 of FIG. 3E) may be accessible by way of Wiki-like collaborated-on topic trees (not explicitly shown in FIG. 4D—see instead the "B" tree of FIG. 3E to which node Tn61 attaches). More specifically, it is within the contemplation of the present disclosure to allow for multiple linking trees of hierarchical and non-hierarchical nature to co-exist within the STAN_3 system's topic-to-topic associations (T2T) mapping mechanism 413'. At least one of the linking trees (not explicitly shown in FIG. 4A, see instead the A, B and C trees of FIG. 3E) is a universal and hierarchical tree; meaning in respective order, that it (e.g., tree A of FIG. 3E) connects to all topic nodes within the respective STAN_3 Cognitive Attention Receiving Space (e.g., topic space (Ts)) and that its hierarchical structure allows for non-ambiguous navigation from a root node (not shown) of the tree to any specific one of the universally-accessible nodes (e.g., topic nodes) that are progeny of the root node. Preferably, at least a second hierarchical tree supported by the STAN_3 system 410 is included where the second tree is a semi-universal hierarchical tree of the respective Cognitive Attention Receiving Space (e.g., topic space), meaning that it (e.g., tree B of FIG. 3E) does not connect to all topic nodes or topic space regions (TSRs) within the respective STAN_3 topic space (Ts). More specifically, an example of such a semi-universal, hierarchical tree would be one that does not link to topic nodes directed to scandalous or highly contentious topics, for example to pornographic content, or to racist material, or to seditious material, or other such subject matters. The determination regarding which topic nodes and/or topic space regions (TSRs) will be designated as taboo is left to a governance body that is responsible for maintaining that semi-universal, hierarchical tree. They decide what is permitted on their tree or not. The governance style may be democratic, dictatorial or anything in between. An example of such a limited reach tree might be one designated as safe for children under 13 years of age.

When the term, "Wiki-like" is used herein, for example in regards to the Wiki-like collaboration project control software modules (418*b*), that term does not imply or inherit all attributes of the Wikipedia™ project or the like. More specifically, although Wikipedia™ may strive for disambiguous and singular definitions of unique keywords or phraseologies (e.g., What is a "Topic" from a linguistic point of view, and more specifically, within the context of sentence/clause-level categorization versus discourse-level categorization?), the present application contemplates in the opposite direction, namely, that any two or more cognitive states (or sets of states), whether expressible as words, or pictures, or smells or sounds (e.g., of music), etc.; can have a same name (e.g., the topic is "Needles") and yet different groups of collaborators (e.g., people) can reach respective and different consensuses to define that cognition in their own peculiar, group-approved way. So for example, the STAN_3 system can have many topic nodes each named "Needles" where two or more such topic nodes are hierarchical children of a first Parent node named "Knitting" (thus implying that the first pair of needles are Knitting Needles) and at the same time two or more other nodes each named "Needles" are hierarchical children of a second Parent node named "Safety" and yet other same named child nodes have a third Parent node named "Evergreen Tree" and yet a fourth Parent node for others is named "Medical" and so on. No one group has a monopoly on giving a definition to its version of "Needles" and insisting that users of the STAN_3 system accept that one definition as being exclusive and correct.

Additionally, it is to be appreciated that the cloud computing system used by the STAN_3 system has "chunky granularity", this meaning that the local data centers of a first geographic area are usually not fully identical to those of a spaced apart second geographic area in that each may store locality-specific detailed data that is not fully stored by all the other data centers of the same cloud. What this implies is that "topic space" is not universally the same in all data centers of the cloud. One or a handful of first locality data centers may store topic node definitions for topics of purely local interest, say, a topic called "Proposed Improvements to our Local Library" where this topic node is hierarchical disposed under the domain of Local Politics for example and the same exact topic node will not appear in the "topic space" of a far away other locality because almost no one in the far away other locality will desire to join in on an online chat directed to "Proposed Improvements to our Local Library" of the first locality (and vise versa). Therefore the memory banks of the distant, other data centers are not cluttered up with the storing therein of topic node definitions for purely local topics of an insular first locality. And therefore, the distributed data centers of the cloud computing system are not all homogenously interchangeable with one another. Hence the system has a cloud structure characterized as having "chunky granularity" as opposed to smooth and homogenous granularity. However, with that said, it is within the contemplation of the present disclosure to store backup data for a first data center in the storage banks of one or more (but just a handful) of far away other localities so that; if the first data center does crash and its storage cannot be recreated based on local resources, the backup data stored in the far away other localities may be used to recreate the stored data of the crashed first data center.

With the above now said, it will be shown in conjunction with FIG. 3R how users of various local or universal topic nodes can vote with respect to their non-universal topic trees, and/or with respect to the universally shared portions of topic space, to repel away or attract into closer proximity with their own sense of what is right and wrong, the nodes of other groups just as magnetic poles of different magnets might repel one away from another or attract one to the other. Also, with the above now said, exceptions are allowed-for at and near the root nodes of the STAN_3 Cognitive Attention Receiving Spaces in that system administrators may dictate the names and attributes of hierarchically top level nodes such as the space's top-most catch-all node and the space's top-most quarantined/banished node (where remnants of highly objectionable content is stored with explanations to the offenders as to why they were banished and how they can appeal their banishment or rectify the problem).

Stated otherwise, if there was subject matter defined as "knitting needles" within system topic space, then each and all of the following would be perfectly acceptable under the substantially all-inclusive banner of the STAN_3 system: (1) Arts & Crafts/Knitting/Supplies/[knitting needles$^{11}$], [knitting needles$^{12}$], . . . [knitting needles$^{1K}$]; (2) Engineering/plastics/manufacturing/[knitting needles$^{21}$], [knitting needles$^{22}$], . . . [knitting needles$^{2K'}$]; (3) Education/Potentially Dangerous Supplies In Hands of Teenagers/Home Economics/[knitting needles$^{31}$], [knitting needles$^{32}$], . . . [knitting needles$^{3K}$]; and so on where here each of K, K' and K" is a natural number and each nodes [knitting needles$^{11}$] through [knitting needles$^{3K''}$] could be governed by and controlled by a different group of users having its own unique point of view as to how that topic node should be structured and updated either on a cloud-homogenous basis or for a locally granulated part of the cloud (e.g., if there is a sub-topic node called for example, "Meeting Schedules and Task Assignments for our Local Rural Knitting Club"). It may be appreciated from the given "knitting needles" example that user context (including for example, geographic locality and specificity) is often an important factor in determining what angle a given user is approaching the subject of "knitting needles". For example, if a system user is an engineering professional residing in a big city college area and when in that role he wants to investigate what materials might be best from a manufacturing perspective for producing knitting needles, then for that person, the hierarchical pathway of: //TopicSpace/Root/ . . . /Engineering/plastics/manufacturing/[knitting needles$^{27}$] might be the optimal one for that person in that context. As will be detailed below, the present disclosure contemplates so-called, hybrid nodes including topic/context hybrid nodes which can have shortcut links pointing to context appropriate nodes within topic space. In one embodiment, when the system automatically invites the user to an on-topic chat room (see 102*i* of FIG. 1A) or automatically suggests an on-topic other resource to the user, the system first determines the user's more likely context or contexts and the system consults its hybrid Cognitive Attention Receiving Spaces (e.g., context/keywords, see briefly 384.1 of FIG. 3E) to assist in finding the more context appropriate recommendations for the nodes user. It is to be understood that the above discussion regarding alternate hierarchical organizations for different Wiki-like collaboration projects and the discussion regarding alternate inclusion of different, detail-level topic nodes based on locality-specific details (as occurs in the "chunky granularity" form of cloud computing that may be used by the STAN_3 system) can apply to other Cognitions-representing Spaces besides just topic space, more specifically, at least to the keywords organizing space, the URLs organizing space, the semantically-clustered textual-content organizing space, the social dynamics space and so on.

In addition to "hierarchical" types of trees that link to all (universal for the STAN_3 system) or only a subset (semi-universal) of the topic nodes in the STAN_3 topic space, there can also be "non-hierarchical" trees (e.g., tree C of FIG. 3E) included within the topic space mapping mechanism 413' where the non-hierarchical (and non-universal) trees allow for closed loop linkages between nodes so that no one node is clearly parent or child and where such non-hierarchical trees provide links as between selected topic nodes and/or selected topic space regions (TSRs) and/or selected community boards (see FIG. 1G) and/or as between hybrid combinations of such linkable objects (e.g., from one topic node to the community board of a far away other topic node) while not being universal or fully hierarchical or cloud-homogenous in nature. Such non-hierarchical trees may be used as navigational short cuts for jumping (e.g., warping) for example from one topic space region (TSR.1) of topic space to a far away second topic space region (TSR.2), or for jumping (e.g., warping) for example from a location within topic space to a location in another kind of space (e.g., context space) and so on. The worm-hole tunneling types of non-hierarchical trees do not necessarily allow one to navigate unambiguously and directly to a specific topic node in topic space, whether such topic space is a cloud-homogenous and universal topic space or such a topic space additionally includes topic nodes that are only of locality-based use. Moreover, the worm-hole tunneling types of non-hierarchical trees do not necessarily allow one to navigate from a specific topic node to any chat or other forum participation opportunities a.k.a. (TCONE's) that are tethered weakly or strongly to that specific topic node; and/or from there to the on-topic content sources that are linked with the specific topic node and tagged by users of the topic node as being better or not for serving various on-topic purposes; and/or from there to on-topic social entities who are linked with the specific topic node and tagged by users of the topic node as being better or not for serving various on-topic purposes). Instead, worm-hole tunneling types of non-hierarchical trees may bring the traveler to a travel-limited hierarchical and/or spatial region within topic space that is close to the desired destination, whereafter the traveler will (if allowed to based on user age or other user attributes, e.g., subscription level) have to do some exploring on his or her own to locate an appropriate topic node. This is so for a number of reasons including that most topic nodes in universal topic space can constantly shift in position within the universal topic space and therefore only the universal "A" tree is guaranteed to keep up in real time with the shifting cosmology of the driftable points, nodes or subregions of topic space. Another why warp travel may be restricted is because a given may be under age for viewing certain content or participating in certain forums and warping to a destination by way of a Wiki-like collaboration project tree should not be available as a short-cut for bypassing demographic protection schemes. In other words, as is the case with semi-universal, hierarchical trees, at least some of the non-hierarchical trees can be controlled by respective governance bodies such as Wiki-like collaboration governance groups so that not all users (e.g., under age users) can make use of such navigation trees. One of the governance bodies for controlling navigation privileges can be the system operators of the STAN_3 system 410.

The Wiki-like collaboration project governance bodies that use corresponding ones of the Wiki-like collaboration project control software modules (418*b*, FIG. 4A and understood to be disposed in the cloud) can each establish their own hierarchical and/or non-hierarchical and universal, although generally they will be semi-universal linking trees that link at least to topic nodes controlled by the Wiki-like collaboration project governance body. The Wiki-like collaboration project governance body can be an open type or a limited access type of body. By open type, it is meant here that any STAN user can serve on such a Wiki-like collaboration project governance body if he or she so chooses. Basically, it mimics the collaboration of the open-to-public Wikipedia™ project for example. On the other hand, other Wiki-like collaboration projects supported by the STAN_3 system 410 can be of the limited access type, meaning that only pre-approved STAN users can log in with special permissions and edit attributes of the project-owned topic nodes and/or attributes of the project-owned topic trees and/or vote on collaboration issues.

More specifically, and still referring to FIG. 4A, let it be assumed that USER-A (431) has been admitted into the governance body of a STAN_3 supported Wiki-like collaboration project. Let it be assumed that USER-A has full governance privileges (he can edit anything he wants and vote on any issue he wants). In that case, USER-A can log-in using special log-in procedure 418*a* (e.g., a different password than his usual STAN_3 password; and perhaps a different user name). The special log-in procedure 418*a* gives him full or partial access to the Wiki-like collaboration project control software module 418*b* associated with his special log-in 418*a*. Then by using the so-accessible parts of the project control software module 418*b*, USER-A (431) can add, delete or modify topic nodes that are owned by the Wiki-like collaboration project. Addition or modification can include but is not limited to, changing the node's primary name (see 461 of giF. 4B), the node's secondary alias name, the node's specifications (see 463 of giF. 4B), the node's list of most commonly associated URL hints, keyword hints, meta-tag hints, etc.; the node's placement within the project-owned hierarchical and/or non-hierarchical trees, the node's pointers to its most immediate child nodes (if any) in the project-owned hierarchical and/or non-hierarchical trees, the node's pointers to on-topic chat or other forum participation opportunities and/or the sorting of such pointers according to on-topic purpose (e.g., which blogs or other on-topic forums are most popular, most respected, most credentialed, most used by Tipping Point Persons, etc.); the node's pointers to on-topic other content and/or the sorting of such pointers according to on-topic purpose (e.g., which URL's or other pointers to on-topic content are most popular, most respected, most backed up credentialed peer review, most used by Tipping Point Persons, etc.); the node ID tag given to that node by the collaboration project governance body, and so on. The above is understood to also apply to the topic node data structure shown in present FIGS. 3Ta and 3Tb (discussed below). In an embodiment, a super user can review the voted changes and additions and deletions to the topic tree before changes are accepted. In one embodiment, system administrators (administrators of the STAN_3 system) are empowered to manually and/or automatically (with use of appropriate software) scan through and review all proposed-content changes before the changes are allowed to take place and the system administrators (or more often the approval software they implement) are empowered to delete any scandalous material (including moving the modified node to a pre-identified banishment region of its Cognitive Attention Receiving Space) or to remove the changes or both. Typically, when proposed-changes to a node are blocked by the system administrating software, the corresponding governance body associated with that node will be automatically sent an alert message explaining where, when and why the change blockage and/or node banishment took place. An appeal process may be included whereby users can appeal and seek reversal of the administrative change blockage and/or node banishment. Examples of cases where change blockage and/or node banishment may automatically take place include, but not limited to, cases where the system administrating software determines that it is more likely than not that criminal activity is taking place or being attempted. Change blockage and/or node banishment may also automatically take place in cases where the system administrating software determines that it is more likely than not that overly offensive material is being created. On the other hand, and in one embodiment, the system administrating software and/or so-empowered users of the system may post warning signs or the like in the tree pathways leading to an allegedly offensive node where the posted warning signs may have codes for, and/or may directly indicate: "Warning: All people under 13 stop here and don't go down this branch any further"; "Warning: Gory content beyond here, not good for people with weak stomachs"; "Warning: Material Beyond here likely to be Offensive to Muslims"; and so on. In one embodiment, the warning signs automatically pop up on the user's screen as they navigate toward a potentially offensive node or subregion of a given Cognitive Attention Receiving Space. In one embodiment, if the demographics of the user, as obtained from the user's Personhood Profile indicate the user is a minor or otherwise should be entering a potentially forbidden zone (e.g., the user has system-known mental health issues), the system automatically alerts appropriate authorities (e.g., a parole officer). In one embodiment, and for certain demographic categories (e.g., under age minors warned not to go below here), the warning tag serves not only as a warning but also as a navigational blockage that blocks users having a protected demographic attribute from proceeding into a warning tagged subregion of topic space. Moreover, in one embodiment, users may add onto their individualized account settings, self-imposed blockages that are later voluntarily removable, such as for example, "I am a devout follower of the X religion and I do not want to navigate to any nodes or forums thereof that disparage the X religion".

In addition to the above, a full-privileges member of a respective Wiki-like collaboration project may also modify others of the Cognitive Attention Receiving Space data-objects within the STAN_3 system 410 for trees or space regions owned by the Wiki-like collaboration project. More specifically, aside from being able to modify and/or create topic-to-topic associations (T2T) for project-owned subregions of the topic-to-topic associations mapping mechanism 413 and topic-to-content associations (T2C) 414, the same user (e.g., 431) may be able to modify and/or create locationto-topic associations (L2T) 416 for project-owned ones of such lists or knowledge base rules; and/or modify and/or create topic-to-user associations (T2U) 412 for project-owned ones of such lists or knowledge base rules that affect project owned topic nodes and/or project owned community boards; and/or the fully-privileged user (431) may be able to modify and/or create user-to-user associations (U2U) 411 for project-owned ones of such lists or knowledge base rules that affect project owned definitions of user-to-user associations (e.g., how users within the project relate to one another).

In one embodiment, although not all STAN users may have such full or lesser privileged control of non-open Wiki-like collaboration projects, they can nonetheless visit the project-controlled nodes (if allowed to by the project owners) and at least observe what occurs in the chat or other forum participation sessions of those nodes if not also participate in those collaboration project controlled forums. For some Wiki-like collaboration projects, the other STAN users can view the credentials of the owners of the project and thus determine for themselves how to value or not the contributions that the collaborators in the respective Wiki-like collaboration projects make. In one embodiment, outside-of-the-project users can voice their opinions about the project even though they cannot directly control the project. They can voice their opinions for example by way of surveys and/or chat rooms that are not owned by the Wiki-like collaboration projects but instead have the corresponding Wiki-like collaboration projects as one of the topics of the not-owned chat room (or other such forum). Thus a feedback system is provided for whereby the project governance body can see how outsiders view the project's contributions and progress.

Additionally, in one embodiment, the workproduct of non-open Wiki-like collaboration projects may be made available for observation by paid subscribers. The STAN_3 system may automatically allocate subscription proceeds in part to contributors to the non-open Wiki-like collaboration projects and in part to system administrators based on for example, the amount of traffic that the points, nodes or subregions of the non-open Wiki-like collaboration projects draw. In one embodiment, the paid subscribers may use automated BOTs to automatically scan through the content of the non-open Wiki-like collaboration projects and to collect material based on search algorithms (e.g., knowledge base rules (KBR's)) devised by the paid subscribers.

Returning now to description of general usage members of the STAN_3 community and their attentive energies providing 'touchings' with system resources such as points, nodes or subregions of system topic space (413) or other system-maintained Cognitive Attention Receiving Spaces or system-maintained data organizing mechanisms (e.g., 411, 412, 414, 416), it is to be appreciated that when a general STAN user such as "Stanley" 431 focuses-upon his local data processing device (e.g., 431*a*) and STAN_3 activities-monitoring is turned on for that device (e.g., 431*a* of FIG. 4A), that user's activities can map out not only as 'touchings' directed to respective topic nodes of a topic space tree but also as 'touchings' directed to points, nodes or subregions of other system supported spaces such as for example: (A) 'touchings' in system supported chat room spaces (or more generally: (A.1) 'touchings' in system supported forum spaces), where in the latter case a forum-'touching' occurs when the user opens up a corresponding chat or other forum participation session. The various 'touchings' can have different kinds attention giving powers, energies or "heats" attributed to them. (See also the heats formulating engine of FIG. 1F.) The monitored activities can alternatively or additionally be deemed by system software to be: (B) corresponding 'touchings' (with optionally associated "heats) in a search-specification space (e.g., keywords space), (C) 'touchings' in a URL space and/or in an ERL space (exclusive resource locators); (D) 'touchings' in real life GPS space; (E) 'touchings' by user-controlled avatars or the like in virtual life spaces if the virtual life spaces (which are akin to the Second Life™ world) are supported/monitored by the STAN_3 system 410; (F) 'touchings' in context space; (G) 'touchings' in emotion space; (H) 'touchings' in music and/or sound spaces (see also FIGS. 3F-3G); (I) 'touchings' in recognizable images space (see also FIG. 3M); (J) 'touchings' in recognizable body gestures space (see also FIG. 3I); (K) 'touchings' medical condition space (see also FIG. 3O); (L) 'touchings' in gaming space (not shown); (M) 'touchings' in a system-maintained context space (see also FIG. 3J); (M) 'touchings' in system-maintained hybrid spaces (e.g., time and/or geography and/or context combined with yet another space (see also FIGS. 3E, 3L and FIG. 4E) and so on.

The basis for automatically detecting one or more of these various 'touchings' (and optionally determining their corresponding "heats") and automatically mapping the same into corresponding data-objects organizing spaces (e.g., topics space, keywords space, etc.) is that CFi, CVi or other alike reporting signals are being repeatedly collected by and from user-surrounding devices (e.g., 100) and these signals are being repeatedly in- or up-loaded into report analyzing resources (e.g., servers) of the STAN_3 system 410 where the report analyzing resources then logically link the collected reports with most-likely-to-be correlated points, nodes or subregions of one or more Cognitive Attention Receiving Spaces. More specifically and as an example, when CFi, CVi or other alike reporting signals are being repeatedly fed to domain-lookup servers (DLUX's, see 151 of FIG. 1F) of the system 410, the DLUX servers can output signals 151*o* (FIG. 1F) indicative of the more probable topic nodes that are deemed by the machine system (410) to be directly or indirectly 'touched' by the detected, attention giving activities of the so-monitored STAN user (e.g., "Stanley" 431' of FIG. 4D). In the system of FIG. 4D, the patterns over time of successive and sufficiently 'hot' touchings made by the user (431') can be used to map out one or more significant 'journeys' 431*a*" recently attributable to that social entity (e.g., "Stanley" 431'). Such a journey (e.g., 431*a*") may be deemed significant by the system because, for example, one or more of the 'touchings' in the sequence of 'touching's (e.g., journey 431*a*") exceed a predetermined "heat" threshold level.

The machine-implemented determinations of where a given user is casting his/her attention giving energies (and/or attention giving powers over time and for how long and with what intensity) can be carried out by a machine-means in a manner similar to how such would be determined by fellow human beings when trying to deduce whether their observable friends are paying attention, and if so, to what and with how much intensity. If possible, the eyes are looked at by the machine means as primary indicators of visual attention giving activities. Are the user's eyelids open or closed, and if open, for how long? Is the user's face close to, or far away from the visual content? what does the determined distance imply, given system-known attributes about the user's visual capabilities (e.g., does he/she need to wear eyeglasses)? Is the user rolling his/her eyes to express boredom? Are the user's pupil dilated or not and where primarily is the user's gaze darting to or about?

Tone of voice and detectable vocal stress aberrations can be indicators used by the machine means of attention giving energies as well. Is the user repeatedly yawning or making gasping sounds? Other machine-detectable indicators might include determining if the user stretching his/her body in an attempt to wake up. Is the user fidgeting in his/her chair? What is the user's breathing rate? Based on the user's currently activated PEEP profile and/or activated PHAFUEL record or other such expression and routine categorizing records, the STAN_3 system can automatically determine degrees of likelihood or unlikelihood (probability scores) that the user is paying attention, and if so, more likely to what visual and/or auditory inputs and/or other inputs (e.g., smells, vibrations, etc.) and to what degree.

The content sub-portions that the user probably is casting his/her attention giving energies toward, or the identity of those content sub-portions, be they visual and/or auditory and/or other types of content (e.g., tactile inputs or outputs, smells, odors, fluid flows, temperature gradients, mechanical attributes such as force, acceleration, gravity, etc.) also can be indicative of which sub-portions of which system-maintained Cognitive Representing Spaces the user is aiming his/her attentions to. For example, is it a unique pattern of URL's looked at in a particular sequence over time? Is it a unique pattern of keywords searched on in a particular sequence over time? The context and/or emotional states under which the user probably is casting his/her attention giving energies also can be indicative of which points, nodes or subregions in various system-maintained Cognitive Attention Receiving Spaces the user is aiming his/her attentions to. In accordance with one aspect of the present disclosure, so-called, hybrid or cross-space nodes are maintained by the STAN_3 system for representing combinatorial and/or sequence-based circumstances that involve for example, location as a context-defining variable and time of day as another context-defining variable. More specifically, is the user at his normal work place and is it a time of week and hour of day in which the user routinely and/or by virtue of his/her calendared work schedule probably focusing upon corresponding points, nodes or subregions in Cognitive Attention Receiving Spaces that are determinable by means of a lookup table (LUT) or the like?

When respective significant 'journeys' (e.g., 431*a*", 432*a*") of plural social entities (e.g., 431', 432") cross within a relatively same region of hierarchical and/or spatial topic space (413', or more generally of any relevant Cognitive Attention Receiving Space), then the heats produced by their respective halos will usually add up to thereby define cumulatively increased heats for the so-'touched' nodes do to group activities. This can give a global indication of how 'hot' each of the topic nodes is from the perspective of a collective community of users or specific groups of users. Unlike individualized heats, the detection that certain social entities (e.g., 431', 432") are both crossing through a same topic node during a predetermined same time period may be an event that warrants adding even more heat (a higher heat score) to the shared topic node, particularly if one or more of the those social entities whose paths (e.g., 431*a*", 432*a*") cross through a same node (e.g., 416*c*) is predetermined to be influential or Tipping Point Persons (TPP's, e.g., 429) by the system. When a given topic node experiences plural crossings through it by 'significant journeys' (e.g., 431*a*", 432*a*") of plural social entities (e.g., 431', 432", 429) within a predetermined time duration (e.g., same week), then it may be of value to track the preceding steps that brought those respective social entities to a same hot node (e.g., 416*c*) and it may be of value to track the subsequent journey steps of the influential persons soon after they have touched on the shared hot node (e.g., 416*c*). This can provide other users with insights as to the thinking of the influential or early trailblazing persons as it relates to the topic of the shared hot node (e.g., 416*c*). In other words, what next topic node(s) do the influential or otherwise trail-blazing social entities (e.g., 431', 432") associate with the topic(s) of the shared hot node (e.g., 416*c*)?

Sometimes influential social entities (e.g., 431', 432", 429) follow parallel, but not crossing ones of 'significant journeys' through adjacent subregions of topic space. This kind of event is exemplified by parallel 'significant journeys' 489*a* and 489*b* in FIG. 4D. An automated, journeys pattern detector 489 is provided and configured to automatically detect 'significant journeys' of significant social entities (e.g., Tipping Point Persons 429) and to measure approximate distances (spatially or hierarchically) between those possibly parallel journeys, where the tracked journeys take place within a predetermined time period (e.g., same day, same week, same month, etc.). Then, if the tracked journeys (e.g., 489*a*, 489*b*) are detected by the journeys pattern detector 489 to be relatively close and/or parallel to one another; for example because two or more influential persons touched substantially same topic space regions (TSRs) even though not exactly the same topic nodes (e.g., 416*c*), then the relatively close and/or parallel journeys (e.g., 489*a*, 489*b*) are automatically flagged out by the journeys pattern detector 489 as being worthy of note to interested parties. In one embodiment, the presence of such relatively close and/or parallel journeys may be of interest to marketing people who are looking for trending patterns in topic space (or other Cognitive Attention Receiving Spaces) by persons fitting certain predetermined demographic attributes (e.g., age range, income range, etc.). Although the tracked relatively close and/or parallel journeys (e.g., 489*a*, 489*b*) do not lead the corresponding social entities (e.g., 431', 432") into a same chat room (because, for example, they never touched on a same common topic node or they don't have similar chat co-compatibility profiles), the presence of the relatively close and/or parallel journeys through topic space (and/or through one or more other Cognitive Attention Receiving Spaces) may indicate that the demographically significant (e.g., representative) persons are thinking along similar lines and eventually trending towards certain topic nodes (or other types of points, nodes or subregions) of future interest. It may be worthwhile for product promoters or market predictors to have advance warning of the relatively same directions in which the parallel journeys (e.g., 489*a*, 489*b*) are taking the corresponding travelers (e.g., 431', 432"). Therefore, in accordance with the present disclosure, the automated, journeys pattern detector 489 is configured to provide the above described functionalities.

In one embodiment, the automated, journeys pattern detector 489 is further configured to automatically detect when the not-yet-finished 'significant journeys' of new, later-in-time users are tracking in substantially same sequences and/or closeness of paths with paths (e.g., 489*a*, 489*b*) previously taken by earlier and influential (e.g., pioneering) social entities (e.g., Tipping Point Persons). In such a case, the journeys pattern detector 489 sends alerts to subscribed promoters (or their automated BOT agents) of the presence of the new users whose more recent but not-yet-finished 'significant journeys' are taking them along paths similar to those earlier taken by the trail-blazing pioneers (e.g., Tipping Point Persons 429). The alerted promoters may then wish to make promotional offerings to the in-transit new travelers based on machine-made predictions that the new travelers will substantially follow in the footsteps (e.g., 489*a*, 489*b*) of the earlier and influential (e.g., pioneering) social entities. In one embodiment, the alerts generated by the journeys pattern detector 489 are offered up as leads that are to be bid upon (auctioned off to) persons who are looking for prospective new customers who are following behind in the footsteps of the trail-blazing pioneers. The journeys pattern detector 489 is also used for detecting path crossings such as of journeys 431*a*" and 432*a*" through common node 416*c*. In that case, the closeness of the tracked paths reduces to zero as the paths cross through a same node (e.g., 416*c*) in topic space 413'.

It is within the contemplation of the present disclosure to use automated, journeys pattern detectors like 489 for locating close or crossing 'touching' paths in other data-objects organizing spaces (other Cognitive Attention Receiving Spaces) besides just topic space. For example, influential trailblazers (e.g., Tipping Point Persons) may lead hoards of so-called, "followers" on sequential journeys through a music space (see FIG. 3F) and/or through other forms of shared-experience spaces (e.g., You-Tube™ videos space; shared jokes space, shared books space, etc.). It may desirable for product promoters and/or researchers who research societal trends to be automatically alerted by the STAN_3 system 410 when its other automated, journeys pattern detectors like 489 locate significant movements and/or directions taken in those other data-objects organizing spaces (e.g., Music-space, You-Tube™ videos space; etc.).

In one embodiment, heats are counted as absolute value numbers or scores. However, there are several drawbacks to using such a raw absolute numbers when computing global summation of heats. (But with that said, the present disclosure nonetheless contemplates the use of such a global summation of absolute heats or heat scores as a viable approach.) One drawback is that some topic nodes (or other 'touched' nodes of other spaces) may have thousands of visitors implicitly or actually 'touching' upon them every minute while other nodes—not because they are not worthy—have only a few visitors per week. The smaller visitations number does not necessarily mean that a next visitation by one person to the rarely visited node within a given space (e.g., topic space. keyword space, etc.) should not be considered "hot" or otherwise significant. By way of example, what if a very influential person (a Tipping Point Person 429) 'touches' upon the rarely visited node? That might be considered a significant event even though it was just one user who touched the node. A second drawback to a global summation of absolute heat scores approach is that most users do not care if random strangers 'touched' upon random ones of topic nodes (or nodes of other spaces). They are usually more interested in the cases where relevant social entities (relevant to them; e.g., friends and family) 'touched' upon points, nodes or subregions of topic space where the 'touched' points, nodes or subregions are relevant to them (e.g., My Top 5 Now Topics). This concept will be explored again below when filters of mechanisms that can generate spatial clustering mappings (FIG. 4E) will be detailed below. First, however, the generation of "heat" values needs to be better defined with the following.

Given the above as introductory background, details of a 'relevant' heats measuring system 150 in accordance with FIG. 1F will now be described. In the illustrated example of FIG. 1F, first and second STAN users 131' and 132' are shown as being representative of users whose activities are being monitored by the STAN_3 system 410. As such, corresponding streamlets of CFi signals (current focus indicating records) and/or CVi signals (current implicit or explicit vote indicating records) are respectively shown as collected signal streamlets 151*i*1 and 151*i*2 of users 131' and 132' respectively. These signal streamlets, 151*i*1 and 151*i*2, are being persistently up- or in-loaded into the STAN_3 cloud (see also FIG. 4A) for processing by various automated software modules and/or programmed servers provided therein. The in-cloud processings may include a first set of processings 151 wherein received CFi and/or CVi streamlets are parsed according to user identification, time of original signal generation, place of original signal generation (e.g., machine ID and/or machine location) and likely interrelationships between emotion indicating telemetry and content identifying telemetry (which interrelationships may be functions of the user's currently active PEEP profile and/or current PHAFUEL record). In the process, emotion indicating telemetry is converted into emotion representing codes (e.g., anger, joy, fear, etc. and degree of each) based on the currently active PEEP and/or other activate profiles of the respective user (e.g., 131', 132', etc.). Alternatively or additionally in the process, unique encodings (e.g., keywords, jargon) that are personal to the user are converted into more generically recognizable encodings based on the currently active Domain specific profiles (DsCCp's) of the respective user. More specifically, in the case of the exemplary Superbowl™ Sunday Party described above, it was noted that different people may have different pet names (nick names) for the football hero, Joe Montana (a.k.a. "Golden Joe", "Comeback Joe"). They may similarly have many different pet or nick names for the fictitious football hero named above, Joe-the-Throw Nebraska, perhaps calling him, Nebraska-Magic or Pinpoint-Joe or some other peculiar name. Since the different users may be referring to the same person, Joe Montana (real) or Joe-the-Throw Nebraska (fictitious) by means of many individually preferred names (and perhaps not all even in the English language), part of a CFi "normalizing" process carried out by the STAN_3 system is to recognize the different unique names (or other attributed unique keywords) and to convert all of them into a standardized name (and/or other attributable unique keyword or keywords) before the same are processed by various lookup table (LUT) and cross-talk heat processing means of the system for purpose of narrowing projection on fewer points, fewer nodes or smaller subregions of topic space and/or of other system-maintained Cognitive Attention Receiving Spaces than might otherwise be identified if hybrid cross-talk identifiers were not used.

An example of a hybrid cross-talk identifier may include a system-maintained lookup table (LUT) that receives as its inputs, context signals (e.g., physical location, day of week, time of day, identities of nearby and attention giving other social entities as well as current roles probably adopted currently by those entities) and URL navigation sequence indicating signals (e.g., what sequence of URL's did the user recently traverse through?) and keyword sequence indicating signals (e.g., what sequence of keywords did the user recently focus-upon and/or submit to a search engine). The hybrid cross-talk identifier will then generate, in response, a sorted list of more probable to less probable points, nodes or subregions of topic space and/or other Cognitive Attention Receiving Spaces maintained by the system and that the user's context-based activities point to as more likely points or subregions of cast attention. The user's emotional states (as reported by biological telemetry signals for example) can also be used for narrowing the range of likely points, nodes or subregions in topic space and/or other Cognitive Attention Receiving Spaces that the user's context-based activities point to. Although emotions in general tend to be fuzzy constructs, and people can have more than one emotion at the same time, it is not the current emotions alone that are being used by the STAN_3 system to narrow the range of likely points, nodes or subregions in topic space and/or other Cognitive Attention Receiving Spaces that the user is likely casting his/her attention giving energies to, but rather the cross-talking combination of two or more of these various different factors (context, keywords, URL's, meta-tags, background music/noises, background odors, emotions etc.). Since the human brain tends to operate through association of simultaneously activated cognition centers (e.g., is the amygdala being fired up at the same time that the visual cortex is recognizing a snake in the grass?), the STAN_3 system tries to model this cross-associative process (but on a respective consensus-wise defined, communal recognitions basis) by detecting the likely and more intense attention giving energies being expended by the monitored user and to run these through a hybrid cross-talk identifier such as a lookup table (LUT) for thereby more narrowly pointing to corresponding, consensus-wise defined, representations (e.g., topic nodes) of corresponding communal cognitions.

When the time/location-parsed, and converted (normalized) and recombined (after normalization) data is forwarded to one or more domain-lookup servers (DLUX's) or other hybrid cross-talk identifiers whose jobs it is to automatically determine the most likely topic(s) in topic space (whether universal topic space or a locality augmented combination of universal topic space plus locality-supported only further topic nodes) and/or most likely other points, nodes or subregions in other Cognitive Attention Receiving Spaces that the respective user is likely to be casting his/her attention giving energies upon, the corresponding points, nodes or subregions are identified. Thereafter the initial set of such points, nodes or subregions may be further refined (narrowed in scope) by also using for example, the user's currently active, topic-predicting profiles (e.g., CpCCp's, DsCCp's, PHAFUEL, etc.). Once the more likely to be currently focused-upon points, nodes or subregions are identified, those items are referenced to determine what next resources they point to, including but not limited to, best chat or other forum participation opportunities to invite the user to (e.g., based on chat co-compatibilities), best additional, on-topic resources to point the user to, most likely to be welcomed promotional offerings to expose the user to, and so on.

It is to be noted in summarization here that the in-cloud processings of the received signal streamlets, **151*i*1 and 151*i*2, of corresponding users are not limited to the purpose of pinpointing in topic space (see 313" of FIG. 3D) of most likely topic nodes and/or topic space regions (TSR's) which the respective users will be deemed to be more likely than not focusing-upon at the moment. The received signal streamlets, 151*i*1 and 151*i*2, can be used for identifying nodes or regions in other spaces besides just topic space. This will be discussed more in conjunction with FIG. 3D. For now the focus remains on FIG. 1**F.

Part of the signals 1510 output from the first set 151 of software modules and/or programmed servers illustrated in FIG. 1F are topic domain and/or topic subregion and/or topic node and/or topic space point identifying signals that indicate what general one or handful of topic domains and/or topic nodes or points in topic space have been determined to be most likely (based on likelihood scores) to be ones whose corresponding topics are probably now receiving the most attention giving energies in the corresponding user's mind. In FIG. 1F these determined topic domains/nodes are denoted as $T_{A1}$, $T_{A2}$, etc. where A1, A2 etc. identify the corresponding nodes or subregions in the STAN_3 system's topic space mapping and maintaining mechanism (see 413' of FIG. 4D). Such topic nodes also are represented in area 152 of FIG. 1F by hierarchically interrelated topic nodes Tn01, Tn11 etc.

Computed "heat" scores can come in many types, where type depends on mixtures of weights, baselines and optional normalizations picked when generating the respective "heat" scores. As the STAN_3 system 1F processes in-coming CFi and like streamlets in pipelined fashion, the heats scoring subsystem 150 (FIG. 1F) of the STAN_3 system 410 maintains logical links between the output topic node identifications (e.g., $T_{A1}$, $T_{A2}$, etc.) and the source data which resulted in production of those topic node identifications, where the source data can include one or more of user ID, user CFi's, user CVi's, determined emotions of the user and their degrees, determined location of the user, determined context of the user, and so on. This machine-implemented action is denoted in FIG. 1F by the notations: $T_{A1}$(CFi's, CVi's, emos), $T_{A2}$(CFi's, CVi's, emos), etc. which are associated with signals on the **151*q* output line of module 151**. The maintained logical links may be used for generating relative 'heat' indications as will become apparent from the following.

In addition to retaining the origin associations ($T_{A1}$( ), $T_{A2}$( ), etc.) as between determined topics and original source signals, the heats scoring system 150 of FIG. 1F maintains sets of definitions in its memory for current halo patterns (e.g., **132*h*) at least for more frequently 'followed' ones of its users. If no halo pattern data is stored for a given user, then a default pattern indicating no halo may be used. (Alternatively, the default halo pattern may be one that extends just one level up hierarchically in the A-tree (the universal hierarchical tree) of hierarchical topic space. In other words, if a user with such a default halo pattern implicitly or explicitly touches topic node Tn01 (shown inside box 152 of FIG. 1**F) then hierarchical parent node Tn11 will also be deemed to have been implicitly touched according to a predetermined degree of touching score value.)

'Touching' halos can be fixed or variable. If variable, their extent (e.g., how many hierarchical levels upward they extend), their fade factors (e.g., how rapidly their virtual torches diminish in energy intensity as a function of distance from a core 'touching' point) and their core energy intensities may vary as functions of the node touching user's reputation, and/or his current level and type of emotion and/or speed of travel through the corresponding topic region. In other words, if a given user is merely skimming very rapidly through content and thus implicitly skimming very rapidly through its associated topic region, then this rapid pace of focusing through content can diminish the intensity and/or extent of the user's variable halo (e.g., **132*h*) because it is assumed that the user is casting very little in the way of attention giving power versus time on the Cognitive Attention Receiving Spaces associated with that content. On the other hand, if a given user is determined to be spending a relatively large amount of time stepping very slowly and intently through content and thus implicitly stepping very slowly and with high focus through its associated topic region, then this comparatively slow pace of concentrated focusing can automatically translate into increased intensity and/or increased extent of the user's variable halo (e.g., 132*h*') because it is assumed that the user is casting more in the way of attention giving power versus time on the Cognitive Attention Receiving Spaces associated with that more intently focused-upon content. In one embodiment, the halo of each user is also made an automated function of the specific region of topic space he or she is determined to be skimming through. If that person has very good reputation in that specific region of topic space (as determined for example by votes of others and/or by other credibility determinations), then his/her halo may automatically grow in intensity and/or extent and direction of reach (e.g., per larger halo 132*h*' of FIG. 1F as compared to smaller halo 132*h*). On the other hand, if the same user enters into a region of topic space where he or she is not regarded as an expert, or as one of high reputation and/or as a Tipping Point Person (TPP), then that same user's variable halo (e.g., smaller halo 132*h***) may shrink in intensity and/or extent of reach.

In one embodiment, the halo (and/or other enhance-able weighting attribute) of a Tipping Point Person (TPP) is automatically reduced in effectiveness when the TPP enters into, or otherwise touches a chat or other forum participation session where the demographics of that forum are determined to be substantially outside of an ideal audience demographics profile of that Tipping Point Person (TPP, which ideal demographics profile is predetermined and stored in system memory for that TPP). More specifically, a given TPP may be most influential with an older generation of people (audience) and/or within a certain geographic region but not regarded as so much of an influencer with a younger generation audience and/or with an audience located outside the certain geographic region. Accordingly, when the particular, age-mismatched and/or location-mismatched TPP enters into a chat room (or other forum) populated mostly by younger people and/or people who reside outside the certain geographic region, that particular TPP is not likely to be recognized by the other forum occupants as an influential person who deserves to be awarded with more heavily weighted attributes (e.g., a wider halo). The system 410 automatically senses such conditions in one embodiment and automatically shrinks the TPP's weighted attributes to more normally sized ones (e.g., more normally sized halos). This automated reduction of weighted attributes can be beneficial to the TPP as well as to the audience for whom the TPP is not considered influential. The reason is that TPP's, like other persons, typically have limited bandwidth for handling requests from other people. If the given TPP is bothered with responding to requests (e.g., for help in a topic region he is an expert in) by people who don't appreciate his influential credentials so much (e.g., due to age disparity or distance from the certain geographic regions in which the TPP is better appreciated) then the TPP will have less bandwidth for responding to requests from people who do appreciate to a greatly extent his help or attention. Hence the effectiveness of the TPP may be diminished by his being flagged as a TPP for forums or topic nodes where he will be less appreciated as a result of demographic miscorrelation. Therefore, in the one embodiment, the system automatically tones down the weighted attributes (e.g., halos) of the TPP when he journeys through or nearby forums or nodes that are substantially demographically miscorrelated relative to his ideal demographics profile.

The fixed or variable 'touching' halo (e.g., 132*h*) of each user (e.g., 132') indirectly determines the extent of a touched "topic space region" of his, where this TSR (topic space region) includes a top topic of that user. Consider user 132' in FIG. 1F as an example. Assume that his monitored activities (those monitored with permission by the STAN_3 system 410) result in the domain-lookup server(s) (DLUX 151) determining that user 132' has directly touched nodes Tn01 and Tn02 (implicitly or explicitly), which topic space nodes are illustrated inside box 152 of FIG. 1F. Assume that at the moment, this user 132' has a default, a one-up hierarchical halo. That means that his direct 'touchings' of nodes Tn01 and Tn02 causes his halo (132*h*) to touch the hierarchically next above node (next as along a predetermined tree, e.g., the "A" tree of FIG. 3E) in topic space, namely, node Tn11. In this case the corresponding TSR (topic space region) for this journey is the combination of nodes Tn01, Tn02 and Tn11 located in topic space planes TSp0 and Tsp1 but not Tn22 located in TSp2. Topic space plane symbols TSp0($t$−T1) and Tsp0($t$−T2) represent topic space plane TSp0 as it existed in earlier times of chronological distances T1 time units ago and T2 time units ago respectively. It is within the contemplation of the present disclosure that the 'touching' halo of highly influential personas may be caused to extend from the point of direct 'touching', not only in hierarchical or spatial space, but also in chronological space (e.g., into the past and/or into the future). Accordingly, if the journey paths of two or more highly influential personas, or even ordinary users, barely miss each other because the two traveled through the close by points, nodes or subregions of a given Cognitive Attention Receiving Space (e.g., topic space) but at slightly different times, the chronological space extension of the their respective halos can overlap even though they passed through at slightly different times.

The specified as 'touched', topic space region (TSR) not only identifies a compilation of directly or indirectly 'touched' topic nodes but also implicates, for example, a corresponding set of chat rooms or other forums of those 'touched' topic nodes, where relevant friends of the first user (e.g., 132') may be currently participating in those chat rooms or other forums. (It is to be understood that a directly or indirectly touched topic node can also implicate nodes in other spaces besides forum space, where those other nodes (in respective Cognitive Attention Receiving Spaces) logically link to the touched topic node.) The first user (e.g., 132') may therefore be interested in finding out how many or which ones of his relevant friends are 'touching' those relevant chat rooms or other forums and to what degree (to what extent of relative 'heat')? However, before moving on to explaining a next step where a given type of "heat" is calculated, let it be assumed alternatively that user 132' is a reputable expert in this quadrant of topic space (the one including Tn01) and his halo 132*h* extends downwardly by two hierarchical levels as well as upwardly by three hierarchical levels. In such an alternate situation where the halo is larger and/or more intense, the associated topic space region (TSR) that is automatically determined based on the reputable user 132' having touched node Tn01 will be larger and the number of encompassed chat rooms or other forums will be larger and/or the heat cast by the larger and more intense halo on each indirectly touched node will be greater. And this may be so arranged in order to allow the reputable expert to determine with aid of the enlarged halo which of his relevant friends (or other relevant social entities) are active both up and down in the hierarchy of nodes surrounding his one directly touched node. It is also so arranged in order to allow the relevant friends (those of importance in the user's given context) to see by way of indirect 'touchings' of the expert, what quadrant of topic space the expert is currently journeying through, and moreover, what intensity 'heat' the expert is casting onto the directly or indirectly 'touched' nodes of that quadrant of topic space. In one embodiment, a user can have two or more different halos (e.g., 132*h* and 132*h'*) where for example a first halo (132*h*) is used to define his topic space region (TSR) of interest and the second halo (132*h'*) is used to define the extent to which the first user's 'touchings' are of interest (relevance) to other social entities (e.g., to his friends). There can be multiple copies of second type halos (132*h'*, 132*h"*, etc., latter not shown) for indicating to different groups of friends or other social entities what the extent is of the first user's 'touchings' in one or both of hierarchical/spatial space and across chronological space.

Referring next to further modules beyond 151 of FIG. 1F, a subsequently coupled module, 152 is structured and configured to output so-called, TSR signals 152*o* which represent the corresponding topic space regions (TSR's) deemed to have been indirectly 'touched' by the halo as a result of that halo having made touching contact with nodes ($T_{A1}$( ), $T_{A2}$( ), etc.). Module, 152 receives as one of its inputs, corresponding CFi-plus signals $T_{A1}$(CFi), $T_{A2}$(CFi), etc. which are collectively represented as signal 151*q* but are understood to include the corresponding CFi's, CVi's and/or emo's (other emotion-representing telemetry data received by the system aside from that transmitted via CFi's or CVi's) as well as the node identifications, $T_{A1}(\ )$, $T_{A2}(\ )$, etc. output from the domain-lookup module 151. Additionally, output signal 151*q* from domain-lookup module 151 can include a user's context identifying signal and the latter can be used to automatically adjust variable halos based on context just as other components of the 151*q* signal can be used to automatically adjust variable halos based on other factors.

The TSR signals 152*o* output from module 152 can flow to at least two places. A first destination is a heat parameters formulating module 160. A second destination is a U2U filter module 154. The user-to-user associations filtering module 154 automatically scans through the chat rooms or other forums of the corresponding TSR (e.g., forums of Tn01, Tn02 and Tn11 in this example) to thereby identify presence therein of friends or other relevant social entities belonging to a group (e.g., G2) being tracked by the first user's radar scopes (e.g., 101*r* of FIG. 1A). The output signals 154*o* of the U2U filter module 154 are sent at least to the heat parameters formulating module 160 so the latter can determine how many relevant friends (or other entities) are currently active within the corresponding topic space region (TSR). The output signals 154*o* of the U2U filter module 154 are also sent to the radar scope displaying mechanism of FIG. 1A for thereby identifying to the displaying mechanism which relevant friends (or other entities) are currently active in the corresponding topic space region (TSR). Recall that one possible feature of the radar scope displaying mechanism of FIG. 1A is that friends, etc. who are not currently online and active in a topic space region (TSR) of interest are grayed out or otherwise indicated as not active. The output 154*o* of the U2U filter module 154 can be used for automatically determining when that gray out or fade out aspect is deployed.

Accordingly, two of a plurality of input signals received by the next-described, heat parameters formulating module 160 are the TSR identification signals 152*o* and the relevant active friends identifying signals 154*o*. Identifications of friends (or other relevant social entities) who are not yet currently active in the topic space region (TSR) of interest but who have been invited into that TSR may be obtained from partial output signals 153*q* of a matching forums determining module 153. The latter module 153 receives output signals 151*o* from module 151 and responsively outputs signal 1530, where the latter includes partial output signals 153*q*. Output signals 151*o* indicate which topic nodes are most likely to be of interest to a respective first user (e.g., 132'). The matching forums determining module 153 then finds chat rooms or other TCONE's (forums) having co-compatible chat mates. Some of those co-compatible chat mates can be pre-made friends of the first user (e.g., 132') who are deemed to be currently focused-upon the same topics as the top N now topics of the first user; which is why those co-compatible chat mates are being invited into a same on-topic chat room. Accordingly, partial output signals 153*q* can include identifications of social entities (SPE's) in a target group (e.g., G2) of interest to the first user and thus their identifications plus the identifications of the topic nodes (e.g., Tnxy1, Tnxy2, etc.) to which they have been invited are optionally fed to the heat parameters formulating module 160 for possible use as a substitute for, or an augmentation of the 152*o* (TSR) and 154*o* (relevant SPE's) signals input into module 160.

For sake of completeness, description of the top row of modules in FIG. 1F which top row includes modules 151 and 153 continues here with module 155. As matches are made by module 153 between co-compatible STAN users and the topic nodes they are deemed by the system to currently be most likely focusing-upon, and the specific chat rooms (or other TCONEs—see dSNE 416*d* in FIG. 4D) they are being invited into, statistics of the topic space may be changed, where those statistics indicate where and to what intensity various 'touchings' by participants are spatially "clustered" in topic space (see also FIG. 4E). This statistics updating function is performed by module 155. It automatically updates the counts of how many chat rooms are active, how many users are in each chat room, which chat rooms vote to cleave apart, which vote to merge with one another, which vote to drift (see dSNE 416*d* in FIG. 4D) to a new place in topic space, which ones have what levels of 'touching' heats cast on them, and so forth. In one embodiment, the STAN_3 system 410 automatically suggests to members of a chat room that they drift themselves apart (as a cleaved or drifting chat room) to take up a new tethering position in topic space when a majority of the chat room members refocus themselves (digress themselves) towards a modified topic that rightfully belongs in a different place in topic space than where their chat room currently resides (where the topic node(s) to which their chat room currently tethers, resides). (For more on user digression, see also FIG. 1L and description thereof below.) Assume for example here that the members of an ongoing chat or other forum participation session first indicated via their CFi's that they are interested in primate anatomy and thus they were invited into a chat room tethered to a general, primate anatomy topic node. However, 80% of the same users soon thereafter generated new CFi's indicating they are currently interested in the more specific topic of chimpanzee grooming behavior. In one variation of this hypothetical scenario, there already exits such a specific topic node (chimpanzee grooming behavior) in the system 410. In another variation of this hypothetical scenario, the node (chimpanzee grooming behavior) does not yet exist and the system 410 automatically offers to the 80% portion of the users that such a new node can be auto-generated for them and then the system 410 automatically suggests they agree to drift their part of the chat to the new topic node and continued chat session automatically spawned for. (In so far as the remaining 20% users of the original room are concerned, the cleaving away 80% are reported as having left the original room. See also FIG. 1L and description thereof as provided below.)

Such adaptive changes in topic space, including creation of new topic nodes and ever changing population concentrations (clusterings, see FIG. 4E) of forum participants at different topic nodes/subregions and drifting of chat rooms to new anchoring spots, or mergers or bifurcations of chat or other forum participation sessions, or mergers or bifurcations of topic nodes, all can be tracked to thereby generate velocity of change indication signals which indicate what is becoming more heated and what is cooling down within different regions of topic space. This is another set of parameter signals 155*q* fed into the heat parameters formulating module 160 from module 155. It is to be understood that although the description of FIG. 1F is directed to group 'touchings' in topic space, it is within the contemplation of the present disclosure to use basically same machine operations for determining group heats cast on various points, nodes or subregions in other Cognitions-representing Spaces including for example, keyword space, URL space, semantically-clustered textual content space, social dynamics space and so on. Therefore time-varying group trends with regard to heats cast in other spaces and velocity of change of heats in those other spaces may also be tracked and used for spotting current and/or emerging trends in 'touchings' behaviors by system users. Such data may be provided to authorized vendors for use in better servicing the customers of their respective business sectors and/or customers of different demographic characteristics.

In other words, once a history of recent changes to topic space or other space population densities (e.g., clusterings), ebbs and flows is recorded (e.g., periodic snapshots of change reporting signals 155*o* are recorded), a next module 157 of the top row in FIG. 1F can start making trending predictions of where the movement is heading towards. Such trending predictions 157*o* can represent a further kind of velocity or acceleration prediction indication of what is going to become more heated up and what is expected to be further cooling down in the near future. This is another set of parameter signals 157*q* that can be fed into the heat parameters formulating module 160. Departures from the predictions of trends determining module 157 can be yet other signals that are fed into formulating module 160.

Once again, although FIG. 1F uses the Cognitive Attention Receiving Space known herein as Topic Space (TS) for its example, it is within the contemplation of the present disclosure to similarly compute corresponding 'heats' for individualized and group attentions given to points, nodes or subregions of other system-maintained Cognitive Attention Receiving Spaces such as, but not limited to, keyword space, URL space, context space, social dynamics space and so on.

In a next step in the formation of a heat score in FIG. 1F, the heat parameters formulating module 160 automatically determines which of its input parameters it will instruct a downstream engine (e.g., 170) to use, what weights will be assigned to each and which will not be used (e.g., a zero weight) or which will be negatively used (a negative weight). In one embodiment, the heat parameters formulating module 160 uses a generalized topic region lookup table (LUT, not shown) assigned to a relative large region of topic space within which the corresponding, subset topic region (e.g., A1) of a next-described heat formulating engine 170 resides. In other words, system operators of the STAN_3 system 410 may have prefilled the generalized topic region lookup table (LUT, not shown) to indicate something like: IF subset topic region (e.g., A1) is mostly inside larger topic region A, use the following A-space parameters and weights for feeding summation unit 175 with: Param1(A), wt1(A), Param2(A), wt2 (A), etc., but do not use these other parameters and weights: Param3(A), wt3(A), Param4(A), wt4(A), etc., ELSE IF subset topic region (e.g., B1) is mostly inside larger topic region B, use the following B-space parameters and weights: Param5(B), wt5(B), Param6(B), wt6(B), etc., to define signals (e.g., 171*o*, 172*o*, etc.) which will be fed into summation unit 175 . . . , etc. The system operators in this case will have manually determined which heat parameters and weights are the ones best to use in the given portion of the overall topic space (413' in FIG. 4D). In an alternate embodiment, governing STAN users who have been voted into governance position by users of hierarchically lower topic nodes define the heat parameters and weights to be used in the corresponding quadrant of topic space. In one embodiment, a community boards mechanism of FIG. 1G is used for determining the heat parameters and weights to be used in the corresponding quadrant of topic space.

Still referring to FIG. 1F, two primary inputs into the heat parameters formulating module 160 are one representing an identified TSR 152*o* deemed to have been touched by a given first user (e.g., 132') and an identification 158*q* of a group (e.g., G2) that is being tracked by the radar scope (101*r*) of the given first user (e.g., 132') when that first user is radar header item (101*a* equals Me) in the 101 screen column of FIG. 1A.

Using its various inputs, the formulating module 160 will instruct a downstream engine (e.g., 170, 170A2, 170A3 etc.) how to next generate various kinds 'heat' measurement values (output by units 177, 178, 179 of engine 170 for example). The various kinds 'heat' measurement values are generated in correspondingly instantiated, heat formulating engines where engine 170 is representative of the others. The illustrated engine 170 cross-correlates received group parameters (G2 parameters) with attributes of the selected topic space region (e.g., TSR Tnxy, where node Tnxy here can be also named as node A1). For every tracked social entity group (e.g., G2) and every pre-identified topic space region (TSR) of each header entity (e.g., 101*a* equals Me and pre-identified TSR equals my number 2 of my top N now topics) there is instantiated, a corresponding heat formulating engine like 170. Blocks 170A2, 170A3, etc. represent other instantiated heat formulating engines like 170 directed to other topic space regions (e.g., where the pre-identified TSR equals my number 3, 4, 5, . . . of my top N now topics). Each instantiated heat formulating engine (e.g., 170, 170A2, 170A3, etc.) receives respectively pre-picked parameters 161, etc. from module 160, where as mentioned, the heat parameters formulating module 160 picks the parameters and their corresponding weights. The to-be-picked parameters (171, 172, etc.) and their respective weights (wt.0, wt.1, wt.2, wt.3, etc.) may be recorded in a generalized topic region lookup table (LUT, not shown) which module 160 automatically consults with when providing a corresponding, heat formulating engine (e.g., 170, 170A2, 170A3, etc.) with its respective parameters and weights.

It is to be understood at this juncture that "group" heat is different from individual heat. Because a group is a "social group", it is subject to group dynamics rather than to just individual dynamics. Since each tracked group has its group dynamics (e.g., G2's dynamics) being cross-correlated against a selected TSR and its dynamics (e.g., the dynamics of the TSR identified as Tnxy), the social aspects of the group structure are important attributes in determining "group" heat. More specifically, often it is desirable to credit as a heat-increasing parameter, the fact that there are more relevant people (e.g., members of G2) participating within chat rooms etc. of this TSR then normally is the case for this TSR (e.g., the TSR identified as Tnxy). Accordingly, a first illustrated, but not limiting, computation that can be performed in engine 170 is that of determining a ratio of the current number of G2 members present (participating) in corresponding TSR Tnxy (e.g., Tn01, Tn01 and Tn11) in a recent duration versus the number of G2 members that are normally there as a baseline that has been pre-obtained over a predetermined and pro-rated baseline period (e.g., the last 30 minutes). This normalized first factor 171 can be fed as a first weighted signal 171*o* (fully weighted, or partially weighted) into summation unit 175 where the weighting factor wt.1 enters one input of multiplier 171*x* and first factor 171 enters the other. On the other hand, in some situations it may be desirable to not normalize relative to a baseline. In that case, a baseline weighting factor, wt.0 is set to zero for example in the denominator of the ratio shown for forming the first input parameter signal 171 of engine 170. In yet other situations it may be desirable to operate in a partially normalized and partially not normalized mode wherein the baseline weighting factor, wt.0 is set to a value that causes the product, (wt.0)*(Baseline) to be relatively close to a predetermined constant (e.g., 1) in the denominator. Thus the ratio that forms signal 171 is partially normalized by the baseline value but not completely so normalized. A variation on theme in forming input signal 171 (there can be many variations) is to first pre-weight the relevant friends count according to the reputation or other influence factor of each present (participating) member of the G2 group. In other words, rather than doing a simple body count, input factor 171 can be an optionally partially/fully normalized reputation mass count, where mass here means the relative influence attributed to each present member. A normal member may have a relative mass of 1.0 while a more influential or more respected or more highly credentialed member may have a weight of 1.25 or more (for example).

Yet another possibility (not shown due to space limitations in FIG. 1F) is to also count as an additive heat source, participating social entities who are not members of the targeted G2 group but who are nonetheless identified in result signal 153*q* (SPE's(Tnxy)) as entities who are currently focused-upon and/or already participating in a forum of the same TSR and to normalize that count versus the baseline number for that same TSR. In other words, if more strangers than usual are also currently focused-upon the same topic space region TnxyA1, that works to add a slight amount of additional outside 'heat' and thus increase the heat values that will ultimately be calculated for that TSR and assigned to the target G2 group. Stated otherwise, the heat of outsiders can positively or negatively color the final heat attributed to insider group G2.

As further seen in FIG. 1F, another optionally weighted and optionally normalized input factor signal 172*o* indicates the emotion levels of group G2 members with regard to that TSR. More specifically, if the group G2 members are normally subdued about the one or more topic nodes of the subject TSR (e.g., TnxyA1) but now they are expressing substantially enhanced emotions about the same topic space region (per their CFi signals and as interpreted through their respective PEEP records), then that implies that they are applying more intense attention giving power or energies to the TSR and that works to increase the 'heat' values that will ultimately be calculated for that TSR and assigned to the target G2 group. As a further variation, the optionally normalized emotional heats of strangers identified by result signal 153*q* (and whose emotions are carried in corresponding 151*q* signals) can be used to augment, in other words to color, to slightly budge, the ultimately calculated heat values produced by engine 170 (as output by units 177, 178, 179 of engine 170).

Yet another factor that can be applied to summation unit 175 is the optionally normalized duration of focus by group G2 members on the topic nodes of the subject TSR (e.g., on subregion Tnxy1 for example) relative for example, to a baseline duration as summed with a predetermined constant (e.g., +1). In FIG. 1F, the normalized duration is formed as a function of input parameters 173 multiplied by weighting vector wt.3 in multiplier 173*x* to thus form product signal 173*o* for application as an input into summing unit 175. In other words, if group members are spending more time focusing-upon (casting attention giving energies on) this topic area (e.g., Tnxy1) than normal, that works to increase the 'heat' values that will ultimately be calculated. The optionally normalized durations of focus of strangers can also be included as augmenting coloration (slight score shifting) in the computation. A wide variety of other optionally normalized and/or optionally weighted attributes W can be factored in as represented in the schematic of engine 170 by multiplier unit 17*wx*, by it inputs 17*w* and by its respective weight factor wt.W and its output signal 17*wo*.

The output signal 176 produced by summation unit 175 of engine 170 can therefore represent a relative amount of so-called 'heat' energy (attention giving energy) that has been recently cast over a predefined time duration by STAN users on the subject topic space region (e.g., TSR Tnxy1) by currently online members of the 'insider' G2 target group (as well as optionally by some outside strangers) and which heat energy has not yet faded away (e.g., in a black body radiating style similar to how black bodies of physics radiate their energies off into space) where this 'heat' energy value signal 176 is repeatedly recomputed for corresponding predetermined durations of time. The absolute lengths of these predetermined durations of time may vary depending on objective. In some cases it may be desirable to discount (filter out) what a group (e.g., G2) has been focusing-upon shortly after a major news event breaks out (e.g., an earthquake, a political upheaval) and causes the group (e.g., G2) to divert its focus momentarily to a new topic area (e.g., earthquake preparedness) whereas otherwise the group was focusing-upon a different subregion of topic space. In other words, it may be desirable to not or count or to discount what the group (e.g., G2) has been focusing-upon in the last say 5 minutes to two hours after a major news story unfolds and to count or more heavily weigh the heats cast on topic nodes in more normal time durations and/or longer durations (e.g., weeks, months) that are not tainted by a fad of the moment. On the other hand, in other situations it may be desirable to detect when the group (e.g., G2) has been diverted into focusing-upon a topic related to a fad of the moment and thereafter the group (e.g., G2) continues to remain fixated on the new topic rather than reverting back to the topic space subregion (TSR) that was earlier their region of prolonged focus. This may indicate a major shift in focus by the tracked group (e.g., G2).

Although 'heated' and maintained focus by a given group (e.g., G2) over a predetermined time duration and on a given subregion (TSR) of topic space is one kind of 'heat' that can be of interest to a given STAN user (e.g., user 131'), it is also within the contemplation of the present disclosure that the given STAN user (e.g., user 131') may be interested in seeing (and having the system 410 automatically calculate for him) heats cast by his followed groups (e.g., G2) and/or his followed other social entities (e.g., influential individuals) on subregions or nodes of other kinds of Cognitive Attention Receiving Spaces such as keywords space, or URL space or music space or other such spaces as shall be more detailed when FIG. 3E is described below. For sake of brief explanation here, heat engines like 170 may be tasked with computing heats cast on different nodes of a music space (see briefly FIG. 3F) where clusterings of large heats (see briefly FIG. 4E) can indicate to the user (e.g., user 131' of FIG. 1F) which new songs or musical genre areas his or her friends or followed influential people are more recently focusing-upon. This kind of heats clustering information (see briefly FIG. 4E) can keep the user informed about and not left out on new regions of topic space or music space or another kind of space that his followed friends/influencers are migrating to or have recently migrated to.

It may be desirable to filter the parameters input into a given heat-calculating engine such as 170 of FIG. 1F according to any of a number of different criteria. More specifically, by picking a specific space or subspace, the computed "heat" values may indicate to the watchdogging user not only what are the hottest topics of his/her friends and/or followed groups recently (e.g., last one hour) or in a longer term period (e.g., this past week, month, business financial quarter, etc.), but for example, what are the hottest chat rooms or other forums of the followed entities in a relevant time period, what are the hottest other shared experiences (e.g., movies, You-Tube™ videos, TV shows, sports events, books, social games, music events, etc.) of his/her friends and/or followed groups, TPP's, etc., recently (e.g., last 30 minutes) or in a longer term period (e.g., this past evening, weekday, weekend, week, month, business financial quarter, etc.). The filtering parameters may also discriminate with regard to heats generated in a specified geographic area and/or for a specified demographic population, where the latter can be in a virtual world as well as in real life.

In general, the reporting of negative emotional reactions by users to specific invitations, topics, sub-portions of content and so forth is taken as a negative vote by the user with regard to the corresponding data object. However, there is a special subclass where negative emotional reaction (e.g., CFi's or CVi's indicating disgust for example) cannot be automatically taken as indicative of the user rejecting the system-presented invitations or topics, or the user rejecting the sub-portions of content that he/she was focusing-upon. This occurs when the subject matter of the corresponding invitation or content is a revolting kind and the normal reaction of most people is disgust or another such negative emotional reaction. In accordance with one aspect of the present disclosure, invitations or content sub-portions that are expected to generate negative emotional reactions are automatically identified and tagged as such. And then when an expected, negative emotional reaction is reported back by the CFi's, CVi's of respective users, such negative emotional reactions are automatically discounted as not meaning that the user rejects the invitation and/or sub-portion of content, but rather that the user is nonetheless interested in the same even though demonstrating through telemetry detected emotion that the subject matter is repulsive to the respective user. With that said, it also within the contemplation of the present disclosure to allow sensitive users (e.g., those who are devout followers of religion X for example, as explained above) to self-designate themselves as users who are rejecting all invitations to which they exhibit negative emotional reaction and the system honors them as being exceptions to its general rule about the reverse emotional logic concerning normally revolting subject matter.

Still referring to FIG. 1F, specific time durations and/o specific spaces or subspaces are merely some examples of how heats may be filtered so as to provide more focused information to a first user about how others are behaving (and/or how the user himself has been behaving). Heat information may also be generated while filtering on the basis of context. More specifically, a given user may be asked by his boss to report on what he has been doing on the job this past month or past business quarter. The user may refresh his or her memory by inputting a request to the STAN_3 system 410 to show the one user's heats over the past month and as further filtered to count only 'touchings' that occurred within the context and/or geographic location basis of being at work or on the job. In other words, the user's 'touchings' that occurred outside the specified context (e.g., of being at work or on the job) will not be counted. This allows the user to recount his online activities based on the more heated 'touchings' that he/she made within the given context and/or specified time period. In another situation, the user may be interested in collecting information about heats cast by him/herself and/or others while within a specified one or more geographic locations (e.g., as determined by GPS). In another situation, the user may be interested in collecting information about heats cast by him/herself and/or others while focusing-upon a specified kind of content (e.g., as determined by CFi's that report focus upon one or more specified URL's). In another situation, the user may be interested in collecting information about heats cast by him/herself and/or others while engaged in certain activities involving group dynamics (see briefly FIG. 1M). In such various cases, available CFi, CVi and/or other such collected and historically recorded telemetry may be filtered according to the relevant factors (e.g., time, place, context, focused-upon content, nearby other persons, etc.) and run through a corresponding one or more heat-computing engines (e.g., 170) for thereby creating heat concentration (spatial clustering) maps as distributed over topic and/or other spaces and/or as distributed over time (real or virtual). The so-collected information about where in different Cognition-representing Spaces the user and/or others cast significant heat and when and optionally under a certain limited context may be used to provide a more accurate historical picture as to what topics (and/or other PNOS's of other spaces) drew the most intense heat in say the last week, the last month or another such specified time period. This collected information can be used by the first user to better assess his/her behavior and/or the behavior of others.

As mentioned above, heat measurement values may come in many different flavors or kinds including normalized, fully or partially not normalized, filtered or not according to above-threshold duration, above-threshold emotion levels, time, location, context, etc. Since the 'heat' energy value 176 produced by the weighted parameters summing unit 175 may fluctuate substantially over longer periods of time or smooth out over longer periods of time, it may be desirable to process the 'heat' energy value signals 176 with integrating and/or differentiating filter mechanisms. For example, it may be desirable to compute an averaged 'heat' energy value over a yet longer duration, T1 (longer than the relatively short time durations in which respective 'heat' energy value signals 176 are generated). The more averaged output signal is referred to here as $H_{avg}(T1)$. This $H_{avg}(T1)$ signal may be obtained by simply summing the user-cast "heat energies" during time T1 for each heat-casting member among all the members of group G2 who are 'touching' the subject topic node directly (or indirectly by means of a halo) and then dividing this sum by the duration length, T1. Alternatively, when such is possible, the $H_{avg}(T1)$ output signal may be obtained by regression fitting of sample points represented by the contributions of touching G2 members over time. The plot of over-time contributions is fitted to by a variably adjusting and thus conformably fitting but smooth and continuous over-time function. Then the area under the fitted smooth curve is determined by integrating over duration T1 to determine the total heat energy in period T1. In one embodiment the continuous fitting function is normalized into the form $F(H_j(T1))/T1$, where j spans the number of touching members of group Gk (where here k is a natural number such as 1, 2, etc.) and $H_j(T1)$ (where here j is a natural number such as 1, 2, etc.) represents their respective heats cast over time window T1. F( ) may be a Fourier Transform.

In another embodiment, another appropriate smoothing function such as that of a running average filter unit 177 whose window duration T1 is predefined, is used and a representation of current average heat intensity may be had in this way. On the other hand, aside from computing average heat, it may be desirable to pinpoint topic space regions (TSR's) and/or social groups (e.g., G2) which are showing an unusual velocity of change in their heat, where the term velocity is used here to indicate either a significant increase or decrease in the heat energy function being considered relative to time. In the case of the continuous representation of this averaged heat energy this may be obtained by the first derivative with respect to time t, more specifically $V=d\{F(H_j(T1))/T1\}/dt$; and for the discrete representation it may be obtained by taking the difference of $H_{avg}(T1)$ at two different appropriate times and dividing by the time interval being considered.

Likewise, acceleration in corresponding 'heat' energy value 176 may be of interest. In one embodiment, production of an acceleration indicating signal may be carried out by double differentiating unit 178. (In this regard, unit 177 smooths the possibly discontinuous signal 176 and then unit 178 computes the acceleration of the smoothed and thus continuous output of unit 177.) In the continuous function fitting case, the acceleration may be made available by obtaining the second derivative of the smooth curve versus time that has been fitted to the sample points. If the discrete representation of sample points is instead used, the collective heat may be computed at two different time points and the difference of these heats divided by the time interval between them would indicate heat velocity for that time interval. Repeating for a next time interval would then give the heat velocity at that next adjacent time interval and production of a difference signal representing the difference between these two velocities divided by the sum of the time intervals would give an average acceleration value for the respective two time intervals.

It may also be desirable to keep an eye on the range of 'heat' energy values 176 over a predefined period of time and the MIN/MAX unit 179 may in this case use the same running time window T1 as used by unit 177 but instead output a bar graph or other indicator of the minimum to maximum 'heat' values seen over the relevant time window. The MIN/MAX unit 179 is periodically reset, for example at the start of each new running time window T1.

Although the description above has focused-upon "heat" as cast by a social group on one or more topic nodes, it is within the contemplation of the present disclosure to alternatively or additionally repeatedly compute with machine-implemented means, different kinds of "heat" as cast by a social group on one or more nodes or subregions of other kinds of data-objects organizing spaces, including but not limited to, keywords space, URL space and so on.

Block 180 of FIG. 1F shows one possible example of how the output signals of units 177 (heat average over duration T1), 178 (heat acceleration) and 179 (min/max) may be displayed for user, where the base point A1 indicates that this is for topic space region A1. The same set of symbols may then be used in the display format of FIG. 1D to represent the latest 'heat' information regarding topic A1 and the group (e.g., My Immediate Family, see 101*b* of FIG. 1A) for which that heat information is being indicated.

In some instances, all this complex 'heat' tracking information may be more than what a given user of the STAN_3 system 410 wants. The user may instead wish to simply be informed when the tracked 'heat' information crosses above predefined threshold values; in which case the system 410 automatically throws up a HOT! flag like 115*g* in FIG. 1A and that is enough to alert the user to the fact that he may wish to pay closer attention to that topic and/or the group (e.g., G2) that is currently engaged with that topic.

Referring to FIG. 1D, aside from showing the user-to-topic associated (U2T) heats as produced by relevant social entities (e.g., My Immediate Family, see 101*b* of FIG. 1A) and as computed for example by the mechanism shown in FIG. 1F, it is possible to display user-to-user (U2U) associated heats as produced due to social exchanges between relevant social entities (e.g., as between members of My Immediate Family) where, again, this can be based on normalized values and detected accelerations of such as weighted by the emotions and/or the influence weights attributed to different relevant social entities. More specifically, if the frequency and/or amount of information exchange between two relevant and highly influential (e.g., Tipping Point Persons) within group G2 is detected by the system 410 to have exceeded a predetermined threshold, then a radar object like 101*ra*" of FIG. 1C may pop up or region 143 of FIG. 1D may flash (e.g., in red colors) to alert a first user (user of tablet computer 100) that one of his followed and thus relevant social groups is currently showing unusual exchange heat (group member to group member exchange heat). In a further variation, the displayed alert (e.g., the pyramid of FIG. 1C) may indicate that the group member to group member heated exchange is directed to one of the currently top 5 topics of the "Me" entity. In other words, a topic now of major interest to the "Me" entity is currently being heavily discussed as between two social entities whom the first user regards as highly influential or highly relevant to him.

Referring back to FIG. 1A and in view of the above, it may now be better appreciated how various groups (e.g., 101*b*, 101*c*) that are relevant to the tablet (or other device) user under a given context may be defined and iconically represented (e.g., as discs or circles having unpacking options like 99+, topic space flagging options like 101*ts* and shuffling options like 98+). It may now be better appreciated how the 'heat' signatures (e.g., 101*w*' of FIG. 1B) attributed to each of the groups can be automatically computed and intuitively displayed. It may now be better appreciated how the My top 5 now topics of serving plate 102*a*_Now in FIG. 1A can be automatically identified (see FIG. 1E) and intuitively displayed in top tray 102. It is to be understood that the exemplary organization in FIG. 1A, namely, that of linearly arrayed items including: (1) the social entity representing items 101*a*-101*d* and including (2) the attention giving energy indicating items 101*ra*-101*rd* and also including (3) the target indicating items 102*a*-102*c* (which items identify the points, nodes or subregions of one or more Cognitive Attention Receiving Spaces that are receiving attention-worthy "heat") or corresponding chat or other forum participation opportunities associated with the attention receiving targets or other resources (e.g., further content) associated with the attention receiving targets; is merely an exemplary organization and the arrayed items may be displayed or otherwise presented (e.g., by voice-navigatable voice menu) according to a variety of other ways. As such, the present disclosure is not to be limited to the specific layout shown in FIG. 1A. Additionally, it is to be understood that while FIG. 1A is a static picture, in actual use many of the various tracking and invitation providing objects of respective trays 101, 102, 103 and 104 may be rotating (e.g., pyramids 101*r*) or backwardly receding serving plates (e.g., 102*a*Now) which are overlaid by more current serving plates or glowing playground indicators (e.g., 103*b*) or flashing promotional offerings (e.g., 104*a*). The user may wish at various times to not be distracted by such dynamically changing icons. In that case, the user may activate the respective, Hide-tray functions (e.g., 102*z*) for causing the respective tray to recede into minimized or hidden form at its respective edge of the screen 111. In one embodiment, a Hide-all trays tool is provided so that the user can simultaneously hide or minimize all the side trays and later unhide or restore selected ones or all of those trays. In one embodiment, threshold crossing levels may be set for respective trays such that when the respective level of urgency of a given invitation, for example, exceeds the corresponding threshold crossing level and even though its tray (e.g., 102) is in hidden or minimized mode, the especially urgent invitation (or other indicator) protrudes itself into the on-screen area for recognition by the user as being an especially urgent invitation (or other indicator having special urgency).

Referring to FIG. 1G, when a currently hot topic or a currently hot exchange between group or forum members on a given topic is flagged to the user of computer 100, one of the options he may exercise is to view a hot topic percolation board (a.k.a. (also known as) herein as a community worthy items summarizing board). Such a hot topic percolation board is a form of community board where the currently deemed-to-be most relevant (most worthy to be collectively looked at) comments are percolated up from different on-topic chat rooms or the like to be viewed by a broader community; what may be referred to as a confederation of chat or other forum participation sessions whose anchors are clustered in a particular subregion (e.g., quadrant) of topic space (and/or optionally in subregions of other Cognitive Attention Receiving Spaces). In the case where an invitation flashes (e.g., 102*a*2" in FIG. 1G) as a hot button item on the invitations serving tray 102' of the user's screen (or from an off-screen such tray into an on-screen edge area), the user may activate the corresponding starburst plus tool for the point or the user might right click or double tap (or invoke other activation) and one of the options presented to him will be the Show Community Topic Boards option.

More specifically, and referring to the middle of FIG. 1G, the popped open Community Topic Boards Frame 185 (unfurled from circular area 102*a*2" by way of roll-out indicator 115*a*7) may include a main heading portion 185*a* indicating what topic(s) (within STAN_3 topic space) is/are being addressed and how that/those topic(s) relates to an identified social entity (e.g., it is top topic number 2 of SE1). If the user activates (e.g., clicks or taps on) the corresponding information expansion tool 185*a*+, the system 410 automatically provides additional information about the community board (what is it, what do the rankings mean, what other options are available, etc.) and about the topic and topic node(s) with which it is associated; and optionally the system 410 automatically provides additional information about how social entity SE1 is associated with that topic space region (TSR) and/or subregion of another system-maintained space. In one embodiment, one of the informational options made available by activating expansion tool 185*a*+ is the popping open of a map 185*b* of the local topic space region (TSR) associated with the open Community Topic Board 185. More details about the You Are Here map 185*b* will be provided below.

Inside the primary Community Topic Board Frame 185 there may be displayed one or more subsidiary boards (e.g., 186, 187, . . . ). Referring to the subsidiary board 186 which is shown displayed in the forefront, it has a corresponding subsidiary heading portion 186*a* indicating that the illustrated and ranked items are mostly people-picked and people-ranked ones (as opposed to being picked and ranked only or mostly by a computer program). The subsidiary heading portion 186*a* may have an information expansion tool (not shown, but like 185*a*+) attached to it. In the case of the back-positioned other exemplary board 187, the rankings and choosing of what items to post there were generated primarily by a computer system (410) rather than by real life people. In accordance with one aspect of an embodiment, users may look at the back subsidiary board 187 that was populated by mostly computer action and such people may then vote and/or comment on the items (187*c*) posted on the back subsidiary board 187 to a sufficient degree such that the item is automatically moved as a result of voting/commenting from the back subsidiary board 187 to column 186*c* of the forefront board 186. The knowledge base rules used for determining if and when to promote a on-backboard item (187*c*) to a forefront board 186 and where to place it (the on-board item) within the rankings of the forefront board may vary according to region of topic space, the kinds of users who are looking at the community board and so on. In one embodiment, for example, the automated determination deals with promotion of an on-backboard item (187*c*, e.g., an informational contribution made by a user of the STAN_3 system while engaged with, and to a chat or other forum participation session maintained by the system, where the chat or other forum participation session is pointed to by at least one of a point, node or subregion of a system-maintained Cognitive Attention Receiving Space such as topic space) where the promotion of the on-backboard item (187*c*) causes the item to instead become a forefront on-board item (e.g., 186*c*1) and the machine-implemented determination to promote is based at least on one or more factors selected from the factors group that includes: (1) number of net positive votes representing different people who voted to promote the on-board item; (2) reputations and/or credentials of people who voted to promote the on-board item versus that of those who voted against its promotion; (3) rapidity with which people voted to promote (or demote) the on-board item (e.g., number of net positive votes within a predetermined unit of time exceeds a threshold), (4) emotions relayed via CFi's or CVi's indicating how strongly the voters felt about the on-board item and whether the emotions were intensifying with time, etc.

Each subsidiary board 186, 187, etc. (only two shown) has a respective ranking column (e.g., 186*b*) for ranking the user contributions represented by arrayed items contained therein and a corresponding expansion tool (e.g., 186*b*+) for viewing and/or altering the method that has been pre-used by the system 410 for ranking the rank-wise shown items (e.g., comments, tweets or otherwise whole or abbreviated snippets of user-originated contributions of information). As in the case of promoting a posted item from backboard 187 to forefront board 186, the displayed rankings (186*b*) may be based on popularity of the on-board item (e.g., number of net positive votes exceeding a predetermined threshold crossing), on emotions running high and higher in a short time, and so on. When a user activates the ranking column expansion tool (e.g., 186*b*+), the user is automatically presented with an explanation of the currently displayed ranking system and with an option to ask for displaying of a differently sorted list based on a correspondingly different ranking system (e.g., show items ranked according to a 'heat' formula rather than according to raw number of net positive votes).

For the case of exemplary comment snippet 186*c*1 (the top or #1 ranked one in items containing column 186*c*), if the viewing user activates its respective expansion tool 186*c*1+, then the user is automatically presented with further information (not shown) such as, (1) who (which social entity) originated the comment or other user contribution 186*c*1; (2) a more complete copy of the originated comment/user contribution (where the snippet may be an abstracted/abbreviated version of the original full comment/contribution), (3) information about when the shown item (e.g., comment, tweet, abstracted comment, movie preview or other user contribution, etc.) in its whole was originated; (4) information about where the shown item (186*c*1) in its original whole form was originated and/or information about where this location of origination can be found, for example: (4a) an identification of an online region (e.g., ID of chat room or other TCONE, ID of its topic node, ID of discussion group and/or ID of external platform if it is an out-of-STAN playground) and/or this 'more' information can be (4b) an identification of a real life (ReL) location, in context appropriate form (e.g., GPS coordinates and/or name of meeting room, etc.) of where the shown item (186*c*1) was originated; (5) information about the reputation, credentials, etc. of the originator of the shown item (186*c*1) in its original whole form; (6) information about the reputation, credentials, etc. of the TCONE social entities whose votes indicated that the shown item (186$c$1) deserves promotion up to the forefront Community Topic Board (e.g., 186) either from a backboard 187 or from a TCONE (not shown); (7) information about the reputation, credentials, etc. of the TCONE social entities whose votes indicated that the shown item (186$c$1) deserves to be downgraded rather than up-ranked and/or promoted; and so on.

As shown in the voting/commenting options column 186$d$ of FIG. 1G, a user of the illustrated tablet computer 100' may explicitly vote to indicate that he/she Likes the corresponding item, Dislikes the corresponding item and/or has additional comments (e.g., my 2 cents) to post about the corresponding item (e.g., 186$c$1). In the case where secondary users (those who add their 2 cents) decide to contribute respective sub-thread comments about a posted item (e.g., 186$c$1), then a "Comments re this" link and an indication of how many comments there are, lights up or becomes ungrayed in the area of the corresponding posted item (e.g., 186$c$1). Users may click or tap on the so-ungrayed or otherwise shown hyperlink (not shown) so as to open up a comments thread window that shows the new comments and how they relate one to the next (e.g., parent/reply) in a comments hierarchy. The newly added comments of the subthreads (basically micro-blogs about the higher ranked item 186$c$1 of the forefront community board 186) originally start in a status of being underboard items (not truly posted on community sub-board 186). However these underboard items may themselves be voted on to a point where they (a select subset of the subthread comments) are promoted into becoming higher ranked items (186$c$) of the forefront community board 186 or even items that are promoted from that community board 186 to a community board which is placed at a higher topic node in STAN_3 topic space. Promotion to a next higher hierarchical level (or demotion to a lower one) will be shortly described with reference to the automated process of FIG. 1H.

Although not shown in FIG. 1G (due to space restraints) it is within the contemplation of the present disclosure to have a most-recent-comments/contributions pane that is repeatedly updated with the most recent comments or other user contributions added to the community board 186 irrespective of ranking. In this way, when a newly added item appears on the board, even if it has only 1 net positive vote and thus a low rank, it will not be always hidden on the bottom of the list and thus never given an opportunity to be seen near the top of the list. In one embodiment, the most-recent-comments/contributions pane (not shown) is sorted according to a time based "newness" factor. In the same or an alternate embodiment, the most-recent-comments pane (not shown) is sorted according to an exposure-thus-far factor which indicates the number of times the recent-comment/contribution has been exposed for a first time to unique people. The larger the exposures-thus-far factor, the lower down the list the new item gets pushed. Accordingly, if a new item is only one day old but it has already been seen many times by unique people and not voted upwardly, it won't receive continued promotion credit simply for being new, since it has been seen already above a predetermined number, X of times.

In one embodiment, column 186$d$ displays a user selected set of options. By clicking or tapping or otherwise activating an expansion tool (e.g., starburst+) associated with column 186$d$ (shown in the magnified view under 186$d$), the user can modify the number of options displayed for each row and within column 186$d$ to, for example, show how many My-2-cents comments or other My-2-cents user contributions have already been posted (where this displaying of number of comments may be in addition to or as an alternative to showing number of comments in each corresponding posted item (e.g., 186$c$1)). As alternatives or additions to text-based posts on the community board, posts (user contributions) can include embedded multimedia content, attached sound files, attached voice files, embedded or attached pictures, slide shows, database records, tables, movies, songs, whiteboards, simple interactive puzzles, maps, quizzes, etc.

The My-2-cents comments/contributions have already been posted can define one so-called, micro-blog directed at the correspondingly posted item (e.g., 186$c$1). However, there can be additional tweets, blogs, chats or other forum participation sessions directed at the correspondingly posted item (e.g., 186$c$1) and one of the further options (shown in the magnified view under 186$d$) causes a pop up window to automatically open up with links and/or data about those other or additional forum participation sessions (or further content providing resources) that are directed at the correspondingly posted item (e.g., 186$c$1). The STAN user can click or tap or otherwise activate any one or more of the links in the popped up window to thereby view (or otherwise perceive) the presentations made in those other streams or sessions if so interested. Alternatively or additionally the user may drag-and-drop the popped open links to a My-Cloud-Savings Bank tool 113$c$1$h'''$ (to be further described elsewhere) and investigate them at a later time. In one embodiment, the user may drag-and-drop any of the displayed objects on his tablet computer 100 that can be opened into the My-Cloud-Savings Bank tool 113$c$1$h'''$ for later review thereof. In one embodiment, the user may formulate automatic saving rules that cause the STAN_3 system to automatically save certain items without manual participation by the user. More specifically, one of the user-formulated (or user-activated among system provided templates) automatic saving rules may read as follows: "IF there are discussions/user contributions in a high ranked TSR of mine with heat values which are more than 20% higher than the normal ones AND I am not detected as paying attention to on-topic invitations or the like for the same (e.g., because I am away from my desk or have something else displayed), THEN automatically record the discussion/user-contribution for me to look at later". In this way, if the user steps away from his data processing device, or turns it off, or is paying attention to something else or not paying attention to anything and a chat or other forum participation session comes up having user contributions that are probably of high-attention receiving value to the user, the STAN_3 system automatically records and saves the session in the user's My-Cloud-Savings Bank with an appropriate marker (e.g., tag, bookmark, etc.) indicating its importance (e.g., its extraordinary heat score and/or identifications of the most worthy of attention user contributions) so that the user can notice it/them later and have it/them presented to him/her at a later time if so desired.

Expansion tool 186$b$+ (e.g., a starburst+) in FIG. 1G allows the user to view the basis of, or re-define the basis by which the #1, #2, etc. rankings are provided in left column 186$b$ of the community board 186. There is however, another tool 186$b$2 (Sorts) which allows the user to keep the ranking number associated with each board item (e.g., 186$c$1) unchanged but to also sort the sequence in which the rows are presented according to one or more sort criteria. For example, if the ranking numbers (e.g., #1, #2, etc.) in column 186$b$ are by popularity and the user wants to retain those rankings numbers, but at the same time the user wants his list re-sorted on a chronological basis (e.g., which postings were commented most recently by way of My-2-cents postings—see column 186$d$) and/or resorted on the basis of which have the greater number of such My-2-cents postings, then the user can employ the sorts-and-searches tool **186*b*3 of board 186 to resort its rows accordingly or to search through its content for identified search terms. Each community board, 186, 187, etc. has its own sorts-and-searches tool 186*b*3**. Sorts may include those that sort by popularity and time, for example, which items are most popular in a first predefined time period versus which items are most popular in a second predefined time period. Alternatively the sorts may show how the popularity of given, high popularity items fluctuate over time (e.g., shifting from the #1 most popular position to #3 and then back to #1 over the period of a week).

It should be recalled that window 185 (e.g., community board for a given topic space subregion (TSR) favored by a given social entity, i.e. SE1) unfurled (where the unfurling was highlighted by translucent unfurling beam **115*a*7) in response to the user picking a 'show community board' option associated with topic invitation(s) item 102*a*2". Although not shown, it is to be understood that the user may close or minimize that window 185 as desired and may pop open an associated other community board of another invitation (e.g., 102*n***').

Additionally, in one embodiment, each displayed set of front and back community boards (e.g., 185) may include a 'You are Here' map **185*b* which indicates where the corresponding community board is rooted in STAN_3 topic space. (More generically, as will be explained below, a community board may be directed to a spatial or hierarchical subregion of any system-maintained Cognitive Attention Receiving Space (CARS) and the 'You are Here' map may show in spatial and/or hierarchical terms where the subregion is relative to surrounding subregions of the same CARS.) Referring briefly to FIG. 4D, every node in the STAN_3 topic space 413' may have its own community board. Only one example is shown in FIG. 4D, namely, the grandfather community board 485 (a.k.a. user contributions percolation board) that is rooted to the grandparent node of topic node 416*c* (and of 416*n*). The one illustrated community board 485 may also be called a grandfather "percolation" board so as to drive home the point that posted items (e.g., representing blog comments, tweets, or other user contributions in chat or other forum participation sessions, etc.) that keep being promoted due to net positive votes in lower levels of the topic space hierarchy so as to eventually percolate up to the community board 485 of a hierarchically higher up topic node (e.g., the grandpa or higher board). Accordingly, if users want to see what the general sentiment is at a more general topic node (one higher up in the hierarchy, or closer to a mainstream core in spatial space—see FIG. 3**R) rather than focusing only on the sentiments expressed in their local community boards (ones further down in the hierarchy) they can switch to looking at the community board of the parent topic node or the grandparent node or higher if they so desire. Conversely, they may also to drill down into lower and thus more tightly focused child nodes of the main topic space hierarchy tree.

It is to be understood that topic space is merely a convenient and perhaps more easily grasped example of the general notion of similarly treated Cognitive Attention Receiving Spaces (CARS's) where each such CARS has respective points, nodes or subregions organized therein according to at least one of a hierarchical and spatial organization and where the respective points, nodes or subregions of that CARS (e.g., keyword space, URL space, social dynamics space and so on) may logically link to chat or other forum participation sessions and where respective users make user contributions in the forms of comments, tweets, emails, zip files and so on, and where user contributions in isolated ones of the sessions may be voted up (promoted, as "best of" examples) into a related community board for the respective node, or parent node, or space subregion so that a larger population of users who are tethered to the local subregion of the Cognitive Attention Receiving Space (CARS) by virtue of participation in an associated chat or other forum participation session or otherwise can see user contributions made in plural such participation sessions if the user contributions are promoted into the local community board or further up into a higher level community board. In other words, a given user of the STAN_3 system may be focusing-upon a clustered set of keywords (spatially clustered in a keywords expressions space) rather than on a specific topic node and there may be other system users also then focusing-upon the same clustered set of keywords or on keywords that are close by in a system-maintained keyword space (KwS—see 370 of FIG. 3E). A community board rooted in keyword space would then show "best of" comments or other user contributions that are made within-the-community where the "best of" items have been voted upon by users other than the contribution-originating users for promotion into that rooted community board of keyword space (e.g., 370). Similar community boards may be implemented in other system-maintained Cognitive Attention Receiving Spaces (CARS's; e.g., URL space, meta-tag space, context space, social dynamics space and so on). Topic space is easier to understand and hence it is used as the exemplary space.

Returning again to FIG. 1G, the illustrated 'You are Here' map **185*b* is one mechanism by which users can see where the current community board is rooted in topic space. The 'You are Here' map 185*b* also allows them to easily switch to seeing the community board of a hierarchically higher up or lower down topic node. (The 'You are Here' map 185*b* also allows them to easily drag-and-drop objects for various purposes as shall be explained in FIG. 1N.) In one embodiment, a single click or tap on the desired topic node within the 'You are Here' map 185*b* switches the view so that the user is now looking at the community board of that other node rather than the originally presented one. In the same embodiment, a double click or double tap or control right click or other such user interface activation instead takes the user to a localized view of the topic space map itself (as portrayed hierarchically or spatially or both—see FIG. 3R for an example of both) rather than showing just the community board of the picked topic node. As in other cases described herein, the heading of the 'You are Here' map 185*b* includes a expansion tool (e.g., 185*b*+) option which enables the user to learn more about what he or she is looking at in the displayed frame (185*b***) and what control options are available (e.g., switch to viewing a different community board, reveal more information about the selected topic node and/or its community board and/or its surrounding subregion in topic space, show a local topic space relief map around the selected topic node, etc.).

Referring to the process flow chart of FIG. 1H, it will now be explained in more detail how comments (or other user contributions) in a local TCONE (e.g., an individual chat room populated by say, only 5 or 6 users) can be automatically promoted to a community board (e.g., 186 of FIG. 1G) that is generally seen by a wider audience.

There are two process initiation threads in FIG. 1H. The one that begins with periodically invoked step 184.0 is directed to people-promoted comments. The one that begins with periodically invoked step 188.0 is directed to initial promotion of comments by computer software alone rather than by people votes. It is of course to be understood that the illustrated process is a real world physical one that has physical consequences including transformation of physical matter and is not an abstract or purely mental process.

Assuming that an instance of step 184.0 has been instantiated by the STAN_3 system 410 when bandwidth so allows, the process-implementing computer will jump to step 184.2 for a sampled TCONE to see if there are any items present there for possible promotion to a next higher level. However, before that happens, participants in the local TCONE (e.g., chat room, micro-blog, etc.) are chatting or otherwise exchanging informational notes with one another (which is why the online activity is referred to as a TCONE, or topic center-owned notes exchange session). One of the participants makes a remark (a comment, a local posting, a tweet, etc.) and/or provides a link (e.g., a URL) to topic relevant other content as that user's contribution to the local exchange. Other members of the same TCONE decide that the locally originated contribution is worthy of praise and promotion. So they give it a thumbs-up or other such positive vote (e.g., "Like", "+1", etc.). The voting may be explicit wherein the other members have to activate an "I Like This" button (not shown) or equivalent. In one embodiment, the voting may be implicit in that the STAN_3 system 410 collects CVi's from the TCONE members as they focus on the one item and the system 410 interprets the same as implicit positive or negative votes about that item (based on user PEEP files). In one embodiment, the implicit or explicit spectrum of voting and/or otherwise applying virtual object activating energies and/or applying attention giving energies includes various ones of combinations of facial contortions involving the tongue, the lips, the eyebrows, the nostrils for example where based on the individual's current PEEP record; pursing one's lips and raising one eyebrow may indicate one thing while doing the same with both eyebrows lifted means another and sticking ones tongue out through pursed lips means yet a different third thing. Making a kissing (puckered) lips contortion may mean the user "likes" something. Other examples of facial body language signals include: smiling, baring teeth, biting lips, puffing up ones cheeks; blushing; covering mouth with hand; and/or other facial body language cues. When votes are collected for evaluating an originator's remark for further promotion (or demotion), the originator's votes are not counted. It has to be the non-originating (non-contributing to that contribution) other members who decide so that there is less gaming of the system. Otherwise, there may be rampant self-promotion. In one embodiment, friends and family members of the contributing user are also blocked from voting. When the non-originating other members vote in step 184.1, their respective votes may be automatically enlarged in terms of score value or diminished based on the voter's reputation, current demeanor, credentials, possible bias (in favor of or against), etc. Different kinds of collective reactions to the originator's remark may be automatically generated, for example one representing just a raw popularity vote, one representing a credentials or reputations weighted vote, one representing just emotional 'heat' cast on the remark even if it is negative emotion just as long as it is strong emotion, and so on.

Then in step 184.2, the computer (or more specifically, an instantiated data collecting virtual agent) visits the TCONE, collects its more recent votes (older ones are typically decayed or faded with time so they get less weight and then disappear) and automatically evaluates it relative to one or more predetermined threshold crossing algorithms. One threshold crossing algorithm may look only at net, normalized popularity. More specifically, the number of negatively voting members (within a predetermined time window) is subtracted from the number of positively voting members (within same window) and that result is divided by a baseline net positive vote number. If the actual net positive vote exceeds the baseline value by a predetermined percentage, then the computer determines that a first threshold has been crossed. This alone may be sufficient for promotion of the item to a local community board. In one embodiment, other predetermined threshold crossing algorithms are also executed and a combined score is generated. The other threshold crossing algorithms may look at credentials weighted votes versus a normalizing baseline or the count versus time trending waveform of the net positive votes to see if there is an upward trend that indicates this item is becoming 'hot'.

In one embodiment, in addition to user contributions that are submitted within the course of a chat or other forum participation session and are then explicitly or implicitly voted upon by in-session others for possible promotion into a local and/or promotion to a higher level community board, the STAN_3 system provides a tool (not shown, but can be an available expansion tool option wherever a map of a topic space subregion (TSR) is displayed or a map of another Cognitive Attention Receiving Space is displayed), that allows users who are not participants in an ongoing forum session to nonetheless submit a proposed user contribution for posting onto a community board (e.g., one disposed in topic space or one disposed in another space). In one variation, each community board has an associated one or more moderators who are automatically alerted as to the proposed user contribution (e.g., a movie file, a sound file, an associated editorial opinion, etc.) and who then vote explicitly or implicitly on posting it to their moderated community board. After that user contribution is posted onto the corresponding community board, it may be promoted to community boards higher up in the space hierarchy by reviewers of the respective community board. In an alternative or same embodiment, those users who have pre-established credentials, reputations, influence, etc. that exceed pre-specified corresponding thresholds as established for the respective community board can post their user contributions onto the board (e.g., topic board) without requiring approval from the board moderators. In this way, a recognized expert in a given field (e.g., on-topic field) can post a contribution onto the community board without having to engage in a forum session and without having to first get approval from the board moderators.

Still referring to FIG. 1H, assuming that in step 184.2, the computer decides the original remark is worthy of promotion, in next step 184.3, the computer determines if the original remark is too long for being posted as an appropriately short item on the community board. Different community boards may have respectively different local rules (recorded in computer memory, and usually including spam-block rules) as to what is too long or not, what level and/or or quality of vocabulary is acceptable (e.g., high school level, PhD level, other, no profanities, no ad hominem attack words), etc. If the original remark is too long or otherwise not in conformance with the local posting rules of the local community board, the computer automatically tries to make it conform by abbreviating it, abstracting it, picking out only a more likely relevant snippet of it and so on. In one embodiment, system-generated abbreviations are automatically hyperlinked to system-maintained and/or other online dictionaries that define what the abbreviation represents. The hyperlink does not have to be a visible one (e.g., which makes its presence known by specially coloring the entry and/or underlining it) but rather can be one that becomes visible when the user right clicks or otherwise activates over the entry so as to open a popup menu or the like in which one of the options is "Show dictionary definitions of this". Another option in the popped up and context sensitive menu says: "Show unabbreviated full version of this entry". Activating the "Show dictionary definitions of this" option opens up an on screen bubble that shows the material represented by the abbreviation or other pointed to entry. Activating the "Show unabbreviated full version of this entry" option opens up an on screen bubble that shows the complete post. In one embodiment, the context sensitive menu automatically pops up just by hovering over the onscreen entry. Alternatively or additionally it can open in another window in response to a click or a pre-specified hot gesture or pre-specified hot key combination. In one embodiment, after the computer automatically generates the conforming snippet, abbreviated version, etc., the local TCONE members (e.g., other than the originator) are allowed to vote to approve the computer generated revision before that revision is posted to the local community board. In one embodiment, the members may revise the revision and run it past the computer's conformance approving rules, where after the conforming revision (or original remark if it has not been so revised) is posted onto the local community board in step 184.4 and given an initial ranking score (usually a bottom one) that determines its initial placement position on the local community board.

Still referring to step 184.4, sometimes the local TCONE votes that cause a posted item to become promoted to the local community board are cast by highly regarded Tipping Point Persons (e.g., ones having special influencing credentials). In that case, the computer may automatically decide to not only post the comment (e.g., revised snippet, abbreviated version, etc.) on the local community board but to also simultaneously post it or show a link to it on a next higher community board in the topic space hierarchy, the reason being that if such TPP persons voted so positively on the one item, it deserves accelerated (wider) promotion (so that it is thereby presented to a wider audience, e.g., the users associated with a parent or grandparent node, when they visit their local community board).

Several different things can happen once a comment is promoted up to one or more community boards. First, the originator of the promoted remark (or other user contribution) may optionally want to be automatically notified of the promotion (or demotion in the case where the latter happens). This is managed in step 189.5. The originator may have certain threshold crossing rules for determining when he or she will be so notified for example by email, sms, chat notify, tweet, or other such signaling techniques.

Second, the local TCONE members who voted the item up for posting on the local and/or other community board may optionally be automatically notified of the posting.

Third, there may be STAN users who have subscribed to an automated alert system of the community board that received the newly promoted item. Notification to such users is managed in step 189.4. The respective subscribers may have corresponding threshold crossing rules for determining if and when (or even where) they will be so notified. The corresponding alerts are sent out in step 189.3 based on the then active alerting rules. An example of such an alerting rules can be: "IF two or more of my influential followed others voted positively on the community board item THEN send me a notification alert pinpointing its place of posting and identifying the followed influencers who voted for promoting it ELSE IF four or more members of my custom-created Group5 social entity voted positively on the community board item THEN send me a notification alert pinpointing its time and place of posting and identifying the Group5 members who voted positively for promoting it as well as nay Group5 members who voted against the promotion /END IFs".

Once a comment item (e.g., **186*c*1 of FIG. 1G) or other such itemized user contribution is posted onto a local or higher level community board (e.g., 186**), many different kinds of people can begin to interact with the posted on-board item and with each other. First, the originator of the comment (or other user contribution) may be proud of the promotion and may alert his friends, family and familiars via email, tweeting, etc., as to the posting. Some of those social entities may then want to take a look at it, vote on it, or comment further on it (via my 2 cents). In one embodiment, the originator gives the STAN_3 system permission and appropriate passwords if needed to automatically post news about the promotion to the originator's other accounts, for example to the originator's FaceBook™ wall and the STAN_3 system then automatically does so. The permission to post may include custom-tailored rules about if, when and where to post the news. For example: "IF two or more of my influential followed others voted positively on the community board item THEN post the news to all my external platform accounts ELSE IF four or more members of my custom-created Group5 social entity voted positively on the community board item THEN post the news 1 hour later only to my primary FaceBook™ wall /END IFs".

Second, the local TCONE members who voted the item up for posting on the local community board may continue to think highly of that promoted comment (e.g., **186*c*1**) and they too may alert their friends, family and familiars via email, tweeting, etc., as to the posting. Additionally, they may record their own custom tailored posting rules for if, when and where to post the news.

Third, now that the posting is on a community board shared by all TCONE's of the corresponding topic node (topic center), members in the various TCONE's besides the one where the comment originated may choose to look at the posting, vote on it (positively or negatively), or comment further on it (via My 2 Cents). The new round of voting is depicted as taking place in step 184.5. The members of the other TCONE's may not like it as much or may like the posting more and thus it can move up or down in ranking depending on the collective votes of all the voters who are allowed to vote on it. For some topic nodes, only admitted participants in the TCONE's of that topic center are allowed to vote on items (e.g., **186*c*1**) posted on their local community board. Thus evaluation of the items is not contaminated by interloping outsiders (e.g., those who are not trusted, pre-qualified, etc., to cast such votes). For other topic nodes, the governing members of such nodes may have voted to open up voting to outsiders as well as topic node members (those who are members of TCONE's that are primarily "owned" by the topic center).

In step 184.6, the computer may detect that the on-board posting (e.g., **186*c*1) has been voted into a higher ranking or lower ranking within the local community board or promoted (or demoted) to the community board of a next higher or lower topic node in the topic space hierarchy. At this point, step 184.6 substantially melds with step 188.6. For both of steps 184.6 and 188.6, if a posted item is persistently voted down or ignored over a predetermined length of time, a garbage collector virtual agent 184.7** comes around to remove the no-longer relevant comment from the bottommost rankings of the board.

Referring briefly again to the topic space mapping mechanism 413' in FIG. 4D, it is to be appreciated that the topic space (413') is a living, breathing and evolving kind of data space that has cognitive "plasticity" because the user populations engaged in the various chat or other forum participation sessions tethered to respective points, nodes or subregions of that Cognitive Attention Receiving Space (topic space in this case) are often changing and, with such user population shifts, the implicit or explicit voting as to what is most popular can change and/or the implicit or explicit voting as to what points, nodes or subregions in that Cognitive Attention Receiving Space (topic space in this case) should cross-associate with what others and how and/or to what degree of cross-linking can also change. Most of the topic nodes in the STAN_3 system are movable/variable topic nodes in that the governing users (and/or participants of attached forums) can vote to move the corresponding topic node (and its tethered thereto TCONE's) to a different position hierarchically and/or spatially within topic space. The qualified voters may vote for example to cleave the one topic node into two spaced apart topic nodes that place differently either hierarchically or spatially within topic space (see briefly FIG. 3R for an example of a combined spatial and hierarchical data-objects organizing space). The qualified voters may vote to merge the one topic node they have governing powers over with another topic node and, if the governors of the other node agree, the STAN_3 system thus forms an enlarged one topic node with an enlarged user base where before there had been two separate ones with smaller, isolated user bases. For each topic node, the memberships of the tethered thereto TCONE's may also vote within their respective TCONE's to drift their TCONE away from a corresponding topic center and to attach more strongly instead to a different topic center; to bifurcate their TCONE into two separate Notes Exchange sessions, to merge with other TCONE's, and so on. All these robust and constant changes to the living, breathing and constantly evolving, adapting topic space mean that original community boards of merging topic nodes become similarly merged and their respective on-board items re-ranked; that original community boards of cleaving topic nodes become cleaved and their respective on-board items split apart and thereafter re-ranked; and when new, substantially empty topic nodes are born as a result of a rebellious one or more TCONE's leaving their original topic node, a new and substantially empty community board is born for each newly born topic node. In one embodiment, when a topic node drifts away from its previous location in topic space, or merges into another topic node or is swept away by a garbage collector due to prolonged lack of interest in that node, the system automatically adds its identity and version date to a linked list of "we were here" entries, where the linked list is bidirectionally linked to the parent of the drifted off topic node. In this way even though the original topic node is no longer where it used to be and/or is no longer what it used to be, a trace of its former self is left behind in the parent node's memory. (This will be explained again in conjunction with FIGS. 3Ta and 3Tb.) Similarly, when chat rooms/other forums that previously were steady customers of a given topic node (e.g., they were strongly tethered to that node for a long time) drift away, their identities and version dates are automatically added to a linked list of "we were here" entries, where the linked list of "we were here" forums is bidirectionally linked to the topic node at which they resided for a prolonged period. In this way, if researchers want to trace back through the history of a given topic node and/or of the chat or other forum participation sessions that anchored to it, they can find traces in the "we were here" linked lists. Short-lived chat rooms that come and fly away fairly quickly from one topic node to a next, are not recorded in the "we were here" linked lists.

In one embodiment, when a given topic node changes location in the hierarchy of topic space or relocates spatially in topic space, or merges with another topic node, or cleaves into plural nodes, the system automatically invites the users of that changed/new topic node to review and vote on cross-associating links between that changed/new topic node and points, nodes or subregions of other Cognitive Attention Receiving Spaces (e.g., keyword space, URL space, meta-tag space and so on). The reason is that with change of positioning in topic space, the node's cross-links to points in other spaces may no longer be optimal or may no longer be valid. More specifically, if a given topic node was originally stored in the system database as: (1) //Root/ . . . /Arts & Crafts/Knitting/Supplies/[knitting needles[18]] and its users voted to move it so it instead becomes: (2) //Root/ . . . /Engineering/plastics/manufacturing/[knitting needles[28]], then some of the keywords, URL's, etc. that related to the arts-and-crafts aspects of that topic node may no longer be valid under the new Engineering/plastics theme of the moved node. Accordingly, the current users of the new, changed or merged topic node may wish to review the sorted lists of most relevant keywords, URL's, etc. that are cross-associated with the changed/moved node and they may wish to vote on editing those lists. The automated invitation to review and modify helps to increase the likelihood that such a process takes place.

Although the above discussion is focused-upon movement and/or deletion of topic nodes in/out of topic space and the consequences that such has on the cross-associating links of the moved, merged or otherwise altered topic node to points, nodes or subregions of other Cognitive Attention Receiving Spaces (e.g., keyword space, URL space, etc.), it is also within the contemplation of the present disclosure to apply the same in a vice versa way. In other words and for example, if a URL(s) representing node moves, merges or is otherwise altered in the system-maintained keywords cross-associating space (see for example 390 of FIG. 3E), then the one or more topic nodes to which that altered URL node links (see for example IntEr-Space link 390.6 of FIG. 3E) may no longer be optimal ones to link to, and the users of the moved, merged or is otherwise altered URL node (e.g., 394.1) may therefore be automatically invited by the STAN_3 system to review and possibly revise the IntEr-Space cross-associating links (e.g., IoS-CAX 390.6) extending from the altered URL node (e.g., 394.1 of FIG. 3E) to points, nodes or subregions in topic space (e.g., 313' of FIG. 3E). A detailed discussion of FIG. 3E will appear further below.

People generally do not want to look at empty community boards because there is nothing there to study, vote on or further comment on (my 2 cents). With that in mind, even if no members of any TCONE's of a newly born topic node vote to promote one of their local comments per process flow 184.0, 184.1, 184.2 of FIG. 1H, etc., the STAN_3 system 410 has a computer-initiated, board populating process flow per steps 188.0, 188.2, 188.3 etc. Step 188.2 is relatively similar to earlier described 184.2 except that here the computer relies on implicit voting (e.g., CFi's and/or CVi's) to automatically determine if an in-TCONE comment (or other user contribution) deserves promotion to a local subsidiary community board (e.g., 187 of FIG. 1G) even though no persons have explicitly voted with regard to that comment/contribution. In step 188.4, just as in step 184.4, the computer moves deserving comments into the local subsidiary community board (e.g., 187 of FIG. 1G) even though no persons have explicitly voted on it. In this way the computer-driven subsidiary community board (e.g., 187) is automatically populated with comments. Once the computer-only-promoted items are posted on-board the local subsidiary community board (187), those items become viewable by a wider audience that has the subsidiary community board (187) automatically presented to them per the screen layout of FIG. 1G. Then step 188.5 can take effect where the system responds to implicit or explicit votes by viewers of the subsidiary community board (187).

Some of the automated notifications that happen with people promoted comments as described above also happen with computer-promoted comments. For example, after step 188.4, the originator of the comment may be optionally and automatically notified in step 189.5 for example if the promotion of his/her user contribution to the subsidiary community board (187) meets custom alert rules recorded by that originator. Then in step 189.6, the originator is given the option to revise the computer generated snippet, abbreviation etc. and then to run the revision past the community board conformance rules. If the revised comment (or other, revised user contribution) passes, then in step 189.7 it is submitted to non-originating others for revote on the revision. In this way, the originator does not get to do his own self promotion (or demotion) and instead needs the sentiment of the crowd to get the comment (or other, revised user contribution) further promoted (or demoted if the others do not like it).

In one embodiment, items posted to a main and/or subsidiary community board are automatically supplemented with a system-generated, descriptive title, a posting time and a permanent hyperlink thereto so that others can conveniently reference the posted community board item (e.g., **186*c*1**). Additionally, the on-board items of a given community board may be hyperlinked to each other and/or to on-board items of other community boards so as to thereby link threads of ideas (or user contributions) that users of the board may wish to step through. Moreover, in an embodiment, associated keywords from the originator's topic node are automatically included to help others better grasp what the on-board contribution item is about. Unlike the individualized keywords that a contribution originator might pick, the top rated keywords of the corresponding topic node are keywords that the collective community of node users picked as being perhaps best descriptive of what the node is about and therefore also descriptive of what a user contribution made through that node is about.

In one embodiment, when a user contribution is promoted into or up along one board or up through a hierarchical chain of such community boards, the originator's credential, reputation and/or such profile attributes are automatically incremented to a degree commensurate with the positive acclaim that his/her contribution receives from those rating that contribution. The degree of positive acclaim may be a function of the number others rating the contribution and/or the credentials and reputations of those rating the contribution. While positively received contributions can result in automatic increase of the originator's credential, reputation and/or such profile attributes (there could be a specific, community board acclaims rating), the converse is not implemented in one embodiment. In other words, if the user's submitted contributions to community boards are often poorly received (not given high acclaim), the originator's credential, reputation and/or such profile attributes are not automatically downgraded for such poor reception on community boards. One reason is that fear of negative consequences may dissuade innovative thinkers from submitting their contributions. Another reason is that poor reception on a given one or more community boards does not necessarily mean the contribution was a bad one. It could be that the originator of the contribution is ahead of his or her times and the other users of the board are not yet ready to receive what, to them, appears to be a radical and ridicule-worthy idea. By way of example, one need not look further than the story of Chester Carlson and his invention of Xerography to realize that good ideas are sometimes met with widespread skepticism.

Referring next to FIG. 1I, shown here is a smartphone and/or tablet computer compatible user interface 100" and its associated method for presenting chat-now and alike, on-topic joinder opportunities to users of the STAN_3 system. Especially in the case of smart cellphones (smartphones), the screen area 111" can be relatively small and thus there is not much room for displaying complex interfacing images. The floor-number-indicating dial (Layer-vator dial) **113*a*" indicates that the user is at an interface layer designed for simplified display of chat or other forum participation opportunities 113*b*". A first and comparatively widest column 113*b*1 is labeled in abbreviated form as "Show Forum Participation Opportunities For:" and then below that active function indicator is a first column heading 113*b*1*h* indicating the leftmost column is for the user's current top 5 liked topics. (A thumbs-down icon (not shown) might indicate the user's current top 5 most despised topic areas as opposed to top 5 most like ones. The illustrated thumbs-up icon may indicate these are liked rather than despised topic areas.) As usual within the GUI examples given herein, a corresponding expansion tool (e.g., 113*b*1*h*+) is provided in conjunction with the first column heading 113*b*1*h* and this gives the user the options of learning more about what the heading means and of changing the heading so as to thereby cause the system to automatically display something else (e.g., My Hottest 3 Topics). Of course, it is within the contemplation of this disclosure to provide an the expansion tool function by alternative or additional means such as having the user right click on a supplemental keypad (e.g., provided on a head-worn or arm-worn utility band and coupled by BlueTooth™ to the mobile device) or by using various hot combinations of hand or facial gestures (e.g., unusual or usual facial contortions such as momentarily tilting one's head to a side and sticking tongue out and/or pursing one's lips and/or raising one or both eyebrows) or shaking the device along a pre-specified heading, etc. In one embodiment, an iconic representation 113*b*1*i* of what the leftmost column 113*b*1 is showing may be displayed. In the illustrated example, one of a pair of hands belonging to iconic representation 113*b*1*i*** shows all 5 fingers to indicate the number 5 while the other hand provides a thumbs-up signal to indicate the 5 are liked ones. A thumbs-down signal might indicate the column features most disliked objects (e.g., Topics of My Three Least Favorite Family Members—where for example the user may want to see this because the user subscribes to the adage of keeping your enemies closer to you than your friends). A hand on the left showing 3 fingers instead of 5 might indicate correspondence to the number, three.

Under the first column heading **113*b*1*h* in FIG. 1I there is displayed a first stack 113*c*1 of functional cards. The topmost stack 113*c*1 may have an associated stack number (e.g., number 1 shown in a left corner oval) and at the top of the stack there will be displayed a topmost functional card with its corresponding name. In the illustrated example, the topmost card of stack 113*c*1 has a heading indicating the stack contains chat room participation opportunities and a common topic shared by the cards in the stack is the topic known as "A1". The offered chat room may be named "A1/5" (for example). As usual within the GUI examples given here, a corresponding expansion tool (e.g., 113*c*1+) is provided in conjunction with the top of the stack 113*c*1** and this gives the user the options of learning more about what the stack holds, what the heading of the topmost card means, and of changing the stack heading and/or card format so as to thereby cause the system to automatically display other information in that area or similar information but in a different format (e.g., a user preferred alternate format).

Additionally, the topmost functional card of highest stack 113c1 (highest in column 113b1) may show one or more pictures (real or iconic) of faces 113c1f of other users who have been invited into, or are already participating in the offered chat or other forum participation opportunity. While the displaying of such pictures 113c1f may not be spelled out in every GUI example given herein, it is to be understood that such representation of each user or group of users may be routinely had by means of adjacent real or iconic pictures, as for example, with each user comment item (e.g., 186c1) shown in FIG. 1G. The displaying of such recognizable user face images (or other user identification glyphs) can be turned on or off depending on preferences of the computer user and/or available screen real estate. Additionally or alternatively, the respective user's online persona name or real life (ReL) name may appear adjacent to the face-representing image.

Additionally, the topmost functional card of highest stack 113c1 includes an instant join tool 113c1g (e.g., "G" for G0 or a circled triangle from VCR days indicating this is the activation means for causing the chat session to "Play"). If and when the user clicks or taps or otherwise activates this instant join tool 113c1g (e.g., by clicking or tapping on the circle enclosed forward play arrow), the screen real estate (111") is substantially taken over by the corresponding chat room interface function (which can vary from chat room to chat room and/or from platform to platform) and the user is joined into the corresponding chat room as either an active member or at least as a lurking observer. A back arrow function tool (not shown) is generally included within the screen real estate (111") for allowing the user to quit the picked chat or other forum participation opportunity and try something else. (In one embodiment, a relatively short time, e.g., less than 30 seconds; between joining and quitting is interpreted by the STAN_3 system 410 as constituting a negative vote (a.k.a. CVi) directed to what is inside the joined and quickly quit forum. In one embodiment, the cloud includes a repeated, client pinging function for automatically determining whether the client machine is still connected to the network or not. If a user disconnects from a chat or other forum participation session at the same time that his client machine disconnects from the network; say due to a communications problem, that disconnects from the chat (or other) is not counted as a negative vote.) Although the description above assumes that the user is seeking one good chat or other forum participation opportunity to join into, it is further within the contemplation of the present disclosure that user can seek participation in multiple chats or other forums of his/her liking all at the same time.

Although the description thus far has been focusing-upon a user casting his/her attention giving energies to points, nodes or subregions of the system-maintained topic space (e.g., My Top 5 Now Topics 113b1h), it is within the contemplation of the present disclosure to alternatively or additionally provide the user with chat or other forum participation opportunities that revolve about points, nodes or subregions of other Cognitive Attention Receiving Spaces that are maintained by the system such as for example the system's keywords cross-associating space, the system's URLs cross-associating space, the meta-tags cross-associating space, a music space, an emotional states space, and so on (this list including social dynamics space where nodes thereof may specify chat co-compatibility types). It is not always true that people have a specific "topic" in mind or are casting their attention giving energies on a specific "topic" or subregion of topic space. They could instead be focusing-upon some shared stream of music or some other form of shareable cognition (e.g., shared experiences including for example reading abstract poetry or looking at an abstract painting (Picasso, Matisse, etc.) and musing about what emotional states the readings/viewings give rise to for them. The STAN_3 system maintains different ones of Cognitive Attention Receiving Spaces and allows isolated users to gather around, relevant-to-them points, nodes or subregions of such spaces and to then join in online or real life meetings based on the online clustering of the users (of their attention giving energies) about the respective points, nodes or subregions of the system-maintained Cognitive Attention Receiving Spaces. Accordingly, heading 113b1h could have alternatively read as "My Top 5 Now Movies" or " . . . 5 Books" or " . . . 3 Musical Pieces" or " . . . 7 Keywords of the Day" or " . . . 8 URLs of the Week" and so on. As is true in many other instance herein, topic space is used as a convenient and perhaps more easily graspable example, but is use does not exclude the same concepts being applicable to the other system-maintained Cognitive Attention Receiving Spaces.

Along the bottom right corner of each card stack there is provided a shuffle-to-back tool (e.g., 113cn). If the user does not like what he sees at the top of the stack (e.g., 113c), he can click or tap or gesture for a scrolling-down into, or otherwise activate the "next" or shuffle-to-back tool 113cn and thus view what next functional card lies underneath in the same deck. (In one embodiment, a relatively short time, e.g., less than 30 seconds; between being originally shown the top stack of cards 113c and requesting a shuffle-to-back operation (113cn) is interpreted by the STAN_3 system 410 as constituting a negative vote (a.k.a. CVi) directed to what the system 410 chose to present as the topmost card 113c1. This information is used to retune how the system automatically decides what the user's current context and/or mood is, what his intended top 5 topics are and what his chat room preferences are under current surrounding conditions. Of course this is not necessarily accomplished by recording a single negative CVi and more often it is a long sequence of positive and negative CVi's that are used to train the system 410 into better predicting what the given user would like to see as the number one choice (first shown top card 113c1) on the highest shown stack 113c of the primary column 113b1.)

More succinctly, if the system 410 is well tuned to the user's current mood, etc. (because the system has access to the user's recent activities history, the user's calendaring tools, the user's PHAFUEL records (habits and routines) and the user's PEEP profiles), the user is often automatically taken by Layer-vator 113" to the correct floor 113b" merely by popping open his clam shell style smart phone (—as an example—or more generally by clicking or tapping or otherwise activating an awaken option button, not shown, of his mobile device 100") and at that metaphorical building floor, the user sees a set of options such as shown in FIG. 1I. User context and mood can often be inferred even if the mobile device 100" is just awakening from a sleep mode based on current GPS readings, current time of day or day of week/month, detection of current other social entities in attention giving communicative contact with the user and his/her routine moods in view of such circumstances. Moreover, if the system 410 is well tuned to the user's current mood, etc., then the topmost card 113c1 of the first focused-upon stack 113c will show a chat or other forum participation opportunity that almost exactly matches what the user had in mind (consciously or subconsciously). The user then quickly clicks or taps or otherwise activates the play forward tool 113c1g of that top card 113c1 and the user is thereby quickly brought into a just-starting or recently started chat or other forum session that happens to match the topic or topics the user currently has in mind. In one class of embodiments, users are preferentially not joined into chat or other forum sessions that have been ongoing for a long while because it can be problematic for all involved to have a newcomer enter the forum after a long history of user-to-user interactions has developed and new entrant would not likely be able to catch up and participate in a mutually beneficial way. When a new (not yet started) chat opportunity card appears at the top of a stack, the faces shown on that chat opportunity card are not faces of actual people but rather representative of the types of people that have, or shortly will be co-invited into the nascent chats (see briefly the chat mix recipes **555*i*4 of FIG. 5**C). In one embodiment, if one or more other users have already accepted their invitations to the not-yet-closed out chat room opportunity, facial representations closer to theirs or their actual faces may appear on chat opportunity card. But if the user waits too long, and the entry window into the chat closes, the card slides away (e.g., off to the side) and a new chat opportunity card with generic faces on it appears. Because real time exchange forums like chat rooms do not function well if there are too many people all trying to speak (electronically communicate) at once, chat room populations are generally limited to only a handful of social entities per room where the accepted members are typically co-compatible with one another on a personality or other basis. Thus if others accept the same invitation while the first user hesitates, he may get locked out of that chat. However, with regard to popular topics, and as is true for municipal buses, another one comes along every 5 minutes. Of course, with regard to the chat room close-out rules there can be exceptions to the rule. For example, if a well regarded expert on a given topic (whose reputation is recorded in a system reputation/credentials file) wants to enter an old and ongoing room and the preferences of the other members indicate that they would gladly welcome such an intrusion, then the general rule is automatically overridden.

The next lower functional card stack **113*d* in FIG. 1**I is a blogs stack. Here the entry rules for fast real time forums like chat rooms is automatically overridden by the general system rules for blogs. More specifically, when blogs are involved, new users generally can enter mid-thread because the rate of exchanges is substantially slower and the tolerance for newcomers is typically more relaxed.

The next lower block **113*e* provides the user with further options "(more . . . )" in case the user wants to engage in different other forum types (e.g., tweet streams, email exchanges (i.e. list serves) or other) as suites his mood and within the column heading domain, namely, Show chat or other forum participation opportunities for: My now top 5 topics (113*b*1*h*). In one embodiment, the different other forum types (More . . . 113*e*) may include voice-only exchanges for a case where the user is (or soon will be) driving a vehicle and cannot use visual-based forum formats. Other possibilities include, but not limited to, live video conferences, formation of near field telephony or other chat networks with geographically nearby and like-minded other STAN users and so on. (An instant-chat now option will be described below in conjunction with FIG. 1K.) Although not shown throughout, it is to be understood that the various online chats or other online forum participation sessions described herein may be augmented in a variety of ways including, but not limited to machine-implemented processes that: (1) include within the displayed session frame, still or periodically re-rendered pictures of the faces or more of the participants in the online session; (2) include within the displayed session frame, animated avatars representing the participants in the online session and optionally representing their current facial or body gestures and/or representing their current moods and emotions; (3) include within the displayed session frame, emotion-indicating icons such as ones showing how forum subgroups view each other (3a) or view individual participants (3b) and/or showing how individual forum participants want to be viewed (3c) by the rest of the participants (see for example FIG. 1M, part 193.1*a*3); (4) include within the presented session frame, background music and/or background other sounds (e.g., seashore sounds) for signifying moods for one or more of the session itself or of subgroups or of individual forum participants; (5) include within the presented session frame, background imagery (e.g., seashore scenes) for thereby establishing moods for one or more of the session itself or of subgroups or of individual forum participants; (6) include within the presented session frame, other information indicating detected or perceived social dynamic attributes (see FIG. 1**M); (7) include within the presented session frame, other information indicating detected or perceived demographic attributes (e.g., age range of participants; education range of participants; income range; topic expertise range; etc.); and (8) include within the presented session frame, invitations for joining yet other interrelated chat or other forum participation sessions and/or invitations for having one or more promotional offerings presented to the user.

In some cases the user does not intend to chat online or otherwise participate now in the presented opportunities (e.g., those in functional cards stack **113*c* of FIG. 1*i*) but rather merely to flip through the available cards and save links to a choice few of them for joining into them at a later time. In that case the user may take advantage of a send-to-my-other-device/group feature 113*c*1*h* where for example the user drags and drops copies of selected cards into an icon representing his other device (e.g., My Cellphone). A pop-out menu box may be used to change the designation of the destination device (e.g., My Second Cellphone or My Desktop or my Automobile Dashboard, My Cloud Bank rather than My Cellphone). Then, at a slightly later time (say 15 minutes later) when the user has his alternate device (e.g., My Second Cellphone) in hand, he can re-open the same or a similar chat-now interface (similar to FIG. 1I but tailored to the available screen capabilities of his alternate device) and activate one or more of the chat or other forum participation opportunities that he had hand selected using his first device (e.g., tablet computer 100") and sent to his more mobile second device (e.g., My Second Cellphone). The then presented, opportunity cards (e.g., 113*c*1) may be different because time has passed and the window of opportunity for entering the one earlier chat room has passed. However, a similar and later starting-up chat room (or other kind of forum session) will often be available, particularly if the user is focusing-upon a relatively popular topic. The system 410** will therefore automatically present the similar and later starting up chat room (or other forum session) so that the user does not enter as a late corner to an already ongoing chat session. The Copy-Opp-to-My CloudBank option is a general-purpose savings action area of the user's where the saved target is kept in the computing cloud and may be accessed via any of the user's devices at a later time. As mentioned above, the rules for blogs and other such forums may be different from those of real time chat rooms and video web conferences.

In addition to, or as an alternative to the tool **113*c*1*h* option that provides the Copy-Opp-to-(fill in this with menu chosen option) function, other option may be provided for allowing that user to pick as the send-copy-to target(s), one or more other STAN users or on-topic groups (e.g., My A1 Topic Group, shown as a dashed other option). In this way, a first user who spots interesting chat or other forum participation opportunities (e.g., in his stack 113*c*) that are now of particular interest to him can share the same as a user-initiated invitation (see 102***j* (consolidated invites) in FIG. 1A, 1N) sent to a second or more other users of the STAN_3 system 410. In one embodiment, user-initiated invitations sent from a first STAN user to a specified group of other users (or to individual other users) is seen on the GUI of the receiving other users as a high temperature (hot!) invite if the sender (first user) is considered by them as an influential social entity (e.g., Tipping Point Person). Thus, as soon as an influencer spots a chat or other forum participation opportunity that is regarded by him as being likely to be an opportunity of current significance, he can use tool 113*c*1*h* to rapidly share his newest find (or finds) with his friends, followers, or other significant others.

If the user does not want to now focus-upon his usual top 5 topics (column 113*b*1), he may instead click or tap or gesture for a scroll-in of, or otherwise activate an adjacent next column of options such as 2 (My Next top 5 topics) or 113*b*3 (Charlie's top 5 topics) or 113*b*4 (The top 5 topics of a group that I or the system defined and named as social entities group number B4) and so on (the more. option 113*b*5). Of importance, in one embodiment, the user is not limited to automatically filled (automatically updated and automatically served up) dishes like My Current Top 5 Topics or Charlie's Current Top 5 Topics. These are automated conveniences for filling up the user's slide-out tray 102 with automatically updated plates or dishes (see again the automatically served-up plate stacks 102*a*Now, 102*b*, 102*c* of FIG. 1A). However, the user can alternatively or additionally create his own, not-automatically-updated, plates for example by dragging-and-dropping any appropriate topic or invitation object onto a plate of his choice. This aspect will be more fully explored in conjunction with FIG. 1N. Advance and/or upgraded subscription users may also create their own, script-based automated tools for automatically filling user-specific plates, automatically updating the invitations provided thereon and/or automatically serving up those plates on tray 102.

In shuffling through the various stacks of functional cards 113*c*, 113*d*, etc. in FIG. 1I, the user may come across corresponding chat or other forum participation situations in which the forum is: (1) a manually moderated one, (2) an automatically moderated one, (3) a hybrid moderated one which partly moderated by one or more forum (e.g., chat room) governing persons and partly moderated by automated moderation tools provided by the STAN_3 system 410 and/or by other providers or (4) an unmoderated free-for-all forum. In accordance with one embodiment, the user has an activateable option for causing automated display of the forum governance type. This option is indicated in dashed display option box 113*ds* with the corresponding governance style being indicated by a checked radio button. If the show governance type option is active, then as the user flips through the cards of a corresponding stack (e.g., 113*d*), a forum governance side bar (of form similar to 113*ds*) pops open for, and in indicated association with the top card where the forum governance side bar indicates via the checked radio button, the type of governance used within the forum (e.g., the blog or chat room) and optionally provides one or more metrics regarding governance attributes of that forum. In one embodiment, the slid-out governance side bar 113*ds* shows not only the type of governance used within the forum of the top card but also automatically indicates that there are similar other chat or other forum participation opportunities but with different governance styles. The one that is shown first and on top is one that the STAN_3 system 410 automatically determined to be one most likely to be welcomed by the user. However, if the user is in the mood for a different governance style, say free-for-all instead of the checked, auto-moderated middle one, the user can click or tap or otherwise activate the radio button of one of the other and differently governed forums and in response thereto, the system will automatically serve up a card on top of the stack for that other chat or other forum participation opportunity having the alternate governance style. Once the user sees it, he can nonetheless shuffle it to the bottom of the stack (e.g., 113*d*) if he doesn't like other attributes of the newly shown opportunity.

In terms of more specifics, in the illustrated example of FIG. 1I, the forum governance style may be displayed as being at least one of a free-for-all style (top row of dashed box side bar 113*ds*) where there is no moderation, a single leader moderated one (bottom row of 113*ds*) wherein the moderating leader basically has dictatorial powers over what happens inside the chat room or other forum, a more democratically moderated one (not shown in box 113*ds*) where a voting and optionally rotated group of users function as the governing body and/or one where all users have voting voice in moderating the forum, and a fully automatically moderated one or a hybrid moderated one (middle row of 113*ds*).

Where such a forum governance side bar 113*ds* option is provided, the forum governance side bar may include one or more automatically computed and displayed metrics regarding governance attributes of that forum as already mentioned. As with other graphical user interfaces described herein, corresponding expansion tools (e.g., starburst with a plus symbol (+) inside) may be included for allowing the user to learn more about the feature or access further options for the feature. The expansion tool need not be an always-displayed one, but rather can be one that pops up when the user clicks or taps or otherwise activates a hot key combination (e.g., control-right mouse type button, or hot keyed tilted facial expressions—i.e. where user tilts the tablet rather than his head while making a pre-specified facial expression such as tongue out to the left and tablet camera facing the user captures that so-hot-keyed user input, or hand gestures such as those involving tilting tablet to the left or right).

Yet more specifically, if the radio-button identified governance style for the card-represented forum is a free-for-all type, one of the displayed metrics may indicate a current flame score and another may indicate a flame scores range and an average flame score for the day or for another unit of time. As those skilled in the art of social media may appreciate, a group of people within an unmoderated forum may sometimes fall into a mudslinging frenzy where they just throw verbally abusive insults at each other. This often is referred to as flaming. Some users of the STAN system may not wish to enter into a forum (e.g., chat room or blog thread) that is currently experiencing a high level of flaming or that on average or for the current day has been experiencing a high level of flaming. The displayed flame score (e.g., on a scale of 0 to 10) quickly gives the user a feel for how much flaming may be occurring within a prospective forum before the user even presses or taps the Click To Chat Now or other such entry button, and if the user does not like the indicated flame score, the user may elect to click or tap or otherwise activate the shuffle down option on the stack and thus move to a next available card or perhaps to copy it to his cellphone (tool 113*c*1*h*) for later review.

In similar vein, if the room or other forum is indicated by the checked radio button to be a dictatorially moderated one, one of the displayed metrics may indicate a current overbearance score and another may indicate an overbearance scores range and the average overbearance score for the day or for another unit of time. As those skilled in the art of social media may appreciate, solo leaders of dictatorially moderated forums may sometimes let their power get to their heads and they become overly dictatorial, perhaps just for the hour or the day as opposed to normally. Other participants in the dictatorially moderated room may cast anonymous polling responses that indicate how overbearing or not the leader is for the day hour, day, etc. The displayed overbearance score (e.g., on a scale of 0 to 10) quickly gives the shuffling-through card user a feel for how overbearing the one man rule may be considered to be within a prospective forum before the user even presses the Click To Chat Now or other such entry button, and if the user does not like the indicated overbearance score, the user may elect to click or tap or otherwise activate the shuffle down option on the stack and thus move to a next available card. In one embodiment, the dictatorial leader of the corresponding chat or other forum automatically receives reports from the system 410 indicating what overbearance scores he has been receiving and indicating how many potential entrants shuffled down past his room, perhaps because they didn't like the overbearance score.

Sometimes it is not the room leader who is an overbearance problem but rather one of the other forum participants because the latter is behaving too much like a troll or group bully. As those skilled in the art of social media may appreciate, some participants tend to hog the room's discussion (to consume a large portion of its finite exchange bandwidth) where this hogging is above and beyond what is considered polite for social interactions. The tactics used by trolls and/or bullies may vary and may sometimes be referred to as trollish or bullying or other types of similar behavior for example. In accordance with one aspect of the disclosure, other participants within the social forum may cast semi-anonymous votes which, when these scores cross a first threshold, cause an automated warning (113*d*2B, not fully shown) to be privately communicated to the person who is considered by others to be overly trollish or overly bullying or otherwise violating acceptable room etiquette. The warning may appear in a form somewhat similar to the illustrated dashed bubble 113*dw* of FIG. 1I, except that in the illustrated example, bubble 113*dw* is actually being displayed to a STAN user who happens to be shuffling through a stack (e.g., 113*d*) of chat or other forum participation opportunities and the illustrated warning bubble 113*dw* is displayed to him. If the shuffling through user does not like the indicated bully warning (or a metric (not shown) indicating how many bullies and how bullish they are in that forum), the user may elect to click or tap or otherwise activate the shuffle down option on the stack and thus move to a next available card or another stack. In one embodiment, an oversight group that is charged with manually overseeing the room (even if it is an automatically moderated one) automatically receives reports from the system 410 indicating what troll/bully/etc. scores certain above threshold participants are receiving and indicating how many potential entrants shuffled down past this room (or other forum), perhaps because they didn't like the relatively high troll/bully/etc. scores. With regard to the private warning message 113*d*2B, in accordance with one aspect of the present disclosure, if after receiving one or more private warnings the alleged bully/troll/etc. fails to correct his ways, the system 410 automatically kicks him out of the online chat or other forum participation venue and the system 410 automatically discloses to all in the room who voted to boot the offender out and why. The reason for unmasking the complainers when an actual outcasting occurs is so that no forum participants engage in anonymous voting against a person for invalid reasons (e.g., they don't like the outcast's point of view and want him out even though he is not being a troll/etc.). (Another method for alerting participants within a chat or other forum participation session that others are viewing them unfavorably will be described in conjunction with FIG. 1M.)

When it comes to fully or hybrid-wise automatically moderated chat rooms or other so-moderated forum participation sessions, the STAN_3 system 410 provides two unique tools. One is a digressive topics rating and radar mapping tool (e.g., FIG. 1L) showing the digressive topics. The other is a Subtext topics rating and radar mapping tool (e.g., FIG. 1M) showing the Subtext topics.

Referring to FIG. 1L, shown here is an example of what a digressive topics radar mapping tool 113*xt* may look like. The specific appearance and functions of the displayed digressive topics radar mapping tool may be altered by using a Digressions Map Format Picker tool 113*xto*. In the illustrated example, displayed map 113*xt* has a corresponding heading 113*xx* and an associated expansion tool (e.g., starburst+) for providing help plus options. The illustrated map 113*xt* has a respectively selected format tailored for identifying who is the prime (#1) driver behind each attempt at digression to another topic that appears to be away from one or more central topics (113*x*0) of the room. The identified prime driver can be an individual or a group of social entities. In one embodiment, degree of digression is automatically determined based on how far apart hierarchically and/or spatially a new target node is in topic space as compared to the current, primary target node of the currently ongoing chat or other forum participation session. In one variation, special rules of adjustment to the normal rules for determining degree of digression are stored and used for different subregions of topic space; for example to deal with situations that are exceptions to the more general rules for that subregion of topic space.

In one embodiment, the automated method used by the STAN_3 system for determining likelihood of digressive activity by a respective one or more participants of a given chat or other forum participation session is based on the continued monitoring by the STAN_3 system of all the participants (if they have monitoring turned on and enabled for the chat room screen area and/or enable for the corresponding CARS point, node or subregion) and the continued mapping by the STAN_3 system of where in topic space and/or other Cognitive Attention Receiving Spaces, the respective users are casting significant portions of their respective attention giving energies. If a given user starts casting significant attention giving energies to a topic node that is substantially distanced in topic space from the target node of the chat (or other session) then that focus on the substantially distanced away topic node may be deemed as digressive activity. More specifically, and as will be detailed immediately below, if a given user/forum-participant (e.g., "DB") is detected in his individualized capacity as casting attention giving energies at cognition points, nodes or subregions that are substantially spaced apart (hierarchically and/or spatially) from the cognition points, nodes or subregions that the group as a whole is determined by the STAN_3 system (a.k.a. attention modeling system) to be casting their "heats" on (see again FIG. 1F), then the system determines that the singled out individual (e.g., "DB") is likely to be digressing away from the central focus of the rest of the participants.

Yet more specifically for the illustrated example (FIG. 1L), the so-called Digresser B ("DB") is seen as being a social entity who is apparently pushing for talking within an associated transcript frame 193.1*b* about hockey instead of about best beer in town. While the STAN_3 system is monitoring DB in his individualized capacity, the system determines that an above threshold amount of the attention giving energies of this social entity DB are being now cast on cognition points, nodes or subregions (113x5) that are substantially spaced apart (hierarchically and/or spatially) from the cognition points, nodes or subregions (113x0) that the group as a whole is determined by the system to be centering their focus upon. Accordingly, within the correspondingly displayed radar map 113xt, this social entity DB is shown as driving towards a first exit portal 113e1 that optionally may connect to a first side chat room 113r1 associated with an offbeat topic node (113tst5). More will be said on this aspect shortly. First however, a more birds-eye view of FIG. 1L is taken.

Functional card 193.1a is understood to have been clicked or tapped or otherwise activated here by the user of computer 100"". A corresponding chat room transcript was then displayed and periodically updated in a current transcript frame 193.1b. The user, if he chooses, may momentarily or permanently step out of the forum (e.g., the online chat) by clicking or tapping or otherwise activating the Pause button within card 193.1a. Alternatively or additionally, such a momentary or more permanent stepping out action by the user may be determined by detection of the user moving his smartphone/tablet device relatively far away from his normal viewing distance and/or by the local eyeball tracking mechanism(s) sensing that the user's eyes are no longer looking at what used to be the active screen. When stepping away, the user may employ the Copy-Opp-to-(fill in with menu chosen option) tool 113c1h' to save the link to the paused or stepped-away from functional card 193.1a for future reference. In the illustrated case, the default option allows for a quick drag-and-drop of card 193.1a into the user's Cloud Bank (My Cloud Bank).

Adjacent to the repeatedly updated transcript frame 193.1b is an enlarged and displayed first Digressive Topics Radar Map 113xt which is also automatically repeatedly updated, albeit not necessarily as quickly as is the transcript frame 193.1b. A minimized second such map 114xt is also displayed. It can be enlarged with use of its associated expansion tool (e.g., starburst+) to thereby display its inner contents. The second map 114xt will be explained later below. Referring still to the first map 113xt and its associated chat room 193.1a, it may be seen within the exemplary and corresponding transcript frame 193.1b that a first group of participants have begun a discussion aimed toward a current main or central topic concerning which beer vending establishment is considered the best in their local town. However, a first digresser (DA) is seen to interject what seems to be a somewhat off-topic comment about sushi. A second digresser (DB) interjects what seems to be a somewhat off-topic comment about hockey. And a third digresser (DC) interjects what seems to be a somewhat off-topic comment about local history. Then a room participant named Joe calls them out for apparently trying to take the discussion off-topic and tries to steer the discussion back to the current main or central topic of the room.

At the center area of the correspondingly displayed radar map tool 113xt, there are displayed representations of the node or nodes in STAN_3 topic space corresponding to the central theme(s) of the exemplary chat room (193.1a). In the illustrated example these nodes are shown as being hierarchically interconnected nodes although they do not have to be so displayed. The internal heading of inner circle 113x0 identifies these nodes as the current forefront topic(s). The STAN_3 system can automatically determine that these are the current forefront topic(s) of the group by computing group heat calculations for different candidate nodes using for example an algorithm such as the one depicted in FIG. 1F and then identifying the candidate nodes (or subregions) having the greater heat values. It is to be understood that the FIG. 1F method is not the only method by which the system might determine what are the most likely points, nodes or subregions of a given Cognitive Attention Receiving Space (CARS, e.g., topic space) where the participants of the forum are collectively focusing their attention giving energies. An alternate or supplemental process may include determining the prime focal points of the individual participants (where in one version group leaders and users who make more contributions to the group get more weight than do individuals who are just lurking and watching) and determining a median or average point or area in the corresponding CARS where the collective of participants appear to be aiming their attention giving energies towards.

With the inner or central focus circle 113x0 displayed, a user may click or tap or otherwise activate the displayed nodes (circles on the hierarchical tree) to cause a pop-up window (not shown) to automatically emerge showing more details about that region (TSR) of STAN_3 topic space (or of another CARS if that is instead displayed). As usual with the other GUI examples given herein, a corresponding expansion tool (e.g., starburst+) is provided in conjunction with the map center 113x0 and this gives the user the options of learning more about what the displayed map center 113x0 shows and what further functions the user may deploy in conjunction with the items displayed in the map center 113x0.

Still referring to the exemplary transcript frame 193.1b of FIG. 1L, after the three digressers (DA, DB, DC) contribute their inputs, a further participant named John jumps in behind Joe to indicate that he is forming a social coalition or clique of sorts with Joe and siding in favor of keeping the room topic focused-upon the question of best beer in town. Digresser B (DB) then tries to challenge Joe's leadership. However, a third participant, Bob jumps in to side with Joe and John. The transcript 193.1b may of course continue with many more exchanges that are on-topic or appear to go off-topic or try to aim at controlling the social dynamics of the room. The exemplary interchange in short transcript frame 193.1b is merely provided here as a simple example of what may occur within the socially dynamic environment of a real time chat room. Similar social dynamics may apply to other kinds of on-topic forums (e.g., blogs, tweet streams, live video web conferences etc.).

In correspondence with the dialogs taking place in frame 193.1b, the first Digressive Topics Radar Map 113xt is repeatedly updated to display prime driver icons driving towards the center or towards peripheral side topics. More specifically, a first driver(s) icon 113d0 is displayed showing a central group or clique of participants (Joe, John and Bob) metaphorically driving the discussion towards the central area 113x0. Clicking or tapping or otherwise activating the associated expansion tool (e.g., starburst+) of driver(s) icon 113d0 provides the user with more detailed information (not shown) about the identifications of the inwardly driving participants, what their full persona names are, what "heats" they are each applying towards keeping the discussion focused on the central topic space region (indicated within map center area 113x0) and so on. (With regard to determining which participants are directing their attention giving energies to the central themes of the forum and which are focusing-upon digressive nodes or subregions, once the central focal point of the forum is determined by the STAN_3 system, the system automatically and repeatedly computes the deviance between that group focal point and the individualized focal points that it is also repeatedly determines in the background. Deviance may be quantified as number of hierarchical branches separating two nodes taken alone or as combined with a spatial distance either uni- or two dimensionally along a spatial plane or multi-dimensionally in a multi-dimensional space of higher order. Those users whose deviance values are smallest are deemed to be the ones applying their attention giving energies towards keeping the discussion focused on the central topic space region.)

Similar to the icon of first digressor 113$d$5, a second displayed driver icon 113$d$1 shows a respective one or more participants (in this case just digressor DB again) driving the discussion towards an offshoot topic, for example "hockey". The associated topic space region (TSR) for this first offshoot topic is displayed in map area 113$x$1. Like the case for the central topic area 113$x$0, the user of the data processing device 100"" can click, tap, or otherwise activate the nodes displayed within secondary map area 113$x$1 to explore more details about it (about the apparently digressive topic of "Hockey"). The user can utilize an associated expansion tool (e.g., starburst+) for help and more options. The user can click or otherwise activate an adjacent first exit door 113$e$1 (if it is being displayed, where such displaying does not always happen). Activating the first exit door 113$e$1 will take the user virtually into a first sidebar chat room 113$r$1. In such a case, another transcript like 193.1$b$ automatically pops up and displays a current transcript of discussions ongoing in the first side room 113$r$1. In one embodiment, the first transcript 193.1$b$ remains simultaneously displayed and repeatedly updated whenever new contributions are provided in the first chat room 193.1$a$. At the same time a repeatedly updated transcript (not shown) for the first side room 113$r$1 also appears. The user therefore feels as if he is in both rooms at the same time. He can use his mouse (and/or other user information input means, e.g., tapping/swiping on the touch sensitive screen, etc. to open a contribution submitting tool for entering text and/or other material for insertion as a contribution into either room. Accordingly, the first transcript 193.1$b$ will not indicate that the user of data processing device 100"" has left that room. In an alternate embodiment, when the user takes the side exit door 113$e$1, he is deemed to have left the first chat room (193.1$a$) and to have focused his attentions exclusively upon the Notes Exchange session within the side room 113$r$1. It should go without saying at this point that it is within the contemplation of the present disclosure to similarly apply this form of digressive topics mapping to live web conferences and other forum types (e.g., blogs, tweet stream, etc.). In the case of live web conferencing (be it combined video and audio or audio alone), an automated closed-captions feature (the uses speech to text conversion software) is employed so that vocal contributions of participants are automatically converted into a near real time wise, repeatedly and automatically updated transcript inserts generated by a closed-captions supporting module. Participants may edit the output of the closed-captions supporting module if they find it has made a mistake. In one embodiment, it takes approval by a predetermined plurality (e.g., two or more) of the conference participants before a proposed edit to the output of the closed-captions supporting module takes place and optionally, the original is also shown.

Similar to the way that the apparently digressive actions of the so-called, second digresser DB are displayed in the enlarged mapping circle 113$xt$ as showing him driving (icon 113$d$1) towards a first set of off-topic nodes 113$x$1 and optionally towards an optionally displayed, exit door 113$e$1 (which optionally connects to optional side chat room 113$r$1), another driver(s) identifying icon 113$d$2 shows the first digresser DA driving towards off-topic nodes 113$x$2 (Sushi) and optionally towards an optionally displayed, other exit door 113$e$2 (which optionally connects to an optional and respective side chat room—not referenced). Yet a further driver(s) identifying icon 113$d$3 shows the third digresser, DC driving towards a corresponding set of off-topic nodes (history nodes—not shown) and optionally towards an optionally displayed, third exit door 113$e$3 (which optionally connects to an optional side chat room—denoted as Beer History) and so on. In one embodiment, the combinations of two or more of the driver(s) identifying icon 113$d$N (N=1, 2, 3, etc. here), the associated off-topic nodes 113$x$N, the associated exit door 113$e$N and the associated side chat room 113$r$N are displayed as a consolidated single icon (e.g., a car beginning to drive through partially open exit doors). It is to be understood that the examples given here of metaphorical icons such as room participants riding in a car (e.g., 113$d$0) towards a set of topic nodes (e.g., 113$x$0) and/or towards an exit door (e.g., 113$e$1) and/or a room beyond (e.g., 113$r$1) may be replaced with other suitable representations of the underlying concepts. In one embodiment, the user can employ the format picker tool 113$xto$ to switch to other metaphorical representations more suitable to his or her tastes. The format picker tool 113$xto$ may also provide the user with various options such as: (1) show-or-hide the central and/or peripheral destination topic nodes (e.g., 113$x$1); (2) show-or-hide the central and/or peripheral driver(s) identifying icons (e.g., 113$d$1); (3) show-or-hide the central and/or peripheral exit doors (e.g., 113$e$1); (4) show-or-hide the peripheral side room icons (e.g., 113$r$1); (5) show-or-hide the displaying of yet more peripheral main or side room icons (e.g., 114$xt$, 114$r$2); (6) show-or-hide the displaying of main and digression metric meters such as Heats meter 113H; and so on. The meaning of the yet more peripheral main or side room icons (e.g., 114$xt$, 114$r$2) will be explained shortly.

Referring next to the digression metrics Heats meter 113H of FIG. 1L, the horizontal axis 113$x$H indicates the identity of the respective topic node sets, 113$x$0, 113$x$1, 113$x$2 and so on. It could alternatively represent the drivers except that a same one driver (e.g., DB) could be driving multiple metaphorical cars (113$d$1, 113$d$5) towards different sideline destinations. The bar-graph wise represented digression Heats may denote one or more types of comparative pressures or heats applied towards either remaining centrally focused on the main topic(s) 113$x$0 or on expanding outwardly towards or shifting the room Notes Exchange session towards the peripheral topics 113$x$1, 113$x$2, etc. Such heat metrics may be generated by means of simple counting of how many participants are driving towards each set of topic space regions (TSR's) 113$x$0, 113$x$1, 113$x$2, etc. A more sophisticated heat metric algorithm in accordance with the present disclosure assigns a respective body mass to each participant based on reputation, credentials and/or other such influence shifting attributes. More respected, more established participants are given comparatively greater masses and then the corresponding masses of participants who are driving at respective speeds towards the central versus the peripheral destinations are indicated as momentums or other such metaphorical representations of physics concepts. A yet more sophisticated heat metric algorithm in accordance with the present disclosure factors in the emotional heats cast by the respective participants towards the idea of remaining anchored on the current main topic(s) 113$x$0 as opposed to expanding outwardly towards or shifting (deviating) the room Notes Exchange session towards the peripheral topics 113$x$1, 113$x$2, etc. Such emotional heat factors may be weighted by the influence masses assigned to the respective players. The format picker tool 113$xto$ may be used to select one algorithm or the other as well as to select a desired method for graphically representing the metrics (e.g., bar graph, pie chart, and so on).

Among the digressive topics which can be brought up by various ones of the in-room participants, is a class of topics directed towards how the room is to be governed and/or what social dynamics take place between groups of two or more of the participants. For example, recall that DB challenged Joe's apparent leadership role within transcript 193.1*b*. Also recall that Bob tried to smooth the social friction by using a humbling phraseology: IMHO (which, when looked up in Bob's PEEP file, is found to mean: In My Humble Opinion and is found to be indicative of Bob trying to calm down a possibly contentious social situation). These governance and dynamics types of in-room interactions may fall under a subset of topic nodes 113x5 within STAN_3 topic space that are directed to group dynamics and/or group governance issues. This aspect will be yet further explored in conjunction with FIG. 1M. For now, it is sufficient to note that the enlarged mapping circle 113xt can display one or more participants (e.g., DB in virtual vehicle 113d5) as driving towards a corresponding one or more nodes of the group dynamics and/or group governance topic space regions (TSR's).

Before moving on, the question comes up regarding how the machine system 410 automatically determines who is driving towards what side topics or towards the central set of room topics. In this regard, recall that at least a significant number of the room participants are STAN users. Their CFi's and/or CVi's are being monitored (112"") by the STAN_3 system 410 even while they are participating in the chat room or other forum. These CFi's and/or CVi's are being converted into best guess topic determinations as well as best guess emotional heat determinations and so on. More generally, the STAN_3 system is repeatedly and automatically determining for each respective member of a specified group of members (e.g., the forum participants), which if any of system-maintained points, nodes or subregions of system-maintained Cognitive Attention Receiving Spaces (CARSs) are receiving attention giving energies from the respective member, and if so to what extent (and/or to what comparative extent relative to other cast energies); and the system is using the determination of which points, nodes or subregions are receiving respective and significant individualized attention giving energies to determine which if any of the system-maintained points, nodes or subregions of the same system-maintained Cognitive Attention Receiving Spaces (CARSs) are receiving at least a majority of the group's attention giving energies and if so to what absolute and/or relative extent. The latter can be deemed to be the central area of energetic focus by the group. In one embodiment, those group members who are actively (energetically) typing, copy-and-pasting, or otherwise providing user contributions to the group exchange are weighted as contributing more heat power for defining the group's central points of focus versus users who are just reading for example (just focusing with lesser attention giving energies) on what is going on within the group exchange.

Recall also that the monitored STAN users have respective user profile records stored in the machine system 410 which are indicative of various attributes of the users such as their respective chat co-compatibility preferences, their respective domain and/or topic specific preferences, their respective personal expression propensities, their respective personal habit and routine propensities, and so on (e.g., their mood/context-based CpCCp's, DsCCp's, PEEP's, PHAFUEL's or other such profile records). Participation in a chat room is a form of context in and of itself. There are at least two kinds of participation: active listening or other such attention giving to informational inputs and active speaking or typing or texting or other such attentive informational outputs (user contributions). This aspect will be covered in more detail in conjunction with FIGS. 3A and 3D. At this stage it is enough to understand that the domain-lookup servers (DLUX) of the STAN_3 system 410 are repeatedly outputting in substantially real time, indications of what topic nodes each STAN user appears to be most likely driving towards based on the CFi's and/or CVi's streams of the respective users and/or based on their currently active profiles (CpCCp's, DsCCp's, PEEP's, PHAFUEL's, etc.) and/or based on their currently detected physical surrounds (physical context). So the system 410 that automatically provides the first Digressive Topics Radar Map 113xt (FIG. 1L) is already automatically producing signals representative of what central and/or sideline topics each participant is most likely driving towards. Those signals are then used to generate the graphics for the displayed Radar Map 113xt.

Referring again to the example of second digresser DB and his drive towards the peripheral Hockey exit door 113e1 in FIG. 1L, the first blush understanding by Joe, John and Bob of DB's intentions in transcript 193.1*b* may have been wrong. In one scenario it turns out that DB is very much interested in discussing best beer in town, except that he also is an avid hockey fan. After every game, he likes to go out and have a couple of glasses of good quality beer and discuss the game with like minded people. By interjecting his question, "Did you see the hockey game last night?", DB was making a crude attempt to ferret out like minded beer aficionados who also happen to like hockey, because may be these people would want to join him in real life (ReL) next week after the upcoming game for a couple of glasses of good quality beer. Joe, John and Bob mistook DB's question as being completely off-topic.

Although not shown in the transcript 193.1*b* of FIG. 1L, later on, another room participant may respond to DB's question by answering: "Yes I saw the game. It was great. I like to get together with local beer and hockey connoisseurs after each game to share good beer and good talk. Are you interested?". At this hypothesized point, the system 410 will have automatically identified at least two room participants (DB and Mr. Beer/Hockey connoisseur) who have in common and in their current focus, the combined topics of best beer in town and hockey. In response to this, the system 410 may automatically spawn an empty chat room 113r1 and simultaneously invite the at least two room participants (DB and Mr. Beer/Hockey connoisseur) to enter that room and interact with regards to their currently two top topics: good beer and good hockey. In one embodiment, the automated invitation process includes generating an exit /entry door icon 113e1 at the periphery of displayed circle 113xt, where all participants who have map 113xt enlarged on their screens can see the new exit /entry door icon 113e1 and can explore what lies beyond it if they so choose. It may turn out despite the initial protestations of Joe, John and Bob that 50% of the room participants make a bolt for the new exit door 113e1 because they all happen to be combined fans of good beer and good hockey. Once the bolters convene in new room 113r1, they can determine who their discussion leader will be (perhaps DB) and how the new chat room 113r1 should be governed. Joe, John and Bob may continue with the remaining 50% of the room participants in focusing-upon central themes indicated in central circle 113x0.

At around the same time that DB was gathering together his group of beer and hockey fans, there was another ongoing Instan-Chat™ room (114xt) within the STAN_3 system 410 whose central theme was the local hockey team. However in that second chat room, one or more participants indicated a present desire to talk about not only hockey, but also where is the best tavern to go to in town to a have a good glass of beer after the game. If the digressive topics map 114*xt* of FIG. 1L had been enlarged (as is map 113*xt*) it would have shown a similar picture, except that the central topic (114*x*0, not shown) would have been hockey rather than beer. And that optionally enlarged map 114*xt* would have displayed at a periphery thereof, an exit door 114*e*11 (which is shown in FIG. 1L) connecting to a side discussion room 113*r*1. When participants of the hockey room (114*xt*) enter the beer/hockey side room 113*r*1 by way of door 114*e*1 (or by other ways of responding to received invitations to go there), they may be surprised to meet up with entrants from other chat room 113*xt* who also currently have a same combined focus on the topics of best beer in town and best tavern to get together in after the game. In other words, side chat rooms like 113*r*1 can function as a form of biological connective tissue (connective cells) for creating a network of interrelated chat rooms that are logically linked to one another by way of peripheral exit doors such as 113*e*1 and 114*e*1. Needless to say, the hockey room (which correlates with enlargeable map 114*xt*) can have yet other side chat rooms 114*r*2 and so on.

Moreover, the other illustrated exit doors of the enlarged radar map 113*xt* can lead to yet other combine topic rooms. Digresser DA for example, may be a food guru who likes Japanese foods, including good quality Japanese beers and good quality sushi. When he posed his question in transcript 193.1*b*, he may have been trying to reach out to like minded other participants. If there are such participants, the system 410 can automatically spawn exit door 113*e*2 and its associated side chat room. The third digresser DC may have wanted to explain why a certain tavern near the hockey stadium has the best beer in town because they use casks made of an aged wood that has historical roots to the town. If he gather some adherents to his insights about an old forest near the town and how that interrelates to a given tavern now having the best beer, the system 410 may responsively and automatically spawn exit door 113*e*3 and its associated side chat room for him and his followers. Similarly, yet another automatically spawned exit door 113*e*4 may deal with do-it-yourself (DIY) beer techniques and so on. Spawned exit door 113*e*5 may deal with off topic issues such as how the first room (113*xt*) should be governed and/or how to manage social dynamics within the first room (113*xt*). Participants of the first room (113*xt*) who are interested in those kinds of topics may step out in to side room 113*r*5 to discuss the same there. In one embodiment, the system automatically displays to those users who have shown digressive focus in the direction of a respective side room (e.g., 113*r*5) that someone else has entered that side room or is already in that side room (e.g., 113*r*5). In this way, users who are interested in the digressive topic(s) of the side room can know if the side chat rooms have people in them and thus are worth entering into.

In one embodiment, the mapping system also displays topic space tethering links such as 113*tst*5 which show how each side room tethers as a driftable TCONE to one or more nodes in a corresponding one or more subregions (TSR's) (e.g., 113*x*5) of the system's topic space mechanism (see 413' of FIG. 4D). Users may use those tethers (e.g., 113*tst*5) to navigate to their respective topic nodes and to thereby explore the corresponding topic space regions (TSR's) by for example double clicking, double tapping or otherwise activating on the representations of the tether-connected topic nodes.

Therefore it may be seen, in summing up FIG. 1L that the STAN_3 system 410 can provide powerful tools for allowing chat room participants (or participants of other forums) to connect with one another in real time to discuss multiple topics (e.g., beer and hockey) that currently appear to be the dominant focal points of attention in their minds.

Referring next to FIG. 1M, some participants of chat room 193.1*b*' may be interested in so-called, subtext topics dealing for example with how the room is governed and/or what social dynamics appear to be going on within that room (or other forum participation session). In this regard, the STAN_3 system 410 provides a second automated mapping tool 113Zt that allows such users to keep track of how various players within the room are interrelating to one another based on a selected theory of social dynamics. The Digressive Topics Radar Map 113*xt*' (see FIG. 1L) is displayed as minimized in the screen of FIG. 1M. The user may of course enlarge it to a size similar to that shown in FIG. 1L if desired in order to see what digressive topics the various players in the room (or other forum) appear to be driving towards.

Before explaining mapping tool 113Zt however, a further GUI feature of STAN_3 chat or other forum participation sessions is described for the illustrated screen shot of FIG. 1M. If a chat or other substantially real time forum participation session is ongoing within the user's set of active and currently displayed forums, the user may optionally activate a Show-Faces/Backdrops display module (for example by way of the FORMAT menu in his main, FILE, EDIT, etc. toolbar). This activated module then automatically displays one or more user/group mood/emotion faces and/or face backdrop scenes. For example and as illustrated in FIG. 1M, one selectable sub-panel 193.1*a*' of the Show-Faces/Backdrops option displays to the user of tablet computer 100.M one or both of a set of Happy faces (left side of sub-panel 193.1*a*') with a percentage number (e.g., 75%) below it and a set of Mad/sad face(s) (right side of sub-panel 193.1*a*') with a percentage number (e.g., 10%) below it. This gives the user of tablet computer 100.M a rough sense of how other participants in the chat or other forum participation session (193.1*a*') are voting with regard to him by way of, for example, their STAN detected implicit or explicit votes (e.g., uploaded CVi's). In the illustrated example, 75% of participants are voting to indicate positive attitudes toward the user (of computer 100.M), 10% are voting to indicate negative attitudes, and 15% are either not voting or are not expressing above-threshold positive or negative attitudes about the user (where the threshold is predetermined). Each of the left and right sides of sub-panel 193.1*a*' has an expansion tool (e.g., starburst+) that allows the user of tablet computer 100.M to see more details about the displayed attitude numbers (e.g., 75%/10%), for example, why mode specifically are 10% of the voting participants feeling negatively about the user? Do they think he is acting like a room troll? Do they consider him to be a bully, a topic digresser? Something else?

In one embodiment, clicking or tapping or otherwise activating the expansion tool (e.g., starburst+) of the Mad/sad face(s) (right side of sub-panel 193.1*a*') automatically causes a multi-colored pie chart (like 113PC) to pop open where the displayed pie chart then breaks the 10% value down into more specific subtotals (e.g., 10%=6%+3%+1%). Hovering over each segment of the pie chart (like that at 113PC) causes a corresponding role icon (e.g., 113*z*6=troll, 113*z*2=primary leadership challenger) in below described tool 113Zt to light up. This tells the user more specifically, how other participants are viewing him/her and voting negatively (or positively) because of that view. Due to space constraints in FIG. 1M, the displayed pie chart 113PC is showing a 12% segment of room participants voting in favor of labeling the user of 100.M as the primary leadership challenger. However, in this example, a greater majority has voted to label the user named "DB" as the primary leadership challenger (113*z*2). With regard to how such voting is carried out, it should be recalled that the STAN_3 system 410 is persistently picking up CVi and/or other vote-indicating signals from in-room users who allow themselves to be monitored (where as illustrated, monitor indicator 112"" is "ON" rather than OFF or ASLEEP). Thus the system servers (not shown in FIG. 1M) are automatically and repeatedly decoding and interpreting the CVi and/or other vote-indicating signals to infer how its users are implicitly (or explicitly) voting with regard to different issues, including with regard to other participants within a chat or other forum participation session that the users are now engaged with. More specifically, when a user who is interested in social dynamics issues pops open the social dynamics modeling tool 113Zt, he/she will see how the system is currently categorizing each of the active participants in terms of predefined role versus who is assigned to that role. If the user focuses-upon a given role assignment and smiles or otherwise indicates affirmation, the system may interpret that as a positive implicit vote for that role assignment (this being subject to the user's current PEEP file). On the other hand, if the user focuses-upon a given role assignment and frowns or otherwise indicates displeasure with that role assignment (e.g., by sticking the tongue out and tilting head or otherwise casting a negative vote—this also being subject to the user's current PEEP file), the system may interpret that as a negative implicit or explicit vote for that role assignment. In the case where an above threshold number of forum participants vote negatively, the system automatically finds a sampling who are apparently in idle mode and asks them for an indication of whom they think fits the miscast role. Then after a new person is cast into the miscast role (which new casting is displayed via tool 113Zt), the system tests for implicit affirmations again. Ultimately the group may settle on an agreed-upon role casting for most of the primary role players, although consensus is not necessary and tool 113Zt may continuously flip between showing one user versus another as both contending for a same social dynamics role. In one embodiment, an indication is displayed that the role assignment is a disputed one.

When users who are interested in the social dynamics aspects of the chat or other forum participation session pop open the social dynamics modeling tool 113Zt, they are presented with a current set of archetypes and a respective participant (or group) being cast into each of the archetype roles. They may agree or disagree with the role casting and that could become a sideroom chat of its own for those who are so inclined to discuss that subtext topic. When the social dynamics modeling tool 113Zt is used, then, even before a user (such as that of tablet computer 100.M) receives a warning like the one (113*d*2B) of FIG. 1I regarding perceived anti-harmony (or other) activity, the user can, if he/she activates the Show-Faces/Backdrops option, can get a sense of how others in the chat or other forum participation session are voting with regard to that user (what social dynamics role is that user being cast as).

Additionally or alternatively, the user may elect to activate a Show-My-Face tool 193.1*a*3 (Your Face). A selected picture or icon dragged from a menu of faces can be representative of the user's current mood or emotional state (e.g., happy, sad, mad, etc.). In an embodiment, the STAN_3 system relies on the recently in-loaded CVi's for the given user (e.g., "Me") and automatically makes a My Face choice (193.1*a*3) for the given user (e.g., "Me"). In one embodiment, if the system detects the given user focusing-upon the picked Show-My-Face picture or icon and smiling, the system interprets that facial language as indicating agreement. On the other hand, if the user frowns (and/or sticks tongue out while shaking head to indicate "No"), the system automatically tries a different pick. Interpretation of what mood or emotional state the selected picture or icon represents can be based on the currently active PEEP profile of the user. More specifically, the active PEEP profile (not shown) may include knowledge base rules such as, IF Selected_Face=Happy1 AND Context=At_Home THEN Mood=Calm, Emotion=Content ELSE IF Selected_Face=Happy2 AND Time=Lunch THEN Mood=Glad, Emotion=Happy ELSE . . . . The currently active PEEP profile may interact with others of currently active user profiles (see 301*p* of FIG. 3D) to define logical state values within system memory that are indicative of the user's current mood and/or emotional states as expressed by the user through his selecting of a representative face by means of the Show-My-Face tool 193.1*a*3. The currently picked face may then appear in transcript area 193.1*b*' each time that user contributes to the session transcript. For example, the face picture or icon shown at 193.1*b*3 may be the currently selected of the user named Joe. Similar face pictures or icons may appear inside tool 113Zt (to be described shortly). In addition to foreground faces, users may also select various backdrops (animated or still) for expressing their current moods, emotions or contexts. The selected backdrop appears in the transcript area as a backdrop to the selected face. For example, the backdrop (and/or a foredrop) may show a warm cup of coffee to indicate the user is in a warm, perky mood. Or the backdrop may show a cloud over the user's head to indicate the user is under the weather, etc.

Just as individuals may each select a representative face icon and fore/backdrop for themselves, groups of social entities may vote on how to represent themselves with an iconic group portrait or the like. This may appear on the user's computer 100.M as a Your Group's Face image (not shown) similar to the way the Your Face image 193.1*a*3 is displayed. Additionally, groups may express positive and/or negative votes as against each other. More specifically, if the Your Face image 193.1*a*3 was replaced by a Your Group's Face image (not shown), the positive and/or negative percentages in sub-panel 193.1*a*2 may be directed to the persona of the Your Group's Face rather than to the persona of the Your Face image 193.1*a*3. In one embodiment, the system generates a rotatable 3D amalgamation of all the currently-chosen facial expressions of each of the active persons in the group and this amalgamation is rotated as if it were one head that represents all the more significant emotional states within the group.

Tool 113Zt includes a theory picking sub-tool 113*zto*. In regard to the picked theory, there is no complete consensus as to what theories and types of room governance schemes and/or explanations of social dynamics are best. The illustrated embodiment allows the governing entities of each room to have a voice in choosing a form of governance (e.g., in a spectrum from one man dictatorial control to free-for-all anarchy, with differing degrees of democracy somewhere along that spectrum). In one embodiment, the system topic space mechanism (see 413' of FIG. 4D) provides special topic nodes that link to so-called governance/social dynamics templates for helping to drive tool 113*zto*. These templates may include the illustrated, room-archetypes template. The illustrated room-archetypes template assumes that there certain types of archetypical personas within each room, including, but not limited to, (1) a primary room discussion leader 113*z*1, (2) a primary challenger 113*z*2 to that leader's leadership, (3) a primary room drifter 113*z*3 who is trying to drift the room's discussion to a new topic, (4) a primary room anchor 113*z*4 who is trying to keep the room's discussion from drifting astray of the current central topic(s) (e.g., 113*x*0 of FIG. 1L), (5) one or more cliques or gangs of persons

113z5, (6) one or more primary trolls 113z6 and so on (where dots 113z8 indicate that the list can go on much farther and in one embodiment, the user can rotate through those additional archetypes).

The illustrated second automated mapping tool 113Zt provides an access window 113zTS into a corresponding topic space region (TSR) from where the picked theory and template (e.g., room-archetypes template) was obtained. If the user wishes to do so, the user can double click, double tap, or otherwise activate any one of the displayed topic nodes within access window 113zTS in order to explore that subregion of topic space in greater detail. Also the user can utilize an associated expansion tool (e.g., starburst+) for help and more options. In exploring that portion of the governance/social dynamics area of the system topic space mechanism (see 413' of FIG. 4D), the user may elect to copy therefrom a different social dynamics template and may elect to cause the second automated mapping tool 113Zt to begin using that alternate template and its associated knowledge base rules. Moreover, the user can deploy a drag-and-drop operation 114dnd to drag a copy of the topic-representing circle into a name or unnamed serving plate of tray 102 where the dragged-and-dropped item automatically converts into an invitations generating object that starts compiling for its zone, invitations to on-topic chat or other forum participation opportunities. (This feature will be described in greater detail in conjunction with FIG. 1N.)

When determining who specifically is to be displayed by tool as the current room discussion leader (archetype 113z1), any of a variety of user selectable methods can be used ranging from the user manually identifying each based on his own subjective opinion to having the STAN_3 system 410 provide automated suggestions as to which participant or group of room participants fits into each role and allowing authorized room members to vote implicitly or explicitly on those choices.

The entity holding the room leadership role may be automatically determined by testing the transcript and/or other CFi's collected from potential candidates for traits such as current assertiveness. Each person's assertiveness may be accessed on an automated basis by picking up inferencing clues from their current tone of voice if the forum includes live audio or from the tone of speaking present in their text output, where the person's PEEP file may reveal certain phrases or tonality that indicate an assertive or leadership role being undertaken by the person. A person's current assertiveness attribute may be automatically determined based on any one or more of objectively measured factors including for example: (a) Assertiveness based on total amount of chat text entered by the person, where a comparatively high number indicates a very vocal person; (b) Assertiveness based on total amount of chat text entered compared to the amount of text entered by others in the same chat room, where a comparatively low number may indicate a less vocal person or even one who is merely a lurker/silent watcher in the room; (c) Assertiveness based on total amount of chat text entered compared to the amount of time spent otherwise surfing online, where a comparatively high number (e.g., ratio) may indicate the person talks more than they research while a low number may indicate the person is well informed and accurate when they talk; (d) Assertiveness based on the percentage of all capital letter words used by the person (understood to denote shouting in online text stream) where the counted words should be ones identified in a computer readable dictionary or other lists as being ones not likely to be capitalized acronyms used in specific fields; (e) Assertiveness or leadership role based on the percentage of times that this user (versus a baseline for the group) is the initial one in the chat room or is the first one in the chat room to suggest a topic change which is agreed to with little debate from others (indicating a group recognized leader); (f) Lower assertiveness or sub-leadership role based on the percentage of times this user is the one in the chat room agreeing to and echoing a topic change (a yes-man) after some other user (the prime leader) suggested it; (g) Assertiveness or leadership role based on the percentage of times this user's suggested topic change was followed by a majority of other users in the room; (h) Assertiveness or leadership role based on the percentage of times this user is the one in the chat room first urging against a topic change and the majority group sides with him instead of with the want-to-be room drifter; (i) Assertiveness or leadership role based on the percentage of times this user votes in line with the governing majority on any issue including for example to keep or change a topic or expel another from the room or to chastise a person for being an apparent troll, bully or other despised social archetype (where inline voting may indicate a follower rather than a leader and thus leadership role determination may require more factors than just this one); (j) Assertiveness or leadership role based on automated detection of key words or phrases that, in accordance with the user's PEEP or PHAFUAL profile files indicate social posturing within a group (e.g., phrases such as "please don't interrupt me", "if I may be so bold as to suggest", "no way", "everyone else here sees you are wrong", etc.).

The labels or Archetype Names (113zAN) used for each archetype role may vary depending on the archetype template chosen. Aside from "troll" (113z6) or "bully" (113z7) many other kinds of role definitions may be used such as but not limited to, lurker, choir-member, soft-influencer, strong-influencer, gang or clique leader, gang or clique member, topic drifter, rebel, digresser, head of the loyal opposition, etc. Aside from the exemplary knowledge base rules provided immediately above for automatically determining degree of assertiveness or leadership/followship, many alternate knowledge base rules may be used for automatically determining degree of fit in one type of social dynamics role or another. As already mentioned, it is left up to room members to pick the social dynamics defining templates they believe in and the corresponding knowledge base rules to be used therewith and to directly or indirectly identify both to the social dynamics theory picking tool 113zto, whereafter the social dynamics mapping tool 113Zt generates corresponding graphics for display on the user's screen 111"". The chosen social dynamics defining templates and corresponding knowledge base rules may be obtained from template/rules holding content nodes that link to corresponding topic nodes in the social-dynamics topic space subregions (e.g., You are here 113zTS) maintained by the system topic space mechanism (see 413' of FIG. 4D), or they may be obtained from other system-approved sources (e.g., out-of-STAN other platforms).

The example given in FIG. 1M is just a glimpse of bigger perspective. Social interactions between people and playable-roles assumed by people may be analyzed at any of an almost limitless number of levels. More specifically, one analysis may consider interactions only between isolated pairs of people while another may consider interactions between pairs of pairs and/or within triads of persons or pairs of triads and so on. This is somewhat akin to studying physical matter and focusing the resolution to just simple two-atom compounds or three, four, . . . N-atom compounds or interactions between pairs, triads, etc. of compounds and continuing the scaling from atomic level to micro-structure level (e.g., amorphous versus crystalline structures) and even beyond until one is considering galaxies or even more astronomical entities. In similar fashion, when it comes to interactions between social entities, the granularity of the social dynamics theory and the associated knowledge base rules used therewith can span through the concepts of small-sized private chat rooms (e.g., 2-5 participants) to tribes, cultures, nations, etc. and the various possible interactions between these more-macro-scaled social entities (e.g., tribe to tribe). Large numbers of such social dynamics theories and associated knowledge base rules may be added to and stored in or modified after accumulation within the social-dynamics topic space subregions (e.g., 113zTS) maintained by the system topic space mechanism (see 413' of FIG. 4D) or by other system-approved sources (e.g., out-of-STAN other platforms) and thus an adaptive and robust method for keeping up with the latest theories or developing even newer ones is provided by creating a feedback loop between the STAN_3 topic space and the social dynamics monitoring and controlling tools (e.g., monitored by 113Zt and controlled by who gets warned or kicked out afterwards because tool 113Zt identified them as “troll”, etc.—see 113*d*2B of FIG. 1I).

Still referring to FIG. 1M, at the center of the illustrated subtexts topics mapping tool (e.g., social dynamics mapping tool) 113Zt, a user-rotatable dial or pointer 113*z*00 may be provided for pointing to one or a next of the displayed social dynamics roles (e.g., number one bully 113*z*7) and seeing how one social entity (e.g., Bill) got assigned to that role as opposed to other members of the room. More specifically, it is assumed in the illustrated example that another participant named Brent (see the heats meter 113*z*H) could instead have been identified for that role. However the role-fitting heats meter 113*z*H indicates that Bill has greater heat at the moment for being pigeon-holed into that named role than does Brent. At a later point in time, Brent’s role-matching heat score may rise above that of Bill’s and then in that case, the entity identifying name (113*z*EN) displayed for role 113*z*7 (which role in this example has the role identifying name (Actor Name) 113*z*AN of #1 Bully) would be Brent rather than Bill.

The role-fitting heat score (see meter 113*z*H) given to each room member may be one that is formulated entirely automatically by using knowledge base rules and an automated knowledge base rules, data processing engine or it may be one that is subjectively generated by a room dictator or it may be one that is produced on the basis of automatically generated first scores being refined (slightly modulated) by votes cast implicitly or explicitly by authorized room members. For example, an automated knowledge base rules using, data processing engine (not shown) within system 410 may determine that “Bill” is the number one room bully. However a room oversight committee might downgrade Bill’s bully score by an amount within an allowed and predetermined range and the oversight committee might upgrade Brent’s bully score by an amount so that after the adjustment by the human overseers, Brent rather than Bill is displayed as being the current number one room bully.

Figure 3D:
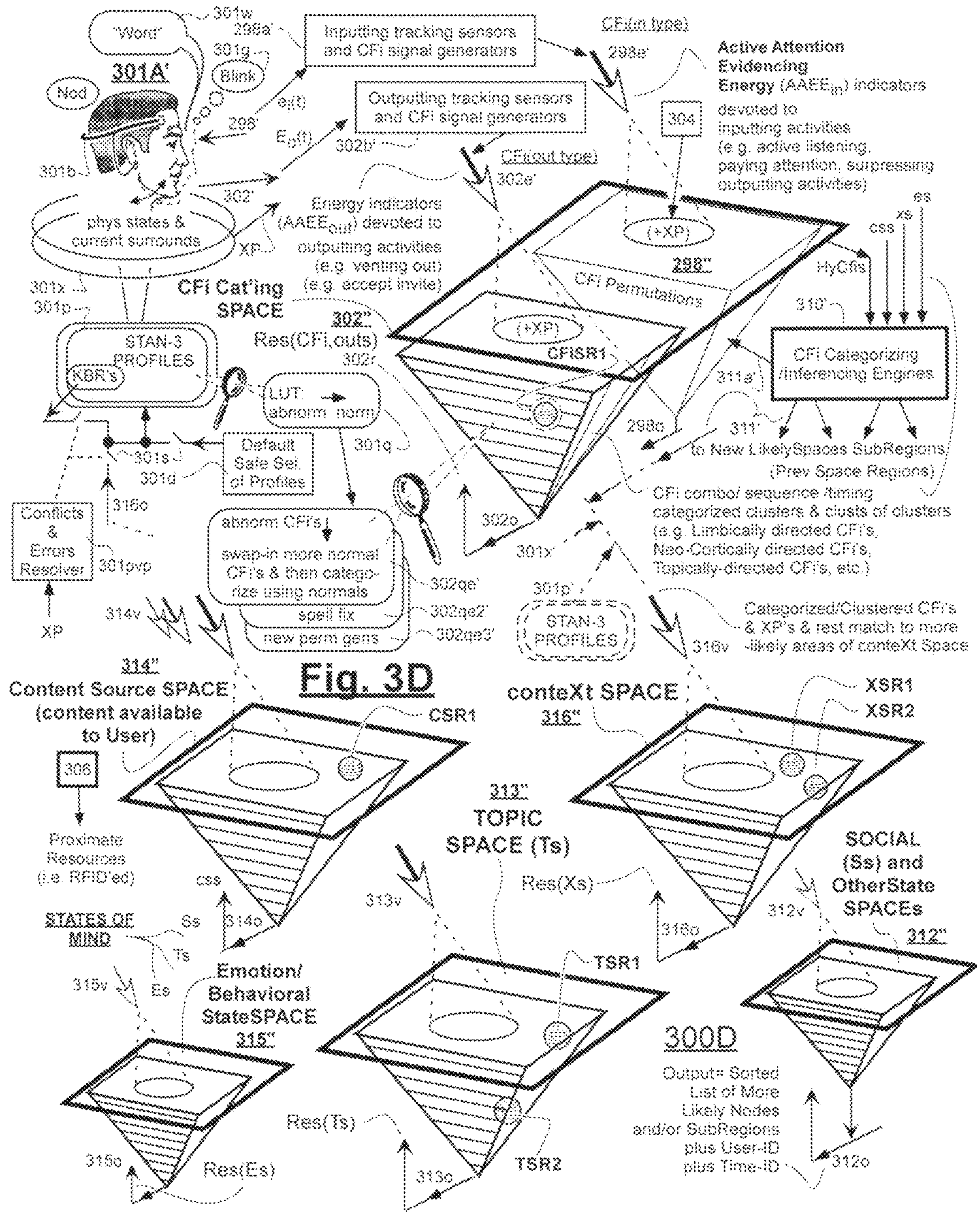
FIG. 3D provides a data flow schematic for explaining how individualized CFi's are automatically converted into normalized and/or categorized CFi's and thereafter mapped by the system to corresponding subregions or nodes within various data-organizing spaces (cognitions coding-for or symbolizing-of spaces) of the system (e.g., topic space, context space, etc.) so that topic-relevant and/or context sensitive results can be produced for or on behalf of a monitored user.
Figure 3E:
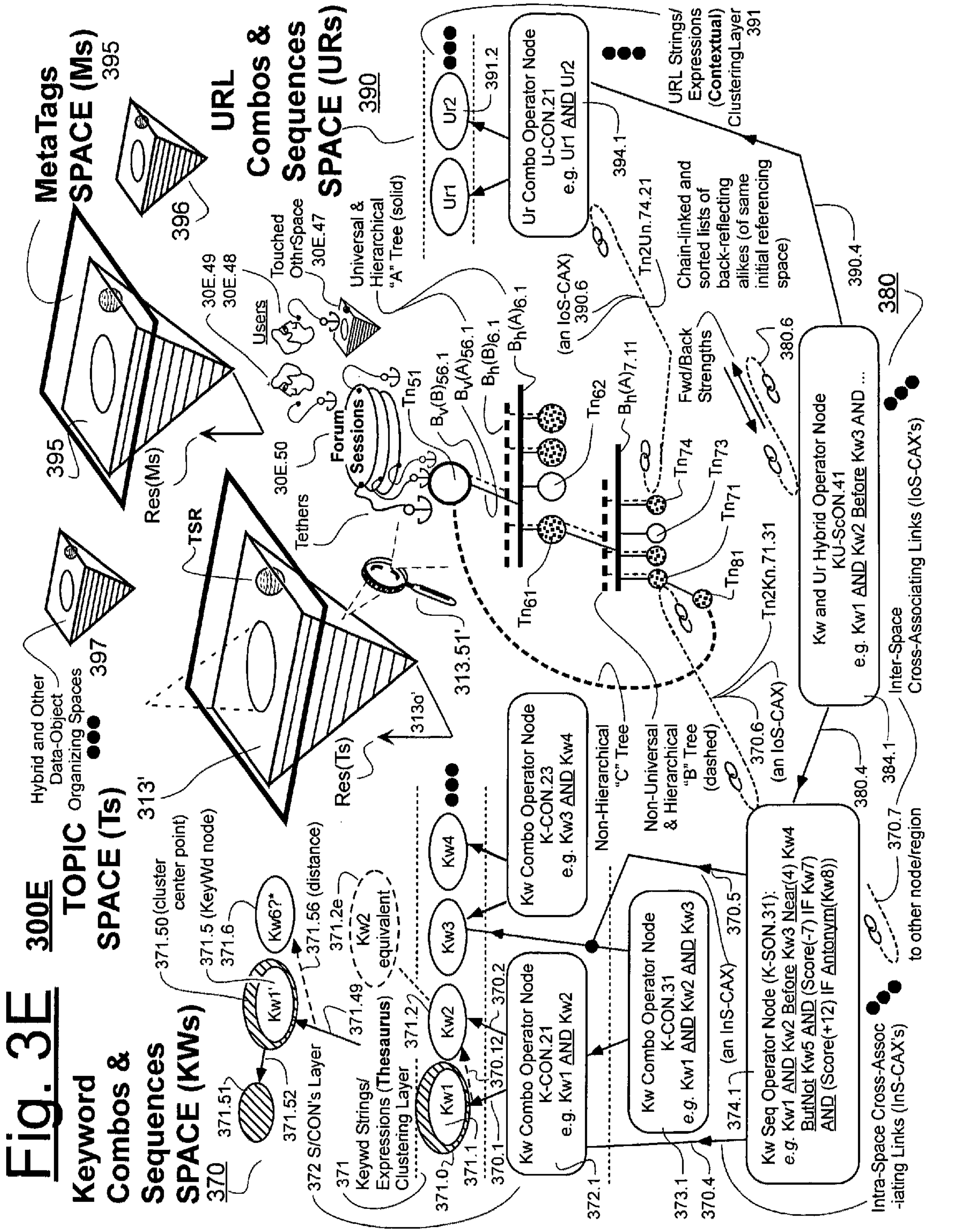
FIG. 3E provides a data structure schematic for explaining how cross links can be provided as between different data organizing spaces of the system, including for example, as between the recorded and adaptively updated topic space (Ts) of the system and a keywords organizing space, a URL's organizing space, a meta-tags organizing space and hybrid organizing spaces which cross organize data objects (e.g., nodes) of two or more different, data organizing spaces and wherein at least one data organizing space has an adaptively updateable, expressions, codings, or other symbols clustering layer.

Referring momentarily to FIG. 3D (it will be revisited later), in the bigger scheme of things, each STAN user (e.g., 301A') is his or her own “context” for the words or phrases (301*w*) that verbally or otherwise emerge from that user. The user’s physical context 301*x* is also part of the context. The user’s identification, history and demographic context is also part of the context. In one embodiment, current status pointers for each user may point to complex combinations (hybrids) of context primitives (see FIGS. 3E-3I, 3M-3O for examples of different kinds of primitives including hybrid ones) in a user’s context space map (see 316" of FIG. 3D as an example of a context mapping mechanism). The user’s PEEP and/or other profiles 301*p* are picked based on the user’s log-in persona and/or based on initial determinations of context (signal 316*o*) and the picked profiles 301*p* add spin to the verbal (or other) output CFi’s 302' subsequently emerging from that user for thereby more clearly resolving what the user’s current context is in context space (316" of FIG. 3D). More specifically and purely as an example, one user may output an idiosyncratic CFi string sequence of the form, “IIRC”. That user’s then-active PEEP profile (301*p*) may indicate that such an acronym string (“IIRC”) is usually intended by that user in the current surrounds and circumstances (301*x* plus 316*o*) to mean, “If I Recall Correctly” (IIRC). On the other hand, for another user and/or her then-active PEEP profile, the same acronym-type character string (“IIRC”) may be indicated as usually being intended by that second user in her current surrounds (301*x*) to mean, International Inventors Rights Center (a hypothetical example). In other words, same words, phrases, character strings, graphic illustrations or other CFi-carried streams (and/or CVi streams) of respective STAN users can indicate different things based on who the person (301A') is, based on what is picked as their currently-active PEEP and/or other profiles (301*p*, i.e. including their currently active PHAFUEL profile), based on their detected current physical surrounds and circumstances 301*x* and so on. So when a given chat room participant outputs a contribution stream such as: “What about X?”, “How about Y?”, “Did you see Z?”, etc. where here the nearby other words/phrases relate to a sub-topic determined by the domain-lookup servers (DLUX) for that user and the user’s currently active profiles indicate that the given user usually employs such phraseology when trying to steer a chat towards the adjacent sub-topic, the system 410 can make an automated determination that the user is trying to steer the current chat towards the sub-topic and therefore that user is in an assumed role of ‘driving’ (using the metaphor of FIG. 1L) or digressing towards that subtopic. In one embodiment, the system 410 includes a computer-readable Thesaurus (not shown) for social dynamics affecting phrases (e.g., “Please let’s stick to the topic”) and substantially equivalent ones of such phrases (in English and/or other languages) where these are automatically converted via a first lookup table (LUT) that logical links with the Thesaurus to corresponding meta-language codes for the equivalent phrases. Then a second lookup table (LUT2, not shown) that receives as an input the user’s current mood, or other states, automatically selects one of the possible meta codes as the most likely meta-coded meaning or intent of the user under the existing circumstances. The third lookup table (LUT3, not shown) that receives the selected meta-coded meaning signal converts the latter into a pointing vector signal 312*v* that can be used to ultimately point to a corresponding one or more nodes in a social dynamics subregion (Ss) of the system topic space mechanism (see 413' of FIG. 4D). However, as mentioned above, it is too soon to explain all this and these aspects will be detailed to a greater extent later below. In one embodiment, the user’s, machine-readable profiles include not only CpCCp’s (Current personhood-based Chat Compatibility Profiles), DsCCp’s (domain specific co-compatibilities), PEEP’s (personal emotion expression profiles), and PHAFUEL’s (personal habits and . . . ), but also personal social dynamics interaction profiles (PSDIP’s) where the latter include lookup tables (LUTs) for converting meta-coded meaning signals into vector signals that ultimately point to most likely nodes in a social dynamics subregion (Ss).

Examples of other words/phrases that may relate to room dynamics may include: “Let’s get back to”, “Let’s stick with”, etc and when these are found by the system 410 to be near words/phrases related to the then primary topic(s) of the room, the system 410 can determine with good likelihood that the corresponding user is acting in the role of a topic anchor who does not want to change the topic. At minimum, it can be one more factor included in knowledge base determination of the heat attributed to that user for the role of room anchor or room leader or otherwise. Words/phrases that relate to room dynamics may be specially clustered in room dynamics sub-regions of a system-maintained, semantic-wise clustering, textual-content organizing space. As will be detailed later below, degree of sameness or similarity as between expressions representing such words/phrases may be determined based on hierarchical and/or spatial distancing within the corresponding content organizing space of the representative expressions and special rules of exception for determining such degrees of sameness or similarity may be stored in the system and used as such.

With regard to room dynamics, other roles that may be of value for determining where the room dynamics are heading (and/or how fast) may include those social entities who are identified as fitting into the role of primary trend setters, where votes by the latter are given greater weight than votes by in-room personas who are not deemed to be as influential in terms of trend setting as are the primary trend setters. In one embodiment, the votes of the primary trend setters are further weighted by their topic-specific credentials and reputations (DsCCp profiles). In one embodiment, if the votes of the primary trend setters do not establish a supermajority (e.g., at least 60% of the weighted vote), the system either automatically bifurcates the room into two or more corresponding rooms each with its own clustered coalition of trend setters or at least it proposes such a split to the in-room participants and then they vote on the automatically provided proposition. In this way the system can keep social harmony within its rooms rather than letting debates over the next direction of the room discussion overtake the primary substantive topic(s) of discussion. In one embodiment, the demographic and other preferences identified in each user's active CpCCp (Current personhood-based Chat Compatibility Profile) are used to determine most likely social dynamics for the room. For example, if the room is mostly populated by Generation X people, then common attributes assigned to such Generation X people may be thrown in as a factor for automatically determining most likely social dynamics of the room. Of course, there can be exceptions; for example if the in-room Generation X people are rebels relative to their own generation, and so on.

One important aspect of trying to maintain social harmony in the STAN-system maintained forums is to try and keep a good balance of active listeners and active talkers. (Room fill recipes will also be discussed in conjunction with FIG. 5C.) This notion of social harmony does not mean that all participants must be agreeing with each other. Rather it means that the persons who are matched up for starting a new room are a substantially balanced group of active listeners and active talkers. Ideally, each person would have a 50%/50% balance as between preferring to be an active talker and being an active listener. But the real world doesn't work out as smoothly as that. Some people are very aggressive or vocal and have tendencies towards say, 90% talker and 10% (or less) active listener. Some people are very reserved and have tendencies towards say, 90% active listener and 10% (or less) active talker. If everyone is for most part a 90% talker and only a 10% listener, the exchanges in the room will likely not result in any advancement of understanding and insight; just a lot of people in a room all basically talking past each other and therefore basically talking only to themselves for the pleasure of hearing their own voices (even if in the form of just text). On the other hand, if everyone in the room is for most part a 90% listener (and not necessarily an "active" listener but rather merely a "lurker") and only a 10% talker, then progress in the room will also not likely move fast or anywhere at all. So the STAN_3 system 410 in one embodiment thereof, includes a listener/talker recipe mixing engine (not shown, see instead 557 of FIG. 5C) that automatically determines from the then-active CpCCp's, DsCCp's, PEEP's, PHAFUEL's (personal habits and routines log), and PSDIP's (Personal Social Dynamics Interaction Profiles) of STAN users who are candidates for being collectively invited into a chat or other forum participation opportunity, which combinations of potential invitees will result in a relatively harmonious mix of active talkers (e.g., texters) and active listeners (e.g., readers). The preceding applies to topics that draw many participants (e.g., hundreds). Of course if the candidate population for peopling a room directed to an esoteric topic is sparse, then a beggars can't be choosers approach is adopted and the invited STAN users for that nascent room will likely be all the potential candidates except that super-trolls (100% ranting talker, 0% listener) may still be automatically excluded from the invitations list. In a more sophisticated invitations mix generating engine, not only are the habitual talker versus active/passive listeners tendencies of candidates considered but also the leader, follower, rebel and other such tendencies are also automatically factored in by the engine. A room that has just one leader and a passive choir being sung to by that one leader can be quite dull. But throw in the "spice" of a rebel or two (e.g., loyal or disloyal opposition) and the flavor of the room dynamics is greatly enhanced. Accordingly, the social mixing engine that automatically composes invitations to would-be-participants of each STAN-spawned room has a set of predetermined social mix recipes it draws from in order to make each party "interesting" but not too interesting (not to the point of fostering social breakdown and complete disharmony). (It is noteworthy to observe that the then-active DsCCp's (Domain specific profiles) of respective users can indicate who is truly an experienced, reputable, certified expert and/or otherwise so-recognized potential contributor to the topic(s) of the forum (if there are one or more specific topics upon which the group is then casting most of its attention giving energies) and who does not have such credentials and therefore may more likely be someone who is a bandwidth consuming over-talker, in which case the noncredentialled over-talkers may be corralled into a room of their own where they can blast each other with their over-developed vocal cords (e.g., virtual ones in the case of texting).)

Figure 5C:
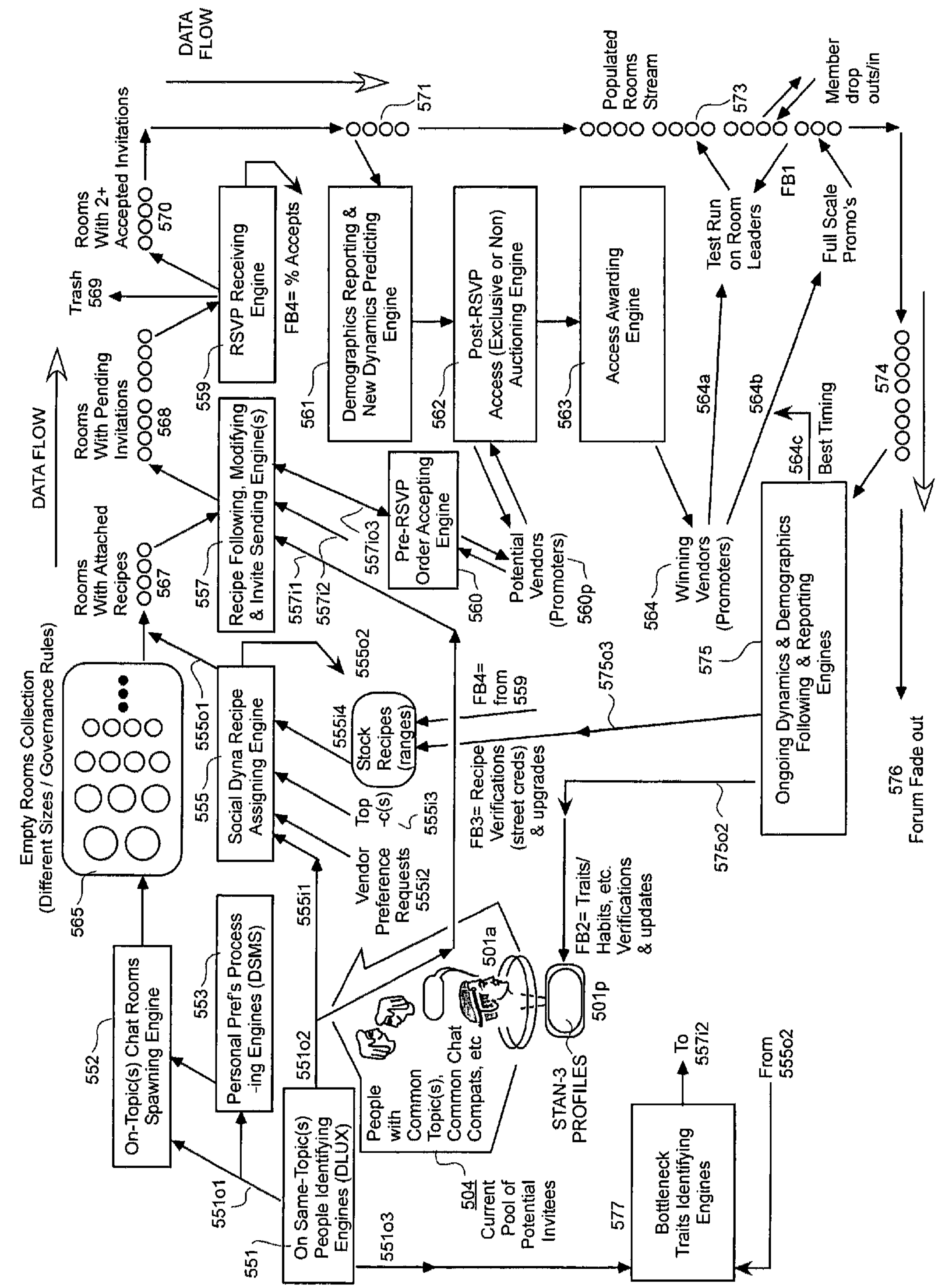
FIG. 5C is a block diagram of a social dynamics aware system that automatically populates chat or other forum participation opportunity spaces in an assembly line fashion with various types of social entities based on predetermined or variably adaptive social dynamic recipes.

Although in one embodiment, the social mixing engine (described elsewhere herein—see 555-557 of FIG. 5C) that automatically composes invitations to would-be-participants is structured to generate mixing recipes that make each in-room party ("party" in a manner of speaking here) more "interesting", it is within the contemplation of the present disclosure that the nascent room mix can be targeted for additional or other purposes, such as to try and generate a room mix that would, as a group, welcome certain targeted promotional offerings (described elsewhere herein—see **555*i*2 of FIG. 5C). More specifically, the active CpCCp's (Current personhood-based Chat Compatibility Profiles) of potential invitees (into a STAN_3 spawned room) may include information about income, spending tendencies and/or other demographic attributes of the various players (assuming the people agree to share such information, which they don't have to). In that case, the social cocktail mixing engine (555-557) may be commanded to use a recipe and/or recipe modifications (e.g., different social dynamic spices that try to assemble a social group fitting into a certain age, income, spending categorizing range and/or other pre-specified demographic categories). In other words, the invited guests to the STAN_3 spawned room (or system-maintained other forum) will not only have a better than fair likelihood of having one or more of their top N current topics in common and having good exchange co-compatibilities with one another, but also of welcoming promotional offerings targeted to their age, gender, income and/or spending (and/or other) demographically common attributes. In one embodiment, if the users so allow, the STAN_3 system creates and stores in its database, personal histories of the users including past purchase records and past positive or negative reactions to different kinds of marketing promotion attempts. The system tries to automatically cluster together into each spawned forum (e.g., chat room), people who have similar such records so they form a collective group that has exhibited a readiness to welcome certain kinds of marketing promotion attempts. Then the system automatically offers up the about-to-be formed social group to correspondingly matching marketers where the latter bid for exclusive or nonexclusive access (but limited in number of permitted marketers and number of permitted promotions—see 562 of FIG. 5C) to the forming chat room or other such STAN_3 spawned forum. In one embodiment, before a planned marketing promotion attempt is made to the group as a whole, it is automatically run by in private before the then reigning discussion leader for his approval and/or commenting upon. If the leader provides negative feedback in private (see FB1 of FIG. 5**C), then the planned marketing promotion attempt is not carried out. The group leader's reactions can be explicit or implicitly voted on (with CVi's) reactions. In other words, the group leader does not have to explicitly respond to any explicit survey. Instead, the system uses its biometrically directed sensors (where available) to infer what the leader's visceral and emotional reactions are to each planned marketing promotion attempt. Often this can be more effective than asking the leader to respond out right because a person's subconscious reactions usually are more accurate than their consciously expressed (and consciously censored) reactions. In one embodiment, rather than relying on just one person's subconscious reactions, the system samples the subconscious reactions of at least three representative forum participants and filters out one or more of the reactions that deviate beyond a predetermined threshold from the group average reaction. In this way, if a given user is mad at his girlfriend for some reason (as an example), and is making facial and/or body gestures due to an argument or thinking about his girlfriend rather than what is currently presented to him online, that deviating response will be filtered out.

The above method of automatically filtering out an excessively deviant response from a group of collected responses of STAN_3 system users is not limited to just emotional or other responses to test promotional offerings. The process may be applied to other telemetry based determinations such as for example, implicit or explicit votings by STAN_3 system users. In one embodiment, if for example, the CFi's or CVi's of one out of 5 sampled users within a non-customized group deviates from the rest by a percentage exceeding a predetermined threshold, that deviant feedback result is automatically tossed out or given a reduced weight when the result report is generated and/or transmitted for use in an appropriate way (e.g., displaying results to an end user). The response of the group as a whole may be based on an average of the individualized responses of the members or based on another collectivized method of representing a group response such as, but not limited to, a weighted average where some members receive more weight than others due to credentials, social dynamic role within the group, etc., or a mean response or a median response.

Notwithstanding the above, in one embodiment, pro-promotion chat or other forum participation sessions are preformulated by first automatically identifying one or more to-be-invited system users who are predetermined, based on their past online histories and based on their predetermined social dynamics profiles, to be likely group leaders who will also likely favor a to-be-promoted cognition (e.g., the idea of buying into a pre-specified good and/or service) and inviting those personas first into a nascent chat or other forum participation opportunity. If a sufficient number exceeding a predetermined threshold accept that invitation, then more users who are predetermined, based on their past online histories and based on their predetermined social dynamics profiles, to be likely to follow the accepting first invitees, are also invited into the forum. Thereafter, the to-be-promoted cognition is interjected into the forum discourse. In one embodiment, one or more of the first invited and likely to become group leaders is someone who has previously tried a to-be-promoted product or service (or one relatively similar to the be-promoted product/service) and has reacted positively to it (e.g., by posting a positive reaction on Yelp.com™ or another such product/service rating site.)

Referring next to FIG. 1J, shown here is another graphical user interface (GUI) option where the user is presented with an image 190*a* of a street map and a locations identification selection tool 190*b*. In the illustrated example, the street map 190*a* has been automatically selected by the system 410 through use of the built in GPS location determining subsystem (not shown, or other such location determiner) of the tablet computer 100''' as well as an automated system determination of what the user's current context is (e.g., on vacation, on a business trip, etc.). If the user prefers a different kind of map than the one 190*a* the system has chosen based on these factors, the user may click, tap, tongue-select (by sticking out tongue or pressing on in-mouth wirelessly communicative touchpad apparatus), or otherwise activate a show-other-map/format option 190*c*. As with others of the GUI's illustrated herein, one or more of the selection options presented to the user may include expansion tools (e.g., 190*b*+) for presenting more detailed explanations and/or further options to the user. In general, the displayed example shows to the user, locations of various kinds of resources that can enable and/or enhance a planned-for or even a spontaneously real life (ReL) gathering whose purpose may vary depending on which users accept or have accepted corresponding invitations and/or depending on what resources are or are not available at the prospective gathering location.

One or more pointer bubbles, 190*p*.1, 190*p*.2, etc. are displayed on or adjacent to the displayed map 190*a*. The pointer bubbles, 190*p*.1, 190*p*.2, etc. point places on the map (e.g., 190*a*.1, 190*a*.3) where on-topic events are already occurring (e.g., on-topic conference 190*p*.4) and/or where on-topic events may soon be caused to occur (e.g., good meeting place for topic(s) of bubble 190*p*.1) and/or where resources are or can be made available (e.g., at a resource-rich university campus 190*p*.6). The displayed bubbles, 190*p*.1, 190*p*.2, etc. are all, or for the most part, ones directed to topics that satisfy the filtering criteria indicated by the selection tool 190*b* (e.g., a displayed filtering criteria box). In the illustrated example, My Top 5 Now Topics implies that these are the top 5 topics the user is currently deemed to be focusing-upon by the STAN_3 system 410. The user may click, tap or otherwise activate a more-menus options arrow (down arrow in box 190*b*) to see and select other more popular options available through his system-supported data processing device 100'''. Alternatively, if the user wants more flexible and complex selection tool options, the user may use the associated expansion tool 190*b*+. Examples of other "filter by" menu options that can be accessed by way of the menus options arrow may include: My next 5 top topics, My best friends' 5 top topics, My favorite group's 3 top topics, and so on. Activation of the expansion tool (e.g., 190*b*+) also reveals to the user more specifics about what the names and further attributes are of the selected filter category (My Top 5 Topics, My best friends' 5 top topics, etc.). When the user activates one of the other "filter by" choices, the pointer bubbles and the places on the map they point to automatically change to satisfy the new criteria. The map 190*a* may also change in terms of zoom factor, central location and/or format so as to correspond with the newly chosen criteria and perhaps also in response to an intervening change of context for the user of computer 100'''.

Referring to the specifics of the top left pointer bubble, 190*p*.1 as an example, this one is pointing out a possible meeting place where a not-yet-fully-arranged, real life (ReL) meeting may soon take place between like-minded STAN users. First, the system 410 has automatically located for the user of tablet computer 100''', neighboring other users 190*a*.12, 190*a*.13, etc. who happen to be situated in a timely reachable radius relative to the possible meeting place 190*a*.1. Needless to say, the user of computer 100''' is also situated within the timely reachable radius 190*a*.11. By timely reachable, what is meant here is that the respective users have various modes of transportation available to them (e.g., taxi, bus, train, walking, etc.) for reaching the planned destination 190*a*.1 within a reasonable amount of time such that the meeting and its intended outcome can take place and such that the invited participants can thereafter make any subsequent deadlines indicated on their respective computer calendars/schedules. In addition to presenting one or more first transport mechanisms (e.g., taxi, bus, etc.) by way of which one or more of the potential participants in the being-planned (or pre-planned) meeting can timely get to the proposed or planned meeting place, the STAN_3 system may optionally present indications (e.g., icons) of one or more second transport mechanisms (e.g., taxi, bus, etc.) by way of which one or more of the potential participants can, at the conclusion of the meeting; timely get to a next desired destination (e.g., back to the office, to a hotel having vacancies, to a convention center, to a customer site, etc.). The first and/or second transport mechanisms may serve as meeting enabling and/or facilitating means in that, without them, some or all of the invited (or to be invited) participants would not be able to attend or would be inconvenienced in attempting to attend. By providing representations of the first and/or second transport mechanisms, the STAN_3 system can encourage potential participants who otherwise may not have attended (e.g., due to worry over how to timely get back to the convention center) to attend because one or more impediments to their attending the proposed or planned meeting is removed.

In one embodiment, the user of computer 100''' can click, tap or otherwise activate an expansion tool (e.g., a plus sign starburst like 190*b*+) adjacent to a displayed icon of each invited other user to get additional information about their exact location or other situation, to optionally locate their current mobile telephone number or other communication access means (e.g., a start private chat now option) and to thereby call/contact the corresponding user so as to better coordinate the meeting, including its timing, venue and planned topic(s) of discussion. (It is to be understood that when the locations and/or other situations of the other potential invitees is ascertained, typically their exact identities, locations, age or other demographics are not revealed or the users are in pre-existing privity with one another and have agreed ahead of time to share such information whose revelation may, in some circumstances otherwise compromise the safety or privacy of those involved. The meeting generating process may, in one embodiment, occur only over a secured communication channel to which only users who trusted one another have access.)

Once an acceptable quorum number of invitees have agreed to the venue, as to the timing and/or the topics; one of them may volunteer to act as coordinator (social leader) and to make a reservation at the chosen location (e.g., restaurant) and to confirm with the other STAN users that they will be there (e.g., how many will likely show up and is the facility sized to suite that number?). In one embodiment, the system 410 automatically facilitates one or more of the meeting arranging steps by, for example automatically suggesting who should act as the meeting coordinator/leader (e.g., because that person can get to the venue before all others and he or she is a relatively assertive person), automatically contacting the chosen location (e.g., restaurant) via an online reservation making system or otherwise to begin or expedite the reservation making process and automatically confirming with all that they are committed to attending the meeting and agreeable to the planned topic(s) of discussion. In short; if by happenstance the user of computer 100''' is located within timely radius (e.g., 190*a*.11) of a likely to be agreeable to all venue 190*a*.1 and other socially co-compatible other STAN users also happen to be located within timely radius of the same location and they are all likely agreeable to lunching together, or having coffee together, etc. and possibly otherwise meeting with regard to one or more currently focused-upon topics of commonality (e.g., they all share in common three topics which topics are members of their personal top 5 current topics of focus), then the STAN_3 system 410 automatically starts to bring the group of previously separated persons together for a mutually beneficial get together. Instead of each eating alone (as an example) they eat together and engage socially with one another and perhaps enrich one another with news, insights or other contributions regarding a topic of common and currently shared focus. In one embodiment, various ones of the social cocktail mixing attributes discussed above in conjunction with FIG. 1M for forming online exchange groups also apply to forming real life (ReL) social gatherings (e.g., 190*p*.1).

Still referring to proposed meeting location 190*a*.1 of FIG. 1J, sometimes it turns out that there are several viable meeting places within the timely reachable radii (e.g., 190*a*.11) of all the likely-to attend invitees (190*a*.12, 190*a*.13, etc.). This may be particularly true for a densely populated business district (e.g., downtown of a city) where many vendors offer their facilities to the general public for conducting meetings there, eating there, drinking there, and so on. In this case, once the STAN_3 system 410 has begun to automatically bring together the likely-to attend invitees (190*a*.12, 190*a*.13, etc.), the system 410 has basically created a group of potential customers that can be served up to the local business establishments for bidding/auctioning upon by one or more means. In one embodiment, the bidding for customers takes the form of presenting enticing discounts or other offers to the would-be customers. For example, one merchant may present a promotional marketing offer as follows: If you schedule your meeting now at our Italian Restaurant, we will give you 15% off on our lunch specials. In one embodiment, a pre-auctioning phase takes place before the promotional offerings can be made to the nascent and not-yet-meeting group (190*a*.12, 190*a*.13, etc.). In that embodiment, the number of promotional offerings (190*q*.1, 190*q*.2) that are allowed to be displayed in offerings tray 104' (or elsewhere) is limited to a predetermined number, say no more than 2 or 3. However, if more than that number of local business establishments want to send their respective promotions to the nascent meeting group (190*a*.12, 190*a*.13, etc.), they first bid as against each other for the number 1, 2 and/or 3 promotional offerings spots (e.g., 190*q*.1, 190*q*.2) in tray 104' and the proceeds of that pre-auctioning phase go to the operators of the STAN_3 system 410 or to another organization that manages the auctioning process. The amount of bid that a local business establishment may be willing to spend to gain exclusive access to the number 1 promotional offering spot (190.*q*1) on tray 104' may be a function of how large the nascent meeting group is (e.g., 10 participants as opposed to just two); whether the members of the nascent group are expected to be big spenders and/or repeat customers and so on. In one embodiment, the STAN_3 system 410 automatically shares sharable information (information which the target participants have pre-approved as being sharable) with the potential offerors/bidders so as to aid the potential offerors/bidders (e.g., local business establishments) with making informed decisions about whether to bid or make a promotional offering and if so at what cost. Such a system can be win-win for both the nascent meeting group (190*a*.12, 190*a*.13, etc.) and the local restaurants or other local business establishments because the about-to-meet STAN users (190*a*.12, 190*a*.13, etc.) get to consider the best promotional offerings before deciding on a final meeting place 190*a*.1 and the local business establishments get to consider, as they fill up the seatings for their lunch business crowd or other event among a possible plurality of nascent meeting groups (not only the one fully shown as 190.*p*1, but also 190*p*.2 and others not shown) to thereby determine which combinations of nascent groups best fits with the vendors capabilities and desires. More specifically, a business establishment that serves alcohol may want to vie for those among the possible meeting groups (e.g., 190*p*.1, 190*p*.2, etc.) whose sharable profiles indicate their members tend to spend large amounts of money for alcohol (e.g., good quality beer as an example) during such meetings. In one embodiment, after the meeting concludes, the STAN_3 system automatically seeks out the reactions of participants (e.g., via a proposed online survey) who are likely to welcome such automated reaction solicitation as to their respective ratings of the establishment (e.g., was the food good? was the service good? what rating (how many stars) do you give the place? any additional comments? and so on). The collected information may be automatically relayed to the management of the restaurant (or other such establishment) for quality assurance purposes. If the rating-providing participants permit, their specific of generalized demographic information (as pulled from their personhood profile record) may be automatically attached to their response by the STAN_3 system so that analysis may be carried out as to what demographic attributes match up with which ratings. If the establishment rates well, they may want to publicize a STAN_3 system certified rating for their establishment (e.g., for a fee) which can show off their ratings for certain demographic matches. It is within the contemplation of the present disclosure that the mobile data processing devices of the respective participants can have monitoring turned on during the meeting and such devices can determine when their respective users are focusing their attention giving energies upon the served food (or other served product or service) and then, based on CFi and/or CVi signals then collected, the STAN_3 system can automatically use the same as votes directed to the topic of whether the place was good or not.

Still referring to FIG. 1J and the proposed in-person meeting bubble 190*p*.1, optional headings and/or subheadings that may appear within that displayed bubble can include: (1) the name of a proposed meeting venue or meeting area (e.g., uptown) together with an associated expansion tool that provides more detailed information; (2) an indication of which other STAN users are nearby together with an associated expansion tool that provides more detailed information about the situation of each; (3) an indication of which topics are common as currently focused-upon ones as between the proposed participants (user of 100"" plus 190*a*.12, 109*a*.13, etc.) together with an associated expansion tool that provides more detailed information about the same; (4) an indication of which "subtext" topics (see above discussion re FIG. 1M) might be engaged in during the proposed meeting together with an associated expansion tool that provides more detailed information; and (5) a more button or expansion tool that provides yet more information if available and for the user to view if he so wishes.

A second nascent meeting group bubble 190*p*.2 is shown in FIG. 1J as pointing to a different venue location and as corresponding to a different nascent group (Grp No. 2). In one embodiment, the user of computer 100"' may have a choice of joining with the participants of the second nascent group (Grp No. 2) instead of the with the participants of the first nascent group (Grp No. 1) based on the user's mood, convenience, knowledge of which other STAN users have been invited to each, which topic or topics are planned to be discussed, and so on. In one variation, both of nascent meeting group bubbles 190*p*.1 and 190*p*.2 point to a same business district or other such general location and each group receives a different set of discount enticements or other marketing promotions from local merchants. More specifically, Grp No. 1 (of bubble 190*p*.1) may receive an enticing and exclusive offer from a local Italian Restaurant (e.g., free glass of champagne for each member of the group) while Grp No. 2 (of bubble 190*p*.2) receives a different offer of enticement or just a normal advertisement from a local Chinese Restaurant; but the user (of 100"') is more in the mood for Chinese food than for Italian now and therefore he says yes to invitation bubble 190*p*.2 and no to invitation bubble 190*p*.1. This of course is just an illustrative example of how the system can work.

Contents within the respective pointer bubbles (e.g., 190*p*.3, 190*p*.4, etc.) of each event may vary depending on the nature of the event. For example, if the event is already a definite one (e.g., scheduled baseball game in the location identified by 190*p*.3) then of course, some of the query data provided in bubble 190*p*.1 (e.g., who is likely to be nearby and likely to agree to attend?) may not be applicable. On the other hand, the alternate event may have its own, event-specific query data (e.g., who has RSVP'ed in bubble 190.*p*5) for the user to look at. In one embodiment, clicking, tapping or otherwise activating venue representing icons like 190*a*.3 automatically provides the user with a street level photograph of the venue and it surrounding neighborhood (e.g., nearby landmarks) so as to help the user get to the meeting place. In one embodiment, the STAN_3 system automatically causes the user's data processing device (100"') to launch the Google Maps™ web site (or equivalent, e.g., MapQuest™) with the location address preloaded where the automatically launched web page shows the user automatically what public transit routes to take and what are the next arrival/departure times for buses, trams, etc. in the next hour as based on the user's desired estimated ETA (estimated time of arrival) for the planned meeting. More specifically, the STAN_3 system may preload into the web-map providing service link (e.g., Google Maps™ or MapQuest™) the origin and destination locations as well as the type of map information desired (e.g., public transit connections and times, street view, etc.) thereby easing the user's access to such web-map providing services based on information known the STAN_3 system about the planned meeting.

Referring to example 190*p*.6 in FIG. 1J, that illustrated example assumes that a major university campus is a possible resource-providing facility for a pre-planned or spontaneously organized real life gathering where the gathering may require or may be enhanced by access to various resource such as, but not limited to: (1) large and/or fully equipped lecture halls that contain various kinds of multi-media equipment (e.g., large scale and/or 3D enabled computer projection and/or interconnection equipment; live tele-conferencing equipment; television broadcast support equipment; question-and-answer session portable microphones, etc.); (2) various types of physical demonstration and/or experiment enabling resources (e.g., chemistry labs, physics labs, engineering labs including computer engineering resources such as super-computers for enabling real time computational simulations and the like, biology/health care simulation or other labs, etc.); (3) library resources including computer database resources and/or access to subscription based data resources; (4) sports activities resources (e.g., gyms, running tracks, tennis/squash courts, etc.); (5) other performance-supporting resources such as music equipment, DJ mixing equipment, poetry jam rooms, choir practice rooms, etc.; (6) large scale dining facilities (e.g., campus cafeterias); (7) temporary housing facilities (e.g., dorm rooms); (8) college faculty personnel (e.g., professors who are experts and/or excellent lecturers on various topics, etc.). In addition to listing the resources (e.g., how many there are, how big? detailed specifications of each, etc.), the expansion tool (e.g., starburst+) of option 190*p*.6 may provide automated means for reserving available ones of such resources for different times and/or for negotiating to obtain such resources for planned times of a nascent real life (ReL) gathering plan. It is of course understood that the example of a university campus is merely exemplary and that various other meeting facilitating resources are contemplated here such as commercial TV studios, leasable machine shops, leasable industrial equipment and so on.

Although FIG. 1J shows a presentation of meeting-enabling/enhancing resources (e.g., 190*a*.1) displayed on a 2D map (190*a*) for the sake of quickly showing the locations of such resources relative to locations of potential invitees (e.g., 190*a*.13), it is within the contemplation of the present disclosure that similar information could instead be provided in list or tabular form (e.g., online name of each potential invitee plus approximate distance away from and/or travel time away from a prospective meeting place) and that the presented information need not be visual or only visual and can include an auditory presentation of the status of potential invitees and potential venues (e.g., 190*a*.1) for a pre-planned or spontaneously created real life gathering. Accordingly, some of the organizers and/or potential invitees can be driving a car for example where they are not then able to safely view a visual display of the meeting proposals and yet they can hear them via an audio presentation also provided by the STAN_3 system and they can interact with the other members of the planned meeting via audio-only communications if need be. Alternatively or additionally the meeting coordinating map can be presented in a street view format whereby potential joiners to the gathering who are walking or driving nearby can use the street view format to guide themselves and others to the targeted meeting venue on the basis of nearby landmarks.

Additionally, while the above description of FIG. 1J assumes a real life (ReL) meeting to be attended by ReL people, it is within the contemplation of the disclosure that part or all of the meeting can take place in a virtual reality world where virtual characters (e.g., avatars) arrange to virtually meet. The pre-planned or being-planned meeting can also take place where part of it occurs in real life (ReL) while another part simultaneously takes place in a virtual reality world, where for example, the bridge between the two worlds is in the form of a teleconferencing communications means (e.g., large size TV screen) that displays to the real life (ReL) participants of the meeting the virtual characters (e.g., avatars) simultaneously disposed in the virtual reality world.

Referring to FIG. 1K, shown here is another smartphone and tablet computer compatible user interface method 100.4 for presenting an M out of N common topics and optional location based chat or other joinder opportunities to users of the STAN_3 system. More specifically, in its normal mode of display when using this M out of N GUI presentation 100.4, the left columnful of options information 192 would not be visible except for a deminimize tool that is the counter opposite of illustrated Hide tool 192.0. However, for the sake of better understanding what is being displayed in right column 193, the settings column 192 is also shown in FIG. 1K in deminimized (expanded) form.

It can be a common occurrence for some users of the STAN_3 system 410 to find themselves alone and bored or curious or needing a 5-minute or like short-duration break while they wait for a next, in-real life (ReL) event to take place; such as meeting with habitually-late friend at a coffee shop. In such a situation, the user will often have only his or her small-sized PDA or smart cellphone with them. The latter device may have a relatively small display screen 111"". As such, the device compatible user interface (GUI 100.4 of FIG. 1K) is preferably kept simple and intuitive. When the user flips open or otherwise activates his/her device 100.4, a single Instan-Chat™ participation opportunities stack 193.1 automatically appears in the one displayed column 193 (192 is minimized). By clicking, tapping or otherwise activating the Chat Now button of the topmost displayed card of stack 193.1, the user can be automatically connected with a corresponding and now-forming chat group or other such online forum participation opportunity (e.g., live web conference) which is targeted for similarly situated other system users who intend to chat (and/or otherwise exchange information) for only a relatively short duration of time (e.g., less than an hour, less than 30 minutes, . . . , no more than about 5 minutes). There is substantially no waiting for the system 410 to monitor and figure out over a long duration what topic or topics the user is currently most likely focused-upon based on recent click streams or screen tap streams or the like (CFi's, CVi's, etc.) acquired over a relatively long duration. The interests monitor 112"" may be partially or fully turned off in this instance, but the user is nonetheless logged into the STAN_3 system 410 and at least his/her location (as well as date and time in location time zone) and/or other context-indicating data (including history of recent user activities and trending projections made from such historical activities) and/or habit/routine indicating data is available to be acquired by the STAN_3 system. Based on availability or not of such context-indicating data as well as likely current availability of other co-compatible system users, the system 410 may pick among a number of possibilities to present as a proposal to the user. If the system has no context hinting clues but remembers what top 5 topics were last the current top 5 topics of focus for the user, the system can assume that the same are also now the top 5 topics which the user remains currently focused-upon.

On the other hand, if the system has access to user context-indicating data beyond just time of day (which alone may be enough if the specific user is a creature of strong habit and routine per his/her PHAFUEL record) such as the system receiving an indication of where the user is located (e.g., at the coffee shop, working late at the office but needing a break, standing outside the movie theater, parked alongside a long stretch of highway, etc.), then the system can pick a more context appropriate group of topics (e.g., topic space subregions) as the top N now based on likely availability of similarly situated other system users who want to now engage in a system-spawned Instan-Chat™. It is to be understood in the course of this description that the system-proposed Instan-Chat™ or Instan™-other forum participation opportunity need not center around nodes or subregions of the system-maintained topic space (e.g., 313' of FIG. 3E) but may instead revolve around one or more respective points, nodes or subregions of a corresponding one or more other Cognitive Attention Receiving Spaces (CARSs; e.g., keyword space, URL space, etc.) maintained by the system. As in other instances throughout the present disclosure, topic space is used as a more readily understandable example.

Additionally, it is to be understood that, although FIG. 1K shows an intuitive-to-use GUI for presenting the proposed Instan-Chat™ or other online forum participation opportunity to the user, it is within the contemplation of the disclosure to present the proposals in one or more alternative or additional ways including, but not limited to, audio presentation and tabular or list or navigatable menus presentation (where audio presentation can be in the form of audible lists or voice controlled navigation through audible menus). Such alternative or additional ways of presenting system-generated information to the user are to be understood as being applicable throughout the present disclosure.

When the STAN_3 system presents the user with a proposed one or more Instan-Chat™ or Instan™-other online forum participation opportunities, such proposal routinely comes in an abbreviated format (e.g., card stack 193.1).

However, if the user wants to see in more detail what the proposed 5 topics are, the user can click, tap or otherwise activate the proposal-stack's expansion tool 193.*h*+ for more information and for the option of quickly switching to a previous one of a set of system recalled lists of other top 5 topics that the user may previously have focused-upon at earlier times or for indicating to the system that a different context is active and thereby implicitly (or explicitly) requesting that the system present a different set of, more context appropriate, Instan-Chat™ proposals. The user can then quickly click, tap or otherwise activate on one of those alternate options and thus switch to a different set of top 5 topics (or top N points, nodes or subregions of other CARSs). Alternatively, if the user has time, the user may manually define a new collection of current top 5 topics that the user feels he/she is currently focused-upon.

In an alternate embodiment, the system 410 uses the current detected context of the user (e.g., sitting at favorite coffee shop waiting for politically oriented friend to show up as indicated in online calendar) in combination with a randomizer to automatically pick likely current points, nodes or subregions of context appropriate CARSs for the user to consider. Examples include: picking a top 5 topics that the user and the to-be-met friend(s) have in common recently or over the past week or month; picking a top 5 recent keywords that the user and the to-be-met friend(s) have in common; picking a top 5 recent URL's that the user and the to-be-met friend(s) have in common; picking a top 5 trending keywords of recent broadcast news, of recent on-Internet news and/or of a more narrowly defined information-sharing network; and randomly picking from a list of favorite topics or favorite other points, nodes or subregions of other CARSs of the user.

However, if the STAN_3 system has yet more specific context-hinting data at its disposal, it can propose yet more context relevant chat or other forum participation opportunities. More specifically, if the GPS subsystem indicates the user is stuck on metered on ramp to a backed up Los Angeles highway and current news sources indicate that traffic is heavy in that location, the system 410 may automatically determine that the user's current top 5 topics include one regarding the over-crowded roadways and how mad he is about the situation. On the other hand, if the GPS subsystem indicates the user is in the bookstore (and optionally more specifically, in the science fiction aisle of the store), the system 410 may automatically determine that the user's current top 5 topics include one regarding new books (e.g., science fiction books) that his book club friends might recommend to him. Of course, it is within the contemplation of the present disclosure that the number of top N topics to be used for the given user can be a value other than N=5, for example 1, 2, 3 or 10 as example alternatives.

Accordingly, if the user has approximately 5 to 15 minutes or more of spare time and the user wishes to instantly join into an interesting online chat or other forum participation opportunity, the one Instan-Chat™ participation opportunities stack 193.1 automatically provides the user with a simple interface for entering such a group participation forum with a single click, tap or other such activation. The time based chat proposal may also include an associated maximum number of co-chatters value. More specifically, if the user has only 5 free minutes, it is unlikely that a meaningful chat can take place for him/her if ten other people are in the same chat room because each will likely want at least about a minute of time to talk. So the better approach is to automatically pre-limit the room size based on the user's expected length of free time. If the user has 30 minutes of expected free time for example, the maximum number of participants may be increased from 3 to 5 (as shown in block 192.2).

In one embodiment, a context determining module of the system 410 automatically determines based on context that the user wants to be presented with an Instan-Chat™ participation interface on power-up and also what card the user will most likely want to be first presented within this Instan-Chat™ participation interface when opening his/her smart cellphone (e.g., because the system 410 has detected that the user is in a car and stuck on the zero speed on-ramp to a backed-up Los Angles freeway for example). Alternatively, the user may utilize the Layer-Vator tool 113"" after power-up to virtually take himself to a metaphorical virtual floor that contains the Instan-Chat™ participation interface of FIG. 1K. In one embodiment, the Layer-Vator tool 113"" includes a My 5 Favorite Floors menu option and the user can position the illustrated Instan-Chat™ participation interface floor as one of his top 5 favorite interface floors. The map-based interface of FIG. 1J can be another of the user's top 5 favorite interface floors. The multiple card stacks interface of FIG. 1I can be another of the user's top 5 favorite interface floors. The same can be true for the more generalized GUI of FIG. 1A. The user may also have a longer, My Next 10 Favorite Floors menu option as a clickable, tappable or otherwise activateable option button on his elevator control panel where the longer list includes one or more on-topic community boards such as that of FIG. 1G as a choosable floor to instantly go to.

Still referring to FIG. 1K, the user can quickly click, tap or otherwise activate the shuffle down tool if the user does not like the topmost functional card displayed on stack 193.1 as the proposed short-duration chat or other forum participation opportunity that the user may join into substantially immediately. Similar to the interface options provided in FIG. 1I, the user can query for more information about any one group. The user can activate a "Show Heats" tool 193.1*p*. As shown at 193.1, the tool displays relative heats as between representative users already in or also invited to the forum and the heats they are currently deemed to be casting on topics that happen to be the top 5, currently focused-upon topics of the user of device 100.4. In the illustrated example, each of the two other users has above threshold heat on 3 of those top 5 topics, although not on the same 3 out of 5. The idea is that, if the system 410 finds people who share current focus on same topics, they will likely want to then chat or otherwise engage with each other in a Notes Exchange session (e.g., web conference, chat, micro-blog, etc.). In one embodiment, if there is already an ongoing chat or other forum participation session to which the device user is being invited (for example because one of the users who earlier joined is dropping out due to his/her free time duration having run out and thus there is room for a new participant to drop in and take over), the STAN_3 system automatically causes display of the current "group" heat attributed to the proposed chat or other forum participation opportunity (represented by card 193.1)

Column 192 shows examples of default and other settings that the user may have established for controlling what quick chat or other quick forum participation opportunities will be presented for example visually in column 193. (In an alternate embodiment, the opportunities can be presented by way of a voice and/or music driven automated announcement system that responds to voice commands and/or haptic/muscle based and/or gesture-based commands of the user.) More specifically, menu box 192.2 allows the user to select the approximate duration of his intended participation within the chat or other forum participation opportunities and the desired maximum number of participants in that forum. The expected duration can alter the nature of which topics are offered as possibilities, how many and which other users are co-invited into or are already present in the forum and what the nature of the forum will be (e.g., short micro-tweets as opposed to lengthy blog entries). In one embodiment, the STAN_3 system uses recently acquired data (e.g., CFi's) that hints at the user's current context to automatically pick the expected chat duration length and number of others who are co-invited to participate. In some situations, it may be detrimental to room harmony and/or social dynamics if some users need to exit in less than 5 minutes and plan on contributing only superficial comments while others had hopes for a 30 minute in depth exchange of non-superficial ideas. Therefore, and in accordance with one aspect of the present disclosure, the STAN_3 system 410 automatically spawns empty chat rooms that have certain room attributes pre-attached to the room; for example, an attribute indicating that this room is dedicated to STAN users who plan to be in and out in 5 minutes or less as opposed to a second attribute indicating that this room is dedicated to STAN users who plan to participate for substantially longer than 5 minutes and who desire to have alike other users join in for a more in depth discussion (or other Notes Exchange session) directed to one or more out of the current top N topics of the those users.

Another menu box 192.3 in the usually hidden settings column 192 shows a method by which the user may signal a certain current mood of his (or hers). For example, if a first user currently feels happy (joyous) and wants to share his/her current feelings with empathetic others among the currently online population of STAN users, the first user may click, tap or otherwise activate a radio button indicating the user is happy and wants to share. It may be detrimental to room harmony and/or social dynamics if some users are not in a co-sympathetic mood, don't want to hear happy talk at the moment from another (because perhaps the joy of another may make them more miserable) and therefore will exit the room immediately upon detecting the then-unwelcomed mood of a fellow online roommate. Therefore, and in accordance with one aspect of the present disclosure, the STAN_3 system 410 automatically spawns empty chat rooms that have certain room attributes pre-attached to the room; for example, an attribute indicating that this room is dedicated to STAN users who plan to share happy or joyous thoughts with one another (e.g., I just fell in love with the most wonderful person in the world and I want to share the feeling with others). By contrast, another empty room that is automatically spawned by the system 410 for purpose of being populated by short term (quick chat) users can have an opposed attribute indicating that this room is dedicated to STAN users who plan to commiserate with one another (e.g., I just broke up with my significant other, or I just lost my job, or both, etc.). Such, attribute-pretagged empty chat or other forum participation spaces are then matched with current quick chat candidates who have correspondingly identified themselves as being currently happy, miserable, etc.; as having 2, 5, 10, 15 minutes, etc. of spare time to engage in a quick online chat or other Notes Exchange session of like situated STAN users where the other STAN users share one or more topics of currently focused-upon interest with each other. In one embodiment, rather than having the user manually indicate current mood, the STAN_3 system determines mood automatically by for example using the user's online calendaring information and the user's PHAFUEL record. If the PHAFUEL record (habits and routines,—see FIG. 5A) indicates that on Friday evenings, after finishing a week of work the user is likely to be in a mood for partying and the current time and day for the corresponding user is Friday evening and past the normal work hours, then the system may use rudimentary information such as merely day of week and local user time to determine likely mood. If the system has had time to acquire additional, context-indicating signals such as for identifying the user's current geographic location and so on, of course that may be also used for automatically determining current user mood.

As yet another example, the third menu box 192.4 in the usually hidden settings column 192 shows a method by which the user may signal a certain other attribute that he or she desires of the chat or other forum participation opportunities presented to him/her. In this merely illustrative case, the user indicates a preference for being matched into a room with other co-compatibles who are situated within a 5 mile radius of where that user is located. One possible reason for desiring this is that the subsequently joined together chatterers may want to discuss a recent local event (e.g., a current traffic jam, a fire, a felt earthquake, etc.). Another possible reason for desiring this is that the subsequently joined together chatterers may want to entertain the possibility of physically getting together in real life (ReL) if the initial discussions go well. This kind of quick-discussion group creating mechanism allows people who would otherwise be bored for the next N minutes (where N=1, 2, 3, etc. here), or unable to immediately vent their current emotions and so on; to join up when possible with other like-situated STAN users for a possibly, mutually beneficial discussion or other Notes Exchange session. In one embodiment, as each such quick chat or other forum space is spawned and peopled with STAN users who substantially match the pre-tagged room attributes, the so-peopled participation spaces are made accessible to a limited number (e.g., 1-3) promotion offering entities (e.g., vendors of goods and/or services) for placing their corresponding promotional offerings in corresponding first, second and so on promotion spots on tray 104"" of the screen presentation produced for participants of the corresponding chat or other forum participation opportunity. In one embodiment, the promotion offering entities are required to competitively bid for the corresponding first, second and so on promotion spots on tray 104"" as will be explained in more detail in conjunction with FIG. 5C. In one embodiment, the STAN_3 system repeatedly scans local news sources for news about recent traffic accidents and/or recent other locally-relevant news (e.g., police activity, fires, water pipe breaks) and the system automatically determines how likely it is that the user of device 100.4 is near that event, and if so, the system automatically presents as a relatively top card, a card that represents a chat or other forum participation opportunity of short duration that is logically linked to the nearby incident. The reason is that when such events occur, people near to the event usually want to immediately chat with other affected persons about that event. The Instan™-Chat feature (FIG. 1K) of the STAN_3 system allows for such a quickly arranged short-duration exchange.

FIG. 1N will be described later below. In brief, it provides additional details regarding how the invitations-serving tray (102") and corresponding serving plates (e.g., 102*a*") provided thereon may be formulated to correspond to specific user contexts (e.g., It's Help Grandma Day for the user of the example of FIG. 1N).

Referring to FIG. 2, shown here is an environment 200 where the system user 201A is holding a palmtop or alike device 199 such as a smart cellphone 199 (e.g., iPhone™, Android™, etc.) in hand. The user may be walking about a city neighborhood or the like when he spots an object 198 (e.g., a building, but it could be a person or combination of both) where the spotted object (one having determinable direction and/or distance relative to the user) is of possible interest. The STAN user (201A) points his handheld device 199 so that a forward facing electronic camera 210 thereof (optionally with a forward-facing directional microphone included therewith) captures an image of the in real life (ReL) object/person 198. In one embodiment, the handheld device 199 includes direction determining and/or distance determining means for automatically determining corresponding direction and/or distance relative to the user. In one embodiment, handheld device 199 does not itself include a complete wireless link to the associated STAN_3 system but rather the handheld device 199 links by way of a relatively low power wireless link (e.g., BlueTooth™) to a more powerful transmitter/receiver 197 that the user 201A carries or wears (e.g., on waist band or ankle band) where the latter more powerful transmitter/receiver 197 may include larger/more powerful electrical batteries and/or larger/more powerful/more-resourceful electronic circuits while the handheld device 199 contains substantially de minimis resources for carrying out its display and/or telemetry gathering functions. In one embodiment, the head-band supported other components (e.g., ear-clip transducer/electrode 201*d* and combination microphone and exhalation sampler 201*c* also couple wirelessly to the main transmitter/receiver and/or main computational unit 197 while the latter unit (197) couples wirelessly to, interacts more directly with the remote (e.g., in-cloud) resources of the STAN_3 system. In one embodiment, the main transmitter/receiver and/or main computational unit 197 is configured to automatically search its surrounding environment (200) upon being powered up or repeatedly at other times for ancillary devices such handheld device 199 and head-band 201*b* plus its supported components (201*c*, 201*d*) plus other user information input and/or output means (e.g., larger and/or smaller display devices including a not-shown wristwatch display panel) that it can reconfigure itself to interact with for purposes of providing the user (and the STAN_3 system) with a greater and richer array of user-information input and/or output means including telemetry gathering means so as to thereby take advantage of the locally-available resources, whatever they may be, for supporting STAN_3 system operations.

In accordance with one aspect of the present disclosure, the camera-captured imagery (it could include IR band imagery as well as visible light band imagery, and the data may include collected direction and/or distance and/or related sound information as well) is transmitted to an in-cloud object recognizing module (not shown) of the STAN_3 system. The object recognizing module then automatically produces descriptive keywords and the like (e.g., meta-tags, cross-associated URL's, etc.) for logical association with the camera captured imagery (e.g., 198). Then the produced descriptive keywords and/or other descriptive data is/are automatically forwarded to topic lookup modules (e.g., 151 of FIG. 1F) of the system 410. Then, corresponding, topic-related feedbacks (e.g., on-topic invitations/suggestions) are returned from the STAN_3 system 410 to the user's device 199 (by way of main transmitter/receiver and/or main computational unit 197 in one embodiment) where the topic-related feedbacks are displayed on a back-facing screen 211 of the device (or otherwise presented to the user 201A, for example, audibly) together with the camera captured imagery (or a revised/transformed version of the captured imagery). This provides the user 201A with a virtually augmented reality wherein real life (ReL) objects/persons (e.g., 198) are intermixed with experience augmenting data produced by the STAN_3 topic space mapping mechanism 413' (see FIG. 4D, to be explained below). Once again, it is to be understood that cross-association of the automatically produced; image describing data (e.g., keywords) with system-maintained Cognitive Attention Receiving Spaces (CARSs) is not limited to topic space. The fed back and reality augmenting information may be extracted from any one or more of system-maintained CARSs such as keyword space, URL space, social dynamics space, hybrid location/context space, and so on.

In the illustrated embodiment 200, the device screen 211 of handheld device 199 can operate as a 3D image projecting screen. The bifocular positionings of the user's eyes can be detected by means of one or more back facing cameras 206, 209 (or alternatively using the IR beam reflecting method of FIG. 1A) and then electronically directed lenticular lenses or the like are used within the screen 211 to focus bifocal images to the respective eyes of the user so that he has the illusion of seeing a 3D image without need for special glasses. (Alternatively or additionally, the handheld device 199 may be configured to operate with special 3D image producing glasses (not shown).)

In the illustrated example 200, the user sees a 3D bent version of the graphical user interface (GUI) that was shown in FIG. 1A. A middle and normally user-facing plane 217 shows the main items (main reading plane) that the user is attentively focusing-upon. The on-topic invitations plane 202 may be tilted relative to the main plane 217 so that the user 201A perceives as being inclined relative to him and the user has to (in one embodiment) tilt his device so that an imbedded gravity direction sensor 207 detects the tilt and reorganizes the 3D display to show the invitations plane 202 as parallel facing to the user 201A in place of the main reading plane 217. Tilting the other way causes the promotional offerings plane 204 to become visually de-tilted and shown in as a user facing area. Tilting to the left automatically causes the hot top N topics radar objects 201*r* to come into the user facing area. In this way with a few intuitive tilt gestures (which gestures generally include returning the screen 211 to be facing in a plan view to the user 201A) the user can quickly keep an eye on topic space related activities as he wants (and when he wants) while otherwise keeping his main focus and attention on the main reading plane 217.

In the illustrated example 200, the user is shown wearing a biometrics detecting and/or reporting head band 201*b*. The head band 201*b* may include an earclip 201*d* that electrically and/or optically (in IR band) couples to the user's ear for detecting pulse rate, muscles twitches (e.g., via EMG signals) and the like where these are indicative of the user's likely biometric states. These signals are then wirelessly relayed from the head band 201*b* to the handheld device 199 (or another nearby relaying device 197) and then uploaded to the cloud as CFi data used for processing therein and automatically determining the user's biometric states and the corresponding user emotional or other states that are likely associated with the reported biometric states. The head band 201*b* may be battery powered (or powered by photovoltaic means) and may include an IR light source (not shown) that points at the IR sensitive screen 211 and thus indicates what direction the user is tilting his head towards and/or how the user is otherwise moving his/her head, where the latter is determined based on what part of the IR sensitive screen 211 the headband produced (or reflected) IR beam strikes. The head band 201*b* may include voice and sound pickup and exhalation/inhalation gas pickup sensors 201*c* for detecting what the user 201A is saying and/or what music or other background noises the user may be listening to and/or for detecting exhalation/inhalation gases and flow rates thereof and chemical contents thereof for reporting as CFi data to the remote STAN_3 system. In one embodiment, detected background music and/or other background noises are used as possibly focused-upon CFi reporting signals (see 298' of FIG. 3D) for automatically determining the likely user context (see conteXt space Xs 316" of FIG. 3D). For example if the user is exposed to soft symphony music, it may be automatically determined (e.g., by using the user's active PEEP file and/or other profile files, i.e. habits, responses to social dynamics, etc.) that the user is probably in a calm and contemplative setting. On the other hand, if very loud rock and roll music is detected (as well as the gravity sensor 207 jiggling because the user is dancing), then it may be automatically determined (e.g., again by using the user's active PEEP and/or other profile files—see 301*p* of FIG. 3D) that the user is likely to be at a vibrant party as his background context. More specifically, the head piece 201*b* may input embedded accelerometers (MEMs devices) that can detect head-nodding movement for purpose of correlating it for example to a background melody that the user is moving in step with. Similarly and additionally, the exhalation/inhalation gas pickup sensors 201*c* can be configured for detecting various natural and/or artificial gases and vapors or lack thereof (e.g., alcohol breath, dry breath, $CO_2$ rich breath, $O_2$ rich breath, etc.) for purpose of automatically determining biological states of the user 201A. All the various clues or hints collected by collecting devices (e.g., 201*c*, 201*d*, 199) that are operatively coupled to the user 201A may be uploaded to the cloud for processing by the STAN_3 system 410 and for consequential determination of what promotional offerings, invitations to on-topic chat or other forum participation opportunities or the like the user would likely welcome given the user's currently determined context.

Although not explicitly shown in FIG. 2, it is within the contemplation of the present disclosure for the user 210A to additionally wear and in-mouth TUI device (Tactile User Interface device) such as for example, an over-the-top-teeth dental like appliance that has three, tongue accessible surfaces; one for example functioning as a ±X cursor movement control pad, the other as a ±Y cursor movement control pad, and the third as a virtual push buttons area. The user may use his/her tongue to press against these control pad areas for moving the cursor and/or invoking respective actuations of on-screen objects. The in-mouth TUI device may operatively couple in a wireless manner to the handheld device. Teeth clenching actions near the back of the device may provide operational power that is converted into electrical power. The user may keep a sterile retainer at hand for holding the dental like appliance when not in use. For some users who wear dentures on a full time basis, their dentures may be so instrumented. Alternatively, instrumented tooth caps could be fashioned for signaling when and/or how the tongue presses against one or more of the cap's surfaces. The instrumented intra-oral devices may also report on degrees of user salivation, mouth breathing, and so on. Alternatively or additionally, such instrumented intra-oral devices that are wirelessly communicative with the user's smartphone or other local display and data processing device may include vibration producing means whereby the user can hear sounds and/or sense vibrations produced by the device for the purpose of supplying private notifications to the user by way of the intra-oral device.

More generally, various means such as the illustrated user-worn head band 201*b* (but these various means can include other user-worn or held other devices or devices that are not worn or held by the user) can discern, sense and/or measure one or more of: (1) physical body states of the user's and/or (2) states of physical things surrounding or near to the user. More specifically, the sensed physical body states of the user may include: (1a) geographic and/or chronological location of the user in terms of one or more of on-map location, local clock settings, current altitude above sea level; (1b) body orientation and/or speed and direction and/or acceleration of the user and/or of any of his/her body parts relative to a defined frame; (1c) measurable physiological states of the user such as but not limited to, body temperature, heart rate, body weight, breathing rate, breathe components and ratios/flowrates thereof, metabolism rates (e.g., blood glucose levels), body fluid chemistries and so on. The states of physical things surrounding or near to the user may include: (2a) ambient climactic states surrounding the user such as but not limited to, current air temperature, air flow speed and direction, humidity, barometric pressure, air carried particulates including microscopic ones and those visible to the eye such as fog, snow and rain and bugs and so on; (2b) lighting conditions surrounding the user such as but not limited to, bright or glaring lights, shadows, visibility-obscuring conditions and so on; (2c) foods, chemicals, odors and the like which the user can perceive or be affected by even if unconsciously; and (2d) types of structures and/or vehicles in which the user is situated or otherwise surrounded by such as but not limited to, airplanes, trains, cars, buses, bicycles, buildings, arenas, no buildings at all but rather trees, wilderness, and so on. The various sensor may alternatively or additionally sense changes in (rates of) the various physical parameters rather than directly sensing the physical parameters.

In one embodiment, the handheld device 199 of FIG. 2 further includes an odor or smells sensor 226 for detecting surrounding odors or in-air chemicals and thus determining user context based on such detections. For example, if the user is in a quite meadow surrounded by nice smelling flowers (whose scents 227 of FIG. 2) are detected, that may indicate one kind of context. If the user is in a smoke filled room, that may indicate a different likely kind of context.

Given presence of the various sensors described for example immediately above, in one embodiment, the STAN_3 system 410 automatically compares the more usual physiological parameters of the user (as recorded in corresponding profile records of the user) versus his/her currently sensed physiological parameters and the system automatically alerts the user and/or other entities the user has given permission for (e.g., the user's primary health provider) with regard to likely deterioration of health of the user and/or with regard to out-of-matching biometric ranges of the user. In the latter case, detection of out-of-matching biometric range physiological attributes for the holder of the interface device being used to network with the STAN_3 system 410 may be indicative of the device having been stolen by a stranger (whose voice patterns for example do not match the normal ones of the legitimate user) or indicative of a stranger trying to spoof as if he/she were the registered STAN user when in fact they are not, whereby proper authorities might be alerted to the possibility that unauthorized entities appear to be trying to access user information and/or alter user profiles. In the case of the former (e.g., changed health or other alike conditions, even if the user is not aware of the same), in one embodiment, the STAN_3 system 410 automatically activates user profiles associated with the changed health or other alike conditions, even if the user is not aware of the same, so that corresponding subregions of topic space and the like can be appropriately activated in response to user inputs under the changed health or other alike conditions.

Although in the exemplary cases of FIG. 2, FIG. 1A, etc., the situation is given as one where the user possesses a hand-carryable mobile data processing device such as a tablet computer or a smartphone with a touch responsive screen, it is within the contemplation of the present disclosure to have a user enter an instrumented room, an instrumented vehicle (e.g., car) or other such instrumented area, which area is instrumented with audio visual display resources and/or other user interface resources (IR band detectors, user biological state detectors, etc.) with the user having essentially no noticeable device in hand and to have the instrumented area automatically recognize the user and his/her identity, automatically log the user into his/her STAN_system account, automatically present the user with one or more of the STAN_system generated presentations described herein (where for example, an on-wall screen displays of any one or more of the presentations of FIGS. 1A-1N and 2) and automatically respond to user voice and/or gesture commands. The user may alternatively carry or wear minimalist types of interface devices for interfacing with the instrumented area, such as but not limited to, a worn RFID and/or IR wavelengths band identification device for allowing automated identification and locating of the user, a specially instrumented wrist watch and/or instrumented forearm bands, gloves, and/or instrumented leg bands, socks, shoes, undergarments and/or an instrumented head band/hat and/or special finger rings or other jewelry which are themselves instrumented with one or more of: biological state detectors for facilitating detection of biological states of the user (e.g., heart rate, respiration rate, perspiration rate, other excretions & rates thereof, muscle actuations), position and/or motion detectors for facilitating detection of positions and/or motions of corresponding body parts of the user, and/or communicative subparts for facilitating communicative interfacing as between the user and the instrumented area. If the user is seated or otherwise resting against a seat or like apparatus, the sitting/resting posture facilitating device may be instrumented with one or more interface facilitating means as well for facilitating operative coupling as between the user and the STAN_3 system. Accordingly, a fully equipped smartphone or laptop or tablet computer is not necessarily needed for the user to make more extensive use of the resources of the STAN_3 system. The user may instead enter a STAN-compatible instrumented area (e.g., a live video conferencing support station) and may use the resources available within that are for interacting with the STAN_3 system and/or with other system users by way of the instrumented area and its operative coupling to the core (e.g., cloud portion) of the STAN_3 system. (In one embodiment, if the user's heart rate and respiration are detected to undergo a sudden and substantially large increase, the STAN_3 system automatically deems that to be a medical or other emergency situation and it automatically copies the then developing CFi signals to an Emergency-Management Cognitive Attention Receiving Space. The latter space may include links to medical emergency handling services and/or security breach emergency handling services where the latter can respond to CFi signals received from the user during an apparent exigent circumstance.)

Referring next to FIG. 3A, shown is a first environment 300A where a user 301A of the STAN_3 system is at times supplying into a local data processing device 299, first signals 302 indicative of energetic output expressions $E_o$ (t, x, f, {TS, XS, . . . , OS}) of the user (one form of attention giving energies), where here, $E_o$ denotes energetic output expressions having at least a time t parameter associated therewith and optionally having other parameters associated therewith such as but not limited to, x: physical location (and optionally v: for velocity and a: for acceleration); f: distribution of energy or power over a frequency domain (frequency spectrum); Ts: associated nodes or regions in topic space; Xs: associated nodes or regions in a system maintained context space; Cs: associated points or regions in an available-to-user content space; EmoS: associated points or regions in an available-to-user emotional and behavioral states space; Ss: associated points or regions in an available-to-user social dynamics space; and so on; where the latter is represented by OS, other system-maintained Cognitive Attention Receiving Spaces. (See also and briefly the lower half of FIG. 3D and the organization of exemplary keywords space 370 in FIG. 3E). The illustrated local data processing device 299 of FIG. 3A can be in the form of a desktop computer or in the form of a laptop or tablet computer and may be a transportable data processing device having the form of at least one of: a hand-held device; a user wearable device; and being part of a user transport vehicle (e.g., an in-dashboard data processing device).

Also in the shown first environment 300A, the user 301A is at times having a local data processing device 299 automatically sensing second signals 298 indicative of input types energetic attention giving activities $e_i$(t, x, f, {TS, XS, . . . }) of the user (another form of attention giving energies), where here, $e_i$ denotes input type energetic attention giving activities of the user 301A which activities $e_i$ have at least a time t parameter associated therewith and optionally have other parameters associated therewith such as but not limited to, x: physical location at which or to which attention is being given (and optionally v: for velocity and a: for acceleration); f: distribution in frequency domain of the attention giving activities; Ts: associated nodes or regions in topic space that more likely correlate with the attention giving activities; Xs: associated nodes or regions in a system maintained context space that more likely correlate with the attention giving activities (where context can include a perceived physical or virtual presence of on-looking other users if such presence is perceived by the first user); Cs: associated points or regions in an available-to-user content space; EmoS: associated points or regions in an available-to-user emotions and/or behavioral states space; Ss: associated points or regions in an available-to-user social dynamics space; and so on. (See also and briefly again the lower half of FIG. 3D).

Also represented for the first environment 300A and the user 301A is symbol 301*xp* representing the surrounding physical contexts of the user and signals (also denoted as 301*xp*) indicative of what some of those surrounding physical contexts are (e.g., time on the local clock, location, velocity, etc.). Included within the concept of the user 301A having a current (and perhaps predictable next) surrounding physical context 301*xp* is the concept of the user being knowingly engaged (known or believed by the user 301A) with other social entities where those other social entities (not explicitly shown) are knowingly/believed to be there because the first user 301A knows or believes they are attentively there, and such knowledge/belief can affect how the first user behaves, what his/her current moods, social dynamic states, etc. are. The attentively present, other social entities may connect with the first user 301A by way of a near-field communications network 301*c* such as one that uses short range wireless communication means to interconnect persons who are physically close by to each other (e.g., within a mile) or they may be physically in the presence of the first user 301A or engaged with him/her by means of televideo conferencing or the like.

Referring in yet more detail to possible elements of the output type first signals 302 that are indicative of energetic output expressions $E_o$(t, x, f, {TS, XS, . . . }) of the user, these may include user identification signals actively produced by the user (e.g., password) or passively obtained from the user (e.g., biometric identification). These may include energetic clicking, tapping and/or typing and/or copying-and-pasting and/or other touching/gesturing signal streams produced by the user 301A in corresponding time periods (t) and within corresponding physical space (x) domains where the latter click/tap/etc. streams or the like are input into at least one local data receiving and/or processing device 299 (there could be more), and where the device(s) 299 has/have appropriate graphical and/or other user interfaces (G+UI) for receiving the user's energetic, and attention giving-indicative streams 302. The first signals 302 which are indicative of energetic output expressions $E_o$(t, x, f, {TS, XS, . . . }) of the user may yet further include facial configurations (e.g., intentional eyebrow raises, lip pursings, puckerings, tongue projections and/or movements) and/or head gestures and/or other body gesture streams produced by the user and detected and converted into corresponding data signals. They may include voice and/or other sound streams produced by the user, biometric streams produced by or obtained from the user, GPS and/or other location or physical context steams obtained that are indicative of the physical context-giving surrounds (301*xp*) of the user, data streams that include imagery or other representations of nearby objects and/or persons where the data streams can be processed by object/person recognizing automated modules and thus augmented with informational data about the recognized object/person (see FIG. 2), and so on. In one embodiment, the determination of current facial configurations may include automatically classifying current facial configurations under a so-called, Facial Action Coding System (FACS) such as that developed by Paul Ekman and Wallace V. Friesen (Facial Action Coding System: A Technique for the Measurement of Facial Movement, Consulting Psychologists Press, Palo Alto, 1978; incorporated herein by reference). In one variation these codings are automatically augmented according to user culture or culture of proximate other persons, user age, user gender, user socio-economic and/or residence attributes and so on.

Referring to possible elements of the input type second signals 298 that are indicative of energetic but not outputting, attention giving activities $e_i$ (t, x, f, {TS, XS, . . . }) of the user, these can include eye tracking signals that are automatically obtained by one of the local data processing devices (299) near the user 301A, where the eye tracking signals (e.g., as tracked over time and statistically processed to identify the predominant points, lines or curves of focus) may indicate how attentive the user is and/or they may identify one or more objects, images or other visualizations that the user is currently giving predominant energetic attention to by virtue of his/her eye activities (which activities can include eyelid blinks, pupil dilations, changes in rates of same, etc. as alternatives to or as additions to eye focusing and eye darting actions of the user). The energetic attention giving activities $e_i$ (t, x, f, {TS, XS, . . . }) of the user may alternatively or additionally include not fully intentional head tilts, nods, wobbles, shakes, etc. where some may indicate the user is listening to or for certain sounds, nostril flares that may indicate the user is smelling or trying to detect certain odors, eyebrow raises and/or other facial muscle tensionings or relaxations that may indicate the user is particularly amused or otherwise emotionally moved by something he/she perceives, and so on but is not intentionally trying to communicate something to someone or to his/her machine by means of such not fully intentional body language factors. Categorization of body language factors into being intended versus not fully intentional may be based on the currently activated PEEP record (Personal Emotions Expression Profile) of the user where the PEEP record includes a lookup table (LUT) and/or knowledge base rules (KBR's) differentiating between the two kinds of body language factors.

In the illustrated first environment 300A, at least one of the user's local data processing devices (299) is operatively coupled to or includes as a part thereof of web content displaying and/or otherwise presenting means (e.g., a flat panel display and/or sound reproducing components). The at least one of the user's local data processing devices (299) is further operatively coupled to and/or has executing within it, a corresponding one or more network browsing modules 303 where at least one of the browsing modules 303 is causing a presenting (e.g., displaying) of browser generated content to the user, where the browser-provided content 299*xt* can have one or more of positioning (x), timing (t) and spatial and/or temporal frequency (f) attributes associated therewith. As those skilled in the art may appreciate, the browser generated content may include, but is not limited to, HTML, XML or otherwise pre-coded content that is converted by the browsing module(s) 303 into user perception-friendly content. The browser generated content may alternatively or additionally include video flash streams or the like. In one embodiment, the network browsing modules 303 are cognizant of where on a corresponding display screen or through another medium various sub-portions of their content is being presented, when it is being presented, and thus when the user is detected by machine means to be then casting input and/or output energies of the attentive kind to the sources (e.g., display screen area) of the browser generated sub-portions of content (299*xt*, see also for example sub-portions 117*a* of window 117 of FIG. 1A), then the content placing (e.g., positioning) and timing and/or other attributes of the browsing module(s) 303 can be automatically logically linked to the detected focusing of user input and/or output energies (Eo(x, t, . . . ), ei(x, t, . . . ) based on time, space and/or other metrics and the logical links for such are relayed to an upstream net or web server 305 or directly to a further upstream portion 310 of the STAN_3 system 410. (As used herein, a "web server" is understood to be a physical or virtual computer that is configured, in accordance with industry-provided standards, to respond to industry-recognized serving requests from web browsers and to responsively serve up web content for downloading to the browser where the downloaded content is coded according to industry-recognized standards so that such content can be subsequently decoded by a target browser module (e.g., 303) that is configured in accordance with the same or similar industry-recognized standards and so that such content can then be presented in decoded form to the user.) In one embodiment, the one or more browsing module(s) 303 are modified (e.g., instrumented) beyond minimal industry-recognized standards for web browsing and by means of a software plug-in or the like to internally generate signals representing the logical linkings between the various sub-portions of browser produced content, its timing and/or its placement and the attention indicating other focus indicating signals (e.g., 298, 302) produced by the local focus detecting instrumentalities (e.g., eye-tracking mechanisms). In an alternate embodiment, a snooping module is added into the data processing device 299 to snoop out the content placing (e.g., positioning) or other attributes of the browser-produced content 299*xt* and to link the attention indicating other signals (e.g., 298, 302) to those associated placement/timing attributes (x,t) and to relay the same upstream to unit 305 or directly to unit 310. In another embodiment, the web/net server 305 is modified to automatically generate data signals that represent the logical linkings between browser-generated sub-portions of content (299*xt*) and one or more of the attention energies indicating signals and/or context indicating signals: $E_o$(x, t, . . . ), $e_i$(x, t, . . . ), $C_x$(x, t, . . . ), etc. produced by the local focus detecting instrumentalities and by local context determining instrumentalities (e.g., GPS unit).

When the STAN_3 system portion 310 receives the combination (322) of the content-sub-portion identifying signals (e.g., time, place and/or data of browser-generated content 299*xt*) and the signals representing user-expended attention-giving energies ($E_o$(x, t, . . . ), $e_i$(x, t, . . . )) cast on those sub-portions and/or user-aware-of context indicators $C_x$(x, t, . . . ), etc., the STAN_3 system portion 310 can treat the same in a manner generally similar to how it treats directly uploaded CFi's (current focus indicator records) of the user 301A. The STAN_3 system portion 310 can therefore produce responsive result signals 324 for use by the web/net server 305 or a further downstream unit, where the responsive result signals 324 may include, but not limited to, identifications of the most likely topic nodes or topic space regions (TSR's) within the system topic space (413'; or another such space if applicable) that correspond with the received combination 322 of content, focus and/or context representing signals. In one embodiment, the number of returned as likely, topic node (or other node) identifications is limited to a predetermined number such as N=1, 2, 3, . . . and therefore the returned topic/other node or subregion identifications may be referred to as the top N topic node/region ID's in FIG. 3A.

Although topic space is mentioned as a convenient example, it is fully within the contemplation of the present disclosure for the responsive result signals 324 (produced by the STAN_3 system 310) to represent points, nodes or subregions of other system-maintained Cognitive Attention Receiving Spaces such as, but not limited to, keyword space, URL space, social dynamics space and so on. The responsive result signals 324 may be seen as results of having tapped into the collection of collective Cognitive Attention Receiving Spaces maintained by the system 310 and having selectively extracted from that "collective brain" (in a manner of speaking) the informational resources maintained by that "collective brain", including, but not limited to, most currently popular chat or other forum participation sessions directed to the corresponding points, nodes or subregions of system-maintained Cognitive Attention Receiving Spaces (e.g., topic space) where the corresponding points, nodes or subregions may be selected on a context-sensitive basis. Context-based selection is possible because the context representing signals $C_x$(x, t, . . . ) of the first user 301A are input into the STAN_3 system 310 and because (as shall be better detailed below), the STAN_3 system 310 maintains hybrid spaces whose nodes can point to context-specific nodes of other spaces and/or chat or other forum participation opportunities or other informational resources that cross-correlate with the hybrid space nodes. Just as the purebred or non-hybrid Cognitions-representing Spaces (e.g., topic space, keyword space, URL space, etc.) have consensus-wise created PNOS-type points, or nodes or subregions respectively representing consensus-wise defined, communal cognitions associated with the purebred types of cognitions, the hybrid Cognitions-representing Spaces (e.g., topic-plus-context space) have stored therein, consensus-wise created PNOS-type points, or nodes or subregions respectively representing consensus-wise defined, communal cognitions associated with the hybrid types of cognitions. For example, when the topic of "football" is taken within the context of being at Ken's house (see again the introductory hypothetical) and it being SuperBowl Sunday™ that day and the first user's calendaring database indicating that he has clean-up crew duty that hour, the system can identify a corresponding and context-based PNOS-type point, node or subregion in a corresponding topic-plus-context space subregion that points to co-associated chat or other forum participation opportunities that other users in similar contextual situations would likely want to participate in. Yet more specifically, one such online chat room might be directed to the topic of "How to finish your clean-up assignments without missing high points of today's game". In other words, rather than the user having to fish through many possible chat rooms looking for one specifically directed to his unique situation, other users whose current attention giving energies are focused-upon the same or a substantially similar node in the same subregion of topic-plus-context space are brought together and invited to simultaneously or in close temporal proximity, join in on a chat or other forum participation session linked to that combination of context plus topic.

As explained in the here-incorporated STAN_1 and STAN_2 applications, each topic node within the system-maintained topic space may include pointers or other links to corresponding on-topic chat rooms and/or other such forum participation opportunities. The linked-to forums may be sorted, for example according to which ones are most popular among different demographic segments (e.g., age groups) of the node-using population. In one embodiment, the number returned as likely, most popular chat rooms (or other so associated forums) is limited to a predetermined number such as M=1, 2, 3, . . . and therefore the returned forum identifying signals may be referred to as the top M online forums in FIG. 3A. The nodes of a hybrid Cognitions-representing Space can operate in substantially the same except that the points, nodes or subregions of the hybrid space are dedicated to a corresponding hybridization of consensus-wise defined, communal cognitions.

As also explained in the here-incorporated STAN_1 and STAN_2 applications, each topic node may include pointers or other links to corresponding on-topic topic content that could be suggested as further research areas (non-forum types of informational resources) to STAN users who are currently focused-upon the topic of the corresponding node. The linked-to suggestible content sources may be sorted, for example according to which ones are most popular among different demographic segments (e.g., age groups) of the node-using population. In one embodiment, the number returned as likely, most popular research sources (or other so associated suppliers of on-topic material) is limited to a predetermined number such as P=1, 2, 3, . . . and therefore the returned resource identifying signals may be referred to as the top P on-topic other contents in FIG. 3A. The nodes of a hybrid Cognitions-representing Space can operate in substantially the same except that the points, nodes or subregions of the hybrid space will point to further resources dedicated to the corresponding hybridization of the consensus-wise defined, communal cognitions as represented by the respective points, nodes or subregions of the respective hybrid space.

As yet further explained in the here-incorporated STAN_1 and STAN_2 applications, each topic node may include pointers or other links to corresponding people (e.g., Tipping Point Persons or other social entities) who are uniquely associated with the corresponding topic node for any of a variety of reasons including, but not limited to, the fact that they are deemed by the system 410 to be experts on that topic, they are deemed by the system to be able to act as human links (connectors) to other people or resources that can be very helpful with regard to the corresponding topic of the topic node; they are deemed by the system to be trustworthy with regard to what they say about the corresponding topic, they are deemed by the system to be very influential with regard to what they say about the corresponding topic, and so on. In one embodiment, the number returned as likely to be best human resources with regard to topic of the topic node (or topic space region: TSR) is limited to a predetermined number such as Q=1, 2, 3, . . . and therefore the returned resource identifying signals may be referred to as the top Q on-topic people in FIG. 3A. The nodes of a hybrid Cognitions-representing Space can operate in substantially the same except that the points, nodes or subregions of the hybrid space will point to people who can serve as resources for the corresponding hybridization of the consensus-wise defined, communal cognitions as represented by the respective points, nodes or subregions of the respective hybrid space.

The list of topic-node-to-associated informational items can go on and on. Further examples may include, most relevant on-topic tweet streams, most relevant on-topic blogs or micro-blogs, most relevant on-topic URLs, most relevant on-topic online or real life (ReL) conferences, most relevant on-topic social groups (of online and/or real life gathering kinds), and so on. And also, of course, it is within the contemplation of the present disclosure for the produced responsive result signals 324 of the STAN_3 system portion 310 to be representative of informational resources extracted from, or by way of other Cognitive Attention Receiving Spaces maintained by the system besides or in addition to topic space.

The produced responsive result signals 324 of the STAN_3 system portion 310 can then be processed by the web or net server 305 and converted into appropriate, downloadable content signals 314 (e.g., HTML, XML, flash or otherwise encoded signals) that are then supplied to the one or more browsing module(s) 303 then being used by the user 301A where the browsing module(s) 303 thereafter provide the same as presented content (299*xt*, e.g., through the user's computer or TV screen, audio unit and/or other media presentation device).

More specifically, the initially present content (299*xt*) on the user's local data processing device 299, before that initial content (299*xt*) is enhanced (supplemented, augmented) by use of the STAN_3 system 310; may have been a news compilation web page that was originated from the net/web server 305, converted into appropriate, downloadable content signals 314 by the browser module(s) 303 and thus initially presented to the user 301A. Then the context-indicating and/or focus-indicating signals 301*xp*, 302, 298 obtained or generated by the local data processing devices (e.g., 299) then surrounding the user are automatically relayed upstream to the STAN_3 system portion 310. In response to these, unit 310 automatically returns response signals 324. The latter flow downstream and in the process they are converted into on-topic, new (post-initial) displayable information (or otherwise presentable information; e.g., audible information) that the user may first need to approve/accept before a final presentation is provided (e.g., after the user accepts a corresponding invitation to enter an online chat room) or that the user is automatically treated to without need for invitation acceptance. This new, post-initial and displayable and/or otherwise presentable information (e.g., encoded by downstream heading signals 314) can enhance the initial web-using experience of the respective user 310A by for example automatically including or suggesting for inclusion, currently hot and on topic chat or other forum participation opportunities that are or will be populated by co-compatible other users.

Yet more specifically, in the case of the initial news compilation web page (e.g., displayed in area 299*xt* at first time t1), once the system automatically determines what topics and/or specific sub-portions of the initially available content the user 301A is currently more focused-upon (e.g., energetically paying attention more to and/or more energetically responding to), the initially presented news compilation transforms automatically and shortly thereafter (e.g., within a minute or less) into a "living" news compilation that seems to magically know what the user 301A has currently been focusing-upon (casting significant attention giving energies upon) and which then serves up correlated additional content (e.g., invitations to immediately join in on related chat rooms and/or suggestions of additional resources the user might want to investigate) which the user 301A likely will welcome as being beneficially useful to the user rather than as being unwelcomed and annoying. Yet more specifically, if the user 301A was reading a short news clip about a well known entertainment celebrity (movie star) or politician named X, or sports figure (e.g., Joe-the-Throw Nebraska (fictitious)), the system 299-310 may shortly thereafter automatically pop open a live chat room (or invitation thereto) where like-minded other STAN users are starting to discuss a particular aspect regarding celebrity X that happens to now be predominantly on the first user's (301A) mind. The way that the system 299-310 came to infer what was most likely receiving the more significant attention giving energies within the first user's (301A) mind is by utilizing a trial and error technique in combination with the system-maintained Cognitive Attention Receiving Spaces (CARSs) where the trial and error technique makes a first guess at likely points, nodes or subregions in the CARSs that the user might agree he/she is focusing his/her attention giving energies upon, then presenting corresponding content (e.g., invitations) to the user, then collecting implicit or explicit vote indicators (CVi's) respecting the newly presented content and repeating so as to thereby home in on the most likely topics on the user's mind as well as homing in on the most likely context that the user is apparently operating under with aid of pre-developed profiles (301*p* in FIG. 3D) for the logged-in first user (301A) and with aid of the then detected context-indicating and/or focus-indicating signals 301*xp*, 302, 298 of the first user (301A).

Referring to the flow chart of FIG. 3C, a machine-implemented process 300C that may be used with the machine system 299-310 of FIG. 3A may begin at step 350. In next step 351, the system automatically obtains focus-indicating signals 302 that indicate certain outwardly expressed activities (attention giving activities) of the user such as, but not limited to, entering one or more keywords into a search engine input space, clicking, tapping, gesturing or otherwise activating and thus navigating through a sequence of URL's or other such pointers to associated content, participating in one or more online chat or other online forum participation sessions that link directly or indirectly (and strongly or weakly—see for example the session tethers of FIG. 3E) to predetermined topic nodes of the system topic space (413'), accepting machine-generated invitations (see 102J of FIG. 1A) that are directed to respective predetermined topic nodes, clicking, tapping on or otherwise activating expansion tools (e.g., starburst+) of on-screen objects (e.g., 101*ra'*, 101*s'* of FIG. 1B) that are pre-linked to predetermined topic nodes, focusing-upon community boards (see FIG. 1G) that are pre-linked to predetermined topic nodes, clicking, tapping on or otherwise activating on-screen objects (e.g., 190*a*.3 of FIG. 1J) that are cross associated with a geographic location and one or more predetermined topic nodes, using the Layer-vator (113 of FIG. 1A) to ride to a specific virtual floor (see FIG. 1N) that is pre-linked to a small number (e.g., 1, 2, 3, . . . ) of predetermined topic nodes, and so on. Once again, mention here of predetermined topic nodes and informational resources that are logically linked thereto is to be appreciated as being representative of the broader concept of specifically identified PNOS-type points, nodes or subregions represented as such in one or more system-maintained Cognitive Attention Receiving Spaces (CARSs) and the informational resources (e.g., pointers to chat rooms and/or pointers to non-forum content) that are logically linked therewith.

In next step 352, the system automatically obtains or generates focus-indicating signals 298 that indicate certain inwardly directed (inputting types of) attention giving activities of the user such as, but not limited to, staring (e.g., having eye dart pattern predominantly hovering there) for a time duration in excess of a predetermined threshold amount at a specific on-screen area (e.g., 117*a* of FIG. 1A) or a machine-recognized off-screen area (e.g., 198 of FIG. 2) that is pre-associated with a limited number (e.g., 1, 2, . . . 5) of topic nodes of the system 310; repeatedly returning to look at (or listen to) a given machine presentation of content where that frequently returned to presentation is pre-linked with a limited number (e.g., 1, 2, . . . 5) of such topic nodes and the frequency of repeated attention giving activities and/or durations of each satisfy predetermined criteria that are indicative for that user and his/her current context of extreme interest in the topics of such topic nodes, and so on.

In next step 353, the system automatically obtains or generates context-indicating signals 301*xp*. Here, such context-indicating signals 301*xp* may indicate one or more most likely contextual attributes of the user such as, but not limited to: his/her geographic location, his/her economic activities disposition (e.g., working, on vacation, has large cash amount in checking account, has been recently spending more than usual and thus is in shopping spree mode, etc.), his/her biometric disposition (e.g., sleepy, drowsy, alert, jittery, calm and sedate, etc.), his/her disposition relative to known habits and routines (see briefly FIG. 5A), his/her disposition relative to usual social dynamic patterns (see briefly FIG. 5B), his/her awareness of other social entities giving him/her their attention, and so on. See also FIG. 3J (context primitive data object) as described below.

In next step 354 (optional) of FIG. 3C, the system automatically generates logical linking signals that link the time, place and/or frequency of focused-upon content items with the time, place, direction and/or frequency of the context-indicating and/or focus-indicating signals 301*xp*, 302, 298 so as to thereby create hybrid pointing signals (HyCFi's) that represent and/or point to the combination or clustered complex of current focus indicators (a CFi's cluster) and that indicate the context(s) under which such clusters were generated as well as, optionally, representing emotional intensity cross-correlated with the in-context cluster of signals representing corresponding user focusing activities. As a result of this optional step 354, upstream unit 310 receives a clearer indication of what specific sub-portions of content go with which focusing-upon activities and to what degree of user intensity (e.g., emotional intensity). As was mentioned above and will be seen in yet more detail below, in one embodiment, the STAN_3 system maintains so-called hybrid Cognitive Attention Receiving Spaces (see for example, hybrid node 384.1 of FIG. 3E) and one or more of such CARSs are hybrids of context plus something else (e.g., keywords, URL's, etc.). The generated hybrid signals (HyCFi's) of step 354 may be used to point to specific points, nodes or subregions in such hybrid CARSs where the latter nodes, etc. point to corresponding, context-appropriate further informational resources (e.g., live chat rooms and/or other resources).

In one embodiment the CFi's (or HyCFi's) received by the upstream unit 310 are time and/or place stamped. As a result of presence of such chronological and spatial identifications, the system 299-310 (FIG. 3A) may determine to one degree of resolution or another, which CFi's and/or HyCFi's likely belong or not with one another based on clusterings of the (Hy)CFi's around associated locations and/or timings and/or commonality of focused-upon sub-portions of content 299*xt*. The (Hy)CFi's that are uploaded into the STAN_3 system 310 are therefore not necessarily treated as individualized samplings of attention giving activities of a corresponding user, but rather they can be treated as a more informative collection (integration) of interrelated hints and clues about what the user is focusing his/her attention giving energies upon. It is to be understood that it is merely helpful but not necessary that optional step 354 be performed.

In next carried out step 355 of FIG. 3C, the system automatically relays to the upstream portion 310 of the STAN_3 system 410 available ones of the context-indicating and/or focus-indicating signals 301*xp*, 302, 298 as well as the optional context-to-focus linking signals (HyCFi's generated in optional step 354). The relaying step 355 may involve sequential receipt and re-transmission through respective units 303 and 305. However, in some cases one or both of units 303 and 305 may be bypassed. More specifically, data processing device 299 may relay some of its informational signals (e.g., CFi's, CVi's, HyCFi's) directly to the upstream portion 310 of the STAN_3 system 410.

In a next carried out step 356 of FIG. 3C, the cloud or otherwise-based STAN_3 system 410 (which includes unit 310) processes the received signals 322, produces corresponding result signals 324 and transmits some or all of them either to the net/web server 305 or it bypasses the net/web server 305 in the case of some of the result signals 324 are in appropriate format and instead transmits some or all of the result signals 324 directly to the browser module(s) 303 or directly to the user's local data processing device 299. The returned result signals 324 are then optionally used by one or more of downstream units 305, 303 and 299 for presenting the user with updated/upgraded/augmented content that may enhance the user's experience beyond that provided by the initially presented web content. More specifically, where a news stories compilation page (displayed web page—e.g., see 117 of FIG. 1A) may have initially presented the user with a wide variety of news articles; some garnering more attention from the user than others, the updated/upgraded/augmented version of that displayed web page (which is enhanced or updated by newer content provided on the basis of the result signals 324 generated by the STAN_3 system server(s) 310) will often appear to be more on target with respect to what the user is more interested on focusing-upon now. In other words, it will be more on-topic with respect to the top N now topics the user apparently has in mind at the present moment. As a result, a user-serving "living" news page is perceived by the user where that "living" news page appears to somehow have read the user's mind and then automatically zoomed in on the news stories and articles the user is now most interested in. So the "living" news page becomes a user-centric "living" news page that appears to serve the selfish private and current wants of the specific user rather than being merely a generalized news page that seeks to simultaneously please as many people as possible without actually zooming in on the selfish private and current wants of specific users and thus not truly pleasing any of them.

In next carried out step 357 of FIG. 3C, if the informational presentations (e.g., displayed content, audio presented content, etc.) changes as a result of machine-implemented steps 351-356, and the user 301A becomes aware of the changes and reacts to them (in a positive or negative voting way), then new context-indicating and/or focus-indicating signals and/or voting signals 301*xp*, 302, 298, CVi's may be produced as a result of the user's positive, negative or neutral reaction to the new stimulus. Alternatively or additionally, the user's context and/or input/output activities may change due to passage of time or other factors (e.g., the user 301A is in a vehicle that is traveling through different contextual surroundings). Accordingly, in either case, whether the user reacts (Yes) or not (No), a subsequent process flow path 359*x* loops back to step 351 so that content-refreshing step 356 may be repeatedly executed and thereafter followed again by step 351. Therefore the system 410 automatically keeps updating its assessments of where the user's current attention is in terms of topic space (see Ts of next to be discussed FIG. 3D), in terms of context space (see Xs of FIG. 3D), in terms of content space (see Cs of FIG. 3D) and/or in terms of likely to be focused-upon other PNOS-type points, nodes or subregions of other Cognitive Attention Receiving Spaces. At minimum, the system 410 automatically keeps updating its assessments of where the user's current attention is in terms of energetic expression outputting activities of the user (see output 3020 of FIG. 3D) and/or in terms of energetic attention giving activities of the user (see output 2980 of FIG. 3D).

If and when the user reacts emotionally in step 357 to the updated/upgraded content presented to the user by step 356, steps 358*a* and 358*b* may be executed. In step 358*a*, the system automatically obtains reaction indicating signals (CVi's) from sensors surrounding the user (or even embedded on or in the user—e.g., intra-oral cavity instrumentation, intra-nasal cavity instrumentation, etc.) and the system determines whether or not to treat such emotion-indicating signals as implicit or explicit votes of confidence or no confidence regarding the newly updated/upgraded content based on the user's currently activated PEEP record. If for example, the user quickly re-focuses his/her attention upon the newly updated/upgraded content and reacts positively (e.g., smiles), then the STAN_3 system can treat this positive reaction as a reinforcement in step 358*b* for neural networking-wise learning or like learned models (e.g., KBR's) the system has/is developed/developing for the user, for his/her current context, and for determining what the user apparently wants to then have presented (e.g., displayed) to him/her. On the other hand, if the user ignores the newly updated/upgraded content (generated by step 356) or reacts in a manner which indicates disapproval of how the STAN_3 system behaved (as opposed to disapproval directed to the newly updated/upgraded content itself), the system automatically alters its behavior (the system adaptively "learns") in step 358*b* so that hopefully the system will do better in the next go-around through steps 351-356. In other words, the learning loop that includes steps 358*a*, 358*b* and repetition pathway 359*x* operates on a trial and error basis that is designed to urge the STAN_3 system into better servicing the user by taking note of his/her positive or negative reactions (if any, and in step 357) to service provided thus far and/or by also taking note of changing circumstances (changed context determined in step 353). As should be apparent from FIG. 3C, if there is no detected user reaction in step 357, the "No" path 359*n* is taken into loop back path 359*x*. On the other hand, if a significant user reaction is detected in step 357, the "Yes" path is taken into steps 358*a*/358*b* and thereafter path 359*y* is followed into loop back path 359*x*. In one embodiment, the reinforced or detracted from model of the first user includes at least one of the currently activated personhood profiles (CpCCp), domain specific profiles (DsCCP), personal emotion expression profiles (PEEP), habits and routines profiles (PHAFUEL) of the first user.

Before moving on to the details of FIG. 3D, a brief explanation of FIG. 3B is provided. The main difference between 3A and 3B is that units 303 (browser modules) and 305 (web servers) of 3A are respectively replaced by application-executing module(s) 303' (a.k.a. client modules 303') and application-serving module(s) 305' in FIG. 3B. As those skilled in the art may appreciate, FIG. 3B is a more generalized version of FIG. 3A because a web browser is a special purpose species of a computer application program and a web server is a special species of a general application server computer (305') that supports other kinds of computer application programs. Because the downstream heading inputs to application-executing module(s) 303' are not limited to browser recognizable codes (e.g., HTML, XML, flash video streams, etc.) and instead may include application-specific other codes, communications line 314' of FIG. 3B is shown to optionally transmit such application-specific other codes. In one embodiment, of FIG. 3B, the application-executing module(s)/clients 303' and/or application-serving module(s)/hosts 305' implement a user configurable news aggregating function and/or other information aggregating functions wherein the application-serving module(s) 305' for example automatically crawl through or search within various databases (e.g., accessed via network 401") beyond the reach of the publically accessible parts of the internet as well as within the internet for the purpose of compiling for the user 301B, news and/or other information of a type defined by the user through his her interfacing actions with an aggregating function of the application-executing module(s) 303'. In one embodiment, the databases searched within or crawled through by the news aggregating functions and/or other information aggregating functions of the application-serving module(s) 305' include areas of the STAN_3 database subsystem 319', where these database areas (319') are ones that system operators of the STAN_3 system 410 have designated as being open to such searching through, or crawling through (e.g., without compromising reasonable privacy expectations of STAN users). In other words, and with reference to the user-to-user associations (U2U) space 311' of the FIG. 3B as well as the user-to-topic associations (U2T) space 312', the topic-to-topic associations (T2T) space 313', the topic-to-content associations (T2C) space 314' and the context-to-other (e.g., user, topic, etc.) associations (X2UTC) space 316'; inquiries 322' input into unit 310' may be responded to with result signals 324' that reveal to the application-serving module(s) 305' various data structures of the STAN_3 system 410 such as, but not limited to, parts of the topic node-to-topic node hierarchy then maintained by the topic-to-topic associations (T2T) mapping mechanism 413' (see FIG. 4D).

Referring now to FIG. 3D and the exemplary STAN user 301A' shown in the upper left corner thereof, it should now be becoming clearer that almost every word 301*w* (e.g., "Please"), phrase (e.g., "How about . . . ?"), facial configuration (e.g., smile, frown, wink, tongue projection, etc.), head gesture 301*g* (e.g., nod) or other energetic expression output $E_o(x, t, f, \ldots)$ produced by the user 301A' is not to be seen as just that expression being output $E_o(x, t, f, \ldots)$ in isolation but rather as one that is produced with its author 301A' being situated in a corresponding internal contextual state therefor and with the surrounding (external) context 301*x* of its author 301A' also potentially being a context therefor and with each preceding or following expressive output $E_o(x', t+1, f', \ldots)$ possibly providing additional contextual flavor to what comes after or before. (The proposition about external context 301*x* being a factor depends on whether the user is blissfully unaware of his/her physical surroundings or more attuned to them.) Stated more simply, the user is the context of his/her actions and his/her contextual surroundings can also be part of the context and his/her surrounding other expressions can further be part of the context. The operative context for each user output expression $E_o(x, t, f, \ldots)$ can give clearer meaning (in a semantic or other sense) to the machine detected, attention giving activities of the user. Therefore, and in accordance with one aspect of the present disclosure, the STAN_3 system 410 maintains as one of its many data-objects organizing spaces (which Cognitive Attention Receiving Spaces or CARSs are defined by stored representative signals stored in machine memory), a context nodes organizing space 316". In FIG. 3D, this context nodes organizing space 316" is illustrated as an inverted square pyramid within which there are sub-portions defined as context subregions (e.g., XSR1, XSR2). In one embodiment, the context nodes organizing space 316", or context space 316" for short, includes context defining primitive nodes (see FIG. 3J) and combination operator nodes (see for example 374.1 of FIG. 3E) including those that define a hybrid combination of a context parameter and a parameter from a non-context other CARS (e.g., keyword space, URL space, etc.). As used herein, a "primitive" is a data structure representing one or more fundamental "symbols" or "codings" where the latter represent a comparatively simple cognitive concept and whereby more complex cognitive concepts can be represented by operator nodes that reference the primitives to build with and from them to arrive at more complex cognitive concepts. For example, one possible and simple concept within context space might be: "This social entity is now operating within his/her normal work hours" and the corresponding coding might be: "Context(t1, p1) includes Time=WithinNormalWorkHours" where t1 is a time range indicating when the context is valid and p1 is a probability factor whose value may indicate that this version of Context is the most probable one (but not necessarily the only likely one). Another primitive construct within context space might represent the concept of: "Today is Wednesday" and the corresponding coding might be: "Context(t1,p1) includes Day=Wednesday". A combination forming, operator may combine the two more primitive codings (primitive representing symbols) to form the more complex concept of: "Today is Wednesday AND this social entity is now operating within his/her normal work hours". The node having that operator in it will then represent that more complex contextual state. Of course, the preceding is merely a simple example and much more complex representations of complex contextual states may be devised with use of primitives and operator nodes that reference to them, as shall be detailed later below. See for example, node 374.1 of FIG. 3E. The term "primitive" as used herein is not to be construed as meaning that the present disclosure does not admit for yet more primitive codings than, for example the exemplary primitive data structure of, say, FIG. 3W (textual cognition representing primitive data structure). Although the concept of a cognition representing primitive is a somewhat simple one, the data structures used to support a communally created and communally updateable one can be more complex as shall become evident below. The definition of "primitive" as used herein does not require communal createability and communal updateability even though such are desirable functionalities herein.

Accordingly, a user's current context can be viewed as an amalgamation of concurrent context primitives and/or temporal sequences of such primitives (e.g., if the user is multitasking and thus jumping back and forth between different contexts). More specifically, a user can be assuming multiple roles at one time where each role has a corresponding one or more activities or performances expected of it and the expressive outputs $E_o(x, t, f, \ldots)$ produced by the user while in each respective contextual state are colored by the respective contextual state. The context primitives aspect of this disclosure will be explained in more detail in conjunction with FIG. 3J. The present FIG. 3D, which is now being described, provides more of a bird's eye view of the system and that bird's eye view will be described first. Various possible details for the data-objects organizing spaces (or "spaces" in short) will be described later below.

Because various semantic spins and/or other cognitive senses can be inferred from the "context" or "contextual state" of the user and can then be attributed for example to each output word 301*w* of FIG. 3D (e.g., "Please"), to each facial configuration (e.g., raised eyebrows, flared nostrils) and/or head gesture (e.g., tilted head) 301*g*, to each internal biometric state that is machine detected (e.g., tongue pressed against instrumented tooth cap), to each sequence of words (e.g., "How about . . . ?") when such a sequence is assembled, to each sequence of mouse clicks, screen taps, gestures or other user-to-machine input activations, and so forth; proper resolution of current user context to one degree of specificity or another can be helpful to the STAN_3 system in determining what semantic spin and/or other cognitive sense(s) is/are more likely to be associated with one or more of the user's energetic input $e_i(x, t, f, \ldots)$ and/or output $E_o(x, t, f, \ldots)$ activities. Proper resolution of current user context can also be helpful to the STAN_3 system in determining which CFi and/or CVi signals are to be grouped (e.g., clustered and/or cross-associated) with one another when parsing received CFi, CVi signal streamlets (e.g., 151*i*2 of FIG. 1F)). A simple example of semantic spin may be one where the user 301A' is giving attentive energies to the expression, "Lincoln". (This example will be played on in yet more detail below.) The more likely semantic spin that is to be attributed by the STAN_3 system to the expression, "Lincoln" depends on what context(s) (signal 316*o*) the system currently assigns to the respective user. The expression, "Lincoln" might refer to Abraham Lincoln, the 16th president of the United States. On the other hand, the same expression, "Lincoln" might refer to a U.S.A. car company founded in 1915 and later acquired by the Ford Motor Company. Yet alternatively, the same expression, "Lincoln" might refer to a city in the State of Nebraska (from which our fictitious football hero, Joe-the-"L"-Bow Throw hails and also from which his lesser known cousin, Tom the "T"-Bow Throw hails—also a fictitious football hero). If the STAN_3 system determines that the user context is that of being a Fifth Grade student doing his/her History homework, that will urge the system into putting a firstly directed, semantic spin on the exemplary expression, "Lincoln". If, on the other hand, the STAN_3 system determines that the user context is that of being a working adult whose 10 year old car is currently giving him/her trouble and the person is thinking of buying a new car, that determined context will urge the system into putting a secondly directed, and different semantic spin on the exemplary expression, "Lincoln". And yet further, if the STAN_3 system determines that the user context is that of being at Ken's house, ready to partake in a Superbowl™ Sunday Party (as described above), that determined context will urge the system into putting a thirdly directed, and yet again different semantic spin on the exemplary expression, "Lincoln". The attributed semantic spin will cause the system to reference respective different clustering areas in primitive expression layers (see for example layer 371 of FIG. 3E) as will be explained later below.

Determination of the semantic/other-sense spin that is to be attributed to various individual and user focused-upon expressions (e.g., "Lincoln") is not limited to the processing of individualized user actions per se (e.g., clicking tapping or otherwise activating user interface means such as hyperlinks, menus, etc.), it may also be used in the clustering together and processing of sequences of user actions. For example, if the user context is determined to be that of the Fifth Grade student doing his/her History homework and the user is detected to also concurrently focus-upon the expression, "war", then the system can logically combine the two and determine the combination to be likely pointing to Abraham Lincoln's involvement with the U.S. Civil War. Once again, this aspect of automatically determining most likely combinations of individual expressions may rely on a pointing to different clustering areas in primitive expression layers (see for example layer 371 of FIG. 3E) as will be explained later below.

Stated more simply here, the machine determined ones of likely context(s) of the user (as represented by a signal 316*o* output from the context determining mechanism 316" of FIG. 3D) are generally combined with the machine detected mouse clickings, screen tappings and/or other activities of the user 301A', where a sequence of such actions may take the user (virtually) through a navigated sequence of content sources (e.g., web pages) and/or the latter may cause the STAN_3 system to model the user as virtually taking a journey (see also unit 489 of FIG. 4D) through a sequence of user virtual "touchings" upon nodes or upon subregions in various system-maintained spaces, including topic space (TS) for example. User actions taken within a corresponding "context" may also cause the STAN_3 system to model the user as being virtually transported through corresponding heat-casting kinds of "touching" journeys (see also 131*a*, 132*a* of FIG. 1E) past topic space nodes or topic space regions (TSR's), and so on. Thus; it is useful for the STAN_3 system to define; in a communal consensus-wise created sense, a context space (Xs) whose data-represented nodes and/or context space regions (XSR's) define in a communal consensus-wise agreed to sense, different kinds of, contextual states that the user may likely enter into in-his/her-mind. The so-identified contextual states of the user, even if they are identified in a "fuzzy" way rather than with more deterministic accuracy or fine resolution can then indicate which of a plurality of pre-specified user profile records 301*p* should be deemed by the system 410 to be the currently active profiles of the user 301A'. The currently deemed to be active profiles 301*p* may then be used to determine in an automated way, what topic nodes or topic space regions (TSR's) in a corresponding defined topic space (Ts) of the system 410 (or more generally which points, nodes or subregions of system-maintained CARSs) are most likely to represent the topics (or other kinds of cognitions) that the user 301A' is most likely to be currently focusing his/her cognition energies upon based on the in-context, machine-detected activities of the user 301A'. Of importance, the apparent "in-his/her-mind contextual states" mentioned here should be differentiated from physical, external contextual states (301*x*) of the user. Examples of physical contextual states (301*x*) of the user can include the user's physical identity (e.g., height, weight, fingerprints, body part dimensions, current body part orientations, etc.), the user's geographic location (e.g., longitude, latitude, altitude, direction faced by the user's face, etc.), the user's physical velocity relative to a predefined frame (where velocity includes speed and direction components), the user's physical acceleration vector and so on. Moreover, the user's physical contextual states (301*x*) may include descriptions of the actual (not virtual) surroundings of the user, for example, indicating that he/she is now physically seated and forward facing in a vehicle having a determinable location, speed, direction and so forth. It is to be understood that although a user's physical contextual states (301*x*) may be one set of states, the user can at the same time have a "perceived" and/or "virtual" set of contextual states that are different from the physical contextual states (301*x*). More specifically, when watching a high quality 3D movie, the user may momentarily perceive that he or she is within the fictional environment of the movie scene although in reality, the user is sitting for example in a darkened movie theater. The "in-his/her-mind contextual states" of the user (e.g., 301A') may include virtual presence in the fictional environment of the movie scene and the latter perception may be one of many possible "perceived" and/or "virtual" set of contextual states defined by the context space (Xs) 316" shown in FIG. 3D.

More generally, and just to summarize the above (and perhaps overly long winded) passages: the user is part of his/her own context. The user's current memories (e.g., recent history) and current state of awareness can be part of his/her context. The user's current physical identity and current physical surroundings and/or the user's current biological states and/or the user's current chronological positioning within time as well as spatial positioning can be part of his/her context and the user's current context. Sensor detectable ones of context-indicating states (which sensor signals are collectively denoted as XP in FIG. 3D and emanate from 301*x*) can impart finer semantic spin and/or other resolution enhancing attributes to current focus indicator signals (CFi's) developed for the given user 301A'. In one embodiment, rather than transmitting raw focus indicator signals (CFi's) to the STAN_3 system, a machine-implemented method automatically transmits context-augmented or context-hybridized focus indicator signals (HyCFi's) to the STAN_3 system. The context-hybridized focus indicator signals (HyCFi's)

may include one or more of context indicating informational signals such as, time of data collection, place of data collection, identification of the user (because the user is his/her own context); identification of other machines and/or social entities in the proximate neighborhood (real or virtual) of the data collecting machine, biometric telemetry collected by user proximate sensors, and so on. Context or context-hybridized focus indicator signals (HyCFi's) may be used to select a user's currently activated profile records (e.g., PEEP, CpCCp, PHAFUEL, etc.).

Context-appropriate selection of the user's currently activated profile records (e.g., PEEP, PHAFUEL, etc.) is an important step. If such selection is repeatedly done incorrectly, it can drive the system into a state of repeatedly picking wrong topic nodes and repeatedly suggesting wrong chat or other forum participation opportunities. In one embodiment, a fail-safe default or checkpoint switching system 301*s* (controlled by module 301*pvp* in FIG. 3D) is employed. A predetermined-to-be-safe set of default or checkpoint profile selections 301*d* is automatically resorted to in place of profile selections indicated by a current, but apparently erroneous, context(s)-guessing output signal 316*o* of the system's context mapping mechanism 316". More specifically, if recent feedback signals (e.g., CVi vote signals) from the user (301A') indicate that invitations (e.g., 102*i* of FIG. 1A), promotional offerings (e.g., 104*t* of FIG. 1A), suggestions (102J2L of FIG. 1N) or other communications (e.g., Hot Alert 115*g*' of FIG. 1N) recently made to the user by the system are meeting with negative reactions from the user (301A'), where such negativity is not the expected reaction, then the system automatically determines that it has probably guessed wrong as to current user context. In other words, if the system provided invitations and/or other suggestions are highly unwelcome, this is probably so because the system 410 has lost track of what the user's current "perceived" and/or "virtual" set of contextual states are. And as a result the system is using an inappropriate one or more profiles (e.g., PEEP, PHAFUEL etc.) and interpreting user signals (e.g., keywords, body language, etc.) incorrectly as a result. In such a case, a switch over to the fail-safe or default set is automatically carried out in response to detection of persistent negative user reactions to system provided invitations and/or other suggestions. The default profile selections 301*d* may be pre-recorded to select a relatively universal or general PEEP profile for the user as opposed to one that is highly dependent on the user being in a specific mood and/or other "Perceived" and/Or "Virtual" (PoV) set of contextual states. Moreover, the default profile selections 301*d* may be pre-recorded to select a relatively universal or general Domain Determining profile for the user as opposed to one that is highly dependent on the user being in a special mood or unusual PoV context state.

Additionally, the default profile selections 301*d* may be pre-recorded to select relatively universal or general chat co-compatibility, PHAFUEL's (personal habits and routines logs, see FIG. 5A), and/or PSDIP's (Personal Social Dynamics Interaction Profiles, see FIG. 5B) as opposed to ones that are highly dependent on the user being in a special mood or unusual PoV context state. In one embodiment, the Conflicts and Errors Resolver module 301*pvp* is coupled to receive physical context representing signals, XP. This physical context representing signals, XP are generated by one or more physical context detecting units 304. (Although not fully shown in FIG. 3D due to space limitations, the physical context detecting unit 304—shown above 298"—is to be understood to be operatively coupled to a user-adjacent GPS unit or the like such that the physical context detecting unit(s) 304 can determine current user position in space and time, current surroundings, and can generate corresponding physical context representing signals, XP for the user. The physical context detecting unit(s) 304 may include cameras, directional microphones and/or other sensing devices for visually or otherwise sensing the user's surrounding environment. The physical context detecting unit(s) 304 may include Wi-Fi™ or other wireless detecting and/or interfacing means for detecting presence of local area networks (LANs) and for interfacing with the same if possible so as to automatically determine what on-network devices are usably proximate to the user 301A'. The physical context representing signals, XP can be used by the Conflicts and Errors Resolver module 301*pvp* for automatically selecting currently activated user profiles (301*p*) that correspond to the current physical surroundings (301*x*) of the user. Once the fail safe (e.g., default) profiles 301*d* have been activated as the current profiles of the user, the system may begin to try to home in again on more definitive determinations of current state of mind for the user (e.g., top 5 now topics, most likely context states, etc.). The fail-safe mechanism 301*s*/301*d* (plus the module 301*pvp* which module controls switches 301*s*) automatically prevents the context-determining subsystem of the STAN_3 system 410 from falling into an erroneous pit or an erroneous chaotic state from which it cannot then escape from.

In one embodiment, in addition to the physical context detecting unit(s) 304, the system includes a proximate resources identifying unit 306 (shown next to 314" in FIG. 3D). The proximate resources identifying unit 306 may be configured for detecting and identifying machine resources that are proximate to the user (and thus potentially usable by the user 301A') but which proximate resources may not at the time be powered up or operatively coupled to a network such that their presence can be detected by means of scanning a local network for presence of nearby online, on-network devices. In terms of a more specific example, one possible proximate resource may be a video teleconferencing station that is not currently turned on, but could be turned on by the user 301A' (or could be remotely turned on by the STAN_3 system) so that the respective user can then engage in a live video web conference with use of the currently turned-off station. It is envisaged here that numerous, user-proximate resources can be tagged with bar code labels (e.g., including those coded with non-visible indicia such as those that fluoresce when excited by UV rays and/or are discernable in the IR band) and/or RFID tags that can be scanned by the proximate resources identifying unit 306 and identified even though those proximate resources are not currently turned on. Then the identified proximate resources can be activated remotely or manually so that they can be used. The types of chat or other forum participation opportunities presented to the respective user 301A' by the STAN_3 system may accordingly be based not only on what already-online resources are determined by the system to be turned on and thus immediately available to the user but also based on what currently off-line (e.g., powered off) resources are determined by the system to be proximate to the user and thus perhaps available (once turned on and/or operatively coupled to a network) for use by the user when engaging in a chat or other forum participation session. Aside from video teleconferencing stations, other proximate resources that may be of value for enhancing user enjoyment of services provided by the STAN_3 system may include, but are not limited to, 3D display units, large screen, high definition display units, high fidelity sound reproduction units, haptic feedback providing units, robotic units, performance enhancement units that can enable or enhance a performance (e.g., music creation) the user may wish to engage in and so on. In accordance with one aspect of the present disclosure, the proximate resources identifying unit 306 automatically scans the user's nearby surroundings and detects potentially usable proximate resources and sends the identifications of these to the head end (e.g., cloud) of the STAN_3 system. In response, the STAN_3 system may automatically by itself, turn on and/or otherwise activate a selected one or more of the proximate resources or suggest to the user 301A' that he/she activate the one or more proximate resources so as to thereby take advantage of their capabilities when interacting with the STAN_3 system and/or other STAN users. In one embodiment, the offline proximate resources detected and identified by the proximate resources identifying unit 306 are included in the descriptions of surrounding physical context (XP) reported to the STAN_3 system by the physical context detecting unit 304. In other words, the proximate resources identifying unit 306 may be an integral part of the physical context XP detected by the physical context detecting unit 304.

In one embodiment, the physical context determining devices (e.g., 304, 306) that are proximate to the user 301A' may include means for automatically recognizing non-instrumented objects, such as for example, conventional pots, pans, plates, cups, silverware, etc. and for recognizing movement of such non-instrumented objects and sequence of movement of such objects, where the physical context determining devices are configured for reporting to the system core (e.g., the cloud) the presence and/or movement and/or order of movement of such non-instrumented objects as defining part of the physical surroundings context of, and/or activities of the user 301A'. Therefore, and as an example, the user is seated in front of his smartphone camera and the camera captures automatically recognizable images of plates, spoons, forks, cups moving in the background behind the user, the system core (e.g., cloud) may use these background captured image portions to automatically determine that perhaps the user is in a restaurant (or cafeteria, meeting hall, etc.) and is surrounded by other people who are consuming meal courses in a discernable sequence based on the order of use of their utensils. It may then be inferred by the system that the user is doing the same (mirroring the behavior of the others) at substantially the same times. Such information may be used for automatically determining a behavioral context in which the user is surrounded and/or engaged in.

Assuming that, when the user's local machine systems are initially activated, there is no specific and refined context yet established by the STAN_3 system for the respective user, and assuming further that the default profiles state 301*d* for the user 301A' have been instead used for establishing during system initialization or during a user PoV state reset operation, then after this initialization process completes, switch 301*s* is automatically flipped into its normal mode wherein the current context indicating signals 316*o*, produced and output from the context space mapping mechanism (Xs) 316" are used for determining which next user profiles 301*p* (beyond the relatively vague default ones) will become the new, currently active profiles of the user 301A'. It should be recalled that profiles can have knowledge base rules (KBR's) embedded in them (e.g., 599 of FIG. 5A) and those rules may also urge switching to yet other alternate profiles, or to yet further alternate contexts based on unique circumstances that the knowledge base rules (KBR's) are custom tailored to address (e.g., by addressing pre-specified exceptions to more general rules). In accordance with one embodiment, a weighted voting mechanism (not shown and understood to be inside module 301*pvp*) is used to automatically arrive at a profile selecting decision when the current context guessing signals 316*o* output by mechanism 316" conflict with knowledge base rule (KBR) decisions of currently active profiles that regard the next PoV context state that is to be assumed for the user. The weighted voting mechanism (disposed inside the Conflicts and Errors Resolver 301*pvp*) may decide to not switch at all in the face of a detected conflict as to next context state or it may decide to side with the profile selection choice of one or the other of the context guessing signals 316*o* and the conflicting knowledge base rules subsystem (see FIGS. 5A and 5B for example where KBR's thereof can suggest a next context state that is to be assumed). It is to be noted that the Conflicts and Errors Resolver module 301*pvp* is coupled to receive the physical context representing signal, XP and thus module 301*pvp* is generally aware at least of the user's current physical disposition if not of the user's current mental disposition and the Conflicts and Errors Resolver 301*pvp* can therefore resolve conflicts on the basis of what is known about the user's currently detected physical disposition (XP).

It is to be also noted here that interactions between the knowledge base rules (KBR's) subsystem and the current context defining output signals 316*o* of the context mapping mechanism 316" can synergistically complement each other rather than conflicting with one another. The Conflicts and Errors Resolver module 301*pvp* is there for the rare occasions where conflict does arise and a fall back is made to relying on current physical context (XP) and associated safe profiles. However, a more common situation can be that where the current context defining output, 316*o* of context mapping mechanism 316" is used by the knowledge base rules (KBR's) subsystem to determine a next-to-be active, and more context-appropriate profile. For example, one of the knowledge base rules (KBR's) within a currently active profile may read as follows: "IF The Current Most Probable Context(s) Determining signals 316*o* include an active pointer to context space subregion XSR2 (a subregion determined by the system to be likely for the user) THEN Switch to PEEP profile number PEEP5.7 as being the currently active PEEP profile, and also Switch to CpCCp profile number PHood5.9 as being the currently active personhood profile, ELSE . . . ". In such a case therefore, the output 316*o* of the context mapping mechanism 316" is supplying the knowledge base rules (KBR's) subsystem with input signals that the latter calls for as its input parameters and the two systems synergistically complement each other rather than conflicting with one another. The dependency may flow the other way incidentally, wherein the context mapping mechanism 316" uses an output signal produced by a context resolving KBR algorithm embedded within a currently activated profile, where for example such a KBR algorithm may read as follows: "IF Current PHAFUEL profile is number PHA6.8 THEN exclude context subregion XSR3 as being likely, ELSE . . . " Accordingly, such a profile-dependent KBR algorithm portion thereby controls how other, next activated profiles will be selected or not. In-profile knowledge base rules (KBR's) and/or other knowledge base rules used by the context mapping mechanism 316" may rely on the current physical context signal (XP) as an alternative to, or in addition to relying on the current user context defining output signal, 316*o* of the context mapping mechanism 316". More specifically, one of the knowledge base rules (KBR's) within a currently active profile may read as follows: "IF Current Physical Context signal XP indicates that the user (301A') is at his workplace site and indicates that time is normal work hours and today is Wednesday, THEN Switch to PEEP profile number PEEP5.8 as being the currently active PEEP profile, ELSE . . . ".

From the above, it can be seen that, in accordance with one aspect of the present disclosure, context guessing signals

316*o* (which signals often represent the apparent mental or perceived context(s) of greatest likelihood(s) for the user 301A' rather than merely physical context 301*x*) are produced and output from a context space mapping mechanism (Xs) 316" which mechanism (Xs) is schematically shown in FIG. 3D as having an upper input plane through which context indicative input signals 316*v* (categorized CFi's 311' plus optional others, as will be detailed below) project down into an inverted-pyramid-like hierarchical structure and these input signals are used to better focus-upon or triangulate around subregions within that represented context space (316") so as to produce better (more refined) determinations of active "perceived" and/or "virtual" (PoV) contextual states (a.k.a. context space region(s), subregions (XSR's) and nodes) of a respective user (301A'). The term "triangulating" is used here-at in a loose sense for lack of better terminology. It does not have to imply three linear vectors pointing into a hierarchical space and to a subregion or node located at an intersection point of the three linear vectors. (In a better sense it may imply that three or more cross-correlated cognitive nuggets (e.g., keywords) have been grouped together as belonging to each other and collectively indicating one context subregion as being more likely than another. But that is an understanding best left for discussion further below.) Crossing vectors and "triangulation" is one metaphorical way of understanding what happens except that such a metaphorical view chronologically pre-supposes the existence of the output 316*o* of subsystem 316" ahead of its earlier in time inputs. The signals that are inputted into the illustrated mapping mechanism 316" (but this can also apply to others of the illustrated mapping mechanisms, e.g., 312" 313", etc. of FIG. 3D) are more correctly described as including one or more of pre-grouped, pre-clustered and "pre-categorized" CFi's and CFi complexes (e.g., hybridized HyCFi signals and/or clusters of clusters) and/or one or more of physical context state descriptor signals (301*x*', which may include the current physical context signal XP) and/or algorithmic guidance signals (e.g., KBR guidances) 301*p*' provided by then active user profiles. Best guess fits are then found as between the various input vector signals (e.g., 316*v*, which latter signal can include signals 301*x*', 301*p*' and a below described 311' signal) and corresponding points, nodes or subregions within the context space defined by the context mapping mechanism 316" in response to these various input vector signals being applied to the respective mapping mechanisms (e.g., 316") of FIG. 3D. In other words, specific points, regions, subregions or nodes are found within the respective mapping mechanisms that best cross-correlate or most suitably fit with the then received input vector signals (e.g., 316*v*). The result of such automated, best guess fittings or cross-correlation is that a "triangulation" of sorts develops around one or more regions (e.g., XSR1, XSR2) or points or nodes within the respective mapping mechanisms (e.g., 316") and the uncertainty or nonconfidence about the best-fit subregions tends to shrink as the number of differentiating ones of "pre-categorized" CFi's, hybridized HyCFi's, and clusters of clusters of such or the like increase and cross-confirm with the most likely contexts guessed at by mechanism 316". In hindsight, the input vector signals (e.g., 316*v*) may be thought of as having operated sort of like fuzzy pointing beams or "fuzzy" pointer vectors 316*v* that homed in on the one or more regions (e.g., XSR1, XSR2) in accordance with a metaphorical "triangulation" although in actuality the vector signals 316*v* did not point there. Instead the automated, best guess fitting algorithms of the particular mapping mechanisms (e.g., 316") made it seem in hindsight as if the vector signals 316*v* had pointed there.

A more specific example of how a user's current mental or perceived context (as represented by result signal 316*o*) may be developed is as follows. Suppose that the physical context detecting unit 304 reports to mapping mechanism 316" (by way of the XP signal) that user 310A' is physically located at address 21771 Stanley Creek Blvd., Cupertino Calif. (a hypothetical example) and the day of week for that user is Wednesday and the time of day is 10:00 AM and the biological states of the user include being awake (e.g., not asleep) and alert (e.g., not groggy). Assume that, at that instant, the system is basically using a generic (e.g., like 301*d*) rather than context-based set of profiles for the user. However, in response to the GPS data and the biological state data, one or more of numerous software modules in mapping mechanism 316" fetches more up to date and currently activated and personalized and pre-specified profile records (e.g., PHAFUEL and CpCCp (the personhood demographic profile) of the specific user and from these, the software module(s) automatically determine that, in all likelihood, the user is at his/her workplace (e.g., based on habits and routines for location and time) and that the user is likely to be perceiving him/herself as being in a normal employee role (e.g., Senior Software Design Engineer—again, a hypothetical example). Additionally, suppose the one or more of numerous software modules in mapping mechanism 316" next responsively fetch data from a currently activated workplace calendaring tool (e.g., Microsoft Office™) of the user where the automatically fetched calendaring data indicates that the user (301A') is scheduled to work on a so-called, STAN-Development-Project-3D (a hypothetical example) at this time of the current work day and week within the current month. In response to this fetched information and as yet a next step in the context-refining process, the one or more software modules in mapping mechanism 316" send instructions, by way of current output signals 316*o* which connect to and drive unit 301*p*, to thereby cause unit 301*p* to activate a specific and more context-appropriate PEEP profile for the user and specific topic domain specifying profiles (DsCCP) that relate more closely to the scheduled STAN-Development-Project-3D. As a consequence, the profiles-produced, decision-guiding input vector signal 301*p*' (which feeds from unit 301*p* into the formation of input vector signal 316*v*) points to a more specific subregion within context space 316" and the current context representing signal 316*o* is updated to reflects this for the corresponding user 301A'. As part of the feedback loop, the produced context representing signal 316*o* is next used by unit 301*p* to perhaps pick yet another combination of user profiles.

In one embodiment, after new context defining signals 316*o* are produced (signals representing the one or top n best guesses as to current user context(s)) the system next causes automatic loading of context-appropriate web content (e.g., 117 of FIG. 1A) or the like onto the information presenting devices (e.g., screen 111) of the user. In other words, once the user context is automatically guessed at by the STAN_3 system, the system automatically presents what it considers to be context-appropriate presentations (e.g., content and/or invitations) to the user 301A'. Subsequent CFi signals received from the corresponding user (301A') in response to the newly presented content (and/or invitations) will next be interpreted in light of this more refined context determination (as represented by the updated 316*o* signal). If the user subsequently expresses satisfaction with the supposedly on-topic invitations and/or suggestions and/or content presentations made to him/her on the basis of this state, the STAN_3 system interprets such positive voting (implicit or explicit) as a reinforcing feedback for its neural net and/or other forms of adaptive and self-correcting modeling of the user. If the user expresses dissatisfaction (by way of unexpected negative CVi's), then the STAN_3 system interprets such negative voting as constituting a detracting feedback for its neural net and/or other form of adaptive and self-corrective modeling of the user and the system then adjusts ("learns") accordingly so as to reduce the frequency of reoccurrence of such error. Strong and prolonged dissatisfaction beyond a predetermined threshold leads to reloading of the default profiles **301*d*** and starting over afresh as described above.

The above example illustrated a case where one or more current contexts of the user (301A'), as represented by context(s) indicating signal **316*o*, are refined and resolved by starting with a relatively coarse determination or guess of context (e.g., alive, awake, alert and at this location) and then narrowing the machine-generated result to a finer determination of more likely context(s) (e.g., in work mode and working on specific project). It is to be appreciated that, just like the having of a large number of less "fuzzy" and more informative pointer vectors 316*v* (vector signals 316*v*) generally helps the system to metaphorically home in or resolve down to more narrow and well bounded context states or context space subregions of smaller hierarchical scope near the base (upper surface) of the inverted pyramid; conversely, as the number of context-differentiating, input vector signals (e.g., 316*v*) and the information in them decreases, the tendency is for the resolving power of the metaphorical "fuzzy" pointer vectors to decrease whereby, in hindsight, it appears as if the comparatively more "fuzzy" pointer vectors 316*v* were pointing to and resolving around only coarser (less hierarchically refined) nodes and/or coarser subregions of the respective mapping mechanism space (CARS, e.g., 316"), where those coarser nodes and/or subregions are conceptually located near the more "coarsely-resolved" apex portion of the inverted hierarchical pyramids (which represent the respective CARS) rather than near the more "finely-resolved" base layers of the corresponding inverted hierarchical pyramids depicted in FIG. 3**D. In other words, cruder (coarser, less refined, poorer resolution) determinations of current context space region(s) (XSR's) likely to be representative of the user's context are usually had when the metaphorical projection beams of the supplied current focus indicator signals (e.g., the raw CFi's) point to hierarchically-speaking; broader regions or domains disposed near the apex (bottom point) of the inverted pyramid (e.g., where such a coarse context indicative signal might merely say the user is alive and at a location having no known significance in his/her currently activated profiles). On the other hand, finer (higher resolution) determinations are usually had when the metaphorical projection beams are comparatively more informative and thus "triangulate" (so to speak) around hierarchically-speaking; finer regions or domains disposed nearer the base of the inverted pyramid (e.g., due to collection of context indicative signals that more informatively says the user is not only alive, but is also respectively spatially and chronologically disposed at a location that does have a known significance in his/her currently activated profiles—i.e. this is where he/she works—and at a time that does have a known significance in his/her currently activate profiles—i.e. this is the time when; according to the user's PHAFUEL record, he/she usually works on the task known as STAN-Development-Project-3D).

The above example was a simple one based on a GPS reporting of a single location (e.g., 21771 Stanley Creek Blvd., Cupertino Calif.—a hypothetical example) for the user and on a single point in time (e.g., Wednesday, 10:00 AM) for the user. However, it is within the contemplation of the present disclosure to determine the top n most likely user context(s) (where n=1, 2, 3, . . . here) based on a sequence of significant events (optionally interrupted by a sequence of none or insignificant events) such as for example, the user's GPS and/or other locater device reporting the user as hopping from one spatial location to another (in real and/or virtual world) with this occurring at respective times of day, week, month etc. (in real or virtual world time). The user's activated PHAFUEL record (habits and routines—see FIG. 5A) may then inform as to a likely specific context based on such a sequence of events and the STAN_3 system uses this additional information for automatically determining user context to a finer degree of resolution. Additionally, the user's then activated Personhood profile (a.k.a. PHood profile or CpCCp profile—see giF. 1B of the STAN-1 application incorporated here by reference) may include in a demographics portion thereof, various cross-associations as between individualized data points (e.g., street addresses, dates during the calendar year, etc.) and more generalized or normalized contextual significances such as, but not limited to, "This is my Date of Birth", "This is my Place of Birth", "This is my Wedding Anniversary Date", "This is my Primary workplace Address", and so on. These individual-to-normalized-information data pairs may be used to inform as to a likely specific context in a consensus-wise normalized and communal context space while inputting the specific recent dates or events or visited places, as well as those planned for the near future for the specific user (301A'). By way of example, if the current week is a week containing the user's 25th wedding anniversary and the user has a "special" restaurant reservation in his/her electronic calendar for the special date, then a received reminder email saying for example, "call restaurant to confirm" in its subject line can have context-augmenting data automatically attached to it by the STAN_3 system indicating that more likely than not, the ambiguous keyword, "restaurant" means, at least this week; the restaurant of the "special" restaurant reservation where the user plans to celebrate the user's 25th wedding anniversary. This is just one example of how resolved user context can be used to better inform the STAN_3 system as to probable semantic intents of ambiguous CFi's (e.g., ambiguous keywords, ambiguous URL's—those specifying only a portal page, and so on).

As explained above, the input vector signals (e.g., **316*v* being input into context mapping mechanism 316") are not actually "fuzzy" pointer vectors that of themselves point to a specific point, node or subregion in the mapped Cognitive Attention Receiving Space (e.g., context space 316") because the results (e.g., context(s) representing output signal 316*o*) arising from their being inputted into the corresponding mapping mechanism (e.g., 316") are usually not known until after the mapping mechanism (e.g., 316") has processed the supplied input vector signals (e.g., 316*v*) in combination with other available information (e.g., currently activated profiles) and has responsively generated newer or updated state signals (e.g., new top n most likely contexts as represented by context representing signal 316*o*) which then in turn may help to identify the more appropriate user profiles and the better fitting or more appropriate points, nodes or subregions in other, cross-associated Cognitive Attention Receiving Spaces such as topic space for example to which yet newer CFi's (next received CFi's) may apply. In one embodiment, the output signals (e.g., 316*o*) of each, "user-is-likely-here" mapping mechanism (e.g., context mapping mechanism 316") are output as a sorted list that provides ranked identifications of the best fitted-to and more hierarchically refined internal points, nodes and/or subregions in that space (e.g., at the top of the list and with regard to context space for example) and that also provides ranked identifications of the more poorly fitted-to and less hierarchically refined internal points, nodes and/or subregions as last (e.g., at the bottom of the list and again with regard to context space for example). The outputted resolving signals (e.g., 316***o*) may also include indications of how well or poorly the internal resolution process executed (e.g., with what level of confidence). If the resolution process is indicated to have executed more poorly than a predetermined acceptable level, and as a result confidence in the results is poor; the STAN_3 system 410 may elect to not generate any invitations (and/or promotional offerings) on the basis of the subpar resolution of, or confidence in the current context determination and/or in the current other focused-upon points, nodes and/or subregions within the corresponding other spaces (e.g., topic space (Ts, 313"), keyword space, URL space, social dynamics space and so on).

The input vector signals (e.g., 316*v*) that are supplied to the various nodes-mapping and space maintaining mechanisms (e.g., to context space 316", to topic space 313", etc.) as briefly noted above can include various context resolving signals obtained from one or more of a plurality of context indicating signals, such as but not limited to: (1) "pre-clustered" or "pre-categorized" or "pre-cross-associated" first CFi signals 3020 produced by, and stored in, a first CFi clustering/categorizing-mechanism 302" (shown in FIG. 3D as being one of an adjacent pair of pyramids), (2) pre-clustered/categorized second CFi signals 2980 produced by, and stored in, a second CFi categorizing-mechanism (298"), (3) physical context indicating signals 301*x*' (representing biological states and physical surrounds) derived from sensors that sense physical surroundings and/or physical states XP of the user where unit 304 is representative of sensors that pick up physical surroundings indications and generate corresponding state signals XP such as obtained from a user-carried GPS device for example, and (4) context indicating or suggesting signals 301*p*' obtained from currently active profiles 301*p* of the user 301A' (e.g., from executing KBR's within those currently active profiles 301*p*). This aspect is represented in FIG. 3D by the illustrated signal feeds going into input port 316*v* of the context mapping mechanism 316". However, to avoid illustrative clutter, this aspect (regarding multiple input feeds) is understood to occur for, but is not illustratively repeated for others of the illustrated mapping mechanisms including: topic space 313", content source space 314", emotional/behavioral states space 315", the social dynamics subspace represented by inverted pyramid 312" and other state defining spaces (e.g., pure and hybrid spaces) as are also represented by inverted pyramid 312".

While not shown in the drawings for all the various and possible mapping mechanisms, it is to be observed that in general, each mapping mechanism 312"-316" produces a respective mapped results output signal (e.g., 312*o*) which represents mapping results (also denoted as 312*o* for example) generated internally within that respective mapping mechanism (inside the pyramid). The respective mapped results output signal (e.g., 312*o*, 313*o*, 316*o*, etc.) can define a sorted list of ranked identifications of internal points, nodes and/or subregions within the represented space of the respective mapping mechanism (e.g., 312", 313", 316", etc.) where those identified internal parts which are deemed most likely for a given time period (e.g., "Now") are ranked highest to thereby indicate which focused upon cognitions of the respective social entity (e.g., STAN user 301A') with regard to attributes (e.g., topics, context, keywords, etc.) that are categorized within that mapped space are comparatively more or less likely. More specifically, one of the energy-consuming cognitions that a STAN user may consciously or subconsciously have (or not) can be those revolving around the question of what "topic" or "topics" best describe content being currently focused-upon by the user and being thought about by the user under a user-assumed (picked) context. More to the point, if the currently focused-upon content contains the text, "Joe-the-Throw Nebraska" (using the hypothetical Superbowl™ Sunday Party example of above), that alone may not indicate a specific topic being cross-associated in the user's mind with the hypothetical celebrity's name. The topic could be, what book does Joe recommend to his Twitter™ followers? The topic could be, what food does Joe like to eat; or it could pertain to the current state of Joe's health. And so on. A recent heat map history of where the specific STAN user (e.g., 301A') has been recently casting a predominant amounts of his/her attention giving energies may give hints, clues and best guess answers as to which topic node(s) in system-maintained topic space is/are the more likely one(s). More specifically, if the user has been inputting health-related keywords into his utilized search engine, that may help to narrow the likely topic(s) to that or those dealing with the combination of "Joe-the-Throw's" identity and Joe's health.

It is to be understood that sometimes there is no specific "topic" yet emerged in the user's conscious or subconscious mind and instead the user is casting attention giving energies on merely a keyword or keyphrase (where herein and in the context of the disclosure of invention, the term "keyword" is to be understood as encompassing the concept of phrases or other combinations or sequences of text and/or sounds rather than merely one word taken at a time) that a user would input into a respective search engine for the purpose of retrieve corresponding search results. The user could instead be casting attention giving energies on merely a scent or a feeling. As explained above, in accordance with one aspect of the present disclosure, users of the STAN_3 system may be brought into an online and/or a real life (ReL) joinder with other users on the basis of shared cognitions or experiences including on the basis of non-topical and/or non-textual shared cognitions where the mapped cognitions of the respective users are deemed by the system to be substantially same or similar based on relative hierarchical and/or spatial distances within corresponding Cognitions-representing Spaces.

The "triangulation" wise identified points, nodes or subregions of a CFi and XP driven mapping mechanism (e.g., 302", 312", 313", 316" of FIG. 3D) will often have node-to-forums links that point to chat or other forum participation opportunities that are cross-associated with that mapped-to node, or they will have node-to-social entity/-ies links that point to one or more social entities who are cross-associated with that mapped-to node. Accordingly, when the respective mapping mechanism result signals (e.g., 312*o*, 313*o*) output by a given one or more mapping mechanisms (e.g., 312", 313") correspond to specific internal nodes (or points, or subregions) of the signal outputting mechanism, such result signals (e.g., 312*o*, 313*o*) will also indirectly correspond to specific social entities (e.g., identified other STAN users who are co-mapped into substantially same or similar regions of the same CARS) and/or to predefined time durations and/or predefined locations that also indirectly cross-correlate with the CFi signals and/or the XP signals collected from a first user (e.g., 301A'). Therefore the result signals (e.g., 312*o*) can be used to provide identification information (e.g., User-ID's, Group ID's, chat room ID's, other Forum ID's, etc.) that ultimately lead to online and/or real life (ReL) joinder as between system users and on the basis of shared cognitions or experiences that are deemed by the STAN_3 system to be substantially same or similar, where such joinders may be made on the basis of non-topical and/or non-textual shared cognitions as well as topical and/or textual cognitions that take place in identified subregions of the space and time continuum.

As a more specific example, user 301A' may be interested in locating other system users who were located in a particular geographic region (e.g., California, USA) and who focused their attention giving activities upon a specific one or more subregions of topic space (313") while also operating in a specific context (e.g., "at work") where this occurred in a specified time zone (e.g., last month). The various Cognitive Attention Receiving Spaces maintained by the STAN_3 system (not all shown in FIG. 3D) can be used in a cross cooperating manner to produce such a desired identification of other users. While not shown in FIG. 3D, the present disclosure contemplates the inclusion of one or more location "spaces" (e.g., geography mapping mechanisms) and one or more chronological "spaces" (e.g., history mapping mechanisms) among the numerous, system-maintained Cognitive Attention Receiving Spaces.

One of the system-maintained location "spaces" is a real life (ReL) geography mapping mechanism whose points, nodes and/or subregions cross-correlate with real life locations on the basis of a variety of designations including but not limited to, GPS coordinates; latitude, longitude, altitude coordinates; street map coordinates (e.g., postal address and street name) and so on. A user's personhood profile (e.g., CpCCp) may include logical links pointing into the system-maintained ReL geography mapping mechanism (not shown) and identifying parts thereof as being the user's "normal work place", "normal place of residence" (a.k.a. "home") and so on. The combination of the user's currently activated personhood profile (e.g., CpCCp) and the system-maintained ReL geography mapping mechanism (not shown) then provides a ReL location-to-context mapping. Such mapping may include use of knowledge base rules (KBR's). For example: IF Month=June-August THEN Home=GPScoords(x1,y1,z1) ELSE Home=GPScoords(x2,y2,z2). The system's context space mapping mechanism 316" does not contain specific information about most users' home address, workplace address, etc.; but instead refers abstractly to such context-oriented items as, for example, Primary Home, Secondary Home, etc. The reason is because the system's context space mapping mechanism 316" is used as a collectively shared resource among many users and not as an individualized resource. This will become clearer when FIG. 3R is described. In one embodiment, the user can section off his personhood profile (e.g., CpCCp, see giF. 1B of the STAN-1 application) into private and shareable demographics information sections where the private demographics information is blocked from being used by the STAN_3 system for routine context determination steps but may be used in special situations the user pre-agrees to. In one embodiment, the user may deploy knowledge base rules (KBR's) for determining when and to what extent his/her individualized demographics information can be used by specific ones of modules of the STAN_3 system, including by automated context determining modules of the STAN_3 system.

While real life (ReL) location is one type of spatial location that can be mapped and tracked by the STAN_3 system, it is within also within the contemplation of the present disclosure to similarly map virtual life (e.g., SecondLife™) locations, except with a separate mapping mechanism dedicated to a respective virtual life support platform.

Real life (ReL) time durations (e.g., this week, this day, this hour; last month, etc.) are similarly mapped in a system-maintained ReL time mapping mechanism (not shown). Each user's personhood profile (e.g., CpCCp) may include logical links pointing into the system-maintained ReL time mapping mechanism (not shown) and identifying parts thereof as being the user's "normal work week", "normal time at home" and so on. The combination of the user's currently activated personhood profile (e.g., CpCCp, in its user Demographics section) and the system-maintained ReL time mapping mechanism (not shown) then provides a ReL time-to-context mapping. Such mapping may include use of knowledge base rules (KBR's). For example: IF Month=June-August THEN "Normal Work Week"=None ELSE "Normal Work Week"=Monday/9:00 AM to Friday/5:00 PM. The system's context space mapping mechanism 316" does not contain specific information about most users' normal work hours, normal vacation time, etc.; but instead refers abstractly to such context-oriented items as, for example, "Normal Work Week", "Normal Vacation Time", etc. Once again, the reason for this is because the system's context space mapping mechanism 316" is used as a collectively shared resource among many users and not as an individualized resource. This aspect will become clearer when FIG. 3R is described.

While real life (ReL) time periods is one type of chronological location that can be mapped and tracked by the STAN_3 system, it is within also within the contemplation of the present disclosure to similarly map virtual life (e.g., SecondLife™) chronological locations, except with a separate mapping mechanism dedicated to each respective virtual life support platform. Accordingly interactions between virtual personas or between real and virtual personas can be specified for purpose of creating chat or other forum participation opportunities just as interactions just between real life (ReL) persons can be tracked.

When an individual user's CFi signals (and/or other signals like CVi's and HyCFi's) upload into the STAN system cloud (and/or other support platform), they generally have "normalizing" data added to them or substituted for them so that they can better match with consensus-wise defined, communal cognitions and/or communal expressions. More specifically, if the uploading CFi's of user 301A' (FIG. 3D) basically say: "I am at geographic location, 21771 Stanley Creek Blvd., Cupertino Calif. and my current time is Wednesday, 10:00 AM", that data is translated into "normalized" (less individualized, more communally understandable data) that instead basically says: "I am at the geographic location which is my "Normal Work Place" (a.k.a. "at work") and my current time is "Normal Work Hours". This normalized input data may then "triangulate" on a subregion of the context space (316") which is directed to more specific context definitions dealing with being at the work place during normal work hours. For example, a more refined context specification may also add that the user has adopted a particular job role (e.g., Senior Software Design Engineer—a hypothetical example).

At this point in the discussion, an important observation that was made above is again repeated with slightly different wording. The user (e.g., 301A') is part of his/her own context(s) from under which his or her various attention giving actions emanate and that/those individualized context(s) may be mapped to corresponding, communally understandable (e.g., more generalized) contexts that populate a communally created and communally updated context space (XS). More specifically, the user's currently "perceived" and/or "virtual" (PoV) set of contextual states (what is activated in his or her mind) is part of the individualized context from under which that user's actions emanate. So if the user is thinking to him/herself, "I am currently taking on the role of Senior Software Design Engineer" that is part of that user's overall and individually-adopted context. Often, the user's current physical surroundings (location, furniture, operational data processing devices, etc.) and/or body states (collectively denoted as 301*x*) are part of the perceived context from under which the individual user's actions emanate. The user's current physical surroundings and/or current body states (301*x*) can be sensed by various sensors, including but not limited to, sensors that sense, discern and/or measure: (1) current location and time (in real life (ReL) and/or in a virtual world that the user is participating within; (2) surrounding images and their locations relative to the user, (3) surrounding sounds and their locations relative to the user, (4) surrounding physical odors or chemicals, (5) presence of nearby other persons (not shown in FIG. 3D; real and/or virtual) and their locations relative to the user, (6) presence of nearby electronic devices and their current settings and/or states (e.g., on/off, tuned to what channel, button activated, etc.) as well as their locations relative to the user, (7) presence of nearby buildings, structures, vehicles, natural objects, etc. as well as their locations relative to the user; and (8) orientations and movements of various body parts of the user including his/her head, eyes, shoulders, hands, etc. Any one or more of these various contextual attributes can help to add additional semantic spin and/or other types of cognitive flavorings to otherwise ambiguous words (e.g., 301*w*), facial gestures (e.g., 301*g*), body orientations, gestures (e.g., blink, nod) and/or device actuations (e.g., mouse clicks, finger taps, etc.) emanating from the user 310A'. Interpretation of ambiguous or "fuzzy" user expressions (301*w*, 301*g*, etc.) can be augmented by lookup tables (LUTs, see 301*q* of FIG. 3D) and/or knowledge base rules (KBR's) made available within the currently active and individualized profiles 301*p* of the user as well as by inclusion in the lookup and/or KBR processes of dependence on the current physical surrounds and states 301*x* of the user. Since the currently active profiles 301*p* are selected by the context indicating output signals 316*o* of context mapping mechanism 316" and since the currently active profiles 301*p* also provide context-hinting clue signals 301*p*' as next inputs into the context (316") and/or various other mapping mechanisms (e.g., 312", 313", 315", etc.), a feedback loop is created (where the feedback system's states should converge on a more refined contextual state and/or more refined other state of the user 301A') whereby the progressively better-selected profiles 301*p* drive the context mapping mechanism 316" (for example) and the latter contributes to selection of the next to be activated and yet better-selected profiles.

The feedback loop is not an entirely closed and isolated one because the real physical surroundings and state indicating signals 301*x*' (which include the XP signal) of the user are included in the input vector signals (e.g., 316*v*) that are supplied to the context mapping mechanism 316". Thus context is usually not determined purely due to guessing about the currently activated (e.g., lit up in an fMRI sense) internal mind states (PoV's, a.k.a. "perceived" and/or "virtual" set of contextual states) of the individual user 301A' based on previously guessed-at mind states but rather also on the basis of surrounding reality. The real physical surrounding context signals 301*x*' (a.k.a. the XP signals) of the user are grounded in physical reality (e.g., What are the current GPS coordinates of the user? What non-mobile devices is he proximate to? What other persons is he proximate to? What is their currently determined context? What biometric data is currently being collected from the user? and so on) and thus the output signals 316*o* of the context mapping mechanism 316" are generally prevented from running amuck into purely fantasy-based determinations of the likely current mind set of the user. Moreover, fresh and newly received CFi signals (302*e*' and 298*e*') are repeatedly being admixed into the input vector signals 316*v*. Thus the profiles-to-context space feedback loop is not free to operate in a completely unbounded and fantasy-based manner but instead keeps being re-grounded with surrounding physical realities.

With that said, it may still be possible for the context mapping mechanism 316" to nonetheless output context representing signals 316*o* that make no sense (because they point to or imply untenable nodes or subregions in other spaces as shall be explained below). In accordance with one aspect of the present disclosure and in an embodiment, the conflicts and errors resolving module 301*pvp* automatically detects such untenable conditions and in response to the same, automatically forces a reversion to use of the default set of safe profiles 301*d*. In that case, the context mapping mechanism 316" "learns" that its previous context-determining steps were erroneous ones and adaptively alters its neural net and/or other trainable modeling parts and then restarts from a safe broad definition of current user profile states and then tries to narrow the definition of current user context to one or more, smaller, finer subregions (e.g., XSR1 and/or XSR2) in the communally created and communally updated context space (XS) as new CFi signals 302*e*', 298*e*' are received and processed by CFi categorizing-mechanisms 302" and 298" and then processed by the context mapping mechanism 316" as well as other such mapping mechanisms (e.g., 313", 314" etc.) included within the STAN_3 system.

It will now be explained in yet more detail how input vector signals (like 316*v*) for the mapping mechanisms (e.g., 316", 313", etc.) are generated from raw CFi signals and the like. There are at least two different kinds of energetic activities the user (301A' of FIG. 3D) can be engaged in. One is energetic paying of attention to user-receivable inputs (298'). The other is energetic outputting of user produced signals 302' (e.g., mouse click or screen tap streams, intentionally communicative head nods and facial expressions—i.e. tongue projections, etc.). A third possibility is that the user (301A' of FIG. 3D) is not paying attention and is instead day dreaming while producing meaningless and random facial expressions, grunts, screen taps and the like.

The CFi's processing portion of system 300D of FIG. 3D relies on available sensors (instruments) at the user's location for gathering data that likely indicates user context and/or what the user is focusing his/her attention giving energies upon. More specifically, a first set of sensors 298*a*' (referred to here as attentive inputting tracking sensors) are provided and disposed to track various biometric indicators of the user, such as eyeball movement patterns, eye movement velocities, tongue positionings, and so on, to thereby detect if the user is actively reading text and/or focusing-upon then presented imagery, and if so what parts thereof and/or with what degree of attentiveness. (In one embodiment, the user's currently activated PEEP profile equates different kinds of tongue, mouth and/or other body part dispositions—e.g., mouth agape and tongue stuck out—with different degrees of individualized attentiveness.) The various biometric indicators may include those that are detectable in a non-visible/non-hearable wavelength band such as biometric states detectable in an IR band and/or biometric states detectable in a sub-audio or super-audio frequency band. A crude example of such biometric indicators may be simply that the user's head is facing towards a computer screen. A more refined example of such tracking of various biometric indicators could be that of keeping track of user eye blinking rates (301*g*), breathing rates, exhalation temperatures and exhalation gas compositions (e.g., using absorption spectrum detecting means for example), salivation rates, salivation composition, tongue movement rates, etc. and then referring to the currently active PEEP profile of the user 301A' for translating such biometric activities into indicators that the user is in an alerted state and is actively paying attention to material being presented to him or not. As already explained in the here-incorporated STAN-1 and STAN-2 applications, STAN users may have unique ways of expressing their individual emotional and/or attentive states where these expressions and their respective meanings may vary based on mood, context and/or current topic of focus. As such, context-dependent and/or topic of focus-dependent lookup tables (LUT's) and/or knowledge base rules (KBR's) are typically included in the user's currently active PEEP profile (not explicitly shown, but understood to be part of profiles set 301*p*) and used for normalizing individualized expressions into more communally understandable expressions. In other words, raw expressions of each given user are run through that individual user's then-active PEEP profile to thereby convert that individual's individualized expressions into more universally understandable (normalized) counterparts. More specifically, for one specific user, a shrug of the left shoulder and a tilt of the head to left might always mean an indication of aloofness. The normalized user state (one that is communally understandable) would then be "aloof" while the individualized gesture is an ambiguous shrug of the left shoulder and a tilt of the head to left.

Incidentally, just as each user may have one or more unique (e.g., idiosyncratic) facial expressions or the like for expressing internal emotional states (e.g., happy, sad, angry, etc.), each user may also have one or more unique other kinds of expressions or codings (e.g., unique keywords, unique topic names, etc.) that they personally use to represent things that the more general populace (the relevant community) expresses with use of other, more-universally accepted expressions (e.g., popular keywords, popular topic names, etc.). More specifically, and using the hypothetical example of the Superbowl™ Sunday Party up top, one system user may have an idiosyncratic pet name he uses in place of a more commonly, communally used name for a well known celebrity. The nonconforming user might routinely refer to "Joe-the-Throw Nebraska" as "Yo Ho Joe". This kind of information is stored in a currently activated personhood profile of the user, under a section entitled for example, Favorite Idiosyncratic Keywords, where a translation to the more commonly used terminology (e.g., "Joe-the-Throw Nebraska") is included and where the STAN_3 system automatically performs the translation when normalizing the raw CFi's received from that individual user. More generally and in accordance with one aspect of the disclosure, one or more of the user profiles 301*p* include expression-translating lookup tables (LUT's) and/or knowledge base rules (KBR's) that provide translation from relatively idiosyncratic CFi expressions often produced by the respective individual user into more universally understood (communally understandable), normal CFi expressions. This expression normalizing process is represented in FIG. 3D by items 301*q* and 302*qe*'. Due to space constraints in FIG. 3D, the actual disposition of module 302*qe*' (the one that replaces 'abnormal' CFi-transmitted expressions with more universally-accepted counterparts) could not be shown. The abnormal(a.k.a. idiosyncratic)-to-normal swap operation of module 302*qe*' occurs in that part of the data flow where CFi-carried signals are coupled from raw-CFi signal generating units 302*b*' and 298*a*' to CFi categorizing-mechanisms 302" and 298". In addition to replacing 'abnormal' or user-idiosyncratic CFi-transmitted expressions with more universally-accepted/recognized counterparts, the system includes a spell-checking and fixing module 302*qe*2' which automatically tests CFi-carried textual material for likely spelling errors and which automatically generates spelling-wise corrected copies of the textual material. (In one embodiment, the original, misspelled text is not deleted because the misspelled version can be useful for automated identification of STAN users who are focusing-upon same misspelled content. Instead, the original, misspelled text is augmented with an appending thereto of the spelling-wise corrected textual material.)

In addition to replacing and/or supplementing 'abnormal' (user-idiosyncratic) CFi-transmitted expressions with more universally-accepted and/or spell-corrected counterparts, the system includes a new permutations generating module 302*qe*3' which automatically tests CFi-carried material for intentional uniqueness by, for example, detecting whether plural reputable users (e.g., influential persons) have started to use a unique and previously not commonly seen pattern of CFi-carried data at about the same time. This may signal that perhaps a newly observed pattern or permutation is not an idiosyncratic aberration of one or a few non-influential users but rather that it is likely being adopted by the user community (e.g., firstly by influential early-adopter or Tipping Point Persons within that community, and later by following others) and thus it is not a misspelling or an individually unique pattern (e.g., a pet idiosyncratic name) that is used only by one or a small handful of users in place of a more universally accepted pattern. If the new-permutations generating module 302*qe*3' determines that the new pattern or permutation is being adopted by the user community, the new-permutations generating module 302*qe*3' automatically inserts a corresponding new node into the system-maintained keyword expressions space (e.g., in expressions layer 371 of FIG. 3E) and/or another such space (e.g., hybrid keyword plus context space) as may be appropriate so that the new-permutation no longer appears to modules 302*qe*' and 302*qe*2' as being an idiosyncratic, abnormal or misspelled expression pattern. The node (corresponding to the early-adopted new CFi pattern) can be inserted into keyword expressions space and/or another such space (e.g., hybrid keyword plus context space) even before a topic node is optionally created for the new CFi pattern. Later, if and when a new topic node is created in topic space for a topic related to the new CFi pattern, there will already exist in the system's keyword expressions space (e.g., in expressions layer 371 of FIG. 3E) and/or another such space (e.g., hybrid keyword plus context space), a non-topic node to which the newly-created topic node can be logically linked. In other words, the system can automatically start laying down an infra-structure (e.g., keyword expression primitives; which concept will be explained in conjunction with 371 of FIG. 3E) for supporting newly emerging topics even before a large portion of the user population starts voting for the creation of such new topic nodes (and/or for the creation of associated, on-topic chat or other forum participation sessions). A further explanation of where and how the new permutations generating module 302*qe*3' fits into the overall scheme of things will be provided in conjunction with FIG. 3W.

In addition to replacing and/or supplementing 'abnormal' (user-idiosyncratic) CFi-transmitted expressions with more universally-accepted and/or spell-corrected counterparts, the system includes an expressions expanding or supplementing/augmenting module (not separately shown, but part of the 302*qe*' complex) which optionally adds to the normalized expressions already provided by the individual user, supplemental expressions that are of similar meaning (e.g., synonyms) and/or are of opposite meaning (e.g., antonyms) and/or are of similar sound (e.g., homonyms). This may be done by referencing online Thesauruses and/or dictionaries and/or system-maintained lists that provide such augmenting information. In this way, if the user picked a non-idiosyncratic, but nonetheless not popularly used term, the system can automatically add a more popularly used term to the mix and, as a result, the context and/or other mapping mechanisms (e.g., 316", 313" of FIG. 3D) are assisted towards more quickly finding matching nodes (and/or points or subregions) within their internal Cognitions-representing Spaces.

Sometimes, a same one system user can have multiple sensing machines (e.g., 298*a*', 302*b*', 304) reading out similar and basically duplicative CFi reporting records for uploading into the system cloud. Such redundant generating of duplicative CFi's may make it appear as if the respective user is more intensely focused-upon something than is really the case. However, each locally generated CFi signal usually has attached to it at least a time stamp if not also a location stamp and/or machine ID stamp and/or user ID stamp and/or data-type indicating stamp (e.g., image data, text data, coded data, biometric data, etc.). When a string or streamlet of CFi signals are received at the head end (e.g., cloud end) of the STAN_3 system, in one embodiment they are preprocessed by a data deduplicating module (not shown) which is configured to detect likely data duplication conditions and remove data that is likely to be duplicative from the data stream sent further upstream for yet further processing. In this way, the upstream resources are not unduly swamped with duplicative CFi data so that, for example, one person's duplicative CFi's do not unfairly swamp out (e.g., out-vote) another person's CFi's just because the latter user has a fewer number of local CFi generators than does the first user. In one embodiment, the number of CFi generating instruments that can simultaneously supply CFi reporting records on behalf of a respective individual user (e.g., 301*a*') is limited to a predefined number and hierarchical rankings are attributed to different ones of such duplicative reporting instruments whereby, if the predetermined CFi inputs per person per unit of time threshold is exceeded, the lower ranked ones among the duplicative reporting instruments are disabled or ignored first so that the higher quality, better reporting ones are the ones who contribute to the limited reporting bandwidth granted to each STAN_3 system user. (Of course, in one embodiment, users who pay for premium subscriptions are granted a higher maximum CFi's/unit-time value than are those with no or lesser subscriptions.)

After deduplication, the received CFi signals are sorted according to data type. As indicated above, CFi signals are typically delivered to the head end of the system core (e.g., cloud 410) with time, location and data type stamps attached to the payload data. One payload may represent simple text content (e.g., ASCII encoded) while another payload may represent simple sound content (e.g., .wav encoded) and yet another payload may represent bit-mapped encoded imagery (e.g., .bmp encoded). These different data types are sorted according to their data types so that sounds get stored adjacent to other sounds of the same general time-stamped period and/or of the same general location-stamped place and so that odor (smell) indicating signals get stored adjacent to other odor (smell) indicating signals of same place/time and so on. This is a first step in categorizing and parsing the possibly multi-typed ones of the received CFi signals. The goal is to form clusters of reasonably combinable CFi primitives that pass so-called, sanity checks before being used to build more complex combinations or clusterings of CFi signals. More specifically, if a musical-tone detecting sensor (not shown) at the user end (301A') sends a first CFi packet holding 3 notes and then sends a second CFi packet holding 5 more notes, it is possible and likely that the total of 8 notes belong together as part of one melody; or perhaps they don't. Perhaps the latter 5 notes need to instead be clustered with the payload of yet a third, not yet, but to-be-sent CFi packet containing 7 further notes. In other words, there are a number of possible first level "permutations" here for clustering together received sequences of CFi signals, namely: (1) CFiPacket#1 (first 3 notes) belongs or does not belong as a prefix to CFiPacket#2 (next 5 notes); (2) CFiPacket#2 (the 5 notes) belongs or does not belong as a prefix to CFiPacket#3 (next 7 notes); (3) all of CFiPacket#1, #2 and #3 belong together as a continuous melody; (4) none of CFiPacket#1, #2 and #3 belong together as a continuous melody. The concept of forming likely "permutations" or clusters of alike CFi data signals; and then clusters of clusters will be explored in more detail later below.

First, and getting back to basics, it is to be understood that each of the CFi generating units 302*b*' and 298*a*' of FIG. 3D, as well as the local physical context reporting unit(s) 304/306, includes a current focus-indicator(s)/current context indicator(s) packaging subunit (not shown) which packages raw telemetry signals from the corresponding tracking sensors as typed data payloads into time-stamped, location-stamped, type-stamped, user-ID stamped, machine-ID stamped, and/or otherwise stamped and transmission ready data packets. These data packets are received by appropriate CFi-processing and context-indication processing servers in the head end (e.g., cloud) of the system core and processed in accordance with their user-ID (and/or local device-ID) and time and location and data type (and/or other stampings). In one embodiment, the CFi/context reporting signals sent to the head end are pre-packaged or re-packaged further downstream, after being transmitted, into hybridized signals, or so-called, HyCFi signals where additional context information beyond time, location and type is attached to the current focus indicating information, such as for example, identifications of other users in interactive proximity with the first user, where the latter can be indicative of a current social context in which the first user (301A') finds him/herself to be situated within.

One of the basic processings that the data packet receiving servers (or automated services) perform at a front or downstream receiving part of the head end is to group (e.g., cluster and/or cross-associate with logical links) the separately received packets of respective users and/or of data-originating devices according to user-ID (and/or according to local originating device-ID and/or data-type ID) and to also group received packets belonging to different times of origination and/or different times of transmission into respective chronologically ordered groups of alike types of data. In other words, musical note signals get grouped with other musical note signals, image defining signals get grouped with other and alike (e.g., .bmp, .jpg, .mp3) image defining signals and so on. The so pre-processed CFi signals are then normalized by normalizing modules like 302*qe*'-302*qe*2' if the signals had not been yet normalized (e.g., de-idiosyncratized) earlier downstream. Then the normalized CFi and/or context indicating signals are fed into CFi clustering, cross-associating and categorizing-mechanisms 302" and 298" provided further upstream for yet further processing. (This further processing will be explained shortly but later below). At this stage it is understood that the muddled streams of data from different users and different ones of their local sensors have been untangled and purified, so to speak, such that the CFi data payloads of a first user, UsrA have been sorted out and stored in a storage area associated with user UsrA while the CFi data payloads of a second user, UsrB have been sorted out and stored in a storage area associated with that second user, UsrB. Moreover, for each user (for each persona of each user), the received CFi data payloads have further been chronologically and type wise and location wise been untangled and purified, so to speak, such that musical notes data picked up by a respective first musical-notes sensor are grouped together with one another in a correct time ordered manner and such that musical notes data picked up by a respective second musical-notes sensor (at a different location) are grouped together with one another in a correct time ordered manner, and the so-ordered data sets are further organized relative to one another in chronologically and type wise and location wise manner, and so on. More specifically, for the given example, the first and second musical-notes sensors may be differently placed microphones within an orchestra and the picked up notes may be from different musical instruments (e.g., piano, violin, clarinet) where the orchestra is playing harmonized stanzas which respectively are intended to be cognitively perceived in organized combinations or clusterings. Therefore one of the intended functions of a CFi's storing and organizing space such as 302" is to store in context appropriate organizations, CFi signals whose represented physical counterparts were intended by the user (301A') or another to be cognitively perceived in relative unison.

The first set of sensors 298*a*' have already been substantially described above (as eyeball movement trackers, head direction trackers, etc.). A second set of sensors 302*b*' (referred to here as attentive-outputting tracking sensors) are also provided and appropriately disposed for tracking various expression outputting (code outputting) actions of the user, such as the user uttering in-context words (301*w*), consciously nodding or shaking or wobbling his head, typing on a keyboard, making apparently-intentional hand gestures, clicking, tapping or otherwise activating different activateable data objects displayed on his screen and so on. As in the case of facial expressions that show attentive inputting of user accessible content (e.g., what is then displayed on the user's computer screen and/or played through his/her earphones even though the user may not watch it or listen to it), unique and abnormal output expressions (e.g., pet names for things, pre-coded combinations of tongue projections and other actions, a.k.a. hot-keying gestures) are run through expression-translating lookup tables (LUT's) and/or knowledge base rules (KBR's) of then active PEEP, CpCCp and/or other profiles for translating such raw expressions into more normalized (less idiosyncratic), Active Attention Evidencing Energy (AAEE) indicator signals of the outputting kind. In one embodiment, the in-context uttered words of the user are supplied to an automated speech recognition module (not shown) that automatically uses context (e.g., signal 316*o*) in combination with speech pattern matching to then generate semantic codings representing the user uttered words in a textual and/or other more readily processible manner. The so-generates, semantic codings of the user's raw outputs form part of the "normalized" output signals of the user. The normalized AAEE indicator signals 298*e*' of the inputting kind have already been described above. One example, by the way, of the normalization of abnormal output expressions may occur when the respective user is a multilingual user and is using an uncommon foreign language whereas keyword expressions then being received by the head end are pre-characterized as needing to belong to one agreed-upon standard language (e.g., English). In that case, words that the respective user may inadvertently output in a non-standard language are automatically translated into the agreed-upon standard language (e.g., English).

The normalized Active Attention Evidencing Energy (AAEE) signals, 302*e*' and 298*e*' are next inputted into corresponding first and second CFi clustering/categorizing mechanisms 302" and 298" as already mentioned. These clustering/categorizing mechanisms organizingly store the separately received CFi signals (302*e*' and 298*e*') into yet more finely categorized and usable groupings (clusterings and/or categories) than just having them grouped according to user-ID and/or time or telemetry origination and/or location of telemetry origination. The further organizing of the received CFi signals (302*e*' and 298*e*') is carried out with aid of so-called, CFi categorizing, clustering and inferencing engines 310' that connect in a feedback loop manner to the CFi clustering/categorizing spaces (mapping mechanisms) 302" and 298" and also in a feedback loop manner to other system-maintained mapping mechanisms (e.g., to content source space 314" (css), to context space (xs), to emotions space (es), and so on). One form of such finer categorizing of the received CFi signals (302*e*' and 298*e*') is to parse them as being limbically-directed CFi's (example: "Please can't we just all get along without engaging in ad hominem attacks?"), as being neo-cortically directed CFi's (example: "Those numbers do not add up.") or as being more primitive cognitions (example: "You have me blowing coffee out of my nostrils and laughing out loud (LOL)"). Another form of such finer categorizing of the received CFi signals (302*e*' and 298*e*') is to parse them as being loosely directed to one broad topic domain or another (example: the liberal arts versus the math and science arts). Additionally, the finer categorizing of the received CFi signals (302*e*' and 298*e*') includes parsing them according to more likely groupings (clusterings) and less likely combinatorial assemblages.

This latter part of the improved grouping/clustering process provided by the CFi categorizing, clustering and inferencing engines 310' is best explained with a few yet more specific examples. Assume that within the 302*e*' signals (AAEE outputting signals) of the corresponding user 301A' there are found three keyword expressions: KWE1, KWE2 and KWE3 that have been input into a search engine input box, one at a time over the course of, say, 9 minutes. (The latter timings can be automatically determined from the time stamps of the corresponding CFi data packet signals that carry the keyword payloads.) One problem for the CFi categorizing mechanism 302" (and its clustering/organizing engines 310') is how to resolve whether each of the three received and stored keyword expressions: KWE1, KWE2 and KWE3 is directed to a respective separate topic or whether all three are directed to a same topic such that they should be processed as the full combination of all three keywords or whether some other permutation holds true (e.g., KWE1 and KWE3 are directed to one topic but the time-wise interposed KWE2 is directed to an unrelated second topic—or is just a nonsense word inadvertently thrown in to the sequence of events). This is referred to here as the CFi grouping and parsing problem. Which CFi's belong with each of the others and which belong to another group or stand by themselves or do not belong at all (and thus deserve to be ignored)? By way of a more specific example, assume that KWE1="Lincoln" and KWE3="address" while KWE2="Goldwater" although perhaps the user (a Fifth Grade student) intended a different second keyword such as "Gettysburg". (Note: At the time of authoring of this example, a Google™ online search for the string, "lincoln goldwater address" produced zero matches while "lincoln gettysburg address" produced over 500,000 results. An educated human being can quickly see that the example of KWE2="Goldwater" does not belong. It makes no sense. But for a computer, the problem may not be easily spotted and resolved.

A second problem for the CFi clustering/categorizing mechanism 302"/310' is how to resolve what kinds of CFi signals is it receiving in the first place? How did it know that expressions: KWE1, KWE2 and KWE3 were in the "keyword" category, as opposed to, for example, in the URL's category? In the case of keyword expressions, that question can be resolved fairly easily because the exemplary KWE1, KWE2 and KWE3 expressions are detected as having been submitted to a search engine through a search engine dialog box or a search engine input procedure. But other text-based CFi's and more to the point, non-textual CFi's, can be more difficult to categorize. Consider for example, a nod of the user's head up and down by the user and/or a simultaneous grunting noise made by the user. What kind of intentional expression, if at all, is that? The answer depends at least partly on context, culture and/or user mood. If the most recent context state of the user is determined by the STAN_3 system 410 (by output signal 316*o* in FIG. 3D) to be one where the user 310A' is engaged in a live video web conference with other persons of a Western culture, then the up-and-down head nod may be taken as an expression of intentional affirmation (yes, agreed to) being communicated to the others if the nod is pronounced enough. On the other hand, if the user 301A' is simply reading some text to himself (a different social context, namely, being alone) and he nods his head up and down or side to side and with less pronouncement, that may mean something different, dependent on the currently active PEEP profile of the respective user. The same would apply to the grunting noises or other non-textual user outputs.

Figure 3F:
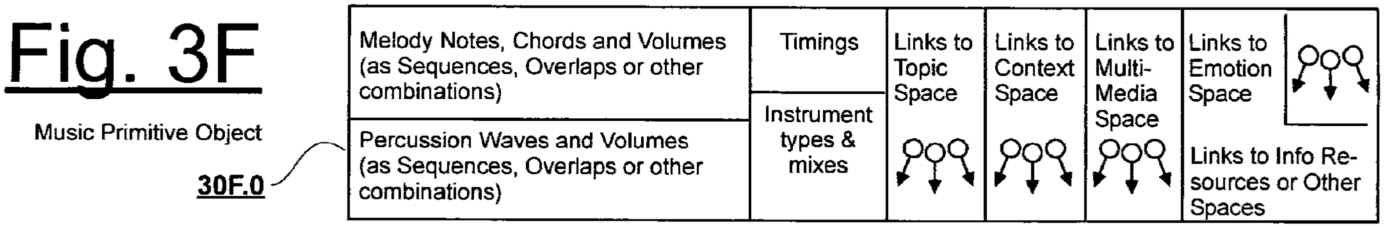
FIGS. 3F-3I respectively show data structures of data object primitives useable for example in a music-nodes data organizing space, a sounds-nodes data organizing space, a voice nodes data organizing space, and a linguistics nodes data organizing space.
Figure 3G:
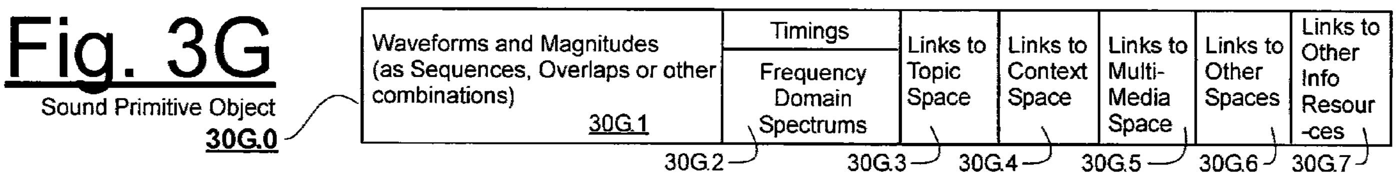
Figure 3H:
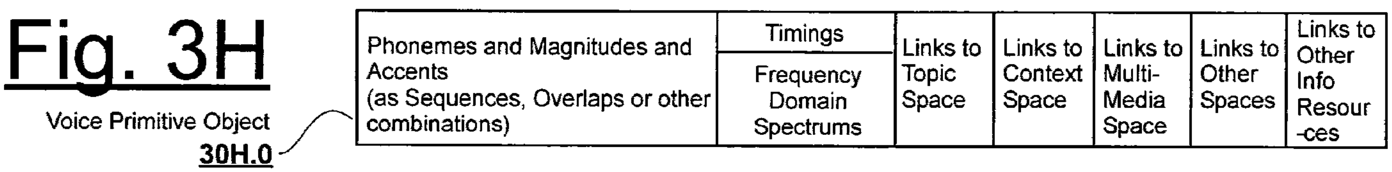
Figure 3I:
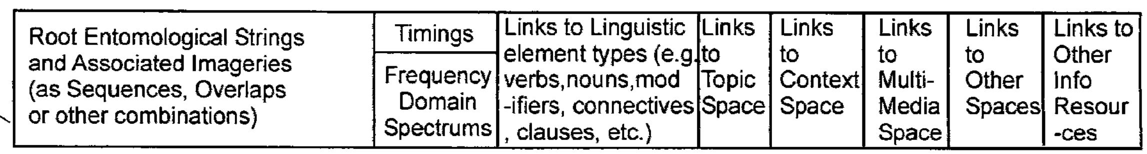
Figure 3J:
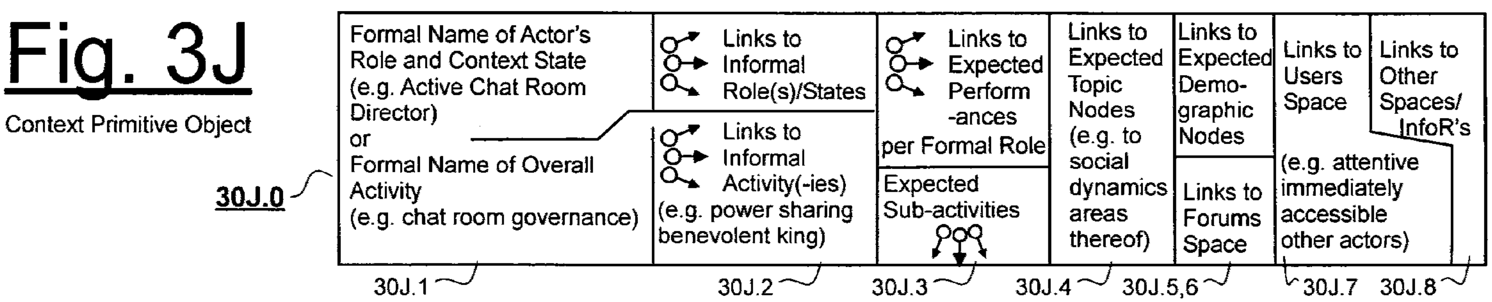
FIG. 3J shows data structures of data object primitives useable in a context nodes data organizing space.
Figure 3K:
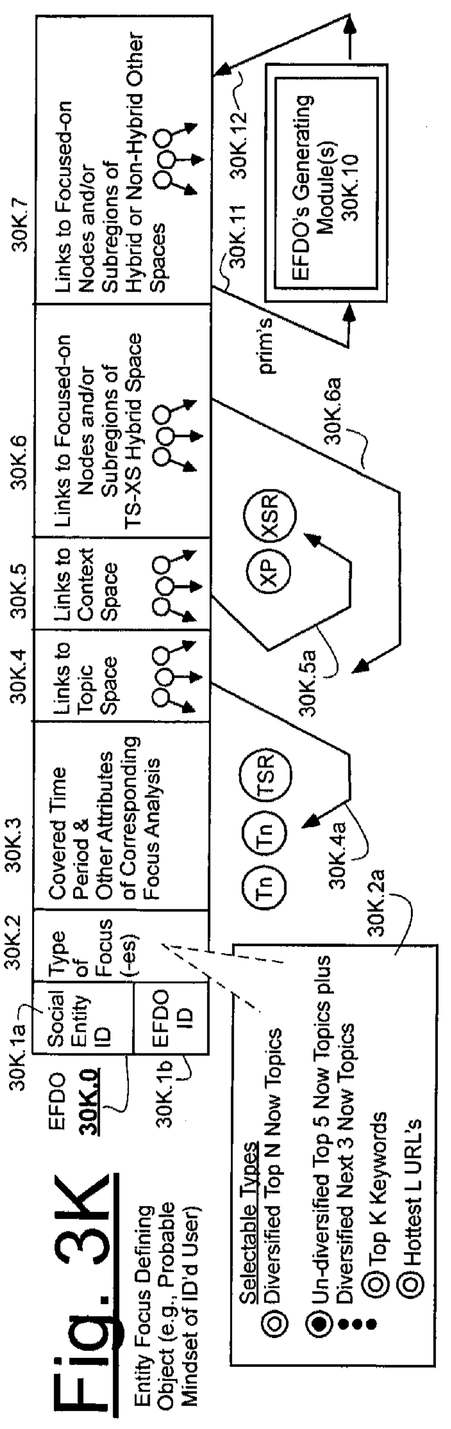
FIG. 3K shows data structures usable in defining nodes being focused-upon and/or space subregions (e.g., TSR's) being focused-upon within a predetermined time duration by an identified social entity.
Figure 3L:
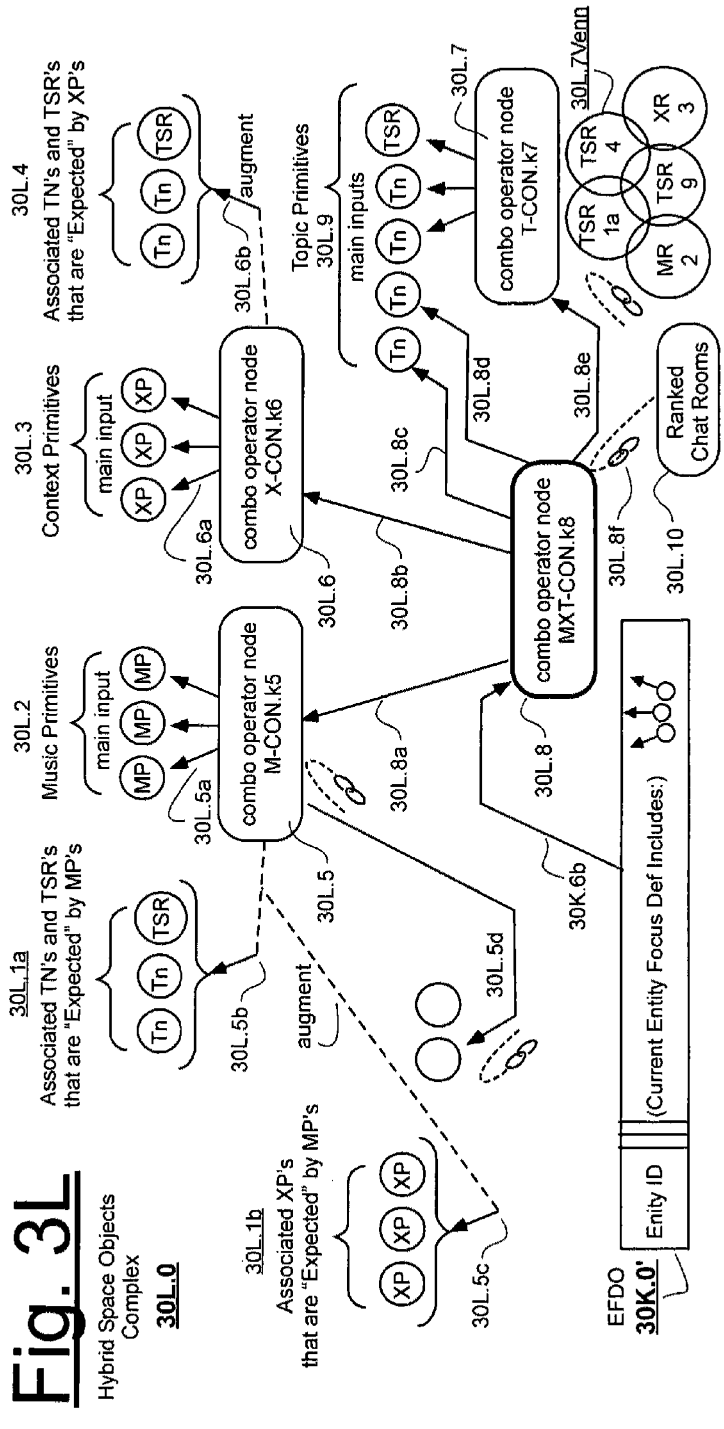
FIG. 3L shows an example of a data structure such as that of FIG. 3K logically linking to a hybrid operator node in a hybrid space formed by the intersection of a music space, a context space and a portion of topic space.
Figure 3M:
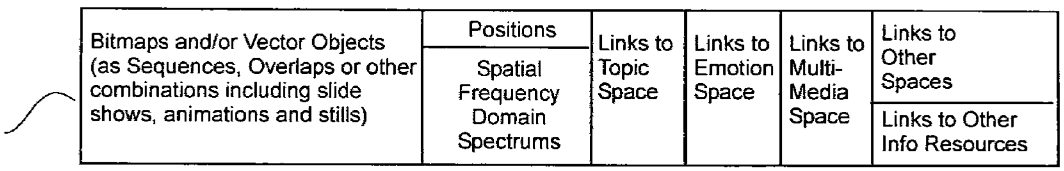
FIGS. 3M-3P respectively show data structures of data object primitives useable for example in an images nodes data organizing space, a body-parts/gestures nodes data organizing space, a biological states organizing space, and a chemical states organizing space.
Figure 3N:
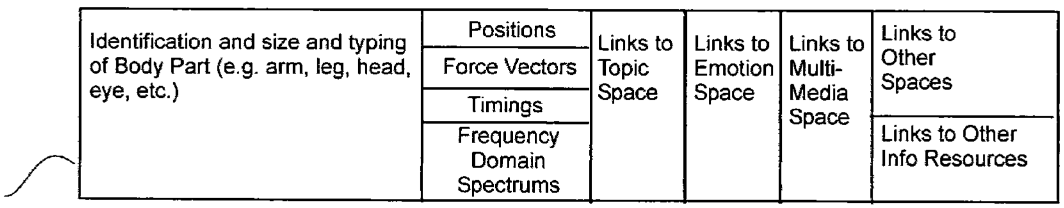
Figure 3O:
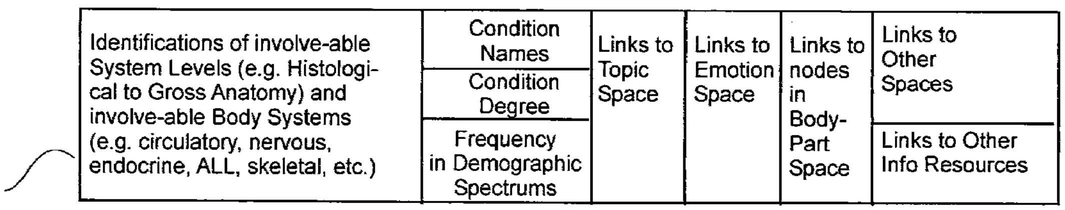
Figure 3P:
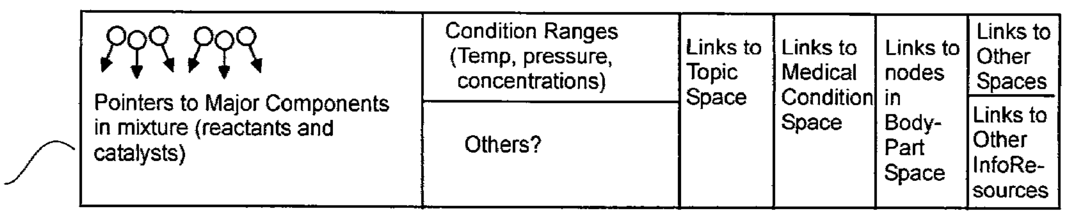

In general, the CFi receiving and clustering/categorizing mechanisms 302"/298" and the interconnected engines 310' first cooperatively assign incoming CFi signals (e.g., normalized/augmented CFi signals) to one or the other or both of two mapping mechanism parts, the first being dedicated to handling information outputting activities (302') of the user 301A' and the second being dedicated to handling more passive information inputting activities (298') of the user 301A'. If the CFi receiving and categorizing mechanisms 302"/298"/310' cannot parse as between the two, they copy the same received CFi signals to both sides. Next, the CFi receiving and categorizing mechanisms/engines 302"/298"/310' try to categorize the received CFi signals into predetermined subcategories unique to that side of the combined categorizing mapping mechanism 302"/298". Keywords versus URL expressions would be one example of such categorizing operations. In this case, both of keywords and URL's belong to a broader class of sequential textual content (which could include sequentially supplied codes or symbols as well as traditional alphanumeric characters). Musical notes versus random background noise may be another example of CFi's of different categories. (Ultimately, musical background notes might be mapped as corresponding to communally-created and communally-accepted music primitives having data structures such as shown in FIG. 3F. However, the present discussion is not yet ripe enough to deal with that eventuality. It will be taken up later below.)

URL string expressions can be automatically categorizing as such (as being Universal Resource Locator type expressions) by their prefix and/or suffix and/or in-fix strings (e.g., by detection of having a "dot.com" character string embedded therein or having the "at mark" symbol infixed therein if it is an email address for example). Other such categorization parsings include but are not limited to: distinguishing as between meta-tag type CFi's, image types, sounds, emphasized text runs (e.g., those that are italicized, bolded, underlined, etc.), body part gestures, topic names, context names (i.e. role undertaken by the user), physical location identifications, platform identifications, social entity identifications, social group identifications, neo-cortically directed expressions (e.g., "Let X be a first algebraic variable . . . "), limbically-directed expressions (e.g., "Please, can't we all just get along?"), and so on. More specifically, in a social dynamics subregion of a hybrid topic and context space, there will typically be a node disposed hierarchically under limbic-type expression strings and it will define a string having the word "Please" in it as well as a group-inclusive expression such as "we all" as being very probably directed to a social harmony proposition. In one embodiment, expressions output by a user (consciously or subconsciously are automatically categorized as belonging to none, or at least one of the following layers of a triune brain model: (1) neo-cortically directed expressions (i.e., those appealing to the intellect), (2) limbically-directed expressions (i.e., those appealing to social interrelation attributes) and (3) reptilian core-directed expressions (i.e., those pertaining to raw animal urges such as hunger, fight/flight, etc.). In one embodiment, the neo-cortically directed expressions are automatically allocated for processing at least by the topic space mapping mechanism 313" because expressions appealing to the intellect are generally categorizable under different specific topic nodes. In one embodiment, the limbically-directed expressions are automatically allocated for processing at least by the emotional/behavioral states mapping mechanism 315" because expressions appealing to social interrelation attributes are generally categorizable under different specific emotion and/or social behavioral state nodes. In one embodiment, the reptilian core-directed expressions are automatically allocated for processing by at least a biological/medical/emotional state(s) mapping mechanism (315", see also exemplary primitive data object of FIG. 3O) because raw animal urges are generally attributable biological states (e.g., fear, anxiety, hunger, etc.). More will be said about parsing of CFi's into clusters and clusters of clusters when the discussion reaches FIG. 3U. The above is more in the way of an introduction.

As mentioned, the automated and augmenting categorization of incoming CFi's is performed with the aid of one or more CFi clustering/categorizing and inferencing engines 310' where the inferencing engines 310' have access to categorizing nodes and/or subregions within, for example, to parts within topic and/or context space and/or within biological states space (e.g., in the case of the social harmony invoking example given immediately above: "Please, can't we all just get along?") or more generally, access to categorizing nodes and/or subregions within the various system-maintained Cognitive Attention Receiving Spaces (CARSs). The inferencing engines 310' receive as their inputs, last known state signals (e.g., 316*o*) from various ones of the state mapping mechanisms (CARSs) as representing rough indications of associated CARSs points cross-correlating to current CFi clusters and indirectly, the respective user's state of mind. More specifically, the last determined to be most-likely context states are represented by "xs" signals received by the inferencing engines 310' from the output 316*o* of the context mapping mechanism 316"; the last determined to be most-likely focused-upon sub-portions of content materials are represented by "css" signals received from the output 3140 of the content source space mapping mechanism 314" (where 314" stores pointers to (e.g., URL's to), or abbreviated representations of content that is likely available to be currently focused-upon by the user 301A'); the previously determined to be most-likely CFi clusterings/categorizations are received as currently stored "HyCFis" signals from the CFi categorizing mechanism 302"/298"; the last determined as probable emotional/behavioral states of the user 301A' are received as "es" signals (emo signals) from an output 315*o* of an emotional/behavioral state mapping mechanism 315", and so on.

In one embodiment, the inferencing engines 310' operate on a weighted assumption that the past is a good predictor of the present and of the near future. In other words, the most recently determined states "xs", "es", "HyCFi's of the respective CFi's from the one user (or of another social entity that is being processed) are first used for categorizing the more likely categories for next incoming new CFi signals 302e' and 298e'. The "css" signals tell the inferencing engines 310' what content was logically available (e.g., on a nearby TV screen—by looking up TV show scheduling databases, on a nearby computer screen, via nearby loudspeakers or earphones, etc.) to the user 310A' at the time one of the CFi's was generated (time and place stamped CFi signals—see 30U.10 of FIG. 3U) in regard to content then being presented for potential perception by the respective user. More specifically, if a search engine input box was displayed in a given screen area, and the user inputted a character string expression into that area at that time, then the expression is determined to most likely be a keyword-based search expression (KWE). If a particular sound was being then outputted by a sound outputting device near or on the user, then a detected sound at that time (e.g., music) is determined to most likely be a music and/or other sound CFi the user was exposed to at the time of telemetry origination. By categorizing the received (and optionally normalized/de-idiosyncraticized) CFi's in this manner it becomes easier to subsequently group likes with alikes and parse them, and cluster logically interrelated ones of them together so as to build clusters of them (or clusters of clusters) before transmitting the parsed and grouped/clustered (and optionally hybridized) CFi's as input vector signals (e.g., HyCFi's) into appropriate ones of the mapping mechanisms (e.g., 313", 316") for further processing.

Yet more specifically and by way of example, it will be seen below that the present disclosure contemplates a music-objects organizing space (or more simply a music space, see FIG. 3F). Current background music that is available to the user 301A' may be indicative of current user context and/or current user emotional/behavioral state (e.g., mood). Various nodes and/or subregions in music space can logically link to 'expected' emotional/behavioral state nodes, and/or to 'expected' context state nodes/regions and/or to 'expected' topic space nodes/regions within corresponding data-objects organizing spaces (mapping mechanisms). An intricate web of cross-associations is quickly developed simply by detecting, for example, a musical melody being played in the background, determining that it is a musical melody, and inferring from that determination, a host of parallel one of more likely possibilities. More to the point, if the user 301A' is detected as currently being exposed to soft calming music, the 'expected' emotional/behavioral state of the user is automatically assumed by the CFi categorizing and inferencing engines 310' (in one embodiment and with use of the music space (not shown in FIG. 3D) and its cross-associating links to emotional/behavioral state space 315") to be a calm and quieting one. That colors how other CFi's received during substantially the same time period and in substantially the same physical context (XP) will be categorized because the user's mood generally determines the currently activated PEEP record (part of 301p') for that user. Each CFi categorization can assist in the additional and more refined categorizing and placing of others of the contemporaneous and/or co-located CFi's of a same user in proper context since the other CFi's were received from a same user and in close chronological and/or geographical interrelation to one another where user non-physical context (more cerebral context) is safely assumed to be a steady state one.

Aside from categorizing individual ones of the incoming CFi's as being one type or another (e.g., textual versus melodic), the CFi clustering/categorizing and inferencing engines 310' parse and group (cluster) the incoming CFi's as either probably belonging together with each other or probably not belonging together. It is desirable to correctly group together emotion-indicating CFi's with their cross-associated non-emotional CFi's (e.g., keywords, URL's) because that is later often used by the system to determine how much "heat" a user is casting on one node or another in topic space (TS) and/or in other such spaces (e.g., keyword space, URL space, and so on). More specifically, if biological state telemetry indicates the user's heart rate has suddenly increased, his/her respiration level has increased, and the user's current PEEP record indicates that this user tends to experience such increase of heart rate (e.g., beats per minute) approximately 10 seconds after having visually perceived emotionally-inciting content, the system can then logically cross-associate the later-in-time, fight-or-flight reaction (e.g., increased heart rate/increased respiration rate) with content that was presented to the same user 10 seconds ago. Consequently, that content, and/or the URL of the site from which it was presented, are given enhanced "heat" signatures.

In terms of a yet more specific example, consider again the sequentially received set of keyword expressions: KWE1, KWE2 and KWE3; where as one example, KWE1="Lincoln", KWE3="address" while KWE2 is something else and its specific content may color what comes next. More specifically, consider how topic and context may be very different in a first case where KWE2="Gettysburg" versus an alternate case where KWE2="car dealership". Those familiar with contemporary automobile manufacture would realize that "Lincoln car dealership" probably corresponds to a sales office of a car distributor who sells on behalf of the Mercury/Lincoln™ brand division of the Ford Motor Company. "Gettysburg Address" on the other hand, corresponds to a famous political event in American history. These are usually considered to be two entirely different topics and normally would have two separate nodes or subregions in topic space, although a topic node covering both at the same time is possible.

Assume also that about 90 seconds after KWE3 was entered into a search engine and results were revealed to the user, the user 301A' became "anxious" (as is evidenced by subsequently received physiological CFi's; perhaps because the user is in Fifth Grade and just realized his/her history teacher expects the student to memorize the entire "Gettysburg Address"). A question for the machine system to resolve in this example is which of the possible permutations of KWE1, KWE2 and KWE3 plus the emotion-indicating CFi that followed form a cross-associated cluster indicating there is a specific keyword expressions clustering (where the latter clustering in keyword space points to a corresponding topic in topic space—see keyword to topic link 370.6 of FIG. 3E) and indicating that the user became "anxious" over this keyword cluster/topic (or other subpart of another CARS), whereby the system should then record a projection of increased "heat" on the associated keyword nodes or cross-associated topic nodes (or nodes of other spaces)? Was it KWE1 taken alone or all of KWE1, KWE2 and KWE3 taken in combination or a sub-combination of that? For sake of example, let it be assumed that KWE2 (e.g., ="Goldwater") was a typographic error inputted by the user. He meant at the time to enter KWE3 instead, but through inadvertence, he caused an erroneous KWE2 to be submitted to his search engine. In other words, the middle keyword expression, KWE2 is just an unintended noise string that got accidentally thrown in between the relevant combination of just KWE1 and KWE3. How does the system automatically determine that KWE2 is an unintended noise string, while KWE1 and KWE3 belong together? The answer is that, at first, the machine system 410 does not know. However, embedded within a keyword expressions space (see briefly 370 of FIG. 3E) there will often be spatially "clustered" and combinatorial sets of keyword expressions (in layer 371 as shall be explained below) that are predetermined to likely make semantic sense (e.g., where the keyword combination might be represented by "operator" node 373.1 of FIG. 3E) and missing from that space will be nodes and/or subregions representing combinatorial sets of keyword expressions (e.g., "KWE1, AND KWE2 AND KWE3") that are not predetermined to make semantic sense (at the relevant time; because after this disclosure is published, the phrase, "lincoln goldwater address" might become attributable to a corresponding topic of a STAN system). Incidentally, it is to be understood that the keyword expressions data-objects organizing space (370) is merely an example of other data-objects organizing spaces including data-objects storing spaces whose stored signals represent other textual expression strings (e.g., URL's, meta-tags, etc.) besides just spatially clustered keyword expression strings. This will be further detailed when the textual string primitive 30W.0 of FIG. 3W is explained later below. As mentioned above, "primitives" are data structures that can be used and combined to build more complex data structures by means of operator nodes where the more complex data structures represent more complex cognitions while the "primitives" represent relatively simple cognitions of one form (e.g., linguistic) or another (e.g., visual, melodic, etc.).

It should be recalled at this juncture that the inferencing engines 310' of FIG. 3D have access to the hierarchical data structures stored inside various ones of the system's data-objects organizing spaces (mapping mechanisms, a.k.a. Cognitive Attention Receiving Spaces). Accordingly, the inferencing engines 310' can first automatically and on a trial and error basis, entertain the possibility that the keyword permutation: say, "KWE1, AND KWE2 AND KWE3" can make semantic sense to a reasonable or rational STAN user situated in a context similar to the one that the CFi-strings-originating user, 301A' is situated in. Accordingly, the inferencing engines 310' are configured to automatically search through a hybrid context-and-keywords space (not shown, but see briefly in its stead, node 384.1 of FIG. 3E) for a pre-existing node corresponding to (matching to, or strongly cross-correlating to, namely, being substantially same or similar to it—which concept of substantially similarity will be explained elsewhere herein—) the entertained permutation of the combined CFi's and it then discovers that the in-context node corresponding to the entertained first permutation (a first trial balloon, see also 30V.12 of FIG. 3V): "KWE1, AND KWE2 AND KWE3" is not there (or has a very low approval rating by the mainstream of users—it does not meet with strong communal consensus as being a reasonable combination). As a consequence, the inferencing engines 310' may automatically throw away the entertained first permutation (e.g., "Lincoln's Goldwater Address") as being an unreasonable/irrational one (unreasonable or lacking sanity at least to the machine system at that time) or the system will shuffle it to a bottom of a list of more likely permutations for reconsideration at a later time; and if the machine system is properly modeling a reasonable/rational person of a relevant system sub-community where that modeled person is similarly situated in a context close to that of user 301A', the rejected/downgraded keyword permutation will also be deemed unreasonable to the similarly situated reasonable person. In one embodiment, the so-called, sanity check for trial permutations (e.g., trial clusterings of keywords) includes an automated test for cross-correlation as between textual or phonetic content and nodes of a system-maintained linguistic space (see FIG. 3I). More specifically, the close mixing of an adverb and adjective (e.g., the "quickly brown fox") might indicate that something is not quite right with a trial permutation because a noun should not be normally modified by an adverb, although the present disclosure is open to the idea that new forms of cognition may arise with time wherein such rules might be properly violated once such violation is accepted by the relevant community.

In one embodiment, the inferencing engines 310' alternatively or additionally have access to one or more online search engines (e.g., Google™ Bing™) and/or Wiki-sites (e.g., Wikipedia™) and the inferencing engines 310' are configured to submit some of their entertained keyword permutations to the one or more online search engines and/or wiki engines (and in one embodiment, in a spread spectrum fashion so as to protect the user's privacy expectations by not dishing out all permutations of all CFi clusters to just one search/wiki engine) and to determine the quality (and/or quantity) of matches found so as to thereby perform a sanity check and automatically determine the likelihood that the entertained keyword permutation is a relatively valid one (e.g., one that can make semantic sense) as opposed to being a set of unrelated terms which combination is not worthy of prioritized consideration at the moment. However, in discovering that one permutation of, say plural keywords has more search engine hits than another, the inferencing engines automatically discount the popularity of shorter keyword permutations versus longer ones (ones with more terms to match) because, of course; the shorter ones are more likely to have a larger number of hits. For example, the one keyword, "Lincoln" will typically draw a much larger number of hits (matches) than the more defined, two word permutation of "Lincoln AND Address". In one embodiment, the system is configured to prefer medium sized clusters of roughly three words each (or more specifically, in the range of two words minimum and five words maximum as an example); e.g., "Lincoln AND Gettysburg AND Address" over one word clusters and over say, 7 word clusters. The reason is because it has been found that the human brain works best in building up concepts as singlets, doublets and triads of linguistic cognitions (e.g., "the"/"quick brown fox"/"jumped over").

More generally speaking, the inferencing engines 310' function as trial permutation generating engines which generate different trial permutations of clustered or otherwise grouped together CFi's or HyCFi's and then test the generated permutations for cross-correlation strengths relative to search engine results for the same trial permutations and/or for cross-correlation strengths relative to best-matched points, nodes or subregions of system-maintained/stored Cognitive Attention Receiving Spaces (CARSs), where respective cross-correlation strength scores are then assigned to the tested CFi and/or HyCFi permutations (and discounted for the unfair advantage that short permutations have over longer ones). The scored permutations are then sorted and stored as a sorted list. A subset of the scored permutations that have comparatively highest scores (after discounting for length and number of words) are then used to identify corresponding ones of the CARSs and points, nodes or subregions within them as being most likely ones of such portions of the system-maintained CARSs to which the received and test-wise clustered CFi's belong (see briefly, cluster definer 30U.12 in FIG. 3U). These results are represented in FIG. 3D by output signals 311' of the inferencing engines 310'. The corresponding, and once-clustered CFi's (the highest scoring permutations, including clusters of clusters) are then applied as search inputs into the identified portions of the system-maintained CARSs, often together with the current context-indicating signals 316_o_ so that context-relevant results (e.g., invitations to chat rooms) will next be developed and so that, optionally, clusters of clusters of the CFi's (see briefly, cluster definer 30U.14 in FIG. 3U) can next be developed with use of enlightening results produced by the first round of mappings into the various Cognitions-representing Spaces.

In terms of a more specific example, if the permutation of "Lincoln's Address" ("KWE1 AND KWE3" of the above example where KWE2 is ignored) receives the highest, post-discount cross-correlation scores, that permutation is combined with demographic context information indicating, for example, that the respective user is a Fifth Grade student now trying to do his/her history homework. The context-augmented search permutation is then applied for example, as an input vector into the topic space mapping mechanism 313" with instructions to find the best matching nodes or subregions for that context-augmented search permutation (e.g., a Fifth Grade Student doing homework re a so-called, "Lincoln's Address"). Those will likely lead to topic nodes that are relevant to the specific user and his/her current areas of focus. It is within the contemplation of the present disclosure to repeat the above for creating sorted lists of hybrid-wise clusters of clusters (e.g., "KWE1 AND KWE3" AND "URL5 AND URL7"); and then clusters of clusters of clusters and so on.

Stated in other words, eventually, the inferencing engines 310' will have automatically built up and entertained a more complex keyword permutation represented for example by "KWE1 AND KWE3 AND Context=user's current context" (e.g., "Lincoln's Address for purposes of a Fifth Grade Student") of the above given example. Then, according to this example, the inferencing engines 310' determine the probable sanity of this more complex keyword permutation by trying to find one or more corresponding nodes and/or subregions in keyword and context hybrid space (e.g., cross-correlating strongly with "Lincoln's Address") and/or many search hits from the utilized online search engines (e.g., Google™, Bing™) where some nodes and/or hits are identified as being more likely than others to be applicable, given the demographic context of the user 301A' who is being then tracked (e.g., a Fifth Grade student). This tells the inferencing engines 310' that the "KWE1 AND KWE3" permutation is a reasonable one that should be further processed (ahead of other less likely, more lowly scored permutations) by the topic and/or other mapping mechanisms (313" or others) so as to produce a current state output signal (e.g., 313_o_) corresponding to that reasonable-to-the-machine keyword permutation (e.g., "KWE1 AND KWE3") and corresponding to the then applicable user context (e.g., a Fifth Grade student who just came home from school and normally does his/her homework at this time of day). One of the outcomes of determining that "KWE1 AND KWE3" is a more likely to be valid permutation while "KWE2 AND KWE3" is not or is an unlikely to be sensible one (because KWE2 is accidentally interjected noise) is that the timing of emotion development (e.g., user 301A' becoming "anxious") can be cross-associated as likely to have begun either with the results obtained from user-supplied keyword, KWE1 or the results obtained from KWE3 but not from the time of interjection of the accidentally interjected KWE2. That outcome may then influence the degree of "heat" and the timing of "heat" cast on topic space nodes and/or subregions that are next logically linked to the keyword permutation of "KWE1 AND KWE3". Thus it is seen how the CFi-permutations testing and inferencing engines 310' can help form reasonable groupings or clusterings of keywords and/or other CFi's that deserve prioritized further processing while filtering out unreasonable groupings that will likely waste processing bandwidth in the downstream mapping mechanisms (e.g., topic space 313") without likely producing useful results (e.g., valid topic identifying signals 313_o_).

The grouped (e.g., clustered or cross-associated and thus parsed) and categorized CFi permutations are then selected and applied for further testing against nodes and/or subregions in what are referred to here as either "pure" data-objects organizing spaces (e.g., like topic space 313") or "hybrid" data-objects organizing spaces (e.g., 397 of FIG. 3E) where the nature of the latter will be better understood shortly. By way of at least a brief introductory example here (one that will be further explicated in conjunction with FIG. 3L), there may be a node in a music-context-topic hybrid space (see 30L.8 of FIG. 3L) that back links to certain subregions of topic space (see briefly 30L.8_c-e_ of FIG. 3L). (Example: What musical score did the band play just before Abraham Lincoln gave his famous "Gettysburg Address"?) If the current user's focal state (see briefly focus-identifying data object 30K.0' of FIG. 3L) points to the hybrid, in-context music-topic node, it can be automatically determined from that, that the machine system 410 should also link back to, and test out, the topic space region(s) of that hybrid node to see if multiple hints or clues (e.g., clusters of clusters of hybridized CFi's) simultaneously point to the same back-linked topic nodes and/or subregions. If they do, the likelihood increases that those same back-linked topic nodes and/or subregions are focused-upon regions of topic space corresponding to what the user 301A' is truly focused-upon and corresponding focus scores for those nodes/subregions are then automatically increased. At the end of the process, the added together plus or minus scores for different candidate nodes and/or subregions in topic space (or other space) are summed and the results are sorted to thereby produce a sorted list of more-likely-to-be focused-upon topic nodes (or subregions) and less likely ones. Thus, a current user's focus-upon a particular subregion of topic space can be determined by an automated machine means that operates with artificial intelligence (AI) types of software to arrive at context-appropriate determinations regarding what topics are more likely than not to be the areas of focus of the respective user. As mentioned above (with regard to output signal 313_o_; most likely topics), the sorted results list will typically include or be logically linked to the user-ID and/or an identification of the local data processing device (e.g., smartphone) from which the corresponding CFi streamlet arose and/or to an identification of the time period in which the corresponding CFi streamlet (e.g., KWE1-KWE3) arose. (See also briefly, CFi data structure 30U.10 of FIG. 3U.) Hence, physical context for the CFi streamlet (e.g., KWE1-KWE3) is often present and the CFi permutations testing process often works with hybridized current focus indicators (HyCFi's) in which the attention giving activities/states of the user are cross-associated with physical context representing signals (XP, generated by module 304 for example) indicative at least of current physical context of the user. Accordingly, the input planes of CFi processing mechanisms 302" and 298" in FIG. 3D are illustrated with the parenthetical notation, "(+XP)" to indicate that, in general (there can be exceptions), received CFi signals (302_e_' and 298_e_') are of the with-context-appended hybridized type of current focus indicators (HyCFi's) so that at least current physical context "(+XP)" is generally included in the consideration of which permutations of separately received CFi signals are most likely to belong together as a reasonably parsed clusterings or groupings of such received CFi signals and which are not.

Still referring to FIG. 3D, aside from the topic space mapping mechanism 313" and the context space mapping mechanism 316", only a few others of the more frequently usable ones of many possible data-objects organizing (mapping) spaces (e.g., Cognitive Attention Receiving Space mapping mechanisms) are shown in FIG. 3D. These include the then-available-to-user-content space mapping mechanism 314", the emotional/behavioral user state mapping mechanism 315", and a social interactions theories mapping mechanism 312", where the last inverted pyramid (312") in FIG. 3D can be taken to represent yet more such spaces.

Referring yet a bit longer to FIG. 3D, it is to be understood that the automated matching of STAN users with corresponding chat or other forum participation opportunities and/or the automated matching of STAN users with suggested on-topic content (or other informational resources such as topic-knowledgeable other users/experts) is not limited to having to isolate specific nodes and/or subregions in just topic space 313". STAN users can be automatically matched to one another and/or invited into same chat or other forum participation sessions on the basis of substantial commonality as between either their raw CFi signals (298e', 302e') or their normalized, clustered and/or categorized CFi's of a recent time period or the fact that their raw or normalized, clustered and/or categorized CFi's best fit with roughly same subregions in one or more of the system-maintained Cognitions-representing Spaces. In FIG. 3D, this possibility is represented by CFi's storing subregion CFiSR1 inside pyramid 302". CFi's that cluster within this one region may attach to a so-called, CFi's Collecting Node (CFiSRO 30U.0 in FIG. 3U) where the node points to associated chat or other forum participation opportunities (see fields 30U.6, 30U.7) or associated other informational resources (30U.8). In other words, just the clusterings of CFi's can be used to refer a given STAN user to another given STAN user and/or to specific online content or other informational resources (for further research) due to the substantial matching between the raw or categorized CFi's of that user in a recent time period and correspondingly cross-matched nodes and/or subregions in spaces other than topic space, such as for example, in a keyword expressions space (not shown in FIG. 3D, see instead FIG. 3E). Alternatively or additionally, STAN users can be automatically matched to one another and/or invited into same chat or other forum participation sessions on the basis of substantial commonality as between nodes and/or subregions of other-than-topic space spaces that their raw or categorized CFi's point towards (cross-correlate to with relatively high cross-correlation scores based on context as well as other attributes). The CFi's of cross-introduced STAN users do not have to point to exactly the same topic node (as an example) in topic space for the users to be introduced to one another. Instead, the CFi's can merely point to points, nodes or subregions (PNOSs) in topic space (and/or in another such space) where the pointed to PNOS's are deemed substantially close to one another in a hierarchical and/or spatial sense based on predefined closeness rules stored for the corresponding subregion of the respective space. (In other words, close enough within that context.)

Stated in alternative words, topic space is not the one and only means by way of which STAN users can be automatically joined together based on the CFi's up or in-loaded on their behalf into the STAN_3 system core from their local monitoring devices. The raw CFi's alone (298e', 302e') or normalized ones may provide a sufficient basis by themselves for automatically generating invitations and/or suggesting additional content for the users to look at. It will be seen shortly in FIG. 3E that nodes in non-topic spaces (e.g., keyword expressions space) can logically link to topic nodes and that those non-topic nodes can of themselves similarly point to associated chat or other forum participation sessions and/or associated suggestible content that is likely to be an area of current focus for the respective STAN user or; due to the non-topic nodes also pointing to cross-associated topic nodes, the non-topic nodes can thereby indirectly point (by way of the intervening topic nodes) to associated chat or other forum participation sessions and/or associated suggestible content that is likely to be on-topic.

The types of raw CFi's (298e', 302e') or normalized/categorized CFi's (2980, 3020) that two or more STAN users have substantially in common are not limited to text-based information (textual CFi's). It could instead or additionally be musical or other sound-based information that has been normalized into a primitive that represents that non-textual information (see briefly the musical primitive object 30F.0 of FIG. 3F) and the users could be linked to one another based on substantial commonality of raw or categorized CFi's which are determined to be directed to substantially same primitives and/or substantially same or similar other points, nodes or subregions in music space rather than in a text-based space (e.g., topic space). The found commonality between STAN users can more generally be based on found substantially same focused-upon nodes and/or subregions in yet other non-textual spaces like a nontextual emotions space (where said other nontextual space can be a data-objects organizing space that uses a primitives data structure such as those of FIGS. 3F-3I, for example, in a primitives layer thereof and uses operator node objects (see FIG. 3Q) for defining more complex objects in, for example, emotion space in a manner similar to one that will be shortly explained for keyword expressions space). More specifically, two or more STAN users can be automatically joined online with one another based on substantial cross-correlation of shared emotion primitives, of shared sound primitives (see briefly FIG. 3G) and so on, as obtained from their respective CFi's; where the latter can be categorized as being textual CFi's or sound-related CFi's or emotions-related CFi's and so on. Alternatively or additionally, two or more STAN users can be automatically joined online with one another based on substantial cross-correlation of voice primitives (see briefly FIG. 3H) that are obtained from their respective CFi's. Alternatively or additionally, two or more STAN users can be automatically joined online with one another based on substantial cross-correlation of linguistic primitives (see briefly FIG. 3I) that are obtained from their respective CFi's. Alternatively or additionally, two or more STAN users can be automatically joined online with one another based on substantial cross-correlation of image primitives (see briefly FIG. 3M) that are obtained from their respective CFi's. Alternatively or additionally, two or more STAN users can be automatically joined online with one another based on substantial cross-correlation of body language primitives (see briefly FIG. 3N) that are obtained from their respective CFi's. Alternatively or additionally, two or more STAN users can be automatically joined online with one another based on substantial cross-correlation of physiological state primitives (see briefly FIG. 3O) that are obtained from their respective CFi's. Alternatively or additionally, two or more STAN users can be automatically joined online with one another based on substantial cross-correlation of chemical mixture objects defined by chemical mixture primitives (see briefly FIG. 3P) that are obtained from their respective CFi's.

Referring now to FIG. 3E, the more familiar among the Cognitive Attention Receiving Spaces, namely, the topic space mapping mechanism 313' is shown at the center of the diagram. For sake of example, other mapping mechanisms are shown to encircle the topic space hierarchical pyramid 313' and to cross link with nodes and/or subregions of the topic space hierarchical pyramid 313'. One of the other interlinked mapping mechanisms is a meta-tags data-objects organizing space 395. Although its apex-region primitives are not shown elsewhere in detail, the primitives of the meta-tags space 395 may include definitions of various HTML and/or XML meta-tag constructs which generally speaking, are a form of textual sequences or symbol strings whose symbols (codings) may include non-ASCII codes in addition to or as alternatives to ASCII coded symbols. CFi streamlets that include various combinations, permutations and/or sequences and/or chronological overlaps of meta-tag strings may be categorized by the machine system 410 on the basis of information that is logically linked to relevant ones of the nodes and/or subregions of the meta-tags space 395. More specifically, a meta-tag which indicates certain HTML content is to be highlighted by bolding, blinking, changing colors, etc. may logically link to representations of cognitions related to attention "getting" activities.

Yet another of the other interlinked mapping mechanisms shown in FIG. 3E is a keyword expressions space 370, where the latter space 370 is not illustrated merely as a pyramid, but rather the details of an apex portion and of further layers (wider and more away from the apex layers) of that keyword expressions space 370 are illustrated. Keyword expressions are another example of textual sequences or symbol strings whose symbols may include non-ASCII codes in addition to ASCII coded symbols, although typically they will include text strings (e.g., alphanumeric sequences). The "apex" layer or layers of the keyword expressions space 370 are also referred to herein as the primitive expressions clustering layer(s). More generally, for each of the cognition mapping mechanisms shown in FIGS. 3D-3E to be represented by an inverted pyramid, the at- or near-"apex" layer or layers may be referred to as the primitive expressions (or symbols or codings) clustering layer(s) of that mapping mechanism while the closer-to-base layers may be seen as containing clusterings of more complex representations of cognitions that build upon and build with the representations of more primitive cognitions representing "apex" layers. Representations which are clustered substantially close together (in a hierarchical and/or spatial sense) in a respective cognition mapping mechanism may be deemed to represent cognitions that are substantially same or similar to one another in a given kind of cognitive sense. Very briefly and as an example, say one primitive expression in keyword space 370 contains the symbols sequence, "Ab* Lincoln" where the asterisk is a wild card symbol such that Ab* can represent both of "Abraham" and "Abe". Say as part of the brief example, another primitive expression contains the symbols sequence, "16th US President". In one sense, both refer to the same persons and thus to the same cognitive sense, namely, that of Abraham Lincoln and he being the 16th US President. In one embodiment, the two symbol sequences, "Ab* Lincoln" and "16* U*S* President" would be clustered substantially close to one another in keyword space 370 (and/or in topic space) because they both may be deemed to represent respective cognitions that are substantially same or similar to one another in a given kind of cognitive sense. An example of a coded representation for a more complex cognition might be as follows: "(Ab* Lincoln) OR (16* U*S* President) AND (Civil War)".

Before describing yet further details of the illustrated keyword expressions space 370, a quick return tour is provided here through the hierarchical, and plural tree branches-containing, structure (e.g., having the "A" tree, the "B" tree and the "C" tree intertwined with one another) of the topic space mechanism 313'. In the enlarged portion 313.51' of the space 313' as shown in FIG. 3E, a mid-layer topic node named, Tn62 (see also the enlarged view in FIG. 3X) resides on the "A" tree; and more specifically at a respective position along the horizontal branch number Bh(A)6.1 of the "A" tree but not on the "B" tree or on the "C" tree. Only topic nodes Tn81 and Tn51 of the exemplary hierarchy reside on the "C" tree. Topic node Tn51 is the immediate parent of node Tn62, and that parent links down to its child node, Tn62 by way of vertical connecting branch Bv(A)56.1 and horizontal connecting branch Bh(A)6.1. Other nodes (filled circle ones) hanging off of the "A" tree branch Bh(A)6.1 also reside on the "B" tree and hang off the latter tree's horizontal connecting branch Bh(B)6.1, where the B-tree branch is drawn as a dashed horizontal line in FIG. 3E.

Additionally, in FIG. 3E, topic node Tn61 is a parent to further children hanging down from, for example, "A" tree horizontal connecting branch Bh(A)7.11. One of those child nodes, Tn71, reflectively links to a so-called, operator node 374.1 in keyword space 370 by way of reflective logical link 370.6. Another of those child nodes, Tn74, reflectively links to another operator node 394.1 disposed in URL space 390 by way of reflective logical link 390.6. As a result, the second operator node 394.1 in URL space 390 is indirectly logically linked by way of sibling relationship on horizontal connecting branch Bh(A)7.11 to the first mentioned operator node 374.1 that resides in the keyword expressions space 370.

Parent node Tn51 of the magnified portion 313.51' of the topic space mapping mechanism 313' has a number of chat or other forum participation sessions (forum sessions) 30E.50 currently tethered to it either on a relatively strongly anchored basis (whereby a breaking off from, and drifting away from that mooring is relatively difficult) or on a relatively weak anchored basis (whereby a stretching away from, and/or a breaking off of the corresponding forum (e.g., chat room) and a drifting away from that mooring point Tn51 is relatively easier). Recall that members of chat rooms and/or other forums can vote to drift apart from one topic center (TC) and to more strongly attach one of their anchors (figuratively speaking) to a different topic centers as forum membership and circumstances change. In general, topic space 313' can be a constantly and robustly changing combination of interlinked topic nodes and/or topic subregions whose hierarchical organizations, names of nodes, governance bodies controlling the nodes, and so on can change over time to correspond with changing circumstances in the virtual and/or non-virtual world and the chat or other forum participation sessions attached to those plastic-wise re-configurable topic nodes or subregions can also change robustly.

The illustrated plurality of forum sessions, 30E.50 are servicing a first group of STAN users 30E.49, where those users are currently dropping their figurative anchors onto those forum sessions 30E.50 and thereby 'touching' topic node Tn51 to one extent of cast "heat" energy or another (e.g., casting attention giving energies on that node) depending on various "heat" generating attributes (e.g., duration of participation, degree of participation, emotions and levels thereof detected as being associated with the chat room participation and so on). Depending on the sizes and directional orientations of their halos, some of the first users 30E.49 may apply a halo-extended 'touching' heat to child node Tn61 or even to grandchildren of Tn51, such as topic node Tn71. Other STAN users 30E.48 may be simultaneously 'touching' other parts of topic space 313' and/or simultaneously 'touching' parts of one or more other spaces, where those touched other spaces are represented in FIG. 3E by pyramid symbol 30E.47. Representative pyramid symbol 30E.47 can represent keyword expressions space 370 or URL expressions space 390 or a hybrid keyword-URL expressions space (380) that contains illustrated node 384.1 or any other data-objects organizing space.

Referring to now to the specifics of the keyword expressions space 370 of the embodiment represented by FIG. 3E, a near-apex layer 371 of what in its case, would be illustrated as an upright pyramid structure, contains so-called, "regular" keyword expressions. An example of what may constitute such a "regular" keyword expression would be a string like, "??? patent*" where here, the suffix asterisk symbol (*) represents an any-length wildcard which can contain zero, one or more of any characters in a predefined symbols set while here, each of the prefixing question mark symbols (?) represents a zero or one character wide wildcard which can be substituted for by none or any one character in the predefined symbols set. Accordingly, if the predefined symbols set includes the letters, A-Z and various punctuation marks, the "regular" keyword expression, "???patent*" may define an automated match-finding query that can be satisfied by the machine system finding one or more of the following expressions: "patenting", "patentable" "nonpatentable", "un-patentable", nonpatentability" and so on. Similarly, an exemplary "regular" keyword expression such as, "???obvi*" may define an automated match-finding query that can be satisfied by the machine system finding one or more of the following expressions: "nonobvious", "obviated" and so on. The wildcard symbols need not be limited to these specific ones. In a later described data structure (see briefly 30W.0 of FIG. 3W) it will be seen how the definitions of what symbols serve as wild cards or not may be varied. A Boolean combination expression such as, "???patent*" AND "???obvi*" may therefore be satisfied by the machine system finding one or more expressions such as "patentably unobvious" and "patently nonobvious". These are of course, merely examples and the specific codes used for representing wild cards, combinatorial operators and the like may vary from application to application. The "regular" keyword expression definers may include mandates for capitalization and/or other typographic configurations (e.g., underlined, bolded and/or other) of the one or more of the represented characters and/or for exclusion (e.g., via a minus sign) of certain subpermutations from the represented keywords.

In one embodiment, the "regular" keyword expressions of the near-apex layer 371 come to be spatially clustered around keystone expressions and/or are clustered according to Thesaurus-like senses of the words that are to be covered by the clustered keyword primitives. By way of example, assume again that a first node 371.1 in primitives layer 371 defines its keyword expression (Kw1) as "*lincoln*" where this would cover "Abe Lincoln", "President Abraham Lincoln" and so on, but where this first node 371.1 is not intended to cover other contextual senses of the "*lincoln*" expression such as those that deal with the Lincoln™ brand of automobiles or the city of Lincoln, Nebr. Instead, the "*lincoln*" expression according to one of those other senses would be covered by another primitive node 371.5 that is clustered elsewhere (371.50) in addressable memory space near nodes (371.6) for yet other keyword expressions (e.g., Kw6?*) related to that alternate sense of "Lincoln".

The clustering center point (a COGS) 371.50 of the alternate sense, "*lincoln*" expression 371.5 is a point or small subregion in the space of the primitive cognitions layer 371 of keyword space 370 to which that alternate sense expression, "*lincoln*" (371.5) is anchored. Unlike the keyword node 371.5 (Kw1'="*lincoln*", but in another cognitive sense), the clustering center point (COGS) 371.50 is not given a specific name or other articulable attributes by system users. Instead, this data object (the COGS 371.50) operates like a shadowy entity that represents a cognitive sense, where the represented COGnitive Sense (where the capitalized letters explain where the acronym COGS comes from) is inferred from the keyword nodes closest to it and where the distances (hierarchically and/or spatially speaking) of the clustered-about nodes relative to the given, cognitive-sense-representing clustering center point (e.g., COGS 371.50) indicates how close in a cognitive sense way, the cognitive senses of the respective nodes are to that of the center point (e.g., COGS 371.50). In other words, the first mentioned Kw1 of the given example, "*lincoln*" (371.1) represents "*lincoln*" taken according to a respective, first cognitive sense (e.g., the 16th President of the United States or 16th POTUS) while the second mentioned Kw1' of the given example, "*lincoln*" (371.5) represents "*lincoln*" taken according to a respective, second and different cognitive sense (e.g., the Lincoln™ brand of automobiles or the city of Lincoln, Nebr.) and the shadowy, cognitive-sense-representing clustering center points (e.g., 371.0, 371.50) which are most closely disposed (hierarchically and/or spatially) to the respective keyword nodes that have a same keyword expression (e.g., "*lincoln*") but different cognitive senses for the same, respectively represent the cognitive sense but without providing an "expression" (e.g., Lincoln, the 16th President; or Lincoln, the automobile brand) for that cognitive sense. Instead, each of cognitive-sense-representing clustering center points 371.0 and 371.50 respectively draws its represented cognitive sense from the keyword expressing nodes (e.g., Kw1, Kw2, Kw1' Kw6) closest to it. It is essentially a symbiotic relationship. The one or more closest COGS (e.g., 371.50) adjacent to a given keyword node gives a cognitive sense form of spin to the keyword expression (e.g., "*lincoln*") of that node while the one or more closest keyword nodes (e.g., Kw1' Kw6) to a given COGS (e.g., 371.50) inferentially give cognitive sense to that COGS (e.g., 371.50). If system users vote to add-to or delete or move the keyword nodes (e.g., Kw1' Kw6) that are closest to a given COGS (e.g., 371.50), such a user-driven change can alter the inferred cognitive sense of the corresponding COGS. On the other hand, if system users vote to add or delete or move the closest COGS's that surround a given keyword node (e.g., Kw2), such a user-driven change can alter the cognitive sense spin that is projected onto the keyword expression (e.g., "*lincoln*") of that node by the nearest cognitive-sense-representing clustering center points (COGS's).

The hierarchical and/or spatial space of the primitive cognitions layer 371 shown in FIG. 3E can be 2-dimensional, 3-dimensional or of greater dimensionality and/or it can have a hierarchical organization wherein PNOS-type points, nodes or subregions thereof are linked in accordance with a hierarchical tree structure. In one embodiment, hierarchical and/or spatial distance away from a given clustering center point (COGS, e.g., 371.50) indicates how dissimilar, far away, or unlike the inferred cognitive sense of the clustering center point 371.50 is the cognitive sense of each expression (e.g., Kw6?*) 371.6 that is disposed in that primitive cognitions layer 371 of the keyword space 370. In other words, other keyword expressions that are anchored relatively close to, or at zero distance from the given clustering center point 371.50 are respectively deemed to be correspondingly similar to, or same as, in a cognitive sense of the other keyword expressions (e.g., Kw6?*, 371.6) while those that are calculated to be farther away (hierarchically and/or spatially) are deemed to be proportionally more distant or dissimilar in terms of their respective cognitive senses.

In terms of a more concrete example, assume that the cognitive sense of, as well as the expressional equivalent of the alternate sense expression, "*lincoln*" (371.5) is "Lincoln, Nebr.; the City of". Assume that the cognitive sense of, as well as the expressional equivalent of the nearby Kw6 expression node 371.6 is "Nebraska; The Capital City of". It turns out that Lincoln Nebr. is the Capital City of the State of Nebraska. Therefore, although the expressions "Lincoln, Nebr.; the City of" and "Nebraska; The Capital City of" are not the same expressions, under a cognitive sense analysis they refer to substantially the same cognitive concept. Hence the hierarchical and/or spatial distance between points, nodes or subregions 371.5 and 371.6 should be approximately zero. In one embodiment, a relative pointer 371.56 that logically links node 371.5 (Kw1') to node 371.6 (Kw6) includes an indication of how far away, hierarchically and/or spatially, from starting position 371.50 (the clustering center point) is the nearby node 371.6 (Kw6). In this case, the first exemplary node 371.5 (Kw1') is assumed to be positioned dead center on top of clustering position 371.50 (the clustering center point or COGS). The nearby other node 371.6 (Kw6) is deemed to be slightly spaced apart, and in a corresponding direction, from the clustering center position 371.50 (a relative origin). The data that represents relative pointer 371.56 may also include an indication of the location in system memory where the nearby expression Kw6 (371.5) is stored as well as hierarchical and/or spatial vector indicating how far away and in what direction the nearby expression Kw6 (371.5) is displaced relative to the center point expression Kw1' (371.5).

In similar fashion, the first used example of keyword expression Kw1 (node 371.1), where its expression, "*lincoln*" is determined by communal consensus to refer to the Abraham Lincoln sense of that expression, is located dead center over different clustering center point 371.0. A relative distancing and direction pointer 370.12 (which like other pointers discussed herein is understood to be a stored physical signal pointing to a stored other physical signal, e.g., the one representing second keyword Kw2) is provided to indicate that the second keyword expression Kw2 has a substantially same or similar cognitive sense as does the first keyword expression Kw1 even if the second keyword expression Kw2 is substantially different from the first keyword expression (e.g., "16th USA President" versus "Ab* Lincoln"). (Because illustration space is relatively tight in FIG. 3E, some concepts relating to cognitive sense center points, e.g., COGS's 371.0 and 371.50 and to vectors pointing away therefrom (e.g., 371.56 or 370.12) and to other kinds of pointers (371.52) will be discussed while referring to one rather than the other. However, it is to be understood that the generic aspects of the descriptions apply to both.)

As indicated by the above, each respective, clustering center point (e.g., COGS's 371.0 and 317.50—each represented in FIG. 3E by a cross hatched ellipse) may provide a Thesaurus like or semantic type of contextual flavor to the various expressions (e.g., Kw1, Kw1') that are positioned either directly over the respective center points and to the other keyword expressions that are hierarchically and/or spatially disposed as spaced apart but clustered nearby and around the respective clustering center point (e.g., 371.0 or 317.50). It is left up to respective governance bodies (a.k.a. herein as relevant communities) who are in charge of the different subregions of the context space to determine what Thesaurus like or semantic type or other cognitive sense is applied by the respective clustering center point (e.g., 371.0 or 317.50) and this is done by how they position the various nodes nearby to the given COGS. More specifically, these cognitive senses are implicitly defined when the hierarchical and/or spatial positions of the consensus-wise created clustering center points (e.g., 371.0 or 317.50) are created by, or revised by corresponding controlling communities of users (a.k.a. governance bodies) and when the various keyword expressions (e.g., Kw1, Kw1') are positioned either directly over or nearby the respective center points (COGS's) and/or when so-called, operator nodes (see 372.1) are operatively coupled to the primitive layer expressions having the different cognitive senses and/or when so-called, operator nodes (see 372.1) are operatively positioned (hierarchically and/or spatially) adjacent to their own nearby cognitive-sense-representing clustering center points (COGS's, not shown for the illustrated operator nodes due to space limitations in the drawings).

As mentioned, each consensus-wise created or communally-updated clustering center point (e.g., 371.0 or 317.50) has assigned to it a respective hierarchical and/or spatial position in the space of the corresponding Cognitions-representing Space or subregion thereof (e.g., keyword expressions primitives layer 370). Each clustering center point (e.g., 371.0 or 317.50) also has assigned to it a first creation date indicating time stamp and optionally, a list of later position and/or cognitive sense modification dates. Each clustering center point (e.g., 371.0 or 317.50) further has assigned to it a primary expression pointer (not shown) that points to the one keyword expression (e.g., Kw1 371.1) that is deemed by the controlling community to be the expression which is most closely linked with the respective clustering center point (e.g., 371.0). Each clustering center point (e.g., 371.0 or 317.50) may further have assigned to it, one or both of re-direction and expansion pointers 371.52 (both represented by the one arrowed line in FIG. 3E, see also 30W.7ERR of FIG. 3W).

After a clustering center point (e.g., 371.0 or 317.50) is first created by a corresponding governance body and the hierarchical and/or spatial areas around it are populated by associated keyword expressions (e.g., Kw2, Kw3, Kw4, etc.) it may become desirable to add yet further keyword expressions in same close proximity with the cognitive sense represented by the first created center point (e.g., 371.0). However, it may become inconvenient or impractical or otherwise not proper to crowd all the new keyword expressions around the same center point (e.g., 371.0). Instead, it may become desirable to create a "twin" (e.g., 371.51) of the first created center point (e.g., 371.50) in another location of memory. This may be done with use of a so-called, center point "expansion" pointer 371.52 (see also 30W.7ERR of FIG. 3W). The latter points bi-directionally as between the earlier created original (e.g., 371.50) and later-in-time created twin (e.g., 371.51) and also provides a date stamp as to when the twin was created. Keyword expressions that attach to the later-in-time created twin (e.g., 371.51) inherit the creation date of that twin rather than the creation date of the original center point (e.g., 371.50). Therefore it becomes possible with this data structure to determine the timing of the cognitive sense that is attached to a given newer keyword expression as opposed to the perhaps slightly different, cognitive sense that is attached to an earlier created keyword expression. Also, legacy hierarchical and/or spatial assignments may be preserved.

Alternatively or additionally after a clustering center point (e.g., 371.0 or 317.50) is first created by a corresponding governance body and the hierarchical and/or spatial areas around it are populated by associated keyword expressions (e.g., Kw2, Kw3, Kw4, etc.) it may become desirable to drastically change the keyword expressions associated with that earlier-in-time center point (e.g., 371.50) and/or to drastically change the hierarchical and/or spatial distancings between the surrounding keyword expressions and the center point (e.g., 371.50). At the same time, it may be desirable to preserve legacy structures. Accordingly, rather than erasing an originally created structuring of clustering center points (e.g., 371.0 or 317.50) and surrounding expression nodes thereof (e.g., Kw1 and Kw1'), a re-directing pointer (represented by the same link 371.52 as used for the expansion pointer, see also 30W.7ERR of FIG. 3W) may be attached to each originally created center point (e.g., 371.50) and that time stamped, "re-directing pointer" 371.52 is understood by the system software to mean, don't use this center point but rather jump to the next (newer) center point (e.g., 371.5) and use that next (newer) center point as if it were this center point. Re-directing pointers can of course be cascaded to form a linked list that redirects a software action originally directed to an original center point to instead be applied to a substitute center point created many levels later. In this way the system can adapt to ever changing cognitive senses and sentiments (over time and/or user populations) of its evolving user base. One of the redirected software actions may be one where the software is accessing keyword expressions located hierarchically and/or spatially a given distance away from and/or in a given direction away from the originally specified center point (COGS). In other words, if the software is instructed to fetch all keyword expression nodes disposed within X distance from the identified center point (e.g., COGS 371.50) and redirection is in effect, the software will instead fetch all keyword expression nodes disposed within X distance from the alternate center point (e.g., 371.51) to which it was redirected by pointer 371.52. This allows legacy software to transparently access that latest (most up to date) communally created and communally updated version of keyword space (KWs 370) even though the legacy software code tells it to reference the earlier in time and originally created keyword center point (e.g., 370.50). Incidentally, although the data objects representing cognitive-sense-representing clustering center points (COGS's) do not have textual expressions defining their respective cognitive senses, they do each have a unique center point identifying field (not shown, see instead 30T.1*b* of FIG. 3Ta as being an equivalent) so that the COGS's can be uniquely identified even if they have moved about hierarchically and/or spatially within their respective Cognitions-representing Space (e.g., keyword expressions space 370 of FIG. 3E). As a result, the system has an adaptively updateable, expressions, codings, or other symbols clustering layer (e.g., 371) that may be transparently updated by means of expansion and/or re-direction without having to change the legacy software that references it.

In one embodiment, each primary keyword expression node (e.g., Kw1 371.1) of a respective first clustering center point includes a linked list pointer pointing to the next node having a same or substantially same keyword expression but located in a different clustering area. For example, linked list pointer 371.49 may link from the node (371.1) of expression Kw1 to the node (371.5) of identical expression Kw1' (node 371.5 which is located over different clustering center point 371.50). The latter node would have a similar linked list pointer (not shown) pointing to the next node also having the same keyword expression (e.g., "*lincoln*") but a different cognitive sense represented by a respective other clustering center point (not shown). In one embodiment, the linked list pointers (e.g., 371.49) also each include a pair of expression ranking values that rank the expressions at the terminal ends of the respective linked list pointer according to which is the most popular cognitive sense for that expression and which is the least. For example, the expression, "911" may have earlier had the cognitive sense of an emergency phone number as its number one ranked sense, However, after September 2001 the World Trade Center attack becomes the new number one ranked sense, System software can quickly scan through the linked list of pointers to find the current, top N cognitive senses for a given expression, where N can be 1, 2, 3, . . . here.

While clustering center points (e.g., 371.0, 371.50, 371.51) have been described thus far as providing, in one instance, a Thesaurus like or semantic type of flavoring to the keyword(s) overlaid directly on top of, or disposed hierarchically and/or spatially nearby to the respective clustering center point (e.g., keyword nodes 371.1, 371.5 and 371.6), more generally speaking, clustering center points (COGS's) can be used to imply other kinds of cognitive senses to respective PNOS-type points, nodes or subregions of other types of Cognitions-representing Spaces (e.g., music space, emotion space, historical events space) where there is no easy way (or any way) to articulate a communal "sense" that a relevant community cognitively attributes to the PNOS's that are disposed hierarchically and/or spatially in close proximity with each respective clustering center point (COGS). More specifically and for example, certain ones of advertising jingles or popular show tunes or movie scenes may evoke in a relevant community (e.g., a specific demographic group) a particular cognitive sensation that cannot be easily described with words and yet, when two or more of those advertising jingles or popular show tunes or movie clips are played to that demographic audience as representative examples of the cognitive sense, the audience knows it when it hears it (or knows it when they see it, this referring to the played video clips). Yet more specifically, and in the case of an American audience, the showing of a first image depicting the raising of the American flag at Iwo Jima, a second image depicting George Washington crossing the Delaware River and a third image depicting George W. Bush with a bullhorn at the attacked World Trade Center site soon after 9/11 may evoke certain emotions of patriotic pride and yet that cognitive sense cannot be easily put into words. In accordance with the present disclosure, nodes representing images such as these (and/or movie clips of this kind) may be closely clustered in a respective imagery space (see for example primitive data object 30M.0 of FIG. 3M) over or substantially close to a respective clustering center point (COGS) that directly represents the unarticulated cognitive sense (e.g., one associated with patriotic American pride as a nonlimiting example).

An example use for such a clustering center point is as follows. Assume that a user of the STAN_3 system recalls the imagery of the raising of the American flag at Iwo Jima (World War II) as one example that evokes patriotic pride and the crossing of the Delaware as a second "of its kind", but the user does not remember yet further examples and the user wants to identify such further examples as understood by a given sub-community among system users. To this end the user instructs the STAN_3 system to find for him (or her) a closely clustered group of images in a system-maintained Image-type Cognitions-representing Space where two of the closely clustered representations of images (imagery nodes) are the ones for the recalled cases of Iwo Jima and the crossing of the Delaware. In response, the system automatically searches the given Cognitions-representing Space (and/or other interrelated spaces) for one or more clustering center points (COGS's) that have two such images in close proximity thereto, or overlaid directly on that found one or more clustering center points. More specifically, such a found clustering center point may additionally have adjacent thereto, images of specific events taking place at the Arlington Cemetery, or in front of the Lincoln Memorial, or with the Statue of Liberty as a backdrop, and so on. In other words, the system can automatically find others "of its kind" (as defined by respective user sub-communities) once a cognitive sense is hinted at by two or more user-provided examples that fit under the vague specification of, find for me more "of its kind" like these two or more examples. Stated otherwise, a given user sub-community may communally cross-associate in its communal mind, certain imageries, songs, historical events, etc. that belong together because they satisfy a perhaps-unarticulable cognitive sense (e.g., a communal "common sense"). The here-disclosed clustering center points enable the clustering together of such communally cross-associated items about respective clustering center points (COGS's) even if there is no one clear topic or central keyword expression or other specifiable other node that can tie the loose ends together just as well.

In one embodiment, the postionings in system memory of clustering center points are defined by absolute (long form) address pointers (e.g., stored in a lookup table (LUT) that cross-associates the COGS unique ID with its memory storage address and its hierarchical and/or spatial positioning) while the postionings in system memory of keyword nodes (e.g., 371.1, 371.2) clustered around that center point are defined by relative (short form) address pointers that use the center point address as a base. As a result, the bit lengths of digital pointers (memory address references) that point to the keyword primitives can be made relatively short while just one long-form base address is used for pointing to the corresponding clustering center point (e.g., 371.0).

Alternatively or additionally after a clustering center point (e.g., 371.0 or 317.50) is first created by a corresponding governance body and the hierarchical and/or spatial areas around it are populated by associated keyword expressions (e.g., Kw2, Kw3, Kw4, etc.), thereby defining relative distances between the various keyword nodes, it may become desirable to alter those represented distances. However, locations in hierarchical and/or spatial space are already defined for the originally created and center point surrounding nodes. In one aspect of the present disclosure, rather than changing the defined locations in hierarchical and/or spatial space of the already formed nodes, an altered distance calculating file or record is added to the definition of the clustering center point. The altered distance calculating file or record is represented by symbol 371.56 (but see also 30W.7ERR of FIG. 3W) and it may call for calculating of effective distances in various linear or nonlinear and/or condition based ways. Such altered distance calculations may include the use of one or more lookup tables (LUT's). Accordingly, if a legacy software module is instructed to access keyword expressions located hierarchically and/or spatially a given distance away from and/or in a given direction away from an originally specified center point, the distance (and angular direction) recalculating file/record is automatically consulted and is used to redefine the distance that are calculated (and/or looked up via LUT's) for respective keyword nodes. In other words, if the software is instructed to fetch all keyword expression nodes disposed within distance X from the identified center point (e.g., 371.50) or from another point whose position is specified relative to the identified center point and the distance recalculation/look-up functionality is in effect, then the software will instead fetch all keyword expression nodes disposed within a different X' (prime) distance, where that primed distance is computed (e.g., obtained with aid of lookup tables) according to the alternate distance calculating scheme (e.g., 371.56) attached to the specified clustering center point. This allows legacy software to transparently access the latest (most up to date) communally defined version of keyword space (KWs 370) per communally re-defined spacings between keyword-expression holding nodes (this includes operator nodes like 372.1) even though the legacy software code tells it to use a distance specified earlier in time and per the originally positioned keyword nodes. As a result, the system has an adaptively updateable, expressions, codings, or other symbols clustering layer (e.g., 371) that may be transparently updated without having to change the legacy software that references it or the originally specified positionings of the keyword expression holding nodes.

Assume for sake of a more concrete example of how primitives may be combined by operator nodes that the illustrated second keyword node 371.2 is disposed in the primitives holding layer 371 fairly close, in terms of spatial and/or hierarchical clustering (and optionally also in terms of memory address number) to the location assigned to the first keyword expression-holding node 371.1. Assume moreover, that the keyword expression (Kw2) of the second node 371.2 covers the expression, "*Abe" and by so doing (with asterisk in front) it covers the permutations of "Honest Abe", "President Abe" and perhaps many other such variations. As a result, the Boolean combination calling for Kw1 AND Kw2 may be found in many of so-called, "operator nodes" for representing cognitions such as those related to "Honest President Abe Lincoln" and the like. An operator node, as the term is used herein, is provided and functions somewhat similarly to an ordinary expression-containing node in a hierarchical tree structure (and it inherits some attributes of its base or parent node(s)—see FIG. 3Q) except that it generally does not store directly within it, all the definitions of its intended, combined-primitive attributes. More specifically, if a first operator node 372.1—which node is shown disposed in a sequences/combinations layer 372 of FIG. 3E—were an ordinary primitive node rather than an operator node, that primitive node would directly store within it, the textual expression, "*lincoln* AND *Abe" (if the Abe Lincoln example is continued here). However, in accordance with one aspect of the present disclosure, operator node 372.1 contains references to one or more predefined functional "operators" (e.g., AND, OR, NOT, parenthesis, Nearby(number of words), After, Before, NotNearby( ), NotBefore, and so on) and it contains pointers as substitutes for variables that are to be operated on by the referenced functional "operators". One of the pointers (e.g., 370.1) can include a long or absolute or base pointer having a relatively large number of bits and pointing to a predefined, clustering center point 371.0 while another of the pointers (e.g., 370.12) can be a short or relative or offset pointer having a substantially smaller number of bits because it uses the clustering center point 371.0 as a base for its represented offset value. This scheme allows the memory space consumed by various combinations of primitives (two primitives, three primitives, four, . . . 10, 100, etc.) to be made relatively small in cases where the plural ones of the pointed-to primitives (e.g., Kw1 and Kw2) are clustered together (spatially, hierarchically and/or address-wise) in the primitives holding layer (e.g., 371) around a same clustering center point (e.g., 371.0). In other words, rather than using two long-form pointers, 370.1 and 370.2 (the latter being shown for purpose of comparison, offset 370.12 is preferably used instead) to define the "AND"ed combination of Kw1 and Kw2, the first operator node 372.1 may contain just one long-form pointer, 370.1, and associated therewith, one or more short-form pointers (e.g., offset 370.12) that point to the same clustering region of the primitives holding layer (e.g., 371) but use the one long-form pointer (e.g., 370.1) as a base or reference point for addressing the corresponding other primitive object (e.g., Kw2 371.2) with a fewer number of bits because the other primitive object (e.g., Kw2 node 371.2) is typically clustered in a Thesaurus like or semantic contextual like clustering way around a clustering center point to which one or more keystone primitives (e.g., Kw1 node 371.1) are directly tied. In one embodiment, the relative offset pointer 370.12 (but see also 371.56) functions as a distance indicator because its offset from the clustering center point 371.0 can also represent distance in hierarchical and/or spatial space from the clustering center point.

While FIG. 3E shows pointers such as 370.1, 370.4, 370.5 etc. pointing upwardly in the hierarchical tree structure, it is to be understood that the illustrated hierarchical tree structure is navigatable in hierarchical down, up and/or sideways directions such that children nodes can be traced to and from their respective parent nodes, such that parent nodes can be traced to and from their respective child nodes and/or such that sibling nodes can be traced to and from their co-sibling nodes. In the illustrated example, operator node 372.1 is a child of the two parent nodes, 371.1 (Kw1) and 371.2 (Kw2) from which it inherits at least some of its internalized data. Pointers 370.1 and 370.2 point backwards to indicate the sources of the inherited, and thus incorporated by such reference data. However, from a hierarchical tree perspective, operator node 372.1 is the child of its two parent nodes, 371.1 (Kw1) and 371.2 (Kw2).

It is stated above that, often, keyword expressions (e.g., Kw1 371.1 and Kw2 371.2) come to be clustered together spatially and/or hierarchically next to one another and near a clustering center point (e.g., 371.0). But the mechanisms that can cause this close clustering together of nodes to happen have not been fully explained above yet. One option is that the spatial (e.g., in keyword space) and/or hierarchical (e.g., within a keyword 'A'-tree) clustering together of semantically belonging-together keyword expressions is initially established on a permanent or modifiable basis by manual intervention by system operators and/or by trusted system users who have been granted privileges to manually assign spatial and/or hierarchical locations to all or a pre-specified subset of initial points, nodes or subregions of one or more Cognitive Attention Receiving Spaces (e.g., keyword expressions space). In that case, the so-privileged system operators/trusted users may organize the spatial and/or hierarchical placements of cognition-representing primitive and some higher level data-objects (e.g., keyword expressions) such that those that sensibly belong together are clustered together. More specifically, system operators and/or trusted system users may initially populate a primitives layer of a textual cognition space (e.g., keyword space, URL space, etc.) with multiple and spaced apart copies of textual expression clustering center points (e.g., 370.1, 371.50, etc.) paired directly with respective textual expression nodes (see FIG. 3W) containing the textual expression, "*lincoln*" where a first of such operator created pairing of a clustering center point and its directly overlying keyword node is assigned to the Abraham Lincoln sense of "*lincoln*"; where a second of such operator created, pairing of a clustering center point and overlying keyword node is assigned to the Lincoln, Nebr. sense of "*lincoln*"; where a third of such operator created, pairing of a clustering center point and overlying keyword node is assigned to the Lincoln Car Dealerships sense and so on.

Alternatively or additionally, the spatial and/or hierarchical placements of cognition-representing data-objects such as the keyword expression representing ones (e.g., 371.1, 371.2, 373.1), URL expression representing ones (e.g., 391.2, 394.1), meta-tag expression representing ones (not explicitly shown—see 395) are voted on by one or more direct or indirect voting mechanisms, where the vote is for continued approval of a current placement or for moving to a newly proposed placement, and/or continued approval of the current way the expression is expressed or for changing to a newly proposed way of expressing it (with characters or other symbols or codes). In response to such voting, the STAN_3 system automatically and responsively modifies the spatial and/or hierarchical placements of cognition-representing data-objects and/or of their contained expressions according to results of such voting mechanisms. One example of indirect (implicit) voting is when, as a result of a chat or other forum participation session, a subset of keyword expressions (e.g., 371.1, 371.2, 373.1) are determined to be the top N keywords now most popular with participants of the forum; in which case the popularity-wise clustered set of keyword expressions may be given corresponding nudges towards becoming clustered closer together (not necessarily over a clustering center point such as 371.0) in terms of their spatial and/or hierarchical placements within the corresponding Cognitive Attention Receiving Space (e.g., keyword expressions space). If enough chat or other forum participation sessions give cumulative nudges in a same direction to one or more such keyword expression holding nodes (e.g., 371.1, 371.2), the system responds by moving them closer together in the spatial and/or hierarchical placement sense. In accordance with one aspect of the present disclosure, some keyword expression holding nodes (e.g., 371.1) may be assigned a greater anchoring strength at their current position than others. As a result, when certain keywords are determined to have increased commonality with each other such that they merit being nudged closer together, the one with the greatest anchoring strength moves the least and the others therefore move toward its original location in hierarchical and/or spatial space. (The concept of anchoring will be discussed at greater length below in conjunction with 30R.9*d* of FIG. 3R.)

While co-popularity among all users (or among a pre-specified subset of users; e.g., expert users) is one basis for nudging together into closer co-clustering with one another and in a corresponding hierarchical and/or spatial space of certain keyword expressing nodes (e.g., 371.1, 371.2, 373.1 as one example, but could be other nudged together points, nodes or subregions in other Cognitive Attention Receiving Spaces as a more general example), it is within the contemplation of the present disclosure to have oppositely acting mechanisms that nudge apart (and thus de-cluster in a spatial or hierarchical sense) certain groups of cognition representing data objects one from another. A more specific example will be given by way of section 30T.12*e*8 of FIG. 3Tb (to be described). For sake of a simple example here, let it be assumed that one user in one chat room has proposed that the keyword expression. "Goldwater" should be clustered together with the keyword expressions for Abe-Lincoln and Gettysburg Address. Let it be assumed that essentially all other involved users voted strongly (e.g., with great emotional intensity) against the idea. In other words, they were indicating that the keyword expression, "Goldwater" is greatly disliked (despised, negatively viewed) among a super-majority (e.g., 67% or more) of involved users and thus they were voting for nudging the keyword expression, "Goldwater" far away in spatial and/or hierarchical space from the keyword expressions that overlie the co-related cognitions of Abe-Lincoln and Gettysburg Address. (Clustering center points such as 371.0, 371.50 and 371.51 are the data objects that implicitly represent the underlying cognitive sentiments of their directly overlying expression nodes, although those underlying cognitive sentiments do not have to be explicitly spelled out. They can be implied by the placement of their directly overlying and/or further spaced away, expression-holding nodes.) As a consequence of a placement proposal and votes for or against it, if enough users (e.g., a number greater than a predetermined threshold) vote negatively against the proposal and/or if enough highly-influential experts (who may be given greater voting weights) vote implicitly or explicitly in such a negative or de-clustering direction, then the system will respond by automatically moving the keyword expression node for "Goldwater" (not shown in FIG. 3E) farther away in the spatial and/or hierarchical placement sense from the other clustered together data objects (e.g., 371.1, 371.2) which better represent the cognitive concepts of Abe-Lincoln and Gettysburg Address (as an example, see also briefly, node 30W.14 of FIG. 3W). With repeated votes of these pull-together and/or push-apart kinds and as recognized over pre-specified time spans (or all of system time) and/or as cast by different and optionally differently weighted users and/or users fitting pre-specified filtering criteria (e.g., demographic criteria in terms of age, gender, income level, geographic location etc.), the various points, nodes or subregions (e.g., keyword expressions) are jostled about in the respective keyword expressions space (or other corresponding cognition-representing space) until some come to be clustered closely together relative to one another and others come to be de-clustered and thus spaced relatively farther apart in the spatial and/or hierarchical sense. In accordance with one aspect of the present disclosure, a same cognition specifying data object (e.g., keyword expression, and more specifically, as an example from above, the expression, "*lincoln*") can be repeated many times within a corresponding Cognitive Attention Receiving Space (e.g., keyword expressions space) where each instance has a respective different sense such that, in one instance, it is clustered closely together with a second such data object (e.g., "Goldwater" being clustered closely together with "Abe-Lincoln") and in another instance it is spaced far apart in a spatial and/or hierarchical sense from the same second such data object because the cognitive senses of the different instances of the same expression are different. Each topic node may point to a respective, clustered together set of keyword expressions or the like (other clustered together cognition representing data objects) as is appropriate for that topic node and the users who favor that topic node. Two topic nodes may appear to correspond to a same topic and yet the users who favor the respective first and second topic nodes may have entirely different viewpoints regarding which other cognition representing data objects (e.g., top N keywords) are to be most liked (e.g., most popular) and which, if any, are to be most disliked (e.g., most despised, most emotionally rejected). In other words, the system allows for a wide variety of differing points of view as among different communities of system users. An data-objects organizing system for allowing such a thing to happen will be explained in yet more detail when FIG. 3R is described below.

Automatic clustering and/or de-clustering of the cognition representing data objects (e.g., topic nodes, keyword expression nodes, etc.) within the spatial and/or hierarchical space of a corresponding Cognitive Attention Receiving Space (CARS, e.g., topic space, keyword expressions space, etc.) need not be limited to or based only on the above described indirect voting where; as a result of a chat or other forum participation session, a subset of cognition representing data objects (e.g., keyword expressions 371.1, 371.2, 373.1 in FIG. 3E) are determined to be the top N such data objects (e.g., keywords) which are most popular in a positive favoring sense among participants of a corresponding forum or topic node and are thus urged to be spatially and/or hierarchically clustered closer together (e.g., in keyword space) and/or where a cognition representing data object (e.g., keyword expression 371.6) is determined to be among a top N' despised data objects (e.g., keywords) which are most unpopular (despised, viewed in a negative or disfavoring sense) among participants of the corresponding forum (or topic node) and is thus urged to be spatially and/or hierarchically moved apart from the favored, clustered together other such data objects (e.g., in keyword space). Various expert, credentialed and/or reputable or otherwise well regarded users may be given cluster-altering empowerments whereby their positive and/or negative, implicit or explicit votes operate to automatically urge movement of concurrently co-liked data objects closer together (tighter clustering) in a given data-objects organizing space and/or to automatically urge movement of a disliked data object further apart in spatial and/or hierarchical space from other nearby data objects that are voted upon by the empowered user as being "liked" for its/their current placement in spatial and/or hierarchical aspect of the given data-objects organizing space. In one embodiment, participants of chat or other forum participation sessions that tether strongly to a given vicinity (e.g., predefined subregion) of a Cognitive Attention Receiving Space are asked to vote on which among them is to act as a cluster-controlling representative who will be empowered to vote on behalf of the others (as a community representative) with regard to how corresponding cognition representing data objects should clustered close together or not within a given vicinity of a given data-objects organizing space (e.g., keyword space) in which the community is interested in.

Figure 3Q:
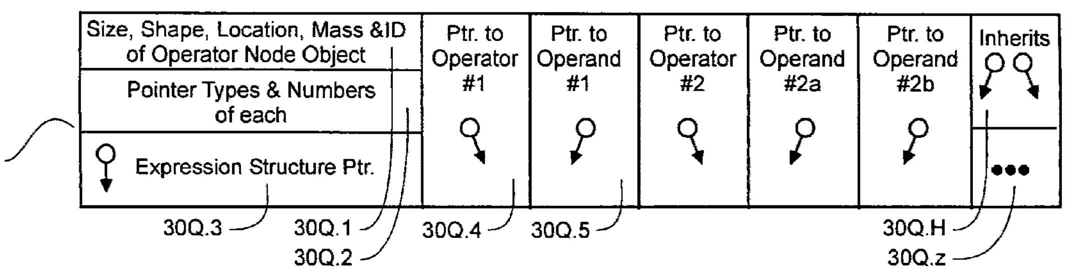
FIG. 3Q shows an example of a data structure that may be used to define an operator node.
Figure 3R:
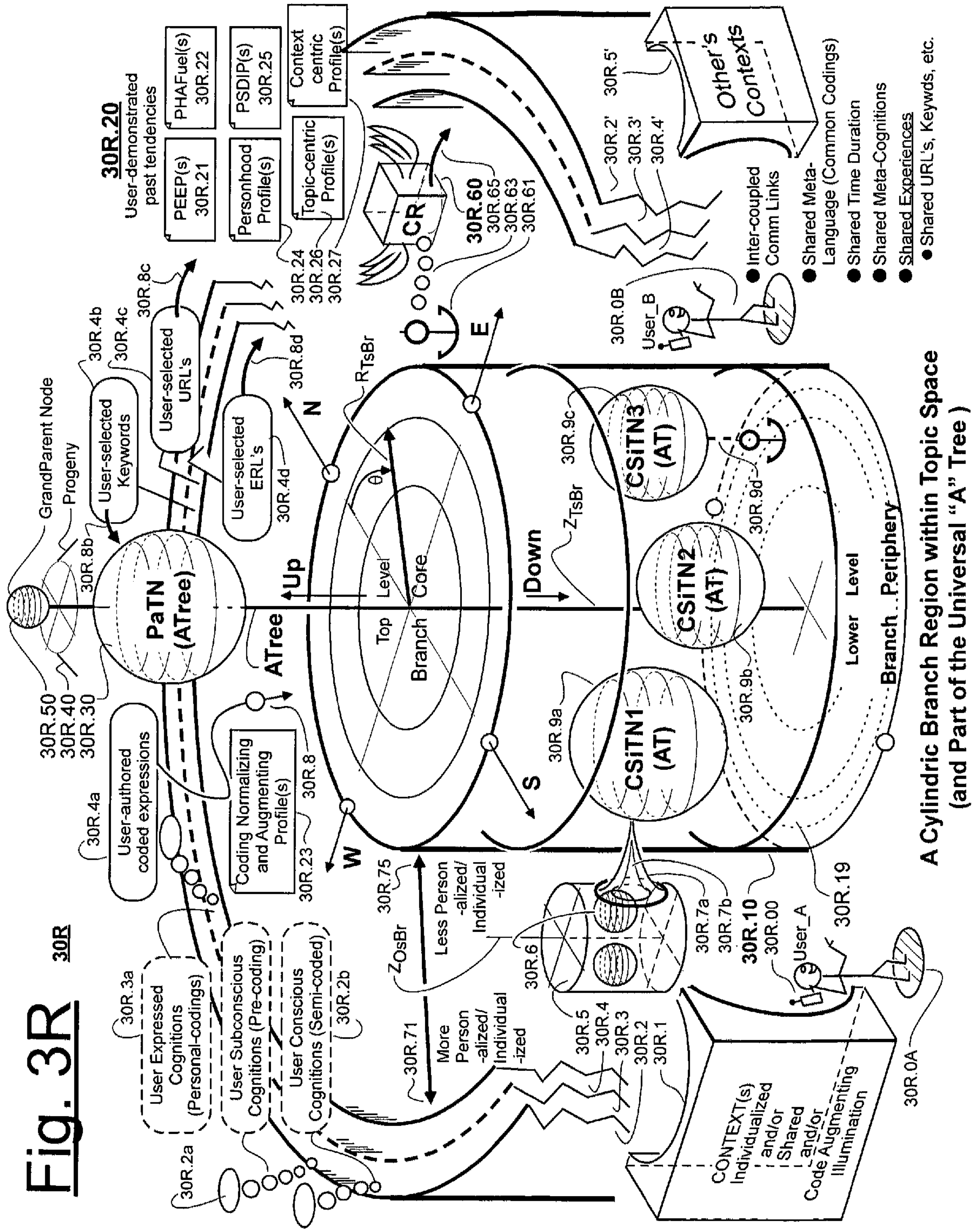
FIG. 3R illustrates in a perspective schematic format how child and co-sibling nodes (CSiN's) may be organized within a branch space owned by a parent node (such as a parent topic node of PaTN) and how personalized codings of different users in corresponding individualized contexts progress to become collective (communal) codings and collectively usable resources within, or linked to by, the CSiN's organized within the perspective-wise illustrated branch space.

Referring next to FIG. 3Q, shown here is an exemplary but not limiting (and not fully detailed) data structure 30Q.0 for defining an operator node. Due to space limitations in the drawings, some details of data structure 30Q.0 are left out, including for example, a set of linked list pointers similar to 30W.7*b* of FIG. 3W and one or more pointers similar to 30W.7*c* of FIG. 3W that point to a corresponding one or more nearest clustering center points. The below discussion re 30W.7*b* and 30W.7*c* of FIG. 3W are incorporated by reference here as if applied to the illustrated operator node data structure 30Q.0. In the illustrated example of FIG. 3Q, a first field 30Q.1 indicates the size, shape, location (e.g., relative location in a corresponding space, for example keyword space), identification and/or assigned virtual mass (or anchoring strength) of the operator node object. (As noted above, the data structure 30Q.0 may also or alternatively indicate an anchoring strength in place of or in addition to the virtual mass of the represented cognition-representing data object.) As also already mentioned above, an operator node uses pointers to draw into its definition, data from more primitive other data objects (e.g., from primitive cognition representing data objects and/or from functioning-as-parents, other operator nodes). When serving as part of a respective spatial (and optionally also hierarchical) space, the operator node may be assigned a respective virtual shape, a respective virtual size (e.g., virtual range of occupancy in a corresponding space), a respective virtual center of gravity, and optionally a respective virtual mass or virtual anchoring strength for that respective spatial space. The operator node should also have a unique identification code to distinguish it from other operator nodes of the same space. Often the operator node may be pictured as a movable spherical node of constant radius and having its mass temporarily rooted at a single point (center of gravity point) within the respective spatial space that is under consideration. Referring briefly to the perspective diagram of FIG. 3R, the three equally-sized spheres illustrated as residing inside of cylindrical space 30R.10 may alternatively represent operator nodes in place of the sibling topic nodes 30R.9*a*, 9*b* and 9*c* that they do represent. However, spatial space in which such nodes are virtually placed is not limited herein to the 3-dimensional kind and operator nodes are not limited to ones that can be pictured as same sized and same shaped virtual objects (e.g., spheres) residing at respective locations within a given spatial (and optionally also hierarchical) space. More to the point, it is within the contemplation of the present disclosure to allow for the representing of any respective one of points, nodes or subregions within a respective spatial space (e.g., a 3-dimensional cylindrical kind) by means of a corresponding one or more operator nodes in place of a primitive node. So in the general sense, an operator node can be assigned a respective virtual shape and virtual size; particularly if it is to define a corresponding subregion within its given space (e.g., a subregion containing a plurality of virtual points). Additionally, the operator node will be assigned a unique virtual location where that assigned virtual location may (in one embodiment) coincide with the center of gravity of its assigned shape and mass. That assigned virtual location may (in one embodiment) coincide with the assigned location of a clustering center point (e.g., 371.0 of FIG. 3E) provided within the respective Cognitions-representing Space (e.g., keyword space). Accordingly, the first field 30Q.1 (the size/shape/location field) may contain data indicating the assigned virtual sizes, virtual shapes and/or virtual locations of the uniquely identified (ID'ed) operator node object within respective virtual spaces. Virtual distances between operator nodes whose virtual locations are adjacent to one another may indicate how closely clustered or not those operator nodes are to one another and/or to nearby clustering center points (e.g., 371.0 of FIG. 3E). In one embodiment, closely clustered operator nodes (and/or closely clustered cognition primitives) lend anchoring support to one another when nudges are applied for separating them from one another. This concept will be better explained when anchor 30R.9*d* of FIG. 3R is described below. The point is that cognition representing data objects (e.g., operator nodes) that are deemed to be alike to one another, or otherwise as "belonging together", may be automatically urged into clustering with one another in a hierarchical and/or spatial sense and the latter has implications when the respective virtual space is explored by a user or a search bot to see which points, nodes or subregions are clustered closely to one another (and thus deemed to be substantially same or similar to one another) and which are spaced far apart (and thus deemed to be substantially dissimilar to one another in terms of one or more cognitive senses covered by nearby clustering center points).

In one embodiment, the virtual size/shape/location field 30Q.1 may additionally provide real world information about the memory space consumed by data structure 30Q.0 (e.g., in terms of number of bits or words) and/or information about how the remaining fields of data structure 30Q.0 are organized.

A second field 30Q.2 of data structure 30Q.0 lists pointer types (e.g., long, short, operator or operand, etc.) and numbers and/or orders in the represented expression of each. A third field 30Q.3 contains a pointer to an expression structure definition that defines the structure of the subsequent combination of operator pointers and operand pointers. The operator pointers logically link to corresponding operator definitions. The operand pointers logically link to corresponding operand definitions. An example of an operand definition can be one of the keyword expressions (e.g., 371.6) of FIG. 3E. An example of an operator definition might be: "AND together the next N operands". More specifically, the illustrated pointer to Operator definition #2 might indicate: OR together the next M operands (as pointed to by their respective pointers: Ptr. to Operand#2a, Ptr. to Operand#2b, etc.) and then logically AND the result with the preceding expression portion (e.g., Operator#1=NOT and Operand#1="Car?"). The organization of operators and operands can be defined by an organization defining object pointed to by the third field. As mentioned, this is merely a nonlimiting example.

Aside from including operand and operator indicators (e.g., 30Q.5, 30Q.4), the data structure 30Q.0 of the operator node will typically include one or more, so-called, inheritance fields 30Q.H by way of which the data structure 30Q.0 inherits data structure parts of base level primitives and/or of its parent nodes of the one or more Cognitive Attention Receiving Spaces (CARSs) the operator belongs to. More specifically, most primitives will include a field containing pointers to points, nodes or subregions in the same and/or other Cognitive Attention Receiving Spaces (e.g., nodes or subregions of topic space) and/or a field containing pointers to chat or other forum participation sessions or other informational resources. The operator node (30Q.0) will similarly, and by means of inheritance (30Q.H) contain such pointers as well so that the operator node (30Q.0) can function as cross-linking data object just as can the base level primitives of the CARSs to which its operand pointers (e.g., 30Q.5) point to and/or so that the operator node (30Q.0) can function as a cross-referencing data object to informational resources just as can the base level primitives of the CARSs to which it belongs.

Referring back to FIG. 3E, in accordance with another aspect of the present disclosure, primitive defining nodes (e.g., Kw2 node 371.2) may include logical links to semantic or other equivalents thereof (e.g., to synonyms, to homonyms) and/or logical links to effective opposites thereof (e.g., to antonyms). A pointer in FIG. 3Q that points to an operand may be of a type that indicates an optional attribute such as: include synonyms and/or include homonyms and/or include or swap-in the effective opposites thereof (e.g., to antonyms). Thus, by pointing to just one keyword expression node (e.g., 371.2 of FIG. 3E) an operator node object (e.g., 372.1) may automatically inherit synonyms and/or homonyms and/or antonyms of the pointed-to one keyword (e.g., 371.2). The concept of incorporating effective equivalents and/or effective opposites applies to other types of primitives besides just keyword expression primitives. More specifically, a URL expression primitive (e.g., 391.2) might be of a form such as: "www.*lincoln*" and it might further have a logical link to another URL primitive (not shown) that references web sites whose URL's satisfy the criteria: "www.*honest?abe*". Thus, a URL's combining operator node (e.g., 394.1 in FIG. 3E) might inherency-wise make reference to web sites whose URL name includes, "Honest Abe" (as an example) as well as those whose URL name includes, "Abraham-Lincoln" (as an example).

As further shown in FIG. 3E, operator node objects (e.g., 373.1) can each refer to another operator node objects (e.g., 372.1) as well as to primitive objects (e.g., Kw3). Thus complex combinations of keyword expression patterns can be defined (built up) with just a small number of operator node objects. The specifying within operator node objects (e.g., 374.1) of primitive patterns can include a specifying of sequence patterns (what comes before or after what; temporally, hierarchically or spatially; and optionally what time gaps or spatial or hierarchical gaps are to be provided there between), a specifying of overlap and/or timing interrelations (what overlaps chronologically or otherwise with what (or does not overlap) and to what extent of overlap or spacing apart) and a specifying of contingent score changing expressions (e.g., IF Kw3 is Near(within 4 words of) Kw4 Then increase matching score or other specified score by indicated amount).

As further shown in FIG. 3E, operator node objects (e.g., 374.1) can uni-directionally or bi-directionally link logically to nodes and/or subregions in other spaces. More specifically, operator node object 374.1 is shown to logically link by way of bi-directional link 370.6 to topic node Tn71 in topic space 313'. Accordingly, if keywords operator node 374.1 is pointed directly to (by matching with it) or pointed to indirectly (by matching to its parent node or child node) by a categorized/normalized CFi or by a plurality of categorized CFi's (e.g., a clustering of CFi's—see 30V.12 of FIG. 3V) or otherwise, then the categorized set of one or more CFi's are thereby logically linked by way of cross-space bi-directional linkages including 370.6 to topic node Tn71. (It is to be noted here that keywords operator node 374.1 does not represent a clustering of CFi's, but rather an operator defined combination of keyword primitives, which combination of primitives may, or may not match to a recently received cluster of CFi's received from a specific user. See also the clustering of CFi's denoted as 30V.12 in FIG. 3V). The cross-space bi-directional link 370.6 in FIG. 3E may have forward direction and/or back direction strength scores associated with it as well as a pointer's-halo size and halo fade factors associated with it so that it (the cross-space link e.g., 370.6) can point to a subregion of the pointed-to other space and not just to a single node within that other space if desired. See also FIGS. 3X and 3Y for enlarged views of how the pointer's-halo size strengths can contribute to total scores of topic nodes (e.g., Tn74" of FIG. 3Y) when a node is painted over by wide projection beams or narrow, focused pointer beams of respective beam intensities (e.g., narrow beam 370.6*sw'* in FIG. 3X versus 370.6*sw"* in FIG. 3Y). By using a halo'ed pointer. a given operator node can point to and incorporate into itself a collection of adjacent primitives (and/or a collection of adjacent other operator nodes) where the halo'ed pointer may reference a nearby clustering center point (see 371.50 of FIG. 3E), may provide an offset from the clustering center point (see 371.56 of FIG. 3E) and then may specify a radius for a covered circular area centered on that offset point. Other shapes besides encircling circles may be used instead (e.g., ellipses, regular polygons etc.). As used herein, a so-called, pointer's-halo (e.g., the one cast by logical link 370.6" in FIG. 3Y) is not to be confused with a STAN user's 'touching' halo although they have a number of similar attributes, such as having variable halo spreads in different hierarchical directions (and/or variable halo spreads in different spatial directions of a multidimensional space that has distance and direction attributes) and such as having variable halo intensities or scoring strengths (positive or negative) and/or variable halo strength fading factors along respective different directions and/or according to respective hierarchical or other radii away from the pointed-to or directly 'touched' point in the respective space (e.g., topic space).

While not explicitly shown in FIG. 3E, it is to be understood that operator node objects (e.g., 374.1) can uni-directionally or bi-directionally link logically to informational resources such as chat or other forum participation sessions and/or non-forum research resources and/or to users who cross-associated with the operator node (e.g., an expert or an influencer with regard to the subject matter of the operator node object, e.g., the cognitive sense(s) and the corresponding expression(s) of the operator node). In other words, just as nodes (e.g., Tn71) in topic space can have respective chat rooms cross-associated therewith, operator nodes (e.g., 374.1) in keyword space and/or in other such Cognitive Attention Receiving Spaces can have respective informational resources cross-associated therewith. System users can navigate to a given operator node and can then navigate therefrom to the cross-associated and respective informational resources.

Figure 3T:
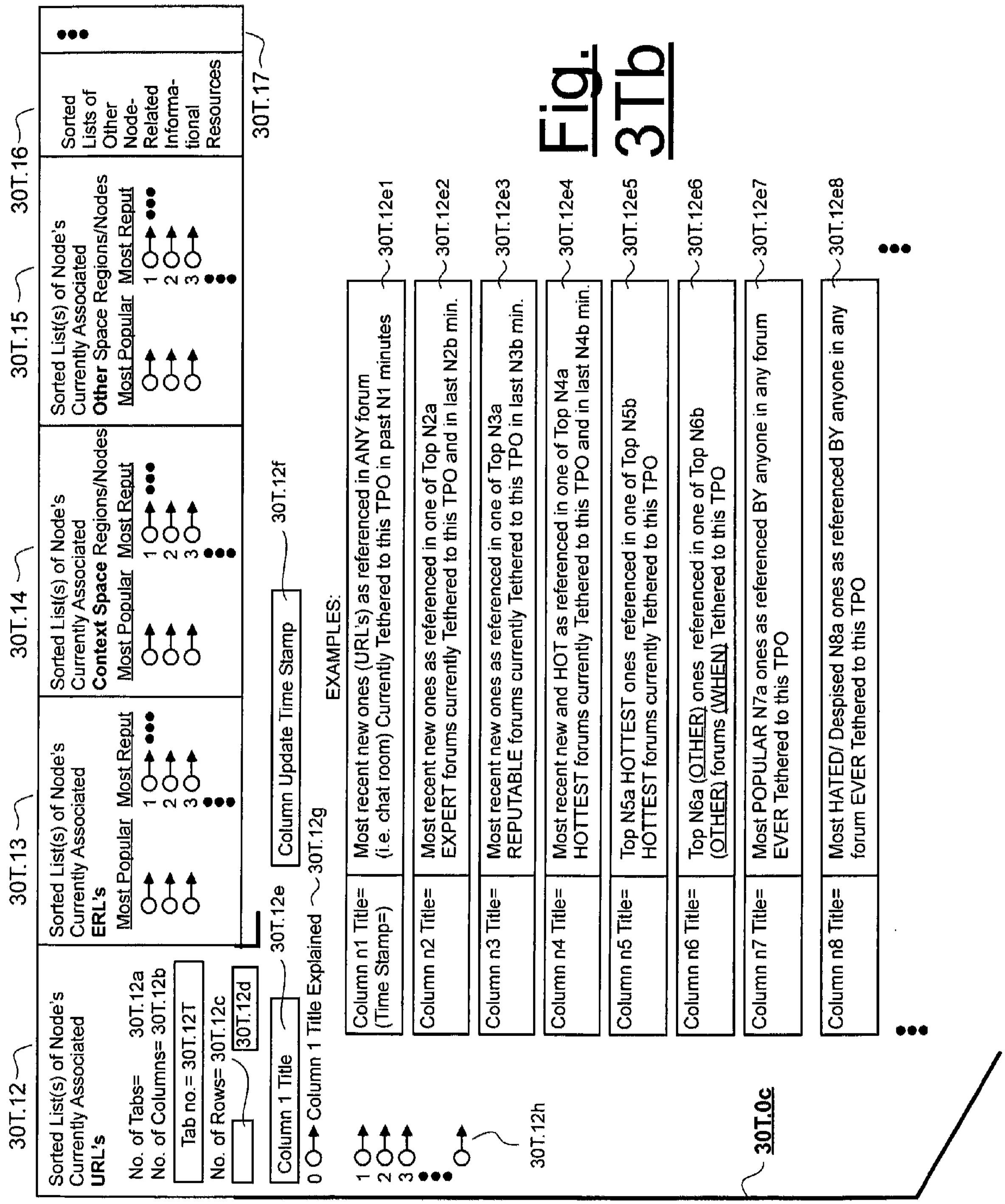
FIG. 3Ta and FIG. 3Tb show an example of a data structure that may be used for representing a corresponding topic node in the system of FIGS. 3R-3S.
Figure 3X:
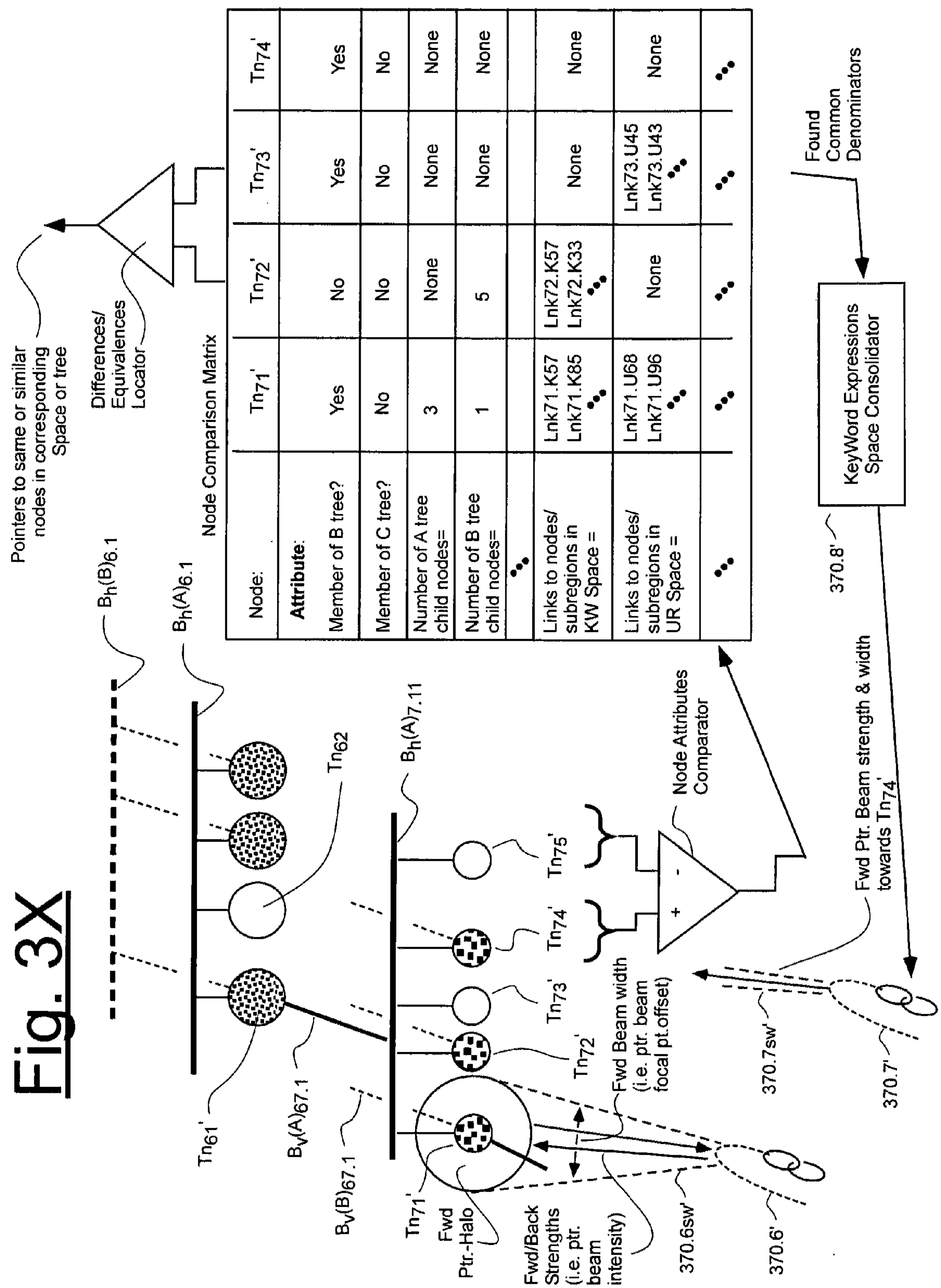
FIG. 3X illustrates a system for locating equivalent and near-equivalent (same or similar) nodes within a corresponding data organizing space.

In view of the above, it may be seen that the cross-spaces (inter-space) bi-directional link 370.6 of FIG. 3E may have various strength/intensity attributes logically attached to it for indicating how strongly topic node Tn71 links to operator node object 374.1 and/or how strongly operator node object 374.1 links to topic node Tn71 and/or whether parents (e.g., Tn61) or children (e.g., Tn81) and/or siblings (e.g., Tn74) of the pointed-to topic node Tn71 are also strongly, weakly or not at all linked to the node in the first space (e.g., 370) by virtue of a pointer's-halo cast by link 370.6 (halo not shown in FIG. 3E, see instead FIG. 3X). In other words, by matching or otherwise cross-correlating (e.g., with use of a relative matching or cross-correlating score that does not have to be 100% matching) one or more raw or normalized/categorized CFi's (e.g., clusterings of CFi's) with corresponding nodes in keyword expressions space 370, the STAN_3 system 410 can then automatically discover what nodes (and/or what subregions) of topic space 313' and/or of another space (e.g., context space, emotions space, URL space, etc.) logically link directly or indirectly to the received raw or normalized/categorized CFi's of a given user and how strongly. Linkage scores to different nodes and/or subregions in topic space can be added up for different permutations of CFi's (a.k.a. trial clusterings of CFi's—see 30V.12 of FIG. 3V) and then the topic nodes and/or subregions that score highest can be deemed to be the most likely topic nodes/regions being focused-upon by the STAN user (e.g., user 301A') from whom the CFi's were collected, and were optionally normalized and/or augmented, clustered into trial permutations and then cross-correlated with similar permutations (e.g., that represented by operator node 374.1) in keyword space. Moreover, linkage scores can be weighted by probability factors where appropriate. Yet more specifically, a first cross-correlation or probability factor may be assigned to a logical linkage (not shown, see 30V.8 of FIG. 3V) as between the keyword combination-and-sequence of node 374.1 and a received clustering of CFi's (e.g., 30V.14 of FIG. 3V) received from a specific user to indicate the likelihood that a received group of keyword expression holding CFi's cross-correlate well with node 374.1. At the same time, a respective other cross-correlation or probability factor may be assigned to another keyword space node to indicate the likelihood that the same received clustering of CFi's (e.g., 30V.14 of FIG. 3V) cross-correlates well with that other node (second keyword space node not shown, but understood to point to a different subregion of topic space than does cross-spaces link 370.6). Then, when corresponding cross-correlation or likelihood scores are automatically computed for competing topic space nodes, the probability factor for each keyword space node is multiplied against the forward pointer strength factor of the corresponding cross-spaces logical link (e.g., that of 370.6) so as to thereby determine the additive (or subtractive) contribution that each cross-spaces logical link (e.g., 370.6) will paint onto the one or more candidate topic nodes it projects its beam (narrow or wide spread beam) on.

The scores contributed by the cross-spaces (inter-space) logical links (e.g., 370.6) need not indicate or merely indicate what candidate topic nodes/subregions the STAN user (e.g., user 301A') appears to be now focusing-upon based on received raw or categorized CFi's (which received signals can be clustered per FIG. 3V and can point to cross-correlated keyword nodes, i.e. 30V.8 of FIG. 3V; which figure will be detailed later below). They can alternatively or additionally indicate what nodes and/or subregions in user-to-user associations (U2U) space the user (e.g., user 301A') appears to be focusing-upon and to what degree of likelihood. They can alternatively or additionally indicate what emotions or behavioral states in emotions/behavioral states space the user (e.g., user 301A') appears to be focusing-upon and to what degree of comparative likelihood. They can alternatively or additionally indicate what context nodes and/or subregions in context space (see 316" of FIG. 3D) the user (e.g., user 301A') appears to be focusing-upon and to what degree of comparative likelihood. They can alternatively or additionally indicate what context nodes and/or subregions in social dynamics space (see 312" of FIG. 3D) the user (e.g., user 301A') appears to be focusing-upon and to what degree of comparative likelihood. And so on.

Moreover, linkage strength scores to competing ones of topic nodes (e.g., Tn71 versus Tn74 in the case of FIG. 3E) need not be generated simply on the basis of received CFi's being linked more strongly or weakly to corresponding keyword expression nodes (e.g., 374.1) and the latter being linked more strongly or weakly to one topic node rather than to another (e.g., Tn71 versus Tn74). The cross-spaces linkage strength scores cast from URL nodes in URL space (e.g., the forward strength score going from URL operator node 394.1 to topic node Tn74) can be added in to the accumulating scores of competing ones of topic nodes (e.g., Tn71 versus Tn74). The respective linkage strength scores from Meta-tag nodes in Meta-tag space (395 of FIG. 3E) to the competing topic nodes (e.g., Tn71 versus Tn74) can be included in the machine-implemented computations of competing final scores. The respective linkage strength scores from hybrid nodes (e.g., Kw-Ur node 384.1 linking by way of logical link 380.6) to topic space and/or to another space can be included in the machine-implemented computations of competing final scores. In other words, a rich set of diversified CFi's received from a given STAN user (e.g., user 301A' of FIG. 3D) can be parsed, clustered and cross-correlated to potentially matching (e.g., candidate) points, nodes or subregions in one or more of the system-maintained Cognitive Attention Receiving Spaces and this can lead to a rich set of cross-space linkage scores contributing to (or detracting from) the final scores of different ones of topic nodes so that specific topic nodes and/or topic subregions ultimately become distinguished as being the more likely ones being focused-upon due to the hints and clues collected from the given STAN user (e.g., user 301A' of FIG. 3D) by way of up or in-loaded CFi's, CVi's and the like as well as assistance provided by the then active personal profiles 301*p* of the given STAN user (e.g., user 301A' of FIG. 3D).

Cross-spaces logical linkages such as 370.6 (a.k.a. IntEr-Space cross-associating links or "IoS-CAX's") are referred to herein as "reflective" when they link to a node (e.g., to topic node Tn71) that has additional links back to the same space (e.g., keyword space) from which the first link (e.g., 370.6) came from. Although not shown in FIG. 3E, it is to be understood that a topic node such as Tn71 will typically have more than one logical link (more than just 370.6) logically linking it to nodes in keyword expressions space (as an example) and/or to nodes in other spaces outside of topic space. Accordingly, when a given user's (e.g., user 301A') CFi's are matched with cross-correlation strength of 100% or less to a first node (e.g., 374.1) in keyword expressions space, that keyword node will likely link to a topic node (e.g., Tn71) that links back to yet other nodes (other than 374.1) in keyword expressions space 370. Therefore, if a cross-correlation is desired as between keyword expressions that have a same topic node or topic space subregion (TSR) in common, the bi-directional nature of cross-spaces links such as 370.6 may be followed to the common nodes in topic space and then a tracing back via other linkages from that region of topic space 313' to keyword expressions space 370 may be carried out by automated machine-implemented means so as to thereby identify the topic-wise cross-correlated other keyword expressions. A similar process may be carried out for identifying URL nodes (e.g., 391.2) that are topic-wise cross-correlated to one another and so on. A similar process may be carried out for identifying URL nodes (e.g., 394.1) that are cross-correlated to each other by way of a common hybrid space node (e.g., 384.1) or by way of a common keyword space node. More generally, cross-correlations as between nodes and/or subregions in one space (e.g., keyword space 370) that have in common, one or more nodes and/or subregions in a second space (e.g., topic space 313' of FIG. 3E) may be automatically discovered by backtracking through the corresponding cross-space linkages (e.g., start at keyword node 374.1, forward track along link 370.6 to topic node Tn71, then chain back to a different node in keyword space 370 by tracking along a different cross-space linkage that logically links node Tn71 to keyword expressions space). In one embodiment, the automated cross-correlations discovering process is configured to unearth the stronger ones of the backlinks from say, common node Tn71 to the space (e.g., 370) where cross-correlations are being sought. One use for this process is to identify better keyword combinations for linking to a given topic space region (TSR) or other space subregion. More specifically, if the Fifth Grade student of the above example had used "Honest Abe" as the keyword combination (see also field 30W.2 of FIG. 3W) for navigating to a topic node directed to the Gettysburg Address (see also data object 30W.14 of FIG. 3W), a search for stronger cross-correlated keyword combinations may inform the student that the keyword combination, "President Abraham Lincoln" would have been a better search expression to be included in the search engine strategy.

More will be said about FIGS. 3E and 3W later below. However, referring now to FIG. 3J (an example of a context primitive), it may be recalled that the demographic attributes of the exemplary Fifth Grade student (studying the Gettysburg Address), which is a part of the context of the user; can serve as a filtering basis for narrowing down the set of possible nodes in topic space which should be suggested in response to a vague search keyword of the form, "*lincoln*" where the latter can have many cognitive senses (e.g., the city in Nebraska, the Automobile Dealership, the 16th President, etc.). Once user context is determined, it becomes more evident to the STAN_3 system 410 that the given STAN user (e.g., Fifth Grade student) more likely intends to focus-upon the "Abraham Lincoln" cognitive sense and not on "Local Ford/Mercury/Lincoln Car Dealerships" because the user is part of his own context and the user's demographic attributes (as found for example in the user's personhood profile) are thus also part of the context. In the example, the user's education level (e.g., Fifth Grade), the user's habits-driven role (e.g., in student mode immediately after school) and the user's age group can operate as hints or clues for narrowing down the intended topic. In other words, first round cross-correlations as between received clusterings of CFi's (e.g., 30V.12 of FIG. 3V) and spatial and/or hierarchical clusterings of nodes in corresponding spaces (e.g., keyword space, URL space, etc.) are preferably not used alone but rather in conjunction with context-sensitive hybridizations of such received CFi's. Incidentally, just as was true for the case of FIG. 3Q, due to space limitations in the drawings, some details of data structure 30J.0 are left out, including for example, a set of linked list pointers similar to 30W.7*b* of FIG. 3W and one or more pointers similar to 30W.7*c* of FIG. 3W that point to a corresponding one or more nearest clustering center points. The below discussion re 30W.7*b* and 30W.7*c* of FIG. 3W are incorporated by reference here as if applied to the illustrated operator node data structure 30J.0, including the provision of a location specifier which specifies where in its respective context space, the context-representing primitive object is located.

More generally and in accordance with the present disclosure, a context data-objects organizing space (a.k.a. context space or context mapping mechanism, e.g., 316" of FIG. 3D) is provided within the STAN_3 system 410 to be composed of stored data representing context space primitive objects (e.g., 30J.0 of FIG. 3J) hierarchically and/or spatially dispersed in the space and operator node objects (e.g., 30Q.0 of FIG. 3Q) that logically link with such context primitives (e.g., 30J.0) and are also hierarchically and/or spatially dispersed within the context space and where the primitive/operator nodes are optionally clustered around respective clustering center points (see 371.0 of FIG. 3E) where such clustering center points are also hierarchically and/or spatially dispersed within the context space. In one embodiment, each context primitive (see FIG. 3J) has a data structure which includes a number of context defining fields where these included fields may comprise one or more of: (1) a first field 30J.1 indicating a formal name of a role (e.g., 5th Grade Student) that is potentially being assumed by an actor (e.g., STAN user) who may be deemed as likely to be operating under that corresponding context. Examples of roles may include socio-economic designations such as (but not limited to) full-time student (and grade level), part-time teacher (and grade levels), employee (and job title), employer, manager, subordinate, and so on. The role designation may include an active versus inactive indicating modifier such as, "retired college professor" as compared to "acting general manager" for example. Instead of, or in addition to, naming a formal role, the first field 30J.1 may indicate a formal name of an activity corresponding to the actor's context or role (e.g., managing chat room as opposed to chat room manager). A same user can be simultaneously operating under many different contexts. More specifically, the Fifth Grade Student of the Abe Lincoln example may also be a part time worker in his/her school library and/or an active member of a school sports or other such team or club. When CFi's are received from that user, the different contexts which may be operative at the moment are sorted according to likelihood (which likelihood may be based on the user's currently activate profiles and/or the user's last determined-as-more-likely contexts (represented by signal 316*o* of FIG. 3D)) and the received CFi's (e.g., post-normalization CFi's) are hybridized first with the most likely context, then with the second most likely context, and so on (as represented by and ranked by data provided in signal 316*o* of FIG. 3D); so that a likely context-appropriate permutation is not overlooked.

Another of the fields in each context primitive defining object 30J.0 (FIG. 3J) can be: (2) a second field 30J.2 pointing to informal role names or role states or activity names. The reason for inclusion of this second field 30J.2 is because the formal names assigned to some roles (e.g., Vice President) can often be for sake of a facade or ego rather than for reflecting actual reality. Someone can be formally referred to as Vice President or Manager of Data Reproduction when in fact they routinely operate the company's photocopying machine. Therefore cross-links 30J.2 to the informal but more accurate definitions of the actor's role may be helpful in more accurately defining the user's context for certain users, where the weighting in favor of second field 30J.2 rather than first field 30J.1 can be based on a physical locality indicating signal (the XP signal of FIG. 3D). The pointed-to informal role can simply be another context primitive defining object like 30J.0.

Assigned roles (as defined by field 30J.1) will often have one or more normally expected activities or performances that correspond to the named formal role. For example, a normally expected activity of someone in the context of being a "manager" might be "managing subordinates". Therefore, when a user is determined (by signal 316*o*) as likely to currently be in the context of being an acting manager (as defined by field 30J.1, if primitive 30Q.0 is being referenced based on the current version of output signal 316*o*), corresponding third field 30J.3 may include a pointer pointing to an operator node object in context space or in an activities space (not directly shown) that combines the activity "managing" with the object of the activity, "subordinates". Each of those primitives ("managing" and "subordinates") may logically link to nodes in topic space and/or to nodes in other spaces. (Another example of "expected performances" 30J.3 might be "does homework immediately after school" for the case of the Fifth Grade Student working on his/her Abe-Lincoln assignment.) Although each user who operates under an assumed role (context) is "expected" to perform one or more of the expected activities of that role, it may be the case that the individual user has habits or routines wherein the individual user avoids certain of those "expected" performances. Such exceptions to the general rule are defined (in one embodiment) within the individual user's currently active PHAFUEL profile (e.g., FIG. 5A). More specifically, even if the "expected performances" 30J.3 for the average Fifth Grade Student might be "does homework immediately after school", for the case of the specific Fifth Grade Student in the above Abe-Lincoln example, that user's PHAFUEL profile might indicate that he/she normally does it 2 hours after supper. Accordingly, if the physical context signals (XP) that accompany the user's CFi's indicate the time to be 1-3 hours after supper, that additional information will be used by the STAN_3 system to indicate increased likelihood that the user is in the doing-homework activity part of the assumed role (Fifth Grade Student).

A fourth field 30J.4 (FIG. 3J) may include pointers pointing to one or more communal-basis-wise expected cross-correlated nodes in topic space. By this it is meant that the average or normal member of the relevant community of alike users would be expected to likely be focused-upon the listed topic nodes when in the given reference. It does not necessarily mean that the current, specific user is now focused-upon those nodes. The pointers of fourth field 30J.4 may alternatively or additionally point to knowledge base rules (KBR's) that exclude or include various nodes and/or subregions of topic space. Once again, because the context space primitive object 30J.0 of FIG. 3J is part of a communally created and communally updated context space (XS), the pointed-to knowledge base rules (KBR's) are ones that apply to the average or normal member of the relevant community of alike users and they do not necessarily reflect the propensities of the current, specific user. More specifically, if the role or user context is Fifth Grade Student, one of the pointed-to KBR's may exclude or substantially downgrade in match score, topic nodes directed to purchase, driving or other uses of automobiles since the average Fifth Grade Student is not engaged in such activities. On the other hand, further knowledge base rules (KBR's) stored in one of the specific user's currently activated, personal profiles may indicate that for this particular Fifth Grade Student, the match score should not be downgraded as much.

A fifth field 30J.5 of each context primitive may include pointers to, and/or knowledge base rules (KBR's) for including and/or excluding subregions of a demographics space (not shown). The logical links between context space (e.g., 316") and demographics space (not shown) should be bi-directional ones such that the providing of specific demographic attributes (e.g., age, gender, height, weight, income group, etc.) will link with different linkage strength values (positive or negative) to nodes and/or subregions in context space (e.g., 316") and such that the providing of specific context attributes (e.g., role name equals normal or average "Fifth Grade Student") link with different linkage strength values (positive or negative) to nodes and/or subregions in demographics space (e.g., age is probably less than 15 years old, height is probably less than 6 feet and so on).

A sixth field 30J.6 of each context primitive 30J.0 may include pointers to, and/or knowledge base rules (KBR's) for including and/or excluding likely subregions of a forums space (not shown, in other words, a space defining different kinds of chat or other forum participation opportunities which the in-context average or normal user is likely to be excluded from and/or included within).

A seventh field 30J.7 of each context primitive 30J.0 may include pointers to, and/or knowledge base rules (KBR's) for including and/or excluding likely subregions of a related-users space (not shown, but whose nodes would indicate other users to whom the first user is likely to be currently relating to (or vise versa) because of the currently undertaken role of the first user). More specifically, a primitive 30J.0 whose formal role is "Fifth Grade Student" may have pointers and/or KBR's in seventh field 30J.7 pointing to "Fifth Grade Teachers" and/or "Fifth Grade Tutors" and/or "Other Fifth Grade Students". In one embodiment, the seventh field 30J.7 specifies other social entities that are likely to be currently giving attention to the person who holds the role of primitive 30J.0 (or vise versa). More specifically, a social entity with the role of "Fifth Grade Teacher" may be specified as a role of another person who is likely giving current attention to the inhabitant who holds the role of primitive 30J.0 (e.g., "Fifth Grade Student") or vise versa where the average or normal "Fifth Grade Student" is likely giving partial focusing attention to the "Fifth Grade Teacher". The context of a STAN user can often include a current expectation that other users (e.g., his online "Fifth Grade Teacher" and/or his "Mother" who just reminded him to do his homework) are currently casting attention on that first user. People may act differently when alone as opposed to when they believe others are watching them, auditing them, or otherwise currently paying attention to what the first user (e.g., "Fifth Grade Student") is currently doing.

Each context primitive 30J.0 may include pointers to, and/or knowledge base rules (KBR's) for including and/or excluding likely subregions of yet other spaces (other data-objects organizing spaces) and/or other informational resources as is indicated by eighth area 30J.8 of data structure 30J.0. The pointed to other informational resources may include chat or other forum participation sessions cross-associated with the context primitive 30J.0. They may alternatively or additionally include non-forum research sources. The pointed to other informational resources may include personas or groups (expert groups, influential persons, etc.) cross-associated with the context primitive 30J.0; where once again, the results apply to the average or normal user within the relevant community but not necessarily to the given specific user. Chat rooms full of, and/or individualized users do not necessarily have to tether to, or only to a topic center (topic node). They may alternatively or additionally tether to a context node within the system's context space such as one represented by context primitive 30J.0 or one represented by an operator node that is a progeny of context node 30J.0. More specifically, and by way of example, one context node in context space may be that of pretending (e.g., as part of an online game) to take on the role of "President of the United States" (POTUS, i.e. in field 30J.1) and one of the expected performance or activities may be that of acting as Commander in Chief (e.g., in field 30J.3). There can be online chat or other forum participation sessions devoted to this contextual role-playing aspect, where for example, eighth area 30J.8 may include pointers to online forum participation sessions devoted to a corresponding online game. At the same time, there may be one or more topic nodes or subregions in topic space dedicated to the topic of pretending to be POTUS. Unlike a conventional Wikipedia™ structure, the Cognitive Attention Receiving Spaces of the STAN_3 system may each have many points, nodes or subregions that each, on the surface, appears to be directed to a same or similar cognition. More specifically, just as was true for the above exemplary case of "*lincoln*" being plurally expressed in a corresponding plurality of different hierarchical and/or spatial locations within keyword space, context space (XS)—as another example—may be filled with many copies of data structure 30J.0 each having a same formal role name and a same informal role name and yet the on-the-surface apparently same context specifications respectively overlie different cognitive senses of the specified role (e.g., pretending to be POTUS as part of a serious strategic game, pretending to be POTUS as part of a comic or mocking game, pretending to be POTUS as part of an educational Fifth Grade level exercise and so on). In one embodiment, just as keyword space may be populated by clustering center points each representing a respective cognitive sense for nearby keyword expressions, context space may be similarly populated by clustering center points each representing a respective cognitive sense for nearby context-specifying expressions (e.g., substantially same or similar copies of primitive object 30J.0). Moreover, topic space and yet others of the system-maintained Cognitions-representing Spaces may be similarly populated by clustering center points each representing a respective cognitive sense for nearby cognition-representing topic or other respective types of nodes. By providing such clustering center points in each respective space, distinctions can be made as between apparently (on the surface) same Cognitive Attention Receiving Nodes or Subregions (CARNS) where the underlying cognitive senses are actually different. Ranking and sorting according to different cognitive senses may be based on a complex set of currently activate user states that indicate likely user mood, likely user context, the user's currently chosen persona name, recent user activity history, and so on.

Referring next to FIG. 3X as well as FIG. 3Q, in one embodiment, the operator node objects and/or inter-space cross-association links (e.g., IoS-CAX 370.6', 370.7') emanating therefrom may be automatically generated by so-called, keyword expressions space consolidator modules (e.g., 370.8' in FIG. 3X). Such consolidator modules (e.g., 370.8') automatically crawl through their respective spaces looking for nodes and/or logical links that can be consolidated from many into one without loss of function (basically, a deduplication function). More specifically, if keyword node 374.1 of FIG. 3E hypothetically had four cross-space links like 370.6, each pointing to a respective one of topic nodes Tn71 to Tn74 with same strength, then those four hypothetical (not shown) cross-space links are essentially superfluous duplicates of one another and they could be consolidated into and replaced by a single, wide beam projecting link (see 370.6" of FIG. 3Y) without loss of function. A consolidator module (e.g., 370.8') automatically finds such overlap and/or redundancy during its space crawl-through operations and it then consolidates the many links into a functionally equivalent one and/or the many nodes into a functionally equivalent one node where possible. Such consolidation would reduce memory consumption and increase data processing speed because the keyword-to-topic nodes matching servers would have a fewer number of nodes and/or cross-spaces links to trace through when trying to match a received CFi's cluster (see 30U.12 of FIG. 3U) of a respective user with cross-correlating or matching nodes in topic or other spaces.

Figure 3Y:
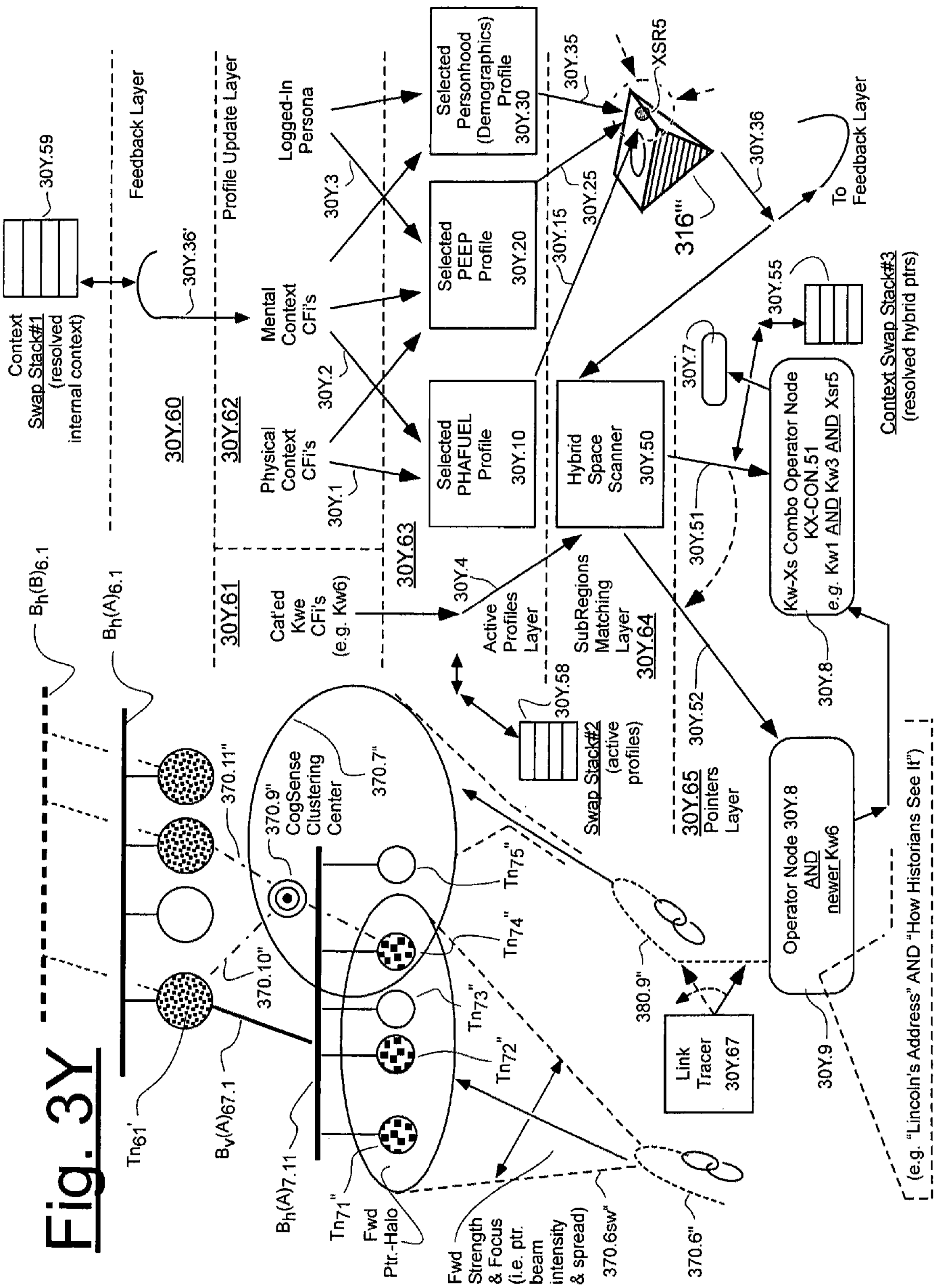
FIG. 3Y illustrates a system that automatically scans through a hybrid context-plus-other space (e.g., context-plus-keyword expressions space) in order to identify context appropriate topic nodes and/or subregions that score highest for correspondence with CFi's received under the assumed context.

Referring to FIG. 3Y as well as FIG. 3E, in one embodiment, the automated determination of what topic nodes the logged-in user is more likely to be currently focusing-upon is carried out in a stepping stones fashion with the help of a hybrid space scanner 30Y.50 that automatically searches through hybrid spaces that have "context" as one of their hybridizing factors. Recall that the likely context(s) signal 316*o* output by the context mapping mechanism 316" of FIG. 3D (see also 30Y.36 of FIG. 3Y) includes data identifying the most likely N contexts (where here N=1, 2, 3, . . . ) and data ranking and sorting these probable contexts according to likelihood that these are the current context(s). Starting with the determined-as-most-likely context, the hybrid space scanner 30Y.50 finds a first, relatively coarse subregion in hybrid space to serve as a first foothold or stepping stone; and then as more information comes in about user context and/or about user focused-upon items (e.g., keywords, URL's, sub-portions of user-perceivable content), the scanner 30Y.50 steps forward (e.g., transitions) from a respective first pointing state 30Y.51 (shown at a bottom middle portion of FIG. 3Y) to a second pointing state 30Y.52 which points to a more specific, more refined (higher resolution) subregion (e.g., 30Y.9) in the hybrid space that better indicates what the user appears to be focusing-upon given the assumption of the first picked context as being the most likely one.

In terms of further specifics, it should be recalled that often, the received CFi's of a given user (e.g., 301A' of FIG. 3A) are so-called, hybridized or HyCFi's which define a complex of physical and/or other context (e.g., biometric) representing signals as well as those defining things (e.g., sub-portions of on-screen content that the user is focusing-upon, keywords used, URL's accessed, etc.) thereby it is determined that the respective user appears to have recently been giving focused attention to a corresponding one or more topic nodes. Yet more specifically, in the case where a given set of the user's recently used keywords are received via a respective first set of CFi's that are grouped together (e.g., Kw1 AND Kw3 in the example of FIG. 3Y), the hybrid space scanner 30Y.50 is configured to responsively and automatically search through a hybrid keywords and context states space looking for a hybrid node or subregion (e.g., 30Y.8) that substantially matches (not necessarily 100%) both the grouped together keywords (e.g., Kw1 AND Kw3) and the currently resolved context states (e.g., Xsr5, which context space subregion (XSR) is initially pointed to by corresponding context output signal 30Y.36), where these currently resolved context states are those determined for the corresponding STAN user. More to the point, if the STAN user currently has the context state (e.g., Xsr5) of being in the role of a Fifth Grade student doing his/her homework soon after coming home from school; because habitually, per his/her currently active PHAFUEL profile 30Y.10 (disposed in an active profiles layer 30Y.63) that is what the user usually does at that time and/or place and/or if the STAN user is determined by the system to currently have the context state (e.g., Xsr5) of being in a studious mood because his/her currently active PEEP profile (e.g., 30Y.20, also in layer 30Y.63) so indicates, and/or if the STAN user currently is determined by the system to have the context state (e.g., Xsr5) of being a Fifth Grade student because his/her currently active Personhood/Demographics profile (e.g., 30Y.30, also in layer 30Y.63) so indicates, then the resulting, CFi-refined and profile-refined context-determining signals 30Y.36 next which are output by the mapping mechanism 316'" (which mapping mechanism is disposed in a subregions matching layer 30Y.64 of a process depicted by FIG. 3Y) will be collected by the hybrid space scanner 30Y.50 (which scanner is also disposed in layer 30Y.64) as defining to best of current resolution by the system what the user's current context is. This updated determination enables the scanner 30Y.50 to output progressively updated pointers (stored in pointers layer 30Y.65) that focus-upon a correspondingly matching (not necessarily 100%) first portion 30Y.8 of hybrid context-keywords space in a first of progressive resolving steps. When a next and newer set of one or more keyword expressions 30Y.4 (e.g., Kw6) are received under this initially refined context definition (e.g., 30Y.36), the newer set of keyword expressions (and/or newer set of other focus-indicating expressions) are automatically added to the hints of clues collected by the hybrid space scanner 30Y.50 to thereby enable the scanner to advance its hybrid-matching pointer (30Y.51) to thereby better focus (by way of updated matching pointer 30Y.52) upon a corresponding narrower portion of the hybrid context and keywords space that contains the more relevant hybrid node 30Y.9. More specifically, if the first set of keywords (e.g., Kw1 AND Kw3) are "Lincoln's" and "Address" and the first resolved context (e.g., XSR5) is "Fifth Grade Student doing homework" and then the more recently received keywords 30Y.4 are Kw6="How Historians see it now", then the hybrid space scanner 30Y.50 stepping-stone-wise steps forward form a first state (where it outputs pointer 30Y.51 and it is thereby pointing at a first hybrid subregion parented by hybrid node 30Y.8) to a second state (where it outputs pointer 30Y.52 and it is thereby pointing at a smaller hybrid subregion parented by hybrid node 30Y.9). Note that hybrid node 30Y.9 is hierarchically a child of node 30Y.8 and the latter operator node 30Y.8 is hierarchically a child of node 30Y.7. Nodes 30Y.7, 30Y.8 and 30Y.9 are represented by data stored in a hybrid context-plus-keywords space maintained by the STAN_3 system.

The newer found, hybrid node 30Y.9 has a cross-spaces logical link 380.9" that points to a topic space subregion 370.7" containing topic nodes Tn74" and Tn75". In one embodiment, cross-spaces logical link 380.9" points to the center of an elliptical region 370.7" by specifying a nearby, cognitive sense representing, clustering center point 370.9", by specifying an offset distance and offset direction from that center point 370.9" and then by specifying the two focal points of elliptical region 370.7" relative to the offset vector (the vector defined by the offset distance and offset direction). The referenced cognitive sense representing, clustering center point 370.9" defines, among other things, spatial distances such as 370.10" and 370.11" between itself and nearby topic nodes such as Tn61', Tn74', etc. The defined spatial distances indicate relative closeness of cognitive sense as between a central cognitive sense of the clustering center point 370.9" and respective cognitive senses of the nearby topic nodes (e.g., Tn61' and Tn74'). The linked-to elliptical region 370.7" encompasses subregions Tn74" and Tn75" within its interior and thereby references them. These, traced-to and corresponding topic nodes and/or topic subregions (e.g., Tn74" and Tn75") in topic space may then point to a context-appropriate set of chat or other forum participation sessions (not shown) which the user will be invited to join in on where the forum participation sessions are closely related to "Lincoln's Gettysburg Address" and how historians currently view it and where the participation sessions are co-compatibility appropriate for an average or normal Fifth Grade Student. Contrastingly, the so traced-to corresponding nodes and/or subregions (e.g., Tn74" and Tn75") will not be ones directed to a local Ford/Lincoln™ automobile dealership or to a topic directed to the city of Lincoln, Nebr. Thus the corresponding invitation(s) and/or suggestions which the Fifth Grade Student receives from the STAN_3 system will be demographics-wise appropriate and topic-wise appropriate and context-wise appropriate.

By way of contrast, had the system user been an older person who recently was searching for a new car, the keywords "Lincoln's Address" would have instead led to the system pointing to a topic or other kind of node (e.g., geography space node) directed to the local Ford/Lincoln™ automobile dealership. This would be so because under that alternate context (older user and different user history), the possibility of the user being a Fifth Grade student would have been excluded, or at least much reduced in score in terms of context and a corresponding topic likely to be then be on the user's mind. At the same time logical connections to nodes or subregions pointing to automobile dealerships would have received substantially greater scores.

Still referring to FIG. 3Y and this time also to FIG. 3D, a more specific example is provided of how the currently activated profiles (301_p_, 301_p_' in FIG. 3D; and layer 30Y.63 in FIG. 3Y) can work in combination with currently received indications of user physical and other contexts to progressively home in on a likely, subregion XSR5 of FIG. 3Y within the context mapping mechanism (316''').

Some of the recently received CFi's, 30Y.1 will be those indicating current physical context (e.g., geographic location and temporal positioning within a user associated calendar) where these current physical context CFi's 30Y.1 operate to identify a more likely, current PHAFUEL log(habits and routines) 30Y.10 for the user and to identify a more likely, current PEEP record (personhood and emotional expressions profile) 30Y.20 for the user. Aside from the emotional expressions profile (30Y.20), the user may have a corresponding, currently exposable other personhood profile 30Y.30 which the user has indicated as being currently exposable over the network, except that the exposed data from the personhood profile 30Y.30 may be less detailed or specific than that of the current PEEP record (30Y.20). For example, the exposed data from the personhood profile 30Y.30 may only show a rough yearly income range (e.g., "above $30K per year") rather than the user's actual income numbers. The logged-in persona 30Y.3 of the user may point to a specific personhood profile 30Y.30 as well as to a specific (but not exposed) PEEP 30Y.20. A last determined, mental context of the user (e.g., recent user history) may also point to specific ones of the user's PHAFUEL records, PEEP profiles and personhood profile (e.g., 30Y.10, 30Y.20, 30Y.30) as being the currently most likely to use. These currently activated profile records may then match with or strongly cross-correlate with a specific subregion, XSR5 in context space 316''' (e.g., by pointing to the parent node of that subregion). The cross-correlation is represented by respective pointers 30Y.15, 30Y.25 and 30Y.35. Although not shown in FIG. 3Y, an example of a series of hierarchically organized nodes represented by data stored for the system-maintained context space 316''' may be as follows: //currently adopted role=at home/young person/student/elementary school/Fifth Grade Student/doing homework/for History class. That, context (as represented by output signal 30Y.36), when combined with recently received CFi's (e.g., keyword type CFi's 30Y.4) causes the scanner 30Y.50 to automatically point to a first subregion in a hybrid keyword/context space (having node 30Y.8 as its parent, where 30Y.7 is the parent of 30Y.8). Then when newer, context indicating CFi's (30Y.1, 30Y.2, 30Y.3) are received and newer, focus-indicating CFi's (30Y.4) are received, the updated context indicating signal 30Y.36 (and also 30Y.36' which drives the profiles) may identify a smaller (better resolved) subregion in context space (and in profiles space) and the scanner 30Y.50 may then step forward to a state in which it points to a smaller (better resolved) subregion 30Y.9 in the hybrid keyword/context space, thereby directly or indirectly pointing to context and topic appropriate chat or other forum participation opportunities which the user is to be invited into. In one embodiment, an automated link tracer 30Y.67 uses the inter-space links (e.g., 380.9") of the pointed-to hybrid node (e.g., 30Y.9) to trace to the indirectly pointed-to subregion (e.g., topic space region 370.7") of another Cognitive Attention Receiving Space (e.g., topic space) and it then fetches the chat room or other informational resources of the indirectly pointed-to subregion (e.g., 370.7") for use in transmitting an invitation or other communication back to the user.

Sometimes, a user is momentarily interrupted out of one context and asked to temporarily switch into a second context with the expectation that the user will soon return to the first context. By way of example, while the Fifth Grade Student is doing his/her homework, the mother comes into the room and asks, "Sorry to interrupt, but my computer is down; can you do me a favor and print out some driving directions to my friend's house?" In this exemplary case, the student is momentarily taken out of his/her first context (e.g., researching the question about how modern historians view Abe-Lincoln's Address) and put into a different context (e.g., temporarily helping his/her mother to get driving directions). The STAN_3 system can automatically detect this sudden switch of context by, for example, detecting that the new search keywords being inputted into respective search engines (e.g., "What is the shortest driving directions to Montgomery Street?") are incongruent with the context (30Y.36) last determined for that user (Fifth Grade Student).

In response to this determination, and in accordance with one aspect of the present disclosure, the system automatically saves the previously determined context (represented by signals 30Y.36 and 30Y.36') into a first context swap stack (or other such history memory) 30Y.59 that is associated with recent activities of the first user. The system also automatically saves the previously determined set of activated profiles (of active profiles layer 30Y.63) into a second user's context swap stack (or other such memory) 30Y.58. Additionally, the system automatically saves the previously determined set of pointers (the pointers of active pointers layer 30Y.65) into a corresponding hybrid space pointers saving stack (or other such memory) 30Y.55 that belongs to the interrupted user. In one embodiment, a synchronizing signal is also stored that indicates which levels of the various context swap stacks belong to one another.

Once the interrupted context-development process is stored away in the swap stacks, the STAN_3 system can then begin to develop a new determination of the newly inserted and current context (e.g., helping mother get driving directions) for the same user and it can then begin making context-appropriate suggestions for that new context. When the interrupting second context completes (as evidenced by changed CFi's from the user), the system temporarily saves the parameters of that second context into the context swap stacks, 30Y.59, 30Y.58, 30Y.55, and retrieves the earlier saved parameters of the first, and temporarily interrupted context (e.g., researching the question about how modern historians view Abe-Lincoln's Address). In this way, the work done by the system in refining its understandings of the user's context for the first, temporarily interrupted task (Fifth Grade homework task) is not lost and the interrupted user can pick up where he/she last left off. It is within the contemplation of the disclosure that the context swap stacks, 30Y.59, 30Y.58, 30Y.55 may be sized and organized for swapping as between three or more interleaving tasks. In one embodiment, the user identifies to the system, one or more tasks as being long-term continuing ones and the system then understands that other intervening tasks are shorter-term ones for which the parameters do not have to be saved for a long time.

Still referring to FIG. 3Y for just a bit longer, it may be seen that hybrid matching functions depicted in this figure are subdivided into a series of pipelined machine operations, including: (a) a feedback operation (layer 30Y.60) in which a latest, other-than-purely physical, context determination representing signal 30Y.36' obtained from the context mapping mechanism 316''' is received and stored; (b) a recent CFi's and other-user-state-reporting signals receiving operation (layer 30Y.61/62) in which recent physical context reporting CFi's (XP signals) and other attention giving activities reporting signals related to the user and the user's state are received and stored; (c) a profiles updating operation (layer 30Y.63) in which selection of the currently activated profiles may be changed based on the more recently received CFi and other user-state reporting signals; (d) a subregions cross-correlating/matching operation (layer 30Y.64) in which the currently activated user profiles are used in combination with recently received, reporting signals (e.g., CFi's, CVi's) related to the user's state and recent attention giving activities of the user are used to better resolve or update the system's determination of the user's likely current and other-than-purely physical context, which context is represented by the context space output signal, 30Y.36 and in which operational layer 30Y.64 the user's current, other-than-purely physical context representing signal 30Y.36 is used to drive the hybrid space scanner 30Y.50 in combination with drives provided by recently received CFi's, CVi's (which recently received signals may be transformed/translated based on the currently activated profiles (of layer 30Y.63) before driving the scanner 30Y.50) so that the scanner 30Y.50 generates pointers (e.g., 30Y.51, 52) pointing to hybrid space points, nodes or subregions (e.g., 30Y.7,8,9) that are likely to be cross-associated with what the user appears to be casting his/her attention giving energies on, given the determined, other-than-purely physical context (30Y.36) of the user; (e) a cross-space linking operation (e.g., 30Y.67) in which the identified hybrid space points, nodes or subregions are used to logically link (380.9'') to corresponding points, nodes or subregions (or clustering center points, e.g., 370.9'') in other Cognitive Attention Receiving Spaces (e.g., in topic space—as represented in FIG. 3Y by subregion 370.7''); and (f) an informational resources providing operation (not explicitly shown, see description above of tracer 30Y.67) in which the user (e.g., the Fifth Grade Student) is provided with on-topic and/or otherwise appropriate informational resources that are likely to be relevant to what the user apparently has in mind given the determinations made by the STAN_3 system regarding the user's current context (represented by signal 30Y.36) and given the determinations made by the STAN_3 system regarding the user's current attention giving activities. The provided informational resources which are transmitted to the user (e.g., to the user's mobile data processing device) may include one or more of invitations to join in on chat or other online forum participation sessions, invitations to join in real life (ReL) gathering events, suggestions of other users (e.g., topic experts) whom the first user may wish to link up with so as to obtain further relevant information and suggestions of other informational resources which the first user may wish to tap so as to obtain further relevant information, where the relevancy of the provided informational resources is based on the pointers generated by the hybrid space scanner 30Y.50 and the hybrid space points, nodes or subregions pointed to by those pointers (e.g., 30Y.51, 30Y.52).

Stated otherwise, a machine-implemented and automated process (e.g., 30Y.60-67) is provided which empowers a first user (e.g., 30R.0A) whose attention giving activities are being automatically monitored by one or more local devices (e.g., mobile wireless device 30R.00 in FIG. 3R) and being automatically reported to the ss3 core (e.g., the cloud) so as to cause his monitored activities to induce the automated informational resource lookup operations to take place in the STAN_3 system core on his/her behalf where the automated informational resource lookup operations include one or more of: (a) automatically determining one or more most likely current contexts (30Y.36) for the user; (b) automatically determining, based on the determined current context(s), one or more currently likely profiles (30Y.63) to be activated for the user; (c) automatically identifying, based on the currently activated one or more profiles and on reporting signals (e.g., 30Y.4) recently received for the user reporting recent attention giving activities of the user and/or reporting recent physical context and/or biometric states of the user, one or more points, nodes or subregions (or clustering center points, e.g., 370.9'') of a pure or hybrid Cognitive Attention Receiving Space (e.g., keyword-and-context space) to be currently pointed-to; (d) automatically identifying, based on the currently pointed-to parts of a hybrid or pure Cognitive Attention Receiving Space, one or more informational resources to be transmitted back to the user in the form, for example, of invitations to join chat or other online forum participation sessions, invitations to join real life (ReL) or virtual life events related to the currently pointed-to parts of the pure/hybrid Cognitive Attention Receiving Space, and so on. As used in this paragraph, the term "empowers" includes at least the notion that a user is enabled to log-into and/or otherwise access remote resources of the STAN_3 system core for thereby causing the system core to return to that distally located user, informational resource signals which can represent at least one of: invitations to join chat or other online forum participation sessions related to the pointed-to parts of the hybrid Cognitive Attention Receiving Space (HyCARS), invitations to join real life (ReL) or virtual life events related to the pointed-to parts of the HyCARS, suggestions to connect with one or more identified other users (e.g., experts, influencers) in regard to the pointed-to parts of the HyCARS, and suggestions to access one or more identified data resources (e.g., databases) in regard to the pointed-to parts of the hybrid Cognitive Attention Receiving Space (HyCARS).

Referring to FIG. 3F, in one embodiment, one of the data-objects organizing spaces maintained by the STAN_3 system 410 is a music-type Cognitive Attention Receiving Space (CARS) that includes as its primitives, a music primitive object 30F.0 having a data structure composed of pointers and/or descriptors including first ones defining musical melody notes and/or musical chords and/or relative volumes or strengths of the same relative to each other. It is to be understood that due to drawing space limitations some housekeeping fields are not shown in FIG. 3F, including for example fields identifying where in the local space the data object is hierarchically and/or spatially located, fields identifying the data object by serial number or other unique means and fields identifying nearby clustering center points. On the other hand, examples of such left out fields may be found for example in FIGS. 3Ta-TB and 3W as will be detailed below. The discussion later below of such housekeeping fields are to be seen as if incorporated here at by reference.

The music primitive object 30F.0 of FIG. 3F may alternatively or additionally define percussion waveforms and their interrelationships as opposed to musical melody notes. The music primitive object 30F.0 may identify associated musical instruments or types of instruments and/or mixes thereof. The music primitive object 30F.0 may identify associated nodes and/or subregions in topic space, for example those that identify a corresponding name for a musical piece having the notes and/or percussions identified by the music primitive object 30F.0 and/or identify a corresponding set of lyrics that go with the musical piece and/or identify corresponding historical or other events that are logically associated to the musical piece. The music primitive object 30F.0 may identify associated nodes and/or subregions in context space, for example those that identify a corresponding location or situation or contextual state that is likely to be associated with the corresponding musical segment. The music primitive object 30F.0 may identify associated nodes and/or subregions in multimedia space, for example those that identify a corresponding movie film or theatrical production that is likely to be associated with the corresponding musical segment. The music primitive object 30F.0 may identify associated nodes and/or subregions in emotional/behavioral state space, for example states that are likely to be present in association with the corresponding musical segment. And moreover, the music primitive object 30F.0 may identify cross-associated informational resources for its notes/percussions and/or associated nodes and/or subregions in yet other spaces where appropriate. Although not explicitly shown, the cross-associated informational resources may include one or more of cross-associated chat or other forum participation sessions, cross-associated personas and/or other such informational resources as may be useful to system users when focusing-upon the respective notes/percussions of the corresponding music primitive object 30F.0 or of respective operator nodes that inherit attributes of the music primitive object 30F.0.

Of importance, it is to be understood that the illustrated data structures of the different cognition representing data objects being introduced here-at; where the music primitive object 30F.0 of FIG. 3F is merely an example, are not limited in content or organization to that which is shown in FIG. 3F. The data structures (e.g., of music primitive object 30F.0 as a first example; and also the data structures of further data objects shown in FIGS. 3G-3Q) or other such primitive data objects not illustrated in figures but included as part of the spirit and scope of the present teachings, may include additional fields (e.g., like 30T.1*a*-30T.1*d* and others of FIGS. 3Ta-3Tb and like 30W.7*b*-30W.7*c* and others of FIG. 3W) and/or fields organized in different ways and/or ancillary other data structures with which the illustrated ones cross-cooperate. More specifically, because the concept of non-textual cognition representing data objects like 30F.0 of FIG. 3F is being elaborated on here for a relatively first time and it may be hard to simultaneously wrap one's mind around the dual ideas of what each primitive object does and then how plural ones of such cognition representing data objects (e.g., music primitives 30F.0) may be distributively placed (e.g., clustered, for example adjacent to one or more cognitive-sense-representing clustering center points—see again 370.9" of FIG. 3Y) within corresponding spatial and/or hierarchical spaces, it is to be understood that additional fields (not shown in FIG. 3F) may be provided for specifying where in such spaces the data objects virtually reside in a spatial and/or hierarchical and/or other sense (e.g., including where in the system's physical memory the data representing the data objects resides), but for the sake of simplification such additional fields are not shown (at least in FIGS. 3F-3P). On the other hand, when the yet more detailed data structure of a topic primitive object (TPO, see briefly, FIGS. 3Ta-3Tb) will be later described, the concept of primitive cognition representing data objects having spatial and/or hierarchical placements will be better explained (see briefly, fields 30T.1*a*-30T.3 of FIG. 3Ta). Nonetheless, it is to be understood that data structures such as that of the above introduced music primitive object 30F.0 may include one or more additional fields which provide data indicative of where in a corresponding one or more spatial and/or hierarchical spaces the respective primitive (e.g., 30F.0) resides and/or how it is shaped or sized. This concept was already mentioned above with regard to field 30Q.1 of FIG. 3Q. The one or more additional fields (not shown in FIG. 3F) may include bi-directional pointers to ancillary, position defining data structures (not shown) where those ancillary position-defining data structures define, or assist in defining where the first data structure (e.g., 30F.0) resides in a respective one or more virtual spaces. As an example, an ancillary, position defining data structure (not shown) may identify a specific subregion (e.g., a base address) within which or near to which the respective primitive (e.g., 30F.0) resides and then the respective primitive may itself include a more detailed one or more location defining fields (e.g., an offset from a base address) which indicate where in respective spatial and/or hierarchical spaces and in corresponding subregions the respective primitive (e.g., 30F.0) is precisely located. (The notion of a primitive and/or non-primitive cognition representing data object having location was described above as part of field 30Q.1 of FIG. 3Q (operator node data object) and that notion will be explicated even further in the discussion of FIGS. 3R, 3S, 3Ta and 3Tb.)

Referring next to FIG. 3G, in one embodiment, one of the data-objects organizing spaces maintained by the STAN_3 system 410 is a sound waveforms space that includes as its primitives, a sound primitive object 30G.0 having a data structure composed of pointers and/or descriptors including first ones 30G.1 defining sound waveforms and relative magnitudes thereof as well as, or alternatively overlaps, relative timings and/or spacing apart pauses between the defined sound segments. The sound primitive object 30G.0 may include data 30G.2 identifying associated portions of a frequency spectrum that correspond with the represented sound segments. The sound primitive object 30G.0 may include stored data 30G.3 identifying associated nodes and/or subregions in topic space that correspond with the represented sound segments. The illustrated and respective links 30G.4-30G.7 to context space, multimedia space and so on may provide functions substantially similar to those described above for music space. These include stored data 30G.7 identifying cross-associated informational resources for its sound waveforms and/or stored data 30G.6 identifying cross-associated points, nodes and/or subregions in yet other spaces where appropriate. Although not explicitly shown, the cross-associated informational resources may include one or more of cross-associated chat or other forum participation sessions, cross-associated personas and/or other such informational resources as may be useful to system users when apparently giving attention energies to respective sound waveforms of the corresponding sound primitive object 30G.0 or of respective operator nodes that inherit attributes of the sound primitive object 30G.0.

Referring to FIG. 3H, in one embodiment, one of the data-objects organizing spaces maintained by the STAN_3 system 410 is a voice primitive representing object 30H.0 having a data structure composed of pointers and/or descriptors including first ones defining phoneme attributes of a corresponding voice sound segment and relative magnitudes thereof as well as, or alternatively overlaps, relative timings and/or spacing apart pauses between the defined voice segments. The voice primitive object 30H.0 may identify associated portions of a frequency spectrum that correspond with the represented voice segments. The voice primitive object 30H.0 may identify associated nodes and/or subregions in topic space that correspond with the represented voice segments. The links to context space, multimedia space and so on may provide functions substantially similar to those described above for the music and sound spaces.

Referring to FIG. 3I, in one embodiment, one of the data-objects organizing spaces maintained by the STAN_3 system 410 is a linguistics primitive(s) representing object 30*i*.0 having a data structure composed of pointers and/or descriptors including first ones defining root entomological origin expressions (e.g., foreign language origins) and/or associated mental imageries corresponding to represented linguistics factors and optionally indicating overlaps of linguistic attributes, spacing aparts of linguistic attributes and/or other combinations of linguistic attributes. The linguistics primitive(s) representing object 30*i*.0 may identify associated portions of a frequency spectrum that correspond with represented linguistic attributes (e.g., pattern matching with other linguistic primitives or combinations of such primitives). The linguistics primitive(s) representing object 30*i*.0 may identify included linguistic types for corresponding included linguistic elements of the represented primitive such as verb(s), noun(s), adverbs, adjectives, homonyms, antonyms, negations, connectors (e.g., "and", "or", "as well as", etc.), punctuations or pauses, clauses and so on. It is to be understood here that linguistic primitives are not limited to textual material and may alternatively or additionally include phonetic material and even sign language. The linguistics primitive(s) representing object 30*i*.0 may further identify associated nodes and/or subregions in topic space that correspond with the represented linguistics primitive(s). Also for the linguistics primitive(s) representing object 30*i*.0, the included links to context space, body gesture space, multimedia space and so on and may provide functions substantially similar to those described above for music and other such spaces. (The context primitive 30J.0 of FIG. 3J has already been discussed above.)

Referring to FIG. 3M, in one embodiment, one of the data-objects organizing spaces maintained by the STAN_3 system 410 is an image(s) representing primitive object 30M.0 having a data structure composed of pointers and/or descriptors including first ones defining a corresponding image object in terms of pixilated bitmaps and/or in terms of geometric vector-defined objects where the defined bitmaps and/or vector-defined image objects may have relative transparencies and/or line boldness factors relative to one another and/or they may overlap one another (e.g., by residing in different overlapping image planes) and/or they may be spaced apart from one another by object-defined spacing apart factors and/or they may relate chronologically to one another by object-defined timing or sequence attributes so as to form slide shows and/or animated presentations in addition to or as alternatives to still image objects. The image(s) representing primitive object 30M.0 may identify associated portions of spatial and/or color and/or presentation speed frequency spectrums that correspond with the represented image(s). The image(s) representing primitive object 30M.0 may identify associated nodes and/or subregions in topic space that correspond with the represented image(s). Also for the image(s) representing primitive object 30M.0, the included links to context space, multimedia space and so on may provide functions substantially similar to those described above for music and other such spaces.

Referring to FIG. 3N, in one embodiment, one of the data-objects organizing spaces maintained by the STAN_3 system 410 is a body and/or body parts(s) representing primitive object 30N.0 having a data structure composed of pointers and/or descriptors including first ones defining a corresponding and configured (e.g., oriented, posed, still or moving, etc.) body and/or body parts(s) object in terms of identification of the body and/or specific body part(s) and/or in terms of sizes, types, spatial dispositions of the body and/or specific body part(s) relative to a reference frame and/or relative to each other. The body and/or body parts(s) representing primitive object 30N.0 may identify associated portions of spatial and/or color and/or presentation speed frequency spectrums that correspond with the represented body or part(s). The body and/or body parts(s) representing primitive object 30N.0 may identify associated force vectors or power vectors corresponding to the represented body or part(s) as may occur for example during exercising, dancing or sports activities. The body and/or body parts(s) representing primitive object 30N.0 may identify associated nodes and/or subregions in topic space that correspond with the represented body and/or specific body part(s) and their still or moving states. Also for the body and/or body parts(s) representing primitive object 30N.0, the included links to emotion space, context space, multimedia space and so on may provide functions substantially similar to those described above for music and other such spaces. In one embodiment, keyword expressions that correspond to action verbs are logically cross linked to corresponding body motion attributes of the body and/or body parts(s) representing primitive object 30N.0. In the same or another embodiment keyword expressions (or linguistic expressions, see FIG. 3I) that correspond to computer action verbs are logically cross linked to corresponding computer action nodes in a system-maintained computer actions space (not shown). As a result, a neural and neuroplastically variable network of logical linkages is built up in the system for cross-correlating between action-representing words/linguistics or like expressions and definitions of corresponding body and/or computer actions.

Referring to FIG. 3O, in one embodiment, one of the data-objects organizing spaces maintained by the STAN_3 system 410 is a physiological, biological and/or medical condition/state representing primitive object 30*o*.0 having a data structure composed of pointers and/or descriptors including first ones defining a corresponding biological entity and/or biological entity parts(s) object in terms of identification of the biological entity and/or biological entity parts(s) and/or in terms of sizes, macroscopic and/or microscopic resolution levels, systemic types, metabolic states or dispositions of the biological entity and/or biological entity parts(s) for example relative to a reference biological entity (e.g., a healthy subject) and/or relative to each other. The physiological, biological and/or medical condition/state representing primitive object 30*o*.0 may identify associated condition names, degrees of attainment of such conditions (e.g., pathologies).

The physiological, biological and/or medical condition/state representing primitive object 30*o*.0 may identify associated dispositions within reference demographic spaces and/or associated dispositions within spatial and/or color and/or metabolism rate spectrums that correspond with the represented biological entity and/or biological entity parts(s). The physiological, biological and/or medical condition/state representing primitive object 30*o*.0 may identify associated force or stress or strain vectors or energy vectors (e.g., metabolic energy flows and/or rates in or out) corresponding to the represented biological entity and/or biological entity parts(s) as may occur for example during various metabolic states including those when healthy or sick or when exercising, dancing or engaging sports activities. The physiological, biological and/or medical condition/state representing primitive object 30*o*.0 may identify associated nodes and/or subregions in topic space that correspond with the represented biological entity and/or biological entity parts(s) and their still or moving states. Also for the physiological, biological and/or medical condition/state representing primitive object 30*o*.0, the included links to emotion space, context space, multimedia space and so on may provide functions substantially similar to those described above for music and other such spaces.

Referring to FIG. 3P, in one embodiment, one of the data-objects organizing spaces maintained by the STAN_3 system 410 is a chemical compound and/or mixture and/or reaction representing primitive object 30P.0 having a data structure composed of pointers and/or descriptors including first ones defining a corresponding chemical compound and/or mixture and/or reaction in terms of identification of the corresponding chemical compound and/or mixture and/or reaction and/or in terms of mixture concentrations, particle sizes, structures of materials at macroscopic and/or microscopic and/or molecular/atomic/subatomic resolution levels, and/or in terms of reaction environment (e.g., presence of catalysts, enzymes, etc.), temperature, pressure, flow rates, etc. The chemical compound and/or mixture and/or reaction representing primitive object 30P.0 may identify associated condition/reaction state names, degrees of attainment of such conditions (e.g., forward and backward reaction rates). The chemical compound and/or mixture and/or reaction representing primitive object 30P.0 may identify associated other entities such as biological entities as disposed for example within reference demographic spaces (e.g., likelihood of negative reaction to pharmaceutical compound and/or mixture) and/or associated dispositions of the compound and/or reactants within spatial and/or reaction rate spectrums. The chemical compound and/or mixture and/or reaction representing primitive object 30P.0 may identify associated power vectors or energy vectors (e.g., reaction energy flows and/or rates in or out) corresponding to the represented chemical compound and/or mixture and/or reaction as may occur for example under various reaction conditions. The chemical compound and/or mixture and/or reaction representing primitive object 30P.0 may identify associated nodes and/or subregions in topic space that correspond with the represented chemical compound and/or mixture and/or reaction. Also for the chemical compound and/or mixture and/or reaction representing primitive object 30P.0, the included links to emotion space, biological condition/state space, context space, multimedia space and so on may provide functions substantially similar to those described above for music or other such spaces. (FIG. 3Q was already described above.)

Referring next to FIG. 3X, in one embodiment, the STAN_3 system 410 includes a node attributes comparing module that automatically crawls through a given data-objects organizing space (e.g., topic space) and automatically compares corresponding attributes of two or more nodes (e.g., topic nodes) in that space for various notions of sameness (e.g., duplication), degree of sameness or degree of differences, where the results are recorded into a nodes comparison database such as in the form, for example, of the illustrated nodes comparison matrix of FIG. 3X. Due to space limitations in the drawings, not all of the various notions of substantial sameness or similarity are illustrated. For example, comparison as between relative hierarchical and/or spatial distances of compared topic nodes to identified clustering center points (see 370.9" of FIG. 3Y) are not shown but are nonetheless understood to be contemplated herein. In one embodiment, the attributes that are compared may include any one or more of: hierarchical or nonhierarchical trees or graphs to which the compared nodes (e.g., Tn74' and Tn75') belong. Note that the universal hierarchical "A" tree is not tested for, because all nodes of the given space must be members of that universal tree irrespective of where in the spatial dimensions of the topic space the nodes reside. (It is within the contemplation of the present disclosure to alternatively have a topic space and/or other Cognitions-representing Spaces that do not hierarchically organize their respective nodes or other such data object but instead place them only spatially, for example as clustered near or far to one another and/or near or far to clustering center points and in such a case the tests performed by the node attributes comparing module will be varied accordingly.) The attributes that are compared as between the two or more hierarchically organized nodes (e.g., Tn74' versus Tn75') may further include the number of child nodes that the compared node has, the number of out-of-tree logical links that the compared node has, and if such out-of-tree logical links point to specific external spaces, an indication of what those specific external spaces are (e.g., keyword expressions space, URL space, context space, etc.) and optionally an identification of the specific nodes and/or subregions in the specific external spaces that are being pointed to. It is to be understood that this is a non-limiting set of examples of the kinds of information that is recorded into the node-versus-node comparison matrix.

In one embodiment, the STAN_3 system 410 further includes a differences/equivalences locating module that automatically crawls through the respective node-versus-node comparison matrix of each space (e.g., topic space, context space, keyword expressions space, URL expressions space, etc.) looking for nodes (or points or subregions) that are substantially the same and/or very different from one another and generating further records that identify the substantially same and/or substantially different nodes (e.g., substantially different sibling nodes of a same tree branch, or ditto for respective points or respective subregions). The generated and stored records that are automatically produced by the differences/equivalences locating module are subsequently automatically crawled through by other modules and used for generating various reports and/or for identifying unusual situations (e.g., possible error conditions that warrant further investigation). One of the other modules that crawl through the differences/equivalences records can be the local space consolidating module (e.g., 370.8' of FIG. 3*x* in the case of the keyword expressions or other such textual expressions space).

Referring next to FIG. 3R, operations of the STAN_3 system 30R/310/410 will now be described using a perspective schematic format having concentric cylindrical shells (e.g., denoted as 30R.2, 30R.3, etc., and progressing radially inward) and showing how child and co-sibling topic nodes (CSiTN's) may be organized within a branch space (inner cylinder 30R.10) owned by a parent node (such as parent topic node PaTN 30R.30) and how personalized (e.g., idiosyncratic) codings of different users (e.g., 30R.0A, 30R.0B) in corresponding individualized contexts (represented at the outer periphery of the concentric cylindrical shells by individualized context segments 30R.1, 30R.5' of the exemplary left and right side users) progress sequentially through data processing parts (30R.2, 30R.3, 30R.4, etc.) of the illustrated system 30R so as to become cross-correlated (e.g., matched) with collective or communal codings provided by the collective of the users and illustrated as being more towards the central vertical axis ($Z_{TsBr}$—also representing a Z-direction topic space branch) of the illustrated concentric cylindrical shells. The generated cross-correlations (e.g., matchings) between peripherally generated CFi's or other such user state reporting signals (e.g., bubble 30R.4$a$) and cross-correlated, child nodes (e.g., 30R.9$c$) of the illustrated topic space region (TSR) lead to the production of signals representing logical cross-associations as between the respective users (e.g., 30R.0A, 30R.0B) and respective portions of the collectively usable informational resources provided within, or linked to by, the CSiTN's (child nodes) organized within the perspective-wise illustrated branch space 30R.10. These logical cross-associations may identify respective chat or other forum participation opportunities (e.g., chat room 30R.60) to which each respective system user may be respectively invited; and/or respective other users (e.g., topic experts) with whom each respective system user (e.g., 30R.0A) may be respectively connected; and/or non-forum other resources (e.g., research suggestions, conference notifications, etc.) of which each respective system user may be alerted to.

In FIG. 3R, each of the illustrated users (30R.0A, 30R.0B) is intentionally drawn as being relatively small sized and having a correspondingly small sized, linking device (e.g., 30R.00, for example a miniature smartphone) which empowers the user (e.g., 30R.0A) to have signals representing monitored ones of his/her attention giving activities transmitted (reported, see for example 30Y.61 of FIG. 3Y) to the remote, functionally-bigger and more powerful data processing resources of the system core for cross-matching of current user context and current user attention giving activities with points, nodes or subregions of system-maintained Cognitive Attention Receiving Spaces (CARSs), where the cross-matched parts of the CARSs (see for example 370.7" of FIG. 3Y) logically link to collective informational resources generated by collective activities of many system users (e.g., most popular on-topic URL's, most popular on-topic keywords, etc.). In other words, the one (30R.0A) is empowered to selectively connect to context and focus-appropriate informational resources (e.g., 30R.30) of the many by use of a relatively small and functionally simple interconnect device (e.g., 30R.00).

One machine-implemented and automated process followed here starts with the exemplary first user 30R.0A shown near the bottom left corner of FIG. 3R and the activities/states monitoring operations of his/her local interconnect device (30R.00). That first user 30R.0A has a respective, current and individualized context 30R.1 within which he/she is deemed to be currently operating. That individualized and user-specific context 30R.1 may have a counterpart context node (not shown) in the system-maintained context space (see FIG. 3S) where the counterpart context node is less individualized, less user-specific and more generic and optionally normalized so as to serve as a counterpart context node that defines a current context of many similarly situated users, not necessarily just that of the one individualized user (30R.0A). Due to lack of drawing space in FIG. 3R, item 30R.1 will also at times be used to represent the multi-users generic context, where the latter may shed context-based illuminating light on a corresponding, multi-users servicing and thus relatively generic topic node (or node of another non-context space). For sake of example in illustrating the difference between individualized and more generic (more communally common) contexts, the first user 30R.0A of one exemplary case may currently present him/herself as being a Fifth Grade Student at Public School number PS 279 in New York City and having Mr. Bass as his/her history teacher. However, many of such user-specific details will generally not be reflected in the counterpart context node of the system-maintained context space (XS) to which the individualized context (30R.1) of the first user 30R.0A will be cross-correlated (e.g., matched or mapped). Instead, there will be a corresponding node in context space for all Fifth Grade Students and perhaps all such students who are in the contextual state of now focusing-upon a homework task associated with their history teacher. One of the automated data processing operations carried out by the STAN_3 system in such a case will be to light up (illuminate) the collective/generic, Doing-Homework/Fifth Grade/History context node (not shown) as being a system-maintained node currently cross-associated with the user-specific context 30R.1 of individual user 30R.0A. This occurs shortly after the individualized context 30R.1 of that user has been automatically determined by the system based on physical context (XP) reporting signals received for that first user and/or based on other context reporting signals (e.g., biometric) sent to the system core regarding the contextual state of the first user 30R.0A. The concave symbol drawn at 30R.1 of FIG. 3R for representing the first user's individualized context may be seen as representative of that (the individualized context) and also, later in this description, as being separately representative of a context-appropriate illumination provided by the counterpart context node (not shown in FIG. 3R) for use by cross-correlation modules within the system (see 30Y.50 in FIG. 3Y and the non-individualized context signal 30Y.36 which drives it) that make cross-correlations between recently received CFi's (30Y.4) and context-appropriate nodes (e.g., 30Y.8, 30Y.9) in hybrid space.

For sake of completeness, FIG. 3R shows some of the individualized profile records of the first user 30R.0A in the upper right corner of the drawing. These can include, the currently activated PEEP record 30R.21, currently activated PHAFUEL record 30R.22, other currently activated personhood profiles 30R.24, one or more currently activated social dynamics (PSDIP) profiles 30R.25, one or more currently activated, topic-centric profiles (a.k.a. Domain specific profiles) 30R.26 and one or more currently activated, context-centric personal profiles 30R.27. The context-centric personal profiles 30R.27 may include highly personalized, individualized data about the specific user 30R.0A such as what specific school he/she attends, at what hours, in which classroom etc. However, for the sake of safety and privacy protection, almost none of that gets exposed outside of the user's account settings control except to the extent that the user (or an authorized guardian) gives permission for. For example, even the fact that the user is in Fifth Grade may be blocked from being shared and instead the user's context may be output in a normalized (de-individualized) form of K1-8 or K5-8 elementary school grade levels so as to give only an approximate range rather than more revealing data. However, if the user elects to remain more private about his/her context in this manner, the system will often not be able to home in on narrower context nodes/subregions within its context space (XS) as it tries to match the user with context-appropriate informational resources. Instead the system will rely on lower resolution (wider scope) subregions of context space (e.g., grade school history homework as the operative context for co-received keywords of "lincoln" and "address" for the above Abe-Lincoln example). In many instances, that alone may be good enough for automatically getting the user to the informational resources cross-associated with what the user is currently focusing-upon.

While the user (e.g., 30R.0A) is operating under his/her current individualized context 30R.1, the user will generally have user-internal cognitions. There are at least two different kinds of such possible mental cognitions, conscious and subconscious cognitions. These conscious and subconscious cognitions are respectively denoted as 30R.2*b* and 30R.2*a* in FIG. 3R and they are shown as occurring radially outward of cylindrical virtual shell 30R.3 of FIG. 3R. Not all user cognitions are outwardly expressed or expressed by means of a user-supplied coding in a manner whereby the cognition could be understood based on the user-supplied outer manifestation. Some cognitions remain hidden as ones that even the user does consciously perceive as being there. It is not the intent of, nor does the present disclosure provide a means for directly determining exactly what a user's private cognitions are. However, with that said, it is within the contemplation of the present disclosure that an individualized fMRI device, EEG device and/or the like may be used, if permitted by the user, for automatically determining what areas of the user's brain are currently most active. Such, machine-facilitated determinations may shed light on the user's current mental state (e.g., mostly emotional versus mostly unemotional and logical).

Moving radially inward in the depiction of FIG. 3R, in other words, in the direction of arrow 30R.75, and thus inwardly of the private cognitions wall 30R.3, there will be various, "coded expressions" that the user exhibits as externally detectable manifestations based on his/her internal cognitions (30R.2*a*, 30R.2*b*). These externally detectable manifestations may include facial expressions, other body language expressions, changes in biological state (e.g., heart rate, breathing rate, etc.) as picked up by sensors operatively coupled to the STAN_3 system, and so on. They may also include outwardly expressed codings in the forms of foreign and/or native language words or other textual streams. Such manifestations are identified in FIG. 3R as user-expressed and personal codings 30R.3*a*. The user's currently activated PEEP records (30R.21) may be used for decoding body language and biometric other ones of some of these user-expressed and personal codings 30R.3*a*, where the PEEP-based decodings produce data signals representing the understood implications of the individualized user's body language and biometric other ones of such user-expressed and personal codings 30R.3*a*.

One subset of the user's personal codings 30R.3*a* is referred to here as the user's authored-coded expressions 30R.4*a*. The latter may include user-selected keywords (30R.4*b*, which selections are understood to include user-typed out keywords), user-selected URL's (30R.4*c*, which selections are understood to include user-typed out hyperlink specifications), user-selected ERL's (30R.4*d*, which Exclusive Resource Locaters are ditto-wise understood to include user-typed out hyperlink specifications), and so on.

The respective user-authored coded expressions 30R.4*a* are transmitted by way of CFi carrying data packets (see 30U.10 of FIG. 3U) to the system core (e.g., in-cloud servers) for further processing therein. One of the processings is that of normalizing individualized and/or idiosyncratic expressions (codings) relative to an agreed-upon common coding such as for example converting foreign language words or phrases into a predetermined common language (e.g., into English) as already described above. Another is that of normalizing less often used identifications of persons or things (e.g., "Yo Ho Joe") into more universally recognized expressions (e.g., "Joe-the-Throw Nebraska") as also described above. Yet another of the processings is that of augmenting user-supplied textual codings with additional and more-universally used codings as also described above. These normalizing/augmenting operations may be carried out using respective, coding normalizing/augmenting profiles 30R.23 of the respective individualized users or groups of such users. In one embodiment, if the individualized user's coding normalizing/augmenting profile 30R.23 indicates that the user prefers to receive feedback from the STAN_3 system in his/her non-normative (e.g., foreign) language rather than in the agreed-upon, common or meta-coded language (e.g., American English), the user's coding normalizing/augmenting profile 30R.23 is also used in the reverse direction, for the case when signals (e.g., invitations) representing informational resources are returned to the user. In other words, the returned informational resources are caused to be in; or are automatically translated to be in, the user's preferred non-normative language (British English rather than American English for example).

The respective, and optionally normalized/optionally augmented CFi's of the respective individual users are collectively represented by packet 30R.8 in FIG. 3R. Due to drawing space limitations in FIG. 3R, it was not practical to show that the user selected keywords 30R.8*b* are passed through coding normalizing/augmenting process 30R.23, that the user selected URL's 30R.8*c* are also passed through the coding normalizing/augmenting process 30R.23, and also that the user selected ERL's 30R.8*d* are passed through the same and so on. Instead, arrow indicators 30R.4*b*, 30R.4*c*, 30R.4*d* are drawn to represent this aspect. User selected meta-tags or other textual type CFi's keywords may be similarly processed by the coding normalizing/augmenting process 30R.23.

The core-received and optionally normalized (30R.23) packets 30R.8 (generally, or 30R.8*b*, 8*c*, 8*d*, etc. more specifically) are next parsed, categorized and re-grouped (clustered as likes together with alikes of a same categorization) within the system core as already explained above with respect to FIG. 3D and FIG. 3V. In other words, trial clusters are formed and cross-correlated against sanity checking nodes within the system-maintained Cognitive Attention Receiving Spaces and/or sanity checking nodes within online search engines, wiki-sites and so on. Clusters of clusters may be formed and also checked for probable sanity. Then the clustered cognition-representing data objects (e.g., clustered keyword-carrying CFi's 30Y.4 of FIG. 3Y) are supplied to a respective hybrid space scanner (30Y.50) together with corresponding context-representing data (30Y.36, which signal represents non-individualized context) and in response thereto, the hybrid space scanner (30Y.50) steps progressively through a hybrid context-and-other-cognition space (e.g., context/topic space) trying to find corresponding and more strongly cross-correlated points, nodes or subregions (e.g., 30Y.7, 30Y.8, 30Y.9) that best match with recently received CFi's (30Y.4) and the latest determination 30Y.36 of user-perceived context.

Stated more simply, the individual user's current and specific context (30R.1) is cross-matched with a system-maintained and more generic context; the individual user's current and specific outward expressions (e.g., user-selected keywords 30R.4*b*) are cross-matched with system-maintained and more generic expressions of same type (e.g., more popular keywords, URL's, ERL's etc.), a hybrid expressions-and-context Cognitive Attention Receiving Space is pointed to (e.g., by hybrid space scanner 30Y.50 of FIG. 3Y) and then informational resources provided directly or indirectly by those pointed-to expressions/context hybrid points, nodes or subregions are fetched and transmitted to the user in the form of invitations to online chat rooms directed to the same cognitions and/or in the form of other such provisions of context and focus relevant informational resources.

In the discussion regarding FIG. 3Y, it was mentioned that a given grandparent node can define a first subregion in a corresponding Cognitive Attention Receiving Space, and that a respective parent node can define a smaller, and thus higher resolution second subregion in the corresponding CARS and so on. This concept is better shown in the example of FIG. 3R where the central cylindrical region 30R.10 contains all the child nodes of parent node 30R.30 and where parent node 30R.30 is a child of grandparent node 30R.50, and further where conical symbol 30R.40 represents the children containerizing space of the respective grandparent node 30R.50. Parent node 30R.30 is contained within the containerizing space 30R.40 of grandparent node 30R.50. Not all containerizing spaces (e.g., 30R.40, 30R.10) have to be the same in terms of internal spatial and/or hierarchical organization. For example, the grandparent node's containerizing space 30R.40 may have a conical 3-dimensional spatial organization where diameter increases as a function of Z-direction depth, whereas the illustrated parent node 30R.30 is shown to have a respective, children containerizing space 30R.10 that internally has a cylindrical and 3-dimensional spatial configuration with respective coordinates defining Z-direction depth, radial direction distance ($R_{TsBr}$) from the vertical axis of rotation ($Z_{TsBr}$) and angle of rotation (theta) relative to a predefined North, East, South, West frame of reference. (In one embodiment, each parent node may include a definition of the spatial configuration of its children's containerizing space. That space may be other than 3-dimensional. It could have dimensional axes greater than 3 in number; or fewer than 3, e.g., a flattened disc in place of the cylinder or a vertical or a horizontal line in place of the cylinder.)

FIG. 3R shows merely as an example, the case where parent node 30R.30 and grandparent node 30R.50 are respective topic nodes within the system-maintained topic space (see also 313" of FIG. 3D) and they both reside on the system's universal and hierarchical "A"-tree (AT) and they both have respective child nodes inside their corresponding branch spaces, 30R.40, 30R.10. Some of a set of pre-existing child nodes within cylindrical branch space 30R.10 are represented by child-and-co-sibling nodes CSiTN1 (a.k.a. 30R.9*a*), CSiTN2 (a.k.a. 30R.9*b*), and CSiTN3 (a.k.a. 30R.9*c*). The latter three child nodes, 30R.9*a*-9*c* all spatially reside at a roughly middle depth level of the Z-direction depth axis of cylindrical branch space 30R.10 and inward of a circle having a roughly middle length radius, $R_{TsBr}$.

In the illustrated embodiment 30R, almost any migrating topic node (see 30S.53 of FIG. 3S) can drift into the interior of the illustrated cylindrical branch space 30R.10 of topic node PaTN (a.k.a. 30R.30). Recall that the governance bodies of each respective topic node (or other kind of Cognitive Attention Receiving Space node) can vote to break their node's tethering (see tethers near area 313.51' of FIG. 3E) away from an old point in topic space and drift the node to a new place in topic space, for example into cylindrical branch space 30R.10. However, when their node enters branch space 30R.10 (and in accordance with one aspect of the present disclosure) it cannot attach anywhere it wants. Instead, it is first relegated to a basement level 30R.19 of the space and to being disposed radially outward of a predefined, sibling-acceptance radius (e.g., $R_{TsBr}$) of the space. To rise higher than the basement level 30R.19, the newly drifted-in topic node (not shown, see 30S.53 of FIG. 3S) has to receive acceptance and net-positive promotion votes from governance bodies of the parent node 30R.30. To move inwardly, towards the more mainstream core of the cylindrical branch space 30R.10, the newly drifted-in topic node has to receive acceptance and net-positive promotion votes from governance bodies of already-clustered-in-the-core sibling nodes (e.g., 30R.9*a*-9*c*) of roughly the same Z-direction depth or level.

More specifically, child nodes (e.g., 30R.9*a*-9*c*) who receive net-positive promotion votes from governance bodies of parent node (PaTN, 30R.30) get to move upwardly towards closer spatial clustering with the parent node. Child nodes who receive net-negative promotion votes from parent node governance bodies get repelled away from the parent node (PaTN) and thus migrate towards the basement level 30R.19 of the illustrated cylindrical branch space 30R.10. Thus the parent node governance bodies exert vertically promoting (up) or demoting (down) pressures on the spatial dispositions of child nodes found within the corresponding children-containing branch space 30R.10 of that parent node 30R.30. It should be recalled that the nature of a given topic node can change over time as new chat rooms or other forum participation sessions tether onto that given topic node or de-tether and move away to preferably hover about other topic nodes. Thus the votes given by parent node governance bodies to underlying child nodes can vary over time. (It is to be understood that it is within the contemplation of the present disclosure to have chat rooms or other forum participation sessions that are simultaneously shared by plural topic nodes, in which case the sessions may be perceived as if they loop in and out of orbit with each of the planet-wise represented topic nodes. It is also within the contemplation of the present disclosure to have chat rooms or other forum participation sessions that orbit about cognitive-sense-representing clustering center points rather than about any specific topic node or other such node in another comparable space. In the later case, the chat or other forum participation opportunities presented to users may be based on hierarchical and/or spatial distance of a matched node to corresponding nearby clustering center points rather than based on the identity of the matched node itself and the chat or other forum participation sessions deemed to be tethered to that node.)

In a similar manner, same Z-direction depth level co-siblings (e.g., CSiTN1-N3) within a branch space can cast positive and thus R-direction attracting pressures on nearby other co-siblings or negative and thus R-direction repelling pressures on nearby co-siblings. Eventually, as these various votes are cast (implicit or explicitly), co-siblings of a branch space whose governance bodies like each other, come to be spatially disposed as clusters near each other while co-siblings whose respective governance bodies dislike each other (vote to repel the other away), come to be spatially spaced apart in the corresponding cylindrical branch space (e.g., 30R.10). In this way a rogue topic node that drifts itself into branch space 30R.10, but is disliked by substantially all other occupants of that branch space (e.g., 30R.10) and is disliked by substantially all governance bodies of the parent node 30R.30 will be shifted into, or kept in the periphery of the basement level 30R.19 of the siblings-containing space. On the other hand, an in-harmony topic node that drifts itself into branch space 30R.10, and is well liked by substantially all other, central core occupants of that branch space (e.g., 30R.10) and is well liked by substantially all governance bodies of the parent node 30R.30 will be shifted into, or kept at the upper level of that branch space and clustered near the center of the space (close to the vertical Z-direction axis, $Z_{TsBr}$, of the topic space branch). All child nodes within branch space 30R.10 are considered to be hierarchically tethered on the "A"-tree (AT) as a child of the corresponding parent node (PaTN). However, in terms of spatial disposition, some of the child nodes are deemed to be more favored by the parent and co-siblings while others are deemed to be less favored by the parent and the major mass of co-siblings.

When it comes to determining which sibling node will push (repel) another away without being itself displaced from its current mooring, the notion of strong anchors and weak anchors may be used. Each child node is assigned a respective, anchor strength score. For example, anchor tether 30R.9*d* of co-sibling node 30R.9*c* is assigned a local strength value based on a number of factors such as, but not limited to, the number of system users who regularly use that topic node directly or indirectly (e.g., through an attached chat room like 30R.60), the reputations and/or topic-relevant credentials of the system users who regularly use that topic node 30R.9*c*, and so on. However, the locally assigned tethering strength 30R.9*d* is not the effective tethering strength when push comes to shove. Instead, if a challenged node (e.g., 30R.9*c*) is repelled by a challenging node (e.g., a new corner node (not shown) in layer 30R.19), the challenged node (and the challenging node) each get to inherit addition positive or negative tethering strength scores respectively from spatially nearby other nodes which respectively "like" or "dislike" the corresponding challenged and challenging node (e.g., a new corner node in layer 30R.19). More specifically, since a new corner node will often have no adjacent friend nodes that "like" that new corner node, the new corner node will have a relatively low tethering strength score. On the other hand, an already well established node (e.g., 30R.9*c*) that has many strongly tethered "friend" nodes (e.g., 30R.9*b*, 30R.9*a*) lending a positive tethering support value on top of the first node's native tethering strength 30R.9*d* will have a significantly greater, effective tethering strength. Hence, when push comes to shove, it will be the repulsive new-corner who gets spatially pushed away (by a distance proportional to repulsing votes and inversely proportional to effective tethering strength) while the counter-repulsing, established node (e.g., 30R.9*c*) will mostly stand its ground. Through a series of repulsing and attracting, pushes and shoves of this nature, the various nodes in each horizontal level of the cylindrical branch space 30R.10 will sort it out amongst themselves as to which nodes get to spatially cluster near the central or mainstream core section and which nodes are marginalized toward the periphery (pushed out in the direction of outward bound arrow 30R.71).

Vertical positioning of nodes within the cylindrical branch space 30R.10 can be driven primary by votes cast by the more influential (more highly regarded) governance bodies of the parent node 30R.30. In one embodiment, "like" and "dislike" votes from sibling nodes in the horizontal layers directly above (and optionally also directly below) are factored into the vote. Thus, if both the parent node governance bodies and the higher up sibling nodes vote to "like" an up-and-coming node currently disposed beneath them, that node gets promoted upwardly in the Z-direction so as to be closer to the top level of the cylindrical branch space 30R.10. On the other hand, if the parent node governance bodies and the higher up sibling nodes vote to "dislike" a despised node beneath them, that node gets demoted downwardly in the Z-direction so as to be closer to the basement level 30R.19. Through a series of repulsing and attracting, pushes and shoves of this nature, the parent node 30R.30 as well as the various nodes in each horizontal level of the cylindrical branch space 30R.10 will sort it out amongst themselves as to which nodes (see 30S.77 of FIG. 3S) get to spatially cluster near the top of the branch space 30R.10 and which will be pushed down into the basement level 30R.19.

When a group of system users (e.g., those who are members of a chat room like 30R.60 and who) are seeking a child node within the specific cylindrical branch space 30R.10 to link up with (via tether 30R.63 of respective tethering strength), one of the factors that may be considered during the selection process is where in the cylindrical interior of branch space 30R.10 do each of the candidate child nodes (e.g., 30R.9*a,b,c*) place, why, and who are the other child nodes that "like" the spatially placed candidate node or "dislike" it. In accordance with one aspect of the present disclosure, the effective tethering strength scores (e.g., 30R.9*d*) of respective candidate nodes are made available to system users or chat room governance entities for consideration when those entities are making a decision as to which one or more child nodes to link up with. A relatively high, effective tethering strength score means the candidate node (e.g., 30R.9*c*) is well "liked" by the other nodes in its immediate neighborhood while a relatively low (or even negative), effective tethering strength score means the candidate node is "disliked". It is up to the internal politics of each in-drifting chat room (e.g., 30R.60) to decide if they want to associate with the underdogs in that cylindrical branch space 30R.10 or with the overlords and why.

Child nodes (e.g., 30R.9*a*) inside cylindrical branch space 30R.10 may cross-link to other branch spaces, such as the illustrated 30R.5 to the left of 30R.9*a*. The inter-branch space linking linkage, 30R.7*a/b* (which has sub parts 30R.7*a* and 30R.7*b*) may be one that points to a relatively wide subregion of the other space as does, the wide horned, first linking symbol 30R.7*a*; or the inter-branch space linking may be one that points to a relatively narrower subregion of the other space as does, the narrower horned, second linking symbol 30R.7*b*. For example, the narrower horned, second linking symbol 30R.7*b* may point to child node 30R.6 within other branch space 30R.5. That other branch space 30R.5 may be disposed inside of topic space; or it may be disposed inside of a different Cognitive Attention Receiving Space; for example inside a URL's expressions clustering space. If the latter case is true, then a system user who is directed to topic node 30R.9*a* (a.k.a. CSiTn1) is concomitantly also indirectly directed to identified URL expressions which are spatially clustered within the ambit of narrow horn 30R.7*b* or wider horn 30R.7*a*.

Just as keyword expressions may be spatially clustered in a semantic/Thesaurus sense near to each other in layer 371 of FIG. 3E and/or near to predefined cognitive sense representing clustering center points, so too URL-defining expressions (not shown) may be provided in the exemplary other branch space 30R.5 of FIG. 3R as clustered together, other cognition representing data objects. The so-clustered, URL-defining expressions (not shown, see instead 30S.75*a,b* of FIG. 3S) may not be textually interrelated to each other, but they may be interrelated in some other way (a different cognitive sense), and thus they are caused to become spatially clustered together within a virtual URL's space (see 30S.72 of FIG. 3S) based on the user-population defined senses of cross-space linking horns 30R.7*a* and 30R.7*b* of FIG. 3R where the user-population defined senses may be expressed by communal actions that place or move corresponding clustering center points (see 370.9" of FIG. 3Y) hierarchically and/or spatially as voted upon or otherwise agreed to by the respective communities of users who use the respective sub-portions of the respective spaces.

Incidentally, in one embodiment, when a user requests to view on his/her screen a map of a specified subregion of topic space (or of any similarly structured other system-maintained space), one of the options is to view the space in a 3-dimensional fashion similar to that shown in FIG. 3R (or better yet in next-described FIG. 3S) wherein cylindrical branch spaces like 30R.10 are shown as 3-dimensional cylindrical, but semitransparent (e.g., translucent) constructs, wherein conical branch spaces like 30R.40 are shown as 3-dimensional conical, but semitransparent constructs, wherein the clustered nodes within each branch space are shown as spherical nodes (or other 3D geometric objects) placed appropriately within their respective branch spaces; and wherein logical links or innervations (e.g., 30R.7*b*) are also shown as semitransparent and fiber-like constructs that can be traced along to reach the nodes (e.g., 30R.6) of other external CARS or branch spaces (e.g., 30R.5) to which they interconnect.

The chat rooms or other forums that tether to the respective topic nodes (or other space nodes) may be depicted as orbiting cubes (or as other shaped 3D geometric objects, e.g., orbiting space satellites). A display control tool may be provided for hiding one or more different types of such objects or changing their relative sizes, etc. In one version, the relative sizes of sibling objects (e.g., nodes and/or chat rooms) indicate in a relative sense how many system users are or have recently utilized those resources. Hence a topic node that has a relatively large population of users engaged with its informational resources will appear as a large planet (and/or as a more fully colored rather than ghostly planet) while a chat room with a relatively small number of active participants will appear as a comparatively small orbiting satellite (and/or as a more translucent and less colored globe) disposed next to another, more populated forum orbiting the same node (e.g., depicted as a spherical planet).

Color codings may additionally be provided for indicating additional attributes, such as for example if a mapping is of dimensionality greater than 3 and the colors represent placement in a fourth or higher dimension. The display control tool (not shown) may be used to alter the default assignment of color codes. Some colors (e.g., red, pink and blue) may be reserved for showing which 3-dimensional objects or subregions are receiving above threshold heat, unusually large values of heat and/or which are abnormally cold. The user is given the ability to zoom in or out on a magnification gradient so that patterns of unusual heat or abnormal coldness can be visually spotted. In one embodiment, the provided color codings include ones for indicating strength of repulsing or attracting forces (pushes and pulls) as between clustering or outcast sibling nodes and/or as between the parent node and upward or downward moved sibling nodes. Lines of attraction or repulsion can be automatically drawn between selected ones of displayed nodes where the color codes (and/or line thickness) indicate attraction versus repulsion and the strength of each. In one embodiment, the chat room or other forums that are optionally displayed as orbiting their tethered-to topic nodes may also be displayed as clustering with one or more if their governance bodies vote for spatially attracting those sibling forums or as distanced from one another if their governance bodies vote for spatially repelling those sibling forums. Respective lines of attraction or repulsion and their strengths may be similarly displayed for the forums as they are for clustered together or repulsed apart nodes.

In one embodiment, as an alternative to, or as a supplementing addition to displaying points, nodes or subregions of Cognitive Attention Receiving Spaces and/or their associated chat or other forum participation sessions with aid of color coding and/or line thickness/pattern coding for representing various attributes of the displayed objects, the system may provide sound effects for audibly indicating various node or forum attributes. One of the audibly indicated attributes can be that representing the volume (number of) and/or intensity (e.g., hotness) of discourses taking place for respective nodes, subregions or forum. This can be in the form of different kinds of musical pieces representing collective mood or even a montage of text-converted-to-voice transcripts from selected rooms. In one embodiment, the user hears the audibly indicated attributes when hovering a cursor representing virtual object (or the user's finger) over a displayed representation of the node, forum or over a collection of such graphically represented objects.

In one embodiment and as a supplementing addition to displaying points, nodes or subregions of Cognitive Attention Receiving Spaces and/or their associated chat or other forum participation sessions, the presentation also depicts the cognitive-sense-representing clustering center points and their respective hierarchical and/or spatial positionings in the respective space.

Referring next to FIG. 3S, a more complete and more practical depiction 30S of system operations has a first set of Inter-Space cross-associating links 30S.7 (a.k.a. IoS-CAX's) formed between a child topic node such as 30S.9*a* (a.k.a. CSiTn1) and points, nodes or subregions within a hybrid Context-and-Other space 30S.5; where in the illustrated example the "Other" is URL's 30S.72. In other words, there can be one or more hybrid clusterings of URL clusters (or singlets) and context clusters (or singlets) that are logically linked by means of the stored data signals representing IoS-CAX 30S.7 to corresponding topic node 30S.9*a* of cylindrical branch space 30S.10. Accordingly, when a first user (e.g., User_A' in FIG. 3S, a.k.a. the one occupying context PXA) is in a corresponding first and individualized context, PXA (which stands for Private conteXt A) and that first user is currently focusing-upon sub-portions of content fetched from a respective first URL (e.g., www.URLa.com/PXA) while a second user (e.g., User_B' in FIG. 3S, a.k.a. the one occupying context PXB) is in a corresponding second, individualized and different context, PXB (which stands for Private conteXt number B) and that second user is currently focusing-upon sub-portions of content fetched from a respective second and different URL (e.g., www.URLb.com/PXB), it is possible that there will some form of sufficiently overlapping commonality between the specific and different contexts, PXA, PXB of the two users (e.g., they are both Fifth Grade Students, although in different schools and under different teachers) and some form of sufficiently overlapping commonality between the specific and different focused-upon sub-portions of content fetched from the respective URL's such that it can be automatically determined by the STAN_3 system and to a relatively high degree of confidence that the first and second users (User_A and User_B) are currently focusing-upon a same topic, where that topic is represented at least by topic node 30S.9*a* (a.k.a. 30S.9*a*') in FIG. 3S.

More specifically for FIG. 3S, the different, first and second URL's (e.g., www.URLa.com/PXA and www.URLb.com/PXB, not explicitly shown) may be respectively represented by clustered together URL-representing expressions 30S.75*a* and 30S.75*b* where the latter, URL-representing expressions are stored as spatially or logically (e.g., hierarchically) clustered together nodes in a system-maintained URL's space 30S.72. Those two, clustered-together URL expression nodes, 30S.75*a* and 30S.75*b* may, as a cluster, point to many other points, nodes or subregions in many other Cognitive Attention Receiving Spaces. However, when logically conjoined with a context node (not shown, but understood to be inside space 30S.2—shown to the right of branch space 30S.10) where that communally created and communally defined context node cross-correlates strongly with both of the private contexts, PXA and PXB, of respective users A and B, those two URL expressions (30S.75*a* and 30S.75*b*) point strongly to topic node 30S.9*a* (a.k.a. CSiTn1) inside the illustrated cylindrical branch space 30S.10.

In view of the above, a machine-implemented method may be provided for automatically bringing the first and second users (A' and B') into a same chat room 30S.60 (shown disposed in FIG. 3S between PXA and PXB), where the chat-type forum session 30S.60 is tethered to topic node 30S.9*a* of cylindrical branch space 30S.10 (where the tethering is represented by the anchor disposed in FIG. 3S adjacent to cylindrical branch space 30S.10) and where the method includes one or more of the following steps:

1) empowering each of users A' and B' and/or empowering the respective smartphones (e.g., 30S.00) of the users to functionally interact with the STAN_3 system core (e.g., the cloud) so as to do one or more of the following things:
2) automatically causing a repeated uploading (or in-loading) to the STAN_3 system core of reporting signals that are indicative of respective physical contexts (XP) of the respective users, of probable mental contexts of the respective users, and of probable attention giving activities of the respective users, where the STAN_3 system core receives and recognizes those uploaded signals as belonging to registered and validly logged-in, respective users A' and B';
3) automatically causing the STAN_3 system core to repeatedly locate in a system-maintained context space 30S.2, one or more context representing nodes or subregions that most strongly cross-correlate to both of the private contexts, PXA and PXB, of respective users A' and B';
4) automatically causing the STAN_3 system core to repeatedly locate in a system-maintained URL's space 30S.72, one or more URL's-commonality nodes or subregions that most strongly cross-correlate with a common attribute (e.g., cognitive sense) of both of the focused-upon content sub-portions of the different and respective URL's (e.g., www.URLa.com/PXA and PXBwww.URLb.com/PXB) that the users A' and B' are respectively focusing-upon;
5) automatically causing the STAN_3 system core to repeatedly locate in a system-maintained hybrid space 30S.5, a hybrid node or subregion that cross links logically and strongly with the located node(s) in URL's space 30S.72 and with the located node(s) in context space 30S.2;
6) automatically causing the STAN_3 system core to trace from the located hybrid context-and-URL's node to, and thus identify a topic node 30S.9*a* in the system-maintained topic space, where optionally the topic node 30S.9*a* also well cross-correlates with chat co-compatibility requirements or desires of the two users (A' and B');
7) automatically causing the STAN_3 system core to spawn or identify an online chat room 30S.60 which is tethered to the identified topic node 30S.9*a;*
8) automatically causing the STAN_3 system core to invite, by way of invitation signals sent back to the smartphones (30S.00, and/or other local data processing devices) of the respective users, where the invitation signals define respective invitations to join into the spawned or identified chat room 30S.60; and
9) automatically enabling the users, A and B, to chat online with one another and/or with other, similarly situated and similarly empowered users of the STAN_3 system by way of the spawned/identified chat room 30S.60.

As is in the case of FIG. 3R, FIG. 3S also shows the first and second users, A and B, as being relatively small in terms of the local data processing functionalities they have in their immediate physical possession as a result of having smartphones or the like where the latter are compared to the remote data processing capabilities and functionalities provided by the STAN_3 system core (SS3 core, e.g., the cloud). However, because the smartphones (e.g., 30S.00) of the respective users are each provided with empowerment to operatively interact with the SS3 core (e.g., by having appropriate interaction software pre-loaded into the smartphones) and because the users, A' and B', are also or alternatively each provided with empowerment to operatively interact with the SS3 core (e.g., by having appropriate registration and/or log-in of the respective users take place so that the SS3 core recognizes the users and respective local devices that monitor the recognized users), the users gain access to the CFi's uploading and analyzing capabilities of the functionally more powerful SS3 core and they gain access to the invitations providing (e.g., invitations downloading) capabilities of the SS3 core (and/or to other informational resource providing functionalities of the SS3 core). In FIG. 3S, the user and device empowerment aspect (empowerment to interact with the SS3 core) is represented by empowerment and recognition portal 30S.73. The user CFi's and like uploaded and state reporting signals are represented by arrow 30S.75 which passes such uploaded and core-recognized signals through the empowerment and recognition enabling portal 30S.73. The responsively returned signals representing invitations to on-topic chat or other forum participation opportunities are represented by return arrow 30S.71, where the responsively returned signals 30S.71 may additionally or alternatively include other feedback informational resource signals representing other kinds of informational resources that strongly cross-correlate within the system to the attention giving energies which that SS3 core automatically determined that the respective users are likely to be now (or recently) casting on system-identified points, nodes or subregions (or cognitive-sense-representing clustering center points) of various Cognitive Attention Receiving Spaces (CARSs) maintained by the system.

As an aside, it is to be understood that the CARSs maintained by the system can constantly change in numbers and types and neuroplastic like cross-connections as between one another's points, nodes or subregions (and/or cognitive-sense-representing clustering center points) so as to adapt to changing cognitions and cognitive sentiments of the user population. More specifically, cognitions that did not exist before can come into being while others fade into disuse and the system's users can start populating the system's topic space with new topic nodes and/or topic space regions (TSR's) that represent the newer cognitions as well as creating new Cognitive Attention Receiving Spaces that have new points, nodes or subregions that innervate with (logically link with) and thus cross-correlate with corresponding new topic nodes or topic subregions or nodes in other pre-created and system-maintained spaces. As an example, imagine with reference to FIG. 3S that users A and B are invited into, and enter into a no-specific-topic chat room (e.g., 30S.62 which is initially tethered to null-topic node 30S.55) based on their personhood co-compatibilities rather than on any specific keywords, URL's or the like that might link them to a specific topic node. In such a case, that no-specific-topic chat room (e.g., 30S.62) is automatically associated by the system with a no-specific-topic, top catch-all node (a.k.a. null-topic node) 30S.55 in the system-maintained topic space. That topic space has a root node 30S.59 (also the root of the universal and hierarchical "A"-tree of the system topic space) to which all other hierarchical topic nodes ultimately link. Another top level topic node directly under the root node may be a system-operators' controlled, top topic domains node 30S.57 to which all user-created topic nodes must attach as children. Topic nodes (not shown) directly under this top topic domains node 30S.57 may be ubiquitously named as Topics Zone 100, Topics Zone 200, etc. and it is generally left to the user population to define what sub-topics fit as children under each such ubiquitous zone, although there may be exceptions where the system-operators can force certain types of topics (and/or certain cognitive-sense-representing clustering center points) to reside inside of certain pre-specified zones (e.g., topics that may be offensive to, or inappropriate for certain subsets of the user population—i.e., minors).

Assume next, that while aimlessly chatting within the exemplary, no-specific-topic chat room (e.g., 30S.62), users A and B conjure up a new topic that has not existed before (has not been predefined before. at least in the terms used by users A and B) within the system-maintained topic space (whose root is node 30S.59). Assume that users A and B start throwing out proposed keywords or URL's to each other respecting the new but un-named, not-yet-specified topic. (They don't have to know that this is what they are doing, that they are negotiating the question of, What are we talking about or What one or more topics is our discussion circling around?. They merely do it. An example may be as follows: UserA writes to userB: "What do you think about what is said at www.URLa.com/PXA?".) At first they don't have a good grasp of what those proposed keywords, URL's fully mean or how the dots may interconnect because they don't have a good grasp of what the new topic is, what cross-correlates strongly to it and what does not. However, while they are transmitting trial keywords, URL's and the like to each other, the STAN_3 system automatically responds to whatever single keywords or clusters of keywords (or URL's or other codings) they toss out at each other by having the system core (the SS3 core) automatically send invitations to each of the users regarding possible chat or other forum participation opportunities that relate to the keyword clusters and/or URL clusters the respective two users (A and B) have tried thus far. Those invitations may include ones for merging their private two-user online chat (and null-topic thus far chat) with non-private ones of other users where the cross-matched other chat or other forum participation sessions may already have topic nodes cross-associated with them. Eventually in this example, let it be assumed that the two users, A and B privately converge on the keyword combination of: "neuroplasticity of the STAN_3 system" while electing to not yet merge with other chats proposed by the SS3 core. The two users, A and B may have converged on this exemplary keyword combination ("neuroplasticity of the STAN_3 system") because they eventually realized, after much research that such best describes the new concept they had been circling around and reaching for but could not earlier clearly articulate it with words. However, at this point their private two-user online chat is still tethered to (cross-associated with) the top catch-all node 30S.55 (a.k.a. null-topic node) in the system-maintained topic space. This is so because users A and B are the exclusive controlling governance body of their nascent chat room (30S.61) and they have not yet voted (implicitly or explicitly) to move their chat room from its initial attachment (tethering, anchoring) to another node within topic space. Movement is at their discretion. If they do decide by implicit or explicit voting to move their chat room's tethering (anchoring) to a different node in topic space, they may eventually also decide by implicit or explicit voting to create a node in topic space that did not exist before and further move their chat room's tethering to that newly-created topic node.

In one embodiment, the system automatically and repeatedly transmits suggestions to the room governance body (in this case users A and B) to move their null-topic forum to a different location within the system-maintained topic space and/or to merge it with another forum that the system has determined is one whose topic is substantially similar or same to theirs. In this example however, the users, A and B, have not accepted such automatically presented suggestions because they believe that they have not yet settled on an acceptable definition of what their private topic is. Ultimately in this hypothetical example they decide on the topic definition being: "Nonbiological Neuroplasticity of Social-Topical Adaptive Networks", but there is no such topic node pre-existing (in this hypothetical example) inside the STAN_3 system at that time. While the system keeps automatically suggesting to them where to move their chat, they decide to instead create their own unique topic node (not shown) and to first to tether it (the newly created topic node) to a Zone-3 child (a hypothetical subregion) of a ubiquitous zones node 30S.57. Later they decide to also or instead to tether their chat room to parent node 30S.30 of FIG. 3S. Their still-on-the-move and/or multi-tethered chat room is now denoted as 30S.61 in FIG. 3S. Because it is tethered to plural topic nodes with equally shared strengths of anchoring (or it could be viewed as orbiting both topic nodes with equally strong gravitational attraction to the orbited bodies) rather than it being primarily tethered at this time to just one node, that multi-tethered chat room is deemed to be a continuously-drifting or orbiting chat room that orbits/drifts (orbit represented by 30S.63) between a number of possible landing spots (final anchoring spots). In some cases, a chat room may never settle in on one topic node as being its exclusive topic node and the chat (or other forum participation session) may continue to fly around topic space while temporarily attaching to one or more and varying topic nodes.

In this example, the parent node 30S.30 to which users A and B decided to partially tether their co-governed chat room, is a hierarchical child of grandparent node 30S.50. Therefore in this example, the governance bodies who control grandparent node 30S.50 decide during the interim to move it (and all its child nodes contained in its branch space 30S.40) to a new location within the system-maintained topic space. While it and its progeny are thus in transit, the grandparent node 30S.50 and all the progeny nodes in its hierarchically subsumed branch space 30S.40 are denoted in FIG. 3S as a drifting combination 30S.53 of a top node (e.g., 30S.50) and progeny nodes (e.g., 30S.30, 30S.9*a*, 9*b*, 9*c*, etc.). When the drifting combination 30S.53 moves, the so-called, orbit 30S.63 of the partially-tethered chat room 30S.61 shifts with it. In one embodiment, the various driftings of the nodes belonging to drifting combination 30S.53 are recorded in a machine-retained migration history file of database 30S.54. When the drifting grandparent node 30S.50' finally has its to-parent link 30S.51 tied to a corresponding great grandparent node (not shown), the drifting combination 30S.53 becomes a settled-in combination; which in FIG. 3S is assumed to include grandparent node 30S.50, parent node 30S.30 and children nodes 30S.9*a*-9*c*.

Later in the exemplary drift-of-topic process, the co-governing users A and B of the drifting chat room 30S.61 decide to more fixedly (but not necessarily permanently) anchor their chat room (now denoted as CR 30S.60) to the specific topic node denoted as 30S.9*a* in FIG. 3S where the latter is spatially located within cylindrical branch space 30S.10 and is hierarchically a child of parent node 30S.30. The flying wings of this now-parked room 30S.60 are schematically illustrated in FIG. 3S as being X-ed out or temporary clipped for this case. Due to space constraints in the drawing, the tether of room 30S.60 is shown anchored to the branch space 30S.10 generally rather than to topic node 30S.9*a* specifically. However, the two users are depicted thereat as users A' and B' who are making discoursive connection with one another by way of their respective smartphones (e.g., 30S.00) and by way of the topic node 30S.9*a*' to which their parked chat room 30S.60 now predominantly tethers.

At this stage, users A' and B' also form the governance body for their previously brand new and then drifted and now re-planted topic node 30S.9*a*. This topic node has drifted together with their flying chat room 30S.61 as they voted to keep drifting both of their controlled chat room and co-controlled topic node out of a first branch space (not explicitly shown, see 30S.49') and ultimately into the illustrated branch space 30S.10 of parent node 30S.30. Also at this stage, users A' and B' may vote for designating URL expressions 30S.75*a* and 30S.75*b* as being the most representative URL's for the new topic they conjured up and are now discussing online. As the still exclusive governance body of their newly-located topic node and chat room, they may also vote to approve the topic specification of "Nonbiological Neuroplasticity of Social-Topical Adaptive Networks" as being the short-form textual descriptor of their created and re-parked node 30S.9*a* and they may at the same time vote to approve the following keywords as being the most representative or top keywords for their node: "Neuroplastic Social-Topical Adaptive Network" and "Nonbiological Neuroplasticity". They may open up their so modified and previously private chat room for entry by other system users who are interested in joining based on any of possible bases for co-compatibility with topic node 30S.9*a*, including but not limited to, use of same or similar keywords, use of same or similar URL's, having same or similar normalized contexts, and/or having same or similar other normalized cognitions.

As new system users learn of its existence and join in on the earlier created and now implanted topic node 30S.9*a* by way of (for example) accepting system generated invitations to a one or more chat rooms (e.g., 30S.60) or other forums that tether to topic node 30S.9*a*, governance of this topic node 30S.9*a* and/or governance of the forums tethered to it may change for any of a number of reasons including the possibility that the original birthers (founding fathers, A' and B') of that topic node 30S.9*a* and/or of its first chat room 30S.60 have dropped away and have let others take control. The new governance bodies of the earlier-implanted topic node 30S.9*a* and/or the forums (e.g., 30S.60) tethered to it may vote to change its attributes yet further (e.g., top URL's, top keywords, top other cross-associated cognitions, etc.) and perhaps even to move it to a yet different location in topic space. Thus, a topic that may have not earlier existed in topic space (e.g., the "Nonbiological Neuroplasticity of Social-Topical Adaptive Networks" node) is created in the form of a new topic node (e.g., 30S.9*a*) implanted into a first branch space (e.g., 30S.10) and is provided with changeable IntEr-Space cross-associating links (e.g., IoS-CAX's) from it to other Cognitive Attention Receiving Spaces (e.g., URL's space 30S.72; hybrid space 30S.5; other hybrid space 30S.1). The location of the created topic node (e.g., 30S.9*a*) in topic space and the innervations or cross-associations between that node and nodes of other spaces may change over time due to user actions (e.g., implicit or explicit vote castings). In other words, a machine-implemented and neuroplastic wise adaptable combination of cognition representing nodes (representing communally-agreed upon expressions of respective cognitive senses) and nerve-connection representing logical links (IoS-CAX's and InS-CAX's) is formed and modified over time in response to implicit or explicit votes cast by node and forum governing bodies where the governance bodies are typically constituted by plural system users and thus re-adaptation decisions are typically reached on a communal consensus basis or majority rule basis rather than on the basis of the idiosyncratic whims of a single user.

FIG. 3S includes some summations of concepts presented here. Among these are that two or more users have smartphones or other such devices for inter-coupling with one another while the SS3 core serves as a mediating coupling means. This aspect is represented by as inter-coupled communicative links concept 30S.70 in FIG. 3S.

Additionally, FIG. 3S illustrates the concept of shared common codings or meta-expressions/meta-codings (e.g., mutually agreed to, common keywords for a given cognition). While not explicitly shown in FIG. 3S, it is to be understood that users A and B somehow negotiated a common language (e.g., American English) as the one to be used as the standardized or meta language for their co-governed chat room 30S.60 and/or for their co-governed topic node 30S.9*a*. They also inherently agreed to a common or normalized context that is to serve as a meta-context common to their respective private contexts, PXA and PXB. They also inherently agreed to a common time duration in which their discourse takes place because their chat room 30S.60 has real-time chatting (e.g., instant messaging) as its pre-defined discourse style. There may also be shared geographic commonalities if the two users, A and B, had pre-specified in their chat co-compatibility profiles (not shown) that they wish to only have discourse with other users who in real life (ReL) are located within, say 500 miles of where they are physically located. (Closeness of location may alternatively or additionally be specified in virtual life.) In addition to having same or similar keywords, URL's or other such uploaded and normalized textual CFi's, the users may have other, non-textual cognitions in common with each other, such as, but not limited to, same or similar music streams or other sounds, same or similar taste-defining streams or other such sensory defining streams, same or similar friendship circles, same or similar admiration circles (e.g., who they follow by way of Twitter™ or by way of alike other admiration/followership mechanisms), by having same or similar general areas of interest, and so on.

Referring to FIGS. 3Ta-3Tb, shown here is one possible data structure 30T.0 for defining topic space primitive objects (TPO's) where the primitive objects can be points, nodes or subregions in topic space. The default is a non-root and non-leaf, hierarchical node in a hierarchical/spatial topic space, meaning that the exemplary TPO 30T.0 represents a node (e.g., 30S.9*c* of FIG. 3S) in topic space that is a child of a corresponding parent node (e.g., 30S.30) and which child node has children of its own and also has a spatial location in the branch space (e.g., 30S.10 of FIG. 3S) of its parent node. The represented node may also have interrelations (e.g., spatial close clustering) with same level siblings (e.g., 30S.9*a*, 9*b*) of the branch space and/or interrelations with (e.g., repulsed distancing from) siblings (e.g., 30S.77) in other levels of the branch space. Additionally, aside from the universal hierarchical "A"-Tree which it must belong to, the represented topic node may belong to hierarchical or non-hierarchical other trees (e.g., "B"-Tree, "C"-Tree, etc.; as will be explained for 30T.2) which are generally non-universal and do not necessarily support spatial placements of nodes on their respective branches. Note that the example of branch space 30R.10 of FIG. 3R is but one of many possibilities where in that exemplary possibility the hierarchal branch (from which the children of parent node 30R.30 depend) defines a cylindrical branch space; although alternatively it could have defined a disc shaped 2D space or a line-shaped 1D space or spaces with dimensions in between (e.g., two or more crossing lines each with enumerated points there along) or it could have defined spaces of higher dimensionalities. The possible configurations of the branch space may include torroids, spheres, concentric spherical shells, concentric donuts or concentric cylindrical shells and so on. As was explained in the case of FIG. 3R, spatial placement within a parent's branch space may indicate how the given node (e.g., 30R.9*c*) places or clusters closely or repulsively far away relative to other sibling nodes within that branch space.

As an aside and with regard to the exemplary TPO data structure (30T.0), it is to be understood that the here detailed topic primitive object (TPO) is an example of a more generic concept of a machine stored and pre-categorized, cognition-representing primitive object (CRPO). There are a number of choices that system designers can make when implementing a topic space and/or another system-maintained Cognitions-representing Space. The points, nodes or subregions (PNOS's) of the designed space may be free-ranging; meaning that such PNOS's can be freely moved to any desired part of hierarchical and/or spatial space at the users' whims; or in another extreme the PNOS's may be restricted to specific parts of hierarchical and/or spatial space as dictated by system administrators. Between these extremes are various sub-combinations, including the possibility of having cognitive-sense-representing clustering center points that are fixed within hierarchical and/or spatial space or are free-floating or are restricted to specific parts of hierarchical and/or spatial space as dictated by system administrators. In the example given by FIGS. 3Ta-3Tb, the topic nodes are substantially free-ranging (with the possible exceptions noted in FIG. 3S for the root node 30S.59 and the catch-all 30S.55 and the top topic domains 30S.57) and there are no cognitive-sense-representing clustering center points in the exemplary version of system topic space. It is to be understood however, that it is within the contemplation of the present disclosure to alternatively have a topic space that does contain cognitive-sense-representing clustering center points; in which case fields such as 30W.7*b* and 30W.7*c* of FIG. 3W might also be included in the topic node data structure 30T.0 of here described FIGS. 3Ta-3Tb.

A first field 30T.1*a* of the exemplary TPO data structure (30T.0) of FIG. 3Ta includes a link (e.g., pointer data) to the parent node in the universal "A"-Tree if there is such a universal tree. Not all embodiments have to have a hierarchical "A"-Tree. One alternate embodiment has only a universal spatial topic space (an "A" space) in whose coordinate-defined grid all nodes, points or subregions lie and where spatial distance between such points, nodes or subregions indicates how closely or not, they cluster relative to one another. Each point, node or subregion in such a spatial space has a corresponding and unique location (address) by of which it is uniquely addressed. Subregions in this "A" space may also have predefined extents (e.g., a limiting radius extending from a corresponding center point of the spatial subregion). Points, nodes or subregions within the "A" space may point to an encompassing subregion as being their parent or may point to a specific other point or node as being their parent. By contrast, if a universal "A"-Tree is used, Each point, node or subregion (except the root node 30S.59) has a corresponding and unique hierarchical parent node under which it resides and by way of which it can be identified in combination with a unique node name or unique spatial address inside the parent node's branch space.

In view of the above explanation, it may be seen that the first field 30T.1*a* of FIG. 3T allows for any permutation using up to three of the illustrated possibilities: (1) uniquely identifying the parent node; (2) identifying unique coordinates for the represented TPO (e.g., node) in a corresponding spatial space and optionally pointing to a position of a parent in that corresponding spatial space (e.g., "A" space); and/or (3) identifying unique coordinates in a corresponding branch space (e.g., 30R.10) of the uniquely identified parent node (e.g., 30R.30). The corresponding spatial space (e.g., "A" space) in which the TPO optionally resides need not be a 3-dimensional one and can instead be of dimensional value greater than one (e.g., a 1.5D space composed of uniquely identifiable lines or curves each having uniquely identifiable points thereon) including spaces with dimensionalities greater than 3. An example of a 2.5D space under this definition is a set of concentric 2D toruses (flat donuts). Although not shown in FIG. 3Ta, there is yet another possibility where the represented TPO is currently not attached to a real parent point, parent node or parent subregion. This can happen for example when the TPO is drifting between anchor points—see for example 30S.53 of FIG. 3S. In such a case the first field 30T.1*a* points to a so-called and predefined, null parent; this indicating that there is no real parent at the moment.

A second field 30T.1*b* of the exemplary TPO data structure (30T.0) contains the primitive's uniqueness-guarantying stamp. The uniqueness-guarantying stamp 30T.1*b* can be an extension of the primary node identification provided by the first field 30T.1*a*. More specifically, if the first field 30T.1*a* uniquely identifies a corresponding parent node, the unique-making stamp 30T.1*b* may simply be a unique serial number (or other code sequence) that uniquely identifies the represented node relative to other children of the parent node. However, since in one embodiment, every topic node (except the root 30S.59 of course, and also the top catch-all (the null-topic topic node) 30S.55 and the top, notnull-topic topic zones node 30S.57) is free to drift to a new parent node and/or to a new spatial location, it is preferable that each created TPO have its own unique serial number/identifier as well as a corresponding one or more version dates stamps.

When a topic primitive object (TPO, e.g., a topic node) breaks away from (or is otherwise removed from) a previous location on the universal "A"-Tree and/or from a previous location within the universal spatial space of the corresponding topics mapping mechanism (a.k.a. topic space) so as to, for example, move to a new location, the breaking away TPO (e.g., 30S.53 of FIG. 3S) leaves behind a short-form, "I was here" marker. The short-form, "I was here" marker consists essentially of the TPO's unique serial number (TPO Ser. No.) and the TPO's version date stamps. A first version date stamp indicates when the TPO originally attached to the "I was here" location (at which it no longer resides). A second version date stamp indicates when the TPO moved away (on its own or was forced to depart) from the "I was here" location.

In addition to the "I was here" tag, there also and optionally can be a "this-TPO-is-dead" versus "this-TPO-is-alive" flag area 30T.1*c* which indicates whether or not the corresponding topic primitive object (TPO) is no longer attached to the pointed-to hierarchical parent node and/or to the pointed-to spatial parent location. If the tagged location is one where the TPO no longer resides, the "this-TPO-is-dead/alive" flag area 30T.1*c* of that tag will include an explanation of why the TPO is no longer there and perhaps where it next moved to. In one embodiment, system administrators can kill a node if its attached chat rooms are persistently engaging in inappropriate conduct. In that case, the "this-TPO-tag-is-dead" flag 30T.1*c* will include an explanation of why the system administrators killed it so that offending users know the reason. The "this-TPO-tag-is-dead" flag area 30T.1*c* may further include a link to an appeal site whereat system users might appeal the administrators' decision to kill the now-dead node. In one embodiment, one or more spaces-crawling automated bots crawl through all nodes of topic space (and/or other system-maintained CARSs) and all the chat or other forum participation sessions tethered to them, searching for evidence of inappropriate conduct. If a below threshold amount of inappropriate conduct (e.g., use of language that is predetermined to be inappropriate for that zone) is discovered by the bot, the node and its forums are marked for more frequent return visits and an accumulating score is kept (stored) for each. If the accumulating score crosses a first predetermined threshold, warnings are automatically sent to members of the governance body. If the accumulating score next crosses beyond a second predetermined threshold, the node and/or its cross-associated forums are automatically killed by the bot. Progeny nodes and their associated forums are also killed by this operation. Explanations are emailed or otherwise transmitted automatically to the governance bodies of the killed nodes/forums explaining why the automated kill took place and explaining the procedure for appealing.

In one embodiment, the dead-or-alive flag area 30T.1*c* may include a map of (or a pointer to such a map which maps) the remainder of the data structure 30T.0. This included or point to map (not shown) indicates the respective locations in machine memory space of the other fields of the TPO representing data structure 30T.0 and their respective sizes. For example, if the represented TPO does not appear on alternate trees besides the "A"-Tree and/or does not appear in alternate spatial coordinates (B, C, etc.) besides that of the "A"-universal space, then respective fields 30T.2 and 30T.3 may be empty and of minimized size or not there at all. The data structure map (not shown) of flag area 30T.1*c* will indicate this and may further indicate the same for others of the fields of data structure 30T.0 and may further indicate how many such fields (e.g., beyond 30T.14, 30T.15 or 30T.16 of FIG. 3Tb) the data structure has. Alternatively such a data structure mapping specification and pointers to it may be recorded in a different area of the system's machine memory space.

In one embodiment, the dead-or-alive flag area 30T.1*c* may further provide an over-time fade out function. The over-time fade out function operates as follows. If certain fields (e.g., 30T.13 of FIG. 3Tb) of the TPO data structure are not referenced by users ever, or are not referenced over a prolonged (and predefined) amount of time; and the corresponding TPO is flagged as being an inconsequential node (e.g., not used by any personas of long term importance to the surrounding subregion of topic space), then this information regarding non-use and inconsequentialness is recorded in the dead-or-alive flag area 30T.1*c* and eventually an automated background garbage collecting or gardening bot (not shown) crawls by and automatically reorganizes the represented data structure 30T.0 by deleting (trimming away) the unused or not-in-a-long time used and so-identified fields or by deleting substantially all of the TPO data structure save for the "I was here" marker data. In this way, topic nodes that are added to topic space but never thereafter used or not used for a very long time (and not likely to be ever used in the future by system users) can be removed from the system's memory space so that they do not unusefully consume system memory space. In an alternate embodiment, unused or rarely used TPO's can have most of their data structure compressed where a this-node-is compressed tag is added to the dead-or-alive flag area 30T.1*c*.

A further field 30T.1*d* of the exemplary TPO data structure (30T.0) contains so-called, anchor factors. These indicate how strongly the represented node anchors by itself to its respective location in topic space (see also 30R.61/63 of FIG. 3R) and/or what positive or negative, anchor reinforcing factors it lends to nearby siblings or they to it, and/or what repulsive or attractive (push away/pull closer in) forces it applies to voted-upon nearby siblings and/or what repulsive or attractive (push down and away/pull closer up) forces it applies to voted-upon child nodes of itself. The attract/repel forces may have different strength values and, in one embodiment as described elsewhere herein, color coded lines may be displayed to graphically show to users the presence of such attraction or repulsion forces and their strengths.

If the represented node is dead or moved away, then fields 30T.1*a* through 30T.1*c* are all that remain of it. The rest of the data structure (30T.0) is not needed and thus, in one embodiment, is not stored or in other embodiment compressed and stored as compressed data. On the other hand, if the represented node is alive and well at its present location, then in addition to the anchor factors field 30T.1*d*, it may include a next section 30T.2 filled with sorted pointers (or a pointer to such sorted pointers) pointing to optional other parent nodes on optional other tree structures (beyond the "A"-Tree). In other words, the represented node may have a different parent node or linked-to peer on the "B"-Tree, on the "C"-Tree, and so on. Typically, system users will want to know which of these alternate parent nodes (on the "B"-Tree, etc.) is/are the most recently referenced ones, the hottest ones, the most popular alternate parent node among users of the represented node, which is the one that is most well regarded by only users having high reputation and/or high credentials, etc. There can be many such lists having different ranking categories (with optional sorting per the rankings) and different effective dates or durations. (See also section 30T.12 of FIG. 3Tb as discussed below.) Accordingly, in one embodiment, section 30T.2 indicates how many sorted columns (in area 30T.2*b*) there are in each of its one or more tabs and how many tabs there are (in area 30T.2*a*). The nature of each sorted column of alternate parents is described by the column header. Typically, the most popular-among-all-users is the first provided list in the first column of the first tab. Each column also indicates (in area 30T.2*c*, 2*d*, etc.) how many rows it has.

Just as section 30T.2 provides sorted lists of pointers to alternate parent nodes of alternate hierarchical trees, next section 30T.3 provides sorted lists of pointers to alternate locations in the branch spaces of the alternate parent nodes. The sorted lists (e.g., most popular, most reputable) of section 30T.3 correspond on essentially a one-for-one basis with those of previous section 30T.2 and thus further explanation is not needed. If a respective alternate parent node does not have a spatial branch space, the corresponding pointer of section 30T.3 is coded as a null or invalid pointer.

In the hypothetical story above of how node 30S.9*a* (of FIG. 3S) came to be born and placed by original users A and B, it was indicated that the two users were deemed as founding fathers of the node. In general, a topic node can have any practical number of founding fathers. Users of the system may wish to know who the founding fathers were, what their respective reputations are or were, and/or other data about the founding fathers. This is particularly true if the users wish to "follow" or track the contributions of certain admired (or despised as the case may be) other personas, including tracing to the original topic nodes that those admired/or-otherwise personas had a hand in creating. A topic node that is a direct child of the root's null-topic node 30S.55 is not considered to be a created topic node because it has no agreed-to topic specification at that stage. However, when the controlling governance body (e.g., users A and B) agree to move the given node off the branch of the root's null-topic node 30S.55 and to someplace else in topic space, those members of the governance body are deemed to be its founding fathers. (The locations to which the moved node goes after is covered by data in the next-described section 30T.5*a*.) Like other cases where users can benefit from having pre-sorted lists of information based on popularity among all users, popularity among highly credentialed users and so on, the founding fathers section 30T.4 provides pointers to (or a pointer to such lists of pointers) bibliographic information about the founding fathers (a.k.a. original node authors) where the identifications of the founding fathers are pre-sorted according to who is most popular, who has the highest reputation, and so on.

As indicated at 30T.4*a*, the respective bibliographic information about each founding father (which founder may be a virtual persona instead of a real life person) may include a system-provided unique identification number for that persona, public biography information about the identified persona if such information is available, information about publicly available (and optionally certified) credentials of the identified persona (e.g., college degrees, etc.), information about publicly available reputation scores (optionally certified) for that identified persona in different subject matter areas, information about publicly known affiliations (e.g., business groups, scholastic groups, etc.) of the identified persona, and so on. One of the functions that the founding fathers section 30T.4 can serve is to provide attribution to those personas who decided to launch a new topic node when moving their chat or other forum participation session from under the topic catch-all node (a.k.a. null topic node 30S.55) to a new position within topic space, which new position includes the new topic node they create (by naming it, positioning it, etc.). In one embodiment, the STAN_3 system automatically suggests to participants of forums taking place under null topic node 30S.55 the possibility of creating their own new topic node if they can't find a pre-existing one to which their Notes Exchange session belongs and/or the possibility of moving their Notes Exchange session (e.g., online chat) for attachment to (tethering to) one or more pre-existing nodes or subregions in topic space to which their Notes Exchange session appears to belong. The suggestion to create a new topic node may also include mention that the founders will receive attribution for being the founding fathers of the new node. Hence there is incentive for creating new nodes. The suggestion to create a new topic node may also include a pointer to instructions of how to create a new topic node. The Help menu for STAN-spawned forums may also include a pointer to instructions of how to create a new topic node so that participants who are dissatisfied with a current topic node and want to form a new, different node can easily do so.

Some of the information provided in data structure section 30T.4*a* may be in the form of a pointer to a system-maintained user-to-user associations (U2U) database 30T.6*b* of the STAN_3 system. More specifically, if a first tracked founding father is indicated to be affiliated with a system-tracked group of other system users, the logical link from data structure section 30T.4*a* into database 30T.6*b* may be further traced back through to identify the other system users (e.g., 30T.6*a*) with whom the first founding father is affiliated and to discover the nature of that affiliation. The traced-back-to other persona may also be a founding father or a member of a governance body or of another group (30T.6) associated with the node and hence an otherwise hidden network of connections between the various personas who founded or ruled or currently rule the given node may be uncovered by tracing back through the system-maintained user-to-user associations (U2U) database 30T.6*b*. Such a discovery tool for determining who is affiliated with whom cab be particularly valuable in business oriented research where it is desirable to know which hidden other personas are cross affiliated with the node's founding fathers, with the node's current governance body and how.

In one embodiment, a further tool is provided (not shown) for uncovering the currently shared areas of topical or other focus as between two or more of the founding fathers and/or of other personas (e.g., governance body members) cross-associated with them. Therefore, once a system user finds a topic node he/she admires and decides that he/she might want to follow one or more influential persons or groups (e.g., founding fathers, governance body members) and/or follow up on topics of current hot focus by those persons or groups, the tool allows the user to do so.

As indicated at 30T.5*a* and 30T.5*b*, the exemplary data structure for the represented topic primitive object (TPO) may include pointers to one or more histories regarding the node's migration histories (plural intended). Reasons for why a given node can have plural migration histories are many. First, the node can simultaneously reside on the "A"-Tree, a "B"-Tree, a "C"-Tree, etc. and the node's positionings on each such hierarchical or non-hierarchical tree can vary. Second, a current node can be the result of merger of two or more separate and earlier existing nodes or a splitting of an earlier existing node into plural nodes. Each pre-existing node may have its own pre-merger history of migrations (and the parent node of a split may also have one or more histories). The pointed to histories may include narrative of what happened and when (e.g., what votes were cast by what members of a controlling governance body) to invoke each migratory move and/or bifurcation and/or merger. The various histories may be used to automatically depict a trajectory and optionally also automatically generate a prediction of further migration based on past history. By contrast, section 30T.5*b* contains sequential pointers to the locations in hierarchical and/or spatial frames between which migratory moves took place where the sequential pointers are ordered according to the time lines of the migratory moves. This too can be used for mapping the migrations and predicting future moves. It is within the contemplation of the present disclosure to provide an automated tool that can display to a user the migration histories (through a same hierarchical and/or spatial frame) of two or more identified nodes so that the user can see where (and when) the identified nodes were clustered close together and where/when they were spaced relatively far apart. A user may optionally also follow the plural migratory moves of a single node as it drifts within respective ones of the "A"-Tree, "B"-Tree, "C"-Tree, etc. This may help shed light on how and why a particular topic evolved to what it is at present. An automated trending tool may be included within the system's informational resources for predicting where to and when certain topic nodes are expected to next migrate. Such information can be useful to marketing groups who wish to proactively anticipate where certain demographic groups of people are heading in terms of clustering of previously spaced apart topical concepts. (By way of example, assume that the keyword, "neuorplasticity" was previously restricted to the biological sciences quadrant of topic space, but more recently—as a hypothetical—growing clusters of people are drifting respectively controlled nodes with this as one of their top keywords into the cloud computing quadrant of topic space. Such a hypothetical might lead to an evidence supported conclusion that there is growing and snowballing group cognition out there that a cloud computing environment can have a neuorplastic type of innervation structure embedded within it (where the innervation is composed of machine-implemented logical links and the links strengthen or weaken, grow in one direction or recede from another based on how many users fire up those innervations by means of direct or indirect 'touchings' on the nodes—i.e. synaptic ends—of those machine-implemented logical links).

Referring to section 30T.6 of FIG. 3Ta (where strip 30T.0*b* is an extension of strip 30T.0), each topic node can have one or more forums (e.g., online chat rooms) tethered to it. Some are strongly tethered (anchored) to it because the governance bodies of those forums voted for such clipped-wing semi-permanence (see again 30S.60 of FIG. 3S). Others are forums which are still drifting by (see again 30S.62 of FIG. 3S) because their governance bodies have not voted to settle down in that way and they still searching for perhaps a better topic node to tie their anchor to; where that better topic node might be one that they clone by copying and slightly modifying an existing topic node—that is, by copying data structure 30T.0, modifying it, and submitting it to a make-me-a-new-node tool (not shown) of the STAN_3 system, where, after checking for format correctness, the system can create such a requested new node provided the requesters are appropriately pre-qualified to request such creation. Alternatively or additionally, the node cloning group may modify a plurality of pre-existing nodes, combine fragments of those modified nodes and then submit the new creation to the make-me-a-new-node tool (not shown). Irrespective of that, an important attribute of most topic or other nodes is keeping track of how many and what kinds of chat or other forum participation sessions are currently tethered to that represented node and keeping track of which of those forums have governance privileges for the represented node. This is the function of section 30T.6. It maintains sorted lists (or logical linkages to such lists) of various individuals or groups (e.g., governance bodies, chat room or other online forums) that are tethered to the node in one form or another. In particular, section 30T.6 identifies the one or more governance bodies that are in current control of the represented node where such bodies may be listed according to which one is largest (e.g., most popular), which ones have the greater levels of control over the maintenance of the represented node (e.g., most powerful), which ones have the highest levels of credentials or reputations and so on. The node's governance bodies can vote to determine a large portion of the node's attributes, including but not limited to, where in its Cognitive Attention Receiving Space the node resides (except that push and shove voting may determine fine resolution location within a branch space as was explained for 30R.9*c* of FIG. 3R), what the primary name (30T.8, described below) will be for the represented node, what the node's specifications (30T.9, described below) might say, and so on.

Another type of node-associated set of groups or personas that are identified by section 30T.6 are the so-called, stable forums and groups. These are distinguished from node-associated fly-by-night forums/groups. An example of a fly-by-night forum would be a two-person online chat room that temporarily tethers to the represented topic node (TPO) for just a few minutes or hours and then breaks away and then drifts away to tether to a different node. By contrast, other forums; such as node-dedicated blogs and tweets whose communications are generally dedicated to that specific one and represented node would be tethered basically for their lives to the represented node (married to that node) and thus such would be the most stably attached to that node. In the spectrum between fly-by-night forums or groups and married-to-the-node forums/group there can be all variations of attachment to the represented node including for example forums or groups that are tethered on a 50/50% basis to the represented node and also to another such node. As may be apparent at this stage, node-associated forums can include chat rooms, blogs, live video conferences and the like. Node-associated other "groups" however, are not necessarily engaged in communicative discourse with one another, but rather they remain cross-associated to the one represented node nonetheless. An example would be a group of so-called, "experts" (30T.6*e*) who basically leave their virtual calling or virtual business cards attached to the given node so that people who want to contact them with regard to the specific topic or another attribute of the represented node can do so. The pointers of "experts" subsection 30T.6*e* may point to corresponding records in the user-to-user associations (U2U) database 30T.6*b*.

In one embodiment, the pre-sorted pointers of section 30T.6 each point to a corresponding record 30T.6*a* in the system's user-to-user associations (U2U) database 30T.6*b*. Accordingly, just as a trace back may be carried out from a given founding father's record 30T.4*a* and by way of his/her public affiliations fields to other users or groups identified within the U2U database 30T.6*b*, the public record 30T.6*a* of almost any forum, persona or other type of group listed in the tethered persons/groups/forums section 30T.6 can be consulted by system users to trace forward through its public affiliations fields to yet other users or groups identified within the U2U database 30T.6*b*.

Although in theory an almost unlimited number of node-associated groups, personas and forums could be point to by section 30T.6, such is not practical. Instead the provided lists are limited to a pre-specified top $N_k$ such entities where $N_k$ may vary as a function of the $k^{th}$ set of groups, personas or forums being considered. More specifically, $N_k$ for the k value associated with most stable node-associated forums might be set to 100 while $N_k$ for the k value associated with least stable of recent fly-by-night entities that most recently tethered to the represented node might be set to 5 (as an example). In terms of visualization, the represented node may be likened to a planet having different orbital shells as well as a terra firma surface. Entities that marry/dedicate themselves essentially for life to that planet (e.g., the node's primary governance body) can be visualized as being rooted to the planet's surface. On the other hand, fly-by-night chat rooms that temporarily pop into orbit around that node and then move on a short time later can be visualized as being temporarily parked in the outermost orbit. Other entities in the spectrum between those extremes can be visualized as parking themselves in lower planetary orbits. Section 30T.6 can be visualized as a sort of census bureau that keeps track of the more prominent citizens and visitors but not necessarily of everyone.

When a system user, or even an automated bot that is crawling through a given sector of topic space, comes upon a node (e.g., the represented TPO) that he/it is not yet familiar with, he/it may wish to know; even before exploring deeper, what kind of node is being encountered based on evaluations provided by earlier visitors and/or by inhabitants of neighboring nodes. Therefore and in accordance with one aspect of the present disclosure, a ratings and warnings section 30T.7 is provided as part of the TPO data structure 30T.0 where this section 30T.7 may contain sorted lists of (or pointers to such lists of) ratings given by rating providing organizations or services to the node and/or warnings posted by such organizations or services or previous visitors regarding the nature of the node. More specifically and by way of example, an included warnings subsection 30T.7*a* may provide warnings that indicate the node and its children (if any) are intended for mature audiences only (no minors) and/or that the forums associated with the node or the informational other resources provided by the node might be viewed as offensive to some persons where the potentially offensive material pertains to politics and/or religion and/or ethnicity and so on. Therefore, and as an example, an automated search bot (see 30T.11*b*) that is crawling through that area of topic space on behalf of a minor user (e.g., Fifth Grade Student), stops crawling down that branch and subbranches of topic space when it encounters warning signs (30T.7*a*) indicating the material is inappropriate. Accordingly time is saved and persons for whom the material is deemed inappropriate may be blocked from seeing it.

With regard to the illustrated ratings subsection 30T.7*b*, one of the stored ratings may be based on where in a parent node's branch space (e.g., 30R.10) the represented node resides and what attractive or repulsive clustering scores are given to that node from the parent node and/or from neighboring sibling nodes. As may be recalled from the discussion of FIG. 3R, the placement of a child node within its parent's branch space (e.g., 30R.10) may be a function of repulsion and attraction forces applied to that given node from governance bodies of the parent node (e.g., 30R.30) and/or of neighboring sibling nodes. Therefore, the STAN_3 system can automatically generate some of the ratings of subsection 30T.7*b* simply based on how the corresponding parent and sibling nodes (more specifically, the governance bodies of those other nodes) rate the given node (e.g., 30R.9*c*).

Referring to section 30T.8 of FIG. 3Ta, each topic node (TPO) may be assigned a primary name and one or more alias names by respective governance bodies and/or user groups. Section 30T.8 may contain sorted lists of (or pointers to such lists of) primary and alias names, where the lists are sorted according to popularity of the naming entity, credentials of the naming entity and so on.

Referring to section 30T.9 of FIG. 3Ta, each topic node (TPO) may have one or more topic specifications attached to it for explaining; from the perspective of the author of that specification, what the topic is about. The one or more specifications may be written by or otherwise provided by a respective governance body and/or by a respective one or more user groups associated with that topic node. Unlike the well known Wikipedia™ web site where for a given term there is usually one and only one definition of that term, in accordance with the present disclosure, many alternative specifications (e.g., different cognitive sensibilities) may be provided for what the topic is "about" as seen through the eyes of the many, perhaps divergent, users of that topic node. Accordingly, section 30T.9 may contain sorted lists of (or pointers to such lists of) specifications, where the lists are sorted according to popularity of the specification-providing entity, credentials of the specification-providing/authoring entity and so on.

Referring to section 30T.10 of FIG. 3Ta, each topic node (TPO) will typically have a so-called, branch space containing the children (progeny nodes) of the represented node where the branch space may be organized as a specific kind of 3-dimensional space (e.g., a solid cylindrical branch space like 30S.10 of FIG. 3S, or a conical space like 30S.40, or other as explained earlier above).

In some cases, it may be of value to list the more popular or otherwise classified child nodes of the represented TPO and/or their locations within the specified branch space. Such sorted lists of (or pointers to such lists of) classified child nodes and their locations may further be provided in section 30T.10. An example use of this prestored and presorted information would be for an automated search bot that is looking to find the most popular top 5 child nodes of the given parent or the 7 most well credentialed or highest reputed child nodes of the given parent. A background service of the STAN_3 system repeatedly tests the branch space of each parent node to determine which children are currently the most popular, the most reputable, etc. and then it updates the information stored in section 30T.10. Therefore when a user's private search bot later comes through looking for such information, it is already there.

Referring to section 30T.11 of FIG. 3Ta, often a topic node is identified based on its top 2-5 keywords or top clusters of keywords or top clusters of context-plus-keyword hybrid expressions. As was explained above for FIG. 3E, keyword expressions and/or hybrid keyword plus context operator nodes may logically link to respective nodes in topic space and the pointed-to topic nodes may reflectively point back (see 370.6, 390.6 of FIG. 3E) to the source keyword space (or source URL space, or source other space as the case may be including source hybrid space point). Section 30T.11 provides such a reflective point back function. An example point, node (e.g., operator node) or subregion in the point to external space (e.g., keyword space) is illustrated at 30T.11*a*. Among the external space and reflectively pointed back to points, nodes or subregions; some may be more popular for users of the represented TPO, some may be more preferred by a highly credentialed (e.g., expert) subclass of the users of the represented TPO, some may be the most recently referenced ones and so on. Section 30T.11 may contain sorted lists of (or pointers to such lists of) most popular or otherwise so-sorted and thus classified ones of the reflectively pointed back to points, nodes or subregions in the external spaces. An automated background service of the STAN_3 system repeatedly tests the reflectively pointed back to points, nodes or subregions as listed in section 30T.11 of FIG. 3Ta to determine which are currently the most popular, the most preferred among reputable users, etc. and then it updates the sorted information stored in section 30T.11. Therefore when a user's private search bot 30T.11*b* later comes through looking for such information, it is already there. In the case of the illustrated search bot 30T.11*b*, item 30T.11*si* represents search instructions that have been provided to the bot and that the bot is searching in accordance with. The combination of the executing bot thread and its machine-readable and stored search instructions is denoted as 30T.11*c*.

Referring to section 30T.12 of FIG. 3Tb, this a continuation strip 30T.0*c* of the exemplary TPO data structure 30T.0 where parts of one embodiment are shown in greater detail in FIG. 3Tb. Various points, nodes or subregions (PNOS's) in various ones of the other system-maintained spaces may be reflectively linked-to from the TPO data structure. Some of those external PNOS's may be inside the system-maintained URL's space (see 390 of FIG. 3E) and section 30T.12 may contain pre-ranked and optionally sorted lists of (or pointers to such lists of) pointers to those parts of URL's space where the lists are ranked and optionally sorted according to different ranking and sorting algorithms (e.g., different ranking categories) and for different effective dates or effective time durations and/or according to different filtering criteria. The pointers that point-to the ranked/optionally-sorted/optionally-filtered lists of external PNOS's (e.g., of URL's space) may be organized in a spreadsheet manner or in other database fashion, where in one embodiment, the pointers (e.g., 30T.12*h*) are listed in sorted order in respective columns of tab areas of system memory space and where each tab area has a respective tab number (30T.12T and optionally includes tab update time stamps or tab effective time duration specifications—not shown). Each column has a column number and an associated column title 30T.12*e* as well as a column update time stamp 30T.12*f* indicating when the respective column's list was last updated and also optionally indicating what set of dates and/or times the ranked/sorted list is for. A zero-ith pointer 30T.12*g* in each column may point to a more detailed explanation of what the often-abbreviated column title (30T.12*e*) means. In one embodiment, users can view the TPO data structure, including its tabbed lists (e.g., 30T.12*h*) in a user friendly format and they can click or otherwise activate the zero-ith pointer 30T.12*f* to thereby view the detailed explanation and to thus learn more about what the respective column is showing (e.g., what machine-implemented sorting algorithm was used, what effective dates and times the list covers, what geographic or other filtering criteria may have been used in creating or updating the list, and so on.)

Examples of possible column titles are shown by blocks 30T.12*e*1 through 30T.12*e*8. The corresponding columns may include a first one (30T.12*e*1) listing a most recent subset of new URL's (or URL expressions) that were not listed elsewhere in section 30T.12 and are thus currently new within section 30T.12, where the period for recentness may be a predetermined value N1, for example, in the last 5 minutes (and the column update time 30T.12*f* indicates when the 5 minute period ended). A different spreadsheet tab may store similar information for an earlier 5 minutes and so on. This allows for quick calculations of trending changes or persistences (for example indicating that a given new URL has been persistently mentioned for the last hour in each 5 minute subsection of that hour).

A second exemplary column (30T.12*e*2) may provide a listing of pointers pointing to most recent external space PNOS's (e.g., in URL's space) that are new to section 30T.12 over the last N2b minutes (where N2b is a pre-specified number) and that were referenced within one of the top N2a "expert" forums (or by TPO-associated expert groups (30T.6*e*) even though those are not currently engaged in an online notes exchange), where these top N2a "expert" forums are currently strongly tethered to the represented TPO or are otherwise cross-associated to the represented TPO (topic primitive object), and where N2a is a pre-specified number.

A third exemplary column (30T.12*e*3) may provide a listing of pointers that are pointing to most recent external space PNOS's that are new to section 30T.12 over the last N3b minutes and that were referenced within one of the top N3a "most reputable" forums (or TPO-associated reputable groups) that are currently strongly tethered to the represented TPO or otherwise cross-associated to the represented TPO. A fourth exemplary column (30T.12*e*4) may do the same for the top N4a "hottest" forums or groups (where the definition of hotness can vary and will be given in the detailed specification pointed to by pointer 30T.12*g*).

A fifth exemplary column (30T.12*e*5) may provide a listing of pointers that are pointing to the "hottest" N5a external space PNOS's that were referenced within one of the top N5b "hottest" forums (or hottest TPO-associated reputable groups) that are currently tethered to the represented TPO or otherwise cross-associated to the represented TPO, where there is not necessarily a time limit or effective time span associated to this category.

A sixth exemplary column (30T.12*e*6) is shown generically to provide a listing of pointers that are pointing to the top N6a "other" external space PNOS's that were referenced within one of the top N6b "otherwise categorized" forums (or "otherwise categorized" TPO-associated groups) that are currently tethered to the represented TPO or are otherwise cross-associated to the represented TPO where there is not necessarily a time limit or time span associated to this category, but if there is it is denoted generically as "when" in the generic example of block 30T.12*e*6.

Block 30T.12*e*7 shows an example that was already shown for earlier sections of the TPO data structure, namely, providing a listing of pointers that are pointing to the top N7a most popular URL's (or URL expressions) as referenced by any of the forums currently tethered to the represented TPO or are otherwise cross-associated to the represented TPO where N7a is a predetermined number. Similar additional blocks may provide pointers to a top N7c URL's ever recommended by the most reputable N7d users in any of the forums currently tethered to the represented TPO or are otherwise cross-associated to the represented TPO, and so on.

In general, and if not otherwise specifically stated herein, heat or other attention giving energies cast onto respective points, nodes or subregions of corresponding Cognitive Attention Receiving Spaces (CARS's) can be assumed to be of a positive or "I like this" kind. However, it is within the contemplation of the present disclosure to also indicate when attention giving energies cast onto respective points, nodes or subregions are of a negative or "I especially do not like/despise this" kind. In other words, just as certain URL expressions (or other ranked/rated cognition representing codes) can be rated by users as being the top N7a most popular (most liked, most used) such cognition representing codes and the ranked codes can be optionally pre-sorted according to their comparative rankings; other certain URL expressions (or other ranked/rated cognition representing codes) can be rated by users as being the top N8a most hated, most despised or otherwise negatively thought about representations of corresponding cognitions, where the pointers to the respectively despised cognition representations may be pre-sorted according to their comparative rankings so that the most despised one is listed first for example. Block 30T.12*e*8 shows an example (a non-limiting example), namely, one providing a listing of pointers that are pointing to the top N8a most hated or despised by users of this topic primitive object (TPO 30T.0) among URL's (or URL expressions) as referenced by any of the forums currently tethered to the represented TPO or are otherwise cross-associated to the represented TPO where N8a is a predetermined number and degree of hatred (or despising) is based on number of users voting negatively by implicit or explicit means with regard to connecting the hated URL expression with the represented TPO. Similar additional blocks may provide pointers to a top N8b URL's most despised ever by the most reputable N8c users in any of the forums currently tethered to the represented TPO or are otherwise cross-associated to the represented TPO, and so on.

Although not shown in expanded form, next section 30T.13 may do the same thing for ERL's (Exclusive Resource Locators, i.e. private subscription databases) of a system-maintained ERL space where those identified ERL's are cross-correlated with the represented TPO of FIGS. 30Ta-3Tb.

Similarly, next sections 30T.14 and 30T.15 may respectively do the same thing in positive affirmation sense or negative despising sense for points, nodes or subregions in a system-maintained context space (e.g., 316" of FIG. 3D) or in a system-maintained and hybrid context-plus-other space (e.g., 30S.5 of FIG. 3S) or for yet other (PNOS's) in system-maintained other Cognitive Attention Receiving Spaces. Additionally, and as indicated by next sections 30T.16 and 30T.17, further sorted lists may be provided for other node-related informational resources. These node-related other informational resources (30T.16-17) may include identifiers of topic related educational courses, topic related conferences or other such events, topic related hardware and/or software resources (see university owned resources 190*p*.6 of FIG. 1J), topic-related promotional offerings (see 104*a* of FIG. 1A), and so on. As mentioned above, in one variation, the further fields (e.g., 30T.17) of the illustrated topic primitive object (TPO) may provide pointers to nearby cognitive-sense-representing clustering center points in topic space if such are used. The further fields (e.g., 30T.17) may alternatively or additionally provide pointers to other nodes in topic space that have substantially same topic prime names (see 30T.8) and/or substantially same topic specifications (see 30T.9) but nonetheless, different cognitive senses for the alike named topic nodes. The latter pointers may define a linked list of same or alike named topic nodes where the pointers also provide indications of ranking that indicate which of the different senses for the same topic node name are more popular and which are less popular. The linked list may be traced through to identify, for example, other topic nodes that have a same or alike name as that of a first identified topic node but are more popular among system users.

Referring next to FIG. 3U as well as to above discussed FIG. 3D, the machine-implemented and automated operations of the CFi categorizing, clustering and inferencing engines 310' may be supported by the illustrated data structure 30U.0 which is also referred to herein as a CFi's Sorting and Reorganizing Object (CFiSRO) or alternatively as a CFi's collecting node 30U.0. As an aside, when people receive language-mediated codings, e.g., words organized as sentences; they often syntactically disambiguate the codings on a subconscious level (give it more of a cognitive sense than warranted by the coding taken alone) by perhaps checking different permutations for sanity ad/or appropriateness to surrounding context. Some permutations will not make any cognition sense or little of it in the surrounding context while others may make much more "sense". The machine counterpart to that kind of activity may be referred to as involving a Cognition-Representing Objects Organizing Space (a.k.a. CROOS) rather than a Cognitive Attention Receiving Space (a.k.a. CARS) because conscious attention is often not cast on such activities. The illustrated CFi's collecting node 30U.0 resides in a system-maintained and system-organized CROOS. As a second aside, It is to be understood that that the trial-and-error "clustering" of received CFi's is not be deemed as an identical process to the elsewhere described "clustering" of keywords or the like in keyword space and/or in other Cognitions-representing Spaces.

Current focus indicators (CFi's) may come in many different "types", and when received as packet-packaged data (see packet 30U.10) at the SS3 core portion of the system, the payload CFi data (see field 30U.10*g* of packet 30U.10) may have to be reformatted and then matched up with other reformatted (e.g., normalized) CFi data received at other times and/or from different CFi sourcing machines so that CFi's which should be clustered together can be identified (because the clustering thereof makes a system-recognized "cognitive sense" of one kind or another) and clustered together. A simple example of three CFi's that have been cross-correlated to one another and then formed into a CFi's cluster is seen under a first illustrated cluster holder data object 30U.12, where the three CFi's are denoted as CFi#1, CFi#2 and CFi#3. The fact that the one cluster holder data object 30U.12 points to them means that they are clustered together at least temporarily on a trial basis. As explained above, trial clusters of CFi's are formed and trial clusters of clusters (see 30U.14) are formed and these trial basis clusters are subjected to so-called, sanity checks to thereby determine on an artificial intelligence basis if they make sense in view of surrounding contexts.

One method for automatically clustering CFi's includes clustering likes with likes. In other words, a first received CFi that represents a particular smell or chemical vapor is logically linked with a second received CFi that represents a particular smell or chemical vapor if the two were transmitted at roughly the same time (per their time stamps 30U.10*b*) and from roughly the same place (per their respective place of origin stamps 30U.10*c* as provided by the transmitting packet). Normally, a received CFi that represents a particular smell would not be paired up with a received CFi that represents a particular sound, for example because for most normal cognitions, smells belong with other smells and sounds belong with other sounds of same place of origin and roughly same time of origination. In view of this, when primitive level clustering is being undertaken with aid of a CFi's Sorting and Reorganizing Object (CFiSRO) 30U.0, a CFi's typing specification is provided inside a first section 30U.1 of the CFiSRO data object to specify the type or limited types of CFi's that are to be clustered together under the umbrella of the given CFiSRO.

More specifically, the CFi's collecting node 30U.0 may specify in its first section 30U.1 that it is collecting only smell type CFi's or only emotion representing CFi's or only textual types of CFi's (e.g., only keywords). With that said, it is within the contemplation of the present disclosure that non-primitive or higher cognition level collecting nodes (e.g., those that cluster together clusters of clusters of primitive CFi's collecting nodes like 30U.0) might mix and match cognition representations of different types, for example, a musical sequence and a set of emotions that go together (for whatever reason) with that musical sequence. An example could be marching music mixed with a heart pounding biological state that often comes with that music (i.e. a national anthem) and emotional states that follow as a consequence. Among the different types of CFi's that first section 30U.1 might specify, there could be (but this is not limited to just these), CFi's representing sights, sounds, smells, tastes, different kinds of touch sensations, different kinds of kinesthetic sensations, different kinds of emotional or biological state sensations, textual cognitions (e.g., including keywords, URL's, meta-tags etc.), physical context representations (e.g., specification of surrounding environment, i.e. at work, at home, etc.) and hybrid cognitions including those that mix sensed physical context (XP) with one of the other types of CFi's (e.g., keywords, URL's, etc.).

Aside from trying to cluster likes with likes in terms of type when creating trial clusters of individually received CFi's, the first section may also specify that similarly sized ones of same types of CFi's should be clustered together. More specifically, short textual sequences of some types may be more likely to belong together with other short textual sequences rather than with proportionally much larger/longer sequences. For example a first CFi representing a single word or short phrase is unlikely to belong together with a second CFi representing a full chapter out of a book although a third CFi also representing a full chapter might. So first section 30U.1 may specify size limitations or ranges for the highest level of clusters of clusters that it will hold. (More detailed cluster size ranges are provided in a later described section 30U.3*b*.) The size specification in first section 30U.1 tells the system memory management software what rough size of data objects it is dealing with.

When the types and generalized broad sizes of the to-be collected CFi data objects are specified in first section 30U.1, it is often the case that a corresponding inferencing engine (see 310' of FIG. 3D) which is using the specific collecting node 30U.0 will already have one or more predetermined ones of plural Cognition SubTypes of Categorizations already cross-associated (on a trial basis) with the to-be-clustered together set of CFi's it is trying to cluster together. In one embodiment, the number of such predetermined subtypes is stored in list size area 30U.2*n*. More specifically, some collected CFi's (say keywords) might be categorized as being of a "sub-type" that is cross-associated with a Limbic Focal Subspace 30U.2*a* maintained by the system. By this it is meant that the to-be-clustered together (on a trial basis) CFi's of this pre-subtyped CFiSRO 30U.0 are predetermined (on a trial basis, a hypothesizing basis) to be strongly cross-correlated with a social dynamics cognition area. The latter is an example of a limbic subtype of cognition that could involve social dynamic interactions with other people. If this is the case, the corresponding inferencing engine (see 310' of FIG. 3D) that is working together with the so conjecturally sub-typed CFiSRO 30U.0 when trying to build up a clustering of CFi's will look for permutations that match up with a limbic proposal such as "Gee, can't we all just get along?". (See FIG. 1M.). At the same time, the same inferencing engine or another one will be trying out a different conjectured subtype for the same set of recently received CFi's and being clustered together CFi's; such as for example, a neocortical proposal (example: "This is a scientifically supported theory, not an appeal to emotions"). One of those conjectured subtypes will usually receive a high sanity check score (see 30U.2*e*) while the other gets a lower sanity score. With each subtype, there will be a preference for organizing the received CFi's according to a different permutation (e.g., under cluster holder 30U.12).

Some subtypes will receive relatively high scores for sanity check (when so checked) while others will receive relatively lower scores. Due to section limitations in the drawing, only one sanity-score storing area 30U.2*e* corresponding to subtype 30U.2*d* is shown. However, it is to be understood that each subtype (30U.2*a*, 30U.2*b* etc.) will have a respective sanity-score storing area like 30U.2*e* logically linked with it. The trial-wise tested subtypes that score highest (and are ranked as such) will be pursued more so by the corresponding inferencing engine (see 310' of FIG. 3D) so as to build clusters of clusters (for example) while those subtypes that score low during the first round of trial basis attempts will be ranked lowest and in essence shuffled to the back of a task priority queue, probably to be abandoned if the other trial basis subtypes ahead of them on the queue continue to return highest scores for each round of sanity check (for clusters of clusters and for clusters of those, etc.). In other words, among the possible subtypes: 30U.2*a* (limbic subtype), 30U.2*b* (neocortical subtype), 30U.2*c* (survival, reptilian like subtype), 30U.2*d* (time and/or spatial coordinates cognition subtype), 30U.2*f* (Left-brained cognition subtype or Right-brained cognition subtype0, 30U.2*g* (cognition involving multiple topics that cross-correlated in topic space), and so on; there will be a corresponding sanity check score such as the one stored in score holding area 30U.2*e*. One of those scores will usually be highest, a second will be next highest and so on. The pointers that point to the subtypes that have highest ones of corresponding sanity check scores (e.g., 30U.2*e*) are next ranked as having highest probability of being correct while those with corresponding lowest sanity check scores, as least probable. In response to this, the respective inferencing engine (see 310' of FIG. 3D) focuses its resources (i.e. data processing bandwidth) on testing out CFi's clustering permutations matching the subtype having the highest first round sanity score, and then the one having the next highest and so on. With each round of sanity checking and higher level of clustering (forming clusters of clusters), the pointers are re-ranked based on respective sanity check scores. At the end of the process, the ranked (and optionally sorted) list of pointers 30U.2 will be pointing to a subtype that has the highest sanity check score (e.g., 30U.2*e*) corresponding to whatever clusters of clusters permutation (see 30U.14) has been built up under the auspices of the corresponding CFi's collecting node 30U.0. Therefore, when a clusters of clusters is formed under a respective CFi's collecting node 30U.0, section 30U.2 of that collecting node will indicate which subtype (e.g., 30U.2*a*-2*g*, etc.) is most likely to correspond with the formed complex (e.g., 30U.14) of clustered CFi's.

Referring to section 30U.3*a* of FIG. 3U (control codes), the received CFi packets (e.g., 30U.10) can come in with roughly same time-of-origination stamps (30U.10*b*) and roughly same place-of-origination stamps (30U.10*c*) but from different machines of origin (30U.10*d*). The different machines of origin can differently code their respective CFi payloads (30U.10*g*) because they use respective and different sets of control codings and different data formats. It is difficult to work with (when clustering the following for example,) CFi payloads (30U.10*g*) having different sets of control codings and different data formats. Accordingly, a normative set of control codes and a normative data format should be chosen. Then, all raw CFi payloads (30U.10*g*) that are received as having non-normative control codes and non-normative data formats are automatically converted into the normative format that uses the normative set of control codes (e.g., meta codes and meta format). Section 30U.3*a* of the collecting node data structure 30U.0 stores the definitions of the normative format and the normative set of control codes. A data format normalizing module (not shown) uses the information in section 30U.3*a* to determine if and how to normalize incoming raw CFi payload data (30U.10*g*).

Referring to section 30U.3*b*, it is often the case that raw CFi data packets (e.g., 30U.10) keep streaming in on a non-stop basis from a monitored system user (identified in portion 30U.10*a* of each received packet) as the user moves to different locations over different spans of time. The clusters building process cannot build clusters of infinite size and then make sense of them. A limit has to be set as to how many payloads of a given type (and/or subtype) will be collected under the auspices of a single collecting node 30U.0 for a respective time span and/or for a respective geographic area. Section 30U.3*b* stores data for placing a limit on the number of payloads to be processed for each type (and optionally each subtype) of cognition and for respective time spans of origination, locations of origination and so on. A more specific example is shown at 30U.3*c'* (extending from magnifier of 30U.14). In the example, the desired span of origination time spans for level one CFi's is between 10 and 30 seconds. In other words, a continuous stream of CFi's that covers an origination span of less than about 10 seconds is rejected and a continuous stream of CFi's that covers an origination span greater than about seconds is rejected for forming a level one cluster under this collecting node 30U.0. (The rejected continuous stream may nonetheless collect under another collecting node 30U.0 having a different setting in its section 30U.3*c'*.) The geographic distance between data collecting locations (30U.10*c*) may also be delimited in settings section 30U.3*c'*, for example having to be in the range 5 to 50 feet. The size of each payload may also be delimited in settings section 30U.3*c'*, for example having to be in the range 7 to 80 bytes. For a level 2 clusters of clusters (see 30U.14) the time span of origination can be different than that of the level one clusters, for example 18 to 180 seconds. This can happen because one level one cluster (30U.12) can belong to a first half while a second level one cluster (30U.13) can belong to a second half of the longer span length.

More specifically under this example, a first trial cluster holder 30U.12 may be limited to collecting no more than three CFi's (#1, #2, #3) but no less than two under its auspices. A second trial cluster holder 30U.13 may be limited to collecting no more than five CFi's (#4, #5, #6) but no less than three under its auspices. At the same time, the corresponding level two trial cluster holder 30U.14 (which forms a clusters of clusters) may be limited to collecting no more than 32 CFi's under its auspices but no less than six CFi's (namely, the illustrated CFi's #1, #2, #3, #4, #5, #6). In FIG. 3U, each level one cluster holder (e.g., 30U.12) contains a first set of pointers (e.g., 30U.12*a*, 30U.12*b*, 30U.12*c*) pointing to corresponding ones of received CFi's (e.g., #1, #2, #3) and a second pointer (30U.12*d*) pointing to corresponding trial points, nodes or subregions (30U.22) in respective ones of system-maintained Cognitive Attention Receiving Spaces that currently cross-correlate strongly with the clustered collection of received CFi's (e.g., #1, #2, #3). This is in terms of a trial and error basis. The CFi's collecting under the first trial cluster holder 30U.12 can change if a current collection and/or permutation receives a poor sanity check score. Similarly, another level one cluster holder (e.g., 30U.13) contains a respective first set of pointers (e.g., 30U.13*a*, 30U.13*b*, 30U.13*c*) pointing to its corresponding ones of received CFi's (e.g., #4, #5, #6) and a respective second pointer (30U.13*d* not shown) pointing to its corresponding trial points, nodes or subregions (not shown) in respective ones of system-maintained Cognitive Attention Receiving Spaces that currently cross-correlate strongly with the clustered collection of received CFi's (e.g., #4, #5, #6). The level one PNOS's set (30U.22 and its level one counterpart (not shown) for CFi's #4, #5, #6) should substantially match. Otherwise it might be that CFi's #4, #5, #6 do not reasonably cross-correlate with CFi's #1, #2, #3. The PNOS's set shown at 30U.24 belongs to pointer 30U.14*d* of the level 2 collecting node 30U.14.

Referring to section 30U.4 of FIG. 3U, here a collection of pointers is stored each pointing to the highest level, clusters of clusters holder (in this example 30U.14) allowed in ranges section 30U.3*c*. Section 30U.4 therefore defines the highest level of clusters of clusters for the given collecting node 30U.0.1*t* is within the contemplation of the present disclosure that there can be a super collecting node (not shown) which points to a collection of plural collecting nodes like 30U.0.

Referring to section 30U.5, after raw ones of received CFi payloads have been reformatted (and/or re-coded) to conform with the normative codes and formats section 30U.3*a*, the raw keywords, URL's, etc. defined by the reformatted (and/or re-coded) data may still be idiosyncratic (not normal) relative to a predetermine set of "normalized" keywords, keyword expressions, URL's, URL expressions and so on associated with the current collecting node 30U.0. Section 30U.5 contains pointers pointing to such CFi normalizing and/or augmenting sets for respective CFi's clustering holders 30U.12, 30U.13, 30U.14, etc. Because the clustered CFi's of holders 30U.12, 30U.13, 30U.14, etc. are so-clustered initially on only a trial and error basis, the per-cluster pointers to CFi normalizing and/or augmenting sets are also taken as being on a trial and error basis. The inferencing engines (310') may use the normalizing/augmenting pointers of section 30U.5 for aiding in performing sanity checks. The tested against PNOS's in system-maintained Cognitive Attention Receiving Spaces will be already normalized and/or augmented. Therefore it may be necessary to normalize and/or augment the raw CFi data of the currently clustered CFi's (e.g., #1, #2, . . . , etc.).

Referring next to section 30U.6, it again should be remembered that the clustered CFi's of holders 30U.12, 30U.13, 30U.14, etc. are so-clustered initially on only a trial and error basis. Nonetheless, initial matchings can be made for each level one cluster, each level two cluster (e.g., 30U.14), etc., for matching chat rooms. Section 30U.6 may contain respective pointers to such trial and error basis matched chat rooms. The data stored in section 30U.6 may be used to invite two or more system users to a same chat room based on trial and error basis clustered CFi's alone. Section 30U.7 provides substantially the same function for other forum participation sessions. Section 30U.8 provides substantially the same function for other informational resources that currently cross-correlate on a trial and error basis with the currently clustered CFi's of the given collecting node 30U.0.

Referring to FIG. 3V, the format of special purpose collecting nodes, e.g., 30V.0 can be slightly different than that described for the general purpose CFi's collecting node 30U.0 shown in FIG. 3U. The latter is a template, but need not be strictly adhered to. In FIG. 3V, the collecting node 30V.0 is specialized for textual content containing CFi's such as those containing keywords, focused-upon sub-portions of content that the user was exposed to, URL's, meta-tags and so on. In this case, section 30V.1 may assign corresponding textual types to the textual CFi to indicate for example that is coded as ASCII plain text, as Rich text, as MS Word™ text, as HTML encoded text, XML encoded text and so on. Section 30V.2 may assign various ones of different subtypings to the typed textual material such as a neo-cortical subtype, temporal spatial subtype and so on. Each pointed-to subtype node may have an associated sanity check score. Furthermore in this case, an additional section 30V.3*a* may be included in the data structure 30V.0 for defining regular expression control codes such as multi-symbol wild cards (e.g., "*"), single-symbol wild cards (e.g., "?"), antonym specifiers (e.g., "!"), and so on. Another additional section 30V.3*b* may be included for defining special purpose delimiter codes as may be used in HTML or otherwise coded meta-tags and the like. Aside from that, the data structure of textual collecting node 30V.0 may be substantially similar to that of general purpose CFi's collecting node 30U.0 shown in FIG. 3U.

FIG. 3V additionally shows an illustrative example of how the level one and level two cluster holder data objects may be used. In this example, the following raw CFi parameters are present: CFi#1="Lincoln??", CFi#2="Gettysburg*", CFi#3="Address", CFi#4="How", CFi#5="Histor*", and CFi#6="See it". Therefore the first level one cluster holder data object 30V.12 defines on a trial and error basis, the test clause: CFi#1+CFi#2+CFi#3="Lincoln's Gettysburg Address" as shown in dashed block 30V.12'. Similarly, the second level one cluster holder data object 30V.13 defines on a trial and error basis, the test clause: CFi#4+CFi#5+CFi#6="How Historians See-it" as shown in dashed block 30V.13'. Although a human observer can almost instantly see that each of these 3-word clauses makes sense, the automated machine system performs the aforementioned sanity check runs and scores the results so as to determine which permutations and combinations are more likely valid and which are less illustrated to be sensible. Once the automated sanity checks have been run on the short run clusterings of the first and second level one cluster holder data object 30V.12, 30V.13 and the returned scores have been determined to be adequate (e.g., above a predefined threshold) and ranked or sorted, the level one cluster holder data object 30V.14 is automatically assembled by the machine system on a trial and error basis, where one high-scoring permutation turns out to be: "Lincoln's Gettysburg Address, How Historians See-it". In that case, pointer 30V.14*d* is updated to point to corresponding points, nodes or subregions in topic space, in image space, in sounds space, in context space and so on; where these pointed to, trial and error PNOS's (30V.24) can then indirectly point to chat or other forum participation opportunities corresponding to the topic of "Lincoln's Gettysburg Address, How Historians See-it". Therefore, the exemplary data structure 30V.0 may serve as a basis for the STAN_3 system automatically sending invitations to students doing research on the question ("Lincoln's . . . How Historians See-it") so as to automatically bring such students (e.g., Fifth Grade Students) together into same online chat rooms or the like.

For the case of the exemplary, level one clustering of CFi-delivered keywords: "How Historians See-it" (30V.13'), FIG. 3V additionally shows how pointer 30V.13*d* (understood to emanate from holder 30V.13') can point to a collection 30V.23 of further pointers that point to respective nodes and/or cognitive-sense-representing clustering center points (e.g., pointers 374.2) in keyword space that have similar semantic meanings or cognitive senses. As was explained above, keyword expressions may be clustered in a keyword expressions layer (371, FIG. 3E) of keyword space where the clustering is according a semantic sense (e.g., a Thesaurus sense) or another such cognitive sense and where clusterings may be on or around cognitive-sense-representing clustering center points in some cases. In one embodiment, the calculated distance of a first keyword expression away from a second keyword expression in hierarchical and/or spatial keyword space, where the second keyword expression is most representative (in a communal popularity sense) of an underlying cognitive sense, indicates how same or similar the first keyword expression is relative to the second keyword expression and/or relative to a cognitive-sense-representing clustering center point over which the second keyword expression directly lies. Accordingly, the keyword string, "How Historians See-it" might be, in one hypothetical example, closely clustered in keyword space adjacent to other expressions that match (per the appropriate matching rules—see 30W.3*c* of FIG. 3W as will be discussed below) the text strings: "How Historians Perceive-it", "How Historians View-it", and/or "The Historical Perspective" 374.2 where all these differently phrased keyword strings are shown to the machine system to be different manifestations of a same neo-cortical cognition (a same communal cognitive sense of what the strings imply for that clustering subregion of keyword space). The so clustered together, but different keyword expressions and/or strings may have respective further pointers to subregions of topic space that address the concept of "Historical Perspective" (e.g., 374.2 of FIG. 3V). These sub-topic pointers (which point to a sub-topic under "Lincoln's Gettysburg Address, How Historians See-it" (30V.14) can serve as a basis for the STAN_3 system making suggestions to the students (the monitored STAN_3 system users) for further research on the topic they are apparently currently focusing-upon. In other words, it may be automatically suggested to the students that they learn how a "Historical Perspective" (e.g., 374.2) occurring some 10, 20 or 100 years after the event may differ from a concurrent perspective. The portions of topic space that keyword expression 374.2 points to may provide such relevant material. Therefore, to summarize, the progressive build up of small clusters of received (and optionally normalized) CFi's into apparently sensible combinations of such CFi's (with some being selectively masked out) and the further build up of these level one clusterings (e.g., 30V.12, 30V.13) into level two clusters of clusters (e.g., 30V.14) and so on; not only can generate ranked and sorted lists of pointers (e.g., those in memory area 30V.24) to specific topic nodes for the narrowed level two clustering (e.g., "Lincoln's Gettysburg Address, How Historians See-it" (30V.14)), but they can also at the same time generate ranked and sorted lists of pointers (e.g., those in memory area 30V.23) to subtopics that the user (e.g., student) may wish to explore. Therefore the machine generated result signals may simultaneously provide answers cross-correlating to very specific and narrow cognitions that are probably there in the user's mind or should be there (e.g., as a time-pressed Fifth Grade Student, where one ancillary topic might be: How do I get my homework task done as quickly and efficiently as possible?) as well as answers or suggestions cross-correlating to broader understandings that the user may wish to follow up on (e.g., What is the difference between Historical Perspective 100 years after the fact and perspective at the time an event happens?).

The data structure shown in FIG. 3V is not to be confused with the similar-looking one 30W.0 shown in FIG. 3W. FIG. 3V shows a CFi's collecting node 30V.0. On the other hand, FIG. 3W shows a counterpart Textual Expression primitive object (TexPO) 30W.0. TexPO 30W.0 would be an example of a simple keyword or another such textual expression that result pointers (e.g., 30V.22) of FIG. 3V may point to. It is to be understood that while keywords have been used here as an easy to appreciate example of textual content, the focused-upon sub-portions of content (e.g., web content) presented to the user are another example of textual expression content for which the system tries to automatically locate best-matching and representative textual expression primitives or operator-node-defined complexes in a corresponding content space. Like keyword expressions that have a same underlying cognitive sense, many different ones of textual content nodes may be clustered together with each other and/or near to a common cognitive-sense-representing clustering center point in the corresponding content space. There is no clear and absolute distinction between keyword expressions and content space expressions except that keywords tend to be shorter in length and keywords, rather than raw sub-portions of focused-upon textual content, are what users more normally input into their search engines.

Referring to FIG. 3W, a first section 30W.1*a* of the illustrated TexPO data structure 30W.0 provides typing information (and optionally subtyping information) indicative of a type of textual data (e.g., a textual string or textual regular expression) provided in second section 30W.2 and optionally about its relative size and optionally about one or more system-maintained Cognitive Attention Receiving Spaces with which it may be best associated. In the instant example, the second section 30W.2 contains a textual regular expression formed of a combination of control codes (wildcards, match rule control codes and delimiters) as well as alphanumeric symbols that define a keyword expression: "*Ab*^Lincoln*" where here the quotation marks are delimiters indicating start and end of the regular keyword expression; the asterisks (*) are wildcards allowing for replacement by a string of any length and content including a zero length one, the up carrot (^) represents a required white space character and the two underlined letters (A and L) are indicative of a requirement that their case (in this instance, upper case lettering) is required. Accordingly, a text sequence such as "President Abraham Lincoln" will match and so too will "Mr. Abe Lincoln" and "Honest Abe Lincoln's" (assuming that there are no special rules in the match rules section 30W.3*c* that indicate otherwise). Although not shown in FIG. 3W, one embodiment includes the use of so-called, "within N" (w/N) words wildcard specifications and "not within N" (!w/N) words wildcard specifications as well as before or after sequence specifications and Boolean logic specifications (e.g., "Ab*" before AND w/5 "Lincoln*") thereby allowing for different levels of flexibility beyond just the unlimited length wildcard (*) and the single symbol length wildcard (?).

The illustrated TexPO data object 30W.0 is deemed to reside at a respective anchored location in a textual primitives layer 30W.71 (see also 371 of FIG. 3E) having logically linked other data objects and having a virtual spatial framework (which framework is also denoted as 30W.71). The residence location of data object 30W.0 in its respective hierarchical and/or spatial organizing and Cognitions-representing Space may be specified in data field 30W.1*b*. As seen in FIG. 3W, the other exemplary textual primitive objects: TexPO2 (30W.12), TexPO3 (30W.13) and TexPO4 (30W.14) define in their respective second sections (like the detailed 30W.2) corresponding keyword expressions that can strongly tether with the concept of Abe-Lincoln, for example: the USA Civil War and the Gettysburg Address. In other words, the various textual primitive objects, TexPO, TexPO2, TexPO3 may closely cluster with one another, hierarchically and/or spatially because they have a common cognitive sense related to Abe-Lincoln, the USA Civil War and the Gettysburg Address. Indeed there may be one or more cognitive-sense-representing clustering center points (see 30W.7*p*) that represent the common cognitive sense or something closely aligned thereto (in a cognitive sense). Each TexPO may have a respective, anchoring strength factor (e.g., 30W.2*a*, 30W.12*a*, 30W.14*a*) associated with its respective virtual position within the virtual spatial framework 30W.71 of its subregion of keyword expressions space (or of another textual content space). Those strongly together and/or closely together TexPO's that have relatively strongest anchoring strength factors (e.g., 30W.2*a*) are deemed to be the core of, or hard-to-move foundational stones of the clustering area while those that have substantially weaker anchoring strength factors and weak clustering strengths (e.g., s.0.12, or even negative clustering strengths if repulsion is intended) are deemed to be easier-to-move nonfoundational stones of the clustering area. (As will be explained soon, so-called, update engines 30W.37 can move the primitives or operator nodes logically linked to them according to a reciprocal function of anchoring strength and/or clustering strength.) The decision as to which other TexPO's (e.g., 30W.12, 30W.14) most strongly tether (anchor) into the current region of a textual primitive object layer (see 371 of FIG. 3E) and most strongly cluster with one another happens by chance and evolution rather than by predesign. First, one textual primitive object (TexPO) is placed (hierarchically and/or spatially) into its position (30W.1*b*) in the corresponding textual expression space (e.g., keyword space) and then another near it, and then another. It is left up to the large number of users who reference the current region 30W.71 (e.g., like layer 371 of FIG. 3E) of the corresponding textual expression space and who then indicate favor for one variation of clustering in that subregion over another by means of their positive and/or negative focusing energies that the subregion evolves to have its organization of clustered together textual primitive objects (TexPO's). More specifically and for example, if most users (or the more influential users) cast their focusing energies more so upon TexPO 30W.0 as opposed to on TexPO 30W.15 (as a mere example) that automatically gives one TexPO (e.g., 30W.0) a greater anchoring strength 30W.2*a* (because it is more favored by users) than that of the regionally less favored TexPO (e.g., 30W.15). Similarly, by the general population user usage favoring a referencing onto TexPO 30W.12 second most often over TexPO 30W.14, where the latter is the third most often referenced one of the local textual cognition primitive objects that each of those gets its respective and proportional anchoring weights and proportional (according to popularity of joint usage) clustering strength factors (e.g., s.0.12, s.0.14; discussed below). In one embodiment, rather than relying merely on general population preferences for which TexPO will most strongly anchor in this subregion (30W.71) of a corresponding textual expression space and which will most strongly and attractively tether one to the other (as opposed to repulsion) and thus reinforce their effective anchoring strengths, the system also relies more heavily on respective focusings by expert and/or reputable users on such TexPO's of the given region for thereby increase their anchoring scores (30W.2*a*) by a greater degree based on the level of expertise or reputation of the visiting expert/reputable user. Attractive or repulsive clustering strengths (e.g., s.0.12) are similarly increased in absolute magnitude based on the more heavily weighted activities of experts and/or reputable or influential users.

TexPO data objects may have respective directional distances associated with their intra-space cross-linkages (e.g., d.0.14 and d.14.0) for purpose of visually displaying a corresponding 2D or 3D map of how the TexPO's cluster closely together or more far apart and/or how they anchor (30W.2*a*) strongly or weakly to their respective spots in the textual cognition primitive or other layer (see again 371). Distance values may be computed as combined functions of map room needs for squeezing in other TexPO's and on attractive or repulsive clustering strengths. However, before discussing these co-clustering factors, first some additional discussion for tertiary sections 30W.3*a*, 3*b* and 3*c* of the detailed data structure 30W.0 is provided here. The textual expression code stored in second section 30W.2 can have various control codes associated with it, including but not limited to, various predefined wildcard codes (30W.3*a*), various predefined delimiter codes (30W.3*b*), and various predefined expression matching rules (30W.3*c*). The expression matching rules (30W.3*c*) may include specialized knowledge base rules (KBR's) indicating which symbols in the expression specification (30W.2) may require an exact match in terms of specialized formatting (e.g., font, bold, underline, italicized, capitalized-only, lower-case only, etc.). The expression matching rules (30W.3*c*) may define special case exceptions to more general rules for match scoring. The expression matching rules (30W.3*c*) may include rules that allow for less than perfect matching; for example a 75% cross-correlation factor being enough in place of a 100% cross-correlation factor. The expression matching rules (30W.3*c*) may further include more sophisticated matching rule specifications directed to anchoring strength requirements (see 30W.2*a*), effective distances (see d.0.14) from other TexPO's and so on. When the STAN_3 system tries to match (or otherwise cross-correlate) a user-supplied CFi (e.g., 30V.10*g* of FIG. 3V) or a system-generated clustering of CFi's (e.g., 30V.12' of FIG. 3V) with a counterpart textual expression (e.g., 30W.2) defined within a respective TexPO (e.g., 30W.0, the Abe-Lincoln example), the system may use the expression matching rules (30W.3*c*) of the trial TexPO for generating a corresponding matching or cross-correlation score to the test clustering of CFi's. In one embodiment, the system tests for matching or cross-correlation against several trial TexPO's and then picks the higher scoring ones for further processing as against a trial clustering of CFi's while tossing out the comparatively lower scoring TexPO's. Therefore, the expression matching rules (30W.3*c*) may function as an important filtering mechanism for determining which CFi's cross-correlate strongly with which counterpart textual expressions (30W.2 of TexPO 30W.0 for example) in keyword space, or in URL's space or in meta-tags space, or in focused-upon sub-portions content space, or the like.

Referring next to section 30W.4 of the illustrated data structure 30W.0 (the first TexPO), each such textual primitive object may logically link to other TexPO's in its respective region 30W.71 of its respective textual expression space (e.g., in keyword space—see also link 370.12 of FIG. 3E; in URL's space—see also 391.2 of FIG. 3E; in meta-tags space see also 395 of FIG. 3E; in a hybrid space—see also 384.1 of FIG. 3E; and so on). The logical linkages between spatially nearby TexPO's may be in the form of absolute or relative location pointers (which relative ones associate with a base absolute location such as for example a cognitive-sense-representing clustering center point, see again 370.0 and 370.12 of FIG. 3E). These intra-space logical linkages may have virtual distance (e.g., d.0.12) and/or virtual strength values (e.g., s.0.12, positive or negative) logically attached to them. In one embodiment, virtual distance also partially determines virtual strength of the intra-space logical linkages and thus TexPO's that are farther apart in the corresponding virtual spatial framework (30W.71) are deemed to be more weakly clustered together while TexPO's that are comparatively closer together (e.g., Abe-Lincoln 30W.0 and Gettysburg Address 30W.14) are deemed to be more strongly clustered together and their respective anchoring factors synergistically reinforce one another so that together, these closely co-clustered TexPO's each have a greater effective anchoring factor than if it were not closely allied (by distance and/or linkage strength) to the other TexPO. For example, the linkage virtual strength value could be s=f(1/d); meaning that strength is a function of the reciprocal of virtual distance. With use of such synergistically reinforcing, directional linkages (e.g., d.0.14 from TexPO 30W.0 to TexPO 30W.14 and d.14.0 from TexPO 30W.14 to TexPO 30W.0), a foundational clustering of key TexPO's may be established, where less influential TexPO's (e.g., 30W.16) then weakly tag along to the strongly anchored foundational TexPO's of the clustered area. As mentioned above it is by happenstance (chance) usage of system users that a determination is made as to which TexPO's form the foundational anchor points of the given local region 30W.71 and for a corresponding cognitive sense. In another region of keyword or another textual expression space, the weaker expressions of first region 30W.71 may be duplicated where however, in that other region, the duplicated TexPO's are the more important, more strongly anchored one and thus kings of their realm (the other region—not shown). It is basically by user voting through usage that some TexPO's become dominant over others in one subregion and vice versa in another subregion. In other words, an example expression such as "Abe-Lincoln" might be a relatively unmovable keystone of its subregion 30W.71 in its subregion of expression space (e.g., keyword space) while the same example expression, "Abe-Lincoln" may be a relatively weakly implanted and an unimportant expression for a clustered expressions other subregion that focuses in on; for example, different styles of beards or top hats. In one embodiment, a zero-ith pointer (not shown) of ranked lists section 30W.4 points forward and/or backwards in linked list style to the next or previous instance of the same example expression, "Abe-Lincoln" and if the current region (30W.71) is determined to not be the one matching what is sought, a searching bot (e.g., 30W.11*b*—to be described) or other search module follows that zero-ith pointer(s) linked list (not shown) to get to the next instance and test that one for match criteria satisfaction.

In one embodiment, the relative and/or absolute logical links stored in section 30W.4 are ranked and sorted according to effective anchoring strength (e.g., 30W.12*a*) and/or relative clustering strength (e.g., s0.12). For example, the most central and foundational other TexPO for the current TexPO (e.g., 30W.0, Abe-Lincoln) might be 30W.12 (=Civil War) and the pointer to it would then be listed first in the pre-ranked and sorted list of section 30W.4; and then the next most important one (e.g., 30W.14=Gettysburg Address) would have the pointer to it listed and so on. Accordingly, when a user-launched automated search bot 30W.11*b* comes across a TexPO data structure such as 30W.0, the pre-ranked and pre-sorted listing in intra-space links section 30W.4 will already have an indication of relative importance of other TexPO's (e.g., 30W.12, 30W.14) to the given TexPO (e.g., 30W.0) based on relative anchoring strengths and/or relative clustering strengths. If the automated search bot 30W.11*b* has respective search instructions 30W.11*si* containing search criteria directed to relative importance of other TexPO's relative to the being-considered TexPO (e.g., 30W.0) serving as a base, then the computational work of determining the strength and/or distance and/or rankings of the other TexPO's relative to the being-considered TexPO will already have been done by section 30W.4. Thus the data processing workload of the automated search bot 30W.11*b* is reduced. More specifically, the pre-specified search instructions 30W.11*si* of the bot may include an instruction to find a TexPO whose top N most important other TexPO's relate to: (1) the Civil War, (2) Gettysburg and (3) Washington D.C. (last TexPO not shown); N being a predefined number here. In such a case, an automated testing of a sorted list provided in pre-ranked and pre-sorted section 30W.4 will indicate to the search bot 30W.11*b* how well the given TexPO under consideration (e.g., 30W.0) satisfies that part of the bot's search criteria (30W.11*si*).

Before moving on to description of next section 30W.5, first a word about launched user search bot's like 30W.11*b* is in order here. Like topic space, the textual cognition spaces of the STAN_3 system (e.g., keyword space, focused-upon content sub-portions space, etc.) can be constantly changing in response to the fluctuating attention giving activities of the user population. New catch phrases may come into vogue while others fade away. So the anchoring and/or clustering strengths of respective TexPO's may change over time in response to changing preferences of the user population pool. (In one embodiment, the re-direction aspect of the cognitive-sense-representing clustering center points is used to create more up to date, replacement subregions of the given textual expression space to replace the older and gone stale subregions while retaining a legacy history of the older versions.) Sophisticated users; and in particular market research specialists might want to keep track of trending changes among general population pools and their uses of various subregions of various textual expression spaces where those changes are reflected in how the organizing of TexPO's in a corresponding textual cognition space changes or in another expressed cognition space. Eventually, many such changes show up as corresponding changes in topic space. However, they may first appear as a new catch phrase (e.g., "If you love me, pass my bill"—President Obama Sep. 14, 2011) in a corresponding textual cognition space or as a catchy new other expression (e.g., a visual cartoon) in another type of expressed cognition space. Sophisticated users may wish to launch space-crawling, automated bots like 30W.11*b* which virtually crawl through respective areas of specified expression cognition spaces in search of tell tale signs of changing user mood and changing usages of language or other forms of expression. Such may be signaled by the appearance of a new catch expression and/or by changes of relative rankings as between pre-established catch phrases or as between other such expressed cognitions. Search instructions (30W.1*si*) that the sophisticated user formulates on his/her own or with the aid of search templates provided by the STAN_3 system are inserted into scripted code that search bot obeys. An example of a scripted code might say, "Alert me if Gettysburg Address (30W.14) becomes more highly ranked than Civil War (30W.12) in section 30W.4 of TexPO 30W.0, otherwise keep crawling". In other words, if no important changes occur, the user does not want to be bothered by his/her in-the-background crawling around search bot 30W.111*b*. The user is not focusing his/her current attention giving energies on the possible change of organization within the crawled through textual or other expressed cognition space. The user launched crawl bot 30W.11*b* keeps doing this as system bandwidth allows and as long as the respective user does not cancel a subscribed to crawl service (if such subscribing is needed). Specifics regarding how to create an in-the-background crawling bot (e.g., 30W.11*b*), how to program it the first time and/or how to recall it for change of search and alert instructions (e.g., 30W.11*si*) may be provided by tutorial web pages or the like provided by the STAN_3 system.

Referring to section 30W.5 of the illustrated data structure 30W.0 (the first TexPO under consideration), each such textual primitive object may include logical links to normalization, augmentation and/or translation dictionaries. This concept has been discussed above. Briefly, the textual expression in section 30W.2 (assume for this explanation it says "Yo Ho Joe" rather than Abe-Lincoln) may be a relatively nonconforming one that only a small subset of system users use while the majority of users routinely refer to the referenced target as "Joe-the-Throw Nebraska" rather than as "Yo Ho Joe". In this case, a first pointer in section 30W.5 may point to the more normal naming of the targeted cognition (e.g., Joe-the-Throw Nebraska"). The normalization pointers in section 30W.5 may be pre-ranked and/or pre-sorted according to most popular to least popular normalized alternatives. Accordingly, when a user's automated search bot 30W.11*b* comes across a TexPO data structure such as 30W.0, the pre-ranked and pre-sorted listing in the normalized alternatives part of section 30W.5 will already have an indication of alternative other ways that the targeted textual cognition can be expressed. In one embodiment, the normalized alternative pointers may point to expressions in respective sections 30W.2 of respective other textual primitive objects (other TexPO's, for example TexPO2, TexPO3, etc.).

Another subsection of part 30W.5 may contain a pre-ranked and pre-sorted listing of pointers pointing to other TexPO's whose expressions are not substitutes for the textual cognition of the current TexPO (e.g., 30W.0) but rather are expansions, extensions of the given textual cognition (e.g., Abe-Lincoln). Such expansion/extension lists may be used when the system user does not have at the tip of his/her tongue the exact expression he/she is trying to grasp. For example, the user may say to themselves (or others), "It's got something to do with Abe-Lincoln (or with "Yo Ho Joe" as another example), but I can't pull the exact naming of it out of mind at the moment". The expansion/extension lists may be pre-ranked and/or sorted according to current popularity scores or according to other, additional criteria (e.g., expert user's preferences). More specifically, as an example, if there a popular joke circulating among system users relating to the Abe-Lincoln example (e.g., "Other than that Mrs. Lincoln, how did you enjoy the show?"), one of the expansion/extension pointers may point to an intra-space node or subregion related to that currently popular joke. Often, if the textual cognition represented by section 30W.2 is a living celebrity, the number 1 popular expansion/extension pointer will point to an intra-space node or subregion related to a current events textual cognition that is currently "hot" or most popular.

Another subsection of part 30W.5 may contain a pre-ranked and pre-sorted listing of pointers pointing to other TexPO's whose expressions are substitutes for the textual cognition underlying the textual expression of the current TexPO (e.g., 30W.0) but are expressed in a different language (e.g., Spanish, French, Chinese) or with use of very different words. For example, the expression, "sixteenth president of the USA" may be a way of expressing the concept of Abe-Lincoln but with very different words. In one embodiment, a language conversion that is most often called for (most popular) at the time is automatically listed first. Two uses may be derived from such a configuration. First, because most users who need a translation will be asking for that number 1 most popular translation, it will be most readily available at the top of the pre-sorted list. Secondly, for people doing market or other research regarding the textual cognition (e.g., Abe-Lincoln) represented by section 30W.2 and which language based demographic groups are accessing it most, such information will be readily given by the pre-sorted list in the translations part of section 30W.5.

Referring to section 30W.6 of the illustrated data structure 30W.0 (the first TexPO under consideration), each such textual primitive object may include logical links to points, nodes or subregions (and/or cognitive-sense-representing clustering center points) in topic space that strongly cross-correlate with the textual cognition (e.g., Abe-Lincoln) represented by section 30W.2. This concept has been discussed above. Briefly, one or more pre-ranked and pre-sorted listings of pointers pointing to topic space may be provided. These may be ranked according to current "hotness", according to long-term popularity, according to co-related topics that experts users currently consider to be most related, and so on. Accordingly, when a user's automated search bot 30W.11*b* comes across a TexPO data structure such as 30W.0, the pre-ranked and pre-sorted listing in the topic space pointers section 30W.6 will already have indications of which topic nodes and/or cognitive-sense-representing clustering center points are most currently "hot" in relation to the textual expression and corresponding cognition of section 30W.2, which are most popular over a long term duration (e.g., last 2 years), which are most currently popular among expert users, among users having pre-specified demographic attributes, and so on.

Referring to section 30W.7*a* of the illustrated data structure 30W.0 (the first TexPO under consideration), each such textual primitive object may include logical links to chat or other forum participation sessions that strongly cross-correlate with the textual cognition (e.g., Abe-Lincoln) represented by section 30W.2. This concept has been discussed above. Briefly, these sessions may be ranked according to current "hotness", according to long-term popularity, according to participation by known expert and/or influential users currently consider to be most related to the textual cognition represented by section 30W.2, and so on. Accordingly, when a user's automated search bot 30W.11*b* comes across a TexPO data structure such as 30W.0, the pre-ranked and pre-sorted listing in the cross-associated forum pointers section 30W.7*a* will already have indications of which forums are most currently "hot" in relation to the textual cognition of section 30W.2, which are most popular over a long term duration (e.g., last 6 months), which are the most currently popular among expert users who are cross-associated with the textual cognition of section 30W.2, which are currently focusing-upon the textual cognition of section 30W.2 while at the same time being most currently popular or hottest among users having pre-specified demographic attributes, and so on.

Referring to section 30W.7*b* of the illustrated data structure 30W.0 (the first TexPO under consideration), this functionality has also been briefly mentioned above. A same one textual expression (e.g., "Best USA President ever") may have very different meanings or cognitive senses to different groups of users. More specifically, one group of users may consider Abe-Lincoln to be the "Best USA President ever" and thus they routinely equate the textual expression, "Best USA President ever" with Abe-Lincoln as well as that sense of Abe-Lincoln that deals with the Civil War and the Gettysburg Address for example. On the other hand, another group of users may consider Ronald Reagan or FDR to be the "Best USA President ever" for their respective various reasons. Of course the present disclosure is not picking one over the other but rather providing a means by way of which these different interpretations of the exemplary textual expression, "Best USA President ever" may be logically linked one to the next. That is what the linked list pointers of section 30W.7*b* do. In one embodiment, each pointer also includes a relative ranking indication such as this next cognitive sense of the same textual expression is ranked number 3 out of the top 100. A search bot can use this linked list to locate, for example, the top 3 current understandings of what the exemplary textual expression, "Best USA President ever" means to system users.

Referring to section 30W.7*c* of the illustrated data structure 30W.0 (the first TexPO under consideration), this functionality has also been briefly mentioned above. Textual primitive objects (TexPO's) such as 30W.0 may be deemed to lay directly over a specific cognitive-sense-representing clustering center point (e.g., 30W.7*p*) or to be clustered near to that clustering center point (e.g., 30W.7*p*) where such distance (in a hierarchical and/or spatial sense) may be calculated based on the literal locations (e.g., 30W.1*b*) given respectively for the TexPO 30W.0 and its nearby clustering center point (e.g., 30W.7*p*) or where such distance may be calculated based on one or more distance recalculation rules provided for the corresponding clustering center point (one of the three pointers represented by pointers trio, 30W.ERR). Although due to drawing space limitations, FIG. 3W shows just one nearby clustering center point (e.g., 30W.7*p*), it is within the contemplation of the present disclosure to have section 30W.7*c* storing a ranked and presorted list of the nearest N, cognitive-sense-representing clustering center points, where here N can be pre-specified as 2, 3, . . . , etc. Each clustering center point (e.g., 30W.7*p*) may optionally include as part of its data structure, a time stamped re-direction pointer, a time stamped expansion pointer and/or a time stamped distance-recalculation pointer. These three optional pointers are collectively referenced by reference symbol, 30W.7ERR.

Referring next to section 30W.8 of the illustrated data structure 30W.0 (the first TexPO under consideration), each such textual primitive object may include logical links to points, nodes or subregions in other system-maintained Cognitive Attention Receiving Spaces (CARSs) besides topic space, forum space or the textual space (e.g., keyword space) of the first TexPO 30W.0. These other logical links (e.g., pointers) may be pre-ranked and pre-sorted according to appropriate ranking and sorting algorithms that serve popular desires of the user population. The other system-maintained CARSs that are referenced by section 30W.8 of the data structure may include representations of non-textual cognitions such as, for example those directed to sights, sounds, tastes, smells, emotions and so on. A more specific example of non-textual cognitions may be a plurality of image sequences relating to Abe-Lincoln giving his famous Gettysburg Address at Gettysburg. The image sequences may not have any text immediately linked to them but rather they may be simply raw image sequences as stated. However, even though there is no textual expression immediately linked to them, each of the plural image sequences may share a consensus-wise agreed to cognitive sense with the others of the plural image sequences. These plural image sequences may be clustered about a cognitive-sense-representing clustering center point in a respective, images-only space. A cross-spaces pointer such as one in field 30W.8 can point to the clustering center point in the respective, images-only space and thus logically link textual primitive object (TexPO) 30W.0 to the images-only center point in the other Cognitions-representing Space.

Referring to section 30W.9, the textual space (e.g., keyword space) of the first TexPO 30W.0 will typically have operator nodes such as 374.1' pointing back to (e.g., via pointer 370.4') textual primitive objects such as TexPO 30W.0, where the to-primitive pointers (e.g., 370.4') function to define a more complex, less primitive textual cognition of the respective operator node 374.1'. In its turn, the pointed-to TexPO 30W.0 can have pre-ranked and pre-sorted pointers stored in section 30W.9 that point to the back referencing operator nodes (e.g., 370.4'). Stated otherwise, section 30W.9 points to the hierarchical child nodes of node 30W.0. The pointers of section 30W.9 may have respective distance and/or strength values (e.g., d.0.74, s.0.74) logically attributed to them for indicating, in similar manner to the primitive layer links (section 30W.4) how strongly and/or closely clustered or not the more complex textual cognitions of the operator nodes are to the primitive textual cognition 30W.2 of data structure 30W.0. In one embodiment, the pointers of section 30W.9 may comprise a pointer to a specific cognitive-sense-representing clustering center point plus a relative offset from that center point to the intended operator node. In this way, each pointer of section 30W.9 may simultaneously identify the co-related center point as well as the child node (e.g., operator node) which is ultimately being pointed to.

In one embodiment, system users have the option of seeing the clustering distance and/or strength values between primitive nodes (e.g., TexPO 30W.0) and/or between selected ones of more complex nodes (e.g., 370.4') and/or between selected ones of cognitive-sense-representing clustering center points (if used in the respective space) visually displayed to them on a screen in similar manner to the way that topic or other space nodes of FIG. 3S may be displayed. The visually displayed information may be formatted onto a 2D plane or displayed with a 3D or higher format including relying on color coding to represent alternate dimensions and/or different coupling strengths or distances (e.g., d.0.74, s.0.74) and/or different levels of "hotness" being currently associated with respective nodes or subregions of the displayed space.

The pointers of section 30W.9 may be pre-ranked and pre-sorted according to appropriate ranking and sorting algorithms, including for example, according to which operator nodes are most frequently in recent times (e.g., last day, week or month) referenced by all system users, which are most frequently in recent times referenced by system recognized experts or influential persons, which are most frequently in recent times referenced by chat or other forum participation sessions that have hotness scores exceeding predetermined threshold values, and so on. Accordingly, when a user's automated search bot 30W.11*b* comes across a TexPO data structure such as 30W.0, the pre-ranked and pre-sorted listing in the cross-associated operator nodes section 30W.9 will already have indications for exploitation by the bot including indications of which more complex (less primitive) textual cognitions (as represented by respective operator nodes like 370.4') are most currently "hot", which are most popular over a long term duration (e.g., last 3 months), which are most currently popular among expert users who are cross-associated with the primitive textual cognition of section 30W.2, which users are currently focusing-upon a textual cognition having that of section 30W.2 as its primitive, and so on. The automated search bot 30W.11*b* may use the results for purposes of market research or other purposes.

Referring to section 30W.10 of the illustrated data structure 30W.0 (the first TexPO under consideration), each such textual primitive object may include logical links pointing into user-to-user associations (U2U) space (see for example 30T.6*b* of FIG. 3Ta) and thereby identifying specific users who are strongly cross-associated with the TexPO under consideration (e.g., 30W.0) where the basis for such strong cross-association may be specified and may include one or more of bases such as, being a highly influential persona with respect to the textual cognition of section 30W.2; being a well regarded expert persona with respect to the textual cognition of section 30W.2; and so on. The pointers to influential and other types of personas may be pre-ranked and pre-sorted according to appropriate predetermined and machine-implemented algorithms. Accordingly, when a user's automated search bot 30W.11*b* comes across a TexPO data structure such as 30W.0, the pre-ranked and pre-sorted listing in the cross-associated users section 30W.10 will already have indications for exploitation by the bot as may be deemed appropriate by the predetermined search instructions 30W.11*si* given to the bot 30W.11*b*.

Referring to section 30W.11, in addition to strongly cross-associated users (of section 30W.10), listings of pre-ranked and pre-sorted pointers may be provided in section 30W.11 for logically linking to other informational resources which are cross-associated with the textual cognition of section 30W.2. These other informational resources may include cross-correlated conference events, research facilities, non-public database resources and so on. The list sortings may indicate which are most preferred by lay or expert users, which are currently the most "hotly" referenced ones and so on.

FIG. 3W additionally shows the presence of two kinds of automated engines that are associated with primitive (e.g., 30W.0) or more complex nodes (e.g., 374.1') of the corresponding textual or other cognition space. One of the engines is a space populating engine 30W.30 that automatically adds new nodes to the space. The other is an automated space updating engine 30W.37 that automatically updates the pre-existing nodes and logical linkages of the respective cognition space (e.g., keywords space, URL's space, etc.). The automated space updating engine 30W.37 may also from time to time, update the cognitive-sense-representing clustering center points (e.g., 30W.7*p*) by for example creating an expanded space subregion that contains a mirror copy of the first center point but at a different location and pointing to different nearby PNOS's in its respective subregion. In one embodiment, when mirror copies of a cognitive-sense-representing clustering center point are created by use of expansion pointers ("Expand" in FIG. 3W), each such pointer includes a time-stamped forward pointer pointing to the more recently created expansion subregion and indicating the date of the expansion and a time-stamped backward pointer pointing from the more recently created copy of the center point back to the earlier-in-time one (e.g., 30W.7*p*) and indicating the creation date of the earlier-in-time one (e.g., 30W.7*p*). In one variation the back and forth pointers also indicate a relative hotness ranking (e.g., number 3 out of 100) for at least some of the pointed to center points. In this way a linked list is formed that allows users or an automated bot to navigate from one expansion subregion to the next and to determine which of the subregions is the most often referenced one (e.g., the hottest) among system users and which is next most popular and so on.

The automated space updating engine 30W.37 may also from time to time, update the cognitive-sense-representing clustering center points (e.g., 30W.7*p*) by for example creating a substitute (replacement) subregion that contains a copy of the first center point but at a different location and pointing to different nearby PNOS's in its respective subregion. In one embodiment, when such a replacement copy of a cognitive-sense-representing clustering center point is created, it is done by use of a redirect pointer ("Redirect" in FIG. 3W). Each redirection pointer includes a time-stamped forward pointer pointing to the more recently created substitute subregion and indicating the date of the substitution and a time-stamped backward pointer pointing from the more recently created, substitute copy of the center point back to the earlier-in-time one (e.g., 30W.7*p*) and indicating the creation date of the earlier-in-time one (e.g., 30W.7*p*).

The automated space updating engine 30W.37 may additionally from time to time, update the distance recalculation algorithms ("ReCalc" in FIG. 3W) of respective center points.

When each new subregion in a textual space or in another cognition space is created and initially populated, it may be manually or automatically pre-seeded with information obtained from one or more listings of expert or influential users who are strongly cross-associated with that new space or new subregion of the space. In one embodiment, various hierarchical and/or spatial dimension ranges of each Cognitions-representing Space are designated as "reserved for future expansion needs" and these are released for populating with new points, nodes or sub-subregions as the need arises. When a new subregion is opened up for homesteading by new nodes or other such data objects, a rough city plan for the new area may be defined by sparse seeding with expert-created and placed nodes and/or with expert-created and placed cognitive-sense-representing clustering center points. Consider by way of an example the creation of a new textual cognition subregion directed to the concepts of "Abe-Lincoln" (30W.0) and "The Civil War" (30W.12). At the time of creation of the new textual cognition subregion, there already may exist various bibliographic databases or the like which contain listings of renowned scholars or experts who wrote books, treatises or the like that are logically cross-associated with the given primitive textual cognitions taken alone or as more complex combinations (e.g., 374.1'). More specifically, the title of a newly released paper written by a renowned scholar might be, "Abe-Lincoln, the Civil War years" (a hypothetical example). The release of the newly published paper may alone be sufficient reason for seeding an empty and correspondingly newly released or created area of a textual cognition region (e.g., 30W.71) devoted to that paper. The releasing or creation of the new (sub)area may be automatically accompanied by a sparse seeding thereof with TexPO's like the illustrated 30W.0, 30W.12 and 30W.15. When system monitored ones of such expert or influential users directly or indirectly induce the introduction a new textual subregion or of a new textual expression (or a different expression) in a pre-existing subregion because they released a new treatise, a new talk/lecture or other form of communication, the STAN_3 system automatically searches for and seeds within the newly introduced subregion or around the newly introduced expression, additional cognition-representing nodes or clustering center points that are obvious variations of first seeds implanted into the new subregion. In other words, the STAN_3 system (or more specifically an automated space populating engine 30W.30 thereof) automatically creates one or more respective new nodes (e.g., 30W.0, 30W.12 and 30W.15 for "Abe-Lincoln, the Civil War years") in that newly spawned subregion; where the new TexPO nodes are weakly cross linked (e.g., with a pointer such as one in 30W.4 or 30W.9) to/from a corresponding, less complex node (which could be a root node of keyword space for example—not shown or a preexisting other node like 30W.13 ("How Historians See It") for example). In other words, the automated space populating engine 30W.30 keeps track of system monitored ones of expert or influential users (30W.31), and it automatically tests for novelty of expressions or other works they generate regarding a corresponding subregion of an expressible Cognitive Attention Receiving Space (e.g., keyword space), and it automatically inserts a new one or more nodes (and/or cross clustering connectors, e.g., s.0.12; d.14.15) when the generated expression or other work is determined to be novel and optionally a hot or catchy one.

The automated space populating engine 30W.30 keeps track of system monitored chat or other forum participation sessions that are strongly cross-associated with respective subregions assigned to the space populating engine 30W.30, testing for newly trending usages 30W.32 in such forums of expressions not otherwise found in the assigned subregions. When usage in a tracked one or more forums exceeds a predetermined threshold in terms of "hotness" and/or popularity, the space populating engine 30W.30 automatically adds a corresponding new node into the assigned subregion where a textual or other cognition storing section (e.g., 30W.2) of the newly added node stores a respective digital representation of the new expression. Aside from system-spawned or supported forums (e.g., system generated online chat rooms), the STAN_3 system may monitor other informational resources such as Twitter™ feeds for trending new expressions (e.g., new or hot turns of phrase; for example an actor's novel line in a new movie (i.e. 'make my day'—Clint Eastwood; 'I'll be back'—Arnold Schwarzenegger, etc.) and the respective space populating engine 30W.30 may then insert the new textual or other cognition node (e.g., 374.1') as trending developments warrant. The same can be done for trending catch phrases 30W.34 found on parts of the internet (e.g., micro-blogs, news headlines consolidating sites, movie reviews, which may not be directly driven by the STAN_3 system and in other (30W.35) such informational resources. New cognitions for which new nodes are generated and inserted into a respective subregion of a system-maintained Cognitive Attention Receiving Space need not be limited to digitally-represented-by-text cognitions (e.g., 30W.2). They can be new musical cognitions (see again FIG. 3F), new linguistic cognitions (see again FIG. 3I), new cognitions respecting user contexts (see again FIG. 3J), new cognitions respecting visual attributes (see again FIG. 3M), new cognitions respecting biological attributes (see again FIG. 3O), new cognitions respecting topic space (see again FIGS. 3Ta-3Tb), and so on.

After the automated space populating engine 30W.30 has added a new textual or other cognition representing node or subregion into a respective, system-maintained Cognitive Attention Receiving Space (CARS), the new node or subregion is tracked by an automated space update engine 30W.37 assigned to that subregion of the given CARS. The assigned automated space update engine 30W.37 is assigned with various consolidation and update tasks. An example of a consolidation task may be as follows. One chat room shows excited trending (e.g., great hotness) for a first version of a celebrity's novel expression (example: 'make my day'—Clint Eastwood) and a new node is created for that version. Then another forum (e.g., a web blog) shows excited trending (e.g., great popularity) for a second version of the same celebrity's novel expression (example: 'Go ahead, make my day'—Clint Eastwood) and a separate new node is created for that version. After a while, the automated space update engine 30W.37 assigned to that subregion of expression space automatically realizes that the two versions are actually referring to a substantially a same cognitive expression. One basis for so realizing by automated machine means is that same users are found by the automated machine means to be interchangeably referring to both. In that case the update engine 30W.37 automatically consolidates the two nodes into one or makes one the hierarchical child of the other. When making one node the parent of the other node or consolidating two nodes into one, the update engine 30W.37 may generate a wild-cards filled version of the expression that covers both versions. For example, 'Go ahead, make my day'—Clint Eastwood may be consolidated into the wild card padded expression: '*make my day*'—C* Eastwood*; where here the asterisk (*) denotes any additional or no symbol string. Thus the parent node expression covers the varied versions of the child node expressions.

Another of the assigned tasks of the automated space update engine 30W.37 is to update the rankings and optional sorted listings in the various pointer storing sections (e.g., 30W.4-30W.11) of the primitive of more complex nodes in its assigned subregion of the Cognitive Attention Receiving Space. For example, a usage that was most popular last week may suddenly drop into second or third place this week while a new usage takes over the number spot. Such change in rankings is handled by the automated space update engine 30W.37.

Referring to FIG. 5C, in one embodiment, the STAN_3 system 410 includes a chat or other forum participation sessions generating service 503' that automatically sends out invitations for, and thus tries to populate corresponding ones of chat or other online forum participation sessions with "interesting" mixtures of participants. More specifically, and referring to social entities—identifying module 551, social entities that have a same topic node and/or topic space region (TSR) being currently focused-upon (or other specified points, nodes or subregions of other specified CARS spaces being currently focused-upon) are automatically identified by module 551. The commonality isolating function of module 551 need not be limited to sameness of topic nodes and/or topic space subregions in a current time period. The commonality isolating function of module 551 can alternatively or additionally group STAN using social entities according to personhood co-compatibilities for now joining with each other in chat or other online forum participation sessions or even in real life (ReL) meeting sessions. The commonality isolating function of module 551 can alternatively or additionally group STAN using social entities according to substantial sameness of currently received CFi's and/or according to substantial sameness of currently focused-upon nodes and/or subregions in various other spaces (CARS's), including but not limited to, music space, emotion space, context space, keyword expressions space, URL expressions space, linguistics space, image space, body or biological state spaces, and chemical substance and/or mixture and/or reaction space. More specifically, if two or more people (or other social entities) are listening to substantially same music pieces at substantially same times and having similar emotional reactions to the music (as indicated by substantial similarity of identified nodes and/or subregions in emotions/behavior state space) and/or they are experiencing the substantially same music pieces in substantially similar contextual settings (as indicated by substantial similarity of nodes and/or subregions in context space) and/or those social entities are otherwise having substantially similar and sharable experiences which they may wish to then exchange notes or observations about, then the commonality isolating module 551 may automatically group them (or more specifically, their identifications) into corresponding pooling bins (504). Although FIG. 5C shows just one such pooling bin 504, in general there will be a plurality of such corresponding pooling bins 504 formed; one for each of shared points, nodes or subregions (PNOS's) in a corresponding system-maintained first cognitions representing space (e.g., topic space) where the shared PNOS's of the respective bin cross-correlate with received ones of the reporting signals (CFi's) received for respective ones of the pooled together system users.

Once the identifications (e.g., signals 551*o*2) of the identified social entities are pooled together into respective pooling areas (e.g., 504) based on one or more specified commonalities, another module 553 fetches a copy of the identifications (as signals 551*o*1) and uses the same to scan the currently active, preferences profiles (e.g., 501*p*) of those social entities where the fetched preferences profiles (501*p*) include indications of currently active preferences of the pooled persons (or other social entities) for being invited or not into different kinds of chat or other forum participation sessions. The indications may include, for example, indications of the maximum or minimum size of a chat room that they would be willing to participate in (in terms of how many other participants are invited into and join that chat room), of the level of expertise or credentials of other participants that they desire to be present or not within the forum, of the personality types of other participants whom they wish to avoid or whom they wish to join with, and so on. The fetched preferences profiles (501*p*) should include indications of social dynamic propensity attributes to be expected of the respective users if and when they are invited into and participate in a respective chat or other forum participation session directed to the topic and/or other PNOS's of a respective Cognitive Attention Receiving Space. In other words, the social dynamic propensity attributes indicate which users are likely to be room leaders or respected room participants or social-discourse facilitating members relative to the topic and/or other PNOS's of a respective CARS of the corresponding waiting pool 504. The preferences collecting module 553 forwards its results (of the aggregate desires and/or the social dynamic propensity attributes of the currently pooled (504) users) to a chat rooms spawning engine 552. The spawning engine 552 then uses the combination of the preferences collected by module 553 and the demographic data obtained for the identified social entities collected in the waiting pool 504 to predict what sizes and how many of each of now-empty, chat or other forum participation opportunities are probably needed to satisfy the wishes (preferences) of gathered identifications in the waiting pool 504.

Representations of the various types, sizes and numbers of the empty chat or other forum participation opportunities are automatically recorded into launching area 565. Each of the empty forum descriptions in launching area 565 is next to be populated with a socially "interesting" mix of co-compatible personalities (with identifications of those personas) so that a socially "interesting" interchange will likely develop when invitees (those waiting in pool 504) are accordingly invited to join into the, soon-to be launched forums (565) and when a statistically predictable subpopulation of them subsequently accept the invitations. To this end, an automated social dynamics, recipe assigning engine 555 is deployed. The recipe assigning engine 555 has access to predefined room-filling recipes 555*i*4 (a.k.a. social-mix recipes) which respectively define different mixes of personality types that usually (based on earlier collected statistical data and survey results) can be invited into a chat room or other forum participation session where that mixture of personality types will usually produce well-received results for the participants. In one embodiment, promoters (e.g., vendors) who plan to make promotional offerings later downstream in the process, get to supply some of their preferences as requested mixes or mix modification 555*i*2 into the recipe assigning/formulating engine 555. In one embodiment, a listing of the current top topics identified by module 551 (or other current top N points, nodes or subregions (PNOS's) in other Cognitive Attention Receiving Spaces) are fed into recipe assigning/formulating engine 555 as input 555*i*3 so that assigning/formulating engine 555 can pick out or formulate recipes based on those current top topics (or other PNOS's). As the recipe assigning/formulating engine 555 begins to generate corresponding room make-up recipes, it will start to detect that certain participant personality types are more desired (e.g., more in short supply) than others and it will feed this information as signal 555*o*2 to one or more bottleneck traits identifying engines 577.

The bottleneck traits identifying engines 577 compare what they have (551*o*3) in the waiting pool 504 versus what is called-for by the initially generated recipes. The bottleneck traits identifying engines 577 then responsively transmit bottleneck warning signals 557*i*2 to a next-in-the-assembly line, recipes modifying engine 557. As in the case, for example, of high production restaurant kitchen, the inventory of raw materials on hand (in 504) may not always perfectly match what an idealized recipe calls for; and the chef (or in this case, the automated recipes modifying engine 557) has to make adjustments to the recipes so that a good-enough result is produced from ingredients on hand as opposed to the ideally desired ingredients (pool of available users). In the instant case, the ingredients on hand are the entity identifications waiting in pool area 504. The automated recipes modifying engine 557 has been warned by signal 557*i*2 that certain types of social entities (e.g., potential room leaders or top influencers) are in short supply. So the recipes modifying engine 557 has to make adjustments accordingly.

The recipe assigning module 555 assigns an idealized recipe from its recipes compilation storage area 555*i*4 to the pre-sized and otherwise pre-designed empty chat rooms or empty other forums flowing out of staging area 565 to thereby produce corresponding forums 567 (rolling out on the assembly line) having idealized recipes logically attached to them. The automated recipes modifying engine 557 then looks into the ingredients pool 504 then on hand and makes adjustments to the recipes as necessary to compensate for expected bottlenecks or shortages in desired personality types. More specifically, a recipe may call for two leaders and two influencers, but these personas are in currently short supply in pool 504. So the recipes modifying engine 557 automatically trims the recipe to one of each for example. The on-assembly-line rooms 568 with correspondingly modified recipes attached to them are then output assembly line wise along a data flow storing path (delaying and buffering path) to await acceptances of corresponding invitations to these rooms by respective entities in pool 504. The invitations are sent to the pooled personas (504) by the automated recipes modifying and invitations sending engine 557.

In an alternate or supplemental embodiment, the output signal from bottleneck traits identifying engines 577 is also transmitted to the recipe assigning module 555. In response, the recipe assigning module 555 curtails its selections to those that do not overdraw on the identified scarce ingredients. In other words, even though the currently identified top N topics (**555*i*3—or top N' other PNOS's of another CARS) and/or the received vendor requests (555*i*2) point to a first subset of the stock recipes 555*i*4 as being ideal ones for the currently hot topics (or hot other 'touchings'); if the bottleneck traits identifying engines 577 indicate that the called-for personas are not present in sufficient quantities (or at all) inside the current waiting pool 504, then the recipe assigning module 555** adjusts accordingly, making do with the available people, or better yet with the people who have actually accepted the chat invitations rather than picking recipes first and then trying to produce room participant populations in accordance to the pre-picked recipes.

Next in the assembly line, an RSVP receiving engine 559 automatically receives acceptances (or not) from the invited potential participants of pool 504. Some chat rooms or other forums will receive an insufficient number of the right kinds of acceptances (e.g., a critically needed and scarce room leader does not sign up). If that happens, the RSVP receiving engine 559 automatically trashes the room (removal flow 569) and sends apologies to the invitees indicating that the party had to be canceled due to unforeseen circumstances. On the other hand, with regard to rooms for which a sufficient number of the right kinds of acceptances (e.g., critically needed room leaders and/or rebels and/or social butterflies and/or Tipping Point Persons) are received so as to allow the intent of the room recipe to substantially work as intended, those rooms (or other forums) 570 continue flowing down the assembly buffer line (memory system that functions as if it were a conveyor belt) for processing next by engine 561. At the same time, a feedback signal, FB4 is output from the RSVP's receiving engine 559 and transmitted to a recipes perfecting engine (not shown) that is operatively coupled to the holding area of the social-mix recipes **555*i*4. The FB4 feedback signal (e.g., percentage of acceptances and/or types of acceptances) are used by the recipes perfecting engine (of holding module 555*i*4) to tweak the existing recipes so they better conform to actual results (what is observed in the field) as opposed to theoretical predictions of results (e.g., which room recipes are most successful in getting the right kinds and numbers of positive RSVP's). The recipes perfecting engine (which tweaks one or more recipes in holding module 555*i*4) receives yet other feedback signals (e.g., FB3, 575*o*3**-described below) which it can use alone or in combination with FB4 for tweaking the existing recipes and thus improving them based on obtained in-field data (on FB4, etc.).

Engine 561 is referred to as the demographics reporting and new social dynamics predicting engine. It collects the demographics data of the social entities (e.g., people) who actually accepted the invitations and forwards the same to auctioning engine 562. It also predicts the new social dynamics that are expected to occur within the chat room (or other forum) based on who actually joined as opposed who was earlier expected to join (expected by upstream engine 557).

The auctioning engine 562 is referred to as a post-RSVP auctioning engine 562 because it tries to auction off (or sell off) populated rooms to potential promotion offerors (vendors) **560*p* based on who actually joined the room and on what social dynamics are predicted to occur within the room by predicting engine 561. By auctioning off (or selling off), it is meant here that the winning/buying promotion offeror(s) will correspondingly receive a chance to post a promotional offering (e.g., discounted pizza) to participants of the corresponding chat or other forum participation session. Naturally, chat or other forum participation sessions that have influential Tipping Point Persons or the like joined in to them and/or are predicted to have very entertaining or otherwise "interesting" social dynamics taking place in them, can be put up for auction or sale at minimum bid amounts that are higher than chat rooms or the like that are expected to be less "interesting". The potential promotion offerors (vendors) 560*p* transmit their bids or sale acceptances to engine 562 after having received the demographics and/or social dynamics predicting reports from engine 562. Identifications of the auction winners or accepting buyers (from among buying/bidding population 560*p*) are transmitted to access awarding engine 563**.

As an alternative to bidding or buying exclusive or non-exclusive access rights to post-RSVP forums that have already begun to have active participation therein, the potential promotion offerors (vendors) **560*p* may instead interact with a pre-RSVP's engine 560 that allows them to buy exclusive or non-exclusive access rights for making promotional offerings to spawned rooms even before the RSVP's are accepted. In one embodiment, the system 410 establishes fixed prices for such pre-RSVP purchases of rights. Since the potential promotion offerors (vendors) 560*p* take a bigger risk in the case where RSVP's are not yet received (e.g., because the room might get trashed 569**), the pre-RSVP purchase prices are typically lower than the minimum bid prices established for post-RSVP rooms.

In one embodiment, influential Tipping Point Personas (e.g., **501*a*) present within the waiting pool 504 are identified before the auctioning off of promotional access takes place (in engine 562). Special preliminary invitations are sent to these identified TPP personas. The special preliminary invitations indicate to the targeted Tipping point people that, if they join, and the afterwards joining participants are happy with the chat (as indicated by fedback CVi data), then the early-wise committing TPP will be rewarded, for example with discount coupons offered by a corresponding promotion offeror (vendor) 560*p*. This mechanism can encourage certain people to establish themselves as happy-room-makers or as other forms of system-recognized, influential people (e.g., Tipping Point Persons) since they typically know they have personalities for making other people happy (as will be objectively reported by automatically collected CVi signals) and thus they are likely to win the promised rewards if they perform as expected of them. The result is a win-win for all involved because the other chat or forum participants perceive a more enjoyable chat or other forum participation experience thanks to the extra energies exerted by the happy-room-makers (the system-recognized, influential people (e.g., Tipping Point Persons)) to make the sessions enjoyable ones. The enjoyment factor induces pleased participants to return again for more such sessions. The enjoyment factor also induces the pleased participants to associate the promotional offerings of the winning promotion offeror (vendor) 564** with goodwill feelings which can lead to increased sales. Over time, as positive influence casting results are collected via fedback CVi signals obtained from the other forum participants, the STAN_3 system can automatically rank and thus determine who among the happy-room-makers are best at performing their task (of making the in-room experience more enjoyable for the other participants) for different categories of topics or other such classes of chat rooms; and the rewards offered to these identified TPP personas may be increased accordingly.

In one embodiment, the auction winners 564 can first test-pitch their promotional offerings to one or a few in-room representatives (e.g., the room discussion leader) in private before attempting to pitch the same to the general population of the chat room or other forum. Feedback (FB1) from the test run of the pitch (564*a*) on the room representative (e.g., leader) is sent to the access-rights owning promoters (564). They can use the feedback signals (FB1) to determine whether or not to pitch the same promotional presentation to the room's general population (with risk of losing goodwill if the pitch is poorly received) and/or to determine when to pitch the same to the room's general population and/or to determine whether modifying tweaks are to be made to the pitch before it is broadcast (564*b*) to the room's general population. It is to be noted that as time progresses while the instantiated forum advances on the room assembly-and-conveying line, various room participants may drop out and/or new ones may join the room. Thus the makeup and social dynamics of the room at a time period represented by 574 (when the pitch is made or thereafter) may not be the same as at a time period represented by test run 573.

In one embodiment, a further engine 575 (referred to here as the ongoing social dynamics and demographics following and reporting engine) periodically checks in on the in-process chat rooms (or other forums) 571, 573, 574 and it generates various feedback signals that can be used elsewhere in the system for improving system reliability and performance. One such feedback signal (FB2, a.k.a. signal 575*o*2) indicates the way that participants actually behave in the rooms as opposed to what was expected of them, for example based on their currently activated profiles. These actual behavior reports are transmitted to another engine (not shown) which compares the actual behavior reports 575*o*2 against the traits and habits recorded in the respective user's currently activate profiles 501*p* (See also PHAFUEL log 501' of FIG. 5A.) The profiles versus actual behavior comparing engine (not shown, associated with signals 575*o*2) either reports variances as between actual behavior and profile-predicted behavior or automatically tweaks the profiles 501*p* of the respective users to better reflect the observed actual behavior patterns under corresponding contextual background. Another feedback signal (FB3) sent back from engine 575 to the variance reporting/correcting engine (not shown) is one relating to the verification of the alleged street credentials of certain Tipping Point Persons or the like. These credential verification signals are derived from votes (e.g., CVi's) cast by in-room participants other than the persons whose credentials are being verified. Another feedback signal (575*o*3) sent back from engine 575 goes to the recipes tweaking engine (not shown) associated with holding area 555*i*4. These downstream feedback signals (575*o*3) indicate how the spawned room performs later downstream, long after it has been launched but before it fades out (576) for example due to loss of participants and/or interest. The downstream feedback signals (575*o*3) may be used to improve recipes for longevity as opposed to good performance merely soon after launch (570) of the rooms (of the TCONEs).

The statistics developed by the ongoing social dynamics and demographics following and reporting engine 575 may be used to signal (564) the best timings for pitching promotional offerings to respective rooms. By properly timing when a promotional offering is made and to whom, the promotional offering can be caused to be more often welcomed than not by those who receive it (e.g., "Pizza: Big Neighborhood Discount Offer, While it lasts, First 10 Households, Press here for more"). In one embodiment, the ongoing social dynamics and demographics following and reporting engine 575 is operatively coupled to receive context state reports generated by the context space mapping mechanism (316" of FIG. 3D) for indicating the most appropriate generalized context node(s) for each of potential recipients of promotional offerings. Accordingly, the engine 575 can better predict when is the best timing 564*c* to pitch the offering based on latest reports about the user's contextual state (and/or other mapped states, e.g., physiological/emotional/habitual states=hungry and in mood for pizza).

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

In terms of some of the novel concepts that are presented herein, the following recaps are provided:

Per FIG. 1A, an automated and machine-implemented mechanism is provided for allowing the inviting together of, or the automatic bringing together of, people or groups of people based on machine automated determinations of more likely cognitions within those users' minds, for example based on uncovering what topics (or other points, nodes or subregions (PNOS's) of other Cognitive Attention Receiving Spaces) are currently most likely relevant to them and by presenting them with appropriately categorized invites; where the determination of currently relevant topics and/or other PNOS's, the determination of currently appropriate times and places to present the invites and/or hold the gatherings are based on one or more of: automatically determining user location and/or other context by means of embedded GPS sensors or the like, automatically determining proximity with other people and/or proximity of their computers, and/or wireless communicating devices automatically determining what virtually or physically proximate people are allowing broadcast of their Top 5 Now Topics to others where at least one matches with that of a potential invitee. In such a machine-implemented and automation driven bringing together of co-compatible people (or driven directing of people to on-topic events), the current levels of attention giving energies and their focus upon corresponding topic nodes or subregions (or focus upon corresponding other PNOS's of other CARSs) is detected by means of received CFi signals, and/or heats of CFi's, and/or keyword usages, and/or hyperlink usages, and/or perused online material, and/or environmental clues (odors, pictures, physiological responses, music, etc.) that can indicate user context.

Also per FIG. 1A, an automated and machine-implemented mechanism is provided for allowing the inviting together or the automatic bringing together of people or groups of people based on currently determined attention giving activities where the latter can include automatically detected choices or actions made by the users or based on currently determined other indicators that can be implied from their choices or actions and/or interactions as combined with currently activated profiles.

In one embodiment, each STAN user can designate a top 5 topics of that user as broadcast-able topic identifications. The identifications are broadcast on a peer to peer basis and/or by way of a central server. As a result, if a first user is in proximity of other people who have one or more of their broadcast-able topic identifications matching at least one of the first user's broadcast-able topic identifications, then the system automatically alerts the respective users of this condition. In one embodiment, the system allows the matched and proximate persons to identify themselves to the others by, for example, showing the others via wireless communication a recent picture of themselves and/or their relative locations to one another (which resolution of location can be tuned by the respective users). This feature allows users who are in a crowded room to find other users who currently have same focus in topic space and/or other spaces supported by the STAN_3 system 410. Current focus is to be distinguished from reported "general interest" in a given topic. Just because someone has general interest, that does not mean they are currently focused-upon that topics and/or on specific nodes and/or subregions in other spaces maintained by the STAN_3 system 410. More specifically, just because a first user is a fisherman by profession, and thus it's a key general interest of his when considered over long periods of time, in a given moment and given context, it might not be one of his Top 5 Now Topics of focus and therefore the fisherman may not then be in a mood or disposition to want to engage in online or in person exchanges regarding the fishing profession at that moment and/or in that context. It is to be understood that the present disclosure arbitrarily calls it the top 5 now, but in reality it could instead be the top 3 or the top 7. The number N in the designation of top N Now (or then) topics may be a flexible one that varies based on context and most recent CFi's having substantial heat attached to them. In one embodiment, the broadcastable top 5 topic focuses can be put in a status message transmitted via the user's instant messenger program, and/or it can be posted on the user's Facebook™ or other alike platform profile.

In one embodiment, the system 410 supports automated scanning of NearFiledCodes and/or 2D barcodes as part of up or in-loaded CFi's where the automatically scanned codes demonstrate that the user is in range of corresponding merchandise or the like and thus "can" scan the 2d barcode, or any other object-identifying code (2d optical or not) that will show he or she is proximate to and thus probably focused on an object or environment in which the barcode or other scannable information is available.

In one embodiment, the system 410 automatically provides offers and notifications of events occurring now or soon which are triggered by socio-topical acts and/or proximity to corresponding locations.

In one embodiment, the system 410 automatically provides various Hot topic indicators, such as, but not limited to, showing each user's favorite groups of hot topics, showing personal group hot topics. In one embodiment, each user can give the system permission to automatically update the person's broadcastable or shareable hot topics whenever a new hot topic is detected as belonging to the user's current top 5. In one embodiment, the user needs to give permission to show, how long he will share this interest in the new hot topic (e.g., if more or less than the life of the CFi detections period), and/or the user needs to give permission with regard to who the broadcastable information will be broadcast or multi-cast or uni-cast to (e.g., individual person(s), group(s), or all persons or no persons (i.e. hide it)). If a given hot topic falls off the user's top 5 hot topic broadcastables list, it won't show in permitted broadcast. In one embodiment, an expansion tool (e.g., starburst+) is provided under each hot topic graphing bar and the user can click, tap or otherwise activate it to see the corresponding broadcast settings.

In one embodiment, the system 410 automatically provides for showing intersections of heat interests, and thus provides a quick way of finding out which groups have same CFi's, or which CFi's they have in common.

In one embodiment, the system 410 automatically provides for showing topic heat trending data, where the user can go back in time, and see how top hot topics heats trended or changed over given time frames.

In one embodiment, the system 410 automatically provides for use of a single thumb's up icon as an indicator of how the corresponding others in a chat or other forum participation session are looking at the user of the computer 100. If the perception of the others is neutral or good, the thumb icon points up, if its negative, the thumb icon points down and optionally it reciprocates up and down in that configuration show more negative valuation. Similarly, positive valuation by the group can be indicated with a reciprocating thumb's up configuration. So if a given user is not deemed to be rocking the boat (so to speak), then the system shows him a thumb's up icon. On the other hand, if the user is generating a negative raucous in the forum then the thumb points down. The thumb icon doesn't have to operate on a binary up or down basis. Instead, in one embodiment, it acts like a dial on a metered background scale, where if it's up 90 degrees it's good, down its bad, and in the middle it's a varying degree of good or bad or neutral.

In one embodiment, the system 410 automatically scans a local geographic area of predetermined scope surrounding a first user and automatically designates STAN users within that local geographic area as a relevant group of users for the first user. Then the system can display to the first user the top N now topics and/or the top N now other nodes and/or subregions of other spaces of the so designated group, thereby allowing the first user to see what is "hot" in his/her immediate surroundings. The system can also identify within that designated group, people in the immediate surroundings that have similar recent CFi's to the first user's top 5 CFi's and/or compatible personhood compatibility profiles. The geographic clusterings shown in FIG. 4E can be used for such purposes.

Figure 4E:
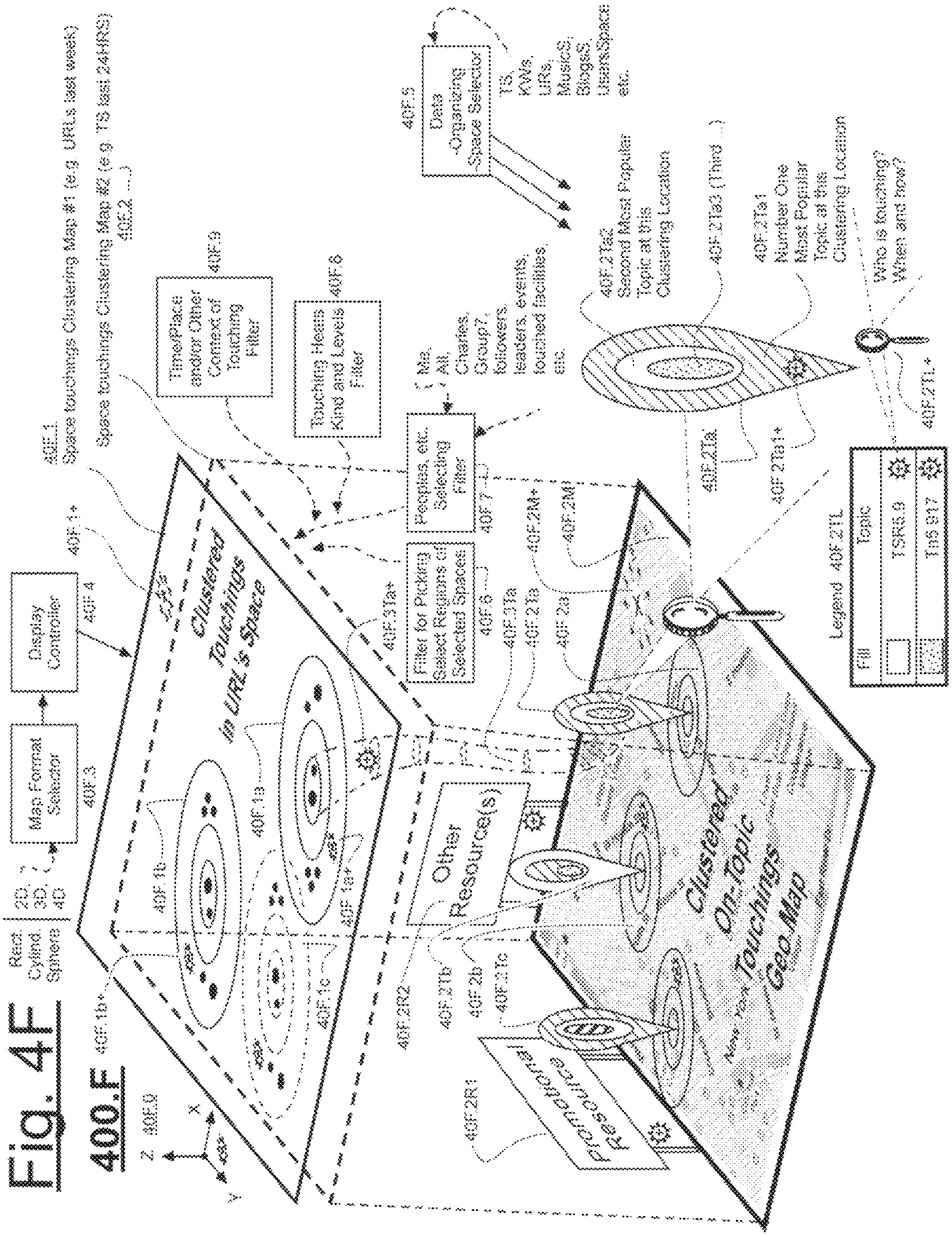
FIG. 4E illustrates how spatial clusterings of points, nodes or subregions in a given Cognitive Attention Receiving Space (CARS) may be displayed and how significant 'touchings' by identified (e.g., demographically filtered) social entities in corresponding 2D or higher dimensioned maps of data organizing spaces (e.g., topic space) can also be identified and displayed.

Referring to FIG. 4E, in one embodiment 400.E, a spatial and/or hierarchical clusterings map 40E.1 for a selected one or more subregions of topic space (or of another CARS, including hybrid ones of such CARS) is displayed on a user display device (e.g., tablet computer) where the selected subregion(s) may be cross-correlated with, for example, a user-defined geographic area (in real life (ReL) or in virtual life) and/or a user-defined demographic sector (e.g., age/occupation; also optionally in virtual life rather than ReL) and/or other user defined or specified subregion specifications, where an icon representing recent 'touchings' by the user (a.k.a. first user, e.g., 431') to whom the clusterings map is displayed may optionally be shown located somewhere on that map and his/her recent 'touching' positions may be displayed relative to significant 'touchings' made by other people (e.g., a selected subset of other people) in that spatial clusterings map 40E.1, Therefore, the user (a.k.a. first user, e.g., 431') may easily see how his 'touchings' in his selected one or more subregions (see divider line 40E.1X, discussed below) of topic space relates to recent 'touchings' (e.g., above threshold 'touchings') by other users in those selected subregions. In one embodiment, the displayed spatial clusterings map 40E.1 may also indicate relative distances within the selected spatial subregion(s) as between the 'touchings' of the first user and clusters of significant (above threshold) and recent 'touchings' made by the other people. In the same or another embodiment, the displayed spatial clusterings map 40E.1 may indicate significant (above threshold) and recent 'touchings' made by non-personal "events" within the selected subregion(s) of topic space. Those non-personal "events" may include organizational announcements, for example that an on-topic conference or lecture will be held at a geographically nearby conference hall where the topic nodes or subregions 'touched' (or to be 'touched') by the conference are relatively close within the displayed topic subregion (e.g., one relating to a specific geographic area and/or a specific demographic class of people) to the 'touchings' made by the first user (e.g., 431'). In this way the first user (e.g., 431') can see which significant 'touchings' by other people and/or by non-person "events" are close to his in the displayed spatial clusterings map 40E.1.

In one embodiment, the map presenting system 400.E automatically indicates which persons or groups in the selected geographic/demographic specific subregion(s) (40E.6*i*—to be explained shortly—being one of them) of topic space whose clustered 'touchings' are displayed have shared a Top 5 Now Topics with the first user and moreover, if they have co-compatible personhood attributes. If such other users are present, the system may then automatically put up a suggestive invite (e.g., an invitation icon) for the first user to join with the others if the others have current "availability" for such suggested joinder. In other words, rather than starting with a predefined one user or group of users and asking what are these pre-identified social entities focusing-upon (as was disclosed for example by pyramid 101*rb* of FIG. 1A), the clustered 'touchings' map 40E.1 of FIG. 4E may start with a set of pre-specified subregions (e.g., 40E.6*i*—only one shown) in topic space and first ask what are the top N topics being focused-upon (being significantly 'touched' in each of the selected areas (e.g., 40E.6*i*). Then it may ask as a follow-up question, which social entities are performing the displayed significant 'touchings' in the displayed subregion(s) are also social entities who share a top N topics with the first user? The map presenting system 400.E may also be configured to automatically ask and answer the question regarding which of these shared top N topics are receiving the most attention? The system may also display in the displayed 'touchings' map 40E.1 (or elsewhere) an availability score for each of the displayed nearby other users who are focusing-upon the identified top N topics of the selected topic subregion, e.g., 40E.6*i* (where N can be 1, 2, 3, . . . etc. here).

As mentioned, the number of displayed subregions can be more than one. Plane 40E.1 can be composed of a collage of selected subregions. Dividing line 40E.1'3 for example, may represent a collage or puzzle-pieces amalgamation line where a first cluster of significant 'touchings' 40E.1*a* from a first selected subregion (e.g., 40E.6*i*) is joined in displayed plane 40E.1 with a second cluster of significant 'touchings' 40E.1*b* taken from a different second selected subregion (not shown) of topic space mapping mechanism 413'. The number of stitched together subregions can be more than two. The user is given access to a subregions selecting tool with which the user can specify the one or more subregions of a selected space that are to be displayed in plane 40E.1 and how they should be organized in that displayed i40E.1.

As a more specific example, let's say the first user has a top-5-now topics set and a first selected topic subregion (e.g., 40E.6*i*) contains topic nodes corresponding to his top-5-now topics. Also say that the first user is publicly broadcasting a definition of this set as being his top 5. Let's say the co-compatible other users (whose currently significant 'touchings' are taking place in the same topic subregion, e.g., 40E.6*i*) cannot now meet physically (in real life (ReL) or meet as avatars in virtual life if the latter is in effect), but they can remotely chat with the first user; perhaps only by means of a short (e.g., 5 minute) chat. In that case, the availability score will indicate the limited way in which the other users are each available for the first user. In other words, there are different types of availabilities that can be indicated on a spectrum extending from real life (ReL) meeting availability for long chats to only virtual availability for short chats and perhaps only in a virtual life context. A significant 'touchings' clustering map such as 40E.1 can indicate all this. More specifically, if the first user used tool 40E.6 (explained shortly) to choose his selected topic subregions (e.g., 40E.6*i*) wisely, the displayed other users (or more specifically those whose significant 'touchings' are being displayed) will inherently be a in geographic area that the first user is also in and/or the other users will inherently belong to a demographic subgroup in which the first user is interested. As a result, even though the first user does not know the identities of these other users beforehand, the first user can find them (provided they are allowing themselves to be found) by virtue of the others having significant 'touchings' within the selected topic subregions (e.g., 40E.6*i*) that the first user has asked the system (400.E) to display to him.

The displayed clusterings map 40E.1 (which in this example displays clusterings of now-on-topic-touchings by other personas within at least topic subregion 40E.6*i*; but in other here-contemplated versions may display clusterings relative to a defined other subregions or more in a defined other spatial space, e.g., URL's space—see FIG. 4F) can be modified by user operation of various display control tools: 40E.5-40E.9 to reveal many different kinds of clusterings. The format of the displayed clustering map need not be a plane (40E.1) in a 3-dimensional spatial space 40E.0 as shown in the example of FIG. 4E. Instead the format could be one mimicking a cylindrical topic space branch (see 30R.10 of FIG. 3R) or the spatial geometry (e.g., conical) of yet another subregion of topic space or of other subregions of other Cognitive Attention Receiving Spaces (see for example FIG. 3E). More generally, the displayed clusterings do not have to be those of touchings of specified people; or only topic-space touchings by people and/or in real life (ReL) 'touchings', and may alternatively or additionally be displayed clusterings of event-based 'touchings' (e.g., on-topic event announcements, tweets etc.) and/or displayed clusterings of other CARS-related and available resources (e.g., university laboratory facilities that logically cross-correlate with a respective subregion of a respective Cognitive Attention Receiving Space (CARS) that is being selected (alone or with selected others) as a mapping source. A bottom right corner portion of FIG. 4E is intended to indicate that the reported clusterings of 'touchings' can identify the users who did the 'touching' and/or can identify the forums in which they performed the touch and/or identify the points, nodes or subregions in respective Cognitive Attention Receiving Spaces (CARS's) that were 'touched', where 'touchings' can have respective locations and times in real life (ReL) and/or virtual life and the touched PNOS's can be those of textual types of CARS's (e.g., keywords, URL's, meta-tags, etc.) and/or of nontextual types of CARS's (e.g., visuals, audibles, emotional or other feelings, biological or other states of the users and so on). Stated otherwise, mapped clusterings do not have to start with a specific identification of clustered personas (e.g., a pre-specified "group" of uniquely identified users—see again My Family 101*b* of FIG. 1A) and then proceed to identifying what subregions of topic space (and/or of another space) they are focusing-upon. Instead a clusterings mapping (e.g., 40E.1) can be automatically generated by starting with a pre-specified one or more geographic areas in a geography space and/or with a pre-specified one or more areas (subregions) in other kinds of spaces (e.g., topic space, keyword space, URL space, social dynamics space and so on) and by thereafter asking open ended or criteria limited questions as to which geographic and/or other areas are receiving the hottest amounts of attention and as directed to what in the respective area; where here hotness can mean most number of people giving attention and/or a geographic and/or other area receiving the most emotionally charged of attention giving energies and if, so; what other spaces and subregions (e.g., topic space subregions) thereof are these hottest amounts of attention being directed to?

The layout of the displayed first clusterings map 40E.1 can be varied to suit user preferences. More specifically, the system provides a user-operable, map format selector module 40E.3 that determines a format for a corresponding, virtual reference frame 40E.0 according to which the clusterings map 40E.1 will be displayed. As indicated in a non-limited way, user selectable input parameters for the map format selector module 40E.3 may designate a 3-dimensional format or a 2D format or a 4D format (e.g., animated or color coded) or even a higher dimensionality and also a reference frame geometry such as rectangular, cylindrical, spherical and so on. The quantitative parameters of the axes of the chosen reference frame 40E.0 may vary and may include one or more members of the set comprising: time, location, trending rate or trending acceleration, distance within a cognition space subregion from main-stream cognitions (see radius $R_{TsBr}$ of FIG. 3R for example) and so on. In the illustrated example of overlaid 3D planes 40E.1/40E.2, the user has chosen a rectangular reference frame 40E.0 whose Z-axis represents time. The upper displayed layer or plane 40E.1 shows clusterings (e.g., of significant touchings) during a first pre-specified time duration (e.g., within the last 30 days) while the lower displayed layer or plane 40E.2 shows clusterings during a second pre-specified time duration (e.g., within the previous 335 days). One or both of overlaid maps 40E.1 and 40E.2 may be translucent so that clusterings of both can be seen simultaneously. In this way, the user not only sees how the clustered items (e.g., touchings) are distributed in the selected XY plane over the most recent month (or day or other such first time period), but also how such clusterings were distributed over an earlier time period (40E.2). In one example the illustrated X and Y coordinates can represent latitude and longitude of a real life (ReL) geographic map. In a second example they can be latitude and longitude of a virtual life world. In a third example they can correspond to the X and Y coordinates (or other coordinates, e.g., cylindrical) of a selected subregion 413*xyz* of topic space or of a subregion of another Cognitive Attention Receiving Space (e.g., URL's space). The map format selector module 40E.3 drives a display controller module 40E.4, where the latter is configured to match with display capabilities of the display device (e.g., smartphone) then being used by the respective system user (e.g., 431'). It is within the contemplation of the disclosure that clusterings information can be presented to a system user alternatively or additionally in audible form; particularly if the user is sight impaired or cannot at the time safely view his/her screen (e.g., because they are driving a vehicle). The audibly relayed clusterings information may be of a narrower type than the visually relayed information. For example, the audibly relayed clusterings information may indicate, "The following top 3 most promising contacts are clustered within 1 mile of you and all are now focusing-upon the following two of your Top 5 Now Topics: users B, C and D for topics 2 and 3; do you want to make contact with any of them?". A yes answer will then be followed by further audio menu choices and the contact that is established may, in some cases, be an audio only communicative session because at least the first user has been predetermined to not be able to then use or safely use visually-based communicative modes.

Still referring to FIG. 4E, another module 40E.5 used in generating the displayed map or overlaid maps (e.g., 40E.1, 40E.2; or optionally the automatically audibly described map) is a data-objects organizing spaces selector module 40E.5. In the illustrated example, the organizing spaces selector module 40E.5 is selecting topic space (413') and user-to-user spaces (U2U 411') as two primary input source spaces for generating the map(s) 40E.1 (and optionally the underlain 40E.2 plane). Therefore, a first data source pointer 40E.5*a* of selector module 40E.5 points to the system-maintained topic space and a second data source pointer 40E.5*b* points to the system-maintained users space. However, in other variations, the first source pointer 40E.5*a* could have instead pointed to another Cognitive Attention Receiving Space (CARS) such as, but not limited to, a real life (ReL) geography space, a real life (ReL) hybrid geography and chronology space, the system-maintained keywords space, URL's space, ERL's spaces, a music space, a microblogs space (e.g., tweets), a hybrid space (e.g., context-plus-another), a social dynamics space, and so on; where points, nodes or subregions in any such CARS can be receiving significant 'touchings' (e.g., hot emotional 'touchings') from users and/or user groups and where clusterings of such significant 'touchings' can be occurring in one or more specific subregions (e.g., 40E.6*i*) of the selected CARS while being optionally directed to subregions of other CARS (e.g., of topic space).

As further shown in FIG. 4E, yet another module, namely, a first subregions filtering module 40E.6 is configured (e.g., by user selectable options) to identify one or more subregions (e.g., 40E.6*i*) of the space pointed to by the first source data pointer 40E.5*a* (topic space) as regions to be investigated for presence of clustered significant 'touchings'. The first subregions filtering module 40E.6 may also control where in displayed map 40E.1 the results of different subregions are to be placed. For example, the first subregions filtering module 40E.6 may be used to draw collage joinder lines like 40E.1X, where in the final version of the displayed clustering map 40E.1, collage forming lines like 40E.1X are rendered invisible.

As yet further shown in FIG. 4E, another module, namely, a second subregions filtering module 40E.7 is configured (e.g., by user selectable options) to identify one or more subregions (e.g., 40E.7*i*) of the space pointed to by the second source data pointer 40E.5*b* (e.g., pointing to users space) as regions to be selectively used when generating the map that reports (e.g., displays) clusterings of significant user 'touchings'. The second subregions filtering module 40E.7 may be pre-configured to include and/or exclude various kinds of entities in the system-maintained users space such as specifically identified individual users, specifically identified groups of users, users who satisfy a predefined search criteria (e.g., geographically nearby users who have top-N-now-topics sets strongly cross-correlating with the first user's top-N-now-topics set and are chat-wise co-compatible with the first user).

Referring to both of FIGS. 4E and 3K, in one embodiment, the STAN_3 system automatically generates so-called, entity focus defining objects (EFDO's) 30K.0 for respective ones of social entities monitored by the system. The so-monitored social entities may include individual users and/or predefined groups of such users. Each individual user may have plural "personas" associated with him/her, where each such persona (e.g., Tom, Tommy, Thomas) is assigned a unique user identification (social entity ID) and the latter is recorded as, or pointed to by data stored in a first section 30K.1*a* of the illustrated EFDO data structure 30K.0. Each monitored group similarly is assigned a unique entity ID. Accordingly, the EFDO data structure 30K.0 can be ubiquitously used for defining respective focusing-upon activities of individual users and/or predefined groups. A second section 30K.1*b* of the EFDO data structure stores code uniquely identifying the corresponding entity focus defining object. A given social entity (identified by 30K.1*a*) may have many entity focus defining objects (EFDO's) generated for that entity at different times and stored in system memory for later recall and re-use. By providing at least the unique EFDO identifying code 30K.1*b* (and optionally also the unique user identifying code 30K.1*a*) a specific one EFDO may be called out. Although not shown, in one embodiment, the EFDO data structure 30K.0 may include addition fields indicating when (in what time range) and/or where (in what geographic sector) and/or with what emotional intensity ("heat") and/or under what context the associated user performed the corresponding focusing activity.

A further section 30K.2 of the EFDO data structure stores code identifying a type of focusing activity being defined by the respective EFDO data structure 30K.0. As illustrated in example block 30K.2*a*, the respective EFDO may be defining a set of top-N-now topics being focused-upon by the identified social entity (30K.1) where the latter is provided by a sorted list of N pointers (e.g., 30K.4*a*) in section 30K.4 that respectively point to respectively ranked topic nodes or topic subregions of the system's topic space. So if the code in the second section 30K.2 specifies the EFDO of the respective social entity (30K.1) as being directed to the top N topics now being focused-upon (or focused-upon in a previous time period), then section 30K.4 will include a sorted listing of pointers pointing to the corresponding nodes or subregions of topic space.

On the other hand, if the code in section 30K.2 specifies the EFDO of the respective social entity (30K.1) as being directed to a "diversified" top N now topics, the corresponding and pre-sorted pointers of the section 30K.4 will point to a ranked set of such "diversified" topic nodes or subregions. In one embodiment, it is permissive to have complex combinations of focus sets; indicating for example that the respective social entity is simultaneously focusing-upon a top K keywords AND a top N topics; or an undiversified Top 5 Now Topics plus a diversified next 3 topics, and so on. Accordingly, the illustrated EFDO data structure 30K.0 includes pointer storing sections like 30K.4-30K.7 for respectively each storing one or more sets of pre-sorted (and/or pre-ranked) pointers pointing to respectively pre-ranked ones of points, nodes or subregions in respective Cognitive Attention Receiving Spaces (CARS) that satisfy a corresponding subset definition (e.g., "diversified" topic nodes).

One of the sections, 30K.5 included in the EFDO data structure 30K.0 identifies the most probable current context of the respective social entity by pointing to (30K.5*a*) corresponding points, nodes or subregions (XSR) in the system-maintained context space. As with other examples provided herein, the system does not know for sure that the pointed to PNOS's are indeed the top ones currently receiving cognitive attention from the respective user of group of users and the exact order of attention giving energies directed to each. These are just best guess modelings of what probably is going on inside the users' minds based on collected CFi's telemetry and the clustering and categorizing of such telemetry in accordance with, for example, the process described herein for FIG. 3U. Hence the illustrated EFDO data structure 30K.0 is to be understood as indicating the "probable" mindset of the identified social entity based on collected telemetry. The system cannot know for sure what is inside the respective users' heads.

Another of the sections, 30K.6 included in the EFDO data structure 30K.0 identifies (30K.6*a*) the most probable current hybrids of context-plus-topic nodes then determined by the system to be most likely receiving attention giving energies from the identified social entity.

Although the descriptions above focused-upon the "current" time period, yet another section 30K.3 of the illustrated EFDO data structure 30K.0 identifies the covered time period for the entity focus defining object (EFDO) and the corresponding physical context associated with the EFDO and/or other filtering attributes (e.g., real life (ReL) geographic location, temperature, humidity, wind velocity, biological status, etc.) associated with the EFDO. Accordingly, a plurality of different EFDO's (30K.0, 30K.0') may be generated and stored by the system where the different EFDO's cover respective different time periods and/or different user contexts and/or different focus type (30K.2) and/or different user personas (30K.1) or different user groups, and so on. The generated and stored entity focus defining objects (EFDO's) may then be accessed by the map generating modules (e.g., 40E.7, 40E.6) of FIG. 4E for determining which focusings and/or significant 'touchings' of a filtered subset of users or groups are clustered where, geographically, temporally or in other terms.

Referring yet a bit more to FIG. 3K, in one embodiment the STAN_3 system comprises one or more entity focus defining objects (EFDO's) generating modules 30K.10. These may be tasked to run in the background as system data processing bandwidth permits and to follow monitored ones of individual users and to automatically generate "primitive" EFDO's for these users; such as for example, primitive EFDO's for all contexts, for a most recent time period and for just the top N topics of that user, or for just the top K keywords, the top L URL's and so on (where N, K and L are integers here representing an expected maximum value of 'tops' for each category). After the primitives have been generated, the EFDO's generating module(s) 30K.10 can use these as recursive inputs 30K.11 for generating more complex EFDO's 30K.12; for example those identifying concurrent focus-upon both of a top L URL's and a top K keywords and/or those with limited contexts (30K.3) such as being 'at work', 'at home', and so on. The first rounds of complex and generated EFDO's may then serve as inputs 30K.11 for generating yet more complex EFDO's 30K.12 and so on. In one embodiment, the system includes further modules (not shown) for predicting which types (30K.2) of focuses will be most in demand by the user population for the purpose of generating clustering maps (e.g., 40E.1, 40E.2 of FIG. 4E) and/or for other purposes. These prediction signals are fed to the EFDO's generating modules 30K.10 for prioritizing the background tasks of the latter modules 30K.10 (e.g., which types of to-be-generated EFDO's take precedence over other types).

Returning to FIG. 4E, the EDFO's of FIG. 3K are one way in which clusterings of significant 'touchings' can be identified and mapped. Additionally, or alternatively, the topic node primitives 30T.0 of FIGS. 3Ta-3Tb may be used (more specifically, at least sections 30T.6 and 30T.12 thereof) for determining which users, user groups and/or forums are currently focusing-upon various nodes or subregions in topic space and to what degree. Individualized and recently updated user profiles (not shown in 4E, see instead FIGS. 5A-5B as examples) may also be used for determining which users, user groups and so on are currently focusing-upon various points, nodes or subregions in respective ones of different Cognitive Attention Receiving Spaces (CARS's) and to what extent. Aside from identifying individualized users and user groups who are casting significant 'touchings' on different subregions of topic space, the clusterings mapping subsystem 400.E of FIG. 4E may automatically identify which real life (ReL) gathering events or the like are receiving significant 'touchings' from corresponding system users and where those events are clustered geographically or within a subregion of topic space or of another CARS. Additionally, the clusterings mapping subsystem 400.E of FIG. 4E may automatically identify which real life (ReL) or virtual life facilities (e.g., university lecture halls, laboratories, informational resource repositories, etc.) are receiving significant 'touchings' from corresponding system users and where those other resources are clustered geographically or within a subregion of topic space or of another CARS.

Aside from filtering on the basis of user types (e.g., 40E.7*i*) and/or subregions (e.g., 40E.6*i*) of the CARS (e.g., topic space) under consideration, the clusterings mapping subsystem 400.E of FIG. 4E may automatically filter according to different kinds of 'touching' heats and/or degrees of the same (e.g., those above or below a predefined threshold value) as is indicated by module 40E.8 and according to different kinds of time or place and/or other context criteria as is indicated by module 40E.9. Additionally; and as inherently indicated by the above mention of trending velocities or accelerations, the clustering mappings provided by the clusterings mapping subsystem 400.E of FIG. 4E may automatically filter according to different rates of trendings so that system users who use the clustering mappings may easily perceive which subregions of a topic space region they are focused-upon are experiencing the fastest growth rates in significant 'touchings' from all or a predefined subset (40E.7*i*) of users and under the conditions of all or a predefined subset (40E.9) of contexts. In one embodiment, trending velocities may be indicated by use of color codings and/or directional vector lines (e.g., red for hottest growth spots, blue for cooling off regions) in the generated clusterings maps while current clustering dispositions are indicated by black dots or other such means and relative distance from a center of gravity for weighted ones of the points (e.g., black dots) are indicated by concentric circles. With this kind of information, the user may quickly see where the center of action is or which central area the 'touchings' actions are heading to (if red hot) or running away from (if cold blue) in geographic terms and/or in other spatial and/or temporal terms.

Referring briefly to FIG. 3L, it is within the contemplation of the disclosure to have entity focus defining objects (EFDO's; e.g., 30K.0') which point (e.g., by way of pointer 30K.6*b*) to complex operator nodes such as 30L.8. The complex operator nodes (e.g., 30L.8) may in turn point to yet other operator nodes; for example 30L.5, 30L.6, 30L.7 so as to thereby define a complex combination of likely cognitions that are cross-associated with an input set of background context specifications (30L.3; e.g., geographic location, time of day, day of week), an input set of background music specifications (30L.2; e.g., melodies) and an input set of topic specifications (30L.9). As explained above, the operator node 30L.5 that points to the input set of music primitives 30L.2, may additionally be pre-configured to also point to a likely, or 'expected' set of augmenting topic nodes 30L.1*a* and/or to also point to a likely, or 'expected' set of augmenting context nodes 30L.1*b* by virtue of respective augmentation pointers 30L.5*b* and 30L.5*c*; where incorporation pointers 30L.5*a* are the main rather than augmentation type incorporation pointers. Similarly operator node 30L.6 drags in with it, the augmenting set of 30L.4 of expected topic nodes for that context set 30L.3. As a result, the second level operator node 30L.8 incorporates into its pulled in set of topic nodes, not only its main topic nodes 30L.9 but also the augmentation-wise supplied topic nodes 30L.1*a* and 30L.4. Then, by virtue of this pulled-in complex of different topic nodes as well as context and music nodes, the second level operator node 30L.8 points to (via pointer 30L.8*f*) a finely-resolved cross-correlated set of pre-ranked online chat rooms 30L.10 that are related to the combination of original input sets, 30L.2, 30L.3 and 30L.9. In other words, the EFDO data structure 30K.0' which points (via 30L.8*f*) to the second level operator node 30L.8 thereby indirectly points to the highly specific set of online chat rooms 30L.10, which chat rooms may have geographically or otherwise closely clustered users participating in them. And therefore, the clusterings map 40E.1 provided in FIG. 4E on the basis of culled-through EFDO's may identify closely clustered users of a given chat room where those closely clustered users are focusing-upon a finely (rather than coarsely) defined set of points, nodes or subregions of different Cognitive Attention Receiving Spaces as if they were overlapping in a Venn diagram (e.g., 30L.7.Venn of FIG. 3L). More specifically, Venn diagram 30L.7.Venn is intended to indicate that the chat or other forum participation opportunities 30L.10 pointed to by operator node 30L.8 will have exchanges focusing-upon an overlap of plural topic nodes or subregions and plural context nodes and plural music space nodes such as for example the topic nodes of group 30L.1*a*, the topic nodes of groups 30L.4 and 30L.9, the music nodes of group 30L.2 and the context nodes of group 30L.3.

Referring next to FIG. 4F, shown is another possible set of clustering mappings 40F.1, 40F.2 that can be displayed by the clusters-representing subsystems of the STAN_3 system. Where practical, reference numbers in the 40F.nn series are used to correspond to those of the 40E.nn series of FIG. 4E so that illustrated modules such as 40F.3, 40F.4, ... 40F.9, etc. do not have to be re-described in detail again. Instead, focus is directed here upon the alternative presentations of clustering information that may be provided to the user. More specifically, an upper displayed mapping 40F.1 has been selected by the user (or by default by a system-provided template) to be displayed as a 2D plane disposed in a 3D reference frame 40F.0. At the same time, a lower displayed mapping 40F.2 (second mapping) has been selected by the user (or by default by a system-provided template) to be displayed as a 3D translucent cube having a substantially opaque bottom floor 40F.2M. A 2D map of a predefined geographic area (in real life (ReL) or virtual life) is painted on the bottom floor 40F.2M. Additionally, sets of concentric clustering radius rings 40F.2*a*, 40F.2*b*, etc. are overlaid on top of the bottom floor map 40F.2M where the center most ring of each set signifies an area of maximum concentration of 'touchings' while the peripheral rings each contain within their mutually exclusive areas (those not including areas of yet more inward circles) 'touchings' concentrations of a relatively lesser degree. A tear-drop like reporting tool, e.g., 40F.2Ta can be moved by the user such that the bottom tip of the tear-drop shape touches one of the peripheral ring areas rather than touching by default the central ring of a respective set of concentric clustering radius rings; and then in that case, a color coded (and/or texture coded) set of proportionality areas change inside the moved tear-drop (e.g., 40F.2Ta) to show how the proportionality and/or absolute magnitude of 'touchings' concentrations have changed as one moves from the inner most or core ring to the outer or peripheral regions. Although not shown, the peripheral rings may optionally be broken up into sectors; in which case the moveable tear-drop tool (e.g., 40F.2Ta) reports on 'touchings' distributions in each pointed to sector.

For sake of convenience, a first of the tear-drop tools (40F.2Ta) is shown in enlarged form 40F.Ta' on the exterior side of the symbolic magnifier. The largest of the color coded (and/or texture coded) areas 40F.2Ta1 represents the cognition subregion (in this a topic node or topic subregion) of greatest popularity within the core ring (or within another area if the tip of the tear drop is moved there) while the next inward area, 40F.2Ta2 represents the cognition subregion (e.g., topic) of next greatest popularity and the third inward area, 40F.2Ta3 represents the cognition subregion (e.g., topic) of yet lesser concentration and popularity within the tipped-at ring area. A legend 40F.2TL may be automatically displayed adjacent to the lower clusters mapping 40F.2 for indicating which cognition subregion (e.g., topic) is represented by each respective color coded (and/or texture coded) area, 40F.2Ta1-a3 inside the displayed tear-drops (e.g., 40F.2Ta, 40F.2Tb, 40F.2Tc). In one embodiment, an expansion tool (e.g., starburst+) is provided adjacent to each named cognition subregion (e.g., topics TSR5.9, TSR5.917) for allowing the user to learn more about that represented cognition point, node or subregion if so desired.

Although not shown for all clustering ring sets (40F.1*a*, 40F.1*b*, 40F.1*c*) of the exemplary URL's map 40F.1, in one embodiment, translucent connection bands or tubes 40F.3Ta (optionally of different colors or textures) are made visible upon user request as between clusterings of URL expressions in a URL-expressions clustering space (e.g., mapped by 40F.1) and a geographic or other such space (e.g., mapped by 40F.2) having 'touchings' thereto cross-mapped to a third space (e.g., to topic space) by tear-drop display tools such as 40F.2Ta or the like. More specifically, primitive URL expressions (see 391.2 of FIG. 3E for example and also 30W.0 of FIG. 3W) and operator nodes (e.g., 394.1 of FIG. 3E) that draw on them may be clustered in a corresponding URL's space according to one or both of geographic preferences (e.g., which URL's are most 'touched' or most intensely 'touched' by system users in respective pre-specified geographic sectors) and demographic preferences (e.g., which URL's are most 'touched' or most intensely 'touched' by system users in respective and pre-specified demographic sectors—i.e. as more specifically delineated for example by occupation, age group, income group and so on). In FIG. 4F, the clustered URL expressions are represented by dark dots of respective diameters placed within clustering ring sets 40F.1*a*, 40F.1*b* and 40F.1*c*. The wider or darker the dot, the greater are the represented 'touchings' in terms of number of users and/or their intensities of 'touching' upon the corresponding URL expression (primitive or operator node defined).

People of like propensities (e.g., of like demographic preferences) tend to congregate or cluster together geographically and/or in other ways (e.g., in terms of their top N topic, keyword and/or URL's 'touchings' in respective other spaces) and as a consequence, cross-space connection tubes (e.g., 40F.3Ta) may often be generated and drawn by the STAN_3 system to indicate machine-found cross-correlations between, say URL expression clusterings (of significant 'touchings') in a URL's space (mapped by 40F.1) and geographic space clusterings (of significant 'touchings') into a corresponding subregion (e.g., represented by 40F.2Ta1 of magnified tear drop) of say, topic space. These cross-correlations may run bi-directionally. By activating a respective expansion tool (e.g., starburst+) in the corresponding legend area, map area or connecting tube area (e.g., 40F.2TL+, 40F.2Ta1+, 40F.1*a*+, 40F.3Ta+), the user is empowered to being presented with additional information, including that indicating who the 'touching' users are, when did they touch and how intensely (e.g., emotionally) did they touch and so on. In some instances, the respective expansion tools (e.g., starbursts+) are not visible until the user zooms in with a viewing zoom-in/zoom-out tool (not shown) to see an enlarged view of the displayed object that contains its respective, information expansion tool. If the activated expansion tool (e.g., starburst+) is within an inter-space connecting tube (e.g., tool 40F.3Ta+), the user is automatically given an option of learning more information about users for the Boolean AND of the interconnected clusterings (e.g., 40F.1*a* AND 40F.2*a*) or learning more information resulting from the Boolean OR of the interconnected clustering or from the Boolean XOR (exclusive OR).

In accordance with one embodiment, the clusterings display subsystem (400.F) also automatically displays the locations of relevant promotion-enabling resources like 40F.2R1 adjacent to corresponding clusterings (e.g., 40F.2Tc) of on-topic 'touchings'. More specifically, the illustrated promotion-enabling resource 40F.2R1*can* include one or more of an electronically and remotely controlled billboard, a remotely controllable low powered wireless transmitter (including for example a low powered cellular communications transponder) and a remotely controllable loudspeaker or other information broadcasting means of limited geographic range. Then, when a marketing entity detects (automatically or otherwise) the presence of a clustering of users within the limited range of the promotion-enabling resource 40F.2R1 (e.g., billboard), where the clustered users are currently focusing-upon a topic node (or upon points, nodes or subregions of other spaces) that strongly cross-correlates with a predetermined, and to be promoted offering, the marketing entity may request or cause the predetermined offering to be then presented by way of the identified promotion-enabling resource 40F.2R1 (e.g., billboard). Therefore the respective promotion-enabling resource 40F.2R1 (e.g., billboard) is efficiently used to present to an adjacent clustering of target users a corresponding promotional offering (e.g., goods or services for sale) that directly relates to the subject matter they are currently focusing-upon. An expansion tool (e.g., starburst+) may be provided in or adjacent to the mapped representation of the promotion-enabling resource 40F.2R1 (e.g., billboard) for describing in more detail the capabilities, limitations or other attributes of that resource.

In accordance with one embodiment, the clusterings display subsystem (400.F) also automatically displays the locations of relevant other informational or facility/hardware resources like 40F.2R2 that are disposed adjacent to corresponding clusterings (e.g., 40F.2*b*) of on-topic 'touchings' that are directed to a corresponding and then focused-upon topic or other such node or subregion of a given Cognitive Attention Receiving Space (CARS). More specifically, if the clustered users of displayed clustering 40F.2*b* are currently focused-upon a topic whose appreciation may be enhanced or facilitated by making use of resources available at the nearby, resource-providing facility 40F.2R2 (e.g., a restaurant with audio-visual presentation resources, a university lecture hall, laboratory, etc.; including those large enough or small enough to efficiently accommodate the indicated number of users in the identified clustering), then in one embodiment one or more of the clustered users and the operator of the nearby resource-providing facility 40F.2R2 are automatically informed (e.g., via email and/or an on-screen advisement) of the proximity between the clustered group (e.g., 40F.2*b*) and the nearby resource-providing facility 40F.2R2 and the ability of the nearby, resource-providing facility to efficiently accommodate the indicated number and/or type of clustered together users (e.g., 40F.2*b*). An expansion tool (e.g., starburst+) may be provided in or adjacent to the mapped representation of the other resource 40F.2R2 (e.g., meeting hall) for describing in more detail the capabilities, limitations or other attributes of that other resource.

Given the above, it may be seen that in one embodiment, the STAN system 410 is provided with means for automatically determining if user-availabilities and/or resource-availabilities are such that users can have impromptu or pre-planned meetings based on local events, or on happenstance clusterings or groupings of alike focused people. These automated determinations may be optionally filtered to assure proper personhood co-compatibilities and/or dispositions in user-defined acceptable geographic vicinities. In an embodiment, the system provides the user with zoom in and out function (not shown) for the displayed clusterings map(s).

In one embodiment, the system 410 automatically determines if availability is such that users can have meetings based on one or more selection criteria such as: (1) Time available (e.g., for a 5, 10, 15 MINS chat) to communicate; (2) physical availability to travel X miles within available time so as to engage in a real life (ReL) meeting having a duration of at least Y minutes (where X and Y are predetermined numbers here); (3) level of attentions-giving capability of each user, and so on. For example, if a first user is multi-tasking, such as watching TV and trying to follow a pre-existing chat at same time and so not really going to be able to be very attentively involved in the planned next chat, but just to be a passive bystander vs. him totally looking at the planned next chat, then the attentions-giving capability of that user may be indicated as being low along a spectrum of possibilities extending from only casual and haphazard attention giving to full-blown attention giving. In one embodiment, the system asks the user what his/her current level of attentions-giving capability is. In the same or an alternate embodiment the system automatically determines the user's current level of attentions-giving capability based on environmental analysis (e.g., is the TV blasting loudly in the background, are people yelling in the background or is the background relatively quiet and at a calm emotional state per incoming CFi telemetry signals?). In one embodiment, the system 410 automatically determines if availability is such that users can have meetings based on user mood and/or based on user-to-user distances in real life (ReL) space and/or in various virtual spaces such as, but not limited to, topic space, context space, emotional/behavioral states space, etc.

Referring now to FIG. 1N, in one embodiment, the system 410 not only automatically serves up automatically pre-labeled serving plates (formed from system provided templates) but also allows for customized user-labeled and user-configured serving plates (e.g., 102*b*" in row 102" of FIG. 1N). As indicated for serving plate 102*a*", although it is depicted for sake of first glance and simple understanding as a serving plate that serves up invitations to on-topic chat or other forum participation opportunities (or suggestions pointing to other on-topic informational resources) related to the topic of "Home Repair", in a broader sense the user may have custom configured it to serve up pointers (e.g., hyperlinks) to various points, nodes or subregions (PNOS's) in other Cognitive Attention Receiving Spaces (CARS's), not necessarily just in topic space; where at the user's discretion those served up pointers may or may not actually relate to the topic of Home Repair. More specifically and at the user's discretion, a given serving plate (e.g., 102*a*" or 102*b*") may be custom configured to provide a mixture of different on-plate scoops, where each scoop (which could be displayed as a scoop of on-plate food items; e.g., stacked donuts, stacked pancakes, cookies, etc.) provides a logical link to an informational resource (e.g., chat room, list of experts, etc.) that is attached to a particular point, node and/or subregion of a particular Cognitive Attention Receiving Space (where latter can be topic space, but does not have to be limited to just topic space).

The underlying logical link (or plural links) of each custom scoop (e.g., 102*j*' on serving plate 102*a*", which scoop is also shown in magnified form as having an exemplary donut shape at 102*je*' with an expansion tool e.g., starburst+) in its center) may be a corresponding one or more links derived from the pre-ranked and/or pre-sorted pointers in FIG. 3K of the user's entity focus defining object (EFDO) and more specifically from one or more of pointers-holding sections 30K.4-30K.7 of data structure 30K.0. By "derived", it is meant here that at least one linkage to a chat room (e.g., 30L.10 of FIG. 3L) or other such informational resource is automatically fetched from a pointed-to primitive or operator node (e.g., 30L.8 of FIG. 3L) and a corresponding informational resource accessing opportunity (e.g., invitation 102J1 to viewing a tweet stream) is presented to the user or the informational resource (e.g., tweet transcript 102J1*o*) is immediately presented to the user when the user clicks, taps or otherwise activates the respective scoop (e.g., 102*je*'). In one embodiment, a plurality of invitations (e.g., 102J1, 102J2, 102J3, 102J4) are all automatically presented to the user and/or the corresponding informational resources (e.g., tweet transcript 102J1*o*) are all automatically presented to the user in response to the user clicking, tapping or otherwise activating the respective on-plate scoop (e.g., 102*je*'). The specific way in which a given scoop may respond to user activation may be selectively changed by the user, for example through activation-preference options provided by way of the expansion tool (e.g., starburst(+) inside 102*je*'). In one embodiment, the presented invitations (e.g., 102J1, 102J2, 102J3, 102J4) and/or opened up and corresponding informational resources (e.g., tweet transcript 102J10*o*) are displayed as if projected on a retractable tapestry 102*jb*'. Clicking or otherwise activating minimization tool 102*jx* causes the retractable tapestry 102*jb*' to roll up into a compactly scrolled form having a de-minimizing tool (+) (not shown) displayed for unfurling the tapestry again. Thus the user can compact the displayed informational resources if desired and re-expand them when needed. If the upper serving plates tray 102" is minimized, the retractable tapestry 102*jb*' and its supporting top scroll are also automatically minimized. In this way the informational resources which the STAN_3 system can optionally present to the user can be moved out of the way so that the user has access to other content on his main screen 111'.

FIG. 1N shows that the user may define a customized floor name, e.g., the "Help Grandma Floor", for respective ones of his/her customized or other floor layouts. When the Layervator (113" of FIG. 1N) floor indicator shifts to a new floor, the customized floor name (e.g., the "Help Grandma Floor") is temporarily or permanently displayed. Additional floor identification information (e.g., a picture of grandma—not shown) may further be displayed to help the user quickly orient him/herself to where he/she is in the represented virtual building or other such structure. Each floor may present a respective different set of invitations and/or other informational resource suggestions of various types (e.g., forum invites and/or further content suggestions) based on the different defined types of pure or hybrid space nodes and/or subregions which the user is determined to be currently giving attention giving energies to. Since the scoops on the various serving plates (e.g., 102a", 102b") can hold many different types of invites, and suggestions, in one embodiment, the STAN_3 system 410 allows the user to curate the scoops so they can be used, for example, as integral parts of special context-serving, automated online newspapers or reporting documents. By "special context-serving", it is meant here that such curated newspapers and/or reports can be directed to an occupational specialty of the user (e.g., doctor, lawyer, engineer, accountant, etc.) or to hobby type interests of the user (e.g., politics junkie, Hollywood fan, etc.) Recent CFi's collected from the user may indicate the user's current context (e.g., at the Superbowl™ Sunday Party; at Grandma's House and there to help her) and then the STAN_3 system may automatically take the user (virtually) to the context-indicated floor, or at least suggest to the user that he/she should go there (e.g., with use of the Layer-vator 113"). Additionally, the custom or template-wise generated scoops of each serving plate (e.g., 102a", 102b") may be auto-curated based on type of data receiving and data presenting device (e.g., smartphone versus tablet) that the user has activated for receiving the curated invites and/or suggestions. Moreover, the custom or template-wise generated scoops of each serving plate (e.g., 102a", 102b") may be auto-curated based what the device activating user wants or expects in terms of covered nodes and/or subregions of topic space and/or of other Cognitive Attention Receiving Spaces.

Some features of FIG. 1N have been mentioned or indirectly described above. However, for sake of completeness they are more fully described here. A user may shuffle any of stacked serving plates 102a", 102a"', 102a"", . . . , 102b", etc. to a top or other position on serving tray 102" as desired to thereby expose the informational resource scooping objects (e.g., 102j', 102n') disposed on the top most serving plates. When the user double clicks, taps, swipes on or otherwise activates a given scooping object (e.g., 102j'), a corresponding set of one or more invitation-providing objects (e.g., 102J1, 102J2, 102J3, 102J4) are automatically presented to the user and/or the corresponding informational resources (e.g., tweet transcript 102J1o) are automatically displayed to the user, for example as if projected on a retractable tapestry 102jb'. The invitation-providing objects (e.g., 102J2) and/or their corresponding informational sourcing objects (e.g., tweet transcript 102J1o) may have supplemental informational sourcing objects (e.g., 102J2P, 102J2L, 102J3P) attached to them or disposed nearby, where these supplemental informational sourcing objects may indicate which or what kind and/or how many of other users (e.g., in 102J2P, the kind is FaceBook™ Friends and the number already in the chat room is 2) are already engaged within and/or have been invited to engage within the corresponding chat or other forum participation opportunity or session. These supplemental informational sourcing objects may alternatively or additionally indicate other informational resources (e.g., suggested other links 102J2L) that the user may wish to explore. The invitation-providing objects (e.g., 102J1, 102J2, 102J3, 102J4) may have various types of ancillary icons attached to or included in them such as ones indicating what type of invitation it is (e.g., singing bird may mean a tweet, facing and talking speech balloons may indicate a real time chat opportunity, talking speech balloons with tipped hats on their heads may indicate there are Tipping Point Persons (TPP's) present in the forum or expected to soon join the forum, an attached node flag—i.e. like 115e—and its color(s) and/or shape may indicate what type of Cognitive Attention Receiving Space and/or subregion thereof is involved, and so on).

In the embodiment 100.N of FIG. 1N, the settings tool 114" may be used to custom configure the then-displayed floor, by for example, giving the floor and/or its corresponding Layer-vator buttons respective customized names, colors and/or other such window dressing attributes (see Edit Vator Buttons option in settings menu 114n1).

The settings tool 114" may be used to custom configure the then-displayed floor, by for example, changing the layout of where and how different main serving trays (e.g., 101", 102", 103", 104") are displayed, if displayed at all, where and how different subservient serving trays (e.g., 101r") are displayed, if displayed at all, where and how different serving plates (e.g., 102a", 102b") are displayed, if displayed at all, and/or where and how different scoops (e.g., 102j') or other such invitations or offerings are displayed, if displayed at all. The settings tool 114" may also be used to custom configure when these various features are displayed, if displayed at all. For example, there may be certain times of the day (or certain other contextual conditions) for which the user does not wish to receive promotional offerings via lower tray 104". In one embodiment, the user may disable the presentation of lower tray 104" for those specified times of the day (or other contextual conditions, e.g., while in a meeting at work). The user may wish to have trays 101", 102", 103" and/or 104" displayed in different parts of the screen rather than in the default positions shown in FIG. 1N. More specifically, the user may prefer to have the topics (or other cognition-type) serving tray 102" pop out from the left side of the screen rather than from the top and to have the social entities serving tray 101" pop out from the bottom instead of from the left. The settings tool 114" or another approximate mechanism may provide for such personal preferences as well as for change of colors, fonts, styles and other attributes of the serving trays.

The settings tool 114" may be used (e.g., via menu 114n1) to custom define which main screen windows will automatically open as default main content of that floor (e.g., the customized Help Grandma floor). For example, one of the default windows that the user/grandson may wish to have as always opening up at center screen is the month's activities calendar (not shown) for a local elders' community center that his grandmother belongs to. In this way, whenever the grandson visits the Help Grandma floor, he is immediately presented with a display (not shown) of the activities calendar for the local elders' community center and he can immediately see if there is an upcoming event that his grandmother may wish to attend. This of course is merely an example and depending on the title and/or function assigned by the user to the floor (e.g., the customized Help Grandma floor), the default central content may vary.

The default content settings option (menu 114n1) may also be used to custom define which serving plates (e.g., 102a", 102b") will appear as the top most serving plates on their respective serving tray (e.g., 102") and/or which scoops (e.g., 102j') will appear and in what order on the respective serving plates. The option is better illustrated by submenu 114n2. For example, the default topics subregion of serving plate 102a" might be "Home Repairs" and the different chat-invitation or other informational resource offering scoops (e.g., 102j') provided on that serving plate may all be directed to different aspects of helping Grandma with her home maintenance and repair problems. Other default topics that the helpful grandson/user may have pre-defined for this floor layout may include topic subregions directed to geriatric health care issues (see submenu 114n3) and/or local or more regional geriatric support groups, local or more regional card game and/or other entertainment options that specially cater to the elderly and so on.

Each of the setting menus (e.g., 114*n*1-114*n*3) may contain information expansion tools (e.g., starburst+) for enabling the user to navigate to additional informational resources. More specifically, one of the additional information providing resources of the Geriatric Health menu item in menus 114*n*3 opens up a spatial map 114*n*4 of a corresponding subregion of the system-maintained topic space. The user may then spot a new on-topic node within that region and elect to drag-and-drop (114*n*5*a*) a copy of that new node up serving plate 102*b*" (where the continuation of the drag-and-drop operation is shown as 114*n*5*b*) whereby the chat or other forum participation sessions associated with that dragged and dropped copy of the node become a new scoop of automatically served up invitations made available to the user on serving plate 102*b*". The user may elect to make all forums associated with that dragged-and-dropped node (operation 114*n*5*a*-114*n*5*b*) be ones to which he will by default receive invitations to, or; in accordance with a further settings option (not shown) for dragged-and-dropped objects (e.g., topic nodes or topic subregions), the user may attach pre-filtering criteria to the invitations providing new scoop (the dashed end circle of drag operation 114*n*5*b*) such as, but not limited to, invite to only the top 2 now chats if ongoing, or invite to only ongoing chats that have on-topic expert Ken54 as one of its participants and so on. In this way the user can custom configure the invitations he/she will receive by way of the dragged-and-dropped new node (or spatial subregion).

Referring again to menu 114*n*2, the add, delete or modify options made available to the user are not limited to topic nodes and/or to the top serving tray 102". Another menu option empowers the user to alter the default personas and/or groups that will be displayed by the left sidebar tray 101" and/or the types of what-are-they-focusing-upon icons (e.g., pyramids) displayed in radar sub-tray 101*r*".

As mentioned for example in connection with mapped plane 40F.1 of FIG. 4F, not all clusterings of interest need to occur in the system-maintained topic space. Clusterings of hotly 'touched' points, nodes or subregions may occur for example in a URL's expressions and operator nodes mapping space where clusterings of such expression primitives and/or operator nodes may occur on the basis of geography and/or other demographic factors. More specifically and for example, the helpful grandson may be interested in keeping track of all currently hot URL's (expression primitives and/or associated operator nodes—see 391.2, 394.1 of FIG. 3E for example) which are clustered one next to another on the basis of local geography (e.g., within 10 miles of Grandma's house) and/or on the basis of demographics of other users who are recently making significant 'touchings' with such URL's (e.g., people matching Grandma's demographics—i.e. age bracket, income bracket, education bracket, etc.). In this way, the helpful grandson (the user) can quickly spot which URL's are recently "hot" for the local geographic area that Grandma belongs to and for people in her demographic brackets. The notion of "hot" here may include points, nodes or subregions in so-filtered URL's space that are showing above-threshold increase in rate of 'touchings' or acceleration of significant 'touchings' as opposed to just above-threshold values in hotness of 'touchings'. This empowers the user to quickly see new emerging trends even if the user does not know the name of an associated topic or the top N keywords associated with such emerging trends. Yet more specifically, there could be a new arthritis treatment that hardly anyone knows about except for a handful of Tipping Point Persons (e.g., Ken 54) and the URL's associated with that new treatment are showing an accelerating amount of heat being applied to them thanks to recent 'touchings' by Tipping Point Persons such as Ken54. The demographically and/or geographically filtered map of URL's hot spots may show the user such emerging trends even if the user does not know the name, keywords or other attributes of the going-viral new topic (e.g., about the new arthritis treatment drug or other form of treatment modality).

Demographic and/or geographic filtering, incidentally, does not have to be centered around Grandma's geographic neighborhood and/or Grandma's demographic brackets. The helpful grandson (a.k.a. first user) may select geriatric physicians as the central demographic bracket for example and/or more specifically, those who practice at a certain hospital and/or are affiliated with a certain university. By watching where the significant 'touchings' of those demographic and/or geographic user recently cluster and/or how they change relative to older clusterings of significant 'touchings', the helpful grandson (a.k.a. first user) may spot emerging trends even before there is a named topic and/or topic node given to the corresponding cognitions (those of the clustered significant 'touchings') and/or even before specific keywords are agreed to with regard to the newly emerging set of socially-mediated cognitions.

Referring to FIG. 2, in one embodiment, the mobile or other data processing device used by the STAN user is operatively coupled to an array of microphones, for example 8 or more directional microphones and the arrays are disposed to enable the system 410 to automatically figure out which of received sounds correspond to speech primitives emanating from the user's mouth and which of received sounds correspond to music or other external sounds based on directional detection of sound source and based on categorization of body part and/or device disposed at the detected position of sound source.

Still referring to FIG. 2, in one embodiment, the augmented reality function provides an ability to point the mobile device at a person present in real life (ReL) and to then automatically see their Top 5 Now Topics and/or their Top N Now (or Then) other focused-upon nodes and/or subregions in other system maintained spaces (other CARS's).

In one embodiment, the system 410 allows for temporary assignment of pseudonames to its users. For example, a user might be producing CFi's directed to a usually embarrassing area of interest (embarrassing for him or her) such as comic book collector, beer bottle cap collector, etc. and that user does not want to expose his identity in an online chat or other such forum for fear of embarrassment. In such cases, the STAN user may request a temporary pseudoname to be used when joining the chat or other forum session directed to that potentially embarrassing area of interest. This allows the user to participate even though the other chat members cannot learn of his usual online or real life (ReL) identity. However, in one variation, his reputation profile(s) are still subject to the votes of the members of the group. So he still has something to lose if he or she doesn't act properly.

In one embodiment, the system 410 provides social icebreaker mechanism that smooths the ability of strangers who happen to have much in common to find each other and perhaps meet online and/or in real life (ReL). There are several ways of doing this: (1) a Double blind icebreaker mechanism—each person (initially identified only by his/her temporary pseudoname) invites one or more other persons (also each initially identified only by his/her temporary pseudoname) who appear to the first person to be topic-wise and/or otherwise co-compatible. If two or more of the pseudoname-identified persons invite one another, then and only then, do the non-pseudoname identifications (the more permanent identifications) of those people who invited each other get revealed simultaneously to the cross-inviters. In one embodiment, this temporary pseudoname-based Double blind invitations option remains active only for a predetermined time period and then shuts off. Cross-identification of Double blind invitations occurs only if the Double blind invitations mode is still active (typically 15 minutes or less).

Another way of the breaking the ice with aid of the STAN_3 system 410 is referred to here as the (2) Single Blind Method: A first user sends a message under his/her assigned temporary pseudoname to a target recipient while using the target's non-pseudoname identification (the more permanent identification). The system-forwarded message to the non-pseudoname-wise identified target may declare something such as: "I am open to talking online about potentially embarrassing topic X if you are also. Please say yes to start out online conversation". If the recipient indicates acceptance, the system automatically invites both into a private chat room or other forum where they both can then chat about the suggested topic. If the targeted recipient says no or ignores the invite for more than a predetermined time duration (e.g., 15 minutes), the option lapses and an automated RSVP is sent to the Single Blind initiator indicating that the target is unable to accept at this time but thank you for suggesting it. In this way the Single Blind initiator is not hurt by a flat out rejection.

In one embodiment, the system 410 automatically broadcasts, or multi-casts to a select group, a first user's Top 5 Now Topics via Twitter™ or an alike short form messaging system so that all interested (e.g., Twitter following) people can see what the first user is currently focused-upon. In one variation, the system 410 also automatically broadcasts, or multi-casts the associated "heats" of the first user's Top 5 Now Topics via Twitter™ or an alike short form messaging system so that all interested (e.g., Twitter following) people can see the extent to which the first user is currently focused-upon the identified topics. In one variation, the Twitter™ or alike short form messaging of the first user's Top 5 Now Topics occurs only after a substantial change is automatically detected in the first user's 'heat' energies as cast upon one or more of their Top 5 Now Topics, and in one further variation of this method, the system first asks the first user for permission based on the new topic heat before broadcasting, or multi-casting the information via Twitter™ or an alike short form messaging system.

In one embodiment, the system 410 not only automatically broadcasts, or multi-casts to a select group, a first user's Top 5 Now Topics via Twitter™ or an alike short form messaging system, for example when the first user's heats substantially change, but also the system posts the information as a new status of the first user on a group readable status board (e.g., FaceBook™ wall). Accordingly, people who visit that group readable, online status board will note the change as it happens. In one embodiment, users are provided with a status board automated crawling tool that automatically crawls through online status boards of all or a preselected subset (e.g., geographically nearby) of STAN users looking for matches in top N Now topics of the tool user versus top N Now topics of the status board owner. This is one another way that STAN users can have the system automatically find for them other users who are now probably focused-upon same or similar nodes and/or subregions in topic space and/or in other system-maintained spaces. When a match is found, the system 410 may automatically send a match-found alert to the cellphone or other mobile device of the tool user. In other words, the tool user does not have to be then logged into the STAN_3 system 410. The system automatically hunts for matches even while the tool user is offline. This can be helpful particularly in the case of esoteric topics that are sporadically focused-upon by only a relatively small number (e.g., less than 1000, less than 100, etc.) of people per week or month or year.

In one embodiment, before posting changed information (e.g., re the first user's Top 5 Now Topics) to the first user's group readable, online status board, the system 410 first asks for permission to update the top 5, indicating to the first user for example that this one topic will drop off the list of top 5 and this new one will be added in. If the first user does not give permission (e.g., the first user ignores the permission request), then the no-longer hot old ones will drop off the posted list, but the new hot topics that have not yet gotten permission for being publicized via the first user's group readable, online status board will not show. On the other hand, currently hot topics (or alike hot nodes and/or subregions in other spaces) that have current permission for being publicized via the first user's group readable, online status board, will still show.

In one embodiment, the system 410 automatically collects CFi's on behalf of a user that specify real life (ReL) events that are happening in a local area where the user is situated and/or resides. These automatically collected CFi's are run for example through the domain-lookup servers (DLUX) of the system to determine if the events match up with any nodes and/or subregions in any system maintained space (e.g., topic space) that are recently being focused-upon by the user (e.g., within the last week, 2 weeks or month). If a substantial match is detected, the user is automatically notified of the match. The notification can come in the form of an on-screen invitation, an email, a tweet and so on. Such notification can allow the user to discover further information about the event (upcoming or in recent past) and to optionally enter a chat or other forum participation session directed to it and to discuss the event with people who are geographically proximate to the user. In one embodiment, the user can tune the notifications according to 'heat' energy cast by the user on the corresponding nodes and/or subregions of the system maintained space (e.g., topic space), so that if an event is occurring in a local area, and the event is related to a topic or other node that the user had recently cast a significantly high value of above-threshold "heat" on that node and/or subregion, then the user will be automatically notified of the event and the heat value(s) associated with it. The user can then determine based on heat value(s) whether he/she wants to chat with others about the event. In one embodiment, time windows are specified for pre-event activities, during-the-event activities and post-event activities and these predetermined windows are used for generating different kinds of notifications, for example, so that the user is notified one or more times prior to the event, one or more times during the event and one or more times after the event in accordance with the predetermined notification windows. In one embodiment, the user can use the pre-event window notifications for receiving promotional offerings for "tickets" to the event if applicable, for joining pre-event parties or other such pre-event social activities and/or for receiving promotional offerings directed to services and/or products related to the event.

In one embodiment, the system 410 automatically maintains an events data-objects organizing space. Primitives of such a data-objects organizing space may have a data structure that defines event-related attributes such as: "event name", "event duration", "event time", "event cost", "event location", "event maximum capacity" (how many people can come to event) and current subscription fill percentage (how many seats and which are sold out), links to event-related nodes and/or subregions in various system maintained other spaces (e.g., topic space), and so on.

In one embodiment, the system 410 further automatically maintains an online registration service for one or more of the events recorded in its events data-objects organizing space. The online registration service is automated and allows STAN users to pre-register for the event (e.g., indicate to other STAN users that they plan to attend). The automated registration service may publicize various user status attributes relevant to the event such as "when registered" or when RSVP'd with regard to the event, or when the user has actually paid for the event, and so on. With the online registration service tracking the event-related status of each user and reporting the same to others, users can then responsively entering a chat room (e.g., when there is reported significant change of status, for example a Tipping Point Person agreed to attend) and the users can there discuss the event and aspects related to it.

In one embodiment, the system 410 automatically maintains trend analysis services for one or more of its system maintained spaces (e.g., topic space, events space) and the trend analysis services automatically provide trending reports by tracking how recently significant status changes occurred, frequency of significant status changes, velocity of such changes, demographic attributes of such changes (e.g., what kind of users are primarily behind the changes in terms of for example. age, gender, income levels and so on), and virality of such changes (how quickly news of the changes and/or discussions about the changes spread through forums of corresponding nodes and/or subregions of system maintained spaces (e.g., topic space) related to the changes.

References are made a number of times above to various persona characterizing profiles of respective system users. Referring to FIG. 5A, one of those characterizing profiles is the PHAFUEL or Personal Habits And Favorites/Unfavorites Expressings Log 501' of the respective user when operating in a respective context. More specifically, recent CFi's (502), CVi's and other such reporting signals that are provided to the STAN_3 system (510 in FIG. 5A) on behalf of a respective system user 531 may cause the system 510 to conclude (in one of recursive context-determining steps) that the user is operating under a specific context and/or mood (as indicated by a repeatedly updated context/mood reporting signal 516*o*). As a consequence of this mood/context determination, the system will activate a corresponding one of a plurality of possible PHAFUEL records 501*a*, 501*b*, etc. as the currently activated one. The assumption is that for each of plural contexts and/or moods, the respective user 531 will have certain behavioral propensities which may be characterized as habits and routines.

Yet more specifically, and assuming a most common of contexts and moods 501*a* is determined to be in effect, the user 531 will habitually behave in a certain way during a normal work day as represented by Row-1 of table column 503 in FIG. 5A and/or the user will respond to certain routine circumstances according to certain typical routines of the user. Normally, if this "normal work day" context 503.1 is in effect, a corresponding sequence of normal events (activities) at normal locations and/or normal times will unfold. For example, the user 531 will awaken at 6:00 AM in an upstairs part of her prime residence (Home) and will brush her teeth and/or perform other bathroom functions in accordance with a first pre-recorded event predicting description 505. In one embodiment, the PHAFUEL record 501*a* is viewable by the respective user 531 and each recorded event description, (e.g., 505) may include numerous details which are accessed by use of an expansion tool (e.g., starburst+). A better example will be given for predicted event 507.

First however, it is to be observed that the predicted unfolding of the "normal work day" context row 503.1 has a context-confirming and unsuredness-resolving, starting point, such as for example, one that indicates what time the user normally awakens (e.g., 6:00 AM), where the user normally awakens (e.g., at home, and upstairs in that home), and perhaps (although not shown) what detailed set of biological or other conditions the user normally awakens under (e.g., hungry, groggy, etc.). The normal starting point predicting data (recorded in section 504.1) provides a form of self-confirming verification of the user context that was presumed by the record activating mood/context signal 516*o*. If, for example, the user 531 does not awaken at home and "upstairs" and at around 6:00 AM, that may indicate that the user is not operating under the assumed, "normal work day" context of row 503.1. In one embodiment, one or more confidence scores (516*c*) relating to the currently assumed user context are decremented if the current CFi's indicate user activities that deviate significantly from the expected normal. More specifically, if the deviation exceeds a predetermined first threshold (e.g., user awakens 1 hour later or more than 50 feet away from normal place), an error signal is automatically sent to the context determining engines (see 316*o* of FIG. 3D) of the STAN_3 system and the system may respond by differently determining user context and starting with a differently activated PHAFUEL record (e.g., 501*b*). On the other hand, if the current user state (as reported by current CFi's) is relatively close to the predicted starting context point (time, place, biological state) 504.1, that operates as a confirming vote (a confidence score incrementing event) for the currently determined context (represented by mood/context signal 516*o*). It should be recalled that the currently determined context (516*o*) can operate to pick substantially all of the activated profiles for the user, not just the currently activated PHAFUEL record (e.g., 501*a*). See again the feedback signal 316*o* feeding into profiles selection module 301*p* of FIG. 3D for thereby contributing to selection of the currently activated profiles on the basis of the context determination made with the aid of context mapping mechanism 316". (The context determination made by mechanism 316" is a collectively applicable context for a number of users rather than for user 531 alone. On top of that, the specific user, e.g., 531, may have individualized deviations from the collective context and those might be represented by knowledge base rules (KBR's) embedded in the personal profiles of the individualized user e.g., 531.)

In addition to increasing or decreasing confidence scores (see 516*c*), the PHAFUEL record may provide a filler-in function. Sometimes there are lapses and/or communicative interruptions (502*a*) to the CFi's and/or CVi's signal streams 502 that are supposed to be received by the system core (e.g., cloud 510) from each respective user. In such a case, where the communication system drops some of the CFi's and/or CVi's in signals stream 502, or they are not able to be processed for some other reason; the then-activated PHAFUEL record (or the default PHAFUEL—see 301*d* of FIG. 3D) is automatically used as a fill-in substitute for the dropped or otherwise not-processed or received signals. For example, if a continuous stream of recent CFi's 502 indicates that the "normal work day" flow of row 503.1 is unfolding over time (and/or location) in accordance with the predictions made by row 503.1 and within predictable variations; then, if during for example, normal breakfast time 507, some of the CFi signals 502 stop being received; the STAN_3 system can predicatively fill-in for the missing CFi signals 502 by assuming that the user will continue along his/her normal habits and per normal routines as indicated in then activate row 503.1 of his/her then activated PHAFUEL record 501*a*. More specifically, the system might safely assume the user is eating breakfast at home, alone and the breakfast food is a cereal in accordance with the highest likelihood entries of normal routines section 507*a*. (Section 507*a* will be further explained below.)

Another occasion where the currently activated and unfolding-as-expected PHAFUEL record 501*a* can come to the rescue is when the received CFi signals 502 point ambiguously to two or more of equally probable outcomes in terms of likely current user state and the STAN_3 system is unsure how to resolve the ambiguity (e.g., an ambiguous clustering of CFi's) based on the CFi's alone. However, the normal habits and routines defined by the then activated PHAFUEL record 501*a* may act as tie breakers for re-scoring one of the two or more of equally probable outcomes as being more likely than the other(s). Accordingly, when such ambiguous situations arise, the STAN_3 system automatically looks to the then activated PHAFUEL record 501*a* (if there is one) for assistance in re-scoring tied-for-first-place results so as to better focus the finite bandwidth resources of the system hardware and/or software modules on the more likely of the beforehand tied determinations (e.g., as to what the user's current context is and therefore which nodes in hybrid context-topic space or the like are most likely the ones being currently focused-upon by the user).

Of importance, at the contextual starting point (e.g., 504.1) or shortly thereafter (e.g., 505), the user 531 will habitually have certain specific data processing devices proximate to them (which are normally turned on) for collecting CFi's (502) and the like for sending back to the STAN_3 system 510. The normal work day characterizing row (503.1) includes a respective habitual device sub-row 506 that indicates which of plural and normally used data processing devices are most likely to be turned on and operatively proximate to the user at the given time and/or in the given location. (In one embodiment, if the user forgot to turn on a vital device and automated turn-on capability is available, the STAN_3 system may automatically turn-on the device for the user.) For example, the user 531 may habitually keep her smartphone (see magnification 506*a* for list of possible devices) activated and at her bedside during the night such that it is operatively proximate to her as a first thing in the morning (e.g., 6:00 AM) when she gets up (starting point 504.1). In accordance with one aspect of the present disclosure, the STAN_3 system consults the user's PHAFUEL record to determine which data processing device (e.g., smartphone versus, or together with tablet computer) the STAN_3 system 510 should be expecting to receive CFi's (502) and like reporting signals regarding the user's current activities (e.g., attention giving activities) at the normal waking time. More specifically, during breakfast (normal event 507) the user might usually step away from her smartphone and instead resort to using her tablet computer and/or her at-home desktop computer. Each of these starts and stops in being operatively proximate to one reporting device (e.g., home desktop computer) or another (e.g., work desktop computer) acts as an additional context confirming/self-verifying condition as well as an explanation for stoppage of CFi signals stream from one device or another. If a deviation that exceeds a predetermined threshold (e.g., user is using next door neighbor's computer 1 hour earlier and more than 100 feet away from normal usage place), an error signal is automatically sent to the context determining engines (see 316*o* of FIG. 3E) of the STAN_3 system and the system may respond by differently determining user context and starting with a differently activated PHAFUEL record (e.g., 501*b*). Part of the pattern of habits and routines of the user is the pattern of usages by the user of different devices that are operatively proximate to him/her. This includes normal time of usage, normal location of usage and normal extent (e.g., intensity) of usage. When the actual pattern of device usage substantially matches the predictions made by the currently activated PHAFUEL record (e.g., 501*a*) this works to increase a machine-maintained confidence score (516*c*) that the currently determined user context is a correct one.

In one embodiment, the STAN_3 system (510) maintains and repeatedly updates a plurality of confidence scores 516*c* that it stores for each of its respectively monitored users (e.g., 531). A first of the confidence scores indicates a relative degree of confidence about the currently activated PHAFUEL record (e.g., 501*a*) based on recent activities and device usages of the user. If the recent activities and device usages (506) substantially conform with predictions made by the currently subscribed-to contextual time line (e.g., 503.1, "normal work day" flow) then the first confidence score is increased for the currently selected PHAFUEL record and a further second confidence score is increased for the currently subscribed-to contextual time line (e.g., 503.1). Conversely, if the recent activities and device usages (506) of the user deviate beyond predetermined threshold values, the confidence scores are correspondingly decremented and; if the deviation is very large, resort may be made to pre-specified default profiles 301*d* as was explained for FIG. 3D. Others of the system-maintained confidence scores 516*c* can indicate respective relative degrees of confidence about the currently activated other profiles (not PHAFUEL) of the respective user. More specifically, it is possible that on a given day the user is still following the "normal work day" flow 503.1 but she (e.g., 531) did not have a good night's sleep the evening before and therefore her social dynamics attribute (see FIG. 5B—to be explained shortly) are not the usual ones even though outwardly her "normal work day" flow 503.1 appears to be the same. Some of the user's activities may result in reduction of confidence score for her currently activated social dynamics profile (PSDIP 502' of FIG. 5B) even though the confidence score for her PHAFUEL record remains high. The same can apply for others of the user's currently activated personal profile records (e.g., PEEP, personhood profile, topic space subregion or domain profile and so on).

Continuing along the "normal work day" flow 503.1 of FIG. 5A, it is seen in the example of second normal event 507 (breakfast) that the location of that event (and/or time for that event) may have a significant variance whereby the system attributes non-negligible probabilities to alternative locations for the event and/or alternative times, and/or alternative breakfast menus; alternative breakfast companions; alternative social contexts for the event and/or other alternative attributes (not shown) for the event such as, but not limited to: alternative ones of used equipment (more applicable to gym event 508); alternative ones of clothings worn; alternative ones of data processing devices used (506) and so on.

The variance factors 507*v* for different ones of alternative attributes may be automatically updated (e.g., confirmed or changed) by the STAN_3 system on a statistics running average or other such basis as each user progresses through his/her normal day's habits and routines and the confirming or dis-affirming CFi's for the same are automatically collected by the system. More specifically, in the exemplary detailed case (507*a*) of user 531 normally eating cereal for breakfast 50% of the time; eggs 25% of the time and some other identified menu item another 25% of the time; the user's tastes may change over time and some other food stuff (e.g., pureed vegetable and fruit mix) may take the number one position in terms of preferences over cereal for example. The system will automatically change the relevant PHAFUEL record (e.g., 501*a*) over time as the user's actual habits and routines change.

Keeping track of mundane things such as what the user normally has for breakfast (e.g., 50% of the time cereal) can assist in generating so-called, likelihood-of-availability scores 516*a* for the user when the system considers (using automated machine means) whether to invite the user to a particular chat or other forum participation or real life (ReL) gathering event opportunity. More specifically, if the contemplated event involves consumption of specific food or drink stuffs (as an example of consumables) and the user's PHAFUEL record indicates the user has likely already consumed more than his/her normal weekly fill for that consumable, then a corresponding likelihood-of-availability score 516*a* for that user and with respect to that contemplated event and its corresponding consumables will be decreased. On the other hand, if the user's current week's consumption for that consumable item (or activity, e.g., involving a specific entertainment genre, i.e. seeing a movie, a sports event, etc.) is well below the normal amount, then the corresponding likelihood-of-availability score 516*a* for that user and with respect to that contemplated event will be increased. In this way the system can better predict which invitations the user is more likely to welcome and which the user is more likely to feel annoyed by. It should be recalled that in the introductory hypothetical (e.g., Superbowl™ Sunday Party) the system was automatically able to predict which promotional offerings certain users are more likely to welcome. The continuously updated PHAFUEL records of the respective users is one way the system is able to do this.

While the system is keeping track of mundane things such as what the user normally has for breakfast (e.g., 50% of the time cereal), and normally where (e.g., at a restaurant called McD—a hypothetical name) and with whom (e.g., with Bill 20% of the time), the system may also at times be in receipt of biological status telemetry (e.g., implicit voting CVi signals which are translated with aid of the user's currently activated PEEP profile). These signals (e.g., CVi's) may indicate whether the given user (e.g., 531) is implicitly liking or disliking a concurrent activity as reported by the then generated CFi's. Over time, a statistical database is developed for the implicit likes and dislikes of the user (where the statistical database is schematically represented by bar graph 507*b* that shows percentage of time something is liked versus percentage of time same thing is disliked). Likes and dislikes may alternatively or additionally be collected by means of explicit votes cast by the user. The likes and dislikes statistics may be used for automatically computing availability scores (516*a*) for the user based on associated attributes of a given event which attributes the user may be likely to like or dislike.

In addition to typical likes and dislikes (507*b*) of the user and typical consumption amounts per week for respective consumables, there may be certain patterns of behavior which the user exhibits in response to relevant variables. These may be recorded as typical "routines" of the user and encoded in the PHAFUEL embedded knowledge base rules (KBR's 599) for the user. For example, one KBR (516*b*) may contribute to determination of the user's availability scores (516*a*) and may define a routine such as: "IF current time is before normal lunch time AND contemplated activity includes lunch AND afternoon work load is low THEN increase Availability Score for contemplated activity by +20". This is an example. Some KBR's may decrement the user's availability scores (516*a*) for a given event; for example: "IF expected duration of contemplated activity is greater than 1 hour AND afternoon work load is high THEN decrease Availability Score for contemplated activity by adding −30 to it."

One of the example time lines, 503.4 is for an extended holiday weekend. Such a contextual time line may have an automatic KBR recorded for it to indicate that the user (531) is not available for any work-related activities when that contextual time line 503.4 is in effect. Accordingly, the currently activated PHAFUEL record (e.g., 501*a*) for the user and the currently activated contextual time line (e.g., 503.4) may influence which promotional offerings and/or invitations to online chat or other forum participation opportunities or real life (ReL) gatherings the user receives. And as further indicated above, the currently activated PHAFUEL record and its included contextual time line (e.g., 503.1) may work to increase or decrease a self-confirming confidence score (516*c*) or not based on how closely the user's actually observed activities conform to those predicted by the habits and routines recorded in the then activated PHAFUEL record.

Referring to FIG. 5B, many of the items illustrated there are substantially similar to those of FIG. 5A and therefore will not be explained again. The illustrated Personal Social Dynamics Interaction Profiles (PSDIP's) 502*a*, 502*b* indicate propensities for different kinds of social dynamics modes. In any given context; say for a "normal work day" flow (503.1), a given user (531') may have a propensity for a different kind of social dynamics characteristic based for example on time of day in the unfolding contextual time line, based on location and based on people who are proximate to the user. More specifically, and as is indicated by way of example at 506*b*, when the exemplary user 531' gets up first thing in the morning (e.g., 6:00 AM), she may have a heightened propensity for being in a non-attentive, non-assertive, "zombie" mode and thus not truly available for any meaningful kind of social interaction. After breakfast, and as is indicated by the event-anchored propensity graphs of contextual time/place line 506*d*, the user may be finally out of the "zombie" mode and more likely than not, shifted into an attentive listening mode within which she will likely be more receptive to hearing what others have to say (or otherwise communicate) to her. In such a case, availability score (see 516*a* of FIG. 5A) may be automatically increased for chat or other forum participation opportunities that call for strong ability to be in an attentive listening mode. Later, when the same user is exercising in the gym and exhausted from a rigorous work out, propensity for being in the non-attentive, non-assertive, "zombie" mode may increase again; while after the gym activity, the user's propensity for attentive listening and/or being an assertive leader of a discussion may return. The list of possible social dynamics modes provided at 506*b*, includes, but is not limited to, zombie mode, attentive listening mode, assertive leadership mode, being open to mindless "small talk" as it is sometimes called, and so on. The knowledge base rules (KBR's) 599' for the currently activated PSDIP record (e.g., 502*a*) may include IF/THEN rules for switching over to different PSDIP records as being the currently activated one and/or IF/THEN rules for setting or adjusting various confidence scores and/or availability scores (see 516*c*, 516*a* of FIG. 5A). For example, one KBR (not shown) may define a propensity change as follows: "IF user just had strong cup of coffee and is in edgy mood (as indicated by above normal heartbeat rate) THEN increase ready-for-attentive listening score by +20 and increase ready-for-exchange that includes assertiveness by +10". Various other social dynamics attributes that might be assigned to the given user (531') may include degree of friendliness, of combativeness, of being empathetic, of being ready for comic relief and/or of degrees of other traits within a multi-dimensional range of possible, social dynamical traits and propensities.

Referring to FIG. 6, shown here is a flow chart for a machine-implemented process 600 wherein one or more STAN_3 system users are identified for receiving a promotional offering from respective one or more sponsors.

In step 601, machine readable instructions and/or specifications from a respective sponsor (e.g., vendor of goods and/ or services) are fetched by the system and acted upon. The fetched instructions/specifications may directly cause or indirectly influence the formation of an offerees space (e.g., in a system memory area) that is to be populated by recorded identifications of one or more users who are to receive a corresponding promotional offering at an appropriate time and place and/or under other appropriate context. In the cases of FIGS. 5A and 5B, it was basically revealed how different users have respective availabilities and propensities for welcoming respective invitations or not into corresponding chat or other forum participation sessions and/or to real life (ReL) events based on where those users are in their respective contextual time lines (e.g., 503.1 of FIG. 5A) and where social dynamics-wise those users are in their respective social dynamics propensity time lines (e.g., **506*d* of FIG. 5B). The goal of the one or more sponsors who are involved in this process (600 of FIG. 6) is to generate a filtered collection of user identifications for respective time slots where the users of each filtered subset have substantial likelihood for welcoming a corresponding promotional offering during that time slot because the slot matches up with their temporal disposition along their individualized contextual time lines (e.g., 503.1 of FIG. 5A) and/or their individualized social interaction propensity time lines (e.g., 506*d* of FIG. 5B) for then welcoming the offering. As mentioned above, a promotional offering need not take the form of calling for a minimum number of users to sign up for the offering. Instead, an offering can involve a whittling down of a large crowd of candidate users by way of lotteries and/or contests and/or attribute requirements so that at the end of the day, only one or a handful (e.g., 5 or less) of competing users win a prize such as a deep discount coupon or another promotional offering. All the other players who do not win placement in the top spot or top handful of spots in the online contest or game, end up with no prize at all or perhaps discount coupons of progressively increasing values for those contestants who mange to stay longer in the game. Stated otherwise, rather than trying to fill an empty offeree space (652 in FIG. 6**) with at least a minimum number of users who sign up for the deal, the promotional offering process may start with too many (more than a pre-specified maximum) of user identifications and then proceed to whittle that list down to a number equal to or less than the pre-specified maximum number.

The right side of FIG. 6 shows schematically a starting state 650 in which the offeree space 652 is empty, the sponsor specification 651 defines a minimum number of users who must sign up for the pre-specified promotional offering before a pre-specified deadline time arrives and/or a pre-specified other offer-ending event occurs (e.g., there are no more surplus units in discounted lot of goods that was being offered). Although not shown, the sponsor specification 651 may further define additional ones of preferences (e.g., demographic preferences) for who should be added into, or alternatively removed from, the offeree space 652 before the deal is consummated. Step 602 of the illustrated flow chart represents the instantiating in machine memory of the process for populating the offeree space 652 in accordance with dictates or preferences of a received sponsor specification 651; where linkage 653 represents the utilization of the sponsor specification 651 by the STAN_3 system in trying to fulfill the sponsor request. The instantiated process for populating the offeree space 652 is activated in a respective data processing server of the cloud computing system 660 as is indicated by instantiation line 655.

At the time of instantiation (655), each of the illustrated, exemplary users, A and B, may already be respectively participating in a respective online chat or other forum participation session or in a game or contest session as is represented by sessions 661 and 662 respectively. During the respective participation by users A and B in their respective sessions (where the respective sessions may include participation in a same chat or other forum participation session and/or same game or contest or lottery), respective CFi's and/or CVi signals are collected from the participating users A and B. The collected CFi's and/or CVi signals may be of relevance to the specification 651' provided by the sponsor. For example, a sponsor specification may call for populating a corresponding offeree space 652' only with users who have a participation heat score exceeding a pre-specified minimum value. Those users whose recently received CFi's and/or CVi signals do not provide the desired participation heat score are not allowed into the corresponding offeree space 652' or are jettisoned from that space. The use of session-obtained CFi's and/or CVi signals is represented in steps 612 and 614 of the process flow chart. Adding in or pruning out of qualifying/non-qualifying users is represented in step 616.

The process of sending out promotional offerings to users may occur even as more users are being hunted for to be added into the offeree space 652' or pruned out (656) from that space. This is so because offeree space 652' may be viewed as operating in accordance with a bubble sort mechanism where the best candidates among current offerees within space 652' bubble to the top on a competitive basis and the least desired ones precipitate down towards the bottom. First offers are sent (620) to the most promising candidates who have managed to bubble to the top of the list and stay there for a pre-specified duration (and/or until their heat scores rise to a pre-specified threshold). At the same time, competitive sorting continues (see feedback path 623) for the less promising candidates who do not get an offering sent to them until it is clear that better candidates will likely not be found before the pre-specified deadline runs out or another offer-ending even occurs.

At step 622, if the time for populating the offeree space 652' has not run out (or another offer-ending event has not yet happened), control is returned via path 623 to the space populating (or pruning) step 616 and the subsequent sending out in step 620 of an offer to a user is understood to be to another user (B, C, D; not A) who next qualifies as being the best available candidate for receiving such an offer at the time. If the result of testing step 622 is that time has run out or that another offer-ending event has occurred, then the sending out of more offers stops and the offer or deal may then be consummated in step 625.

The right side, data flow diagram of FIG. 6 shows on related aspect of sending offers to user candidates at different times. Typically, there is a delay between when the offer is sent out (event 657) and when the targeted recipient (e.g., user A and event 658) accepts, if at all or optionally explicitly declines the offer. Different delay times for acceptance or decline may be attributed to different user populations (e.g., different user demographics). Accordingly, and in accordance with one embodiment, the time for cutting off testing step 622 may be extended in accordance with the expected user response delay time even though users are told the deadline ends earlier.

The above is nonlimiting and by way of a further examples, it is understood that the configuring of user local devices (e.g., 100 of FIG. 1A, 199 of FIG. 2) in accordance with the disclosure can include use of a remote computer and/or remote database (e.g., 419 of FIG. 4A) to assist in carrying out activation and/or reconfiguration of the user local devices. Various types of computer-readable tangible media or machine-instructing means (including but not limited to, a hard disk, a compact disk, a flash memory stick, a downloading of manufactured and not-merely-transitory instructing signals over a network and/or the like may be used for instructing an instructable local or remote machine of the user's to carry out one or more of the Social-Topical Adaptive Networking (STAN) activities described herein. As such, it is within the scope of the disclosure to have an instructable first machine carry out, and/to provide a software product adapted for causing an instructable second machine to carry out machine-implemented methods including one or more of those described herein.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A machine-implemented method for enhancing a network using experience of a respective first user, the method comprising:

causing a plurality of machine-performed processes to occur with respect to the first user and with respect to a local data processing device which is currently accessible by the first user, where the local data processing device is operatively coupled to or includes as a part thereof of a network content displaying and/or otherwise presenting mechanism for displaying and/or otherwise locally presenting to the first user, content obtained from one or more electromagnetic communication based networks;

wherein the local data processing device is operatively coupled to and/or has executing within it, a corresponding one or more network browsing modules where at least one of the network browsing modules is configured to cause a presenting of browser generated content to the first user by way of the content presenting mechanism;

wherein the at least one network browsing module is configured to relay upload data to an associated network server thereof that is operatively coupled to a corresponding one of the networks and is disposed functionally upstream of the local data processing device in terms of a data uploading scheme that provides transmission of uploading data, the uploading transmission extending from the at least one network browsing module and upstream by way of the corresponding network to an associated network server module operative in the associated network server;

wherein the relayed upload data includes at least one of current focus indicator (CFi) data and data providing logical linkings as between plural ones of uploaded CFi data or as between uploaded CFi data and other uploaded data and where the relayed or logically-linked-to and uploaded CFi data indicates one or more attributes of automatically repeatedly monitored and recent attention giving activities of the first user, the recent attention giving activities being ones whereby the first user recently gave focused attention to content presented by the local content presenting mechanism, and the recent attention giving activities including at least one of:

a making of one or more facial expressions by the first user;

a making of body language gestures other than facial expressions by the first user;

a directing of the first user's head in a particular direction;

a training or focusing or trajectory patterns of the first user's eyes on or along with particular content presented by a content displaying device;

a change from steady state in eye based activities of the first user such as eyelid blink rate, eye dart rate, and pupil dilation pattern;

a wobbling, tilting, nodding, or shaking of the first user's head in a particular fashion;

an inputting of touch-type or other device actuation inputs by the first user;

an inputting of device grip and/or device tilt and/or device jiggle manipulation by the first user;

a simultaneous combination of one or more body language gestures and input device actuations by the first user;

a change into an active listening mode from a passive or non-listening mode;

a change into an active odor detecting mode;

a change into a tensed muscles mode; and a change of emotional or biometric state in apparent response to newly recognized content;

an activating or deactivating or moving of or shifting between use of different ones of identifiable and at hand resources by the first user such as a turning on of previously turned-off and at hand electrical devices and such as a moving by the first user of identifiable and at hand non-electrical objects;

an accepting of an invitation provided by the machine system or a pursuing of additional content suggested by the machine system and;

a deviation of significant magnitude from predetermined patterns of habits and routines of the first user;

wherein the automatically repeatedly monitored attention giving activities of the first user are transparently monitored by at least one of the machine-performed processes without need for diverting focusing of attention by the first user for aiding the at least one machine-performed process, where such diverted focusing of attention, if it hypothetically had occurred, would have been directed to aiding the determinations of what the recent attention giving activities of the first user are or recently were;

wherein the associated network server normally responds to non-CFi data uploaded thereto from the at least one network browsing module by responsively downloading corresponding and presentable content to the at least one network browsing module for presentation by way of the content presenting mechanism;

the plurality of caused and machine-performed processes of said machine-implemented method including, in addition to said at least one machine-performed process for automatically repeatedly monitoring attention giving activities of the first user:

causing the associated upstream network server to receive the relayed and uploaded data including the current focus indicator (CFi) data and/or the data providing logical linkings to CFi data that has been relayed thereto by the at least one network browsing module; and causing the associated upstream network server to relay to a Social-Topical Adaptive Networking (STAN) system further-upstream-relayed CFi data corresponding at least to the current focus indicator (CFi) data and/or the data providing logical linkings forwarded to the STAN system from the associated upstream network server;

wherein the STAN system is configured to automatically determine one or more likely cognitive states of the first user based on the further-upstream-relayed current focus indicator (CFi) data relayed to the STAN system, the automatic determining of likely cognitive states being carried out by the STAN system without need for diverting centering of attention by the user directed to aiding the automatic determining by the STAN system of the likely cognitive states of the first user.

2. The experience enhancing method of claim 1 wherein the plurality of caused processes further include:

causing result data produced by the STAN system to be relayed downstream to at least one of:

the network server;

one or more of the network browsing modules;

the local data processing device;

wherein the produced result data includes at least one of:

an indication of significant correlation between likely cognitive states of the first user and nodes or subregions within one or more of communal Cognitions-representing Spaces maintained and dynamically updated by the STAN system;

an identification of, or a downstream relaying of, content and/or potential forum participation opportunities and/or forum participant information corresponding to the nodes or subregions within one or more of the communal Cognitions-representing Spaces that are determined by the STAN system to have significant correlation to the likely cognitive states of the first user.

3. The experience enhancing method of claim 1 wherein the plurality of caused processes further include:

causing, before the relaying thereof by the associated network server to the STAN system, an attachment of respective time of focus and/or screen location information to the current focus indicator data which is relayed by the at least one browsing module upstream to the network server, where the attached time of focus and/or screen location information is indicative of a respective time of focus-upon and/or of a respective screen location of respective content indicated to be focused-upon by the respective current focus indicator data; and causing the STAN system to use the attached time of focus and/or screen location information to form a context-based hybrid clustering of received current focus indicators and chronological and/or spatial contexts associated therewith.

4. The experience enhancing method of claim 3 wherein the plurality of caused processes further include:

causing presentation to the first user of new content that is derived based on use of result data produced by the STAN system;

wherein the produced result data includes at least one of:

an indication of significant correlation between likely cognitive states of the first user and nodes or subregions within one or more of communal Cognitions-representing Spaces maintained and dynamically updated by the STAN system;

an identification of, or a downstream relaying of, content and/or potential forum participation opportunities and/or forum participant information corresponding to the nodes or subregions within one or more of the communal Cognitions-representing Spaces that are determined by the STAN system to have significant correlation to the likely cognitive states of the first user.

5. The experience enhancing method of claim 4 wherein the STAN system stores one or more pre-defined profiling models that model at least one of expressional behaviors, habits, routines, social dynamics behaviors, topic preferences and personhood attributes or co-compatibility preferences of the first user and wherein the plurality of caused processes further include:

causing a learning to take place within the STAN system based on an obtained reaction by the first user to the caused presentation of the new content, where the caused learning reinforces a pre-defined profiling model of the first user or detracts from the pre-defined profiling model of the first user.

6. A machine-implemented and automated process comprising:

providing experience-enhancing empowerment to a first user, where the first user has states and attention giving activities that can be automatically repeatedly and transparently monitored by one or more local devices having access to the first user and his/her respective expressings of clues respecting corresponding states and attention giving activities of the first user, the provided experience-enhancing empowerment being that which gives the first user choice rather than forcibly pushing experience-enhancing or other content onto the first user (other than presenting the first user with invitations or other user-acceptable but ignorable or hideable offerings) and the experience-enhancing empowerment enabling for reporting signals representing transparently and automatically repeatedly monitored states and/or activities of that first user to be sent to, received by and/or recognized by a remote Social-Topical Adaptive Networking (STAN) system which is not neighboring and thus remote from the local devices and where such received and/or recognized reporting signals induce an automated carrying out in the remote Social-Topical Adaptive Networking (STAN) system of an automated informational resource lookup operation on behalf of the first user where the STAN system stores one or more hybrid Cognitive Attention Receiving Spaces each having corresponding points, nodes or subregions representing a hybridization of points, nodes or subregions of at least two further Cognitive Attention Receiving Spaces that are also stored in the STAN system and where the automated informational resource lookup operation includes one or more of:

(a) an automatic determining of one or more likely current contexts of the first user;

(b) based on the said automatically determined or on an otherwise predetermined one or more likely current contexts, an automatic determining of one or more currently activated profiles that are currently to be used for the first user;

(c) based on the currently activated one or more profiles and on state and/or activities reporting signals then received for the first user, where for the case of this paragraph, the reporting signals report attention giving activities of the user and/or report recent physical context and/or report biometric states of the user, automatically identifying one or more points, nodes or subregions of a hybrid Cognitive Attention Receiving Space to be pointed-to as corresponding to at least one of the currently activated profiles and the reporting signals;

(d) based on recently pointed-to parts of the hybrid Cognitive Attention Receiving Space as pointed on behalf of the first user, automatically identifying one or more informational resource signals to be transmitted to the first user for thereby providing experience-enhancing empowerment to the first user, where the informational resource signals can represent at least one of: invitations to join chat or other online forum participation sessions, invitations to join real life (ReL) or virtual life events related to the pointed-to parts of the hybrid Cognitive Attention Receiving Space, suggestions to connect with one or more identified other users in regard to the pointed-to parts of the hybrid Cognitive Attention Receiving Space, and suggestions to access one or more identified data resources in regard to the pointed-to parts of the hybrid Cognitive Attention Receiving Space;

wherein the attention giving activities include at least one of:

a making of one or more facial expressions by the first user;

a making of body language gestures other than facial expressions by the first user;

a directing of the first user's head in a particular direction;

a training or focusing or trajectory patterns of the first user's eyes on or along with particular content presented by a content displaying device;

a change from steady state in eye based activities of the first user such as eyelid blink rate, eye dart rate, and pupil dilation pattern;

a wobbling, tilting, nodding, or shaking of the first user's head in a particular fashion;

an inputting of touch-type or other device actuation inputs by the first user;

an inputting of device grip and/or device tilt and/or device jiggle manipulation by the first user;

a simultaneous combination of one or more body language gestures and input device actuations by the first user;

a change into an active listening mode from a passive or non-listening mode;

a change into an active odor detecting mode;

a change into a tensed muscles mode; and a change of emotional or biometric state in apparent response to newly recognized content;

an activating or deactivating or moving of or shifting between use of different ones of identifiable and at hand resources by the first user such as a turning on of previously turned-off and at hand electrical devices and such as a moving by the first user of identifiable and at hand non-electrical objects;

an accepting of an invitation provided by the machine system or a pursuing of additional content suggested by the machine system and;

a deviation of significant magnitude from predetermined patterns of habits and routines of the first user; and wherein the experience-enhancing empowerment includes:

carrying out said automated informational resource lookup operation on behalf of the first user; and providing the first user with one or more informational resources based on the automated informational resource lookup operation.

7. A machine-implemented, non-abstract and automated process that provides for adaptive social networking between plural users of a machine system, where the machine system is used in implementing the process and where the process comprises:

empowering a first user and/or one or more data processing devices proximate to the first user to cause one or more other data processors of the machine system, which other data processors are operatively coupled to the one or more proximate devices, to home in on one or more of at least one plurality of points, nodes or subregions in a maintained one of plural Communal Cognitions-representing Spaces maintained by the machine system, where the homed-in on points, nodes or subregions are ones determined by the machine system to more likely than others cross-correlate to apparent individualized current cognitions of the first user, wherein the Communal Cognitions-representing Spaces include a Context Space whose points, nodes or subregions include ones representing different user-adoptable roles;

wherein said empowering includes machine-implemented identification of the first user;

wherein said system-maintained plural Communal Cognitions-representing Spaces each includes stored data-objects representing hierarchically and/or spatially organized at least one plurality of points, nodes or subregions and wherein the hierarchical and/or spatial organizations in the respective Communal Cognitions-representing Space of at least one plurality of the points, nodes or subregions thereof are determined and are modifiable, at least in part, by over-a-network reported actions of a corresponding community formed by at least a subset of the plural users of the machine system; and wherein the empowering of the first user includes:

automatically repeatedly carrying out one or more automated informational resource lookup operations on behalf of the first user without need for diverting focusing of attention by the first user for aiding the one or more automated informational resource lookup operations, at least one of the automated informational resource lookup operations being based on an identifying by the machine system of a likely context of the first user among plural contexts represented by the points, nodes or subregions of the Context Space; and providing the first user with an opportunity to access one or more informational resources identified by the machine system based on the one or more automated informational resource lookup operations.

8. The automated process of claim 7 and further wherein:

the stored data-objects of one or more of the plural Communal Cognitions-representing Spaces further include cognitive-sense-representing clustering center points (COGS's) that are hierarchically and/or spatially organized relative to a corresponding one or more of the points, nodes or subregions of the respective one or more Communal Cognitions-representing Spaces; and the automated process uses a calculated hierarchical and/or spatial distance between a given clustering center point (COGS) and one or more points, nodes or subregions that are hierarchically and/or spatially disposed in a neighborhood of the COGS to automatically determine how substantially same or similar the one or more points, nodes or subregions in an underlying cognitive sense to a cognitive sense represented by the given clustering center point.

9. The automated process of claim 7 and further wherein:

the stored data-objects of one or more of the plural Communal Cognitions-representing Spaces include hierarchically and/or spatially clustered together ones of points, nodes or subregions of the respective one or more Communal Cognitions-representing Spaces; and the automated process uses a calculated hierarchical and/or spatial distance between the hierarchically and/or spatially clustered together ones of points, nodes or subregions of a respective Communal Cognitions-representing Space to automatically determine how substantially same or similar the one or more points, nodes or subregions in an underlying cognitive sense are to one another.

10. The automated process of claim 7 and further wherein aside from the Context Space, the plural Communal Cognitions-representing Spaces of the machine system include at least two of:

a topics mapping space;

a recently focused-upon sub-portions of-content mapping space;

a keywords mapping space;

a URLs mapping space;

a meta-tags mapping space; and a hybrid mapping space whose points, nodes or subregions logically link to respective points, nodes or subregions in at least two other Communal Cognitions-representing Spaces of the machine system.

11. The automated process of claim 10 wherein at least a respective one of the points, nodes or subregions (PNOS's) of at least one of the Communal Cognitions-representing Spaces includes data identifying at least one of:

chat or other forum participation opportunities and/or sessions that are currently strongly tethered by respective scored logical tethering links to the respective PNOS;

a ranked set of keyword expressions that are currently strongly linked by respective scored logical links to the respective PNOS;

a ranked set of URL expressions that are currently strongly linked by respective scored logical links to the respective PNOS;

a ranked set of meta-data expressions that are currently strongly linked by respective scored logical links to the respective PNOS;

a ranked set of user context definitions that are currently strongly linked by respective scored logical links to the respective PNOS;

a ranked set of expert user identifications that are currently strongly linked by respective scored logical links to the respective PNOS;

a ranked set of influential user identifications that are currently strongly linked by respective scored logical links to the respective PNOS;

a ranked set of first other points, nodes or subregions in respective Cognitions-representing Space of the respective PNOS that are currently strongly linked by respective scored logical links to the respective PNOS, where the first other points include hierarchical children of the respective PNOS; and a ranked set of second other points, nodes or subregions in another Cognitions-representing Space that are currently strongly linked by respective scored logical links to the respective PNOS.

12. The automated process of claim 10 wherein at least a respective one of the points, nodes or subregions (PNOS's) of at least one of the Communal Cognitions-representing Spaces includes data identifying at least one of:

a hierarchical location within a corresponding hierarchical organizing scheme of the respective Cognitions-representing Space where the respective PNOS is located;

a spatial location within a corresponding spatial organizing scheme of the respective Cognitions-representing Space where the respective PNOS is located;

a unique serial number or other unique identification assigned to the respective PNOS;

a version time and date assigned to the respective PNOS;

a currently dead or alive status assigned to the respective PNOS;

a respective hierarchical and/or spatial anchor factor currently assigned to the respective PNOS for indicating a respective anchoring strength at the corresponding hierarchical and/or spatial locations of the respective PNOS in the corresponding hierarchical and/or spatial location where it is deemed to be located;

an identification of one or more governance bodies currently empowered to modify one or more attributes of the respective PNOS including its hierarchical location or its spatial location or its respective hierarchical and/or spatial anchor factors or other attributes of the respective PNOS.

13. The automated process of claim 7 and further wherein the respective points, nodes or subregions (PNOS's) of at least one of the Communal Cognitions-representing Spaces of the machine system are distributed among:

a primitives portion that contains primitive ones of the PNOS's; and a composites portion that contains operator nodes which each define a composite point, node or subregion based on two or more of the primitive PNOS's contained in the primitives portion.

14. The automated process of claim 13 wherein:

the primitive ones of the PNOS's include at least one of:

a textual expression primitive object;
a topic primitive object;
a music primitive object;
a sound primitive object;
a voice primitive object;
a context primitive object;
an image primitive object;
an anatomy and movement primitive object;
a biological state primitive object; and
a reactive chemical mixture primitive object.

15. The automated process of claim 7 wherein said empowering of the first user and/or the one or more proximate devices to cause said homing-in-on includes:

empowering one or more of the proximate devices to automatically repeatedly and transparently transmit to the one or more data processors of the machine system, current focus indicator signals (CFi's) that indicate current activities and/or current states of the first user.

16. The automated process of claim 15 wherein the indicated current activities and/or current states of the first user include at least one of:

a current location of the first user in real life (ReL) and/or in a virtual space;

a current time zone and/or date zone of the first user in real life (ReL) and/or in a virtual space;

a current pre-scheduled activities state of the first user;

identifications of other personas currently surrounding the first user in a potentially current attention giving way and/or in a near future interaction capability way;

a current other-contextual state of the first user;

a current biometric state of the first user;

current sub-portions of available content that are apparently being focused-upon by the first user; and at least one of keywords, URL's and/or meta-tags that are logically linked to the current sub-portions of available content that are apparently being focused-upon by the first user.

17. The automated process of claim 15 wherein the one or more other data processors of the machine system provide a CFi's clustering function that clusters together on a trial and error basis, different permutations of information provided on behalf of the first user by recently received CFi signals associated with the first user.

18. The automated process of claim 7 wherein said other data processors of the machine system define a chunky granularity cloud system having a plurality of data centers whose resources are primarily but not exclusively dedicated to servicing system users of respective different geographic zones, where the plural data centers can be used to back one another up in case one of the data centers becomes inoperable or overwhelmed with service requests, but where the data centers are not all identical, one to the next in terms of locally stored data, but rather where some of the data centers store locally significant data not stored at others of the data centers, the locally significant data including data representing locally significant points, nodes or subregions in the maintained one or more of the plural Communal Cognitions-representing Spaces maintained by the machine system.

19. The process of claim 6 and further wherein:

the automated informational resource lookup operation includes one or more of:

(a) an automatic determining of one or more likely current contexts of a second user;

(b) based on the said automatically determined or on an otherwise predetermined one or more likely current contexts of the second user, an automatic determining of one or more currently activated profiles that are currently to be used for the second user;

(c) based on the currently activated one or more profiles and on state and/or activities reporting signals then received for the second user, where for the case of this paragraph, the reporting signals report attention giving activities of the second user and/or report recent physical context and/or report biometric states of the second user, automatically identifying one or more points, nodes or subregions of a hybrid Cognitive Attention Receiving Space to be pointed-to as corresponding to at least one of the currently activated profiles and the reporting signals of the second user;

(d) based on recently pointed-to parts of the hybrid Cognitive Attention Receiving Space as pointed on behalf of the second user, automatically identifying one or more informational resource signals to be transmitted to the second user for thereby providing an experience-enhancing empowerment to the second user, where the informational resource signals can represent at least one of: invitations to the second user to join chat or other online forum participation sessions, invitations to the second user to join real life (ReL) or virtual life events related to the pointed-to parts of the hybrid Cognitive Attention Receiving Space, suggestions to the second user to connect with one or more identified other users in regard to the pointed-to parts of the hybrid Cognitive Attention Receiving Space, and suggestions to the second user to access one or more identified data resources in regard to the pointed-to parts of the hybrid Cognitive Attention Receiving Space;

(e) based on sameness or closeness of the respective recently pointed-to parts within at least one of the one or more hybrid Cognitive Attention Receiving Spaces that are respectively pointed to on behalf of the first and second users, generating a desirability of joinder score indicating how desirable it is to automatically suggest to both of the first and second users that they join into a common online forum participation session and/or into a common real life (ReL) or virtual life event.

20. The process of claim 19 wherein:

the common real life (ReL) event, if suggested, is at least one of:

a group discount transactional event;

a promotional offering event;

a customized promotional offering event;

an eating experience;

a drinking experience;

a business meeting;

a sports event;

a conference;

a shared multi-media experience; and a resources using event in which physical resources of a shared physical location are to be used.

21. The process of claim 19 wherein:

the common online forum participation session or common virtual life event, if suggested, is at least one of:

a group discount transactional event;

a promotional offering transaction;

a customized promotional offering transaction;

a group expansion transaction which seeks to increase or increases the size of the group;

a business meeting;

a conference;

a shared multi-media experience; and a resources using event in which resources of a shared virtual resources provider are to be used.

22. The automated process of claim 7 wherein the process further comprises:

empowering a second user and/or one or more data processing devices proximate to the second user to cause one or more other data processors of the machine system, which other data processors are operatively coupled to the one or more proximate devices of the second user, to home in on one or more of at least one plurality of points, nodes or subregions in a maintained one of the plural Communal Cognitions-representing Spaces maintained by the machine system, where the homed-in on points, nodes or subregions are ones determined by the machine system to more likely than others cross-correlate to apparent individualized current cognitions of the second user; and based on sameness or closeness of the respective recently pointed-to parts within at least one of the one or more Cognitive Attention Receiving Spaces that are respectively pointed to on behalf of the first and second users, generating a desirability of joinder score indicating how desirable it is to automatically suggest to both of the first and second users that they join into a common online forum participation session and/or into a common real life (ReL) or virtual life event.

23. The automated process of claim 22 wherein the common real life (ReL) event, if suggested, is at least one of:

a group discount transactional event;

a promotional offering event;

a customized promotional offering event;

an eating experience;

a drinking experience;

a business meeting;

a sports event;

a conference;

a shared multi-media experience; and a resources using event in which physical resources of a shared physical location are to be used.

24. The process of claim 22 wherein:

the common online forum participation session or common virtual life event, if suggested, is at least one of:

a group discount transactional event;

a promotional offering transaction;

a customized promotional offering transaction;

a group expansion transaction which seeks to increase or increases the size of the group;

a business meeting;

a conference;

a shared multi-media experience; and a resources using event in which resources of a shared virtual resources provider are to be used.

25. A machine-implemented, non-abstract and automated process that automatically cross-correlates between likely individual cognitions of an individual first user and corresponding machine representations of communal cognition points, nodes or subregions in a plurality of machine-stored and machine-updated Cognitions-representing Spaces, where the process comprises:

(a) transparently and automatically repeatedly monitoring current activities of the first user and attributes of the first user's current surroundings;

(b) automatically generating current focus indicator signals (CFi's) that represent respective and temporally adjacent ones of said monitorings of the current activities of the first user and of the attributes of the first user's current surroundings;

(c) automatically relaying the generated CFi's to a machine-implemented Social-Topical Adaptive Networking (STAN) system that stores and automatically updates a plurality of Communal Cognitions-representing Spaces, wherein the Communal Cognitions-representing Spaces each include data representing points, nodes or subregions to which corresponding ones of the likely individual cognitions of the monitored first user can be correlated;

wherein the Communal Cognitions-representing Spaces include a Context Space whose points, nodes or subregions include ones representing different user-adoptable roles or user performable activities that are respectively adoptable and performable by the first user;

wherein said empowering includes machine-implemented identification of the first user;

wherein the relayed CFi's are usable by the STAN system for cross-correlating between the likely individual cognitions of the first user and corresponding ones of the points, nodes or subregions of two or more of the Communal Cognitions-representing Spaces maintained by the STAN system; the two or more of the Communal Cognitions-representing Spaces including said Context Space;

wherein the monitored current activities include at least one of:

a making of one or more facial expressions by the first user;

a making of body language gestures other than facial expressions by the first user;

a directing of the first user's head in a particular direction;

a training or focusing or trajectory patterns of the first user's eyes on or along with particular content presented by a content displaying device;

a change from steady state in eye based activities of the first user such as eyelid blink rate, eye dart rate, and pupil dilation pattern;

a wobbling, tilting, nodding, or shaking of the first user's head in a particular fashion;

an inputting of touch-type or other device actuation inputs by the first user;

an inputting of device grip and/or device tilt and/or device jiggle manipulation by the first user;

a simultaneous combination of one or more body language gestures and input device actuations by the first user;

a change into an active listening mode from a passive or non-listening mode;

a change into an active odor detecting mode;

a change into a tensed muscles mode; and a change of emotional or biometric state in apparent response to newly recognized content;

an activating or deactivating or moving of or shifting between use of different ones of identifiable and at hand resources by the first user such as a turning on of previously turned-off and at hand electrical devices and such as a moving by the first user of identifiable and at hand non-electrical objects;

an accepting of an invitation provided by the machine system or a pursuing of additional content suggested by the machine system acid;

a deviation of significant magnitude from predetermined patterns of habits and routines of the first user; and wherein the empowering includes:

an automatically repeated carrying out by the machine system of one or more automated informational resource lookup operations on behalf of the first user; and providing the first user with an opportunity to access one or more informational resources identified by the machine system based on the automated informational resource lookup operations.

26. The machine-implemented process of claim 25 wherein:

the Context Space has stored therein, a plurality of context primitive objects (CPO's) each specifying at least one of:

a formal name of a role the corresponding CPO is associated with;

a formal activity the corresponding CPO is associated with;

one or more expected performances for a role or activity the corresponding CPO is associated with;

one or more expected topics that are cross-correlated to a role or activity the corresponding CPO is associated with;

one or more expected demographic attributes that are cross-correlated to a role or activity the corresponding CPO is associated with; and one or more forums that are cross-correlated to a role or activity the corresponding CPO is associated with.

27. The machine-implemented process of claim 25 wherein:

the Context Space has further stored therein, at least one operator node object that links to two or more of the context primitive objects (CPO's) for thereby defining a respective combined contexts object formed of a corresponding combination of two or more context primitive objects (CPO's).

28. The machine-implemented process of claim 25 wherein:

the Communal Cognitions-representing Spaces further include an Emotion and/or Behavioral States Space whose points, nodes or subregions include ones representing different user-adoptable emotions or behavioral states that are respectively adoptable and attainable by the first user; and the relayed CFi's are usable by the STAN system for cross-correlating between the likely individual cognitions of the first user and corresponding ones of the points, nodes or subregions of two or more of the Communal Cognitions-representing Spaces maintained by the STAN system; the two or more of the Communal Cognitions-representing Spaces including the Emotion and/or Behavioral States Space.

29. The machine-implemented process of claim 28 wherein:

the Emotion and/or Behavioral States Space has stored therein, a plurality of physiological, biological and/or medical condition/state representing primitive objects (PBMCSRO's) each specifying at least one of:

a condition name the corresponding PBMCSRO is associated with;

a condition degree the corresponding PBMCSRO is associated with;

a demographic frequency the corresponding PBMCSRO is associated with;

one or more expected topics that are cross-correlated to the corresponding PBMCSRO;

a pre-specified emotion the corresponding PBMCSRO is associated with;

a pre-specified body portion the corresponding PBMCSRO is associated with; and points, nodes or subregions in others of the Communal Cognitions-representing Spaces that the corresponding PBMCSRO is associated with.

30. The machine-implemented process of claim 25 wherein:

the Communal Cognitions-representing Spaces further include a Topic Space whose points, nodes or subregions include ones representing different topics that the first user may center attention on; and the relayed CFi's are usable by the STAN system for cross-correlating between the likely individual cognitions of the first user and corresponding ones of the points, nodes or subregions of two or more of the Communal Cognitions-representing Spaces maintained by the STAN system; the two or more of the Communal Cognitions-representing Spaces including the Topic Space.

31. The machine-implemented process of claim 30 wherein:

the Topic Space has stored therein, a plurality of topic primitive objects (TPO's) each specifying at least one of:

a hierarchical and/or spatial position of the corresponding TPO within a respective topical hierarchy and a respective topical spatial framework;

a unique serial number or other such unique identifier of the corresponding TPO;

two or more sorted lists each sorted according to a different sorting algorithm and each listing links to respective specifications that specify a primitive topic associated with the corresponding TPO;

two or more sorted lists each sorted according to a different sorting algorithm and each listing links to respective keywords or points, nodes or subregions in a Keyword Space that are associated with the corresponding TPO;

two or more sorted lists each sorted according to a different sorting algorithm and each listing links to respective URL's or points, nodes or subregions in a URL Space that are associated with the corresponding TPO; and two or more sorted lists each sorted according to a different sorting algorithm and each listing respective points, nodes or subregions in the Context Space that are associated with the corresponding TPO.

32. The machine-implemented process of claim 25 wherein:

the Communal Cognitions-representing Spaces further includes one or more Additional Cognitions Spaces whose respective points, nodes or subregions include ones representing additional cognitions that the first user may have in addition to that regarding a currently perceived context under which the first user is operating; and the one or more Additional Cognitions Spaces each having stored therein, a respective plurality of cognition primitive objects representing a respective at least one of:

textually-expressible cognitions;

visually-experienced cognitions;

auditorially-experienced cognitions;

olfactorally-experienced cognitions;

haptically-experienced cognitions;

linguistically-experienced cognitions;

biological-state-wise experienced cognitions;

social-dynamics-wise experienced cognitions; and a hybrid of at least two different kinds of user experienceable or user-expressible cognitions.

33. The machine-implemented process of claim 32 wherein:

the cognition primitive objects of a respective at least one of the Additional Cognitions Spaces each have a respective spatial attribute whereby closely related ones of such cognition primitive objects can be correspondingly clustered close to one another by using the respective spatial attribute to indicate respective spatial closeness or distance between correspondingly more close and less close ones of the spatially clustered cognition primitive objects.

34. The machine-implemented process of claim 25 and further comprising:

(d) transparently and automatically repeatedly monitoring current activities of a second user and attributes of the second user's current surroundings;

(e) automatically generating current focus indicator signals (CFi's) that represent respective and temporally adjacent ones of said monitorings of the current activities of the second user and of the attributes of the second user's current surroundings;

(f) automatically relaying the generated CFi's to the machine-implemented Social-Topical Adaptive Networking (STAN) system, wherein the Communal Cognitions-representing Spaces each include data representing points, nodes or subregions to which corresponding ones of the likely individual cognitions of the monitored second user can be correlated;

wherein the points, nodes or subregions of the Context Space include ones representing different user-adoptable roles or user performable activities that are respectively adoptable and performable by the second user;

(g) using the respective CFi's of the first and second users, automatically and respectively pointing to respective parts within at least one of the one or more Cognitive Attention Receiving Spaces that respectively correspond to the respective CFi's of the first and second users; and (h) based on sameness or closeness of the respective recently pointed-to parts within at least one of the one or more Cognitive Attention Receiving Spaces that are respectively pointed to on behalf of the first and second users, generating a desirability of joinder score indicating how desirable it is to automatically suggest to both of the first and second users that they join into a common online forum participation session and/or into a common real life (ReL) or virtual life event.

35. The machine-implemented process of claim 34 wherein the common real life (ReL) event, if suggested, is at least one of:

a group discount transactional event;

a promotional offering event;

a customized promotional offering event;

an eating experience;

a drinking experience;

a business meeting;

a sports event;

a conference;

a shared multi-media experience; and a resources using event in which physical resources of a shared physical location are to be used.

36. The process of claim 34 wherein:

the common online forum participation session or common virtual life event, if suggested, is at least one of:

a group discount transactional event;

a promotional offering transaction;

a customized promotional offering transaction;

a group expansion transaction which seeks to increase or increases the size of the group;

a business meeting;

a conference;

a shared multi-media experience; and a resources using event in which resources of a shared virtual resources provider are to be used.

37. A machine-implemented, non-abstract and automated process that automatically provides a first user with information based on use of machine stored representations of communal cognition points, nodes or subregions in a plurality of machine-stored and machine-updated Cognitions-representing Spaces, where the process comprises:

(a) causing an automatic determining of what kinds of information are probably currently useful for the first user based on automatically repeated determinations of probable contexts of the first user; and (b) causing an automated using of the determined kinds of information in combination with an automated using of the machine-implemented Social-Topical Adaptive Networking (STAN) system to automatically provide the first user with said information, wherein the STAN system is one that stores and automatically updates a plurality of Communal Cognitions-representing Spaces, wherein the Communal Cognitions-representing Spaces each include data representing points, nodes or subregions of communal cognitions that can be matched to current likely individual cognitions such as those of the first user;

wherein the Communal Cognitions-representing Spaces include a Context Space whose points, nodes or subregions include ones representing different user-adoptable roles or user performable activities that are respectively adoptable and performable by the first user and where automatically repeated determinations of probable contexts of the first user use the Context Space as a resource for determining one or more probable contexts of the first user;

wherein the Communal Cognitions-representing Spaces further includes one or more Additional Cognitions Spaces whose respective points, nodes or subregions include ones representing additional cognitions that the first user may have in addition to that regarding a currently perceived context under which the first user may be operating.

38. The machine-implemented process of claim 37 and further comprising:

(c) causing an automatic determining of what kinds of second information are probably currently useful for a second user;

(d) causing an automated using of the determined kinds of second information of the second user in combination with an automated using of the machine-implemented Social-Topical Adaptive Networking (STAN) system to automatically provide the second user with said second information; and (e) causing an automated determination of commonality as between the first and second users based on sameness or closeness of respective parts of the Communal Cognitions-representing Spaces that are accessed respectively on behalf of the first and second users.

39. The machine-implemented process of claim 38 and further comprising:

based on the automated determination of commonality as between the first and second users, causing a generating of a desirability of joinder score indicating how desirable it is to automatically suggest to both of the first and second users that they join into a common online forum participation session and/or into a common real life (ReL) or virtual life event.

40. The machine-implemented process of claim 39 wherein the common real life (ReL) event, if suggested, is at least one of:

a group discount transactional event;
a promotional offering event;
a customized promotional offering event;
an eating experience;
a drinking experience;
a business meeting;
a sports event;
a conference;
a shared multi-media experience; and
a resources using event in which physical resources of a shared physical location are to be used.

41. The process of claim 39 wherein:

the common online forum participation session or common virtual life event, if suggested, is at least one of:

a group discount transactional event;
a promotional offering transaction;
a customized promotional offering transaction;
a group expansion transaction which seeks to increase or increases the size of the group;
a business meeting;
a conference;
a shared multi-media experience; and
a resources using event in which resources of a shared virtual resources provider are to be used.

* * * * *